(12) United States Patent
Forenza et al.

(10) Patent No.: US 9,826,537 B2
(45) Date of Patent: Nov. 21, 2017

(54) SYSTEM AND METHOD FOR MANAGING INTER-CLUSTER HANDOFF OF CLIENTS WHICH TRAVERSE MULTIPLE DIDO CLUSTERS

(75) Inventors: Antonio Forenza, San Francisco, CA (US); Stephen G. Perlman, Palo Alto, CA (US)

(73) Assignee: REARDEN, LLC, San Francisco, CA (US)

( * ) Notice: Subject to any disclaimer, the term of this patent is extended or adjusted under 35 U.S.C. 154(b) by 810 days.

(21) Appl. No.: 12/802,974

(22) Filed: Jun. 16, 2010

(65) Prior Publication Data

US 2011/0003606 A1 Jan. 6, 2011

Related U.S. Application Data

(63) Continuation-in-part of application No. 12/630,627, filed on Dec. 3, 2009, now Pat. No. 8,654,815, which
(Continued)

(51) Int. Cl.
*H04K 1/10* (2006.01)
*H04L 27/28* (2006.01)
(Continued)

(52) U.S. Cl.
CPC ........ *H04W 72/085* (2013.01); *H04B 7/0417* (2013.01); *H04B 17/318* (2015.01);
(Continued)

(58) Field of Classification Search
None
See application file for complete search history.

(56) References Cited

U.S. PATENT DOCUMENTS 2,127,656 A 8/1938 Terry
3,085,877 A 4/1963 Reid
(Continued)

FOREIGN PATENT DOCUMENTS

CA 1307842 C 9/1992
CA 1309769 C 11/1992
(Continued)

OTHER PUBLICATIONS

"AIRGO—Wireless Without Limits—Homepage", http://www.airgonetworks.com/, printed Apr. 9, 2004, 1 page.
(Continued)

*Primary Examiner* — Shuwang Liu
*Assistant Examiner* — Gina McKie
(74) *Attorney, Agent, or Firm* — Nicholson De Vos Webster & Elliott LLP

(57) ABSTRACT

A system and method are described for adjusting communication with a first distributed-input-distributed-output (DIDO) client as the first DIDO client moves from a first DIDO cluster to a second DIDO cluster: For example, in one embodiment of the system and method, different signal strength thresholds are specified and either conventional DIDO precoding and/or DIDO precoding with inter-DIDO-cluster interference (IDCI) cancellation to avoid RF interference at the DIDO client are employed based on measured signal strengths from a main DIDO cluster and an interfering DIDO cluster.

32 Claims, 111 Drawing Sheets

N-antenna Base Station with Single-antenna Client Devices

Related U.S. Application Data is a continuation-in-part of application No. 12/143,503, filed on Jun. 20, 2008, now Pat. No. 8,160,121, and a continuation-in-part of application No. 11/894,394, filed on Aug. 20, 2007, now Pat. No. 7,599,420, and a continuation-in-part of application No. 11/894,362, filed on Aug. 20, 2007, now Pat. No. 7,633,994, which is a continuation-in-part of application No. 11/894,540, filed on Aug. 20, 2007, now Pat. No. 7,636,381, which is a continuation-in-part of application No. 11/256,478, filed on Oct. 21, 2005, now Pat. No. 7,711,030, which is a continuation-in-part of application No. 10/817,731, filed on Apr. 2, 2004, now Pat. No. 7,885,354.

(51) Int. Cl.
| | | |
|---|---|---|
| *H04W 72/08* | (2009.01) | |
| *H04B 7/0417* | (2017.01) | |
| *H04L 25/03* | (2006.01) | |
| *H04B 17/318* | (2015.01) | |
| *H04L 1/00* | (2006.01) | |
| *H04L 5/00* | (2006.01) | |
| *H04L 25/02* | (2006.01) | |
| *H04B 17/24* | (2015.01) | |
| *H04B 17/345* | (2015.01) | |

(52) U.S. Cl.
CPC .. *H04L 25/03343* (2013.01); *H04L 25/03891* (2013.01); *H04B 17/24* (2015.01); *H04B 17/345* (2015.01); *H04L 1/0003* (2013.01); *H04L 1/0009* (2013.01); *H04L 1/0026* (2013.01); *H04L 1/0029* (2013.01); *H04L 5/0007* (2013.01); *H04L 25/0204* (2013.01); *H04L 2025/03426* (2013.01)

(56) References Cited

U.S. PATENT DOCUMENTS

| | | |
|---|---|---|
| 3,335,716 A | 8/1967 | Alt et al. |
| 3,699,856 A | 10/1972 | Chabot et al. |
| 3,805,238 A | 4/1974 | Rothfjell |
| 3,887,906 A | 6/1975 | Minnaja |
| 3,887,925 A | 6/1975 | Ranghelli et al. |
| 4,003,016 A | 1/1977 | Remley |
| 4,075,097 A | 2/1978 | Paul |
| 4,076,097 A | 2/1978 | Clarke |
| 4,209,780 A | 6/1980 | Fenimore |
| 4,253,193 A | 2/1981 | Kennard et al. |
| 4,331,225 A | 5/1982 | Bolger |
| 4,360,797 A | 11/1982 | Fenimore et al. |
| 4,389,670 A | 6/1983 | Davidson et al. |
| 4,417,791 A | 11/1983 | Erland et al. |
| 4,564,935 A | 1/1986 | Kaplan |
| 4,688,246 A | 8/1987 | Eilers et al. |
| 4,771,289 A | 9/1988 | Masak |
| 4,855,061 A | 8/1989 | Martin |
| 4,943,811 A | 7/1990 | Alden et al. |
| 4,955,562 A | 9/1990 | Martin et al. |
| 5,045,862 A | 9/1991 | Alden et al. |
| 5,076,687 A | 12/1991 | Adelson |
| 5,088,091 A | 2/1992 | Schroeder |
| 5,095,500 A | 3/1992 | Tayloe et al. |
| 5,097,485 A | 3/1992 | O'Connor et al. |
| 5,227,985 A | 7/1993 | Dementhon |
| 5,235,416 A | 8/1993 | Stanhope |
| 5,304,809 A | 4/1994 | Wickersheim |
| 5,305,124 A | 4/1994 | Chern et al. |
| 5,315,309 A | 5/1994 | Rudow et al. |
| 5,321,414 A | 6/1994 | Alden et al. |
| 5,400,037 A | 3/1995 | East |
| 5,420,622 A | 5/1995 | Faroudja |
| 5,424,533 A | 6/1995 | Schmutz |
| 5,440,428 A | 8/1995 | Hegg et al. |
| 5,467,104 A | 11/1995 | Furness, III et al. |
| 5,472,467 A | 12/1995 | Pfeffer et al. |
| 5,479,026 A | 12/1995 | Schumtz |
| 5,480,341 A | 1/1996 | Plakos |
| 5,483,667 A | 1/1996 | Faruque |
| 5,503,350 A | 4/1996 | Foote |
| 5,519,826 A | 5/1996 | Harper et al. |
| 5,563,614 A | 10/1996 | Alden et al. |
| 5,569,317 A | 10/1996 | Sarada et al. |
| 5,573,090 A | 11/1996 | Ross |
| 5,575,719 A | 11/1996 | Gobush et al. |
| 5,596,339 A | 1/1997 | Furness, III et al. |
| 5,600,326 A | 2/1997 | Yu et al. |
| 5,644,207 A | 7/1997 | Lew et al. |
| 5,653,751 A | 8/1997 | Samiy et al. |
| 5,659,327 A | 8/1997 | Furness, III et al. |
| 5,689,577 A | 11/1997 | Arata |
| 5,699,798 A | 12/1997 | Hochman et al. |
| 5,701,132 A | 12/1997 | Kollin et al. |
| 5,712,649 A | 1/1998 | Tosaki |
| 5,742,229 A | 4/1998 | Smith |
| 5,742,253 A | 4/1998 | Conroy et al. |
| 5,756,026 A | 5/1998 | Sanchez et al. |
| 5,757,005 A | 5/1998 | Callas et al. |
| 5,809,422 A | 9/1998 | Raleigh |
| 5,821,989 A | 10/1998 | Lazzaro et al. |
| 5,838,671 A | 11/1998 | Ishikawa |
| 5,852,672 A | 12/1998 | Lu |
| 5,864,384 A | 1/1999 | McClure et al. |
| 5,872,814 A | 2/1999 | McMeekin et al. |
| 5,878,283 A | 3/1999 | House et al. |
| 5,883,606 A | 3/1999 | Smoot |
| 5,903,397 A | 5/1999 | Melville et al. |
| 5,910,834 A | 6/1999 | McClure et al. |
| 5,930,379 A | 7/1999 | Rehg et al. |
| 5,940,166 A | 8/1999 | Miller |
| 5,950,124 A | 9/1999 | Trompower et al. |
| 5,966,129 A | 10/1999 | Matsukuma et al. |
| 5,969,822 A | 10/1999 | Fright et al. |
| 5,982,139 A | 11/1999 | Parise |
| 5,983,104 A | 11/1999 | Wickman et al. |
| 6,005,856 A | 12/1999 | Jensen et al. |
| 6,020,892 A | 2/2000 | Dillon |
| 6,041,365 A | 3/2000 | Kleinerman |
| 6,043,799 A | 3/2000 | Tidwell |
| 6,052,582 A | 4/2000 | Blasing et al. |
| 6,061,021 A | 5/2000 | Zibell |
| 6,061,023 A | 5/2000 | Daniel et al. |
| 6,067,290 A | 5/2000 | Paulraj et al. |
| 6,072,496 A | 6/2000 | Guenter et al. |
| 6,097,353 A | 8/2000 | Melville et al. |
| 6,114,834 A | 9/2000 | Parise |
| 6,141,104 A | 10/2000 | Schulz et al. |
| 6,148,280 A | 11/2000 | Kramer |
| 6,151,118 A | 11/2000 | Norita et al. |
| 6,154,321 A | 11/2000 | Melville et al. |
| 6,205,195 B1 | 3/2001 | Lanza |
| 6,229,503 B1 | 5/2001 | Mays, Jr. et al. |
| 6,241,622 B1 | 6/2001 | Gobush et al. |
| 6,243,198 B1 | 6/2001 | Sedlmayr |
| 6,252,912 B1 | 6/2001 | Salinger |
| 6,271,900 B1 | 8/2001 | Li |
| 6,308,080 B1 | 10/2001 | Burt et al. |
| 6,364,253 B1 | 4/2002 | Cavanagh |
| 6,400,761 B1 | 6/2002 | Smee et al. |
| 6,411,612 B1 | 6/2002 | Halford et al. |
| 6,421,600 B1 | 7/2002 | Ross |
| 6,442,151 B1 | 8/2002 | H'mimy et al. |
| 6,445,910 B1 | 9/2002 | Oestreich |
| 6,454,414 B1 | 9/2002 | Ting |
| 6,459,900 B1 | 10/2002 | Scheinert |
| 6,473,467 B1 | 10/2002 | Wallace et al. |
| 6,473,717 B1 | 10/2002 | Claussen et al. |
| 6,484,030 B1 | 11/2002 | Antoine et al. |
| 6,487,516 B1 | 11/2002 | Amorai-Moriya |
| 6,509,970 B1 | 1/2003 | Seki et al. |
| 6,513,921 B1 | 2/2003 | Houle |

(56) References Cited

U.S. PATENT DOCUMENTS

| | | |
|---|---|---|
| 6,533,674 B1 | 3/2003 | Gobush |
| 6,554,706 B2 | 4/2003 | Kim et al. |
| 6,592,465 B2 | 7/2003 | Lutz et al. |
| 6,633,294 B1 | 10/2003 | Rosenthal et al. |
| 6,643,386 B1 | 11/2003 | Foster |
| 6,685,326 B2 | 2/2004 | Debevec et al. |
| 6,710,797 B1 | 3/2004 | McNelley et al. |
| 6,718,180 B1 | 4/2004 | Lundh |
| 6,737,652 B2 | 5/2004 | Lanza et al. |
| 6,758,759 B2 | 7/2004 | Gobush et al. |
| 6,760,388 B2 | 7/2004 | Ketchum et al. |
| 6,763,225 B1 | 7/2004 | Farmine et al. |
| 6,771,706 B2 | 8/2004 | Ling et al. |
| 6,785,341 B2 | 8/2004 | Walton et al. |
| 6,791,508 B2 | 9/2004 | Berry et al. |
| 6,792,259 B1 | 9/2004 | Parise |
| 6,801,580 B2 | 10/2004 | Kadous |
| 6,804,311 B1 | 10/2004 | Dabak et al. |
| 6,834,043 B1 | 12/2004 | Vook et al. |
| 6,836,673 B1 | 12/2004 | Trott |
| 6,850,872 B1 | 2/2005 | Marschner et al. |
| 6,862,271 B2 | 3/2005 | Medvedev et al. |
| 6,888,809 B1 | 5/2005 | Foschini |
| 6,919,847 B2 | 7/2005 | Caplan et al. |
| 6,919,857 B2 | 7/2005 | Shamblin et al. |
| 6,920,192 B1 | 7/2005 | Laroia et al. |
| 6,943,949 B2 | 9/2005 | Sedlmayr |
| 6,978,150 B2 | 12/2005 | Hamabe |
| 6,982,653 B2 | 1/2006 | Voeller et al. |
| 7,006,043 B1 | 2/2006 | Nalbandian |
| 7,009,652 B1 | 3/2006 | Tanida et al. |
| 7,013,144 B2 | 3/2006 | Yamashita et al. |
| 7,044,613 B2 | 5/2006 | Debevec |
| 7,068,277 B2 | 6/2006 | Menache |
| 7,068,704 B1 | 6/2006 | Orr |
| 7,068,991 B2 | 6/2006 | Parise |
| 7,072,413 B2 | 7/2006 | Walton et al. |
| 7,072,693 B2 | 7/2006 | Farlow et al. |
| 7,075,254 B2 | 7/2006 | Chitta et al. |
| 7,075,438 B2 | 7/2006 | Kent et al. |
| 7,081,997 B2 | 7/2006 | Sedlmayr |
| 7,086,954 B2 | 8/2006 | Gobush et al. |
| 7,089,319 B2 | 8/2006 | Lysenko et al. |
| 7,116,723 B2 | 10/2006 | Kim et al. |
| 7,120,440 B2 | 10/2006 | Cho et al. |
| 7,127,081 B1 | 10/2006 | Erdem |
| 7,139,527 B2 | 11/2006 | Tamaki et al. |
| 7,142,154 B2 | 11/2006 | Quilter et al. |
| 7,152,984 B1 | 12/2006 | Hayes |
| 7,154,671 B2 | 12/2006 | Sedlmayr |
| 7,154,936 B2 | 12/2006 | Bjerke et al. |
| 7,154,960 B2 | 12/2006 | Liu et al. |
| 7,167,684 B2 | 1/2007 | Kadous et al. |
| 7,184,047 B1 | 2/2007 | Crampton |
| 7,193,991 B2 | 3/2007 | Melpignano et al. |
| 7,197,082 B2 | 3/2007 | Alexiou et al. |
| 7,197,084 B2 | 3/2007 | Ketchum et al. |
| 7,218,320 B2 | 5/2007 | Gordon et al. |
| 7,242,724 B2 | 7/2007 | Alexiou et al. |
| 7,248,879 B1 | 7/2007 | Walton et al. |
| 7,257,237 B1 | 8/2007 | Luck et al. |
| 7,272,294 B2 | 9/2007 | Zhou et al. |
| 7,310,680 B1 | 12/2007 | Graham et al. |
| 7,324,110 B2 | 1/2008 | Edwards et al. |
| 7,327,362 B2 | 2/2008 | Grau |
| 7,333,113 B2 | 2/2008 | Gordon |
| 7,333,540 B2 | 2/2008 | Yee |
| 7,356,164 B2 | 4/2008 | Aliaga et al. |
| 7,358,972 B2 | 4/2008 | Echegaray et al. |
| 7,369,681 B2 | 5/2008 | Foth et al. |
| 7,369,876 B2 | 5/2008 | Lee et al. |
| 7,373,133 B2 | 5/2008 | Mickle et al. |
| 7,412,212 B2 | 8/2008 | Hottinen |
| 7,418,053 B2 | 8/2008 | Perlman et al. |
| 7,426,422 B2 | 9/2008 | Carman et al. |
| 7,436,403 B2 | 10/2008 | Debevec |
| 7,437,177 B2 | 10/2008 | Ozluturk et al. |
| 7,486,931 B2 | 2/2009 | Cho et al. |
| 7,502,420 B2 | 3/2009 | Ketchum |
| 7,548,272 B2 | 6/2009 | Perlman et al. |
| 7,548,752 B2 | 6/2009 | Sampath et al. |
| 7,554,549 B2 | 6/2009 | Sagar et al. |
| 7,558,575 B2 | 7/2009 | Losh et al. |
| 7,587,520 B1 | 9/2009 | Kent et al. |
| 7,599,420 B2 | 10/2009 | Forenza et al. |
| 7,630,337 B2 | 12/2009 | Zheng et al. |
| 7,633,944 B1 | 12/2009 | Chang et al. |
| 7,633,994 B2 | 12/2009 | Forenza et al. |
| 7,636,381 B2 | 12/2009 | Forenza et al. |
| 7,671,321 B2 | 3/2010 | Perlman et al. |
| 7,688,789 B2 | 3/2010 | Pan et al. |
| 7,720,259 B2 | 5/2010 | Gordon et al. |
| 7,729,433 B2 | 6/2010 | Jalloul et al. |
| 7,729,443 B2 | 6/2010 | Fukuoka et al. |
| 7,751,368 B2 | 7/2010 | Li et al. |
| 7,751,843 B2 | 7/2010 | Butala |
| 7,756,222 B2 | 7/2010 | Chen et al. |
| 7,767,950 B2 | 8/2010 | Perlman et al. |
| 7,792,423 B2 | 9/2010 | Raskar et al. |
| 7,923,677 B2 | 4/2011 | Slinger |
| 7,986,742 B2 | 7/2011 | Ketchum et al. |
| 8,013,285 B2 | 9/2011 | Perlman et al. |
| 8,041,362 B2 | 10/2011 | Li et al. |
| 8,054,312 B2 | 11/2011 | Gordon |
| 8,081,944 B2 | 12/2011 | Li |
| 8,126,510 B1 | 2/2012 | Samson et al. |
| 8,144,153 B1 | 3/2012 | Sullivan et al. |
| 8,243,353 B1 | 8/2012 | Gutin et al. |
| 8,288,704 B2 | 10/2012 | Perlman et al. |
| 8,320,432 B1 | 11/2012 | Chockalingam et al. |
| 8,428,177 B2 | 4/2013 | Tsai |
| 8,451,764 B2 | 5/2013 | Chao et al. |
| 8,482,462 B2 | 7/2013 | Komijani et al. |
| 8,638,880 B2 | 1/2014 | Baldemair et al. |
| 8,654,815 B1 | 2/2014 | Forenza |
| 8,675,768 B2 | 3/2014 | Xu et al. |
| 8,705,484 B2 | 4/2014 | Caire et al. |
| 8,731,480 B2 | 5/2014 | Kim et al. |
| 8,797,970 B2 | 8/2014 | Xing |
| 8,849,339 B2 | 9/2014 | Anto |
| 8,902,862 B2 | 12/2014 | Yu et al. |
| 8,971,380 B2 | 3/2015 | Forenza |
| 9,177,387 B2 | 11/2015 | Marks |
| 9,252,858 B2 | 2/2016 | Abbasfar et al. |
| 9,331,882 B2 | 5/2016 | Fehri et al. |
| 2001/0031647 A1 | 10/2001 | Scherzer |
| 2002/0027985 A1 | 3/2002 | Rashid-Farrokhi |
| 2002/0051433 A1 | 5/2002 | Affes et al. |
| 2002/0060649 A1 | 5/2002 | Perlman |
| 2002/0114526 A1 | 8/2002 | Dennis |
| 2002/0130867 A1 | 9/2002 | Yang et al. |
| 2002/0132933 A1 | 9/2002 | Dingemans et al. |
| 2002/0138581 A1 | 9/2002 | MacIntosh et al. |
| 2002/0142723 A1 | 10/2002 | Foschini |
| 2002/0168017 A1 | 11/2002 | Berthet |
| 2002/0181444 A1 | 12/2002 | Acampora |
| 2002/0193146 A1 | 12/2002 | Wallace |
| 2003/0003863 A1 | 1/2003 | Thielecke et al. |
| 2003/0012315 A1 | 1/2003 | Fan |
| 2003/0027655 A1 | 2/2003 | Lutz et al. |
| 2003/0036359 A1 | 2/2003 | Dent et al. |
| 2003/0043929 A1 | 3/2003 | Sampath |
| 2003/0048753 A1 | 3/2003 | Jalali |
| 2003/0095186 A1 | 5/2003 | Aman et al. |
| 2003/0114165 A1 | 6/2003 | Mills |
| 2003/0125026 A1* | 7/2003 | Tsunehara et al. ........... 455/435 |
| 2003/0125040 A1 | 7/2003 | Walton et al. |
| 2003/0138206 A1 | 7/2003 | Sheng et al. |
| 2003/0139196 A1 | 7/2003 | Medvedev et al. |
| 2003/0147362 A1 | 8/2003 | Dick et al. |
| 2003/0148738 A1 | 8/2003 | Das et al. |
| 2003/0149726 A1 | 8/2003 | Spear |
| 2003/0156056 A1 | 8/2003 | Perry |
| 2003/0161282 A1 | 8/2003 | Medvedev et al. |

(56) References Cited

U.S. PATENT DOCUMENTS

| | | |
|---|---|---|
| 2003/0193599 A1 | 10/2003 | Campbell et al. |
| 2003/0200227 A1 | 10/2003 | Ressler |
| 2003/0211843 A1 | 11/2003 | Song |
| 2003/0214431 A1 | 11/2003 | Hager et al. |
| 2003/0220112 A1 | 11/2003 | Bugeja |
| 2003/0222820 A1 | 12/2003 | Karr et al. |
| 2003/0223391 A1 | 12/2003 | Malaender et al. |
| 2003/0235146 A1 | 12/2003 | Wu et al. |
| 2004/0002835 A1 | 1/2004 | Nelson |
| 2004/0008650 A1 | 1/2004 | Le et al. |
| 2004/0009755 A1 | 1/2004 | Yoshida |
| 2004/0017313 A1 | 1/2004 | Menache |
| 2004/0042556 A1 | 3/2004 | Medvedev et al. |
| 2004/0043784 A1 | 3/2004 | Czaja et al. |
| 2004/0045031 A1 | 3/2004 | Gautier |
| 2004/0072091 A1 | 4/2004 | Mochizuki et al. |
| 2004/0097197 A1 | 5/2004 | Juncker et al. |
| 2004/0104935 A1 | 6/2004 | Williamson et al. |
| 2004/0119716 A1 | 6/2004 | Park et al. |
| 2004/0136349 A1 | 7/2004 | Walton |
| 2004/0152480 A1 | 8/2004 | Willars et al. |
| 2004/0153512 A1 | 8/2004 | Friend |
| 2004/0155962 A1 | 8/2004 | Marks |
| 2004/0170430 A1 | 9/2004 | Gorokhov |
| 2004/0176097 A1 | 9/2004 | Wilson et al. |
| 2004/0179627 A1 | 9/2004 | Ketchum et al. |
| 2004/0185909 A1 | 9/2004 | Alexiou et al. |
| 2004/0190636 A1 | 9/2004 | Oprea |
| 2004/0203347 A1 | 10/2004 | Nguyen |
| 2004/0203987 A1 | 10/2004 | Butala |
| 2004/0205173 A1 | 10/2004 | Hall |
| 2004/0209579 A1 | 10/2004 | Vaidyanathan |
| 2004/0252632 A1 | 12/2004 | Bourdoux |
| 2005/0003865 A1 | 1/2005 | Lastinger et al. |
| 2005/0020237 A1 | 1/2005 | Alexiou |
| 2005/0030625 A1 | 2/2005 | Cattin-Liebl |
| 2005/0031047 A1 | 2/2005 | Maltsev et al. |
| 2005/0040085 A1 | 2/2005 | Carman et al. |
| 2005/0041750 A1 | 2/2005 | Lau |
| 2005/0041751 A1 | 2/2005 | Nir et al. |
| 2005/0043031 A1 | 2/2005 | Cho et al. |
| 2005/0047515 A1 | 3/2005 | Walton et al. |
| 2005/0058217 A1 | 3/2005 | Sandhu et al. |
| 2005/0075110 A1 | 4/2005 | Posti et al. |
| 2005/0096058 A1 | 5/2005 | Warner et al. |
| 2005/0101259 A1 | 5/2005 | Tong et al. |
| 2005/0104543 A1 | 5/2005 | Kazanov et al. |
| 2005/0105772 A1 | 5/2005 | Voronka et al. |
| 2005/0111406 A1 | 5/2005 | Pasanen et al. |
| 2005/0111599 A1 | 5/2005 | Walton |
| 2005/0114073 A1 | 5/2005 | Gobush |
| 2005/0119868 A1 | 6/2005 | Scheidemann et al. |
| 2005/0143183 A1 | 6/2005 | Shirai et al. |
| 2005/0157683 A1 | 7/2005 | Ylitalo |
| 2005/0161118 A1 | 7/2005 | Carman et al. |
| 2005/0168578 A1 | 8/2005 | Gobush |
| 2005/0169396 A1 | 8/2005 | Baier et al. |
| 2005/0174771 A1 | 8/2005 | Conner |
| 2005/0174977 A1 | 8/2005 | Pedlar et al. |
| 2005/0215336 A1 | 9/2005 | Ueda et al. |
| 2005/0215337 A1 | 9/2005 | Shirai et al. |
| 2005/0230597 A1 | 10/2005 | Hsieh et al. |
| 2005/0232135 A1 | 10/2005 | Mukai et al. |
| 2005/0239406 A1 | 10/2005 | Shattil |
| 2005/0259627 A1 | 11/2005 | Song |
| 2005/0271009 A1 | 12/2005 | Shirakabe et al. |
| 2005/0287962 A1 | 12/2005 | Mehta |
| 2006/0023803 A1 | 2/2006 | Perlman |
| 2006/0046658 A1* | 3/2006 | Cruz .................. H04W 28/22 455/67.11 |
| 2006/0050804 A1 | 3/2006 | Leclair |
| 2006/0055706 A1 | 3/2006 | Perlman et al. |
| 2006/0061680 A1 | 3/2006 | Madhavan et al. |
| 2006/0077258 A1 | 4/2006 | Allen et al. |
| 2006/0098568 A1 | 5/2006 | Oh et al. |
| 2006/0098754 A1 | 5/2006 | Kim et al. |
| 2006/0127836 A1 | 6/2006 | Wen |
| 2006/0146755 A1* | 7/2006 | Pan et al. .................. 370/334 |
| 2006/0159160 A1 | 7/2006 | Kim et al. |
| 2006/0165120 A1 | 7/2006 | Karabinis |
| 2006/0184209 A1 | 8/2006 | John et al. |
| 2006/0192785 A1 | 8/2006 | Marschner et al. |
| 2006/0198461 A1 | 9/2006 | Hayase |
| 2006/0199620 A1 | 9/2006 | Greene et al. |
| 2006/0203096 A1 | 9/2006 | LaSalle et al. |
| 2006/0203708 A1 | 9/2006 | Sampath |
| 2006/0209979 A1 | 9/2006 | Sandell |
| 2006/0266564 A1 | 11/2006 | Perlman |
| 2006/0270359 A1 | 11/2006 | Karmi |
| 2006/0281421 A1 | 12/2006 | Pan et al. |
| 2006/0287743 A1 | 12/2006 | Sampath et al. |
| 2006/0292990 A1 | 12/2006 | Karabinis et al. |
| 2007/0004337 A1 | 1/2007 | Biswas et al. |
| 2007/0024946 A1 | 2/2007 | Panasyuk et al. |
| 2007/0025464 A1 | 2/2007 | Perlman |
| 2007/0054633 A1 | 3/2007 | Piirainen |
| 2007/0058590 A1 | 3/2007 | Wang et al. |
| 2007/0058839 A1 | 3/2007 | Echegaray et al. |
| 2007/0060410 A1 | 3/2007 | Gobush |
| 2007/0064823 A1 | 3/2007 | Hwang et al. |
| 2007/0082674 A1 | 4/2007 | Pedersen |
| 2007/0091085 A1 | 4/2007 | Wang et al. |
| 2007/0091178 A1 | 4/2007 | Cotter |
| 2007/0093273 A1 | 4/2007 | Cai |
| 2007/0093274 A1 | 4/2007 | Jafarkhani et al. |
| 2007/0099665 A1* | 5/2007 | Kim et al. .................. 455/561 |
| 2007/0135125 A1* | 6/2007 | Kim et al. .................. 455/436 |
| 2007/0183362 A1 | 8/2007 | Mondal et al. |
| 2007/0200930 A1 | 8/2007 | Gordon |
| 2007/0206504 A1 | 9/2007 | Koo et al. |
| 2007/0206832 A1 | 9/2007 | Gordon et al. |
| 2007/0211747 A1 | 9/2007 | Kim |
| 2007/0242782 A1* | 10/2007 | Han et al. .................. 375/343 |
| 2007/0249580 A1 | 10/2007 | Stewart et al. |
| 2007/0254602 A1 | 11/2007 | Li et al. |
| 2007/0258531 A1 | 11/2007 | Chen et al. |
| 2007/0263736 A1 | 11/2007 | Yuda et al. |
| 2007/0273951 A1 | 11/2007 | Ribi |
| 2007/0279494 A1 | 12/2007 | Aman et al. |
| 2007/0280116 A1 | 12/2007 | Wang et al. |
| 2007/0285559 A1 | 12/2007 | Perlman et al. |
| 2008/0013644 A1 | 1/2008 | Hugl et al. |
| 2008/0051150 A1 | 2/2008 | Tsutsui |
| 2008/0080631 A1 | 4/2008 | Forenza et al. |
| 2008/0080635 A1 | 4/2008 | Hugl et al. |
| 2008/0089396 A1 | 4/2008 | Zhang et al. |
| 2008/0100622 A1 | 5/2008 | Gordon |
| 2008/0102881 A1* | 5/2008 | Han et al. .................. 455/522 |
| 2008/0107135 A1* | 5/2008 | Ibrahim .................. 370/500 |
| 2008/0117961 A1* | 5/2008 | Han et al. .................. 375/227 |
| 2008/0118004 A1 | 5/2008 | Forenza |
| 2008/0125051 A1 | 5/2008 | Kim et al. |
| 2008/0130790 A1 | 6/2008 | Forenza |
| 2008/0132281 A1 | 6/2008 | Kim et al. |
| 2008/0181285 A1 | 7/2008 | Hwang et al. |
| 2008/0192683 A1 | 8/2008 | Han et al. |
| 2008/0192697 A1 | 8/2008 | Shaheen |
| 2008/0205538 A1* | 8/2008 | Han et al. .................. 375/267 |
| 2008/0214185 A1 | 9/2008 | Cho et al. |
| 2008/0227422 A1 | 9/2008 | Hwang et al. |
| 2008/0232394 A1 | 9/2008 | Kozek et al. |
| 2008/0233902 A1 | 9/2008 | Pan et al. |
| 2008/0239938 A1* | 10/2008 | Jalloul et al. .................. 370/201 |
| 2008/0260054 A1 | 10/2008 | Myung et al. |
| 2008/0261587 A1 | 10/2008 | Lennartson et al. |
| 2008/0268833 A1 | 10/2008 | Huang et al. |
| 2008/0292011 A1 | 11/2008 | Yang |
| 2008/0317014 A1 | 12/2008 | Veselinovic et al. |
| 2009/0016463 A1 | 1/2009 | Roh |
| 2009/0028451 A1 | 1/2009 | Slinger et al. |
| 2009/0034636 A1 | 2/2009 | Kotecha et al. |
| 2009/0041151 A1 | 2/2009 | Khan et al. |
| 2009/0046678 A1 | 2/2009 | Lee et al. |
| 2009/0046800 A1 | 2/2009 | Xu et al. |

(56) References Cited

U.S. PATENT DOCUMENTS

| | | | |
|---|---|---|---|
| 2009/0060013 A1 | 3/2009 | Ashikhmin et al. | |
| 2009/0067198 A1 | 3/2009 | Graham et al. | |
| 2009/0067402 A1 | 3/2009 | Forenza et al. | |
| 2009/0075686 A1 | 3/2009 | Gomadam et al. | |
| 2009/0086648 A1 | 4/2009 | Xu et al. | |
| 2009/0086855 A1 | 4/2009 | Jin | |
| 2009/0090868 A1 | 4/2009 | Payne et al. | |
| 2009/0135944 A1* | 5/2009 | Dyer et al. | 375/267 |
| 2009/0151987 A1 | 6/2009 | Yang et al. | |
| 2009/0168914 A1 | 7/2009 | Chance et al. | |
| 2009/0195355 A1 | 8/2009 | Mitchell | |
| 2009/0202016 A1 | 8/2009 | Seong et al. | |
| 2009/0207822 A1 | 8/2009 | Kim et al. | |
| 2009/0209206 A1 | 8/2009 | Zou et al. | |
| 2009/0227249 A1 | 9/2009 | Ylitalo | |
| 2009/0227292 A1 | 9/2009 | Laroia et al. | |
| 2009/0262695 A1 | 10/2009 | Chen et al. | |
| 2009/0268675 A1 | 10/2009 | Choi | |
| 2009/0274196 A1 | 11/2009 | Black et al. | |
| 2009/0283466 A1 | 11/2009 | Martin et al. | |
| 2009/0285156 A1 | 11/2009 | Huang et al. | |
| 2009/0296650 A1 | 12/2009 | Venturino et al. | |
| 2009/0316014 A1 | 12/2009 | Lim et al. | |
| 2009/0316807 A1 | 12/2009 | Kim et al. | |
| 2009/0318183 A1 | 12/2009 | Hugl et al. | |
| 2010/0002934 A1 | 1/2010 | Sullivan et al. | |
| 2010/0008331 A1 | 1/2010 | Li et al. | |
| 2010/0034151 A1* | 2/2010 | Alexiou et al. | 370/329 |
| 2010/0068999 A1 | 3/2010 | Bangs et al. | |
| 2010/0098030 A1 | 4/2010 | Wang et al. | |
| 2010/0099428 A1 | 4/2010 | Bhushan et al. | |
| 2010/0119001 A1 | 5/2010 | Walton et al. | |
| 2010/0150013 A1 | 6/2010 | Hara et al. | |
| 2010/0157861 A1 | 6/2010 | Na | |
| 2010/0164802 A1 | 7/2010 | Li | |
| 2010/0172309 A1 | 7/2010 | Forenza | |
| 2010/0178934 A1 | 7/2010 | Moeglein et al. | |
| 2010/0195527 A1 | 8/2010 | Gorokhov et al. | |
| 2010/0220679 A1 | 9/2010 | Abraham et al. | |
| 2010/0224725 A1 | 9/2010 | Perlman et al. | |
| 2010/0227562 A1 | 9/2010 | Shim et al. | |
| 2010/0234071 A1 | 9/2010 | Shabtay et al. | |
| 2010/0238984 A1 | 9/2010 | Sayana et al. | |
| 2010/0260060 A1 | 10/2010 | Abraham et al. | |
| 2010/0260103 A1 | 10/2010 | Guey et al. | |
| 2010/0260115 A1 | 10/2010 | Frederiksen et al. | |
| 2010/0265842 A1 | 10/2010 | Khandekar et al. | |
| 2010/0279625 A1 | 11/2010 | Ko et al. | |
| 2010/0290369 A1 | 11/2010 | Hui et al. | |
| 2010/0290382 A1 | 11/2010 | Hui et al. | |
| 2010/0315966 A1 | 12/2010 | Weigand | |
| 2010/0316154 A1 | 12/2010 | Park et al. | |
| 2010/0316163 A1 | 12/2010 | Forenza | |
| 2011/0002371 A1 | 1/2011 | Forenza | |
| 2011/0002410 A1 | 1/2011 | Forenza | |
| 2011/0002411 A1 | 1/2011 | Forenza | |
| 2011/0003607 A1 | 1/2011 | Forenza | |
| 2011/0003608 A1 | 1/2011 | Forenza | |
| 2011/0007856 A1 | 1/2011 | Jang et al. | |
| 2011/0019715 A1 | 1/2011 | Brisebois | |
| 2011/0038436 A1 | 2/2011 | Kim et al. | |
| 2011/0044193 A1 | 2/2011 | Forenza | |
| 2011/0051832 A1 | 3/2011 | Mergen et al. | |
| 2011/0069638 A1 | 3/2011 | Ishizu et al. | |
| 2011/0086611 A1 | 4/2011 | Klein et al. | |
| 2011/0090840 A1 | 4/2011 | Lee et al. | |
| 2011/0090885 A1 | 4/2011 | Safavi | |
| 2011/0104174 A1 | 5/2011 | Strakhova et al. | |
| 2011/0111781 A1 | 5/2011 | Chen et al. | |
| 2011/0135308 A1 | 6/2011 | Tarlazzi et al. | |
| 2011/0142020 A1 | 6/2011 | Kang et al. | |
| 2011/0142104 A1 | 6/2011 | Coldrey et al. | |
| 2011/0164597 A1 | 7/2011 | Amini et al. | |
| 2011/0164697 A1 | 7/2011 | Liao et al. | |
| 2011/0195670 A1 | 8/2011 | Dakshinamurthy et al. | |
| 2011/0199946 A1 | 8/2011 | Breit et al. | |
| 2011/0205963 A1 | 8/2011 | Tang et al. | |
| 2011/0207416 A1 | 8/2011 | Doi | |
| 2011/0211485 A1 | 9/2011 | Xu et al. | |
| 2011/0216662 A1 | 9/2011 | Nie et al. | |
| 2011/0228895 A1 | 9/2011 | Ridley et al. | |
| 2011/0261769 A1 | 10/2011 | Ji et al. | |
| 2011/0305195 A1 | 12/2011 | Forck et al. | |
| 2011/0306381 A1 | 12/2011 | Jia et al. | |
| 2011/0310987 A1 | 12/2011 | Lee et al. | |
| 2011/0310994 A1 | 12/2011 | Ko et al. | |
| 2011/0315855 A1 | 12/2011 | Perlman et al. | |
| 2012/0002743 A1 | 1/2012 | Cavalcante et al. | |
| 2012/0014415 A1 | 1/2012 | Su et al. | |
| 2012/0014477 A1 | 1/2012 | Ko et al. | |
| 2012/0046039 A1 | 2/2012 | Hagerman et al. | |
| 2012/0051257 A1 | 3/2012 | Kim et al. | |
| 2012/0076028 A1 | 3/2012 | Ko et al. | |
| 2012/0076042 A1 | 3/2012 | Chun et al. | |
| 2012/0076236 A1 | 3/2012 | Ko et al. | |
| 2012/0087261 A1* | 4/2012 | Yoo et al. | 370/252 |
| 2012/0087430 A1 | 4/2012 | Forenza et al. | |
| 2012/0093078 A1 | 4/2012 | Perlman et al. | |
| 2012/0108278 A1 | 5/2012 | Kim et al. | |
| 2012/0151305 A1 | 6/2012 | Zhang et al. | |
| 2012/0188988 A1 | 7/2012 | Chung et al. | |
| 2012/0218968 A1 | 8/2012 | Kim et al. | |
| 2012/0224528 A1 | 9/2012 | Tapia et al. | |
| 2012/0230691 A1 | 9/2012 | Hui et al. | |
| 2012/0236741 A1 | 9/2012 | Xu | |
| 2012/0236840 A1 | 9/2012 | Kim et al. | |
| 2012/0252470 A1 | 10/2012 | Wong et al. | |
| 2012/0258657 A1 | 10/2012 | Scheinert | |
| 2012/0281555 A1 | 11/2012 | Gao et al. | |
| 2012/0288022 A1 | 11/2012 | Guey et al. | |
| 2012/0300717 A1 | 11/2012 | Cepeda Lopez | |
| 2012/0314570 A1 | 12/2012 | Forenza | |
| 2012/0314649 A1 | 12/2012 | Forenza | |
| 2013/0010840 A1 | 1/2013 | Maddah-Ali et al. | |
| 2013/0033998 A1 | 2/2013 | Seo et al. | |
| 2013/0038766 A1 | 2/2013 | Perlman et al. | |
| 2013/0039168 A1 | 2/2013 | Forenza et al. | |
| 2013/0039332 A1 | 2/2013 | Nazar et al. | |
| 2013/0039387 A1 | 2/2013 | Qu | |
| 2013/0077514 A1 | 3/2013 | Dinan | |
| 2013/0077569 A1 | 3/2013 | Nam et al. | |
| 2013/0089009 A1 | 4/2013 | Li et al. | |
| 2013/0094548 A1 | 4/2013 | Park | |
| 2013/0114437 A1 | 5/2013 | Yoo et al. | |
| 2013/0115986 A1 | 5/2013 | Mueck et al. | |
| 2013/0128821 A1 | 5/2013 | Hooli et al. | |
| 2013/0188567 A1 | 7/2013 | Wang | |
| 2013/0195047 A1 | 8/2013 | Koivisto et al. | |
| 2013/0195086 A1 | 8/2013 | Xu | |
| 2013/0195467 A1 | 8/2013 | Schmid | |
| 2013/0208604 A1 | 8/2013 | Lee et al. | |
| 2013/0242890 A1 | 9/2013 | He et al. | |
| 2013/0242956 A1 | 9/2013 | Hall | |
| 2013/0315211 A1 | 11/2013 | Balan | |
| 2014/0038619 A1 | 2/2014 | Moulsley | |
| 2014/0064206 A1 | 3/2014 | Bao et al. | |
| 2014/0086296 A1 | 3/2014 | Badic et al. | |
| 2014/0087680 A1 | 3/2014 | Luukkala et al. | |
| 2014/0112216 A1 | 4/2014 | Seo et al. | |
| 2014/0146756 A1 | 5/2014 | Sahin et al. | |
| 2014/0198744 A1 | 7/2014 | Wang et al. | |
| 2014/0206280 A1 | 7/2014 | Nilsson et al. | |
| 2014/0219267 A1 | 8/2014 | Eyuboglu | |
| 2014/0241209 A1 | 8/2014 | Pollakowski et al. | |
| 2014/0241218 A1 | 8/2014 | Moshfeghi | |
| 2014/0241240 A1 | 8/2014 | Kloper et al. | |
| 2014/0245095 A1 | 8/2014 | Nammi et al. | |
| 2014/0295758 A1 | 10/2014 | Pedersen | |
| 2014/0348077 A1 | 11/2014 | Chen et al. | |
| 2014/0348090 A1 | 11/2014 | Nguyen et al. | |
| 2014/0348131 A1 | 11/2014 | Duan et al. | |
| 2015/0011197 A1 | 1/2015 | Tarraf et al. | |
| 2015/0016317 A1 | 1/2015 | Park et al. | |
| 2015/0270882 A1 | 9/2015 | Shattil | |

(56) References Cited

U.S. PATENT DOCUMENTS

| | | |
|---|---|---|
| 2015/0304855 A1 | 10/2015 | Perlman et al. |
| 2015/0305010 A1 | 10/2015 | Guan et al. |
| 2016/0013855 A1 | 1/2016 | Campos et al. |
| 2016/0094318 A1 | 3/2016 | Shattil et al. |
| 2016/0157146 A1 | 6/2016 | Karabinis |
| 2016/0248559 A1* | 8/2016 | Guo .................... H04J 11/0023 |

FOREIGN PATENT DOCUMENTS

| | | |
|---|---|---|
| CA | 2011298 C | 5/1999 |
| CA | 2006481 C | 9/1999 |
| CN | 1256803 A | 5/2000 |
| CN | 1516370 A | 7/2004 |
| CN | 1538636 A | 10/2004 |
| CN | 1703113 A | 11/2005 |
| CN | 1820424 A | 8/2006 |
| CN | 1734972 | 12/2006 |
| CN | 101542938 A | 4/2008 |
| CN | 101238648 A | 8/2008 |
| CN | 101405965 A | 4/2009 |
| CN | 101536320 A | 9/2009 |
| CN | 101981826 A | 2/2011 |
| CN | 102007707 A | 2/2011 |
| CN | 102185641 A | 9/2011 |
| EP | 1359683 | 11/2003 |
| EP | 1392029 A1 | 2/2004 |
| EP | 1775937 A2 | 4/2007 |
| EP | 2244390 | 10/2010 |
| JP | H05231858 A | 9/1993 |
| JP | H05333398 A | 12/1993 |
| JP | 2000503393 A | 3/2000 |
| JP | 2001-217759 | 8/2001 |
| JP | 2002374224 | 12/2001 |
| JP | 2002152995 A | 5/2002 |
| JP | 2002-281551 | 9/2002 |
| JP | 2003-018054 | 1/2003 |
| JP | 2003179948 A | 6/2003 |
| JP | 2003284128 A | 10/2003 |
| JP | 2004502376 A | 1/2004 |
| JP | 2004-104206 | 4/2004 |
| JP | 2004229425 A | 8/2004 |
| JP | 2004242380 A | 8/2004 |
| JP | 2005039822 A | 2/2005 |
| JP | 2005073313 A | 3/2005 |
| JP | 2006-081162 | 3/2006 |
| JP | 2006-245871 | 9/2006 |
| JP | 2007060106 A | 3/2007 |
| JP | 2009213052 A | 9/2009 |
| JP | 2009273167 A | 11/2009 |
| JP | 2009540692 A | 11/2009 |
| JP | 2010016674 A | 1/2010 |
| JP | 2010021999 A | 1/2010 |
| JP | 2010068496 A | 3/2010 |
| JP | 2007-116686 | 5/2010 |
| JP | 2010-193189 | 9/2010 |
| JP | 2011035912 A | 2/2011 |
| JP | 2011517393 A | 6/2011 |
| JP | 2013502117 A | 1/2013 |
| KR | 20120003781 A | 1/2012 |
| RU | 2143775 C1 | 12/1999 |
| RU | 2010110620 A | 9/2011 |
| TW | 201031243 | 8/2010 |
| TW | 201212570 A | 3/2012 |
| TW | 201220741 A | 5/2012 |
| WO | WO9923767 A1 | 5/1999 |
| WO | WO-0201732 A2 | 1/2002 |
| WO | WO-0208785 A1 | 1/2002 |
| WO | WO02054626 | 7/2002 |
| WO | WO-02093784 A1 | 11/2002 |
| WO | WO-02099995 A2 | 12/2002 |
| WO | WO-03003604 A1 | 1/2003 |
| WO | WO03071569 A2 | 8/2003 |
| WO | WO-03084092 A2 | 10/2003 |
| WO | WO-03094460 | 11/2003 |
| WO | WO03107582 | 12/2003 |
| WO | WO-03107852 | 12/2003 |
| WO | WO-2004017586 A1 | 2/2004 |
| WO | WO-2004045884 A1 | 6/2004 |
| WO | WO-2005064871 A1 | 7/2005 |
| WO | WO-2006049417 A1 | 5/2006 |
| WO | WO-2006078019 A1 | 7/2006 |
| WO | WO2006110737 A2 | 10/2006 |
| WO | WO2006113872 A1 | 10/2006 |
| WO | WO2007024913 | 3/2007 |
| WO | WO2007027825 | 3/2007 |
| WO | WO-2007/114654 | 10/2007 |
| WO | WO-2009099752 A1 | 8/2009 |
| WO | WO-2009125962 A2 | 10/2009 |
| WO | WO-2010017482 | 2/2010 |
| WO | WO-2010067419 A1 | 6/2010 |
| WO | WO-2011018121 A1 | 2/2011 |
| WO | WO2011/100492 | 8/2011 |
| WO | WO-2011099802 A2 | 8/2011 |
| WO | WO2012061325 | 9/2011 |
| WO | WO2013040089 | 9/2011 |
| WO | WO-2012044969 A1 | 4/2012 |
| WO | WO-2012058600 A2 | 5/2012 |
| WO | WO-2012127246 A1 | 9/2012 |
| WO | 2012130071 A1 | 10/2012 |
| WO | WO-2013166464 A1 | 11/2013 |

OTHER PUBLICATIONS

"Chapter 26—Electromagnetic-Wave Propagation", Reference Data for Radio Engineers, 5th Edition, Howard W. Sams & Co., Inc., (1973), 1-32 pages.

"High Frequency Active Auroroal Research Program—Homepage", http://www.haarp.alaska.edu/, printed Apr. 9, 2004, 1 page.

"IntelliCell: A Fully Adaptive Approach to Smart Antennas", ArrayComm, Incorporated, WP-ISA-031502-2.0, (2002), pp. 1-18.

"MIMO System uses SDMA for IEEE802.11n", Electronicstalk, http://www.electronicstalk.com/news/ime/ime149.html, (Jul. 14, 2004), pp. 1-3.

"VIVATO—Homepage", http://www.vivato.net/, printed Apr. 9, 2004, 1 page.

3GPP TR 25.876 V7.0.0 (Mar. 2007),, Technical Report, 3rd Generation Partnership Project; Technical Specification Group Radio Access Network; Multiple Input Multiple Output in UTRA; (Release 7), pp. 2-76.

3GPP TS 36.211 V8.7.0 (May 2009),, Technical Specification, 3rd Generation Partnership Project; Technical Specification Group Radio Access Network; Evolved Universal Terrestrial Radio Access (E-UTRA); Physical Channels and Modulation (Release 8), pp. 1-83.

3GPP, ETSI 136 212 V9.1.0 (2010-, Technical Specification, LTE; Evolved Universal Terrestrial Radio Access (E-UTRA); Multiplexing and Channel Coding (3GPP TS 36.212 Verion 9.1.0 Release 9) pp. 63.

3GPP, TS 36.212.V8.7.0 (May 2009), Technical Specification, 3rd Generation Partnership Project; Technical Specification Group Radio Access Network; Evolved Universal Terrestrial Radio Access (E-UTRA); "Multiplexing and channel Coding" (Release 8), pp. 60.

Abbasi, N, et al., "Capacity estimation of HF-MIMO systems", International Conference on Ionospheric Systems and Techniques, Apr. 2009, pp. 5.

Arraycomm, Improving Wireless Economics Through MAS Software, printed on Mar. 8, 2011, pp. 1-3, http://www.arraycomm.com/serve.php?page+proof.

Benedetto, M.D., et al., "Analysis of the effect of the I/Q baseband filter mismatch in an OFDM modem", Wireless personal communications, (2000), 175-186.

Bengtsson, M, "A Pragmatic Approach to Multi-User Spatial Multiplexing", IEEE 2002, pp. 130-134.

Besson, O., et al., "On parameter estimation of MIMO flat-fading channels with frequency offsets", Signal Processing, IEEE Transactions on [see also Acoustics, Speech, and Signal Processing, IEEE Transactions on], vol. 51, No. 3, (Mar. 2003), pp. 602-613.

(56) References Cited

OTHER PUBLICATIONS

Caire, et al., "On Achivalbe Rates in a Multi-Antenna Broadcast Downlink", IEEE Trans. Info. Th., vol. 49, pp. 1691-1706, Jul. 2003.

Catreux, Severine, et al., "Adaptive modulation and MIMO coding for broadband wireless data networks", IEEE Comm. Mag., vol. 2, (Jun. 2002), pp. 108-115.

Chen, Runhua, et al., "Multiuser Space-Time Block Coded MIMO System with Downlink Precoding", IEEE Communications Society, 2004, pp. 2689-2693.

Chen, Runhua, et al., "Transmit selection diversity for unitary precoded multiuser spatial multiplexing systems with linear receivers", accepted to IEEE Trans. on Signal Processing, (Aug. 2005), pp. 1-30.

Choi, L.U., et al., "A transmit preprocessing technique for multiuser MIMO systems using a decomposition approach", IEEE Trans. Wireless Comm., vol. 3, (Jan. 2004), pp. 20-24.

Choi, Wan, et al., "Opportunistic space division multiple access with beam selection", to appear in IEEE Trans. on Communications, (May 19, 2006), pp. 1-23.

Chu, D, et al., "Polyphase codes with good periodic correlation properties (corresp.)", IEEE Trans. Inform. Theory, vol. 18, No. 4, (Jul. 1972), pp. 531-532.

Costa, "Writing on Dirty Paper", IEEE Transactions on Information Theory, vol. IT-29, No. 3, May 1983, pp. 439-441.

Coulson, J, et al., "Maximum likelihood synchronization for OFDM using a pilot symbol: analysis", IEEE J. Select. Areas Commun., vol. 19, No. 12, (Dec. 2001), pp. 2495-2503.

Dai, X, et al., "Carrier frequency offset estimation for OFDM/SDMA systems using consecutive pilots", IEEE Proceedings-Communications, vol. 152, (Oct. 2005), pp. 624-632.

Daniel, J, "Introduction to public safety: RF Signal Distribution Using Fiber Optics", 2009, pp. 13, http://www.rfsolutions.com/fiber.pdf.

Devasirvatham, et al., "Time Delay Spread Measurements At 850 MHz and 1 7 GHz Inside a Metropolitan Office Building", Electronics Letters, Feb. 2, 1989, vol. 25, No. 3, pp. 194-196.

Devasirvatham, et al., Radio Propagation Measurements at 850MHz. 1.7GHz and 4GHz Inside Two Dissimilar Office Buildings, Electronics Letter Mar. 29, 1990 vol. 26 No. 7, pp. 445-447.

Devasirvatham, et al., "Time Delay Spread and Signal Level Measurements of 850 MHz Radio Waves in Building Environments", IEEE Transactions on Antennas and Propagation, vol. AP-34, No. 11, Nov. 1986, pp. 1300-1305.

Dietrich, Carl B., et al., "Spatial, polarization, and pattern diversity for wireless handheld terminals", Proc. IEEE Antennas and Prop. Symp., vol. 49, (Sep. 2001), pp. 1271-1281.

Ding, P, et al., "On the Sum Rate of Channel Subspace Feedback for Multi-Antenna Broadcast Channels," in Proc., IEEE Globecom, vol. 5, pp. 2699-2703, Nov. 2005.

Dohler, Mischa, et al., "A Step Towards MIMO: Virtual Antenna Arrays", European Cooperation in the Field of Scientific and Technical Research, Jan. 15-17, 2003, 9 pages.

Dong, Liang, et al., "Multiple-input multiple-output wireless communication systems using antenna pattern diversity", Proc. IEEE Glob. Telecom. Conf., vol. 1, (Nov. 2002), pp. 997-1001.

Fakhereddin, M.J., et al., "Combined effect of polarization diversity and mutual coupling on MIMO capacity", Proc. IEEE Antennas and Prop. Symp., vol. 2, (Jun. 2003), pp. 495-498.

Fella, Adlane, "Adaptive WiMAX Antennas: The promise of higher ROI", http://www.wimax.com/commentary/spotlight/spotlight8-08-2005/?searchterm=Adlane Fella, printed May 9, 2008, pp. 1-3.

Fletcher, P.N., et al., "Mutual coupling in multi-element array antennas and its influence on MIMO channel capacity", IEEE Electronics Letters, vol. 39, (Feb. 2003), pp. 342-344.

Forenza, Antonio, et al., "Adaptive MIMO transmission for exploiting the capacity of spatially correlated channels", IEEE Trans. on Veh. Tech., vol. 56, n. 2, (Mar. 2007), pp. 619-630.

Forenza, Antonio, et al., "Benefit of Pattern Diversity Via 2-element Array of Circular Patch Antennas in Indoor Clustered MIMO Channels", IEEE Trans. on Communications, vol. 54, No. 5, (May 2006), pp. 943-954.

Forenza, Antonio, et al., "Impact of antenna geometry on MIMO communication in indoor clustered channels", Proc. IEEE Antennas and Prop. Symp., vol. 2, (Jun. 2004), pp. 1700-1703.

Forenza, Antonio, et al., "Switching Between OSTBC and Spatial Multiplexing with Linear Receivers in Spatially Correlated MIMO Channels", IEEE, (2006), pp. 1-5.

Foschini, G.J., et al., "Simplified processing for high spectral efficiency wireless communication employing multi-element arrays", IEEE Jour. Select. Areas in Comm., vol. 17, No. 11, (Nov. 1999), pp. 1841-1852.

Fusco, T., et al., "Blind Frequency-offset Estimation for OFDM/OQAM Systems", IEEE Transactions on [see also Acoustics, Speech, and Signal Processing, IEEE Transactions on] vol. 55, (2007), pp. 1828-1838.

Garcia, C.R., et al., "Channel Model for Train to Train Communication Using the 400 MHz Band", in Proc. of IEEE Vehicular Technology Conference, pp. 3082-3086, May 2008.

Gesbert, David, et al., "From Theory to Practice: An Overview of MIMO Space—Time Coded Wireless Systems", IEEE Journal on Selected Areas in Communications, vol. 21, No. 3, Apr. 2003, pp. 281-302.

Gesbert, David, et al., "Outdoor MIMO Wireless Channels: Models and Performance Prediction", IEEE Transactions on Communications, vol. 50, No. 12, (Dec. 2002), pp. 1926-1934.

Gesbert, D., et al., "Multi-Cell MIMO Cooperative Networks: A New Look at Interference" IEEE Journal on Selected Areas in Communications, vol. 28, No. 9, Dec. 1, 2010, 30 pages.

Office Action from U.S. Appl. No. 12/802,975, mailed Dec. 19, 2012, 16 pages.

Notice of Allowance from counterpart U.S. Appl. No. 12/917,257 mailed Feb. 15, 2013, 18 pages.

Notice of Allowance from counterpart U.S. Appl. No. 12/637,643 mailed Jan. 17, 2013, 11 pages.

Office Action from U.S. Appl. No. 13/464,648, mailed Feb. 12, 2013, 12 pages.

Ghogho, M, et al., "Training design for multipath channel and frequency offset estimation in MIMO systems", Signal Processing, IEEE Transactions on [see also Acoustics, Speech, and Signal Processing, IEEE Transactions on], vol. 54, No. 10, (Oct. 2006), pp. 3957-3965.

Gunashekar, G, et al., "Investigations into the Feasibility of MIMO Techniques within the HF Band: Preliminary Results", Radio Science (Special Issue), 2009, (In Press) 33 pages.

Haring, L., "Residual carrier and sampling frequency synchronization in multiuser OFDM systems", VTC-Spring. IEEE 63rd Vehicular Technology Conference, vol. 4, (2006), pp. 1937-1941.

Heath, Robert W., et al., "Antenna selection for spatial multiplexing systems with linear receivers", IEEE Trans. Comm., vol. 5, (Apr. 2001), pp. 142-144.

Heath, Robert W., et al., "Switching between diversity and multiplexing in MIMO systems", IEEE Trans. Comm., vol. 53, No. 6, (Jun. 2005), pp. 962-968.

Hewlett Packard, "GPS and Precision Timing Applications", Application Note 1272, pp. 1-28, May 1996.

Jindal, N, "MIMO Broadcast Channels With Finite-Rate Feedback," IEEE Trans. on Info. Theory, vol. 52, pp. 5045-5060, Nov. 2006.

Jose, Jubin, et al., "Channel Estimation and Linear Precoding in Multiuser Multiple-Antenna TDD Systems", IEEE Transactions on Vehicular Technology. Jun. 2011 vol. 60 No. 5, pp. 2102-2116.

Jungnickel, V., et al., "Capacity of MIMO systems with closely spaced antennas", IEEE Comm. Lett., vol. 7 (Aug. 2003), pp. 361-363.

Kannan, T.P., et al., "Separation of cochannel signals under imperfect timing and carrier synchronization", IEEE Trans. Veh. Technol., vol. 50, No. 1, (Jan. 2001), pp. 79-96.

Lang, S, et al., "Design and development of a 5.25 GHz software defined wireless OFDM communication platform", IEEE Communications Magazine, vol. 42, No. 6, (Jun. 2004), pp. 6-12.

(56) References Cited

OTHER PUBLICATIONS

Lee, K, et al., "Frequency-offset estimation for MIMO and OFDM systems using orthogonal training sequences", IEEE Trans. Veh. Technol., vol. 56, No. 1, (Jan. 2007), pp. 146-156.
Liu, G., et al., "Time and frequency offset estimation for distributed multiple-input multiple-output orthogonal frequency division multiplexing systems", Institute of Engineering and Technology Communications, vol. 4, Issue 6, 2010, pp. 708-715.
Luise, M, et al., "Carrier frequency acquisition and tracking for OFDM systems", IEEE Trans. Commun., vol. 44, No. 11, (Nov. 1996), pp. 1590-1598.
Luise, M, et al., "Low-complexity blind carrier frequency recovery for OFDM signals over frequency-selective radio channels", IEEE Trans. Commun., vol. 50, No. 7, (Jul. 2002), pp. 1182-1188.
Mattheijssen, Paul, "Antenna-pattern diversity versus space diversity for use at handhelds", IEEE Trans. on Veh. Technol., vol. 53, (Jul. 2004), pp. 1035-1042.
Mazrouei-Sebdani, Mahmood, et al., "Vector Perturbation Precoding and User Scheduling for Network MIMO", IEEE WCNC 2011, pp. 203-208. ISBN 978-1-61284-254-7.
McKay, Matthew R., et al., "A throughput-based adaptive MIMO ¬BICM approach for spatially correlated channels", to appear in Proc. IEEE ICC, (Jun. 2006), pp. 1-5.
McKay, Matthew R., et al., "Multiplexing/beamforming switching for coded MIMO in spatially correlated Rayleigh channels", IEEE Transactions on Vehicular Technology, vol. 56, No. 5, (Sep. 2007) pp. 2555-2567.
Mclean, James S., et al., "A re-examination of the fundamental limits on the radiation Q of electrically small antennas", IEEE Trans. Antennas Propagat., vol. 44, n. 5 (May 1996), pp. 672-676.
Minn, et al., "A robust timing and frequency synchronization for OFDM systems", IEEE Trans. Wireless Commun., vol. 2, No. 4, (Jul. 2003), pp. 822-839.
Montgomery, B.G, et al., "Analog RF-over-fiber technology", Syntonics LLC, Jan. 2008, pp. 2-51, http://chesapeakebayaoc.org/documents/Syntonics_AOC_RF_over-Fiber_19_Jan_08.pdf.
Moose, Paul H., et al., "A technique for orthogonal frequency division multiplexing frequency offset correction", IEEE Trans. Commun., vol. 42, No. 10, (Oct. 1994), pp. 2908-2914.
Morelli, M, et al., "An improved frequency offset estimator for OFDM applications", IEEE Commun. Lett., vol. 3, No. 3, (Mar. 1999), pp. 75-77.
Morelli, M, et al., "Frequency ambiguity resolution in OFDM systems", IEEE Commun. Lett., vol. 4, No. 4, (Apr. 2000), pp. 134-136.
Morris, Matthew L., et al., "Network model for MIMO systems with coupled antennas and noisy amplifiers", IEEE Trans. Antennas Propagat., vol. 53, (Jan. 2005), pp. 545-552.
Oberli, C, et al., "Maximum likelihood tracking algorithms for MIMOOFDM," in Communications, IEEE International Conference on, vol. 4, Jun. 20-24, 2004, pp. 2468-2472.
Oda, Y, et al., "Measured Path Loss and Multipath Propagation Characteristics in UHF and Microwave Frequency Bands for Urban Mobile Communications", IEEE, VIC 2001, pp. 337-341.
Pohl, V., et al., "Antenna spacing in MIMO indoor channels", Proc. IEEE Veh. Technol. Conf., vol. 2 (May 2002), pp. 749-753.
Proakis, J, "Digital Communications", Fourth Edition, Department of Electrical and Computer Engineering, Northeastern University, ISBN 0-07-232111-3, Cover page, Title page, Table of Contents, 2001, 9 pages.
"Propagation", printed Oct. 21, 2005, http://home.planet.n1/~alphe078/propagat1.htm, 2 pages.
Rao, R, et al., "I/Q mismatch cancellation for MIMO-OFDM systems", In Personal, Indoor and Mobile Radio Communications, PIMRC 2004. 15th IEEE International Symposium on, vol. 4, (2004), pp. 2710-2714.
Rao, R.M., et al., "Multi-antenna testbeds for research and education in wireless communications", IEEE Communications Magazine, vol. 42, No. 12, (Dec. 2004), pp. 72-81.
Rappaport, T, Wireless Communications, Principles and Practice, Second Edition, Prentice Hall, 2002, ISBN 0-13-042232-0, Cover page, Title page, Table of Contents, 13 pages.
Schmidl, T.M, et al., "Robust frequency and timing synchronization for OFDM", IEEE Trans. Commun., vol. 45, No. 12, (Dec. 1997), pp. 1613-1621.
Schuchert, S, et al., "A novel I/Q imbalance compensation scheme for the reception of OFDM signals", IEEE Transaction on Consumer Electronics, (Aug. 2001), pp. 313-318.
Serpedin, E, et al., "Blind channel and carrier frequency offset estimation using periodic modulation precoders", Signal Processing, IEEE Transactions on [see also Acoustics, Speech, and Signal Processing, IEEE Transactions on], vol. 48, No. 8, (Aug. 2000), pp. 2389-2405.
Sharif, M, et al., "On the capacity of MIMO broadcast channel with partial side information", IEEE Trans. Info. Th., vol. 51, (Feb. 2005), pp. 506-522.
Shen, Zukang, et al., "Low complexity user selection algorithms for multiuser MIMO systems with block diagonalization", accepted for publication in IEEE Trans. Sig. Proc, (Sep. 2005), pp. 1-12.
Shen, Zukang, et al., "Sum capacity of multiuser MIMO broadcast channels with block diagonalization", submitted to IEEE Trans. Wireless Comm., (Oct. 2005), pp. 1-12.
Shi, K, et al., "Coarse frame and carrier synchronization of OFDM systems: a new metric and comparison", IEEE Trans. Wireless Commun., vol. 3, No. 4, (Jul. 2004), pp. 1271-1284.
Shiu, Da-Shan, et al., "Fading correlation and its effect on the capacity of multielement antenna systems", IEEE Trans. Comm., vol. 48, No. 3, (Mar. 2000), pp. 502-513.
Spencer, Quentin H., et al., "Adaptive Antennas and MIMO Systems for Wireless Communications—An Introduction to the Multi-User MIMI Downlink", IEEE Communications Magazine, (Oct. 2004), pp. 60-67.
Spencer, Quentin H., et al., "Zero-forcing methods for downlink spatial multiplexing in multiuser MIMO channels", IEEE Trans. Sig. Proc., vol. 52 (Feb. 2004), pp. 461-471.
Stoytchev, M., et al., "Compact antenna arrays for MIMO applications", Proc. IEEE Antennas and Prop. Symp., vol. 3 (Jul. 2001), pp. 708-711.
Strangeways, H, "Determination of the Correlation Distance for Spaced Antennas on Multipath HF Links and Implications for Design of SIMO and MIMO Systems", School of Electronic and Electrical Engineering, University of Leeds, IEEE First European Conf. on Antennas and Prop., 12 pages, 2006, www.esaspaceweather.net/spweather/workshops/esww11/proc/Session3/StrangewaysHFMIMOposter.pdf.
Strangways, H. J., "Investigation of signal correlation for spaced and co-located antennas on multipath hf links and implications for the design of SIMO and MIMO systems", IEEE First European Conf. on Antennas and Propagation (EuCAP 2006), vol., n. 6-10, pp. 1-6, Nov. 2006.
Strohmer, T, et al., "Application of Time-Reversal with MMSE Equalizer to UWB Communications", Proc. of IEEE Globecom, vol. 5, pp. 3123-3127, Nov. 2004.
Tang, T, et al., "Joint frequency offset estimation and interference cancellation for MIMO-OFDM systems [mobile radio]", VTC2004-Fall. 2004 IEEE 60th Vehicular Technology Conference, vol. 3, Sep. 26-29, 2004, pp. 1553-1557.
Tarighat, Alireza, et al., "Compensation schemes and performance analysis of IQ imbalances in OFDM receivers", Signal Processing, IEEE Transactions on [see also Acoustics, Speech, and Signal Processing, IEEE Transactions on], vol. 53, (Aug. 2005), pp. 3257-3268.
Tarighat, et al., "MIMO OFDM receivers for systems with IQ imbalances", , IEEE Trans. Sig. Proc., vol. 53, for orthogonal space-time block codes (OSTBC), (Sep. 2005), pp. 3583-3596.
Tarokh, Vahid, et al., "Space-time block codes from orthogonal designs", IEEE Trans. Info. Th., vol. 45, (Jul. 1999), pp. 1456-1467.
Tureli, U, et al., "OFDM blind carrier offset estimation: ESPRIT", IEEE Trans. Commun., vol. 48, No. 9, (Sep. 2000), pp. 1459-1461.
Valkama, M, et al., "Advanced methods for I/Q imbalance compensation in communication receivers", IEEE Trans. Sig. Proc., (Oct. 2001) pp. 2335-2344.

(56) References Cited

OTHER PUBLICATIONS

Van De Beek, Jan-Jaap, et al., "ML estimation of time and frequency offset in OFDM systems", Signal Processing, IEEE Transactions on [see also Acoustics, Speech, and Signal Processing, IEEE Transactions on] vol. 45, No. 7, (Jul. 1997), pp. 1800-1805.
Vaughn, Rodney, et al., "Switched parasitic elements for antenna diversity", IEEE Trans. Antennas Propagat., vol. 47, (Feb. 1999), pp. 399-405.
Vishwanath, S, "Duality, Achievable Rates, and Sum-Rate Capacity of Gaussian MIMO Broadcast Channels," IEEE Trans. Info. Th., vol. 49, No. 10, pp. 2658-2668, Oct. 2003.
Viswanath, et al., "Sum Capacity of the Vector Gaussian Broadcast Channel and Uplink-Downlink Duality", IEEE Transactions on Information Theory, vol. 49, No. 8, Aug. 2003, pp. 1912-1921.
Waldschmidt, Christian, et al., "Complete RF system model for analysis of compact MIMO arrays,", IEEE Trans. on Vehicular Technologies, vol. 53, (May 2004), pp. 579-586.
Wallace, Jon W., et al., "Termination-dependent diversity performance of coupled antennas: Network theory analysis,", IEEE Trans. Antennas Propagat., vol. 52, (Jan. 2004), pp. 98-105.
Warrington, E.M, et al. "Measurement and Modeling of HF Channel Directional Spread Characteristics for Northerly Paths", Radio Science, vol. 41, RS2006, DOI:10.1029/2005R5003294, 2006, pp. 1-13.
Wheeler, Harold A., et al., "Small antennas", IEEE Trans. Antennas Propagat., vol. AP-23, n.4, (Jul. 1975), pp. 462-469.
Wong, et al., "Performance Enhancement of Multiuser MIMO Wireless Communication Systems", IEEE Transactions on Communications, vol. 50, No. 12, Dec. 2002, pp. 1960-1970.
Wong, Kai-Kit, et al., "A joint-channel diagonalization for multiuser MIMO antenna systems", IEEE Trans. Wireless Comm., vol. 2, (Jul. 2003), pp. 773-786.
Yoo, et al., "Multi-Antenna Downlink Channels with Limited Feedback and User Selection", IEEE Journal on Selected Areas in Communications, vol. 25, No. 7, Sep. 2007, pp. 1478-1491.
Yu, et al., "Sum Capacity of Gaussian Vector Broadcast Channels", IEEE Transactions on Information Theory, vol. 50, No. 9, Sep. 2004, pp. 1875-1892.
Zhang, et al., "Coordinated Multi-Cell MIMO Systems With Cellular Block Diagonalization", IEEE 2007, pp. 1669-1673.
Zhang, et al., "Networked MIMO with Clustered Linear Precoding", IEEE Transactions on Wireless Communications, vol. 8, No. 4, Apr. 2009, pp. 1910-1921.
Zheng, Lizhong, et al., "Diversity and multiplexing: a fundamental tradeoff in multiple antenna channels", IEEE Trans. Info. Th., vol. 49, No. 5, (May 2003), pp. 1073-1096.
Zhuang, X, et al., "Channel models for link and system level simulations", IEEE 802.16 Broadband Wireless Access Working Group, (Sep. 2004) 15 pages.
Zogg, et al., "Multipath Delay Spread in a Hilly Region at 210 MHz", IEEE Transactions on Vehicular Technology, vol. VT-36, No. 4, Nov. 1987, pp. 184-187.
Office Action from U.S. Appl. No. 10/817,731, mailed Jan. 21, 2009, 23 pages.
Office Action from U.S. Appl. No. 11/894,394, mailed Oct. 28, 2008, 13 pages.
Office Action from U.S. Appl. No. 11/894,540, mailed Oct. 29, 2008, 13 pages.
Office Action from U.S. Appl. No. 11/894,362, mailed Oct. 29, 2008, 17 pages.
Office Action from U.S. Appl. No. 11/256,478, mailed Sep. 19, 2008, 14 pages.
Notice of Allowance from U.S. Appl. No. 11/894,394, mailed Jun. 26, 2009, 5 pages.
Office Action from U.S. Appl. No. 10/817,731, mailed Sep. 11, 2009, 36 pages.
Notice of Allowance from U.S. Appl. No. 11/894,362, mailed Sep. 3, 2009, 6 pages.
Notice of Allowance from U.S. Appl. No. 11/894,540, mailed Sep. 14, 2009, 6 pages.
Notice of Allowance from U.S. Appl. No. 11/256,478, mailed Jan. 26, 2010, 6 pages.
Office Action from U.S. Appl. No. 10/817,731, mailed Mar. 15, 2010, 26 pages.
Notice of Allowance from U.S. Appl. No. 12/802,976, mailed Nov. 29, 2010, 6 pages.
Office Action from U.S. Appl. No. 12/630,627, mailed Mar. 16, 2011, 5 pages.
Notice of Allowance from U.S. Appl. No. 12/802,976, mailed Apr. 14, 2011, 6 pages.
Final Office Action from U.S. Appl. No. 12/630,627, mailed Oct. 20, 2011, 13 pages.
Final Office Action from U.S. Appl. No. 10/817,731, mailed Jul. 9, 2008, 20 pages.
Office Action from U.S. Appl. No. 10/817,731, mailed Jan. 4, 2008, 13 pages.
Office Action from U.S. Appl. No. 10/817,731, mailed May 18, 2007, 12 pages.
Notice of Allowance from U.S. Appl. No. 10/817,731, mailed Sep. 30, 2010, 6 pages.
Notice of Allowance from U.S. Appl. No. 12/143,503, mailed Aug. 18, 2011, 12 pages.
Office Action from U.S. Appl. No. 12/143,503, mailed Dec. 9, 2010, 15 pages.
Office Action from U.S. Appl. No. 11/894,540, mailed Apr. 29, 2009, 5 pages.
Final Office Action from U.S. Appl. No. 12/802,988, mailed Sep. 5, 2012, 10 pages.
Notice of Allowance from U.S. Appl. No. 12/802,938 mailed Sep. 19, 2012, 8 pages.
Final Office Action from U.S. Appl. No. 12/802,989, mailed Nov. 27, 2012, 12 pages.
Notice of Allowance from U.S. Appl. No. 12/802,938 mailed Dec. 6, 2012, 5 pages.
Notice of Allowance from U.S. Appl. No. 12/917,257, mailed Dec. 6, 2012, 8 pages.
Office Action from U.S. Appl. No. 12/637,643, mailed Sep. 23, 2011, 18 pages.
ArrayComm, "Field-Proven Results", Improving wireless economics through MAS software, printed on Mar. 28, 2011, 3 pages, retrieved from the internet, www.arraycomm.com/serve.php?page=proof.
Office Action from U.S. Appl. No. 12/802,988, mailed Apr. 12, 2013, 8 pages.
Office Action from U.S. Appl. No. 13/232,996, mailed Apr. 11, 2013, 10 pages.
Office Action from U.S. Appl. No. 13/233,006, mailed Apr. 16, 2013, 9 pages.
Notice of Allowance from U.S. Appl. No. 12/917,257 mailed May 31, 2013, 12 pages.
Notice of Allowance from U.S. Appl. No. 12/802,938 mailed May 24, 2013, 10 pages.
Final Office Action from U.S. Appl. No. 12/802,958, mailed Jun. 25, 2013, 48 pages.
Final Office Action from U.S. Appl. No. 13/464,648, mailed Aug. 1, 2013, 10 pages.
Final Office Action from U.S. Appl. No. 13/232,996, mailed Jul. 31, 2013, 12 pages.
Final Office Action from U.S. Appl. No. 12/802,988, mailed Aug. 2, 2013, 13 pages.
Office Action from U.S. Appl. No. 12/802,975, mailed Aug. 14, 2013, 26 pages.
Office Action from U.S. Appl. No. 13/233,006, mailed Sep. 12, 2013, 6 pages.
Office Action from U.S. Appl. No. 12/802,989, mailed Nov. 26, 2013, 27 pages.
Office Action from U.S. Appl. No. 13/464,648, mailed Feb. 14, 2014, 11 pages.
Final Office Action from U.S. Appl. No. 13/233,006, mailed Feb. 18, 2014, 18 pages.
Office Action from U.S. Appl. No. 13/461,682, mailed Feb. 25, 2014, 37 pages.

(56) References Cited

OTHER PUBLICATIONS

Final Office Action with partial English translation from Japanese Patent Application No. 2005-223345, mailed Feb. 18, 2014, 23 pages.
Office Action from U.S. Appl. No. 13/633,702, mailed Dec. 17, 2013, 21 pages.
PCT/US2012/054937 Notification Concerning Transmittal of International Preliminary Report on Patentability, Mailed Mar. 18, 2014, 13 pages.
Office Action from U.S. Appl. No. 12/802,989 mailed Nov. 26, 2013, 27 pages.
Office Action from U.S. Appl. No. 12/802,958, mailed Jun. 23, 2014, 24 pages.
Office Action from U.S. Appl. No. 14/023,302 mailed Jul. 17, 2014, 37 pages.
Office Action from U.S. Appl. No. 12/802,988, mailed Mar. 24, 2014, 11 pages.
Final Office Action from U.S. Appl. No. 12/802,975, mailed Aug. 4, 2014, 40 pages.
Office Action with English translation from foreign counterpart Korean Patent Application No. 1020107006265, mailed Jul. 29, 2014, 10 pages.
Final Office Action from U.S. Appl. No. 13/475,598, mailed Aug. 27, 2014, 30 pages.
Office Action from U.S. Appl. No. 14/156,254, mailed Sep. 11, 2014, 44 pages.
Office Action from U.S. Appl. No. 13/233,006, mailed Sep. 24, 2014, 9 pages.
Notice of Allowance from U.S. Appl. No. 13/633,702, mailed Jan. 6, 2015, 12 pages.
Office Action from U.S. Appl. No. 12/802,989, mailed Nov. 25, 2014, 17 pages.
"Quantum Cryptography." Wikipedia: The Free Encyclopedia. Wikimedia Foundation, Inc. Jul. 26, 2014. Web. Nov. 14, 2014. <http://en.wikipedia.org/wiki/Quantum_cryptography>.
Brassard, Gilles, et al., "A Quantum Bit Commitment Scheme Provably Unbreakable by both Parties". IEEE, FOCS 1993, pp. 362-371.
Mayers, Dominic, "Unconditionally Secure Quantum Bit Commitment is Impossible". *Physical Review Letters* (APS) 78 (17), 1997.
Damgard, Ivan, et al., "Cryptography in the Bounded Quantum-Storage Model". IEEE, FOCS 2005, pp. 24-27.
Koenig, Robert, et al., "Unconditional security from noisy quantum storage". IEEE Transactions on Information Theory, vol. 58, No. 3, Mar. 2012, pp. 1962-1984.
Cachin, Christian, et al. "Oblivious Transfer with a Memory-Bounded Receiver". FOCS 1998. IEEE. pp. 493-502.
Dziembowski, Stefan, et al. "On Generating the Initial Key in the Bounded-Storage Model". Eurocrypt 2004. LNCS 3027. Springer. pp. 126-137.
Chandran, Nishanth, et al., "Position-Based Cryptography", Department of Computer Science, UCLA, 2009, 50 pages.
Kent, Adrian, et al, "Quantum Tagging: Authenticating Location via Quantum Information and Relativistic Signalling Constraints". 2010, 9 pages Phys. Rev. A84, 012326 (2011), DOI: 10.1103/PhysRevA.84.012326, arXiv:1008.2147.
Lau, Hoi-Kwan, et al., "Insecurity of position-based quantum-cryptography protocols against entanglement attacks". Physical Review A (APS), 2010, 83: 012322, 13 pages.
Malaney, Robert, A., et al., "Location-dependent communications using quantum entanglement". Physical Review A, 2010, 81: 042319, 11 pages.
Buhrman, Harry, et al., "Position-Based Quantum Cryptography: Impossibility and Constructions". 2010, 27 pages.
"Post-quantum cryptography". Web. Retrieved Aug. 29, 2010. <http://pqcrypto.org/>.
Bernstein, Daniel J., et al., "Post-quantum cryptography" Springer, 2009, 248 pages ISBN 978-3-540-88701-0.
Watrous, John, "Zero-Knowledge against Quantum Attacks". *SIAM J. Comput*. 39 (1): 25-58. (2009).
3GPP, "Spatial Channel Model AHG (Combined ad-hoc from 3GPP & 3GPP2)", SCM Text V6.0, Apr. 22, 2003, pp. 1-45.
3GPP TR 25.912, "Feasibility Study for Evolved Utra and Utran", V9.0.0 (Oct. 2009).
3GPP TR 25.913, "Requirements for Evolved UTRA (E-UTRA) and Evolved UTRAN (E-UTRAN)", V8.0.0 (Jan. 2009).
W. C. Jakes, Microwave Mobile Communications, IEEE Press, 1974.
J. G. Proakis, Communication System Engineering, Prentice Hall, 1994.
R. A. Monziano and T. W. Miller, *Introduction to Adaptive Arrays*, New York: Wiley, 1980.
Wi-Fi alliance, homepage, pp. 1-3, printed on Nov. 17, 2014, www.wi-fi.org/.
Wi-Fi alliance, "Wi-Fi certified makes it Wi-Fi" http://www.wi-fi.org/files/WFA_Certification_Overview_WP_en.pdf, 1 page.
3GPP, "UMTS", Universal Mobile Telecommunications System, pp. 1-2, printed on Nov. 17, 2014, www.3gpp.org/article/umts.
Motorola, "Long Term Evolution (LTE): A Technical Overview", http://business.motorola.com/experiencelte/pdf/LTETechnicalOverview.pdf.
Blelloch, "Introduction to Data Compression", Carnegie Mellon University Tech. Report Sep. 2010, pp. 1-55.
Extended Search Report from foreign counterpart European Patent Application No. 06718208.8, mailed Jan. 22, 2015, 6 pages.
Decision of Refusal from foreign counterpart Korean Patent Application No. 2010-7006265, mailed Apr. 23, 2015, 6 pages.
First Office Action and Search Report from foreign counterpart Chinese Patent Application No. 201210466082X, mailed Apr. 3, 2015, 26 pages.
Examiner's Report from foreign counterpart Canadian Patent Application No. 2695799, mailed Apr. 1, 2015, 4 pages.
Final Office Action from U.S. Appl. No. 12/802,958, mailed Apr. 15, 2015, 24 pages.
Office Action from U.S. Appl. No. 13/642,259 mailed May 14, 2015, 9 pages.
Office Action from U.S. Appl. No. 13/475,598, mailed Mar. 23, 2015, 14 pages.
Notice of Allowance from U.S. Appl. No. 14/156,254, mailed Mar. 12, 2015, 5 pages.
Office Action from U.S. Appl. No. 14/086,700, mailed Apr. 2, 2015, 12 pages.
Office Action from foreign counterpart Mexico Patent Application No. MX/a/2014/002900, mailed May 24, 2015, 3 pages.
Office Action from U.S. Appl. No. 13/797,984, mailed Jan. 29, 2015, 15 pages.
Office Action from foreign counterpart Japanese Patent Application No. 2013-156855, mailed Apr. 17, 2015, 6 pages.
Office Action from foreign counterpart Korean Patent Application No. 2015-7002560, mailed May 21, 2015, 15 pages.
Office Action from foreign counterpart China Patent Application No. 201180061132.X, mailed May 27, 2015, 6 pages.
Office Action from U.S. Appl. No. 13/233,006, mailed Jun. 4, 2015, 12 pages.
Office Action from U.S. Appl. No. 13/798,004, mailed Jun. 17, 2015, 13 pages.
Office Action from U.S. Appl. No. 14/187,759, mailed Jun. 23, 2015, 16 pages.
Office Action from U.S. Appl. No. 13/232,996, mailed Jun. 24, 2015, 15 pages.
Office Action from U.S. Appl. No. 12/802,988, mailed Jun. 26, 2015, 17 pages.
Office Action from foreign counterpart Japanese Patent Application No. 2014-140413, mailed Jun. 27, 2015, 6 pages.
Office Action from U.S. Appl. No. 12/802,975, mailed May 7, 2015, 25 pages.
Office Action from foreign counterpart China Patent Application No. 201210464974.6, mailed Jul. 1, 2015, 3 pages.
Office Action from U.S. Appl. No. 13/797,950, mailed May 11, 2015, 61 pages.
Office Action from U.S. Appl. No. 14/023,302, mailed Jun. 11, 2015, 8 pages.

(56) References Cited

OTHER PUBLICATIONS

First Examination Report from foreign counterpart New Zealand Patent Application No. 622137, mailed Aug. 28, 2014, 2 pages.
Office Action from U.S. Appl. No. 13/797,971, mailed May 11, 2015, 52 pages.
Notice of Allowance from U.S. Appl. No. 14/156,254, mailed Jul. 8, 2015, 7 pages.
Kellerman, et al., "LDPC OFDM space-time multipath fading channel results", Proc. SPIE 5100, Digital Wireless Communications V, 19 (Jul. 25, 2003); doi:10.1117/12.487462.
3GPP, TS 36.201, Evolved Universal Terrestrial Radio Access (E-UTRA); LTE Physical Layer-General Description (Release 11) pp. 1-14, Oct. 2012.
3GPP, TS 36.211, Evolved Universal Terrestrial Radio Access (E-UTRA); Physical Channels and Modulation (Release 11) pp. 1-107, Oct. 2012, submitted as Part 1 and Part 2.
3GPP, TS 36.212, Evolved Universal Terrestrial Radio Access (E-UTRA); Multiplexing and channel coding (Release 11) pp. 1-80, Oct. 2012, submitted as Part 1 and Part 2.
3GPP, TS 36.213, Evolved Universal Terrestrial Radio Access (E-UTRA); Physical layer procedures (Release 11), pp. 1-145, Oct. 2012.
J-C. Guey, and L. D. Larsson, "Modeling and evaluation of MIMO systems exploiting channel reciprocity in TDD mode", 2004_VTC2004-Fall. 2004 IEEE 60th, 2004.
N. Tyler, B. Allen, and H. Aghvami, "Adaptive antennas: the calibration problem", IEEE Comm. Mag., pp. 114-122, Dec. 2004.
A. Bourdoux, B. Come, and N. Khaled, "Non-reciprocal transceivers in OFDM/SDMA systems: impact and mitigation", IEEE, pp. 183-186, 2003.
M. Guillaud, D. T. M. Slock, and R. Knopp, "A practical method for wireless channel reciprocity exploitation through relative calibration", IEEE Proc. of Sign Proc., pp. 403-406, vol. 1, Aug. 2005.
P. Zetterberg, "Experimental investigation of TDD reciprocity based zero-forcing transmit precoding", EURASIP, Jun. 2010.
P. Uthansakul, K. Attakitmongkol, N. Promsuvana, and Uthansakul, "MIMO antenna selection using CSI from reciprocal channel", Int. Journ. of Elect. and Info. Eng., 2010.
First Office Action from foreign counterpart Russian Patent Application No. 2011131821, mailed Jun. 26, 2015, 8 pages.
First Office Action from foreign counterpart Russian Patent Application No. 2011131821, mailed Jun. 24, 2015, 8 pages.
Office Action from U.S. Appl. No. 13/844,355 mailed Aug. 12, 2015, 20 pages.
Notice of Acceptance from foreign counterpart New Zealand Patent Application No. 610463, mailed Aug. 4, 2015, 1 page.
Examiner's Report from foreign counterpart Canadian Patent Application No. 2,659,572, mailed Jul. 29, 2015, 3 pages.
Office Action from U.S. Appl. No. 12/802,958, mailed Aug. 13, 2015, 22 pages.
Notice of Allowance from U.S. Appl. No. 13/464,648 mailed Aug. 14, 2015, 21 pages.
First Office Action from foreign counterpart Mexican Patent Application No. MX/a/2014/002900, mailed Apr. 24, 2015, 3 pages.
Notice of Allowance from foreign counterpart Canadian Patent Application No. P14906, mailed Jun. 1, 2015, 1 page.
Full Examiner's Report from foreign counterpart Australian Patent Application No. 2010256510, mailed Aug. 10, 2015, 3 pages.
Examiner's Report from foreign counterpart Canadian Patent Application No. 2657309, mailed Apr. 16, 2015, 3 pages.
Lin, et al., "Mirror MoCap: Automatic and efficient capture of dense 3D facial motion parameters from video", The Visual Computer, International Journal of Computer Graphics, Springer, Berlin, DE, vol. 21, No. 6, Jul. 2005, pp. 355-372, XP019339114.
Final Office Action from U.S. Appl. No. 13/797,984, mailed Aug. 20, 2015, 15 pages.
Office Action from U.S. Appl. No. 12/802,989, mailed Aug. 25, 2015, 24 pages.
Office Action from U.S. Appl. No. 14/611,565, mailed Aug. 31, 2015, 21 pages.
Office Action from U.S. Appl. No. 14/086,700, mailed Sep. 2, 2015, 9 pages.
Transmittal of International Preliminary Report on Patentability from foreign counterpart PCT/US2013/061493 mailed Apr. 16, 2015, 8 pages.
Transmittal of International Search Report and the Written Opinion of the International Searching Authority, or the Declaration from foreign counterpart PCT/US15/14511 mailed May 18, 2015, 7 pages.
European Supplementary Search Report from European Patent Application No. 06718208.9 mailed Jan. 22, 2015, 6 pages.
Office Action from U.S. Appl. No. 13/652,259, mailed Sep. 23, 2015, 6 pages.
Examination Report from counterpart Australian Patent Application No. 2014200745, mailed Sep. 25, 2015, 3 pages.
Office Action from foreign counterpart Japan Patent Application No. 2013-537753, mailed Sep. 7, 2015, 9 pages.
Examiner Report from foreign counterpart Canada Patent Application No. 2,562,657, mailed Aug. 31, 2015, 3 pages.
First Examination Report from counterpart India Patent Application No. 1528/DELNP/2007 mailed Sep. 29, 2015, 3 pages.
Notice of Allowance from U.S. Appl. No. 14/023,302, mailed Oct. 9, 2015, 5 pages.
Final Office Action from U.S. Appl. No. 13/797,971, mailed Oct. 9, 2015, 52 pages.
Examiner Report from foreign counterpart Australian Patent Application No. 2011323559, mailed Sep. 30, 2015, 3 pages.
Notice of Allowance from U.S. Appl. No. 13/475,596, mailed Oct. 19, 2015, 29 pages.
First Office Action from counterpart Mexican Patent Application No. MX/a/2014/013795, mailed Oct. 30, 2015, 4 pages.
Notice of Allowance from U.S. Appl. No. 14/156,254, mailed Nov. 3, 2015, 29 pages.
Final Office Action from U.S. Appl. No. 13/233,006, mailed Nov. 5, 2015, 10 pages.
Final Office Action from U.S. Appl. No. 13/232,996, mailed Nov. 12, 2015, 14 pages.
Extended Search Report from counterpart European Patent Application No. 13 784 690.3, mailed Nov. 23, 2015, 4 pages.
Transmittal of International Preliminary Report on Patentability and Written Opinion from foreign counterpart PCT/US2014/025108 mailed Sep. 24, 2015, 8 pages.
Transmittal of International Preliminary Report on Patentability and Written Opinion from foreign counterpart PCT/US2014/025102 mailed Sep. 24, 2015, 10 pages.
Transmittal of International Preliminary Report on Patentability and Written Opinion from foreign counterpart PCT/US2014/025123 mailed Sep. 24, 2015, 10 pages.
Transmittal of International Preliminary Report on Patentability and Written Opinion from foreign counterpart PCT/US2014/025109 mailed Oct. 1, 2015, 5 pages.
Transmittal of International Preliminary Report on Patentability and Written Opinion from foreign counterpart PCT/US2014/025105 mailed Sep. 24, 2015, 10 pages.
Transmittal of International Preliminary Report on Patentability and Written Opinion from foreign counterpart PCT/US2013/071749 mailed Jun. 4, 2015, 7 pages.
Transmittal of International Preliminary Report on Patentability and Written Opinion from foreign counterpart PCT/US2015/23436 mailed Mar. 30, 2015, 10 pages.
Notice of Allowance from counterpart Mexican Patent Application No. MX/a/2014/002900, Nov. 6, 2015, 4 pages.
First Office Action from counterpart Japan Patent Application No. 2014-264325, mailed Nov. 12, 2015, 4 pages.
Final Office Action from U.S. Appl. No. 12/802,974, mailed Nov. 30, 2015, 22 pages.
First Examination Report from counterpart Australian Patent Application No. 2020256510 mailed Aug. 10, 2015, 3 pages.
First Office Action Report from counterpart Chinese Patent Application No. 201310407419.4 mailed Nov. 20, 2015, 8 pages.
First Examination Report from counterpart Australian Patent Application No. 2011323559 mailed Oct. 12, 2015, 3 pages.

(56) References Cited

OTHER PUBLICATIONS

Office Action from U.S. Appl. No. 12/802,988, mailed Jan. 13, 2016, 11 pages.
Office Action from U.S. Appl. No. 13/797,984, mailed Jan. 14, 2016, 14 pages.
First Office Action from counterpart European Patent Application No. 10 784 126.4 mailed Dec. 17, 2015, 7 pages.
First Office Action from counterpart European Patent Application No. 12762167.0 mailed Jan. 4, 2016, 4 pages.
Notice of Allowance from foreign counterpart Korean Patent Application No. 20157002560, mailed Feb. 4, 2016, 2 pages.
European Patent Office Action from counterpart European Patent Application No. 13 790 935.4 mailed Dec. 1, 2015, 9 pages.
Office Action from U.S. Appl. No. 13/797,950, mailed Feb. 2, 2016, 65 pages.
First Office Action from counterpart European Patent Application No. 201380035543.0 mailed Feb. 15, 2016, 8 pages.
Office Action from U.S. Appl. No. 13/652,259, mailed Feb. 18, 2016, 8 pages.
Notice of Allowance from U.S. Appl. No. 14/156,254, mailed Feb. 26, 2016, 21 pages.
Final Office Action from U.S. Appl. No. 13/798,004, mailed Feb. 2, 2016, 12 pages.
Notice of Allowance from U.S. Appl. No. 14/023,302, mailed Feb. 5, 2016, 27 pages.
First Exam Report from counterpart New Zealand Application No. 701691, mailed Feb. 10, 2016, 4 pages.
First Office Action from counterpart Korean Patent Application No. 10-2015-7033311, mailed Feb. 16, 2016, 12 pages.
First Exam Report from counterpart New Zealand Application No. 701691, mailed Feb. 3, 2016, 4 pages.
Office Action from U.S. Appl. No. 14/187,759, mailed Mar. 9, 2016, 16 pages.
Office Action from U.S. Appl. No. 14/754,651, mailed Mar. 15, 2016, 23 pages.
First Office Action and Search Report from counterpart Taiwan Application No. 100139880, mailed Feb. 26, 2016, 27 pages.
Second Office Action from counterpart Mexican Patent Application No. MX/a/2014/013795, mailed Feb. 3, 2016, 7 pages.
Second Office Action and Search Report from foreign counterpart China Patent Application No. 201180061132.X, mailed Mar. 11, 2016, 11 pages.
Pan, Chengkang, et al, "Precoding and Power allocation for Cooperative MIMO systems", 2006, IEEE, 4 pages.
Office Action from U.S. Appl. No. 14/086,700, mailed Mar. 4, 2016, 10 pages.
Notice of Allowance from foreign counterpart Canadian Patent Application No. 2695799, mailed Feb. 9, 2016, 1 page.
Office Action from U.S. Appl. No. 13/233,006, mailed Apr. 15, 2016, 9 pages.
Office Action from U.S. Appl. No. 13/844,355 mailed Apr. 18, 2016, 21 pages.
Examiner's Report from foreign counterpart Canadian Patent Application No. 2657309, mailed Apr. 25, 2016, 4 pages.
S. R. Gottesman and E. E. Fenimore: New Family of Binary Arrays for Coded Aperture Imaging. Appl. Opt., 28:4344-4352, 1989.
Busboom: Arrays Und Rekonstruktionsalgorithmen Fuer Bildgebende Systeme MIT Codierter Apertur. VDI Verlag, Duesseldorf, 1999, ISBN 3-18-357210-9 (English Translation 36 pages). Stanford University, Stanford Tech Report CTSR 2005-02, 11 pages.
Lytro User Manual, 2012, 25 pages, www.lytro.com.
NuCORE Technology, CleanCapture NDX-1260 Analog Image Processor, 2004, 12 pages.
A. Paulraj, R. Nabar, and D. Gore, Introduction to Space-Time Wireless Communications, Cambridge University Press, 40 West 20th Street, New York, NY, USA, 2003, 33 pages.
N. C. Tse, P. Viswanath, and L. Zheng, "Diversity-multiplexing tradeoff in multiple-access channels", *IEEE Trans. Info. Th.*, vol. 50, No. 9, pp. 1859-1874, Sep. 2004.

Visotsky and U. Madhow, "Space-time transmit precoding with im-perfect feedback," IEEE Trans. Info. Th., vol. 47, pp. 2632-2639, Sep. 2001.
S. A. Jafar, S. Vishwanath, and A. Goldsmith, "Channel capacity and beamforming for multiple transmit and receive antennas with covariance feedback," Proc. IEEE Int. Conf. on Comm., vol. 7, pp. 2266-2270, Jun. 2001.
E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553, Sep. 2004.
A. L. Moustakas and S. H. Simon, "Optimizing multiple-input single- output (MISO) communication systems with general Gaussian channels: nontrivial covariance and nonzero mean," IEEE Trans. Info. Th., vol. 49, pp. 2770-2780, Oct. 2003.
M. Kang and M. S. Alouini, "Water-filling capacity and beamforming performance of MIMO systems with covariance feedback," IEEE Work. on Sign. Proc. Adv. in Wire. Comm., pp. 556-560, Jun. 2003.
S. H. Simon and A. L. Moustakas, "Optimizing MIMO antenna systems with channel covariance feedback," IEEE Jour. Select. Areas in Comm., vol. 21, pp. 406-417, Apr. 2003.
S. M. Alamouti, "A simple transmit diversity technique for wireless communications," IEEE Jour. Select. Areas in Comm., vol. 16, No. 8, pp. 1451-1458, Oct. 1998.
V. Tarokh, N. Seshadri, and A. R. Calderbank, "Space-time codes for high data rate wireless communication: Performance criterion and code construction," IEEE Trans. Info. Th., vol. 44, pp. 744-765, Mar. 1998.
E. N. Onggosanusi, A. G. Dabak, and T. A. Schmidl, "High rate space-time block coded scheme: performance and improvement in correlated fading channels," Proc. IEEE Wireless Comm. and Net. Conf., vol. 1, pp. 194-199, Mar. 2002.
G. D. Durgin, Space-Time Wireless Channels, Prentice Hall, Upper Saddle River, NJ, USA, 2003.
R. W. Heath Jr. and A. Paulraj, "Switching between multiplexing and diversity based on constellation distance," Proc. of Allerton Conf. on 208, Comm. Control and Comp., Sep. 2000.
A. Forenza, A. Pandharipande, H. Kim, and R. W. Heath Jr., "Adaptive MIMO transmission scheme: Exploiting the spatial selectivity of wireless channels," Proc. IEEE Veh. Technol. Conf., vol. 5, pp. 3188-3192, May 2005.
C. B. Chae, A. Forenza, R. W. Heath, Jr., M. R. McKay, and I. B. Collings, "Adaptive MIMO Transmission Techniques for Broadband Wireless Communication Systems," *IEEE Communications Magazine*, vol. 48, No. 5, pp. 112-118, May 2010.
FCC, "Broadband action agenda", National Broadband Plan, 2010 http://www.broadband.gov/plan/national-broadband-plan-action-agenda.pdf.
N. Delfas, F. Meunier, S. Flannery, T. Tsusaka, E. Gelblum and S. Kovler, "Mobile data wave: who dares to invest, wins", Morgan Stanley Research Global, pp. 1-62, Jun. 13, 2012.
Goldman, "Sorry, America: your wireless airwaves are full", CNN Money, 3 pages, http://money.cnn.com/2012/02/21/technology/spectrum_crunch/index.htm.
P. Rysavy, "No silver bullets for FCC, NTIA spectrum challange", Daily report for executives, Bloomberg BNA, Aug. 2012, pp. 1-4, http://www.rysavy.com/Articles/2012_09_No_Spectrum_Silver_Bullets.pdf.
T. W. Hazlett, "Radio spectrum for a hungry wireless world", Sep. 22, 2011, 41 pages.
B. J. Love, D. J. Love and J. V. Krogmeier, "Like deck chairs on the Titanic: why spectrum reallocation won't avert the coming data crunch but technology might keep the wireless industry afloat", Feb. 2012, 705-719 pages.
Qualcomm, "The 1000x data challenge, the latest on wireless, voice, services and chipset evolution", 4G World, Oct. 31, 2012 61 pages submitted as Parts 1-3.
J. Lee, J.-K. Han, J. Zhang, "MIMO technologies in 3GPP LTE and LTE-advanced", EURASIP Journal on Wireless Comm. and Net., Hindawi, May 2009, pp. 1-10.

(56) References Cited

OTHER PUBLICATIONS

P. Ding, D. J. Love, and M. D. Zoltowski, "On the sum rate of channel subspace feedback for multi-antenna broadcast channels," in Proc., IEEE Globecom, vol. 5, pp. 2699-2703, Nov. 2005.

D. J. Love, R. W. Heath, Jr., V. K. N. Lau, D. Gesbert, B. D. Rao, and M. Andrews, "An Overview of Limited Feedback in Wireless Communication Systems," IEEE Journal on Sel. Areas in Comm., Special Issue on Exploiting Limited Feedback in Tomorrow's Wireless Communication Networks, vol. 26, No. 8, pp. 1341-1365, Oct. 2008.

R. W. Heath, Jr., D. J. Love, V. K. N. Lau, D. Gesbert, B. D. Rao, and M. Andrews, "Exploiting Limited Feedback in Tomorrow's Wireless Communication Networks," IEEE Journal on Sel. Areas in Comm., Special Issue on Exploiting Limited Feedback in Tomorrow's Wireless Communication Networks, vol. 26, No. 8, pp. 1337-1340, Oct. 2008.

D. J. Love, R. W. Heath, Jr., and T. Strohmer, "Grassmannian Beamforming for Multiple-Input Multiple-Output Wireless Systems," IEEE Trans. on Info. Theory special issue on Mimo Communication, vol. 49, pp. 2735-2747, Oct. 2003.

C. B. Chae, D. Mazzarese, N. Jindal and R. W. Heath, Jr., "Coordinated Beamforming with Limited Feedback in the MIMO Broadcast Channel" *IEEE Journal on Sel. Areas in Comm.*, Special Issue on Exploiting Limited Feedback in Tomorrow's Wireless Comm. Networks, vol. 26, No. 8, pp. 1505-1515, Oct. 2008.

A. Paulraj, "Is OFDMA, MIMO and OS the right stuff for mobile broad-band?" 63 pages, http://www.ieeevtc.org/vtc2005fall/presentations/paulraj.pdf, Sep. 2005.

3GPP, TS 36.808, "Evolved Universal Terrestrial Radio Access (E-UTRA); Carrier Aggregation (Release 10)", v10.0.0, Jun. 2012.

Nokia Siemens Networks, "2020: beyond 4G, radio evolution for the gigabit experience", White Paper, 2011, www.nokiasiemensnetworks.com.

S. Marek, "AT&T's Rinne talks about carrier aggregation trials, small cells and more", http://www.fiercebroadbandwireless.com/story/atts-rinne-talks-about-carrier-aggregation-trials-small-cells-and-more/Nov. 8, 2012.

J. Duplicity, et al., "MU-MIMO in LTE systems", EURASIP Journal on Wireless Communications and Networking, Mar. 2011, 10 pages.

S. Feng and E. Seidel, "Self-organizing networks (SON) in 3GPP LTE", Nomor research, May 2008, pp. 1-15.

NEC, "Self organizing networks", White paper, Feb. 2009, pp. 1-4.

G. J. Foschini, H.C. Huang, K. Karakayali, R. A. Valenzuela, and S. Venkatesan. The Value of Coherent Base Station Coordination. In *Conference on In-formation Sciences and Systems (CISS 2005)*, Mar. 2005.

M. K. Karakayali, G. J. Foschini, R. A. Valenzuela, and R. D. Yates, "On the maximum common rate achievable in a coordinated network," *Proc. of the Int'l Conf. on Communications (ICC'06)*, vol. 9, pp. 1-6, Mar. 3, 2006.

M. K. Karakayali, G. J. Foschini, and R. A. Valenzuela, "Network coordination for spectrally efficient communications in cellular systems," *IEEE Wireless Communications Magazine*, vol. 13, No. 4, pp. 56-61, Aug. 2006.

G. J. Foschini, M. K. Karakayali, and R. A. Valenzuela, "Coordinating multiple antenna cellular networks to achieve enormous spectral efficiency," *Proceedings of the IEEE*, vol. 153, No. 4, pp. 548-555, Aug. 2006.

S. Venkatesan, A. Lozano, and R. Valenzuela, "Network MIMO: overcoming inter-cell interference in indoor wireless systems", Proc. of Asilomar conf., pp. 83-87, Nov. 2007.

S. Venkatesan, H. Huang, A. Lozano, and R. Valenzuela, "A WiMAX-based implementation of network MIMO for indoor wireless systems", EURASIP Journal on Advances in Signal Processing, Sep. 2009, 11 pages.

Y. Liang, R. Valenzuela, G. Foschini, D. Chizhik, and A. Goldsmith, "Interference suppression in wireless cellular networks through picocells", ACSSC, pp. 1041-1045, Nov. 2007.

A. Papadogiannis, H. J. Bang, D. Gesbert, and E. Hardouin, "Efficient selective feedback design for multicell cooperative networks", IEEE Trans. on Vehicular Techn., pp. 196-205, vol. 60, n. 1, Jul. 13, 2010.

I. F. Akyildiz, D. M. Guterrez-Estevez, E. C. Reyes, "The evolution to 4G cellular systems: LTE-Advanced", Physical Comm., Elsevier, pp. 217-244, 2010.

A. Barbieri, P. Gaal, S. Geirhofer, T. Ji, D. Malladi, Y. Wei, and F. Xue, "Coordinated downlink multi-point communications in heterogeneous cellular networks", (Qualcomm), Information Theory and App. Workshop, pp. 7-16, Feb. 2012.

S. Parkvall, E. Dahlman, A. Furuskar, Y. Jading, M. Olsson, S. Wanstedt, and K. Zangi, "LTE-Advanced—evolving LTE towards IMT-Advanced", (Ericsson) IEEE VTC, pp. 1-5, Sep. 2008.

N. Jindal & A. Goldsmith, "Dirty Paper Coding vs. TDMA for MIMO Broadcast Channels", IEEE Trans. on Info. Theory, vol. 51, pp. 1783-1794, May 2005.

M. Tomlinson, "New automatic equaliser employing modulo arithmetic," *Electronics Letters*, vol. 7, Nos. 5/6, pp. 138-139, Mar. 1971.

U. Erez, S. Shamai (Shitz), and R. Zamir, "Capacity and lattice-strategies for cancelling known interference," Proceedings of International Symposium on Information Theory, Honolulu, Hawaii, Nov. 2000, pp. 1-32.

W. Yu and J. M. Cioffi, "Trellis Precoding for the Broadcast Channel", IEEE Globecom, vol. 2, pp. 1344-1348, 2001.

B. M. Hochwald, C. B. Peel, and A. L. Swindlehurst, "A Vector-Perturbation Technique for Near-Capacity Multiantenna Multiuser Communication—Part I: Channel Inversion and Regularization", IEEE Trans. On Communications, vol. 53, n. 1, pp. 195-202, Jan. 2005.

B. M. Hochwald, C. B. Peel, and A. L. Swindlehurst, "A Vector-Perturbation Technique for Near-Capacity Multiantenna Multiuser Communication—Part II: Perturbation", IEEE Trans. on Comm., vol. 53, n. 3, pp. 537-544, Mar. 2005.

S. Perlman and A. Forenza, "Distributed-input distributed-output (DIDO) wireless technology: a new approach to multiuser wireless", Rearden Labs White Paper, 19 pages, Jul. 2011, http://www.reardenwireless.com/110727-DIDO-A%20New%20Approach%20to%20Multiuser%20Wireless.pdf.

A. Vance, "Steve Perlman's wireless fix", Businessweek, Jul. 2011, 10 pages,http://www.businessweek.com/magazine/the-edison-of-silicon-valley-07272011.html.

M. Lindström (Ericsson), "LTE-Advanced Radio Layer 2 and RRC aspects", 3GPP TSG-RAN WG2, Dec. 17-18, 2009, 38 pages.

Anritsu, "LTE resource guide", 18 pages, 2009, www.us.anritsu.com.

J. Lee, "Introduction of LTE-Advanced DL/UL MIMO", Samsung Electronics, Sep. 2009, 18 pages.

J. Zyren, "Overview on the 3GPP long term evolution physical layer", Freescale White Paper, Jul. 2007, 27 pages.

M. Baker, "LTE-Advanced physical layer", Alcatel-Lucent, Dec. 2009, 48 pages.

X. Hou and H. Kayama, "Demodulation reference signal design and channel estimation for LTE-Advanced uplink", DOCOMO, Adv. in Vehic. Netw. Tech., Apr. 2011, Ch. 22, pp. 418-432, title page.

A. Lozano, R.W. Heath and J. Andrews, "Fundamental limits of cooperation", , 27 pages, Mar. 2012, http://arxiv.org/pdf/1204.0011.pdf.

Ubuquiti, "airMAX", 10 pages, printed on Sep. 4, 2015, http://www.ubnt.com/airmax.

Ubuquiti, "airFiber", 10 pages, printed on Sep. 4, 2015, http://www.ubnt.com/airfiber.

MikroTik, "Routerboard", 30 pages, printed on Sep. 4, 2015, http://routerboard.com/.

Ruckus wireless, 2 pages, printed on Sep. 4, 2015, "Long-range 802.11n Wi-Fi point-to-point/multipoint backhaul", http://www.ruckuswireless.com/products/zoneflex-outdoor/7731.

DigitalAir wireless, "Outdoor wireless", 5 pages, printed on Sep. 29, 2015, http://www.digitalairwireless.com/outdoor-wireless-networks.html.

(56) References Cited

OTHER PUBLICATIONS

DigitalAir wireless, "GeoDesy laser links 1.25Gbps full duplex", 4 pges, printed on Oct. 2, 2015, http://www.digitalairwireless.com/outdoor-wireless-networks/point-to-point-wireless/laser-fso-links/geodesy-fso-laser-links.html.

Netsukuku, 8 pages, printed on Sep. 30, 2015, http://netsukuku.freaknet.org/.

Webpass, "Buildings online" 3 pages, printed on Sep. 4, 2015, http://www.webpass.net/buildings?city=san+francisco&column=address&order=asc.

BelAir Networks, "Small cells", 4 pages, 2007, http://www.belairnetworks.com/sites/default/files/WP_SmallCells.pdf.

R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Processing*, vol. 55, No. 3, pp. 1159-1171, Mar. 2007.

P. Viswanath, et al., "Opportunistic beamforming using dump antennas," IEEE Trans. on Inform. Theory, vol. 48, pp. 1277-1294, Jun. 2002.

A. A. M. Saleh, et al., "A statistical model for indoor multipath propagation," IEEE Jour. Select. Areas in Comm., vol. 195 SAC-5, No. 2, pp. 128-137, Feb. 1987.

J. Choi, et al., "Interpolation Based Transmit Beamforming for MIMO-OFDM with Limited Feedback," *IEEE Trans. on Signal Processing*, vol. 53, No. 11, pp. 4125-4135, Nov. 2005.

I. Wong, et al., "Long Range Channel Prediction for Adaptive OFDM Systems," *Proc. of the IEEE Asilomar Conf. on Signals, Systems, and Computers*, vol. 1,pp. 723-736, Pacific Grove, CA, USA, Nov. 7-10, 2004.

B.D. Van Veen, et al., "Beamforming: a versatile approach to spatial filtering," IEEE ASSP Magazine, Apr. 1988, pp. 4-24.

R.G. Vaughan, "On optimum combining at the mobile," *IEEE Trans. on Vehic. Tech.*, vol. 37, n.4, pp. 181-188, Nov. 1988.

F. Qian, "Partially adaptive beamforming for correlated interference rejection," *IEEE Trans. on Sign. Proc.*, vol. 43, n.2, pp. 506-515, Feb. 1995.

H. Krim, et. al., "Two decades of array signal processing research," IEEE Signal Proc. Magazine, pp. 67-94, Jul. 1996.

H. Boche, et al., "Analysis of different precoding/decoding strategies for multiuser beamforming", IEEE Vehic. Tech. Conf., vol. 1, Apr. 2003.

M. Schubert, et al., "Joint 'dirty paper' pre-coding and downlink beamforming," vol. 2, pp. 536-540, Dec. 2002.

H. Boche, et al."A general duality theory for uplink and downlink beamforming", vol. 1, pp. 87-91, Dec. 2002.

S. Robinson, "Toward an Optimal Algorithm for Matrix Multiplication", SIAM News, vol. 38, No. 9, Nov. 2005.

D. Coppersmith and S. Winograd, "Matrix Multiplication via Arithmetic Progression", J. Symb. Comp. vol. 9, p. 251-280, 1990.

H. Cohn, R. Kleinberg, B. Szegedy, C. Umans, "Group-theoretic Algorithms for Matrix Multiplication", p. 379-388, Nov. 2005.

W.H. Press, S.A. Teukolsky, W. T. Vetterling, B.P. Flannery "Numerical Recipes in C: The Art of Scientific Computing", Cambridge University Press, 1992.

Per-Erik Eriksson and Björn Odenhammar, "VDSL2: Next important broadband technology", Ericsson Review No. 1, 2006.

Wallace and M. A. Jensen, "Statistical characteristics of measured MIMO wireless channel data and comparison to conventional models," Proc. IEEE Veh. Technol. Conf., vol. 2, No. 7-11, pp. 1078-1082, Oct. 2001.

V. Erceg et al., "TGn channel models," IEEE 802.11-03/940r4, May 2004.

3GPP Technical Specification Group, "Spatial channel model, SCM-134 text V6.0," Spatial Channel Model AHG (Combined ad-hoc from 3GPP and 3GPP2), Apr. 2003.

K. Sulonen, P. Suvikunnas, L. Vuokko, J. Kivinen, and P. Vainikainen, "Comparison of MIMO antenna configurations in picocell and microcell environments," IEEE Jour. Select. Areas in Comm., vol. 21, pp. 703-712, Jun. 2003.

Shuangqing Wei, D. L. Goeckel, and R. Janaswamy, "On the asymptoticcapacity of MIMO systems with fixed length linear antenna arrays," Proc. IEEE Int. Conf. on Comm., vol. 4, pp. 2633-2637, 2003.

T. S. Pollock, T. D. Abhayapala, and R. A. Kennedy, "Antenna saturation effects on MIMO capacity," Proc. IEEE Int. Conf. on Comm., 192 vol. 4, pp. 2301-2305, May 2003.

M. L. Morris and M. A. Jensen, "The impact of array configuration on MIMO wireless channel capacity," Proc. IEEE Antennas and Prop. Symp., vol. 3, pp. 214-217, Jun. 2002.

Liang Xiao, Lin Dal, Hairuo Zhuang, Shidong Zhou, and Yan Yao, "A comparative study of MIMO capacity with different antenna topologies," IEEE ICCS'02, vol. 1, pp. 431-435, Nov. 2002.

M. R. Andrews, P. P. Mitra, and R. deCarvalho, "Tripling the capacity of wireless communications using electromagnetic polarization," Nature, vol. 409, pp. 316-318, Jan. 2001.

D.D. Stancil, A. Berson, J.P. Van't Hof, R. Negi, S. Sheth, and P. Patel, "Doubling wireless channel capacity using co-polarised, co-located electric and magnetic dipoles," Electronics Letters, vol. 38, pp. 746-747, Jul. 2002.

T. Svantesson, "On capacity and correlation of multi-antenna systems employing multiple polarizations," Proc. IEEE Antennas and Prop. Symp., vol. 3, pp. 202-205, Jun. 2002.

C. Degen and W. Keusgen, "Performance evaluation of MIMO systems using dual-polarized antennas," Proc. IEEE Int. Conf. on Telecommun., vol. 2, pp. 1520-1525, Feb. 2003.

J. B. Andersen and B. N. Getu, "The MIMO cube-a compact MIMO antenna," IEEE Proc. of Wireless Personal Multimedia Communications Int. Symp., vol. 1, pp. 112-114, Oct. 2002.

C. Waldschmidt, C. Kuhnert, S. Schulteis, and W. Wiesbeck, "Compact MIMO-arrays based on polarisation-diversity," Proc. IEEE Antennas and Prop. Symp., vol. 2, pp. 499-502, Jun. 2003.

C. B. Dietrich Jr, K. Dietze, J. R. Nealy, and W. L. Stutzman, "Spatial, polarization, and pattern diversity for wireless handheld terminals," Proc. IEEE Antennas and Prop. Symp., vol. 49, pp. 1271-1281, Sep. 2001.

S. Visuri and D. T. Slock, "Colocated antenna arrays: design desiderata for wireless communications," Proc. Of Sensor Array and Multichannel Sign. Proc. Workshop, pp. 580-584, Aug. 2002.

A. Forenza and R. W. Heath Jr., "Benefit of pattern diversity via 2-element array of circular patch antennas in indoor clustered MIMO channels," *IEEE Trans. on Communications*, vol. 54, No. 5, pp. 943-954, May 2006.

A. Forenza and R. W. Heath, Jr., "Optimization Methodology for Designing 2-CPAs Exploiting Pattern Diversity in Clustered MIMO Channels", *IEEE Trans. on Communications*, vol. 56, No. 10, pp. 1748-1759, Oct. 2008.

D. Piazza, N. J. Kirsch, A. Forenza, R. W. Heath, Jr., and K. R. Dandekar, "Design and Evaluation of a Reconfigurable Antenna Array for MIMO Systems," *IEEE Transactions on Antennas and Propagation*, vol. 56, No. 3, pp. 869-881, Mar. 2008.

R. Bhagavatula, R. W. Heath, Jr., A. Forenza, and S. Vishwanath, "Sizing up MIMO Arrays," *IEEE Vehicular Technology Magazine*, vol. 3, No. 4, pp. 31-38, Dec. 2008.

Ada Poon, R. Brodersen and D. Tse, "Degrees of Freedom in Multiple Antenna Channels: A Signal Space Approach", IEEE Transactions on Information Theory, vol. 51(2), Feb. 2005, pp. 523-536.

T. Yoo, N. Jindal, and A. Goldsmith, "Multi-antenna broadcast channels with limited feedback and user selection," IEEE Journal on Sel. Areas in Communications, vol. 25, pp. 1478-1491, Jul. 2007.

N. Jindal, "MIMO broadcast channels with finite-rate feedback," IEEE Trans. on Info. Theory, vol. 52, pp. 5045-5060, Nov. 2006.

Wikipedia, "Advanced Mobile Phone System" 6 pages, printed on Aug. 14, 2014, http://en.wikipedia.org/wiki/Advanced_Mobile_Phone_System.

AT&T, "1946: First Mobile Telephone Call", 1 page, 2014, http://www.corp.att.com/attlabs/reputation/timeline/46mobile.html.

GSMA, "GSM technology" 1 page, printed on Aug. 14, 2014, http://www.gsmworld.com/technology/index.htm.

ETSI, "Mobile technologies GSM" 2 pages, printed on Aug. 14, 2014, http://www.etsi.org/WebSite/Technologies/gsm.aspx.

(56) References Cited

OTHER PUBLICATIONS

Wikipedia, "IS-95", 6 pages, printed on Aug. 14, 2014, http://en.wikipedia.org/wiki/IS-95.
Q. Bi (Mar. 2004). "A Forward Link Performance Study of the 1xEV-DO Rel. 0 System Using Field Measurements and Simulations" (PDF). Lucent Technologies, 19 pages, http://www.cdg.org/resources/white_papers/files/Lucent%201xEV-DO%20Rev%200%20Mar%2004.pdf.
WiMAX forum, 1 page, printed on Aug. 14, 2014, http://www.wimaxforum.org/.
H. Ekström, A. Furuskär, J. Karlsson, M. Meyer, S. Parkvall, J. Torsner, and M. Wahlqvist "Technical Solutions for the 3G Long-Term Evolution", IEEE Communications Magazine, pp. 38-45, Mar. 2006.
3GPP, "LTE", 4 pages, printed on Aug. 14, 2014, http://www.3gpp.org/LTE.
Motorola, "Long Term Evolution (LTE): A Technical Overview", 15 pages, 2007,http://business.motorola.com/experiencelte/pdf/LTETechnicalOverview.pdf.
Federal Communications Commission, "Authorization of Spread Spectrum Systems Under Parts 15 and 90 of the FCC Rules and Regulations", 18 pages, Jun. 1985.
ITU, "ISM band", 8 pages, 2007, http://www.itu.int/ITU-R/terrestrial/faq/index.html#g013.
S. Perlman and A. Forenza "Distributed-input distributed-output (DIDO) wireless technology: a new approach to multiuser wireless", Aug. 2011 http://www.rearden.com/DIDO/DIDO_White_Paper_110727.pdf.
Bloomberg Businessweek, "Steve Perlman's Wireless Fix", Jul. 27, 2011, 7 pages, http://www.businessweek.com/magazine/the-edison-of-silicon-valley-07272011.html.
Wired, "Has OnLive's Steve Perlman Discovered Holy Grail of Wireless?", Jun. 30, 2011 http://www.wired.com/epicenter/2011/06/perlman-holy-grail-wireless/.
The Wall Street Journal "Silicon Valley Inventor's Radical Rewrite of Wireless", Jul. 28, 2011 http://blogs.wsj.com/digits/2011/07/28/silicon-valley-inventors-radical-rewrite-of-wireless/.
The White House, "Presidential Memorandum: Unleashing the Wireless Broadband Revolution", Jun. 28, 2010.
FCC, "Open commission meeting", Sep. 23, 2010 http://reboot.fcc.gov/open-meetings/2010/september.
"A bill",112th congress, 1$^{st}$ session, Jul. 12, 2011 http://republicans.energycommerce.house.gov/Media/file/Hearings/Telecom/071511/DiscussionDraft.pdf.
A. Duel-Hallen, S. Hu, and H. Hallen, "Long-Range Prediction of Fading Signals," *IEEE Signal Processing Mag.*, vol. 17, No. 3, pp. 62-75, May 2000.
A. Forenza and R. W. Heath, Jr., "Link Adaptation and Channel Prediction in Wireless OFDM Systems," in *Proc. IEEE Midwest Symp. on Circuits and Sys.*, Aug. 2002, pp. 211-214.
M. Sternad and D. Aronsson, "Channel estimation and prediction for adaptive OFDM downlinks [vehicular applications]," in *Proc. IEEE Vehicular Technology Conference*, vol. 2, Oct. 2003, pp. 1283-1287.
D. Schafhuber and G. Matz, "MMSE and Adaptive Prediction of Time-Varying Channels for OFDM Systems," *IEEE Trans. Wireless Commun.*, vol. 4, No. 2, pp. 593-602, Mar. 2005.
I. C. Wong and B. L. Evans, "Joint Channel Estimation and Prediction for OFDM Systems," in *Proc. IEEE Global Telecommunications Conference*, St. Louis, MO, Dec. 2005.
M. Guillaud and D. Slock, "A specular approach to MIMO frequency selective channel tracking and prediction," in *Proc. IEEE Signal Processing Advances in Wireless Communications*, Jul. 2004, pp. 59-63.
Wong, I.C. Evans, B.L., "Exploiting Spatio-Temporal Correlations in MIMO Wireless Channel Prediction", IEEE Globecom Conf., pp. 1-5, Dec. 2006.
P. Rapajic and D. Popescu, Information Capacity of Random Signature Multiple-Input Multiple Output Channel, IEEE Trans. Commun., vol. 48, No. 8, pp. 1245-1248, Aug. 2000.

C.-N. Chuah, D. N. C. Tse, J. M. Kahn, and R. A. Valenzuela, Capacity Scaling in MIMO Wireless Systems under Correlated Fading, IEEE Trans. Inform. Theory, vol. 48, No. 2, pp. 637-650, Feb. 2002.
A. Moustakas, S. Simon, and A. Sengupta, MIMO Capacity Through Correlated Channels in the Presence of Correlated Interferers and Noise: A (Not so) Large N Analysis, IEEE Trans. Inform. Theory, vol. 49, No. 10, pp. 2545-2561, Oct. 2003.
B. Hochwald, T. Marzetta, and V. Tarokh, Multi-Antenna Channel Hardening and its Implications for Rate Feedback and Scheduling, IEEE Trans. Inform. Theory, vol. 50, No. 9, pp. 1893-1909, Sep. 2004.
M. Debbah and R. Muller, MIMO Channel Modelling and the Principle of Maximum Entropy, IEEE Trans. Inform. Theory, vol. 51, No. 5, pp. 1667-1690, May 2005.
Y.-C. Liang, S. Sun and C. Ho, Block-iterative Generalized Decision Feedback Equalizers (BI-GDFE) for Large MIMO Systems: Algorithm Design and Asymptotic Performance Analysis, IEEE Trans. Signal Processing, vol. 54, No. 6, pp. 2035-2048, Jun. 2006.
D. Aktas, M. N. Bacha, J. S. Evans, and S. V. Hanly, Scaling Results on the Sum Capacity of Cellular Networks with MIMO Links, IEEE Trans. Inform. Theory, vol. 52, pp. 3264-3274, Jul. 2006.
Y.-C. Liang, G. M. Pan and Z. D. Bai, Asymptotic Performance of MMSE Receivers for Large Systems Using Random Matrix Theory, IEEE Trans. Inform. Theory, vol. 53, No. 11, pp. 4173-4190, Nov. 2007.
R. Muller, D. Guo, and A. Moustakas, Vector Precoding for Wireless MIMO Systems and Its Replica Analysis, IEEE J. Sel. Areas Commun., vol. 26, No. 3, pp. 530-540, Apr. 2008.
S. K. Mohammed, A. Chockalingam, and B. Sundar Rajan, A Low-Complexity Precoder for Large Multiuser MISO Systems, Proc. IEEE Vehicular Technology Conference (VTC' 2008), Singapore, May 2008.
G. Taricco, Asymptotic Mutual Information Statistics of Separately-Correlated Rician Fading MIMO Channels, IEEE Trans. Inform. Theory, vol. 54, No. 8, pp. 3490-3504, Aug. 2008.
Y.-C. Liang, E.Y. Cheu, L. Bai and G. Pan, on the Relationship Between MMSE-SIC and BI-GDFE Receivers for Large Multiple-Input Multiple-Output Channels, IEEE Trans. Signal Processing, vol. 56, No. 8, pp. 3627-3637, Aug. 2008.
V. K. Nguyen and J. S. Evans, Multiuser Transmit Beamforming via Regularized Channel Inversion: A Large System Analysis, in Proc. IEEE Global Communications Conference, New Orleans, LO, US, Dec. 2008, pp. 1-4.
K. R. Kumar, G. Caire, and A. Moustakas, Asymptotic performance of linear receivers in MIMO fading channels, IEEE Trans. Inform. Theory, vol. 55, No. 10, pp. 4398-4418, Oct. 2009.
B. Cerato and E. Viterbo, Hardware implementation of low-complexity detector for large MIMO, in Proc. IEEE ISCAS'2009, pp. 593-596, Taipei, May 2009.
W. Hachem, O. Khorunzhiy, P. Loubaton, J. Najim, L. Pastur, A New Approach for Mutual Information Analysis of Large Dimensional Multi-Antenna Channels, IEEE Trans. Inform. Theory, vol. 54, No. 9, pp. 3987-4004, Sep. 2008.
T. Datta, N. Srinidhi, A. Chockalingam, and B. Sundar Rajan, A Hybrid RTS-BP Algorithm for Improved Detection of Large-MIMO M-QAM Signals, in Proc. IEEE National Conference on Communication, 2011.
G. Guthy, W. Utschick, and M.L. Honig, Large System Analysis of the Successive Encoding Successive Allocation Method for the MIMO BC, in Proc. of the International ITG Workshop on Smart Antennas, Bremen, Germany, Feb. 2010.
J. Dumont, W. Hachem, S. Lasaulce, P. Loubaton, J. Najim, On the Capacity Achieving Transmit Covariance Matrices for MIMO Rician Channels: An Asymptotic Approach, IEEE Trans. Inform. Theory, vol. 56, No. 3, pp. 1048-1069, Mar. 2010.
A. Chockalingam, Low-Complexity Algorithms for Large-MIMO Detection, in Proc. Communications, Control and Signal Processing (ISCCSP), 2010.
E. Riegler and G. Taricco, Asymptotic Statistics of the Mutual Information for Spatially Correlated Rician Fading MIMO Channels with Interference, IEEE Trans. Inform. Theory, vol. 56, No. 4, pp. 1542-1559, Apr. 2010.

(56) References Cited

OTHER PUBLICATIONS

P. Li and R. D. Murch, Multiple Output Selection-LAS Algorithm in Large MIMO Systems, IEEE Commun. Lett., vol. 14, No. 5, pp. 399-401, May 2010.

H. Huh, S.-H. Moon, Y.-T. Kim, I. Lee, and G. Caire, Multi-cell MIMO Downlink with Cell Cooperation and Fair Scheduling: A Large-System Limit Analysis, IEEE Trans. Inform. Theory, vol. 57, No. 12, pp. 7771-7786, Dec. 2011.

C. Guthy, W. Utschick, and M.L. Honig, Large System Analysis of Projection Based Algorithms for the MIMO Broadcast Channel, in Proc. of the IEEE Int'l Symp. Inform. Theory, Austin, U.S.A., Jun. 2010.

F. Dupuy, P. Loubaton, On the Capacity Achieving Covariance Matrix for Frequency Selective MIMO Channels Using the Asymptotic Approach, IEEE Trans. Inform. Theory, vol. 57, No. 9, pp. 5737-5753, Sep. 2011.

C. K. Wen, K. K. Wong, and J. C. Chen, Asymptotic Mutual Information for Rician MIMO-MA Channels with Arbitrary Inputs: A Replica Analysis, IEEE Trans. Commun., vol. 58, No. 10, pp. 2782-2788, Oct. 2010.

T. L. Marzetta, Noncooperative Cellular Wireless with Unlimited Numbers of Base Station Antennas, IEEE Trans. Wireless Communications, vol. 9, No. 11, pp. 3590-3600, Nov. 2010.

T. Datta, N. Srinidhi, A. Chockalingam, and B. S. Rajan, Random-Restart Reactive Tabu Search Algorithm for Detection in Large-MIMO Systems, IEEE Commun. Letters, vol. 14, No. 12, pp. 1107-1109, Dec. 2010.

H. C. Papadopoulos, G. Caire, and S. A. Ramprashad, Achieving Large Spectral Efficiencies from MU-MIMO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010.

Notice of Allowance from counterpart Australian Patent Application No. 2011323559, dated May 13, 2016, 2 pages.

First Exam Report from counterpart New Zealand Patent Application No. 717370, dated Apr. 8, 2016, 2 pages.

Office Action from U.S. Appl. No. 12/802,989, dated Mar. 30, 2016, 36 pages.

Examiner's Report from counterpart Canadian Patent Application No. 28656772 dated Jan. 7, 2016, 3 pages.

Extended Exam Report from counterpart European Patent Application No. 13 843 203.4, dated Feb. 15, 2016, 8 pages.

Notice of Allowance from foreign counterpart Canadian Patent Application No. 2,659,572, dated Jun. 7, 2016, 1 page.

Examiner's Report from counterpart Australian Patent Application No. 2013256044 dated May 9, 2016, 2 pages.

Final Office Action from U.S. Appl. No. 14/611,565, dated Jun. 16, 2016, 22 pages.

Office Action from U.S. Appl. No. 13/232,996, dated Jun. 20, 2016, 30 pages.

Office Action from U.S. Appl. No. 12/802,975, dated Jul. 1, 2016, 21 pages.

Third Office Action from counterpart Mexican Patent Application No. dated Jul. 27, 2016, 6 pages.

First Office Action from counterpart Taiwan Patent Application No. 102117728 dated Aug. 9, 2016, 11 pages.

Lytro, Lytro Support, What are the specs on the First Generation Lytro Light Field Camera?, 2 pages, Jan. 27, 2016. [https://support.lytro.com/hc/en-us/articles/200863400-What-are-the-spec. . . ] [reprinted on Dec. 13, 2016].

S. A. Jafar and A. Goldsmith, "Transmitter optimization and optimality of beamforming for multiple antenna systems," IEEE Trans. Wireless Comm., vol. 3, No. 4, 1165-1175, Jul. 2004.

J. Wannstrom, "Carrier aggregation explained", [http://www.3gpp.org/technonolgies/keywords-acronyms/101-carrier-aggre. . . ], 6 pages, dated Jun. 2013, printed on Jun. 13, 2015.

Nicta, "InterfereX", 3 pages, http://www.interfereX.com, Jun. 22, 2015.

E. Dahlman, S. Parkvall and J. Skold, "4G: LTE/LTE-Advanced for mobile broadband", Elsevier, 2011, 21 pages.

J. Xu, "LTE-Advanced signal generation and measurements using SystemVue", Agilent Technologies, 46 pages, Dec. 23, 2010.

J. G. Andrews, "Seven ways that HetNet are a cellular paradigm shift", pp. 136-144, IEEE Communications Magazine, Mar. 2013.

Ericsson, "The evolution of EDGE" White Paper, [http://www.ericsson.com/res/docs/whitepapers/evolution_to_edge.pdf], 18 pages, Feb. 2007.

C. Eklund, et al., IEEE Standard 802.16: "A Technical Overview of the WirelessMAN™ Air Interface for Broadband Wireless Access", IEEE Communication Magazine, pp. i, ii, 98-107, Jun. 4, 2002.

The White House, Office of the Press Secretary, "Presidential Memorandum: Unleashing the Wireless Broadband Revolution", Jun. 28, 2010, 3 pages, [http://www.whitehouse.gov/the-press-office/presidential-memorandum-unleashing-wireles. . . ].

Dr. Apurva N. Mody, IEEE 802.22, "IEEE 802.22 Working Group on Wireless Regional Area Networks (WRANs)", [http://www.ieee802.org/22/HomePageText.htm], 1 page, Aug. 14, 2014.

3GPP: "3rd Generation Partnership Project; Technical Specification Group Radio Access Network; Coordinated multi-point operation for LTE physical layer aspects (Release 11)", (Dec. 20, 2011), 69 pages.

A. Pitarokoilis, S. K. Mohammed, and E. G. Larsson, Effect of Oscillator Phase Noise on Uplink Performance of Large MU-MIMO Systems, in Proc. of the 50th Annual Allerton Conference on Communication, Control, and Computing, 2012.

Abandonment from U.S. Appl. No. 13/475,598 dated Feb. 8, 2016, 1 pages.

Advisory Action for U.S. Appl. No. 10/758,475 dated Oct. 1, 2008, 3 pages.

Advisory Action for U.S. Appl. No. 12/802,989 dated May 4, 2017, 3 pages.

Aggarwal R., et al., "On the Design of Large Scale Wireless Systems," IEEE Journal of Selected Areas Communications, 2012, vol. 31 (2), pp. 1-50.

Alrabadi O.N., et al., "Beamforming via Large and Dense Antenna Arrays above a Clutter," Institute of Electrical and Electronics Engineers Journal on Selected Areas in Communications, 2013, vol. 31 (2), pp. 314-325.

Andersen J.B., "Antenna Arrays in Mobile Communications: Gain, diversity, and Channel Capacity.1", IEEE Antennas and Propagation Magazine, vol. 42 (2), Apr. 2000, pp. 12-16.

Anderson A.L., et al., "Beamforming in large-scale MIMO Multiuser Links Under a Per-node Power Constraint," Proceedings in International Symposium on Wireless Communication Systems, 2012.

Araujo D. C., et al., "Channel Estimation for Millimeter-Wave Very-Large MIMO Systems," EUSPICO 2014, in proceedings.

Arnau J., et al., "Dissection of Multibeam Satellite Communications With a Large-scale Antenna System Toolbox," European Wireless 2014 (EW2014), pp. 548-553.

Artigue C., et al., "On the Precoder Design of Flat Fading MIMO Systems Equipped with MMSE Receivers: A Large System Approach", IEEE Trans. Inform. Theory, 2011, vol. 57 (7), pp. 4138-4155.

Bengtsson E.L., UE Antenna Properties and Their Influence on Massive MIMO System Performance, 2002, 5 pages.

Bjornson E, et al., Designing Multi-User MIMO for Energy Efficiency: When is Massive MIMO the Answer?, IEEE Wireless Communications and Networking Conference (WCNC), Istanbul, Turkey, Apr. 2014.

Bjornson E, et al., Massive MIMO and Small Cells: Improving Energy Efficiency by Optimal Soft-Cell Coordination, ICT, 2013, Wireless Communications Symposium, pp. 5442-5447.

Cetiner B.A., et al., "Multifunctional Reconfigurable MEMS Integrated Antennas for Adaptive MIMO Systems", Adaptive Antennas and MIMO Systems for Wireless Systems, IEEE Communications Magazine, vol. 42 (12), Dec. 2004, pp. 62-70.

Cetiner et al., "A Reconfigurable Spiral Antenna for Adaptive MIMO Systems", EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1,

(56) References Cited

OTHER PUBLICATIONS and Special Issue on: Advances in 3DTV: Theory and Practice, Call for Papers Hindawi Publishing Corporation, http://www.hindawi.com, pp. 1.
Chandrasekaran S., et al., "Near-Optimal Large-MIMO Detection Using Randomized MCMC and Randomized Search Algorithms," Proceeding in Institute of Electrical and Electronics Engineers International Conference on Communications, 2011.
Choi J., et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013.
Choi J., et al., "Noncoherent Trellis Coded Quantization: A Practical Limited Feedback Technique for Massive MIMO Systems," Nov. 8, 2013, pp. 1-14.
Communication pursuant to Article 94(3) EPC for European Application No. 10156954 dated Jan. 25, 2017, 5 pages.
Couillet R., et al., "A Deterministic Equivalent for the Analysis of Correlated MIMO Multiple Access Channels," IEEE Trans. Inform. Theory, 2011, vol. 57 (6), pp. 3493-3514.
Dai et al., "Reduced-complexity performance-lossless (quasi-)maximum-likelihood detectors for S-QAM modulated MIMO systems," Electronics Letters, 2013, vol. 49(11), pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17(5), pp. 916-919.
Datta T., et al., "A Novel MCMC Based Receiver for Large-Scale Uplink Multiuser MIMO Systems" Jan. 2012, 37 pages.
Decision of Grant a Patent for Japanese Application No. 2016120928 dated Apr. 10, 2017, 6 pages.
Decision of Grant from foreign counterpart Russian Patent Application No. 2014151216 dated Jan. 31, 2017, 18 pages.
Decision of Refusal from foreign counterpart Japanese Patent Application No. 2014530763 dated Dec. 19, 2016, 6 pages.
Decision of Rejection office action for Japan Patent Application No. 2008-513486 dated Jul. 19, 2011, 2 pages.
Demirodoeven N., et al., "Hybrid Cars Now, Fuel Cell Cars Later", Aug. 13, 2004, vol. 305 Science, pp. 974-976, www.sciencemag.org.
Derrick W K et al., "Energy-Efficient Resource Allocation in OFDMA Systems with Large Numbers of Base Station Antennas", 2011, 30 pages.
Devillers B., et al. Mutual coupling effects in multiuser massive MIMO base stations, IEEE Antennas and Propagation Society International Symposium (APSURSI), Jul. 2012.
Dicke R.H., "Scatter-Hole Cameras for X-Rays and Gamma Rays," Astrophysical Journal, 1968, vol. 153, pp. L101-L106.
Dighe et al., "Analysis of Transmit-Receive Diversity in Rayleigh Fading", IEEE Transactions on Communications, vol. 51 (4), Apr. 2003, pp. 694-703.
Discussion Draft, A bill, 112th congress, 1st session, Jul. 12, 2011, House Republicans, Spectrum Innovation Act of 2011, 2011, 55 pages.
ETSI Reconfigurable Radio Systems: Status and Future Directions on Software Defined Radio and Cognitive Radio Standards, IEEE Communications Magazine, IEEE Service Center, Sep. 2010, vol. 48 (9), pp. 78-86.
European Search Report for Application No. EP05254757 dated Sep. 13, 2005, 9 pages.
Examination Report from foreign counterpart Australian Patent Application No. 2016219662 dated Sep. 9, 2016, 2 pages.
Examination Report from foreign counterpart New Zealand Patent Application No. 622137 dated Dec. 21, 2016, 3 pages.
Examination Report No. 1 from Foreign Counterpart Patent Application No. 2012308632 dated Oct. 11, 2016, 3 pages.
Examiner's Report for Canadian Patent Application No. 2539333 dated Dec. 4, 2012, 15 pages.
Extended European Search Report from EP Application No. 10156950.7 dated Jun. 11, 2012, 10 pages.
Extended European Search Report from EP Application No. 10184659.0 dated Nov. 29, 2012, 8 pages.
Extended European Search Report from EP Application No. 13856705.2 dated Mar. 2, 2016, 10 pages.
Extended European Search Report from European Patent Application No. 14779084.4 dated Sep 29, 2016, 8 pages.
F. Dupuy, et al., On the Capacity Achieving Covariance Matrix for Frequency Selective MIMO Channels Using the Asymptotic Approach, IEEE Trans. Inform. Theory, 2010, pp. 2153-2157.
F. Rusek, et al., "Scaling up MIMO: Opportunities and Challenges with Very Large Arrays", IEEE Signal Proces. Mag., 2012, vol. 30 (1), pp. 1-30.
Fenimore E.E., "Coded Aperture Imaging: Predicted Performance of Uniformly Redundant Arrays," Applied Optics, 1978, vol. 17 (22), pp. 3562-3570.
Fenimore E.E., et al., "Coded Aperture Imaging: The Modulation Transfer Function for Uniformly Redundant Arrays," Applied Optics, 1980, vol. 19(14), pp. 2465-2471.
Fenimore E.E., et al., "Coded Aperture Imaging with Uniformly Redundant Arrays," Applied Optics, 1978, vol. 17(3), pp. 337-347.
Fenimore E.E., et al., "Comparison of Fresnel Zone Plates and Uniformly Redundant Arrays," SPIE, Applications of Digital Image Processing, 1978, vol. 149, pp. 232-236.
Fenimore E.E., et al., "Fast Delta Hadamard Transform," Applied Optics, 1981, vol. 20(17), pp. 3058-3067.
Fenimore E.E., et al., "Tomographical Imaging Using Uniformly Redundant Arrays," Applied Optics, 1979, vol. 18(7), pp. 1052-1057.
Fenimore E.E., et al., "Uniformly Redundant Array Imaging of Laser Driven Compressions: Preliminary Results," Applied Optics, 1979, vol. 18(7), pp. 945-947.
Fenimore E.E., et al., "Uniformly Redundant Arrays: Digital Reconstruction Methods," Applied Optics, 1981, vol. 20(10), pp. 1858-1864.
Fenimore E.E., et al., "Uniformly Redundant Arrays," Digital Signal Processing Symposium, 1977, pp. 1-14.
Fenimore E.E., "Large Symmetric π Transformations for Hadamard Transforms," Applied Optics, 1983, vol. 22(6), pp. 826-829.
Fenimore E.E., "Time-Resolved and Energy-Resolved Coded Aperture Images with URA Tagging," Applied Optics, 1987, vol. 26 (14), pp. 2760-2769.
Fenimore E.E., "X-Ray Imaging Using Uniformly Redundant Arrays," 1979, pp. 1-4.
Final Office Action for Japanese Application No. 2005223345 dated May 12, 2011, 9 Pages.
Final Office Action from U.S. Appl. No. 14/086,700 dated Oct. 14, 2016, 11 pages.
Final Office Action from U.S. Appl. No. 10/758,475 dated Jul. 8, 2008, 8 pages.
Final Office Action from U.S. Appl. No. 11/039,029 dated Dec. 15, 2006, 10 pages.
Final Office Action from U.S. Appl. No. 11/039,029 dated Mar. 3, 2009, 9 pages.
Final Office Action from U.S. Appl. No. 11/039,029 dated Nov. 6, 2007, 11 pages.
Final Office Action from U.S. Appl. No. 11/039,029 dated Nov. 6, 2008, 7 pages.
Final Office Action from U.S. Appl. No. 11/210,098 dated Aug. 21, 2008, 10 pages.
Final Office Action from U.S. Appl. No. 11/210,098 dated Jan. 13, 2009, 7 pages.
Final Office Action from U.S. Appl. No. 11/210,098 dated Jan. 29, 2007, 9 pages.
Final Office Action from U.S. Appl. No. 11/210,098 dated Mar. 31, 2008, 8 pages.
Final Office Action from U.S. Appl. No. 11/899,814 dated Jul. 29, 2008, 8 pages.
Final Office Action from U.S. Appl. No. 11/899,814 dated Mar. 3, 2009, 8 pages.
Final Office Action from U.S. Appl. No. 12/291,856 dated Sep. 15, 2011, 16 pages.
Final Office Action from U.S. Appl. No. 12/291,858 dated Sep. 15, 2011, 15 pages.

(56) References Cited

OTHER PUBLICATIONS

Final Office Action from U.S. Appl. No. 12/630,627 dated Apr. 2, 2013, 23 pages.
Final Office Action from U.S. Appl. No. 12/802,958 dated Apr. 29, 2016, 33 pages.
Final Office Action from U.S. Appl. No. 12/802,975 dated Dec. 14, 2015, 26 pages.
Final Office Action from U.S. Appl. No. 12/802,975 dated Dec. 22, 2016, 29 pages.
Final Office Action from U.S. Appl. No. 12/802,988 dated Feb. 8, 2017, 13 pages.
Final Office Action from U.S. Appl. No. 12/802,988 dated Oct. 21, 2014, 13 pages.
Final Office Action from U.S. Appl. No. 12/802,989 dated Jun. 12, 2014, 17 pages.
Final Office Action from U.S. Appl. No. 12/802,989 dated Nov. 2, 2016, 14 pages.
Final Office Action from U.S. Appl. No. 12/802,989 dated Nov. 27, 2012, 12 pages.
Final Office Action from U.S. Appl. No. 13/232,996 dated Apr. 11, 2017, 149 pages.
Final Office Action from U.S. Appl. No. 13/232,996 dated Oct. 23, 2014, 15 pages.
Final Office Action from U.S. Appl. No. 13/233,006 dated Oct. 12, 2016, 10 pages.
Final Office Action from U.S. Appl. No. 13/652,259 dated Aug. 4, 2016, 7 pages.
Final Office Action from U.S. Appl. No. 13/652,259 dated Oct. 28, 2014, 9 pages.
Final Office Action from U.S. Appl. No. 13/797,984 dated Sep. 29, 2016, 13 pages.
Final Office Action from U.S. Appl. No. 13/798,004 dated Oct. 22, 2014, 8 pages.
Final Office Action from U.S. Appl. No. 13/844,355 dated Dec. 15, 2016, 23 pages.
Final Office Action from U.S. Appl. No. 14/023,302 dated Mar. 2, 2015, 5 pages.
First Exam Report from counterpart New Zealand Application No. 701567 dated Feb. 3, 2016, 4 pages.
First Examination Report from counterpart Australian Patent Application No. 2014248533 dated Mar. 1, 2017, 5 pages.
First Office Action and Search report from foreign counterpart China Patent Application No. 201380026522.2 dated Mar. 27, 2017, 20 pages.
First office action for foreign counterpart China Patent Application No. 200680021909.9 dated Feb. 25, 2011, 4 pages.
First Office Action from counterpart China Patent Application No. 200880102933.4 dated Dec. 7, 2012, 20 pages.
First Office Action from European Patent Application No. 05254757.7 dated Dec. 3, 2012, 6 pages.
First Office Action from foreign counterpart Mexican Patent Application No. MXa2014013795 dated Nov. 1, 2016, 3 pages.
First Office Action dated Dec. 7, 2010, System and Method for Powering a Vehicle using Radio Frequency Signals and Feedback, U.S. Appl. No. 12/291,858, filed Nov. 14, 2008, pp. 1-12.
Forax RF-over-fiber Communications Systems, Syntonics, 2011, 2 pages, http://www.syntonicscorp.com/products/products-foraxRF.html.
Foreign counterpart Final Rejection for Korean Patent Application No. 10-2007-7028402 dated Nov. 15, 2012, 8 pages.
Foreign counterpart First Office Action for Russian Patent Application No. 2007148006/11(052608), dated Nov. 17, 2009, 7 pages.
Foreign counterpart Inquiry Japan Patent Application No. 2008-513486 dated Mar. 26, 2012, 2 pages.
Foreign counterpart Notice of Acceptance for Australia Patent Application No. 2006249578 dated Jan. 3, 2012, 3 pages.
Foreign counterpart Notice of Grant for China Patent Application No. 200680021909.9 dated Mar. 5, 2012, 3 pages.
Foreign counterpart Notice of Grant for Russian Patent Application No. 2007148006/11(052608), dated Mar. 17, 2010, 12 pages.

Fradella R.B., "Electric Highway Vehicles: A Way to Save Our Mobility, Air, Energy, and Fortunes" Technology Assessment of Future Intercity Passenger Transportation Systems, vol. 2, Mar. 1976, pp. iii, v, vi, title p., and XIX3-XIX-27.
Friends of CRC, SHARP (Stationary High Altitude Relay Platform), http://www.friendsofcrc.ca/Projects/SHARP.html, page created on Jun. 25, 1996 by Cynthia Boyko, pp. 1-5.
Friends of CRC, "The Friends of CRC Association", Home page, printed on May 14, 2008, 3 pages, http://www.friendsofcrc.ca/.
Further Examination Report from counterpart New Zealand Application No. 701567 dated Aug. 24, 2016, 6 pages.
Further Examination Report from counterpart New Zealand Application No. 701691 dated Sep. 26, 2016, 3 pages.
G. Caire, et al., "On the Achievable Throughput of a Multiantenna Gaussian Broadcast Channel," IEEE Trans. Info.Th., Jul. 23, 2001, vol. 49, pp. 1-46.
Gao X., et al., "Linear Pre-Coding Performance in Measured Very-Large MIMO Channels," IEEE Vehicular Technology,, 2011, pp. 1-5.
Glazunov A.A., et al., "Experimental Characterization of the Propagation Channel along a Very Large Virtual Array in a Reverberation Chamber", Progress in Electromagnetics Research B, 2014, vol. 59, pp. 205-217.
Gopalakrishnan B., et al., "An Analysis of Pilot Contamination on Multi-User MIMO Cellular Systems with Many Antennas," Proceedings in Signal Processing Advances in Wireless Communications, 2011.
Govindasamy S., et al., "Asymptotic Spectral Efficiency of the Uplink in Spatially Distributed Wireless Networks with Multi-Antenna Base Stations," IEEE Transactions on Communications, 2013, vol. 61(7), pp. 1-13.
Gunson J., et al., "Optimum Design of A Coded Mask X-Ray Telescope For Rocket Applications," Monthly Notices of the Royal Astronomical Society, 1976, vol. 177, pp. 485-497.
Guthy C., et al., "Large System Analysis of Sum Capacity in the Gaussian MIMO Broadcast Channel", IEEE J. Sel. Areas Commun., 2013, vol. 31 (2), pp. 149-159.
Hakkarainen A., et al., "Widely-Linear Beamforming and RF Impairment Suppression in Massive Antenna Arrays", Journal of Communications and Networks, 2013, vol. 15 (4), pp. 383-397.
Hendriks B., et al., "Through a Lens Sharply," IEEE Spectrum, 2004, pp. 32-36.
Hoeffert M., et al., "Climate Change and Energy, Overview", Encyclopedia of Energy, vol. 1, Copyright 2004, Elsevier, Article No. NRGY: 00396, 23 pages.
Hong M., et al., "Joint Base Station Clustering and Beamformer Design for Partial Coordinated Transmission in Heterogeneous Networks," IEEE Journal on Selected Areas in Communications, 2012, vol. 31 (2), pp. 1-20.
Hosseini K., et al., "Massive MIMO and Small Cells: How to Densify Heterogeneous Networks," Wireless Communications Symposium, IEEE ICC, 2013, pp. 5442-5447.
Hoydis J., et al., "Iterative Deterministic Equivalents for the Performance Analysis of Communication Systems," Dec. 18, 2011, pp. 1-43.
Huang Y., et al., "Joint Beamforming and Power Control in Coordinated Multicell: Max-Min Duality, Effective Network and Large System Transition," IEEE Transactions on Wireless Communications, 2013, pp. 1-14.
Huff G.H., et al., "A Novel Radiation Pattern and Frequency Reconfigurable Single Turn Square Spiral Microstrip Antenna", IEEE Microwave and Wireless Components Letters, vol. 13 (2), Feb. 2003, pp. 57-59.
Huh H., et al., Achieving "Massive MIMO" Spectral Efficiency with a Not-so-Large Number of Antennas. IEEE Transactions on Wireless Communications, 2012, vol. 11 (9), pp. 3226-3239.
International Preliminary Report on Patentability and the Written Opinion of the International Searching Authority PCT Application No. PCT/US2015/014511 dated Aug. 18, 2016, 5 pages.
International Preliminary Report on Patentability for Application No. PCT/US11/58663 dated May 7, 2013, 26 pages.
International Preliminary Report on Patentability for Application No. PCT/US2005/11033 dated Jun. 3, 2008, 7 pages.

(56) References Cited

OTHER PUBLICATIONS

International Preliminary Report on Patentability for Application No. PCT/US2006/14854 dated Mar. 17, 2009, 4 pages.
International Preliminary Report on Patentability for Application No. PCT/US2008/073780 dated Mar. 4, 2010, 10 pages.
International Preliminary Report on Patentability for Application No. PCT/US2013/039580 dated Nov. 4, 2014, 7 pages.
International Preliminary Report on Patentability for International Application No. PCT/US06/41009 dated Apr. 23, 2008, 4 pages.
International Preliminary Report on Patentability from Foreign Counterpart PCT Application No. PCT/US2013/041726 dated Nov. 18, 2014, 6 pages.
International Search Report and Written Opinion for Application No. PCT/US2008/073780 dated Nov. 19, 2008.
International Search Report and Written Opinion for Application No. PCT/US2009/063932 dated Jan. 7, 2010, 12 pages.
International Search Report and Written Opinion for Application No. PCT/US2009/063935 dated Feb. 3, 2010, 11 pages.
International Search Report and Written Opinion for Application No. PCT/US2012/054937 dated Apr. 2, 2013, 17 pages.
International Search Report and Written Opinion for Application No. PCT/US2014/025108 dated Sep. 19, 2014, 10 Pages.
International Search Report and Written opinion for International Application No. PCT/US2013/071749 dated Apr. 8, 2014, 9 pages.
International Search Report and Written opinion for International Application No. PCT/US2014/025102 dated Jul. 18, 2014, 11 pages.
International Search Report and Written opinion for International Application No. PCT/US2014/025123 dated Jul. 18, 2014, 11 pages.
International Search Report and Written Opinion for PCT Application No. PCT/US 11/58663 dated Mar. 29, 2012, 33 pages.
International Search Report and Written Opinion from foreign counterpart PCT Application No. PCT/US13/41726 dated Jul. 16, 2013, 7 pages.
International Search Report for Application No. PCT/US06/14854 dated May 8, 2008, 1 page.
International Search Report from International Application No. PCT/US2000/019613 dated Nov. 14, 2000, 1 page.
Jing J., et al. "A Downlink Max-SINR Precoding for Massive MIMO System," International Journal of Future Generation Communication and Networking, 2014, vol. 7 (3), pp. 107-116.
Joho D., et al., "Articles of the Electronic Information and Communication Society", vol. J87-C (5), May 2004, pp. 1-19.
Jose J., et al. "Pilot Contamination and Precoding in Multi-cell TDD Systems," IEEE Transactions on Wireless Communications, 2011, vol. 10 (8), pp. 2640-2651.
Judge P., "GreenTouch Shows Low Power Wireless," TechWeekEurope UK, [online], Feb. 1, 2011, Retrieved from the Internet:< URL: http://www.techweekeruope.co.uk/workspace/greentouch-showslow>, 3 pages.
Kamata H, et. al, "Effects of IQ Imbalance and an Effective Compensation Scheme in the MIMO-OFDM Communication System", Proceedings of the 2005 Institute of Electronics, Information and Communication General Conference, Mar. 7, 2005, B-5-90, pp. 539.
Kermoal J.P., et al., "A Stochastic MIMO Radio Channel Model With Experimental Validation," IEEE Journal on Selected Areas in Communications, 2002, vol. 20 (6), pp. 1211-1226.
Knievel C., et al., "On Particle Swarm Optimization for MIMO Channel Estimation", Article ID 614384, Journal of Electrical and Computer Engineering, 2012, vol. 2012, 10 pages.
Knievel C, Low Complexity Receiver for Large-MIMO Space Time Coded Systems, in Proc. IEEE VTC-Fall'2011, Sep. 2011.
Kouassi B. et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Kreith F., et al., "Efficiency of Advanced Ground Transportation Technologies", Journal of Energy Resources Technology, Copyright 2002 by ASME, Sep. 2002, vol. 124, pp. 173-179.
Krishnan N., et al., "Cellular Systems with Many Antennas: Large System Analysis under Pilot Contamination," in Proceedings of the 50th Annual Allerton Conference on Communication, Control, and Computing, 2012, pp. 1220-1224.
Kumagawa S., et al, "A Study of Introducing Distributed Transmit Power Control to Distributed Antenna System," 2011, 30 pages.
Lee C, Network Massive MIMO for Cell-Boundary Users: From a Precoding Normalization Perspective, IEEE Goblecom Workshops, 2012.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Lunghi T., et al., "Experimental Bit Commitment Based on Quantum Communication and Special Relativity," Physical review letters, 2013, vol. 111 (18), pp. 1-16.
Martinez A.O., et al., "Energy Detection Using Very Large Antenna Array Receivers", 48th Asilomar Conference on Signals, Systems, and Computers Proceedings, 2014, 5 pages.
Martinez A.O., et al "Very Large Aperture Massive MIMO: a Measurement Based Study", 2014, 6 pages.
Masouros C., et al., "Large-Scale MIMO Transmitters in Fixed Physical Spaces: The Effect of Transmit Correlation and Mutual Coupling", IEEE Trans. Commun., 2013, vol. 61 (7), pp. 2794-2804.
Matthaiou M., et al. "Sum Rate Analysis of ZF Receivers in Distributed MIMO Systems," IEEE Journal on Selected Areas in Communications, 2013, vol. 31 (2), pp. 180-191.
Matthaiou M., et al., "Sum Rate Analysis of ZF Receivers in Distributed MIMO Systems with Rayleigh/Lognormal Fading," 2012 IEEE International Conference on Communications, ICC 2012, Ottawa, Jun. 10-15 pp. 3857-3861.
MIT Media Lab, "Wireless Power—From Wirelessly Powered Car to Wirelessly Powered Fabrication", MAS 863, Final Project WebPage, 2002, pp. 1-5, http://www.media.mit.edu/physics/pedagogy/fab/fab_2002/personal_pages/akshay/mit.edu/index42.html.
Miyakawa H., et al., "A Method of Code Conversion for Digital Communication Channels with Intersymbol Interference," Transactions of the Institute of Engineers of Japan, vol. 52-A (6), 1969, pp. 272-273.
Mohammed S.K., et al., "Constant-Envelope Multi-User Precoding for Frequency-Selective Massive MIMO Systems," IEEE Wireless Communications Letters, 2013, vol. 2(5), pp. 1-10.
Mohammed S.K., et al., "Single-User Beamforming in Large-Scale MISO Systems with Per-Antenna Constant-Envelope Constraints," IEEE Transactions on Wireless Communications, 2012, vol. 2012, pp. 3992-4005.
Mohammed S.K., et al., "Per-Antenna Constant Envelope Precoding for Large Multi-User MIMO Systems," IEEE Transactions on Communications, 2012, vol. 61(3), pp. 1-24.
Molisch et al., "MIMO Systems with Antenna Selection", IEEE Microwave Magazine, vol. 5 (1), Mar. 2004, pp. 46-56.
Muharar R., et al., "Downlink Beamforming with Transmit-Side Channel Correlation: A Large System Analysis," in Proc. IEEE International Conference on Communications (ICC), Kyoto, Japan, Jun. 2011.
Muller R.R., et al., "Blind Pilot Decontamination," IEEE Journal of Selected Topics in Signal Processing on Signal Processing for Large-Scale MIMO Communications, 2013, submitted.
Nam J., et al., "Joint Spatial Division and Multiplexing: Realizing Massive MIMO Gains with Limited Channel State Information," in Proceedings Conference on Information Sciences and Systems, IEEE, 2012, 6 pages.
Ngo H.Q., et al., Energy and Spectral Efficiency of Very Large Multiuser MIMO Systems, IEEE Transactions on Communications, May 21, 2012, vol. 61 (4), pp. 1436-1449.
Ngo H.Q., et al., EVD-Based Channel Estimations for Multicell Multiuser MIMO with Very Large Antenna Arrays, IEEE International Conference on Acoustics, Speed and Signal Processing (ICASSP), Kyoto, Japan, Mar. 2012.

(56) References Cited

OTHER PUBLICATIONS

Ngo H.Q., et al., Massive MU-MIMO Downlink TDD Systems with Linear Precoding and Downlink Pilots, Proceedings in Allerton Conference on Communication, Control, and Computing, Urbana-Champaign, Illinois, Oct. 2013.
Ngo H.Q., et al., The multicell multiuser MIMO uplink with very large antenna arrays and a finite-dimensional channel, IEEE Transactions Communications, 2013, vol. 61 (6), pp. 2350-2361.
Ngo H.Q., et al., Uplink Performance Analysis of Multicell MU-MIMO Systems with ZF Receivers, 2012, pp. 1-32.
Nguyen S., et al., "Precoding for Multicell Massive MIMO Systems With Compressive Rank-Q Channel Approximation," 24th IEEE International Symposium, 2013, pp. 1227-1232.
Nguyen S., et al., "Compressive Sensing-Based Channel Estimation for Massive Multiuser MIMO Systems" in proceeding IEEE WCNC, 2013.
Non Final Office Action from U.S. Appl. No. 13/797,984 dated Feb. 28, 2017, 13 pages.
Non-Final Office Action from U.S. Appl. No. 10/758,475 dated Nov. 24, 2008, 8 pages.
Non-Final Office Action from U.S. Appl. No. 10/758,475 dated Oct. 16, 2007, 8 pages.
Non-Final Office Action from U.S. Appl. No. 10/902,978 dated Apr. 10, 2008, 8 pages.
Non-Final Office Action from U.S. Appl. No. 10/902,978 dated Nov. 6, 2007, 11 pages.
Non-Final Office Action from U.S. Appl. No. 11/039,029 dated Apr. 12, 2007, 5 pages.
Non-Final Office Action from U.S. Appl. No. 11/039,029 dated Aug. 14, 2009, 13 pages.
Non-Final Office Action from U.S. Appl. No. 11/039,029 dated Jun. 27, 2006, 9 pages.
Non-Final Office Action from U.S. Appl. No. 11/039,029 dated Mar. 17, 2008, 9 pages.
Non-Final Office Action from U.S. Appl. No. 11/136,946 dated Nov. 14, 2007, 9 pages.
Non-Final Office Action from U.S. Appl. No. 11/210,098 dated Jun. 22, 2006, 8 pages.
Non-Final Office Action from U.S. Appl. No. 11/210,098 dated Sep. 26, 2007, 8 pages.
Non-Final Office Action from U.S. Appl. No. 11/899,814 dated Aug. 17, 2009, 10 pages.
Non-Final Office Action from U.S. Appl. No. 11/899,814 dated Mar. 7, 2008, 13 pages.
Non-Final Office Action from U.S. Appl. No. 12/291,856 dated Dec. 7, 2010, 12 pages.
Non-Final Office Action from U.S. Appl. No. 12/291,858 dated Jun. 28, 2012, 5 pages.
Non-Final Office Action from U.S. Appl. No. 12/630,627 dated Aug. 22, 2012, 23 pages.
Non-Final Office Action from U.S. Appl. No. 12/637,643 dated Jun. 7, 2012, 25 pages.
Non-Final Office Action from U.S. Appl. No. 12/691,500 dated Aug. 23, 2010, 9 pages.
Non-Final Office Action from U.S. Appl. No. 12/802,958 dated Nov. 4, 2016, 19 pages.
Non-Final Office Action from U.S. Appl. No. 12/802,958 dated Nov. 21, 2012, 17 pages.
Non-Final Office Action from U.S. Appl. No. 12/802,975 dated Aug. 1, 2013, 27 pages.
Non-Final Office Action from U.S. Appl. No. 12/802,988 dated Apr. 17, 2012, 10 pages.
Non-Final Office Action from U.S. Appl. No. 12/802,988 dated Aug. 15, 2016, 19 pages.
Non-Final Office Action from U.S. Appl. No. 12/802,989 dated Jun. 14, 2012, 10 pages.
Non-Final Office Action from U.S. Appl. No. 13/226,461 dated Dec. 27, 2011, 10 pages.
Non-Final Office Action from U.S. Appl. No. 13/232,996 dated Mar. 21, 2014, 9 pages.
Non-Final Office Action from U.S. Appl. No. 13/233,006 dated Apr. 28, 2017, 10 pages.
Non-Final Office Action from U.S. Appl. No. 13/233,006 dated Apr. 1, 2016, 9 pages.
Non-Final Office Action from U.S. Appl. No. 13/475,598 dated Dec. 30, 2013, 16 pages.
Non-Final Office Action from U.S. Appl. No. 13/652,259 dated Apr. 10, 2014, 13 pages.
Non-Final Office Action from U.S. Appl. No. 13/652,259 dated Mar. 31, 2017, 7 pages.
Non-Final Office Action from U.S. Appl. No. 13/797,950 dated Jan. 11, 2017, 65 pages.
Non-Final Office Action from U.S. Appl. No. 13/797,971 dated Oct. 4, 2016, 56 pages.
Non-Final Office Action from U.S. Appl. No. 13/798,004 dated Mar. 26, 2014, 12 pages.
Non-Final Office Action from U.S. Appl. No. 13/798,004 dated Sep. 23, 2016, 11 pages.
Non-Final Office Action from U.S. Appl. No. 14/086,700 dated May 25, 2017, 12 pages.
Non-Final Office Action from U.S. Appl. No. 14/611,565 dated Mar. 14, 2017, 23 pages.
Non-Final Office Action from U.S. Appl. No. 14/672,014 dated Dec. 30, 2016, 7 pages.
Non-Final Office Action from U.S. Appl. No. 15/181,383 dated May 22, 2017, 48 pages.
Non-Final Office Action from U.S. Appl. No. 15/201,276 dated Mar. 1, 2017, 107 pages.
Notice of Acceptance from foreign counterpart Australian Patent Application No. 2013327697 dated Feb. 15, 2017, 4 pages.
Notice of Acceptance from foreign counterpart Australian Patent Application No. 20160219662 dated May 5, 2017, 3 pages.
Notice of Acceptance from foreign counterpart Australian Patent Application No. AU20140200745 dated Sep. 19, 2016, 3 page.
Notice of Allowance from U.S. Appl. No. 13/226,461 dated Jun. 12, 2012, 7 pages.
Notice of Allowance from U.S. Appl. No. 13/461,682 dated Oct. 2, 2014, 10 pages.
Notice of Allowance from U.S. Appl. No. 13/464,648 dated Apr. 24, 2015, 23 pages.
Notice of Allowance from U.S. Appl. No. 13/464,648 dated Aug. 25, 2015, 4 pages.
Notice of Allowance from U.S. Appl. No. 13/464,648 dated Feb. 23, 2016, 15 pages.
Notice of Allowance from U.S. Appl. No. 13/464,648 dated Jan. 9, 2015, 11 pages.
Notice of Allowance from U.S. Appl. No. 13/464,648 dated Nov. 30, 2015, 12 pages.
Notice of Allowance from U.S. Appl. No. 13/464,648 dated Sep. 19, 2014, 5 pages.
Notice of Allowance from U.S. Appl. No. 13/633,702 dated Aug. 15, 2014, 11 pages.
Notice of Allowance and Search Report from foreign counterpart Taiwan Patent Application No. 102134408 dated Feb. 17, 2017, 9 pages.
Notice of Allowance from U.S. Appl. No. 12/802,976, dated Mar. 14, 2011, 9 pages.
Notice of Allowance from U.S. Appl. No. 13/232,996 dated Oct. 12, 2016, 5 pages.
Notice of Allowance from U.S. Appl. No. 10/758,475 dated May 11, 2009, 4 pages.
Notice of Allowance from U.S. Appl. No. 10/902,978 dated Apr. 16, 2008, 7 pages.
Notice of Allowance from U.S. Appl. No. 10/902,978 dated Jun. 27, 2008, 7 pages.
Notice of Allowance from U.S. Appl. No. 11/039,029 dated Mar. 24, 2010, 5 pages.
Notice of Allowance from U.S. Appl. No. 11/136,946 dated Jul. 14, 2008, 7 pages.
Notice of Allowance from U.S. Appl. No. 11/210,098 dated Oct. 21, 2009, 8 pages.
Notice of Allowance from U.S. Appl. No. 11/210,098 dated on Oct. 21, 2009, 7 pages.

(56) References Cited

OTHER PUBLICATIONS

Notice of Allowance from U.S. Appl. No. 11/256,478 dated Jul. 30, 2009, 9 pages.
Notice of Allowance from U.S. Appl. No. 11/256,478 dated Oct. 29, 2009, 16 pages.
Notice of Allowance from U.S. Appl. No. 11/894,362 dated Mar. 23, 2009, 10 pages.
Notice of Allowance from U.S. Appl. No. 11/894,362 dated Nov. 10, 2009, 5 pages.
Notice of Allowance from U.S. Appl. No. 11/894,394 dated Jul. 30, 2009, 14 pages.
Notice of Allowance from U.S. Appl. No. 11/894,394 dated Mar. 6, 2009, 11 pages.
Notice of Allowance from U.S. Appl. No. 11/894,540 dated Nov. 9, 2009, 5 pages.
Notice of Allowance from U.S. Appl. No. 11/899,814 dated Mar. 23, 2010, 5 pages.
Notice of Allowance from U.S. Appl. No. 12/143,503 dated Apr. 11, 2011, 9 pages.
Notice of Allowance from U.S. Appl. No. 12/143,503 dated Dec. 9, 2011, 11 pages.
Notice of Allowance from U.S. Appl. No. 12/291,856 dated Jun. 28, 2012, 8 pages.
Notice of Allowance from U.S. Appl. No. 12/291,858 dated Feb. 25, 2013, pages.
Notice of Allowance from U.S. Appl. No. 12/291,858 dated Oct. 15, 2012, 8 pages.
Notice of Allowance from U.S. Appl. No. 12/630,627 dated Sep. 25, 2013, 11 pages.
Notice of Allowance from U.S. Appl. No. 12/691,500 dated Apr. 29, 2011, 7 pages.
Notice of Allowance from U.S. Appl. No. 12/691,500 dated Dec. 27, 2010, 5 pages.
Notice of Allowance from U.S. Appl. No. 12/802,938 dated Apr. 4, 2013, 16 pages.
Notice of Allowance from U.S. Appl No. 12/802,976 dated Aug. 22, 2011, 8 pages.
Notice of Allowance from U.S. Appl. No. 12/802,976 dated Dec. 9, 2011, 11 pages.
Notice of Allowance from U.S. Appl. No. 13/232,996 dated Oct. 26, 2016, 4 pages.
Notice of Allowance from U.S. Appl. No. 13/475,598 dated Feb. 14, 2017, 41 pages.
Notice of Allowance from U.S. Appl. No. 13/797,971 dated May 4, 2017, 8 pages.
Notice of Allowance from U.S. Appl. No. 14/023,302 dated Apr. 27, 2016, 3 pages.
Notice of Allowance dated May 17, 2016 for U.S. Appl. No. 14/023,302, filed Sep. 10, 2013, 5 pages.
Notice of Reasons for Rejection from foreign counterpart Japanese Patent Application No. 20150510498 dated Sep. 26, 2016, 21 pages.
Notice to File a Response from foreign counterpart Korea Patent Application No. 10-2007-7028402 dated Jul. 31, 2012, 13 pages.
Notification Concerning Transmittal of International Preliminary Report on Patentability and Written Opinion for Application No. PCT/US2009/063932 dated May 17, 2011, 8 pages.
Notification Concerning Transmittal of International Preliminary Report on Patentability and Written Opinion for Application No. PCT/US2009/063935 dated May 17, 2011, 8 pages.
Notification Concerning Transmittal of International Preliminary Report on Patentability (Chapter I of the Patent Cooperation Treaty) and Written Opinion of the International Searching Authority from Counterpart PCT Application No. PCT/US06/01111 dated Jul. 24, 2007, 8 pages.
Notification Concerning Transmittal of International Search Report and the Written Opinion for Application No. PCT/US2013/061493 dated Dec. 6, 2013, 9 pages.
Notification for Granting Patent Right from foreign counterpart China Patent Application No. 201180061132.X dated Apr. 6, 2017, 6 pages.
Notification of Reason for Rejection for counterpart Japan Patent Application No. 2007552179 dated Oct. 28, 2010, 2 pages.
Notification of Reason for Rejection office action from foreign counterpart for Japan Patent Application No. 2008-513486 dated Dec. 6, 2010, 2 pages.
Notification of Transmittal of International Search Report and Written opinion for Application No. PCT/US 06/41009 dated May 24, 2007, 6 Pages.
Notification of Transmittal of International Search Report and Written opinion for Application No. PCT/US05/11033 dated May 2, 2008, 10 pages.
Notification of Transmittal of International Search Report and Written opinion for Application No. PCT/US06/01111 dated Aug. 3, 2006, 13 pages.
Notification of Transmittal of International Search Report and Written opinion for Application No. PCT/US2014/025105 dated Jul. 14, 2014, 12 pages.
Notification of Transmittal of International Search Report and Written opinion for Application No. PCT/US2014/025109 Jul. 14, 2014, 6 pages.
Notification of Transmittal of the European Search Report for Application No. 10156954.9-2411 dated Sep. 2, 2010, 5 pages.
Notification of Transmittal of the International Search Report and the Written Opinion of the International Searching Authority, or the Declaration, PCT/US2013/039580 dated Aug. 20, 2013, 12 pages.
Notification on Grant of Patent Right for Invention from foreign counterpart China Patent Application No. 201210466082.X, dated Jan. 26, 2017, 3 pages.
Office Action and Search Report from foreign counterpart China Patent Application No. CN201380035543, dated Jan. 3, 2017, 22 pages.
Office Action and Search Report from foreign counterpart Russian Patent Application No. 2014148791/28(078479), dated Apr. 13, 2017, 14 pages.
Office Action for foreign counterpart China Patent Application No. 20051008867.1 dated Oct. 26, 2010, 4 pages.
Office Action for Korean Patent Application No. 20050070079 dated Jul. 29, 2011, 3 pages.
Office Action from Canada Patent Application No. 2514383 dated Jul. 26, 2012, 3 pages.
Office Action from counterpart Mexican Patent Application No. MX/a/2014/013377 dated Mar. 22, 2016, 20 pages.
Office Action from counterpart Taiwan Application No. 100139880 dated Jan. 26, 2017, 7 pages.
Office Action from foreign counterpart China Patent Application No. 200510088676 dated Jan. 25, 2011, 8 pages.
Office Action from foreign counterpart China Patent Application No. 200510088676.1 dated Feb. 5, 2010, 18 pages.
Office Action from foreign counterpart China Patent Application No. 200510088676.1 dated Mar. 20, 2009, 24 pages.
Office Action from foreign counterpart China Patent Application No. 201180061132.X dated Oct. 10, 2016, 11 pages.
Office Action from foreign counterpart for Japan Patent Application No. 2007-506302 dated Jan. 11, 2011, 5 pages.
Office Action from foreign counterpart Japanese Patent Application No. 2014-140413 dated Jun. 27, 2015, 6 pages. Translation attached.
Office Action from foreign counterpart Japanese Patent Application No. 20150162819, dated Oct. 3, 2016, 6 pages.
Office Action from foreign counterpart mailed for New Zealand Patent Application No. 610463 dated Jan. 22, 2014, 2 pages.
Office Action from foreign counterpart Mexican Patent Application No. MX/a/2015/002992, dated Nov. 8, 2016, 4 pages.
Office Action from foreign counterpart Russian Patent Application No. 2014151216, dated Sep. 30, 2016, 12 pages.
Office Action from foreign counterpart Russian Patent Application No. 2016144927, dated Dec. 21, 2016, 6 pages.
Office Action from Foreign Counterpart Taiwan Patent Application No. 094125985 dated Jan. 6, 2012, 7 pages.
Office Action from foreign counterpart Taiwan Patent Application No. 101133865, dated Oct. 28, 2016, 5 pages.
Office Action from foreign counterpart Taiwan Patent Application No. 102116145, dated Mar. 31, 2017, 7 pages.

(56) References Cited

OTHER PUBLICATIONS

Office Action from foreign counterpart Taiwan Patent Application No. 102117728, dated Nov. 29, 2016, 6 pages.
Office Action from U.S. Appl. No. 13/844,355 dated Jan. 8, 2015, 23 pages.
Office Action fromAustralian Patent Application No. 2004203336 Jun. 5, 2009, 2 pages.
Office Action with English translation for Japanese Patent Application No. 2012-057351 dated Mar. 10, 2014, 2 pages.
Office Action with English translation from Japanese Patent Application No. 2012-057351, dated Jul. 1, 2013, 6 pages.
Oman H, et al., "Eventful Developments in Energy Conversion", Conference Report, IEEE AESS Systems Magazine, Jan. 2002, pp. 34-40.
Optimized Markov Chain Monte Carlo for Signal Detection in MIMO Systems: An Analysis of the Stationary Distribution and Mixing Time, Signal Processing, vol. 62, No. 17, Sep. 2014.
Ozgur A., et al., "Spatial Degrees of Freedom of Large Distributed MIMO Systems and Wireless Ad Hoc Networks", Institute of Electrical and Electronics Engineers Journal on Selected Areas in Communications, 2013, vol. 31 (2), pp. 202-214.
Paul Carlisle "Coded Aperture Imaging," 1998, pp. 1-6, printed on Mar. 15, 2007 Internet: http://paulcarlisle.net/old/codedaperture.html.
Payami S., et al., Channel Measurements and Analysis for Very Large Array Systems At 2.6 GHz, in Proc. 6th European Conference on Antennas and Propagation, EuCAP 2012, Prague, Czech Republic, Mar. 26, 2012.
Ping-Heng., et al., "Compressive Sensing Based Channel Feedback Protocols for Spatially-Correlated Massive Antenna Arrays", in Proc. IEEE Wireless Communications and Networking Conference (WCNC 2012), Apr. 2012, pp. 492-497.
Pitarokoilis A. et al., "On the Optimality of Single-Carrier Transmission in Large-Scale Antenna Systems," IEEE Wireless Commun. Lett., vol. 1, No. 4, pp. 276-279, Aug. 2012.
Radio Frequency Identification Tag Application for Tracking Vehicle Refueling, Maintenance, and Theft, IBM Technical disclosure Bulletin, vol. 40 (3), Mar. 1997, p. 81/82.
Ravindran N., et al., "MIMO Broadcast Channels with Block Diagonalization and Finite Rate Feedback," IEEE, ICASSP Apr. 2007, pp. III-13-III-16.
Reconfigurable Radio Systems (RRS); Radio Base Station (RBS) Software Defined Radio (SDR) status implementations and costs aspects including future possibilities, Technical Report, ETSI, No. V1.1.1, 2009, pp. 24.
Rejection Decision from foreign counterpart Japan Patent Application No. JP2014264325, dated Oct. 3, 2016, 7 pages.
Renner E., "Pinhole Photography," 2000, pp. 1-5.
Restriction Requirement for U.S. Appl. No. 11/039,029 dated Apr. 12, 2006, 5 pages.
Samsung: "Discussion on open-loop CoMP schemes", 3GPP Draft; R1-093377 Open-Loop Comp, 3rd Generation Partnership Project (3GPP), Mobile Competence Centre; 650, Route Des Lucioles; F-06921 Sophia-Antipolis Cedex, France, No. Shenzhen. China, Aug. 19, 2009, Aug. 19, 2009, 4 pages.
Sasako M., et al., "Device for Detecting Abnormality on Wheel Tread of Railcar," Abstract, 1993, pp. 1.
Second Office Action and Search report from foreign counterpart China Patent Application No. 201280044869.5 dated Jan. 17, 2017, 19 pages.
Second office action from foreign counterpart China Patent Application No. 200680021909.9 dated Sep. 5, 2011, 4 pages.
Shepard C., Argos: Practical Many-Antenna Base Stations, in Proc. ACM Int. Conf. Mobile Computing and Networking (MobiCom), Aug. 2012.
Shepard C., ArgosV2: A Flexible Many-Antenna Research Platform, Extended Abstract for demonstration in Proc. ACM Int. Conf. Mobile Computing and Networking (MobiCom), Oct. 2013.

Simon, M, K., et al., "Digital Communication over Fading Channels" A Unified Approach to Performance Analysis, Wiley Series in Telecommunications and Signal Processing, 2000.
Srinidhi N., et al., "Layered Tabu Search Algorithm for Large-MIMO Detection and a Lower Bound on ML Performance", IEEE Trans. Commun, 2010, 5 pages.
Srinidhi N., et al., "Layered Tabu Search Algorithm for Large-MIMO Detection and a Lower Bound on ML Performance", IEEE Trans. Commun, vol. 59, No. 11, pp. 2955-2963, Nov. 2011.
Stanley M., "Mobile Data Wave: Who Dares to Invest, Wins," Jun. 13, 2012, 23 pages.
Studer C., et al., "PAR-Aware Large-Scale Multi-User MIMO-OFDM Downlink", IEEE J. Sel. Areas Commun., Sep. 4, 2012, vol. 31 (2), pp. 303-313.
Supplementary EP Search Report for Application No. EP08798313 dated Nov. 14, 2012, 10 pages.
Supplementary European Search Report for Application No. EP05733294 dated Apr. 5, 2012, 4 pages.
Supplementary European Search Report for Application No. EP06750805 dated Dec. 1, 2016, 12 pages.
Supplementary Partial European Search Report for Application No. EP11838640.8, dated Mar. 2, 2017, 13 pages.
Supplementary Partial European Search Report for Application No. EP14770916, dated Oct. 21, 2016, 6 pages.
Suraweera H.A., et al., Multi-Pair Amplify-and-Forward Relaying with Very Large Antenna Arrays, Proceedings in IEEE International Conference on Communications (ICC), Budapest, Hungary, Jun. 2013.
Suthisopapan P., et al., "Near Capacity Approaching Capacity of Large MIMO Systems by Non-Binary LDPC Codes and MMSE Detection", in Proc. of the IEEE International Symposium on Information Theory, 2012.
Suzuki H., et al., Highly Spectrally Efficient Ngara Rural Wireless Broadband Access Demonstrator, Proceedings in IEEE International Symposium on Communications and Information Technologies (ISCIT), Oct. 2012.
Suzuki H., et al., Large-scale multiple antenna fixed wireless systems for rural areas, Proceedings in IEEE PIMRC, Sep. 2012.
Svac P., et al., Soft-Heuristic Detectors for Large MIMO Systems, IEEE Trans. Signal Processing, 2013, vol. 61 (18), pp. 4573-4586.
Svantesson T., et al., "Analysis of Electromagnetic Field Polarizations in Multiantenna Systems", IEEE Transactions on Wireless Communications, vol. 3 (2), Mar. 2004, pp. 641-646.
T. L. Narasimhan and A. Chockalingam, M-ary Detection and q-ary Decoding in Large-Scale MIMO: A Non-Binary Belief Propagation Approach, Oct. 16, 2013, 7 pages.
T. Yoo, N. Jindal, and A. Goldsmith, "Multi-antenna broadcast channels with limited feedback and user selection," Draft Version, 36 pages, dated Jun. 8, 2006 of IEEE Journal on Sel. Areas in Communications, vol. 25, pp. 1478-1491, Jul. 2007.
Takeuchi K., et al. "On an Achievable Rate of Large Rayleigh Block-Fading MIMO Channels with No CSI," IEEE Transactions on Information Theory, 2011.
Taluja P. S., et al., Diversity Limits of Compact BroadbandMulti-Antenna Systems, IEEE J. Sel. Areas Commun, 2013, vol. 31 (2), pp. 326-337.
Tanaka T., et al., "Power Supply System of Electric Automobile Electric Automobile used for its System and the Same Power Supply Device," Patent Abstract, 2005, pp. 1.
Tanumay Datta., et al., "A Novel Monte-Carlo-Sampling-Based Receiver for Large-Scale Uplink Multiuser MIMO Systems," IEEE Transactions on Vehicular Technology, 2013, vol. 62(7), pp. 3019-3038.
Teletar I.E., "Capacity of Multi-antenna Gaussian Channels", European Transactions on Telecommunications, vol. 10, Nov. 1999, pp. 1-28.
Tran L.N., et al. "A Conic Quadratic Programming Approach to Physical Layer Multicasting for Large-Scale Antenna Arrays," IEEE Signal Processing Letters, 2014, vol. 21 (1), pp. 114-117.
Truong K.T., et al. "Effects of Channel Aging in Massive MIMO Systems," Journal of Communications and Networks, Special Issue on Massive MIMO, 2013, vol. 15 (4), pp. 338-351.

(56) References Cited

OTHER PUBLICATIONS

Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.
Tsakalaki E. P., et al., On the Beamforming Performance of Large-Scale Antenna Arrays , Proc. Loughborough Antennas and Propagation Conference (LAPC), Nov. 2012.
Tse et al., "Performance Tradeoffs between Maximum Ratio Transmission and Switched-Transmit Diversity", in Proc. 11.sup.th IEEE International Symposium on Personal, Indoor and Mobile Radio Communication, vol. 2, Sep. 2000, pp. 1485-1489.
U.S. Appl. No. 12/802,976, filed Jun. 16, 2010.
Vallet P., et al., Improved Subspace Estimation for Multivariate Observations of High Dimension: The Deterministic Signals Case, IEEE Trans. Inform. Theory, 2012, vol. 58 (2), pp. 1043-1068.
Vieira J., et al., "A flexible 100-antenna testbed for Massive MIMO," in Proc IEEE Globecom 2014 Workshop—Massive MIMO: From Theory to Practice, Austin, Texas, USA, Dec. 2014, pp. 287-293.
Visotsky E., et al., "Space-Time Transmit Precoding with Imperfect Feedback," IEEE Transactions on Information Theory, 2001, vol. 47, pp. 2632-2639.
Wagner et al., "Large System Analysis of Linear Precoding in MISO Broadcast Channels with Limited Feedback," IEEE Transactions on Information Theory, 2012, vol. 58(7), pp. 4509-4537.
Wampfler, Inc., Home page, Wampfler, Inc., KY, USA—Wampfler Group, 1 page, printed on Apr. 17, 2006, http://www.wampfler.us/.
Wang Z., et al., "Enhanced downlink MU-Comp schemes for TD-LTE-Advanced," Wireless Communications and Networking Conference (WCNC), IEEE, 2010, 6 pages.
Wang Z., Performance of uplink multiuser massive MIMO system, International Conference on Acoustics Speech, and Signal Processing, Florence, Italy, 2014.
Weedon W.H., et al., "MEMS—switched reconfigurable antennas", IEEE Antennas and Propagation Society, AP-S International Symposium (Digest), vol. 3, 2001, pp. 654-657.
Well-to-Wheels Analysis of Advanced Fuel/Vehicle Systems—A North American Study of Energy Use, Greenhouse Gas Emission, and Criteria Pollutant Emissions, May 2005, 238 pages.
Wen C K., et al., "On the Sum-Rate of Multiuser MIMO Uplink Channels with Jointly-Correlated Rician fading", IEEE Trans. Commun., 2011, vol. 59 (10), pp. 2883-2895.
Wenger J., et al., "The Intelligent Highway: A Smart Idea?", Strategy+ Business, Booz & Co., Feb. 26, 2008, http://www.strategy-business.com/media/file/leading.ideas-20080226.pdf, pp. 5 total.
Wennestrom et al., "An Antenna Solution for MIMO Channels: The Switched Parasitic Antenna", IEEE International Symposium on Personal, Indoor and Mobile Radio Communications, PIMRC, vol. 1, 2001, pp. 159-163.
Wi-Fi alliance, "Wi-Fi certified makes it Wi-Fi: What Retailers and Consumers Need to Know" pp. 1-8, Sep. 2009, Retrieved from the Internet:< URL: http://www.wi-fi.org/files/WFA_Certification_Overview_WP_en.pdf>.
Wikipedia, "List of ad hoc routing protocols", printed on Mar. 8, 2011, 1 page, http://en.wikipedia.org/wiki/List_of_ad-hoc_routing_protocols.
Wikipedia., "Mobile ad hoc network," 2011, pp. 1-3, https://en.wikipedia.org/wiki/Mobile_ad_hoc_network.
Written Opinion for Application No. PCT/US06/14854 dated May 8, 2008, 3 pages.
Wu M., et al., "Approximate Matrix Inversion for High-Throughput Data Detection in the Large-scale MIMO Uplink," IEEE International Symposium on Circuits and Systems (ISCAS), May 2013, pp. 2155-2158.
Yang W., et al., "On thae Capacity of Large-MIMO Block-Fading Channels," IEEE Journal on Selected Areas in Communications, Sep. 30, 2012, vol. 31(2), pp. 1-16.
Yin B., et al., "Implementation trade-offs for linear detection in large-scale MIMO systems," Proceeding Institute of Electrical and Electronics Engineers International Conference on Acoustics Speech, and Signal Processing, 2013, 5 pages.
Yin B., et al., "Full-Duplex in Large-Scale Wireless System," Proceeding of the Asilomar Conference on Signals, Systems and Computers, 2013, 5 pages.
Yin H., et al., A Coordinated Approach to Channel Estimation in Large-scale Multiple-antenna Systems, IEEE Journal on Selected Areas in Communications, Sep. 2, 2012, vol. 31 (2), pp. 1-10.
Yoo., "Multi-Antenna Downlink Channels with Limited Feedback and User Selection," IEEE Journal On Selected Areas In Communications, Sep. 2007, vol. 25 (7), pp. 1478-1491.
Zaidel B., et al., "Vector Precoding for Gaussian MIMO Broadcast Channels: Impact of Replica Symmetry Breaking", Institute of Electrical and Electronics Engineers Transactions on Information Theory, 2012, vol. 58 (3), pp. 1413-1440.
Zakhour R., et al., "Min-Max Fair Coordinated Beamforming via Large Systems Analysis,", in Proc. of the IEEE International Symposium on Information Theory, St. Petersburg, Jul. 2011.
Zhang H., et al., "Cochannel Interference Mitigation and Cooperative Processing in Downlink Multicell Multiuser MIMO Networks," EURASIP Journal on Wireless Communications and Networking, vol. 2004 (2), 2004, pp. 222-235.
Zhang J., et al., "Hermitian Precoding for Distributed MIMO Systems with Individual Channel State Information," IEEE Journal on Selected Areas in Communications, 2013, vol. 31 (2), pp. 241-250.
Zhang J., et al. "On Capacity of Large-Scale MIMO Multiple Access Channels with Distributed Sets of Correlated Antennas," IEEE Journal on Selected Areas in Communications, Sep. 26, 2012, vol. 31 (2), pp. 1-52.
Zhang R., et al. Electromagnetic Lens-focusing Antenna Enabled Massive MIMO, Jun. 6, 2013, pp. 1-7.
Zhou Q., et al., "An Improved LR-aided K-Best Algorithm for MIMO Detection," in Proc. IEEE International Conference on Wireless Communications and Signal Processing (WCSP), 2012.
Zou R., et al., "Li Reducing the Complexity of Quasi-Maximum-Likelihood Detectors Through Companding for Coded MIMO Systems," IEEE Transactions on Vehicular Technology, 2012, vol. 2012, pp. 1109-1123.
First Examination Report from counterpart New Zealand Application No. 729017, dated Jun. 30, 2017, 3 pages.
Further Examination Report for foreign counterpart New Zealand Patent Application No. 717370, dated Aug. 3, 2017, 4 pages.
Notice of Acceptance from foreign counterpart Australian Patent Application No. 2014248533, dated Jun. 28, 2017, 4 pages.
Notice of Acceptance from Foreign Counterpart Patent Application No. 2012308632, dated Sep. 13, 2017, 4 pages.
Final Office Action from U.S. Appl. No. 13/797,950, dated Aug. 24, 2017, 74 pages.
Final Office Action from U.S. Appl. No. 13/798,004, dated Jun. 26, 2017, 15 pages.
Non-Final Office Action from U.S. Appl. No. 12/802,975, dated Sep. 14, 2017, 23 pages.
Non-Final Office Action from U.S. Appl. No. 12/802,988, dated Sep. 15, 2017, 11 pages.
Non-Final Office Action from U.S. Appl. No. 13/232,996, dated Sep. 21, 2017, 15 pages.
Non-Final Office Action from U.S. Appl. No. 13/844,355, dated Jun. 30, 2017, 159 pages.
Non-Final Office Action from U.S. Appl. No. 15/340,914, dated Jul. 21, 2017, 114 pages.
Notice of Allowance from U.S. Appl. No. 12/802,989, dated Jun. 27, 2017, 121 pages.

\* cited by examiner

N-antenna Base Station with Single-antenna Client Devices

3-Antenna Base Station with 3 Single-Antenna Client Devices

Antenna 1 Pilot Signal Transmission

Multiple-Input Distributed-Output (MIDO) Downstream Transmission

Cycling With Different Client Groups

Grouping Clients Based on Proximity

| Method | # of Symbols | Run Time (1,000 iterations) | Max Correct. Offset |
|---|---|---|---|
| Old | 14208 | 600s | ? |
| New ($N_t/M_t = 1$) | 288 | 60s | 1500Hz |
| New ($N_t/M_t = 4$ length $N_t$) | 1056 | 600s | 1500Hz |

*FIG. 50*

| Carrier frequency | Range (Ptx=100W) | Delay spread (indoor) | Delay spread (outdoor) | Max speed* | Min antenna spacing | Antenna size* |
|---|---|---|---|---|---|---|
| 50 MHz | 4 Km | <300 nsec | 1-10 usec | 57 mph | 6 meters | 3 meters |
| 400 MHz | 1.3 Km | <300 nsec | 1-10 usec | 7 mph | 0.8 meters | 0.4 meters |
| 700 MHz | 1 Km | <300 nsec | 1-10 usec | 4 mph | 0.4 meters | 0.2 meters |

\* maximum relative TX/RX speed assuming feedback loop delay (RTT base station-to-centralized processor over the Internet) of 10 msec \ minimum TX or RX antenna spacing to gain the benefit of spatial diversity in rich scattering environments (i.e., indoor or urban environments) is one wavelength \* assuming half-wavelength dipole for maximum antenna efficiency

*Fig. 68*

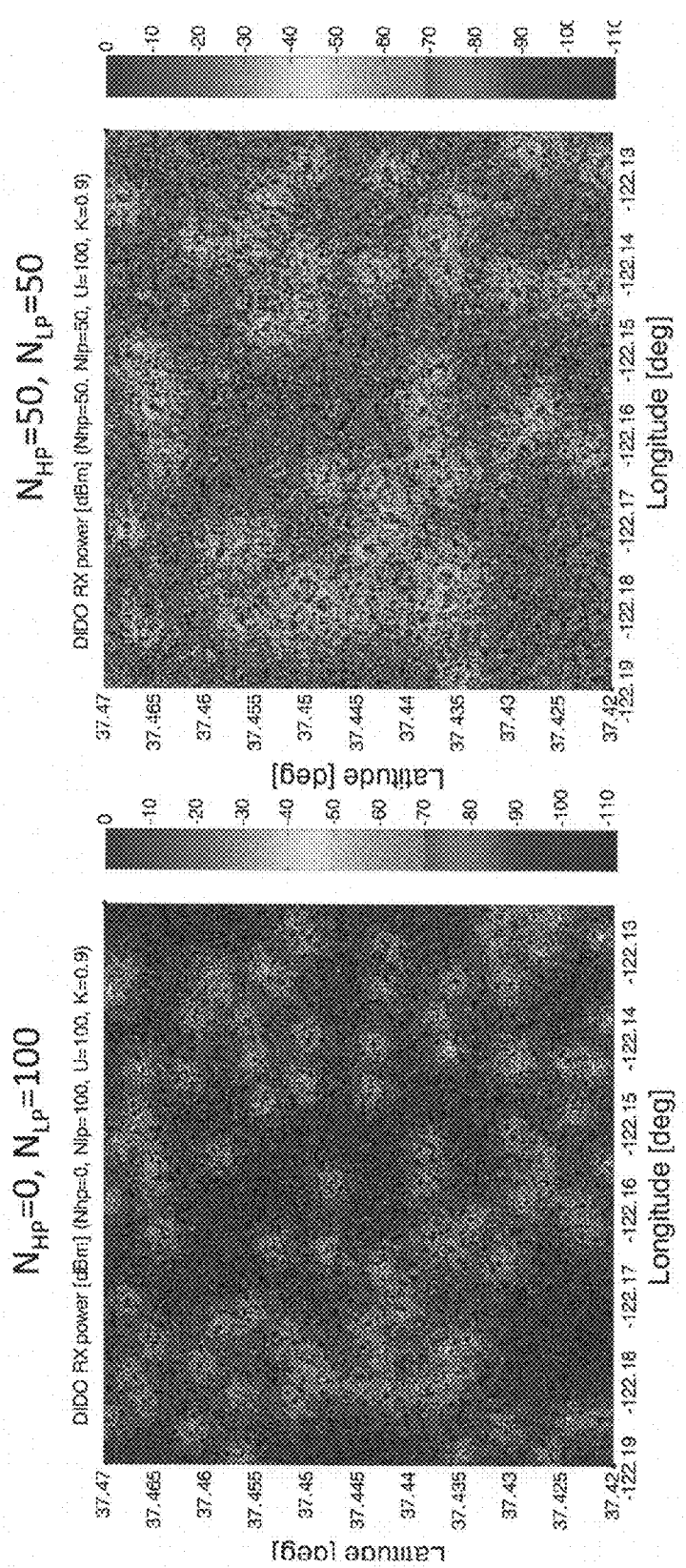

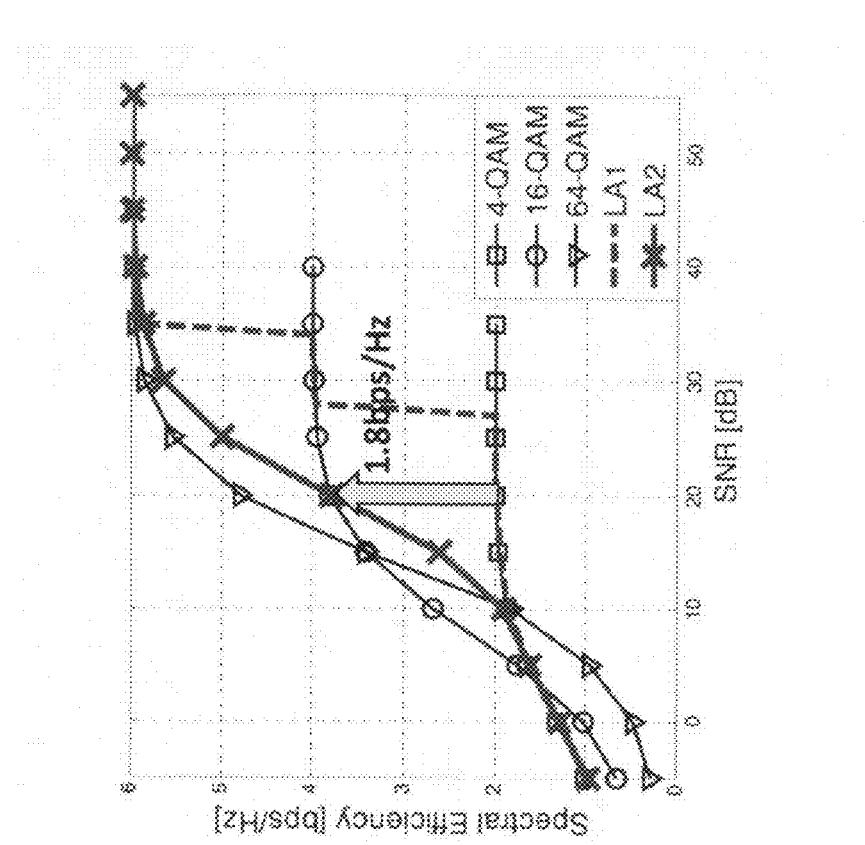
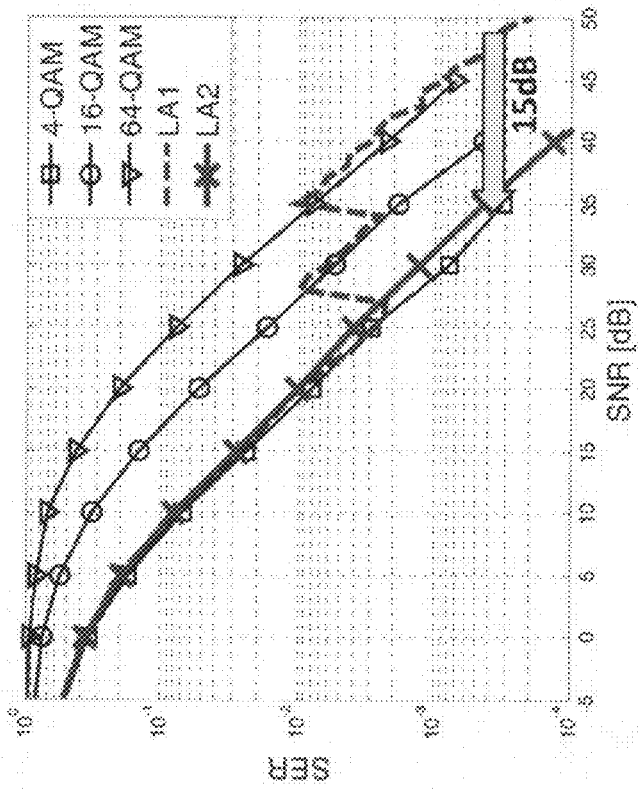
Fig. 108

SYSTEM AND METHOD FOR MANAGING INTER-CLUSTER HANDOFF OF CLIENTS WHICH TRAVERSE MULTIPLE DIDO CLUSTERS

RELATED APPLICATIONS

This application is a continuation-in-part of the following co-pending U.S. patent applications:

U.S. application Ser. No. 12/630,627, filed Dec. 3, 2009, entitled "System and Method For Distributed Antenna Wireless Communications"

U.S. application Ser. No. 12/143,503, filed Jun. 20, 2008 entitled "System and Method For Distributed Input-Distributed Output Wireless Communications";

U.S. application Ser. No. 11/894,394, filed Aug. 20, 2007 entitled, "System and Method for Distributed Input Distributed Output Wireless Communications";

U.S. application Ser. No. 11/894,362, filed Aug. 20, 2007 entitled, "System and method for Distributed Input-Distributed Wireless Communications";

U.S. application Ser. No. 11/894,540, filed Aug. 20, 2007 entitled "System and Method For Distributed Input-Distributed Output Wireless Communications"

U.S. application Ser. No. 11/256,478, filed Oct. 21, 2005 entitled "System and Method For Spatial-Multiplexed Tropospheric Scatter Communications";

U.S. application Ser. No. 10/817,731, filed Apr. 2, 2004 entitled "System and Method For Enhancing Near Vertical Incidence Skywave ("NVIS") Communication Using Space-Time Coding.

BACKGROUND

Prior art multi-user wireless systems may include only a single base station or several base stations.

A single WiFi base station (e.g., utilizing 2.4 GHz 802.11b, g or n protocols) attached to a broadband wired Internet connection in an area where there are no other WiFi access points (e.g. a WiFi access point attached to DSL within a rural home) is an example of a relatively simple multi-user wireless system that is a single base station that is shared by one or more users that are within its transmission range. If a user is in the same room as the wireless access point, the user will typically experience a high-speed link with few transmission disruptions (e.g. there may be packet loss from 2.4 GHz interferers, like microwave ovens, but not from spectrum sharing with other WiFi devices), If a user is a medium distance away or with a few obstructions in the path between the user and WiFi access point, the user will likely experience a medium-speed link. If a user is approaching the edge of the range of the WiFi access point, the user will likely experience a low-speed link, and may be subject to periodic drop-outs if changes to the channel result in the signal SNR dropping below usable levels. And, finally, if the user is beyond the range of the WiFi base station, the user will have no link at all.

When multiple users access the WiFi base station simultaneously, then the available data throughput is shared among them. Different users will typically place different throughput demands on a WiFi base station at a given time, but at times when the aggregate throughput demands exceed the available throughput from the WiFi base station to the users, then some or all users will receive less data throughput than they are seeking. In an extreme situation where a WiFi access point is shared among a very large number of users, throughput to each user can slow down to a crawl, and worse, data throughput to each user may arrive in short bursts separated by long periods of no data throughput at all, during which time other users are served. This "choppy" data delivery may impair certain applications, like media streaming.

Adding additional WiFi base stations in situations with a large number of users will only help up to a point. Within the 2.4 GHz ISM band in the U.S., there are 3 non-interfering channels that can be used for WiFi, and if 3 WiFi base stations in the same coverage area are configured to each use a different non-interfering channel, then the aggregate throughput of the coverage area among multiple users will be increased up to a factor of 3. But, beyond that, adding more WiFi base stations in the same coverage area will not increase aggregate throughput, since they will start sharing the same available spectrum among them, effectually utilizing time-division multiplexed access (TDMA) by "taking turns" using the spectrum. This situation is often seen in coverage areas with high population density, such as within multi-dwelling units. For example, a user in a large apartment building with a WiFi adapter may well experience very poor throughput due to dozens of other interfering WiFi networks (e.g. in other apartments) serving other users that are in the same coverage area, even if the user's access point is in the same room as the client device accessing the base station. Although the link quality is likely good in that situation, the user would be receiving interference from neighbor WiFi adapters operating in the same frequency band, reducing the effective throughput to the user.

Current multiuser wireless systems, including both unlicensed spectrum, such as WiFi, and licensed spectrum, suffer from several limitations. These include coverage area, downlink (DL) data rate and uplink (UL) data rate. Key goals of next generation wireless systems, such as WiMAX and LTE, are to improve coverage area and DL and UL data rate via multiple-input multiple-output (MIMO) technology. MIMO employs multiple antennas at transmit and receive sides of wireless links to improve link quality (resulting in wider coverage) or data rate (by creating multiple non-interfering spatial channels to every user). If enough data rate is available for every user (note, the terms "user" and "client" are used herein interchangeably), however, it may be desirable to exploit channel spatial diversity to create non-interfering channels to multiple users (rather than single user), according to multiuser MIMO (MU-MIMO) techniques. See, e.g., the following references:

G. Caire and S. Shamai, "On the achievable throughput of a multiantenna Gaussian broadcast channel," IEEE Trans. Info. Th., vol. 49, pp. 1691-1706, July 2003.

P. Viswanath and D. Tse, "Sum capacity of the vector Gaussian broadcast channel and uplink-downlink duality," IEEE Trans. Info. Th., vol. 49, pp. 1912-1921, August 2003.

S. Vishwanath, N. Jindal, and A. Goldsmith, "Duality, achievable rates, and sum-rate capacity of Gaussian MIMO broadcast channels," IEEE Trans. Info. Th., vol. 49, pp. 2658-2668, October 2003.

W. Yu and J. Cioffi, "Sum capacity of Gaussian vector broadcast channels," IEEE Trans. Info. Th., vol. 50, pp. 1875-1892, September 2004.

M. Costa, "Writing on dirty paper," IEEE Transactions on Information Theory, vol. 29, pp. 439-441, May 1983.

M. Bengtsson, "A pragmatic approach to multi-user spatial multiplexing," Proc. of Sensor Array and Multichannel Sign. Proc. Workshop, pp. 130-134, August 2002.

K.-K. Wong, R. D. Murch, and K. B. Letaief, "Performance enhancement of multiuser MIMO wireless communication systems," IEEE Trans. Comm., vol. 50, pp. 1960-1970, December 2002.

M. Sharif and B. Hassibi, "On the capacity of MIMO broadcast channel with partial side information," IEEE Trans. Info. Th., vol. 51, pp. 506-522, February 2005.

For example, in MIMO 4×4 systems (i.e., four transmit and four receive antennas), 10 MHz bandwidth, 16-QAM modulation and forward error correction (FEC) coding with rate ¾ (yielding spectral efficiency of 3 bps/Hz), the ideal peak data rate achievable at the physical layer for every user is 4×30 Mbps=120 Mbps, which is much higher than required to deliver high definition video content (which may only require ~10 Mbps). In MU-MIMO systems with four transmit antennas, four users and single antenna per user, in ideal scenarios (i.e., independent identically distributed, i.i.d., channels) downlink data rate may be shared across the four users and channel spatial diversity may be exploited to create four parallel 30 Mbps data links to the users. Different MU-MIMO schemes have been proposed as part of the LTE standard as described, for example, in 3GPP, "Multiple Input Multiple Output in UTRA", 3GPP TR 25.876 V7.0.0, March 2007; 3GPP, "Base Physical channels and modulation", TS 36.211, V8.7.0, May 2009; and 3GPP, "Multiplexing and channel coding", TS 36.212, V8.7.0, May 2009. However, these schemes can provide only up to 2× improvement in DL data rate with four transmit antennas. Practical implementations of MU-MIMO techniques in standard and proprietary cellular systems by companies like ArrayComm (see, e.g., ArrayComm, "Field-proven results", http://www.arraycomm.com/serve.php?page=proof) have yielded up to a ~3× increase (with four transmit antennas) in DL data rate via space division multiple access (SDMA). A key limitation of MU-MIMO schemes in cellular networks is lack of spatial diversity at the transmit side. Spatial diversity is a function of antenna spacing and multipath angular spread in the wireless links. In cellular systems employing MU-MIMO techniques, transmit antennas at a base station are typically clustered together and placed only one or two wavelengths apart due to limited real estate on antenna support structures (referred to herein as "towers," whether physically tall or not) and due to limitations on where towers may be located. Moreover, multipath angular spread is low since cell towers are typically placed high up (10 meters or more) above obstacles to yield wider coverage.

Other practical issues with cellular system deployment include excessive cost and limited availability of locations for cellular antenna locations (e.g. due to municipal restrictions on antenna placement, cost of real-estate, physical obstructions, etc.) and the cost and/or availability of network connectivity to the transmitters (referred to herein as "backhaul"). Further, cellular systems often have difficulty reaching clients located deeply in buildings due to losses from walls, ceilings, floors, furniture and other impediments.

Indeed, the entire concept of a cellular structure for wide-area network wireless presupposes a rather rigid placement of cellular towers, an alternation of frequencies between adjacent cells, and frequently sectorization, so as to avoid interference among transmitters (either base stations or users) that are using the same frequency. As a result, a given sector of a given cell ends up being a shared block of DL and UL spectrum among all of the users in the cell sector, which is then shared among these users primarily in only the time domain. For example, cellular systems based on Time Division Multiple Access (TDMA) and Code Division Multiple Access (CDMA) both share spectrum among users in the time domain. By overlaying such cellular systems with sectorization, perhaps a 2-3× spatial domain benefit can be achieved. And, then by overlaying such cellular systems with a MU-MIMO system, such as those described previously, perhaps another 2-3× space-time domain benefit can be achieved. But, given that the cells and sectors of the cellular system are typically in fixed locations, often dictated by where towers can be placed, even such limited benefits are difficult to exploit if user density (or data rate demands) at a given time does not match up well with tower/sector placement. A cellular smart phone user often experiences the consequence of this today where the user may be talking on the phone or downloading a web page without any trouble at all, and then after driving (or even walking) to a new location will suddenly see the voice quality drop or the web page slow to a crawl, or even lose the connection entirely. But, on a different day, the user may have the exact opposite occur in each location. What the user is probably experiencing, assuming the environmental conditions are the same, is the fact that user density (or data rate demands) is highly variable, but the available total spectrum (and thereby total data rate, using prior art techniques) to be shared among users at a given location is largely fixed.

Further, prior art cellular systems rely upon using different frequencies in different adjacent cells, typically 3 different frequencies. For a given amount of spectrum, this reduces the available data rate by 3×.

So, in summary, prior art cellular systems may lose perhaps 3× in spectrum utilization due to cellularization, and may improve spectrum utilization by perhaps 3× through sectorization and perhaps 3× more through MU-MIMO techniques, resulting in a net 3*3/3=3× potential spectrum utilization. Then, that bandwidth is typically divided up among users in the time domain, based upon what sector of what cell the users fall into at a given time. There are even further inefficiencies that result due to the fact that a given user's data rate demands are typically independent of the user's location, but the available data rate varies depending on the link quality between the user and the base station. For example, a user further from a cellular base station will typically have less available data rate than a user closer to a base station. Since the data rate is typically shared among all of the users in a given cellular sector, the result of this is that all users are impacted by high data rate demands from distant users with poor link quality (e.g. on the edge of a cell) since such users will still demand the same amount of data rate, yet they will be consuming more of the shared spectrum to get it.

Other proposed spectrum sharing systems, such as that used by WiFi (e.g., 802.11b, g, and n) and those proposed by the White Spaces Coalition, share spectrum very inefficiently since simultaneous transmissions by base stations within range of a user result in interference, and as such, the systems utilize collision avoidance and sharing protocols. These spectrum sharing protocols are within the time domain, and so, when there are a large number of interfering base stations and users, no matter how efficient each base station itself is in spectrum utilization, collectively the base stations are limited to time domain sharing of the spectrum among each other. Other prior art spectrum sharing systems similarly rely upon similar methods to mitigate interference among base stations (be they cellular base stations with antennas on towers or small scale base stations, such as WiFi Access Points (APs)). These methods include limiting transmission power from the base station so as to limit the range of interference, beamforming (via synthetic or physical means) to narrow the area of interference, time-domain multiplexing of spectrum and/or MU-MIMO techniques with multiple clustered antennas on the user device, the base station or both. And, in the case of advanced cellular networks in place or planned today, frequently many of these techniques are used at once.

But, what is apparent by the fact that even advanced cellular systems can achieve only about a 3× increase in spectrum utilization compared to a single user utilizing the spectrum is that all of these techniques have done little to increase the aggregate data rate among shared users for a given area of coverage. In particular, as a given coverage area scales in terms of users, it becomes increasingly difficult to scale the available data rate within a given amount of spectrum to keep pace with the growth of users. For example, with cellular systems, to increase the aggregate data rate within a given area, typically the cells are subdivided into smaller cells (often called nano-cells or femto-cells). Such small cells can become extremely expensive given the limitations on where towers can be placed, and the requirement that towers must be placed in a fairly structured pattern so as to provide coverage with a minimum of "dead zones", yet avoid interference between nearby cells using the same frequencies. Essentially, the coverage area must be mapped out, the available locations for placing towers or base stations must be identified, and then given these constraints, the designers of the cellular system must make do with the best they can. And, of course, if user data rate demands grow over time, then the designers of the cellular system must yet again remap the coverage area, try to find locations for towers or base stations, and once again work within the constraints of the circumstances. And, very often, there simply is no good solution, resulting in dead zones or inadequate aggregate data rate capacity in a coverage area. In other words, the rigid physical placement requirements of a cellular system to avoid interference among towers or base stations utilizing the same frequency results in significant difficulties and constraints in cellular system design, and often is unable to meet user data rate and coverage requirements.

So-called prior art "cooperative" and "cognitive" radio systems seek to increase the spectral utilization in a given area by using intelligent algorithms within radios such that they can minimize interference among each other and/or such that they can potentially "listen" for other spectrum use so as to wait until the channel is clear. Such systems are proposed for use particularly in unlicensed spectrum in an effort to increase the spectrum utilization of such spectrum.

A mobile ad hoc network (MANET) (see http://en.wikipedia.org/wiki/Mobile_ad_hoc_network) is an example of a cooperative self-configuring network intended to provide peer-to-peer communications, and could be used to establish communication among radios without cellular infrastructure, and with sufficiently low-power communications, can potentially mitigate interference among simultaneous transmissions that are out of range of each other. A vast number of routing protocols have been proposed and implemented for MANET systems (see http://en.wikipedia.org/wiki/List_of_ad-hoc_routing_protocols for a list of dozens of routing protocols in a wide range of classes), but a common theme among them is they are all techniques for routing (e.g. repeating) transmissions in such a way to minimize transmitter interference within the available spectrum, towards the goal of particular efficiency or reliability paradigms.

All of the prior art multi-user wireless systems seek to improve spectrum utilization within a given coverage area by utilizing techniques to allow for simultaneous spectrum utilization among base stations and multiple users. Notably, in all of these cases, the techniques utilized for simultaneous spectrum utilization among base stations and multiple users achieve the simultaneous spectrum use by multiple users by mitigating interference among the waveforms to the multiple users. For example, in the case of 3 base stations each using a different frequency to transmit to one of 3 users, there interference is mitigated because the 3 transmissions are at 3 different frequencies. In the case of sectorization from a base station to 3 different users, each 180 degrees apart relative to the base station, interference is mitigated because the beamforming prevents the 3 transmissions from overlapping at any user.

When such techniques are augmented with MU-MIMO, and, for example, each base station has 4 antennas, then this has the potential to increase downlink throughput by a factor of 4, by creating four non-interfering spatial channels to the users in given coverage area. But it is still the case that some technique must be utilized to mitigate the interference among multiple simultaneous transmissions to multiple users in different coverage areas.

And, as previously discussed, such prior art techniques (e.g. cellularization, sectorization) not only typically suffer from increasing the cost of the multi-user wireless system and/or the flexibility of deployment, but they typically run into physical or practical limitations of aggregate throughput in a given coverage area. For example, in a cellular system, there may not be enough available locations to install more base stations to create smaller cells. And, in an MU-MIMO system, given the clustered antenna spacing at each base station location, the limited spatial diversity results in asymptotically diminishing returns in throughput as more antennas are added to the base station.

And further, in the case of multi-user wireless systems where the user location and density is unpredictable, it results in unpredictable (with frequently abrupt changes) in throughput, which is inconvenient to the user and renders some applications (e.g. the delivery of services requiring predictable throughput) impractical or of low quality. Thus, prior art multi-user wireless systems still leave much to be desired in terms of their ability to provide predictable and/or high-quality services to users.

Despite the extraordinary sophistication and complexity that has been developed for prior art multi-user wireless systems over time, there exist common themes: transmissions are distributed among different base stations (or ad hoc transceivers) and are structured and/or controlled so as to avoid the RF waveform transmissions from the different base stations and/or different ad hoc transceivers from interfering with each other at the receiver of a given user.

Or, to put it another way, it is taken as a given that if a user happens to receive transmissions from more than one base station or ad hoc transceiver at the same time, the interference from the multiple simultaneous transmissions will result in a reduction of the SNR and/or bandwidth of the signal to the user which, if severe enough, will result in loss of all or some of the potential data (or analog information) that would otherwise have been received by the user.

Thus, in a multiuser wireless system, it is necessary to utilize one or more spectrum sharing approaches or another to avoid or mitigate such interference to users from multiple base stations or ad hoc transceivers transmitting at the same frequency at the same time. There are a vast number of prior art approaches to avoiding such interference, including controlling base stations' physical locations (e.g. cellularization), limiting power output of base stations and/or ad hoc transceivers (e.g. limiting transmit range), beamforming/sectorization, and time domain multiplexing. In short, all of these spectrum sharing systems seek to address the limitation of multiuser wireless systems that when multiple base stations and/or ad hoc transceivers transmitting simultaneously at the same frequency are received by the same user, the resulting interference reduces or destroys the data throughput to the affected user. If a large percentage, or all, of the users in the multi-user wireless system are subject to interference from multiple base stations and/or ad hoc transceivers (e.g. in the event of the malfunction of a component of a multi-user wireless system), then it can result in a situation where the aggregate throughput of the multi-user wireless system is dramatically reduced, or even rendered non-functional.

Prior art multi-user wireless systems add complexity and introduce limitations to wireless networks and frequently result in a situation where a given user's experience (e.g. available bandwidth, latency, predictability, reliability) is impacted by the utilization of the spectrum by other users in the area. Given the increasing demands for aggregate bandwidth within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), it may be the case that prior art wireless techniques will be insufficient to meet the increasing demands for bandwidth that is reliable, predictable and low-latency.

Prior art related to the current invention describes beamforming systems and methods for null-steering in multiuser scenarios. Beamforming was originally conceived to maximize received signal-to-noise ratio (SNR) by dynamically adjusting phase and/or amplitude of the signals (i.e., beamforming weights) fed to the antennas of the array, thereby focusing energy toward the user's direction [14-20]. In multiuser scenarios, beamforming can be used to suppress interfering sources and maximize signal-to-interference-plus-noise ratio (SINR) [21-23]. For example, when beamforming is used at the receiver of a wireless link, the weights are computed to create nulls in the direction of the interfering sources [15]. When beamforming is used at the transmitter in multiuser downlink scenarios, the weights are calculated to pre-cancel inter-user interference and maximize the SINR to every user [21-23]. Alternative techniques for multiuser systems, such as BD precoding [24-25], compute the precoding weights to maximize throughput in the downlink broadcast channel.

The patent or application file contains at least one drawing executed in color. Copies of this patent or patent publication with color drawing(s) will be provided by the U.S. Patent and Trademark Office upon request and payment of the necessary fee.

BRIEF DESCRIPTION OF THE DRAWINGS

A better understanding of the present invention can be obtained from the following detailed description in conjunction with the drawings, in which:

FIG. 39 illustrates the SNR thresholds for a BD scheme with different values of AS.

FIG. 50 compares the amount of overhead required for different embodiments of methods.

FIG. 68 illustrates propagation effects in DIDO systems for three different carrier frequencies.

FIG. 97-*b* illustrate two power distributions corresponding to the configurations in FIGS. 96*a* and 96*b*, respectively.

FIG. 108 illustrates SER performance of one embodiment of the link adaptation (LA) techniques.

DETAILED DESCRIPTION

Figure 1:
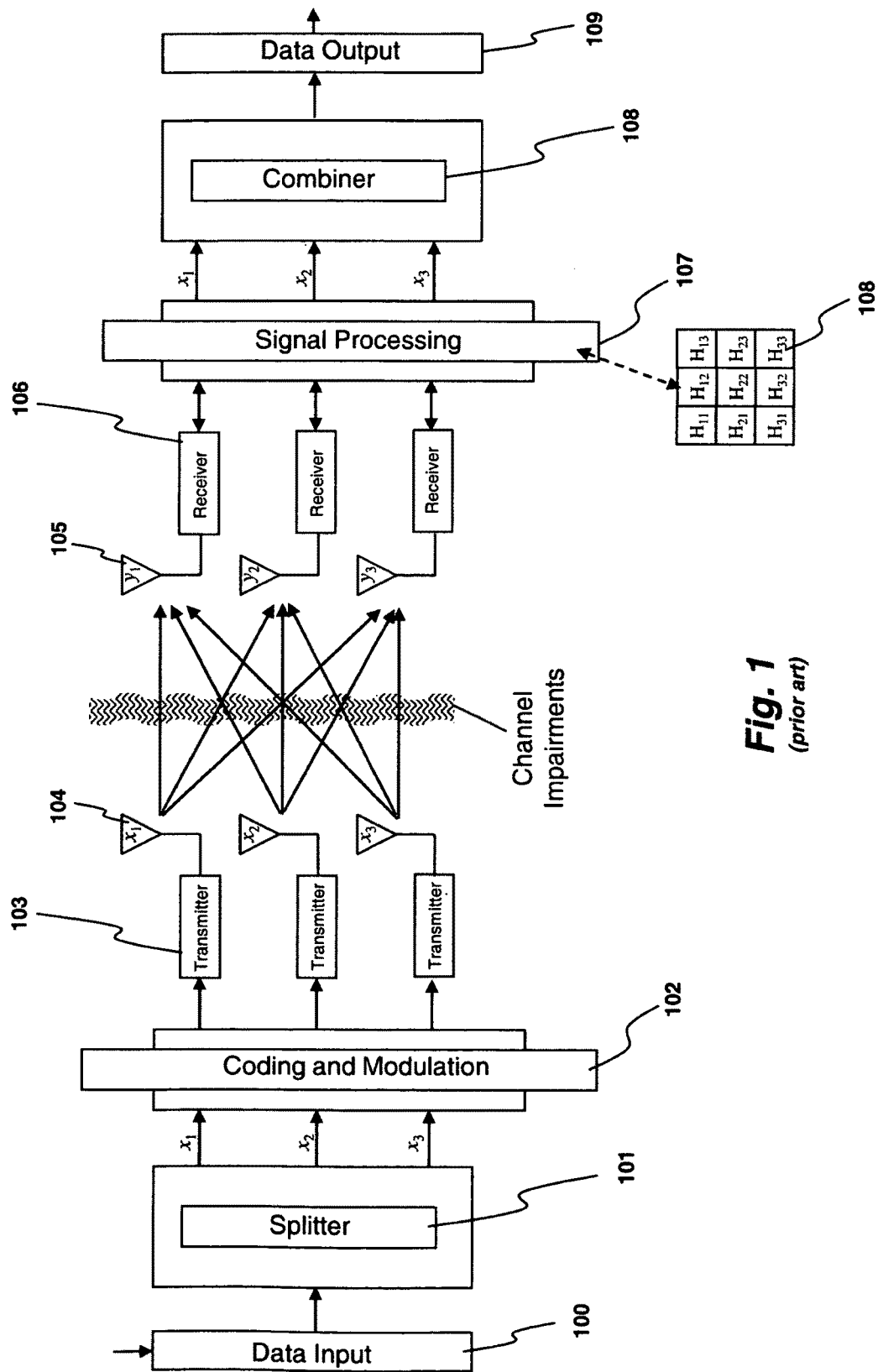
FIG. 1 illustrates a prior art MIMO system.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "related patents and applications":

U.S. application Ser. No. 12/630,627, filed Dec. 2, 2009, entitled "System and Method For Distributed Antenna Wireless Communications"

U.S. Pat. No. 7,599,420, filed Aug. 20, 2007, issued Oct. 6, 2009, entitled "System and Method for Distributed Input Distributed Output Wireless Communication";

U.S. Pat. No. 7,633,994, filed Aug. 20, 2007, issued Dec. 15, 2009, entitled "System and Method for Distributed Input Distributed Output Wireless Communication";

U.S. Pat. No. 7,636,381, filed Aug. 20, 2007, issued Dec. 22, 2009, entitled "System and Method for Distributed Input Distributed Output Wireless Communication";

U.S. application Ser. No. 12/143,503, filed Jun. 20, 2008 entitled, "System and Method For Distributed Input-Distributed Output Wireless Communications";

U.S. application Ser. No. 11/256,478, filed Oct. 21, 2005 entitled "System and Method For Spatial-Multiplexed Tropospheric Scatter Communications";

U.S. Pat. No. 7,418,053, filed Jul. 30, 2004, issued Aug. 26, 2008, entitled "System and Method for Distributed Input Distributed Output Wireless Communication";

U.S. application Ser. No. 10/817,731, filed Apr. 2, 2004 entitled "System and Method For Enhancing Near Vertical Incidence Skywave ("NVIS") Communication Using Space-Time Coding.

For organization purposes, the present detailed description is separated into the following sections:

I. Disclosure of the Present Application which includes new matter introduced in the present application and includes FIGS. 80-113 and associated text;

II. Disclosure From Certain Related Applications which includes matter previously disclosed in certain related applications and which includes FIGS. 1-60 and associated text; and III. Disclosure From U.S. application Ser. No. 12/630,627 which includes new matter introduced in the most recent related application in this series (having Ser. No. 12/630,627) and which includes FIGS. 61-79 and associated text.

Note that section I (Disclosure of the Present Application) utilizes its own set of endnotes which refer to prior art references and prior applications assigned to the assignee of the present application. The endnote citations are listed at the end of section I (just prior to the heading for Section II). Citations in Sections II and III may have numerical designations which overlap with those used in Section I even through these numerical designations identify different references (which are identified within each respective section). Thus, references identified by a particular numerical designation may be identified within the section in which the numerical designation is used.

I. Disclosure of the Present Application

1. Methods to Remove Inter-Cluster Interference

Described below are wireless radio frequency (RF) communication systems and methods employing a plurality of distributed transmitting antennas to create locations in space with zero RF energy. When M transmit antennas are employed, it is possible to create up to (M−1) points of zero RF energy in predefined locations. In one embodiment of the invention, the points of zero RF energy are wireless devices and the transmit antennas are aware of the channel state information (CSI) between the transmitters and the receivers. In one embodiment, the CSI is computed at the receivers and fed back to the transmitters. In another embodiment, the CSI is computed at the transmitter via training from the receivers, assuming channel reciprocity is exploited. The transmitters may utilize the CSI to determine the interfering signals to be simultaneously transmitted. In one embodiment, block diagonalization (BD) precoding is employed at the transmit antennas to generate points of zero RF energy.

The system and methods described herein differ from the conventional receive/transmit beamforming techniques described above. In fact, receive beamforming computes the weights to suppress interference at the receive side (via null-steering), whereas some embodiments of the invention described herein apply weights at the transmit side to create interference patters that result in one or multiple locations in space with "zero RF energy." Unlike conventional transmit beamforming or BD precoding designed to maximize signal quality (or SINR) to every user or downlink throughput, respectively, the systems and methods described herein minimize signal quality under certain conditions and/or from certain transmitters, thereby creating points of zero RF energy at the client devices (sometimes referred to herein as "users"). Moreover, in the context of distributed-input distributed-output (DIDO) systems (described in our related patents and applications), transmit antennas distributed in space provide higher degrees of freedom (i.e., higher channel spatial diversity) that can be exploited to create multiple points of zero RF energy and/or maximum SINR to different users. For example, with M transmit antennas it is possible to create up to (M−1) points of RF energy. By contrast, practical beamforming or BD multiuser systems are typically designed with closely spaced antennas at the transmit side that limit the number of simultaneous users that can be serviced over the wireless link, for any number of transmit antennas M.

Consider a system with M transmit antennas and K users, with K<M. We assume the transmitter is aware of the CSI ($H \in C^{K \times M}$) between the M transmit antennas and K users. For simplicity, every user is assumed to be equipped with single antenna, but the same method can be extended to multiple receive antennas per user. The precoding weights ($w \in C^{M \times 1}$) that create zero RF energy at the K users' locations are computed to satisfy the following condition $$Hw = 0^{K \times 1}$$

where $0^{K \times 1}$ is the vector with all zero entries and H is the channel matrix obtained by combining the channel vectors ($h_k \in C^{1 \times M}$) from the M transmit antennas to the K users as $$H = \begin{bmatrix} h_1 \\ \vdots \\ h_k \\ \vdots \\ h_K \end{bmatrix}.$$

In one embodiment, singular value decomposition (SVD) of the channel matrix H is computed and the precoding weight w is defined as the right singular vector corresponding to the null subspace (identified by zero singular value) of H. The transmit antennas employ the weight vector defined above to transmit RF energy, while creating K points of zero RF energy at the locations of the K users such that the signal received at the $k^{th}$ user is given by $$r_k = h_k w s_k + n_k = 0 + n_k$$

where $n_k \in C^{1 \times 1}$ is the additive white Gaussian noise (AWGN) at the $k^{th}$ user.

In one embodiment, singular value decomposition (SVD) of the channel matrix H is computed and the precoding weight w is defined as the right singular vector corresponding to the null subspace (identified by zero singular value) of H.

In another embodiment, the wireless system is a DIDO system and points of zero RF energy are created to pre-cancel interference to the clients between different DIDO coverage areas. In U.S. application Ser. No. 12/630,627, a DIDO system is described which includes:
DIDO clients
DIDO distributed antennas
DIDO base transceiver stations (BTS)
DIDO base station network (BSN)

Figure 77:
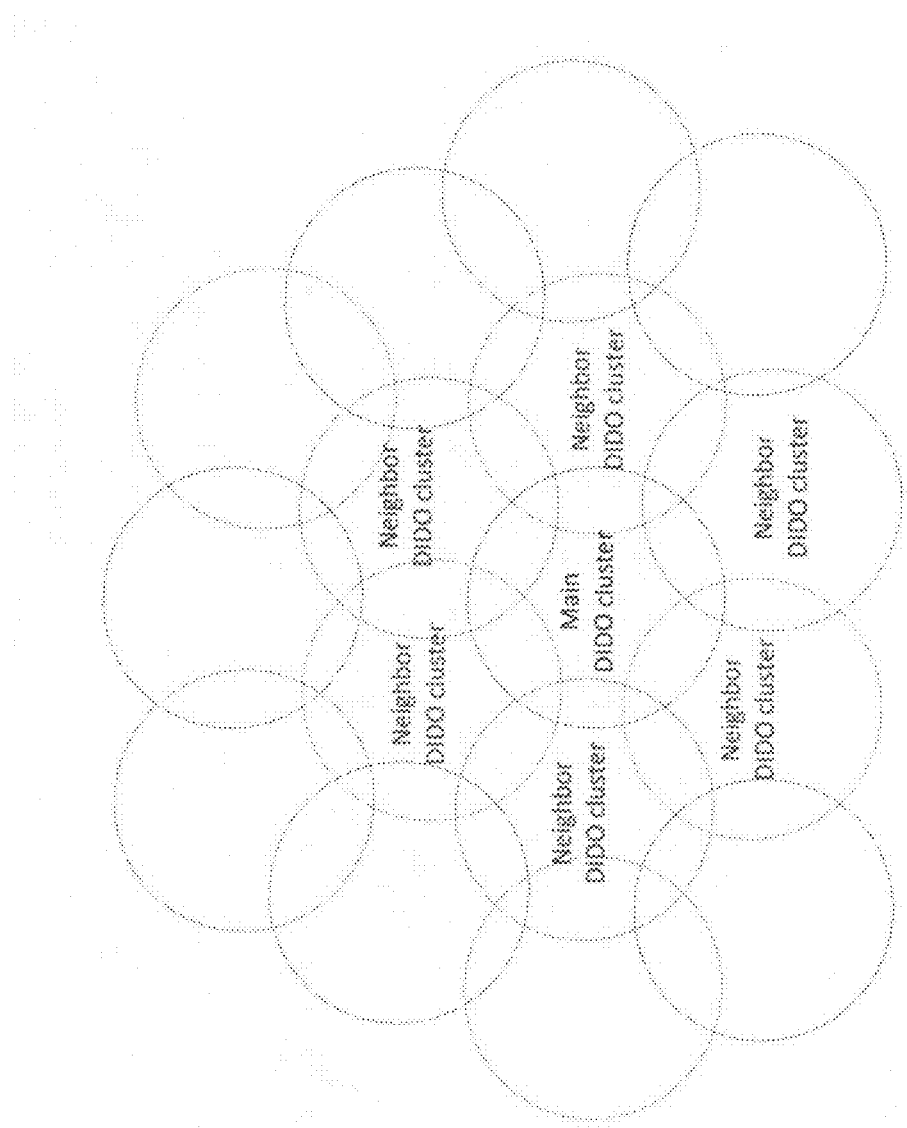
FIG. 77 illustrates a main DIDO cluster surrounded by neighboring DIDO clusters in one embodiment of the invention.

Every BTS is connected via the BSN to multiple distributed antennas that provide service to given coverage area called DIDO cluster. In the present patent application we describe a system and method for removing interference between adjacent DIDO clusters. As illustrated in FIG. 77, we assume the main DIDO cluster hosts the client (i.e. a user device served by the multi-user DIDO system) affected by interference (or target client) from the neighbor clusters.

Figure 78:
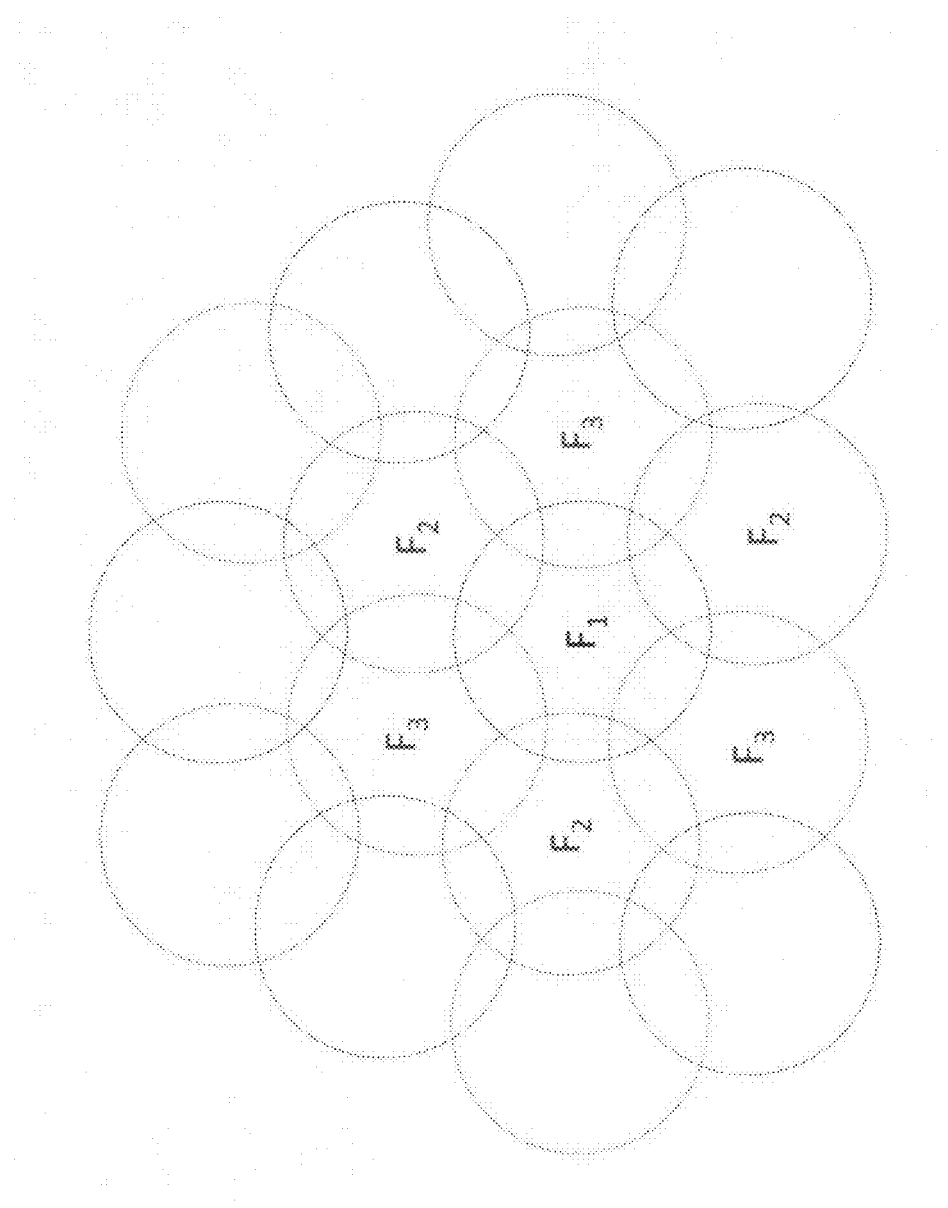
FIG. 78 illustrates frequency division multiple access (FDMA) techniques employed in one embodiment of the invention.

In one embodiment, neighboring clusters operate at different frequencies according to frequency division multiple access (FDMA) techniques similar to conventional cellular systems. For example, with frequency reuse factor of 3, the same carrier frequency is reused every third DIDO cluster as illustrated in FIG. 78. In FIG. 78, the different carrier frequencies are identified as $F_1$, $F_2$ and $F_3$. While this embodiment may be used in some implementations, this solution yields loss in spectral efficiency since the available spectrum is divided in multiple subbands and only a subset of DIDO clusters operate in the same subband. Moreover, it requires complex cell planning to associate different DIDO clusters to different frequencies, thereby preventing interference. Like prior art cellular systems, such cellular planning requires specific placement of antennas and limiting of transmit power to as to avoid interference between clusters using the same frequency.

Figure 79:
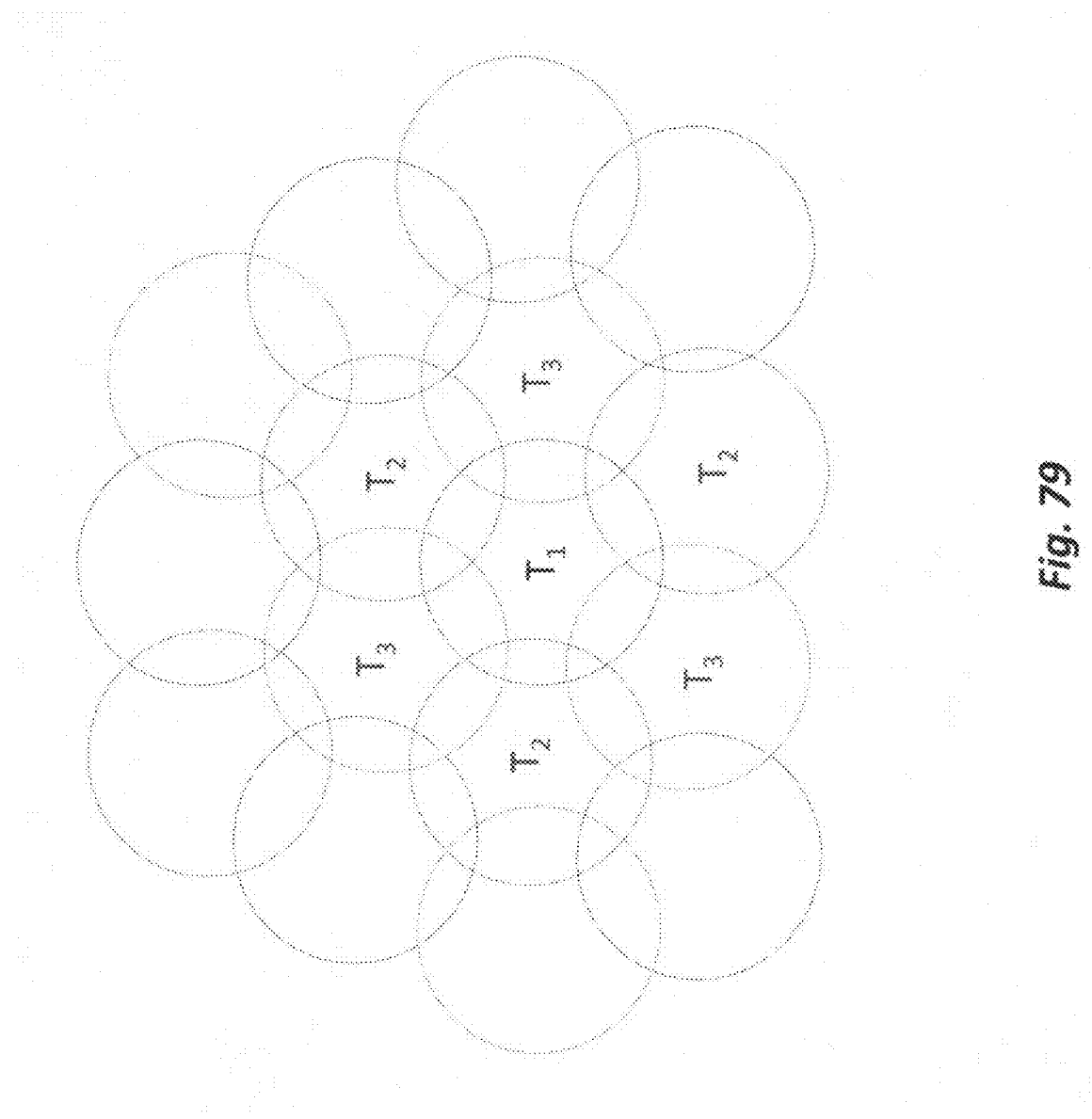
FIG. 79 illustrates time division multiple access (TDMA) techniques employed in one embodiment of the invention.

In another embodiment, neighbor clusters operate in the same frequency band, but at different time slots according to time division multiple access (TDMA) technique. For example, as illustrated in FIG. 79 DIDO transmission is allowed only in time slots $T_1$, $T_2$, and $T_3$ for certain clusters, as illustrated. Time slots can be assigned equally to different clusters, such that different clusters are scheduled according to a Round-Robin policy. If different clusters are characterized by different data rate requirements (i.e., clusters in crowded urban environments as opposed to clusters in rural areas with fewer number of clients per area of coverage), different priorities are assigned to different clusters such that more time slots are assigned to the clusters with larger data rate requirements. While TDMA as described above may be employed in one embodiment of the invention, a TDMA approach may require time synchronization across different clusters and may result in lower spectral efficiency since interfering clusters cannot use the same frequency at the same time.

In one embodiment, all neighboring clusters transmit at the same time in the same frequency band and use spatial processing across clusters to avoid interference. In this embodiment, the multi-cluster DIDO system: (i) uses conventional DIDO precoding within the main cluster to transmit simultaneous non-interfering data streams within the same frequency band to multiple clients (such as described in the related patents and applications, including U.S. Pat. Nos. 7,599,420; 7,633,994; 7,636,381; and application Ser. No. 12/143,503); (ii) uses DIDO precoding with interference cancellation in the neighbor clusters to avoid interference to the clients lying in the interfering zones 8010 in FIG. 80, by creating points of zero radio frequency (RF) energy at the locations of the target clients. If a target client is in an interfering zone 8010, it will receive the sum of the RF containing the data stream from the main cluster 8011 and the zero RF energy from the interfering cluster 8012-8013, which will simply be the RF containing the data stream from the main cluster. Thus, adjacent clusters can utilize the same frequency simultaneously without target clients in the interfering zone suffering from interference.

In practical systems, the performance of DIDO precoding may be affected by different factors such as: channel estimation error or Doppler effects (yielding obsolete channel state information at the DIDO distributed antennas); intermodulation distortion (IMD) in multicarrier DIDO systems; time or frequency offsets. As a result of these effects, it may be impractical to achieve points of zero RF energy. However, as long as the RF energy at the target client from the interfering clusters is negligible compared to the RF energy from the main cluster, the link performance at the target client is unaffected by the interference. For example, let us assume the client requires 20 dB signal-to-noise ratio (SNR) to demodulate 4-QAM constellations using forward error correction (FEC) coding to achieve target bit error rate (BER) of $10^{-6}$. If the RF energy at the target client received from the interfering cluster is 20 dB below the RF energy received from the main cluster, the interference is negligible and the client can demodulate data successfully within the predefined BER target. Thus, the term "zero RF energy" as used herein does not necessarily mean that the RF energy from interfering RF signals is zero. Rather, it means that the RF energy is sufficiently low relative to the RF energy of the desired RF signal such that the desired RF signal may be received at the receiver. Moreover, while certain desirable thresholds for interfering RF energy relative to desired RF energy are described, the underlying principles of the invention are not limited to any particular threshold values.

Figure 80:
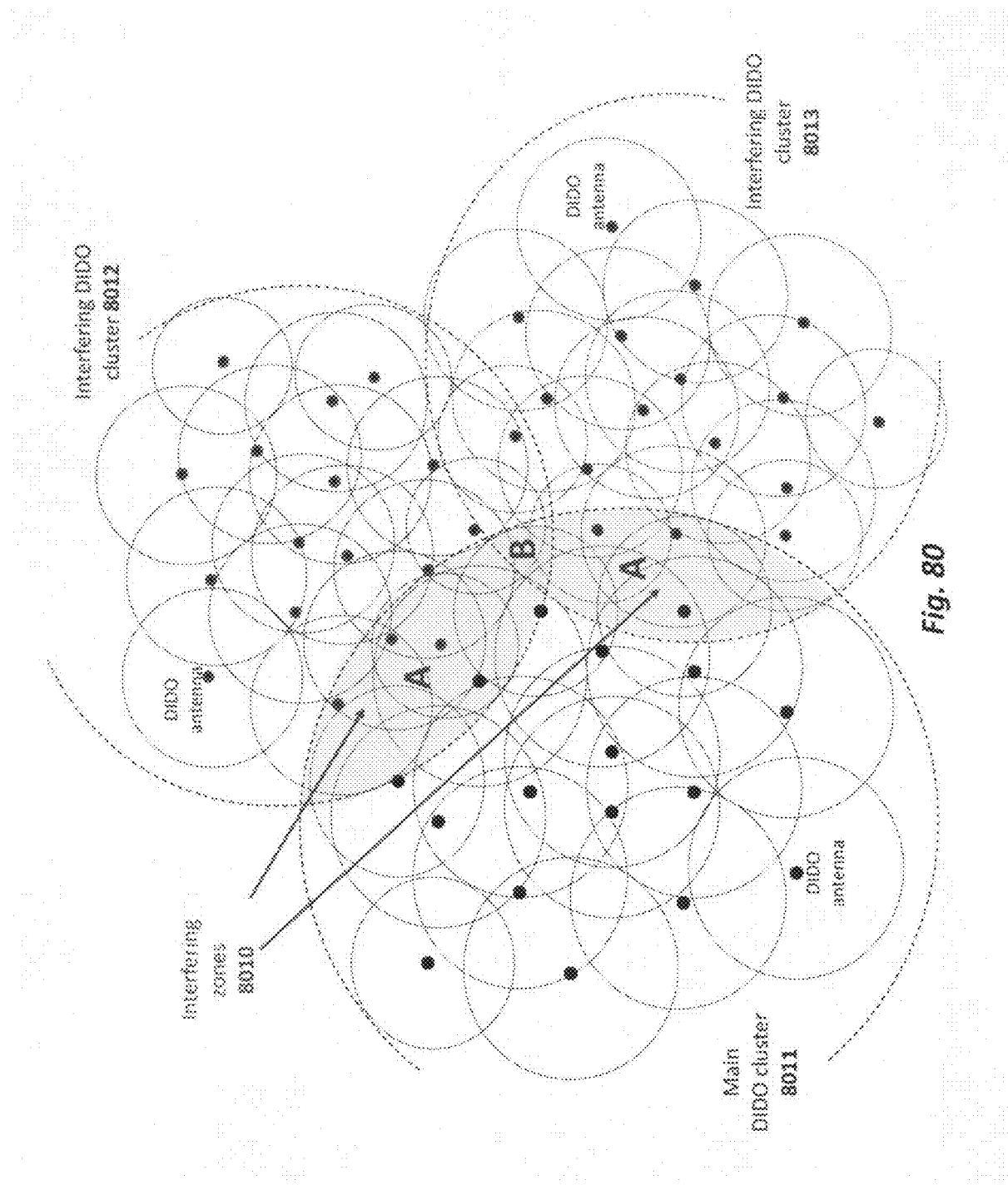
FIG. 80 illustrates different types of interfering zones addressed in one embodiment of the invention.

There are different types of interfering zones 8010 as shown in FIG. 80. For example, "type A" zones (as indicated by the letter "A" in FIG. 80) are affected by interference from only one neighbor cluster, whereas "type B" zones (as indicated by the letter "B") account for interference from two or multiple neighbor clusters.

Figure 81:
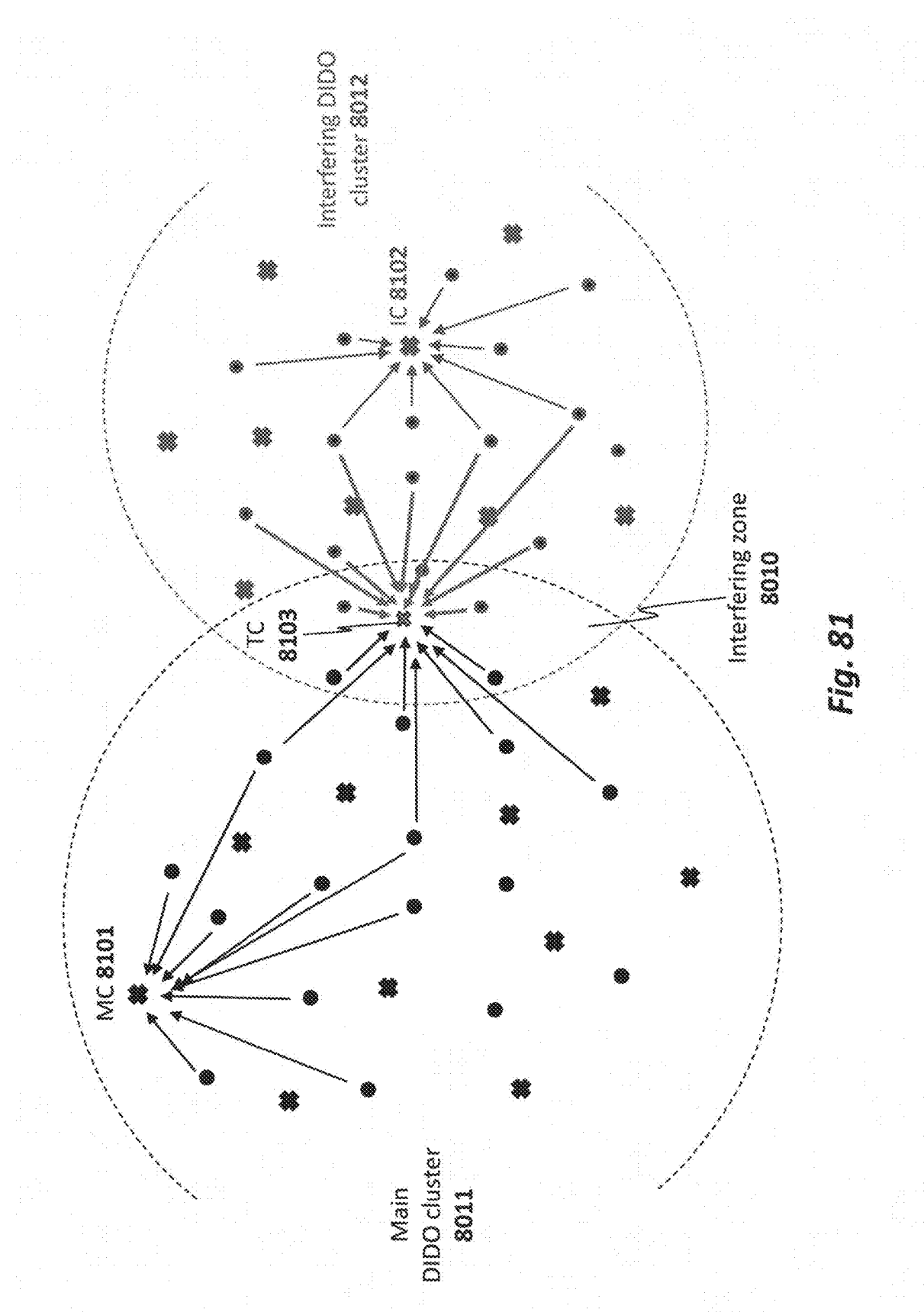
FIG. 81 illustrates a framework employed in one embodiment of the invention.

FIG. 81 depicts a framework employed in one embodiment of the invention. The dots denote DIDO distributed antennas, the crosses refer to the DIDO clients and the arrows indicate the directions of propagation of RF energy. The DIDO antennas in the main cluster transmit precoded data signals to the clients MC 8101 in that cluster. Likewise, the DIDO antennas in the interfering cluster serve the clients IC 8102 within that cluster via conventional DIDO precoding. The green cross 8103 denotes the target client TC 8103 in the interfering zone. The DIDO antennas in the main cluster 8011 transmit precoded data signals to the target client (black arrows) via conventional DIDO precoding. The DIDO antennas in the interfering cluster 8012 use precoding to create zero RF energy towards the directions of the target client 8103 (green arrows).

The received signal at target client k in any interfering zone 8010A, B in FIG. 80 is given by $$r_k = H_k W_k s_k + H_k \sum_{\substack{u=1 \\ u \neq k}}^{U} W_u s_u + \sum_{c=1}^{C} H_{c,k} \sum_{i=1}^{I} w_{c,i} s_{c,i} + n_k \quad (1)$$

where k=1, ..., K, with K being the number of clients in the interfering zone 8010A, B, U is the number of clients in the main DIDO cluster, C is the number of interfering DIDO clusters 8012-8013 and $I_c$ is the number of clients in the interfering cluster c. Moreover, $r_k \in C^{N \times M}$ is the vector containing the receive data streams at client k, assuming M transmit DIDO antennas and N receive antennas at the client devices; $s_k \in C^{N \times 1}$ is the vector of transmit data streams to client k in the main DIDO cluster; $s_u \in C^{N \times 1}$ is the vector of transmit data streams to client u in the main DIDO cluster; $s_{c,i} \in C^{N \times 1}$ is the vector of transmit data streams to client i in the $c^{th}$ interfering DIDO cluster; $n_k \in C^{N \times 1}$ is the vector of additive white Gaussian noise (AWGN) at the N receive antennas of client k; $H_k \in C^{N \times M}$ is the DIDO channel matrix from the M transmit DIDO antennas to the N receive antennas at client k in the main DIDO cluster; $H_{c,k} \in C^{N \times M}$ is the DIDO channel matrix from the M transmit DIDO antennas to the N receive antennas t client k in the $c^{th}$ interfering DIDO cluster; $W_k \in C^{M \times N}$ is the matrix of DIDO precoding weights to client k in the main DIDO cluster; $W_k \in C^{M \times N}$ is the matrix of DIDO precoding weights to client u in the main DIDO cluster; $W_{c,i} \in C^{M \times N}$ is the matrix of DIDO precoding weights to client i in the $c^{th}$ interfering DIDO cluster.

To simplify the notation and without loss of generality, we assume all clients are equipped with N receive antennas and there are M DIDO distributed antennas in every DIDO cluster, with M≥(N·U) and M≥(N·$I_c$), ∀c=1, ..., C. If M is larger than the total number of receive antennas in the cluster, the extra transmit antennas are used to pre-cancel interference to the target clients in the interfering zone or to improve link robustness to the clients within the same cluster via diversity schemes described in the related patents and applications, including U.S. Pat. Nos. 7,599,420; 7,633, 994; 7,636,381; and application Ser. No. 12/143,503.

The DIDO precoding weights are computed to pre-cancel inter-client interference within the same DIDO cluster. For example, block diagonalization (BD) precoding described in the related patents and applications, including U.S. Pat. Nos. 7,599,420; 7,633,994; 7,636,381; and application Ser. No. 12/143,503 and [7] can be used to remove inter-client interference, such that the following condition is satisfied in the main cluster $$H_k W_u = 0^{N \times N}; \forall u=1, \ldots, U; \text{ with } u \neq k. \quad (2)$$

The precoding weight matrices in the neighbor DIDO clusters are designed such that the following condition is satisfied $$H_{c,k} W_{c,i} = 0^{N \times N}; \forall c=1, \ldots, C \text{ and } \forall i=1, \ldots J_c. \quad (3)$$

To compute the precoding matrices $W_{c,i}$, the downlink channel from the M transmit antennas to the $I_c$ clients in the interfering cluster as well as to client k in the interfering zone is estimated and the precoding matrix is computed by the DIDO BTS in the interfering cluster. If BD method is used to compute the precoding matrices in the interfering clusters, the following effective channel matrix is built to compute the weights to the $i^{th}$ client in the neighbor clusters $$\overline{H}_{c,i} = \begin{bmatrix} H_{c,k} \\ \tilde{H}_{c,i} \end{bmatrix} \quad (4)$$

where $\tilde{H}_{c,i}$ is the matrix obtained from the channel matrix $H_c \in \mathbb{C}^{(N-I_c) \times M}$ for the interfering cluster c, where the rows corresponding to the $i^{th}$ client are removed. Substituting conditions (2) and (3) into (1), we obtain the received data streams for target client k, where intra-cluster and inter-cluster interference is removed $$r_k = H_k W_k s_k + n_k. \quad (5)$$

The precoding weights $W_{c,i}$ in (1) computed in the neighbor clusters are designed to transmit precoded data streams to all clients in those clusters, while pre-cancelling interference to the target client in the interfering zone. The target client receives precoded data only from its main cluster. In a different embodiment, the same data stream is sent to the target client from both main and neighbor clusters to obtain diversity gain. In this case, the signal model in (5) is expressed as $$r_k = (H_k W_k + \Sigma_{c=1}^C H_{c,k} W_{c,k}) s_k + n_k \quad (6)$$

where $W_{c,k}$ is the DIDO precoding matrix from the DIDO transmitters in the $c^{th}$ cluster to the target client k in the interfering zone. Note that the method in (6) requires time synchronization across neighboring clusters, which may be complex to achieve in large systems, but nonetheless, is quite feasible if the diversity gain benefit justifies the cost of implementation.

We begin by evaluating the performance of the proposed method in terms of symbol error rate (SER) as a function of the signal-to-noise ratio (SNR). Without loss of generality, we define the following signal model assuming single antenna per client and reformulate (1) as $$r_k = \sqrt{SNR} h_k w_k s_k + \sqrt{INR} h_{c,k} \Sigma_{i=1}^I w_{c,i} s_{c,i} + n_k \quad (7)$$

where INR is the interference-to-noise ratio defined as INR=SNR/SIR and SIR is the signal-to-interference ratio.

Figure 82:
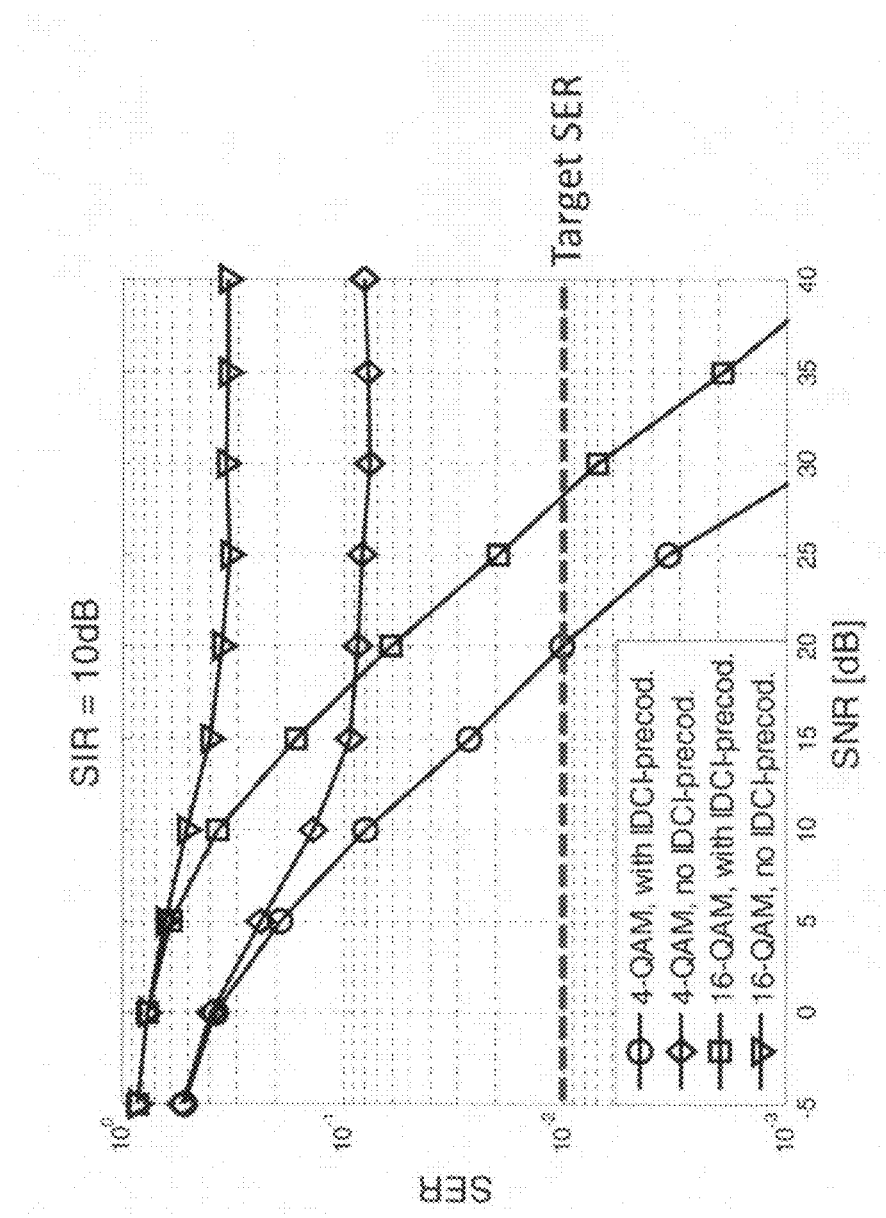
FIG. 82 illustrates a graph showing SER as a function of the SNR, assuming SIR=10 dB for the target client in the interfering zone.

FIG. 82 shows the SER as a function of the SNR, assuming SIR=10 dB for the target client in the interfering zone. Without loss of generality, we measured the SER for 4-QAM and 16-QAM without forwards error correction (FEC) coding. We fix the target SER to 1% for uncoded systems. This target corresponds to different values of SNR depending on the modulation order (i.e., SNR=20 dB for 4-QAM and SNR=28 dB for 16-QAM). Lower SER targets can be satisfied for the same values of SNR when using FEC coding due to coding gain. We consider the scenario of two clusters (one main cluster and one interfering cluster) with two DIDO antennas and two clients (equipped with single antenna each) per cluster. One of the clients in the main cluster lies in the interfering zone. We assume flat-fading narrowband channels, but the following results can be extended to frequency selective multicarrier (OFDM) systems, where each subcarrier undergoes flat-fading. We consider two scenarios: (i) one with inter-DIDO-cluster interference (IDCI) where the precoding weights $w_{c,i}$ are computed without accounting for the target client in the interfering zone; and (ii) the other where the IDCI is removed by computing the weights $w_{c,i}$ to cancel IDCI to the target client. We observe that in presence of IDCI the SER is high and above the predefined target. With IDCI-precoding at the neighbor cluster the interference to the target client is removed and the SER targets are reached for SNR>20 dB.

Figure 83:
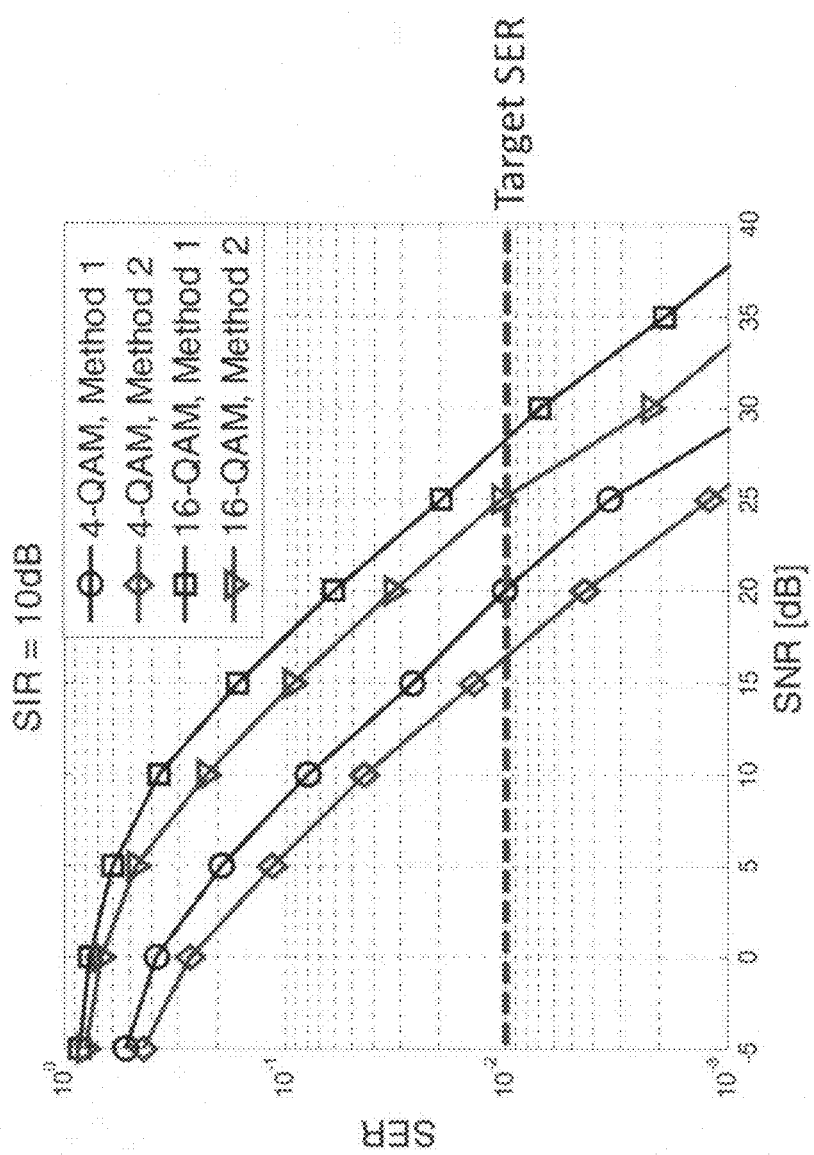
FIG. 83 illustrates a graph showing SER derived from two IDCI-precoding techniques.

The results in FIG. 82 assumes IDCI-precoding as in (5). If IDCI-precoding at the neighbor clusters is also used to precode data streams to the target client in the interfering zone as in (6), additional diversity gain is obtained. FIG. 83 compares the SER derived from two techniques: (i) "Method 1" using the IDCI-precoding in (5); (ii) "Method 2" employing IDCI-precoding in (6) where the neighbor clusters also transmit precoded data stream to the target client. Method 2 yields ~3 dB gain compared to conventional IDCI-precoding due to additional array gain provided by the DIDO antennas in the neighbor cluster used to transmit precoded data stream to the target client. More generally, the array gain of Method 2 over Method 1 is proportional to 10*log 10(C+1), where C is the number of neighbor clusters and the factor "1" refers to the main cluster.

Figure 84:
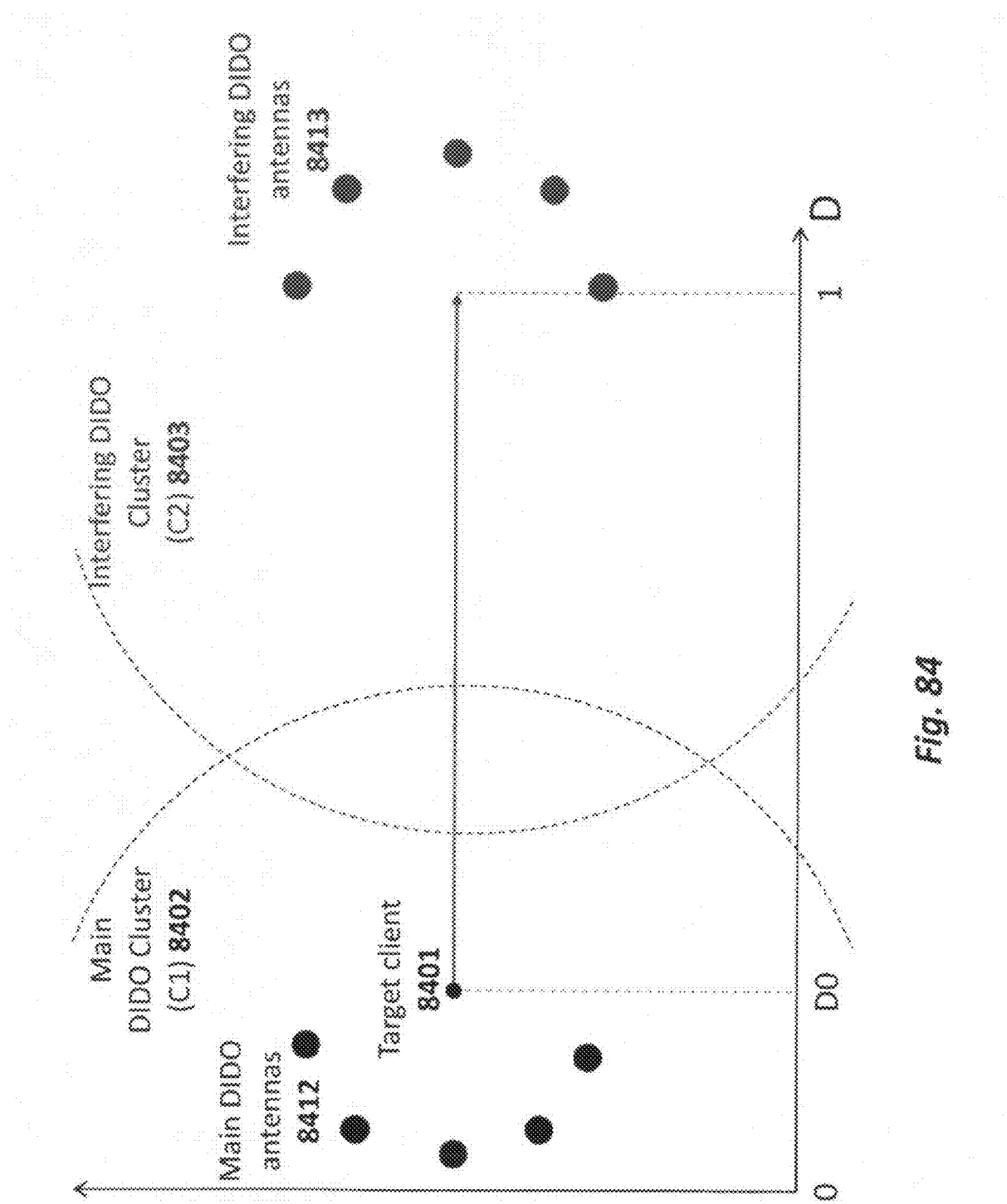
FIG. 84 illustrates an exemplary scenario in which a target client moves from a main DIDO cluster to an interfering cluster.

Next, we evaluate the performance of the above method as a function of the target client's location with respect to the interfering zone. We consider one simple scenario where a target client 8401 moves from the main DIDO cluster 8402 to the interfering cluster 8403, as depicted in FIG. 84. We assume all DIDO antennas 8412 within the main cluster 8402 employ BD precoding to cancel intra-cluster interference to satisfy condition (2). We assume single interfering DIDO cluster, single receiver antenna at the client device 8401 and equal pathloss from all DIDO antennas in the main or interfering cluster to the client (i.e., DIDO antennas placed in circle around the client). We use one simplified pathloss model with pathloss exponent 4 (as in typical urban environments) [11].

The analysis hereafter is based on the following simplified signal model that extends (7) to account for pathloss $$r_k = \sqrt{\frac{SNR \cdot D_o^4}{D^4}} h_k w_k s_k + \sqrt{\frac{SNR \cdot D_o^4}{(1-D)^4}} h_{c,k} \sum_{i=1}^I w_{c,i} s_{c,i} + n_k \quad (8)$$

where the signal-to-interference (SIR) is derived as SIR=$((1-D)/D)^4$. In modeling the IDCI, we consider three scenarios: i) ideal case with no IDCI; ii) IDCI pre-cancelled via BD precoding in the interfering cluster to satisfy condition (3); iii) with IDCI, not pre-cancelled by the neighbor cluster.

Figure 85:
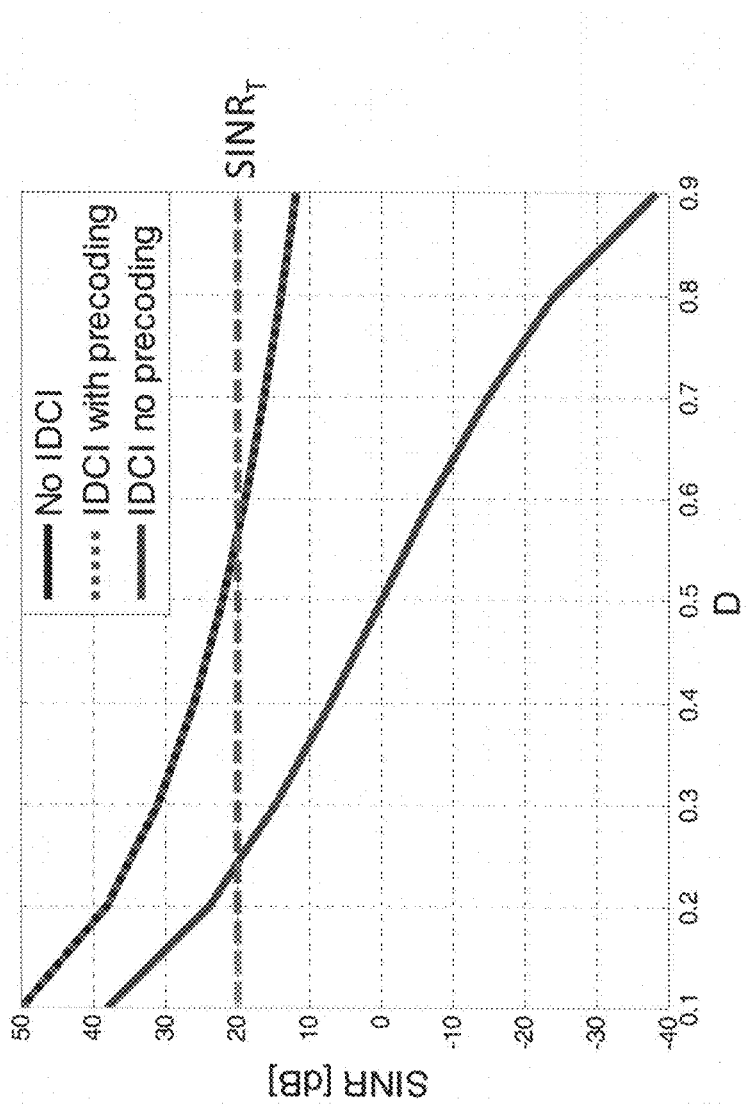
FIG. 85 illustrates the signal-to-interference-plus-noise ratio (SINR) as a function of distance (D).

FIG. 85 shows the signal-to-interference-plus-noise ratio (SINR) as a function of D (i.e., as the target client moves from the main cluster 8402 towards the DIDO antennas 8413 in the interfering cluster 8403). The SINR is derived as the ratio of signal power and interference plus noise power using the signal model in (8). We assume that $D_o$=0.1 and SNR=50 dB for D=$D_o$. In absence of IDCI the wireless link performance is only affected by noise and the SINR decreases due to pathloss. In presence of IDCI (i.e., without IDCI-precoding) the interference from the DIDO antennas in the neighbor cluster contributes to reduce the SINR.

Figure 86:
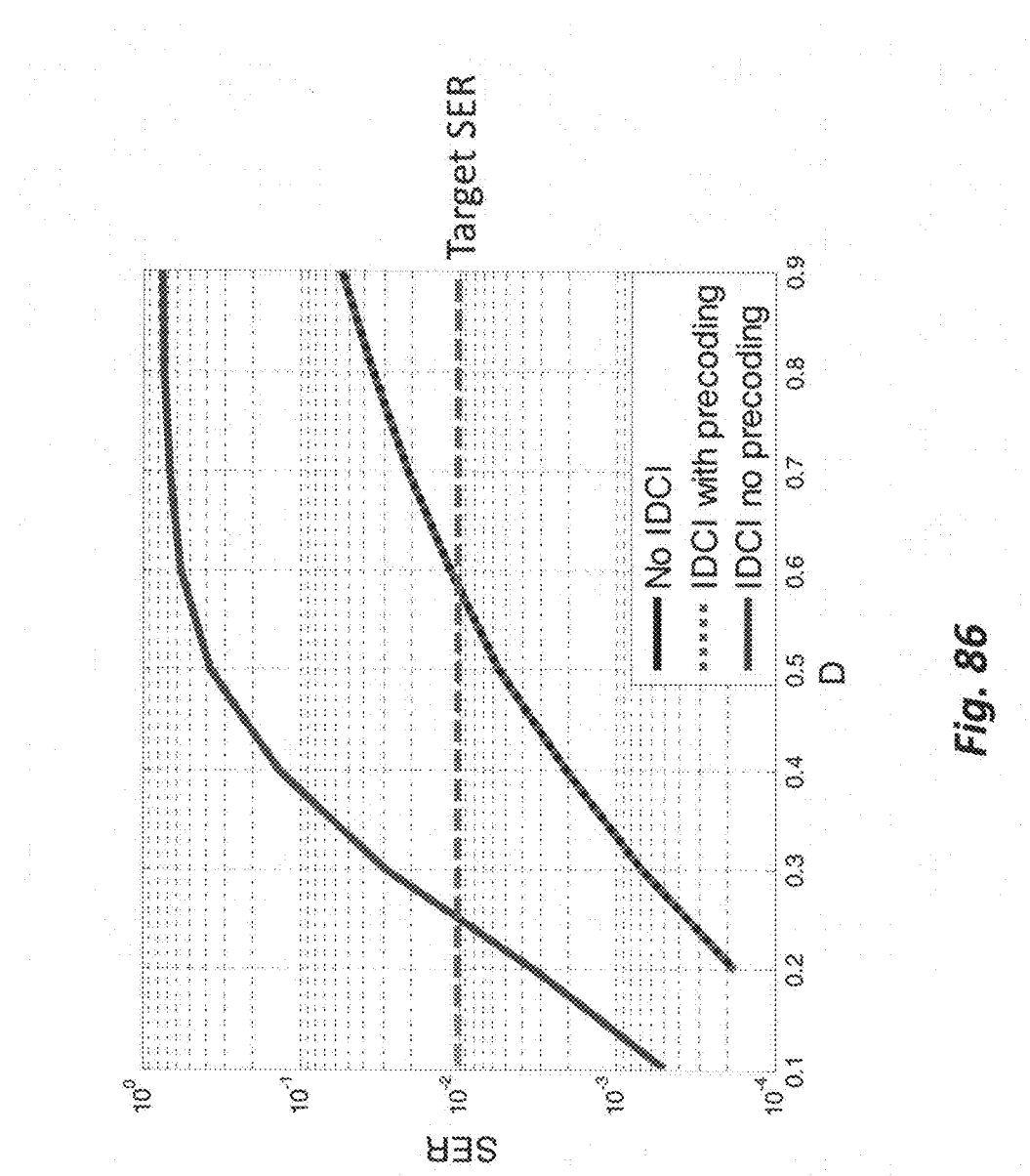
FIG. 86 illustrates the symbol error rate (SER) performance of the three scenarios for 4-QAM modulation in flat-fading narrowband channels.

FIG. 86 shows the symbol error rate (SER) performance of the three scenarios above for 4-QAM modulation in flat-fading narrowband channels. These SER results correspond to the SINR in FIG. 85. We assume SER threshold of 1% for uncoded systems (i.e., without FEC) corresponding to SINR threshold SINR$_T$=20 dB in FIG. 85. The SINR threshold depends on the modulation order used for data transmission. Higher modulation orders are typically characterized by higher SINR$_T$ to achieve the same target error rate. With FEC, lower target SER can be achieved for the same SINR value due to coding gain. In case of IDCI without precoding, the target SER is achieved only within the range D<0.25. With IDCI-precoding at the neighbor cluster the range that satisfies the target SER is extended up to D<0.6. Beyond that range, the SINR increases due to pathloss and the SER target is not satisfied.

Figure 87:
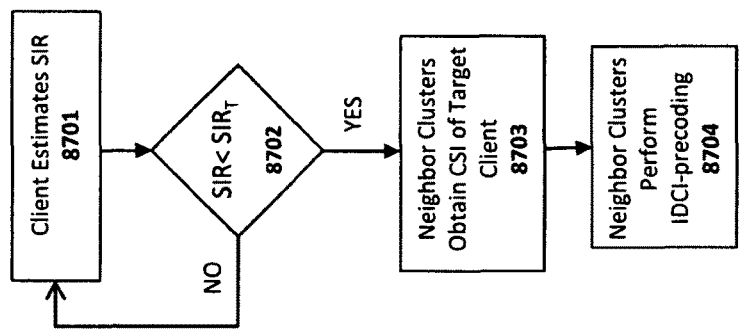
FIG. 87 illustrates a method for IDCI precoding according to one embodiment of the invention.

One embodiment of a method for IDCI precoding is shown in FIG. 87 and consists of the following steps:

SIR estimate 8701: Clients estimate the signal power from the main DIDO cluster (i.e., based on received precoded data) and the interference-plus-noise signal power from the neighbor DIDO clusters. In single-carrier DIDO systems, the frame structure can be designed with short periods of silence. For example, periods of silence can be defined between training for channel estimation and precoded data transmissions during channel state information (CSI) feedback. In one embodiment, the interference-plus-noise signal power from neighbor clusters is measured during the periods of silence from the DIDO antennas in the main cluster. In practical DIDO multicarrier (OFDM) systems, null tones are typically used to prevent direct current (DC) offset and attenuation at the edge of the band due to filtering at transmit and receive sides. In another embodiment employing multicarrier systems, the interference-plus-noise signal power is estimated from the null tones. Correction factors can be used to compensate for transmit/receive filter attenuation at the edge of the band. Once the signal-plus-interference-and-noise power ($P_S$) from the main cluster and the interference-plus-noise power from neighbor clusters ($P_{IN}$) are estimated, the client computes the SINR as $$SINR = \frac{P_S - P_{IN}}{P_{IN}}. \qquad (9)$$

Alternatively, the SINR estimate is derived from the received signal strength indication (RSSI) used in typical wireless communication systems to measure the radio signal power.

We observe the metric in (9) cannot discriminate between noise and interference power level. For example, clients affected by shadowing (i.e., behind obstacles that attenuate the signal power from all DIDO distributed antennas in the main cluster) in interference-free environments may estimate low SINR even though they are not affected by inter-cluster interference. A more reliable metric for the proposed method is the SIR computed as $$SIR = \frac{P_S - P_{IN}}{P_{IN} - P_N} \qquad (10)$$

where $P_N$ is the noise power. In practical multicarrier OFDM systems, the noise power $P_N$ in (10) is estimated from the null tones, assuming all DIDO antennas from main and neighbor clusters use the same set of null tones. The interference-plus-noise power ($P_{IN}$), is estimated from the period of silence as mentioned above. Finally, the signal-plus-interference-and-noise power ($P_S$) is derived from the data tones. From these estimates, the client computes the SIR in (10).

Channel estimation at neighbor clusters 8702-8703: If the estimated SIR in (10) is below predefined threshold ($SIR_T$), determined at 8702 in FIG. 87, the client starts listening to training signals from neighbor clusters. Note that $SIR_T$ depends on the modulation and FEC coding scheme (MCS) used for data transmission. Different SIR targets are defined depending on the client's MCS. When DIDO distributed antennas from different clusters are time-synchronized (i.e., locked to the same pulse-per-second, PPS, time reference), the client exploits the training sequence to deliver its channel estimates to the DIDO antennas in the neighbor clusters at 8703. The training sequence for channel estimation in the neighbor clusters are designed to be orthogonal to the training from the main cluster. Alternatively, when DIDO antennas in different clusters are not time-synchronized, orthogonal sequences (with good cross-correlation properties) are used for time synchronization in different DIDO clusters. Once the client locks to the time/frequency reference of the neighbor clusters, channel estimation is carried out at 8703.

IDCI Precoding 8704: Once the channel estimates are available at the DIDO BTS in the neighbor clusters, IDCI-precoding is computed to satisfy the condition in (3). The DIDO antennas in the neighbor clusters transmit precoded data streams only to the clients in their cluster, while pre-cancelling interference to the clients in the interfering zone 8010 in FIG. 80. We observe that if the client lies in the type B interfering zone 8010 in FIG. 80, interference to the client is generated by multiple clusters and IDCI-precoding is carried out by all neighbor clusters at the same time.

Methods for Handoff

Hereafter, we describe different handoff methods for clients that move across DIDO clusters populated by distributed antennas that are located in separate areas or that provide different kinds of services (i.e., low- or high-mobility services).

a. Handoff Between Adjacent DIDO Clusters

In one embodiment, the IDCI-precoder to remove inter-cluster interference described above is used as a baseline for handoff methods in DIDO systems. Conventional handoff in cellular systems is conceived for clients to switch seamlessly across cells served by different base stations. In DIDO systems, handoff allows clients to move from one cluster to another without loss of connection.

To illustrate one embodiment of a handoff strategy for DIDO systems, we consider again the example in FIG. 84 with only two clusters 8402 and 8403. As the client 8401 moves from the main cluster (C1) 8402 to the neighbor cluster (C2) 8403, one embodiment of a handoff method dynamically calculates the signal quality in different clusters and selects the cluster that yields the lowest error rate performance to the client.

Figure 88:
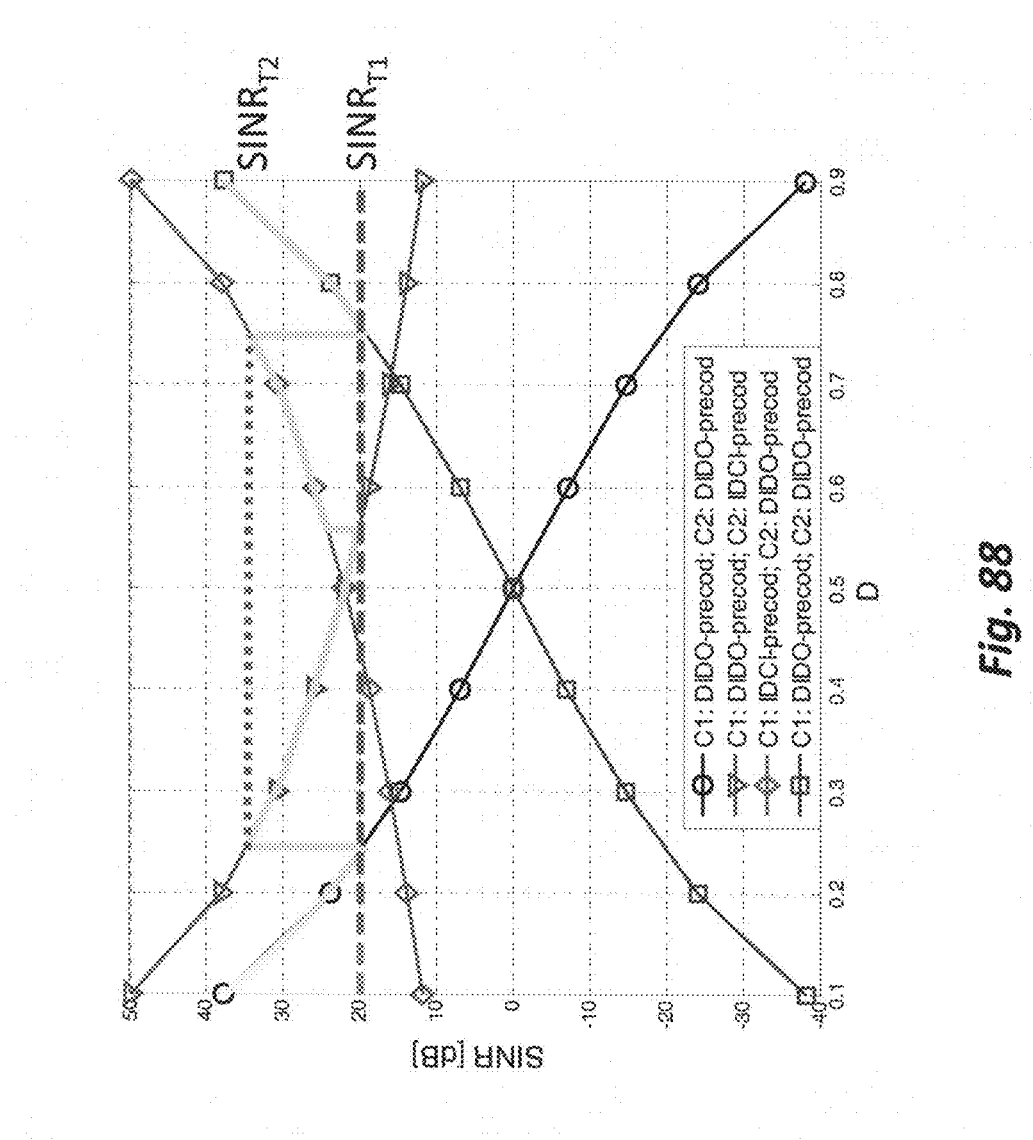
FIG. 88 illustrates the SINR variation in one embodiment as a function of the client's distance from the center of main DIDO clusters.

FIG. 88 shows the SINR variation as a function of the client's distance from the center of clusters C1. For 4-QAM modulation without FEC coding, we consider target SINR=20 dB. The line identified by circles represents the SINR for the target client being served by the DIDO antennas in C1, when both C1 and C2 use DIDO precoding without interference cancellation. The SINR decreases as a function of D due to pathloss and interference from the neighboring cluster. When IDCI-precoding is implemented at the neighboring cluster, the SINR loss is only due to pathloss (as shown by the line with triangles), since interference is completely removed. Symmetric behavior is experienced when the client is served from the neighboring cluster. One embodiment of the handoff strategy is defined such that, as the client moves from C1 to C2, the algorithm switches between different DIDO schemes to maintain the SINR above predefined target.

Figure 89:
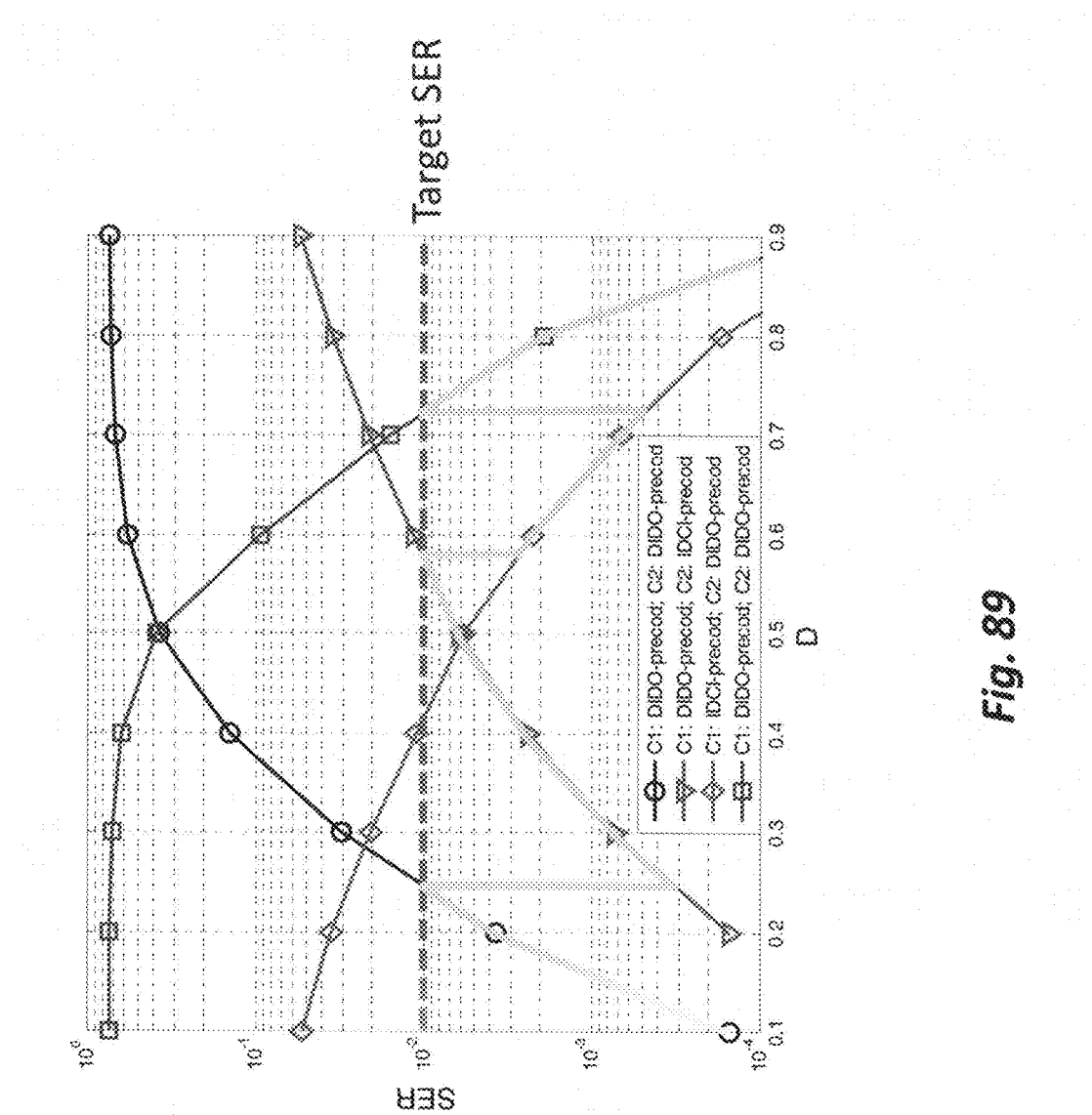
FIG. 89 illustrates one embodiment in which the SER is derived for 4-QAM modulation.

From the plots in FIG. 88, we derive the SER for 4-QAM modulation in FIG. 89. We observe that, by switching between different precoding strategies, the SER is maintained within predefined target.

One embodiment of the handoff strategy is as follows.

C1-DIDO and C2-DIDO precoding: When the client lies within C1, away from the interfering zone, both clusters C1 and C2 operate with conventional DIDO precoding independently.

C1-DIDO and C2-IDCI precoding: As the client moves towards the interfering zone, its SIR or SINR degrades. When the target $SINR_{T1}$ is reached, the target client starts estimating the channel from all DIDO antennas in C2 and provides the CSI to the BTS of C2. The BTS in C2 computes IDCI-precoding and transmits to all clients in C2 while preventing interference to the target client. For as long as the target client is within the interfering zone, it will continue to provide its CSI to both C1 and C2.

C1-IDCI and C2-DIDO precoding: As the client moves towards C2, its SIR or SINR keeps decreasing until it again reaches a target. At this point the client decides to switch to the neighbor cluster. In this case, C1 starts using the CSI from the target client to create zero interference towards its direction with IDCI-precoding, whereas the neighbor cluster uses the CSI for conventional DIDO-precoding. In one embodiment, as the SIR estimate approaches the target, the clusters C1 and C2 try both DIDO- and IDCI-precoding schemes alternatively, to allow the client to estimate the SIR in both cases. Then the client selects the best scheme, to maximize certain error rate performance metric. When this method is applied, the cross-over point for the handoff strategy occurs at the intersection of the curves with triangles and rhombus in FIG. 88. One embodiment uses the modified IDCI-precoding method described in (6) where the neighbor cluster also transmits precoded data stream to the target client to provide array gain. With this approach the handoff strategy is simplified, since the client does not need to estimate the SINR for both strategies at the cross-over point.

C1-DIDO and C2-DIDO precoding: As the client moves out of the interference zone towards C2, the main cluster C1 stops pre-cancelling interference towards that target client via IDCI-precoding and switches back to conventional DIDO-precoding to all clients remaining in C1. This final cross-over point in our handoff strategy is useful to avoid unnecessary CSI feedback from the target client to C1, thereby reducing the overhead over the feedback channel. In one embodiment a second target $SINR_{T2}$ is defined. When the SINR (or SIR) increases above this target, the strategy is switched to C1-DIDO and C2-DIDO. In one embodiment, the cluster C1 keeps alternating between DIDO- and IDCI-precoding to allow the client to estimate the SINR. Then the client selects the method for C1 that more closely approaches the target $SINR_{T1}$ from above.

The method described above computes the SINR or SIR estimates for different schemes in real time and uses them to select the optimal scheme. In one embodiment, the handoff algorithm is designed based on the finite-state machine illustrated in FIG. 90. The client keeps track of its current state and switches to the next state when the SINR or SIR drops below or above the predefined thresholds illustrated in FIG. 88. As discussed above, in state 8801, both clusters C1 and C2 operate with conventional DIDO precoding independently and the client is served by cluster C1; in state 8802, the client is served by cluster C1, the BTS in C2 computes IDCI-precoding and cluster C1 operates using conventional DIDO precoding; in state 8803, the client is served by cluster C2, the BTS in C1 computes IDCI-precoding and cluster C2 operates using conventional DIDO precoding; and in state 8804, the client is served by cluster C2, and both clusters C1 and C2 operate with conventional DIDO precoding independently.

Figure 90:
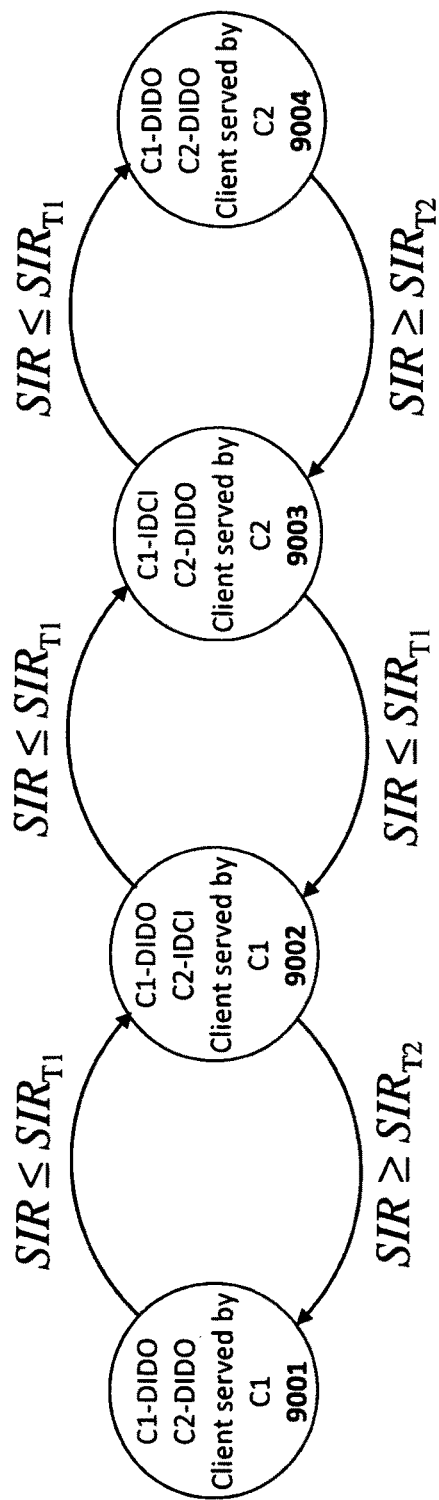
FIG. 90 illustrates one embodiment of the invention in which a finite state machine implements a handoff algorithm.
Figure 91:
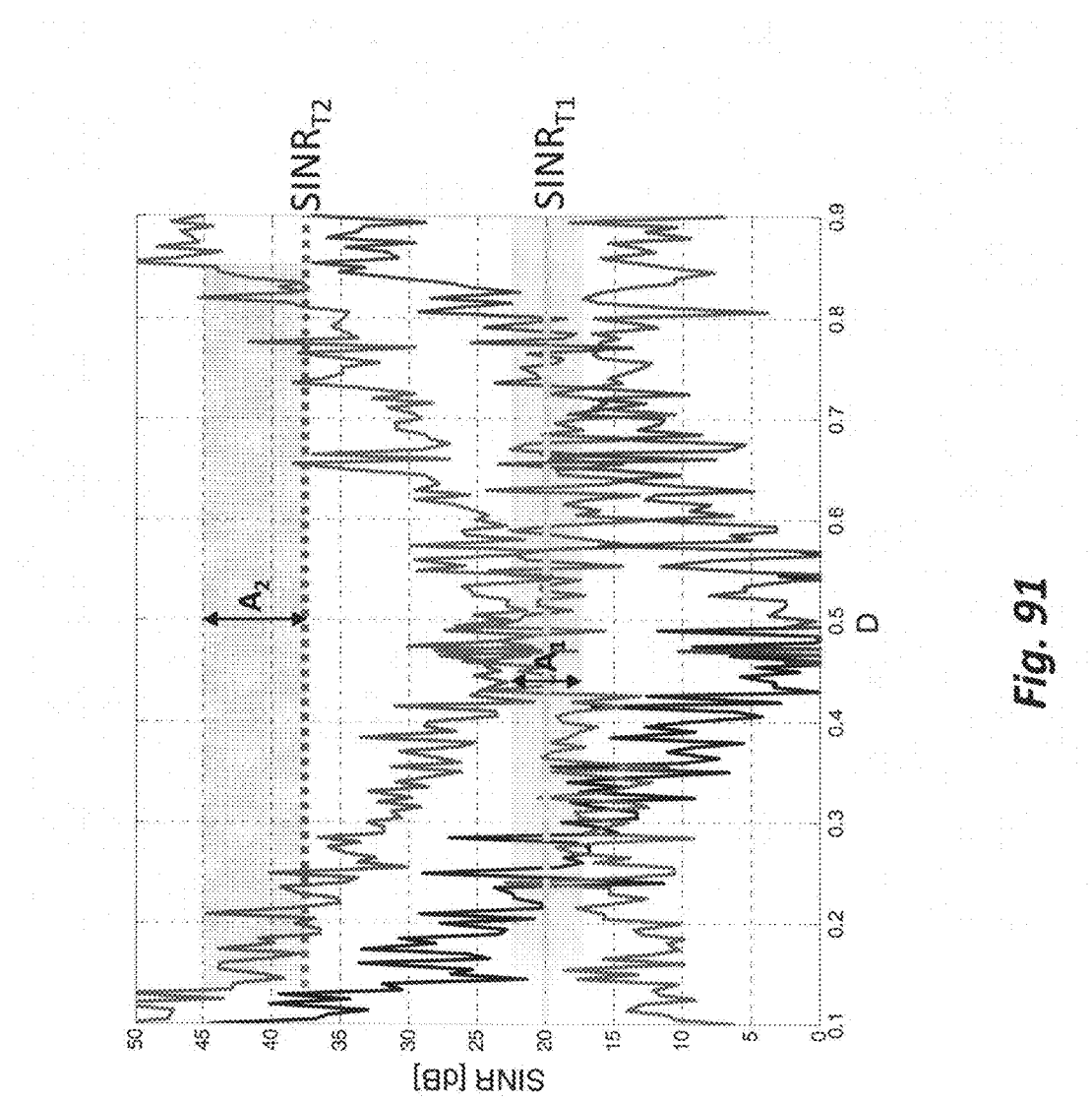
FIG. 91 illustrates depicts one embodiment of a handoff strategy in the presence of shadowing.

In presence of shadowing effects, the signal quality or SIR may fluctuate around the thresholds as shown in FIG. 91, causing repetitive switching between consecutive states in FIG. 90. Changing states repetitively is an undesired effect, since it results in significant overhead on the control channels between clients and BTSs to enable switching between transmission schemes. FIG. 91 depicts one example of a handoff strategy in the presence of shadowing. In one embodiment, the shadowing coefficient is simulated according to log-normal distribution with variance 3 [3]. Hereafter, we define some methods to prevent repetitive switching effect during DIDO handoff.

Figure 92:
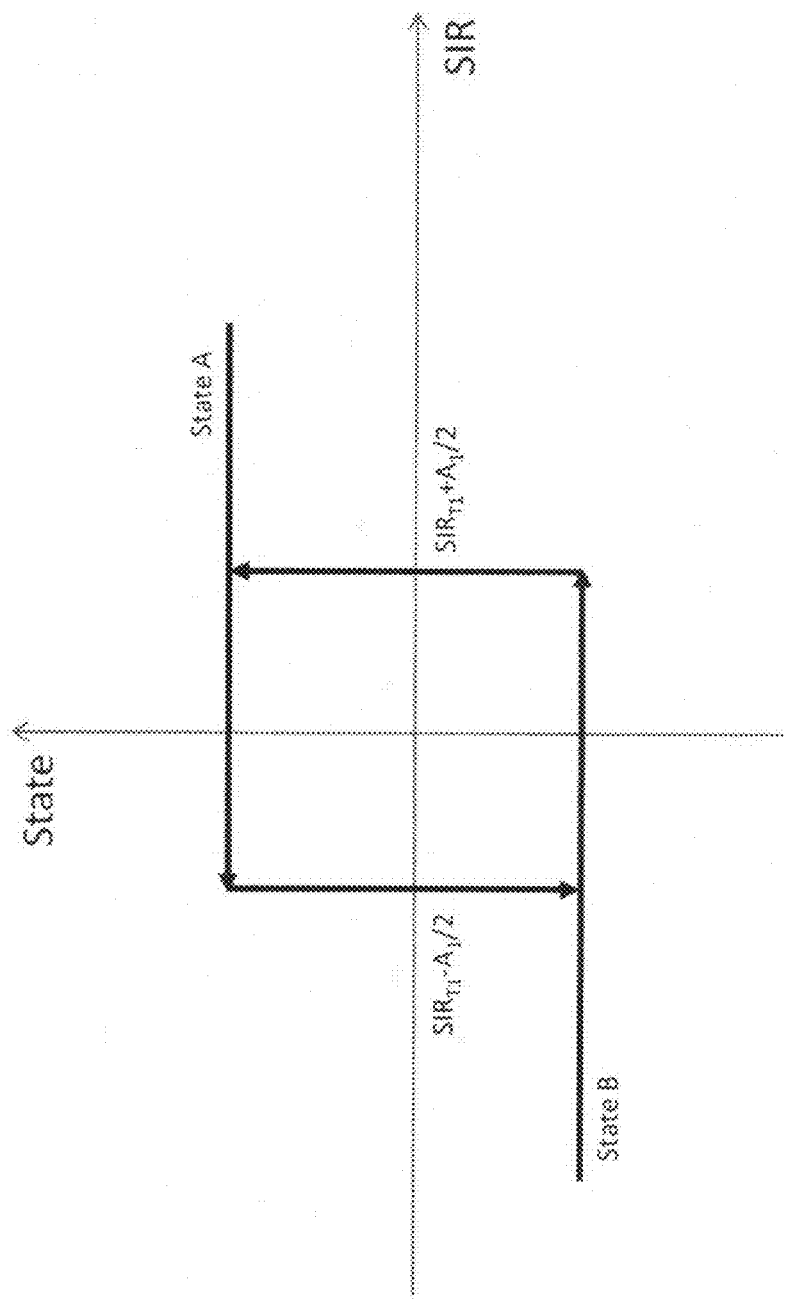
FIG. 92 illustrates a the hysteresis loop mechanism when switching between any two states in FIG. 93.

One embodiment of the invention employs a hysteresis loop to cope with state switching effects. For example, when switching between "C1-DIDO,C2-IDCI" 9302 and "C1-IDCI,C2-DIDO" 9303 states in FIG. 90 (or vice versa) the threshold $SINR_{T1}$ can be adjusted within the range $A_1$. This method avoids repetitive switches between states as the signal quality oscillates around $SINR_{T1}$. For example, FIG. 92 shows the hysteresis loop mechanism when switching between any two states in FIG. 90. To switch from state B to A the SIR must be larger than $(SIR_{T1}+A_1/2)$, but to switch back from A to B the SIR must drop below $(SIR_{T1}-A_1/2)$.

In a different embodiment, the threshold $SINR_{T2}$ is adjusted to avoid repetitive switching between the first and second (or third and fourth) states of the finite-state machine in FIG. 90. For example, a range of values $A_2$ may be defined such that the threshold $SINR_{T2}$ is chosen within that range depending on channel condition and shadowing effects.

In one embodiment, depending on the variance of shadowing expected over the wireless link, the SINR threshold is dynamically adjusted within the range $[SINR_{T2}, SINR_{T2}+A_2]$. The variance of the log-normal distribution can be estimated from the variance of the received signal strength (or RSSI) as the client moves from its current cluster to the neighbor cluster.

The methods above assume the client triggers the handoff strategy. In one embodiment, the handoff decision is deferred to the DIDO BTSs, assuming communication across multiple BTSs is enabled.

For simplicity, the methods above are derived assuming no FEC coding and 4-QAM. More generally, the SINR or SIR thresholds are derived for different modulation coding schemes (MCSs) and the handoff strategy is designed in combination with link adaptation (see, e.g., U.S. Pat. No. 7,636,381) to optimize downlink data rate to each client in the interfering zone.

b. Handoff Between Low- and High-Doppler DIDO Networks

DIDO systems employ closed-loop transmission schemes to precode data streams over the downlink channel. Closed-loop schemes are inherently constrained by latency over the feedback channel. In practical DIDO systems, computational time can be reduced by transceivers with high processing power and it is expected that most of the latency is introduced by the DIDO BSN, when delivering CSI and baseband precoded data from the BTS to the distributed antennas. The BSN can be comprised of various network technologies including, but not limited to, digital subscriber lines (DSL), cable modems, fiber rings, T1 lines, hybrid fiber coaxial (HFC) networks, and/or fixed wireless (e.g., WiFi). Dedicated fiber typically has very large bandwidth and low latency, potentially less than a millisecond in local region, but it is less widely deployed than DSL and cable modems. Today, DSL and cable modem connections typically have between 10-25 ms in last-mile latency in the United States, but they are very widely deployed.

The maximum latency over the BSN determines the maximum Doppler frequency that can be tolerated over the DIDO wireless link without performance degradation of DIDO precoding. For example, in [1] we showed that at the carrier frequency of 400 MHz, networks with latency of about 10 msec (i.e., DSL) can tolerate clients' velocity up to 8 mph (running speed), whereas networks with 1 msec latency (i.e., fiber ring) can support speed up to 70 mph (i.e., freeway traffic).

We define two or multiple DIDO sub-networks depending on the maximum Doppler frequency that can be tolerated over the BSN. For example, a BSN with high-latency DSL connections between the DIDO BTS and distributed antennas can only deliver low mobility or fixed-wireless services (i.e., low-Doppler network), whereas a low-latency BSN over a low-latency fiber ring can tolerate high mobility (i.e., high-Doppler network). We observe that the majority of broadband users are not moving when they use broadband, and further, most are unlikely to be located near areas with many high speed objects moving by (e.g., next to a highway) since such locations are typically less desirable places to live or operate an office. However, there are broadband users who will be using broadband at high speeds (e.g., while in a car driving on the highway) or will be near high speed objects (e.g., in a store located near a highway). To address these two differing user Doppler scenarios, in one embodiment, a low-Doppler DIDO network consists of a typically larger number of DIDO antennas with relatively low power (i.e., 1 W to 100 W, for indoor or rooftop installation) spread across a wide area, whereas a high-Doppler network consists of a typically lower number of DIDO antennas with high power transmission (i.e., 100 W for rooftop or tower installation). The low-Doppler DIDO network serves the typically larger number of low-Doppler users and can do so at typically lower connectivity cost using inexpensive high-latency broadband connections, such as DSL and cable modems. The high-Doppler DIDO network serves the typically fewer number of high-Doppler users and can do so at typically higher connectivity cost using more expensive low-latency broadband connections, such as fiber.

To avoid interference across different types of DIDO networks (e.g. low-Doppler and high-Doppler), different multiple access techniques can be employed such as: time division multiple access (TDMA), frequency division multiple access (FDMA), or code division multiple access (CDMA).

Hereafter, we propose methods to assign clients to different types of DIDO networks and enable handoff between them. The network selection is based on the type of mobility of each client. The client's velocity (v) is proportional to the maximum Doppler shift according to the following equation [6]

$$f_d = \frac{v}{\lambda}\sin\theta \qquad (11)$$

where $f_d$ is the maximum Doppler shift, $\lambda$ is the wavelength corresponding to the carrier frequency and $\theta$ is the angle between the vector indicating the direction transmitter-client and the velocity vector.

In one embodiment, the Doppler shift of every client is calculated via blind estimation techniques. For example, the Doppler shift can be estimated by sending RF energy to the client and analyzing the reflected signal, similar to Doppler radar systems.

In another embodiment, one or multiple DIDO antennas send training signals to the client. Based on those training signals, the client estimates the Doppler shift using techniques such as counting the zero-crossing rate of the channel gain, or performing spectrum analysis. We observe that for fixed velocity v and client's trajectory, the angular velocity v sin $\theta$ in (11) may depend on the relative distance of the client from every DIDO antenna. For example, DIDO antennas in the proximity of a moving client yield larger angular velocity and Doppler shift than faraway antennas. In one embodiment, the Doppler velocity is estimated from multiple DIDO antennas at different distances from the client and the average, weighted average or standard deviation is used as an indicator for the client's mobility. Based on the estimated Doppler indicator, the DIDO BTS decides whether to assign the client to low- or high-Doppler networks.

The Doppler indicator is periodically monitored for all clients and sent back to the BTS. When one or multiple clients change their Doppler velocity (i.e., client riding in the bus versus client walking or sitting), those clients are dynamically re-assigned to different DIDO network that can tolerate their level of mobility.

Although the Doppler of low-velocity clients can be affected by being in the vicinity of high-velocity objects (e.g. near a highway), the Doppler is typically far less than the Doppler of clients that are in motion themselves. As such, in one embodiment, the velocity of the client is estimated (e.g. by using a means such as monitoring the clients position using GPS), and if the velocity is low, the client is assigned to a low-Doppler network, and if the velocity if high, the client is assigned to a high-Doppler network.

Methods for Power Control and Antenna Grouping

Figure 93:
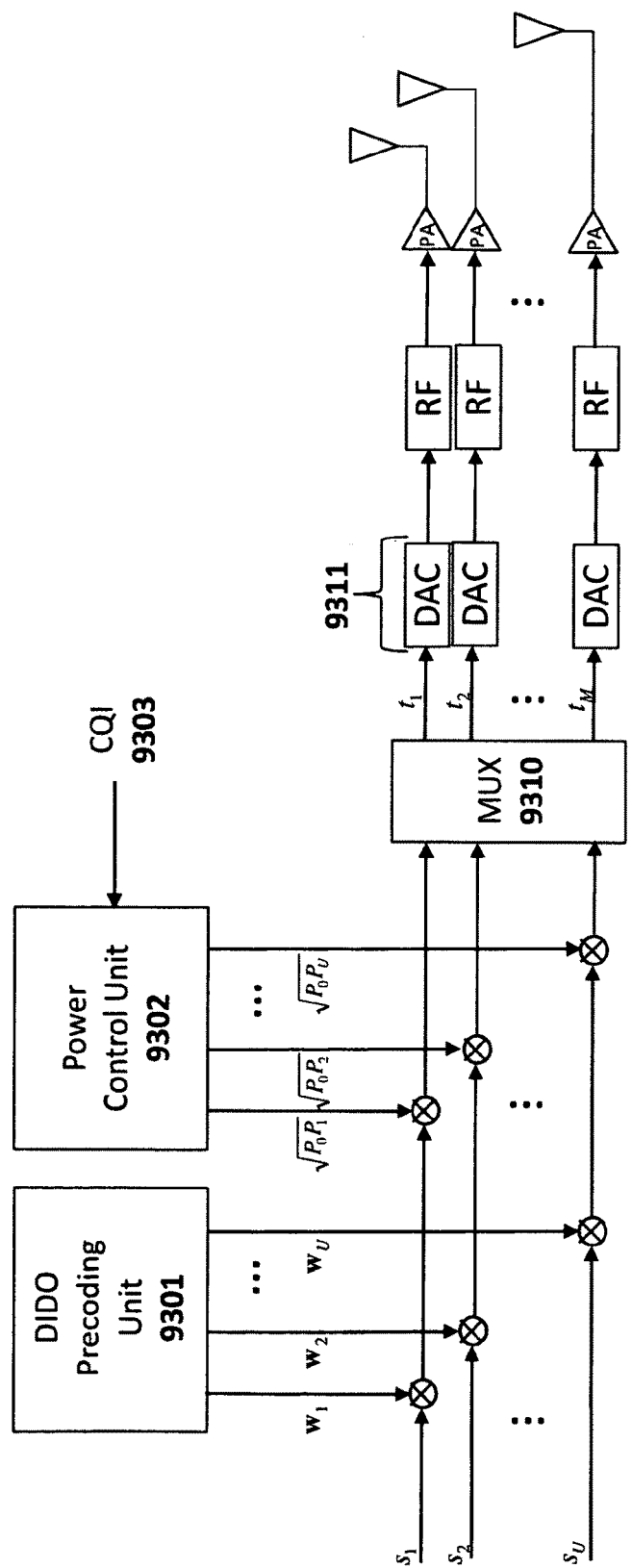
FIG. 93 illustrates one embodiment of a DIDO system with power control.

The block diagram of DIDO systems with power control is depicted in FIG. 93. One or multiple data streams ($s_k$) for every client (1, . . . , U) are first multiplied by the weights generated by the DIDO precoding unit. Precoded data streams are multiplied by power scaling factor computed by the power control unit, based on the input channel quality information (CQI). The CQI is either fed back from the clients to DIDO BTS or derived from the uplink channel assuming uplink-downlink channel reciprocity. The U precoded streams for different clients are then combined and multiplexed into M data streams ($t_m$), one for each of the M transmit antennas. Finally, the streams $t_m$ are sent to the digital-to-analog converter (DAC) unit, the radio frequency (RF) unit, power amplifier (PA) unit and finally to the antennas.

The power control unit measures the CQI for all clients. In one embodiment, the CQI is the average SNR or RSSI. The CQI varies for different clients depending on pathloss or shadowing. Our power control method adjusts the transmit power scaling factors $P_k$ for different clients and multiplies them by the precoded data streams generated for different clients. Note that one or multiple data streams may be generated for every client, depending on the number of clients' receive antennas.

To evaluate the performance of the proposed method, we defined the following signal model based on (5), including pathloss and power control parameters $$r_k = \sqrt{SNR P_k \alpha_k} H_k W_k s_k + n_k \quad (12)$$

where k=1, . . . , U, U is the number of clients, SNR=$P_o/N_o$, with $P_o$ being the average transmit power, $N_o$ the noise power and $\alpha_k$ the pathloss/shadowing coefficient. To model pathloss/shadowing, we use the following simplified model $$\alpha_k = e^{-a\frac{k-1}{U}} \quad (13)$$

where a=4 is the pathloss exponent and we assume the pathloss increases with the clients' index (i.e., clients are located at increasing distance from the DIDO antennas).

Figure 94:
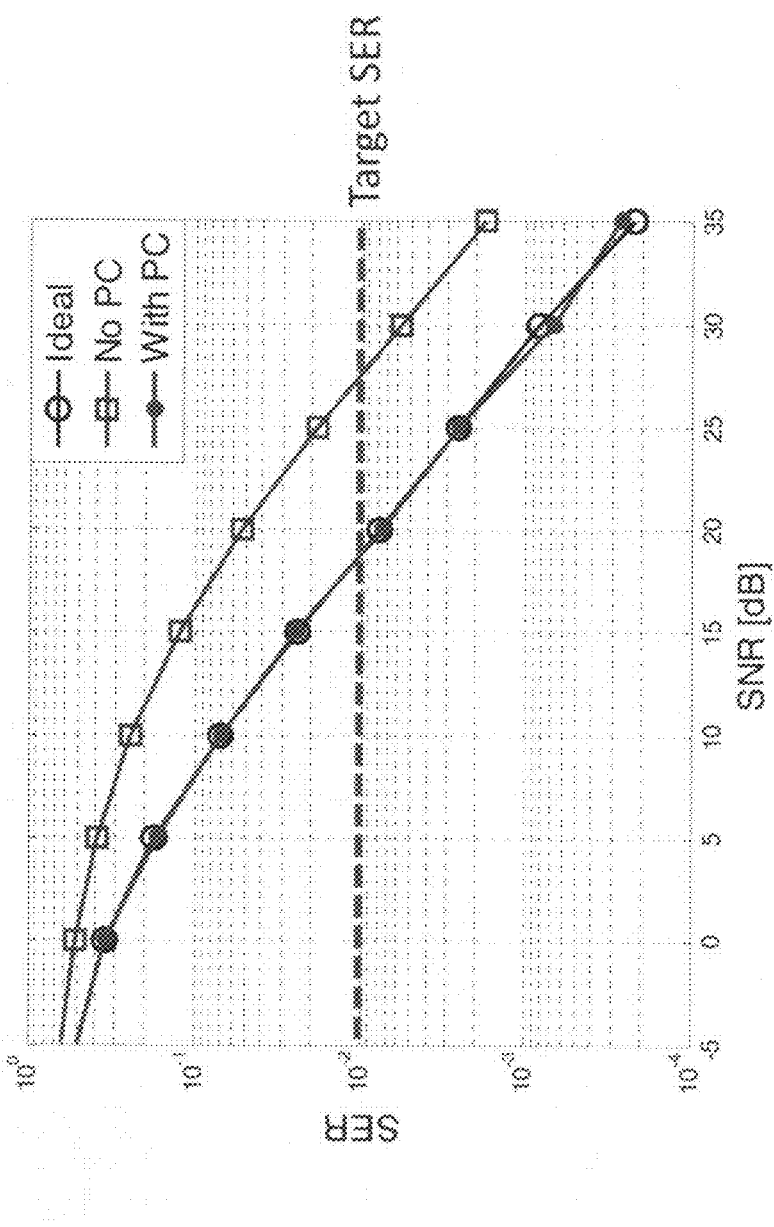
FIG. 94 illustrates the SER versus SNR assuming four DIDO transmit antennas and four clients in different scenarios.

FIG. 94 shows the SER versus SNR assuming four DIDO transmit antennas and four clients in different scenarios. The ideal case assumes all clients have the same pathloss (i.e., a=0), yielding $P_k$=1 for all clients. The plot with squares refers to the case where clients have different pathloss coefficients and no power control. The curve with dots is derived from the same scenario (with pathloss) where the power control coefficients are chosen such that $P_k=1/\alpha_k$. With the power control method, more power is assigned to the data streams intended to the clients that undergo higher pathloss/shadowing, resulting in 9 dB SNR gain (for this particular scenario) compared to the case with no power control.

The Federal Communications Commission (FCC) (and other international regulatory agencies) defines constraints on the maximum power that can be transmitted from wireless devices to limit the exposure of human body to electromagnetic (EM) radiation. There are two types of limits [2]: i) "occupational/controlled" limit, where people are made fully aware of the radio frequency (RF) source via fences, warnings or labels; ii) "general population/uncontrolled" limit where there is no control over the exposure.

Different emission levels are defined for different types of wireless devices. In general, DIDO distributed antennas used for indoor/outdoor applications qualify for the FCC category of "mobile" devices, defined as [2]: "transmitting devices designed to be used in other than fixed locations that would normally be used with radiating structures maintained 20 cm or more from the body of the user or nearby persons."

Figure 95:
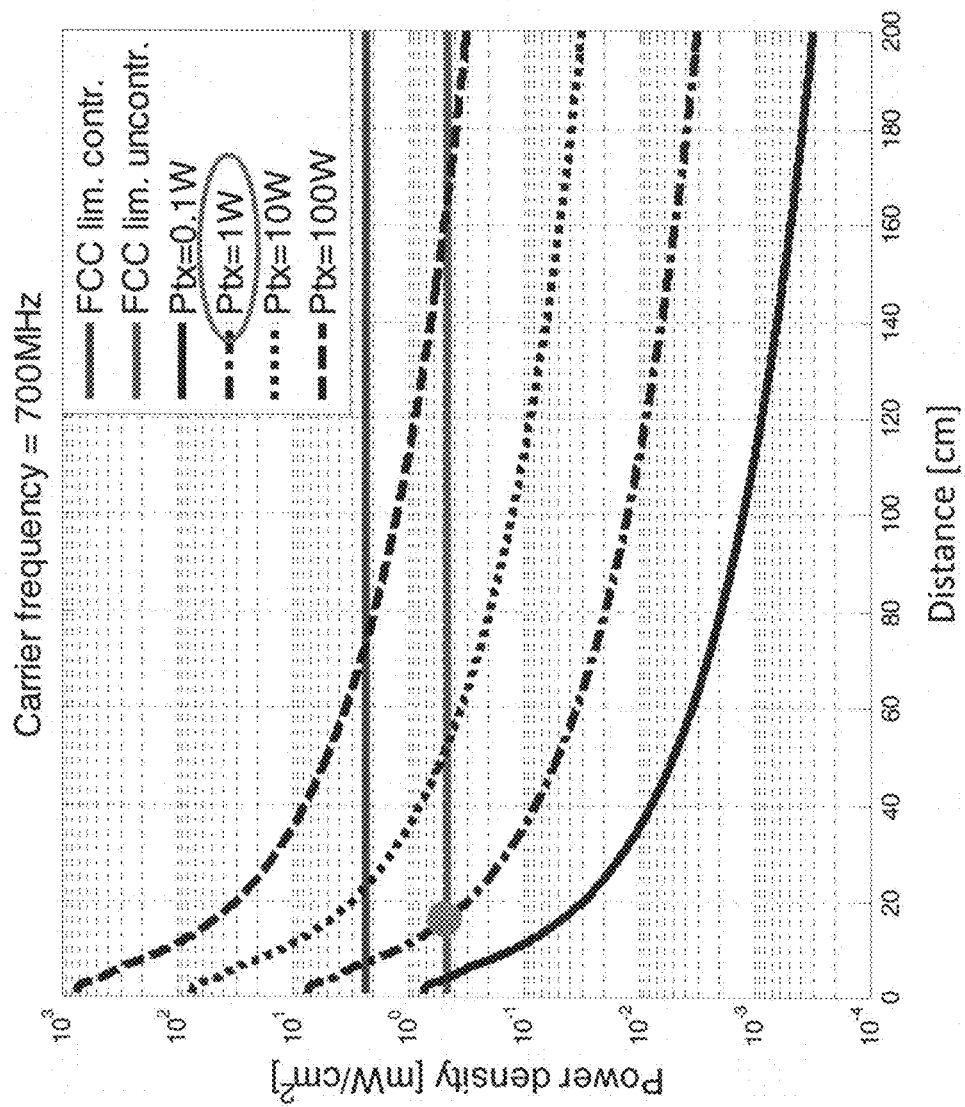
FIG. 95 illustrates MPE power density as a function of distance from the source of RF radiation for different values of transmit power according to one embodiment of the invention.

The EM emission of "mobile" devices is measured in terms of maximum permissible exposure (MPE), expressed in mW/cm². FIG. 95 shows the MPE power density as a function of distance from the source of RF radiation for different values of transmit power at 700 MHz carrier frequency. The maximum allowed transmit power to meet the FCC "uncontrolled" limit for devices that typically operate beyond 20 cm from the human body is 1 W.

Less restrictive power emission constraints are defined for transmitters installed on rooftops or buildings, away from the "general population". For these "rooftop transmitters" the FCC defines a looser emission limit of 1000 W, measured in terms of effective radiated power (ERP).

Based on the above FCC constraints, in one embodiment we define two types of DIDO distributed antennas for practical systems:

Low-power (LP) transmitters: located anywhere (i.e., indoor or outdoor) at any height, with maximum transmit power of 1 W and 5 Mbps consumer-grade broadband (e.g. DSL, cable modem, Fibe To The Home (FTTH)) backhaul connectivity.

High-power (HP) transmitters: rooftop or building mounted antennas at height of approximately 10 meters, with transmit power of 100 W and a commercial-grade broadband (e.g. optical fiber ring) backhaul (with effectively "unlimited" data rate compared to the throughput available over the DIDO wireless links).

Note that LP transmitters with DSL or cable modem connectivity are good candidates for low-Doppler DIDO networks (as described in the previous section), since their clients are mostly fixed or have low mobility. HP transmitters with commercial fiber connectivity can tolerate higher client's mobility and can be used in high-Doppler DIDO networks.

Figures 96A, 96B:
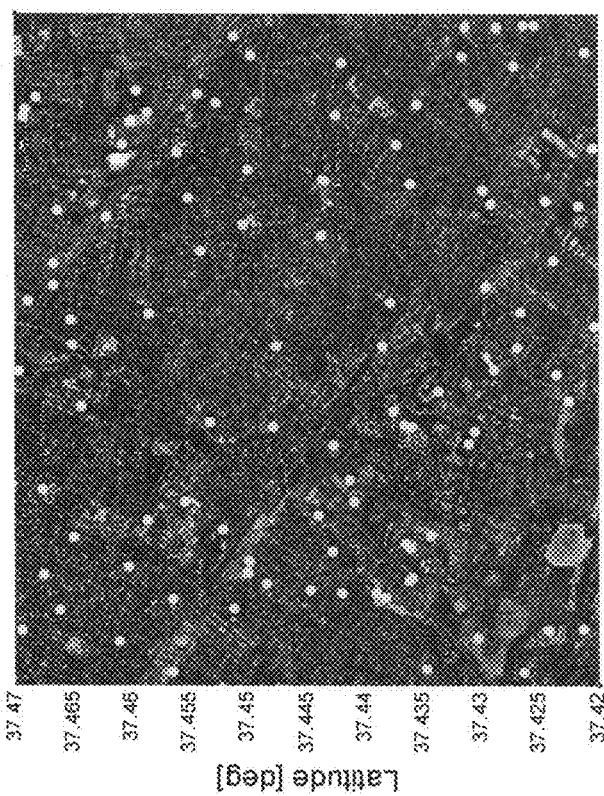
FIG. 96-*b* illustrate different distributions of low-power and high-power DIDO distributed antennas.

To gain practical intuition on the performance of DIDO systems with different types of LP/HP transmitters, we consider the practical case of DIDO antenna installation in downtown Palo Alto, Calif. FIG. 96a shows a random distribution of $N_{LP}$=100 low-power DIDO distributed antennas in Palo Alto. In FIG. 96b, 50 LP antennas are substituted with $N_{HP}$=50 high-power transmitters.

Based on the DIDO antenna distributions in FIGS. 96a-b, we derive the coverage maps in Palo Alto for systems using DIDO technology. FIGS. 97a and 97b show two power distributions corresponding to the configurations in FIG. 96a and FIG. 96b, respectively. The received power distribution (expressed in dBm) is derived assuming the pathloss/shadowing model for urban environments defined by the 3GPP standard [3] at the carrier frequency of 700 MHz. We observe that using 50% of HP transmitters yields better coverage over the selected area.

Figures 98A, 98B:
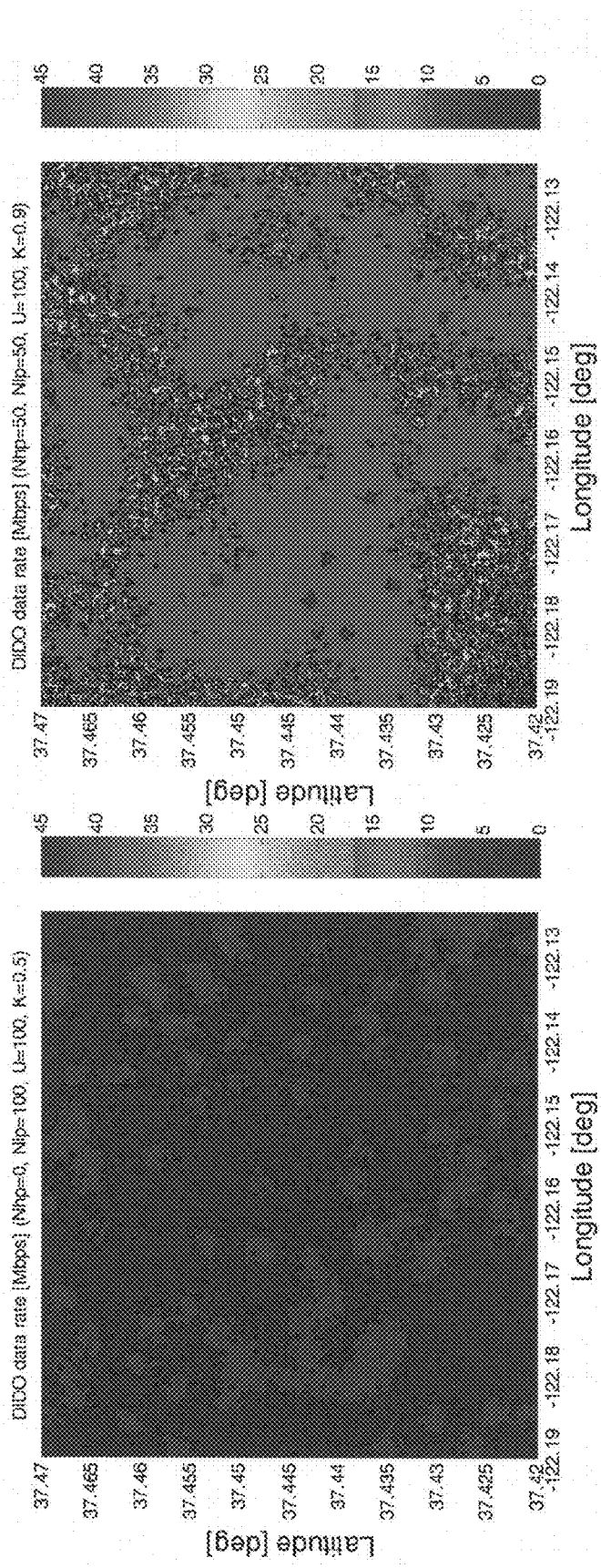
FIG. 98*a-b* illustrate the rate distribution for the two scenarios shown in FIGS. 99*a* and 99*b*, respectively.

FIGS. 98a-b depict the rate distribution for the two scenarios above. The throughput (expressed in Mbps) is derived based on power thresholds for different modulation coding schemes defined in the 3GPP long-term evolution (LTE) standard in [4,5]. The total available bandwidth is fixed to 10 MHz at 700 MHz carrier frequency. Two different frequency allocation plans are considered: i) 5 MHz spectrum allocated only to the LP stations; ii) 9 MHz to HP transmitters and 1 MHz to LP transmitters. Note that lower bandwidth is typically allocated to LP stations due to their DSL backhaul connectivity with limited throughput. FIGS. 98a-b shows that when using 50% of HP transmitters it is possible to increase significantly the rate distribution, raising the average per-client data rate from 2.4 Mbps in FIGS. 98a to 38 Mbps in FIG. 98b.

Next, we defined algorithms to control power transmission of LP stations such that higher power is allowed at any given time, thereby increasing the throughput over the downlink channel of DIDO systems in FIG. 98b. We observe that the FCC limits on the power density is defined based on average over time as [2]

$$S = \frac{\sum_{n=1}^{N} S_n t_n}{T_{MPE}} \quad (14)$$

where $T_{MPE} = \Sigma_{n=1}^N t_n$ is the MPE averaging time, $t_n$ is the period of time of exposure to radiation with power density $S_n$. For "controlled" exposure the average time is 6 minutes, whereas for "uncontrolled" exposure it is increased up to 30 minutes. Then, any power source is allowed to transmit at larger power levels than the MPE limits, as long as the average power density in (14) satisfies the FCC limit over 30 minute average for "uncontrolled" exposure.

Based on this analysis, we define adaptive power control methods to increase instantaneous per-antenna transmit power, while maintaining average power per DIDO antenna below MPE limits. We consider DIDO systems with more transmit antennas than active clients. This is a reasonable assumption given that DIDO antennas can be conceived as inexpensive wireless devices (similar to WiFi access points) and can be placed anywhere there is DSL, cable modem, optical fiber, or other Internet connectivity.

Figure 99:
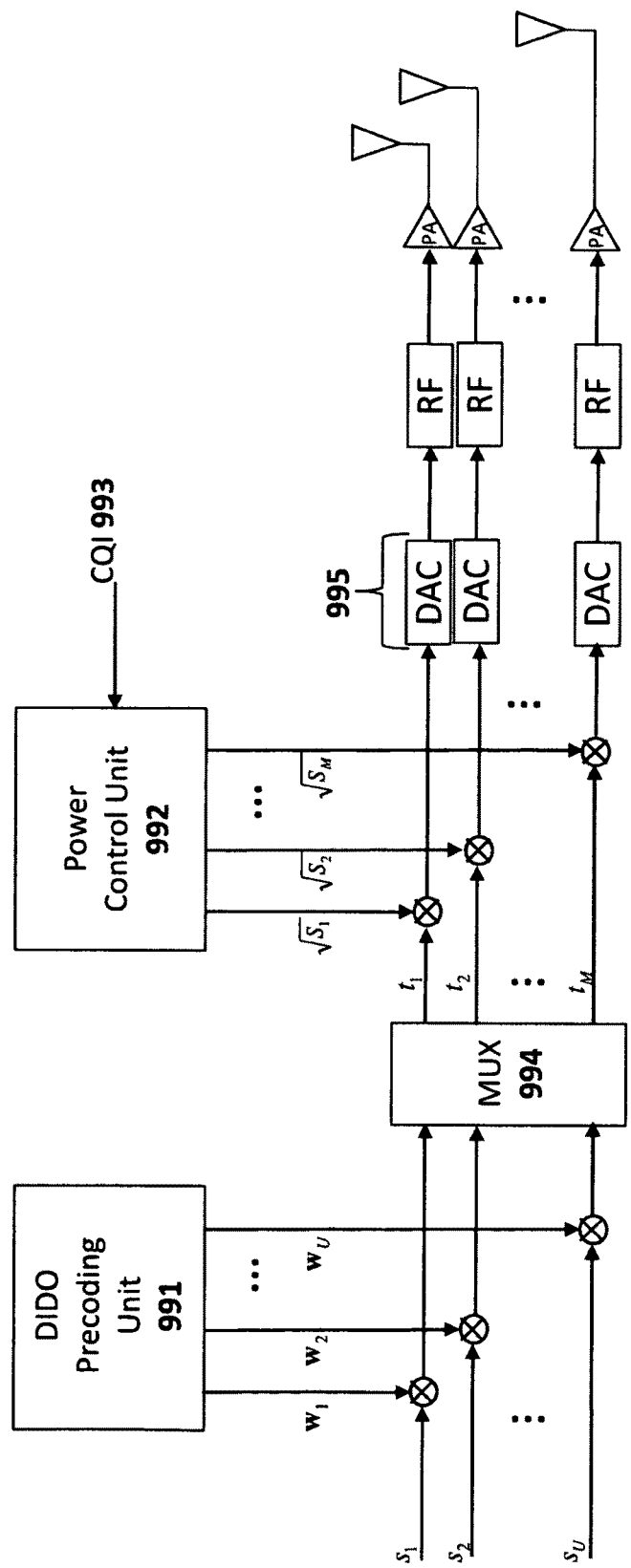
FIG. 99 illustrates one embodiment of a DIDO system with power control.
Figure 100:
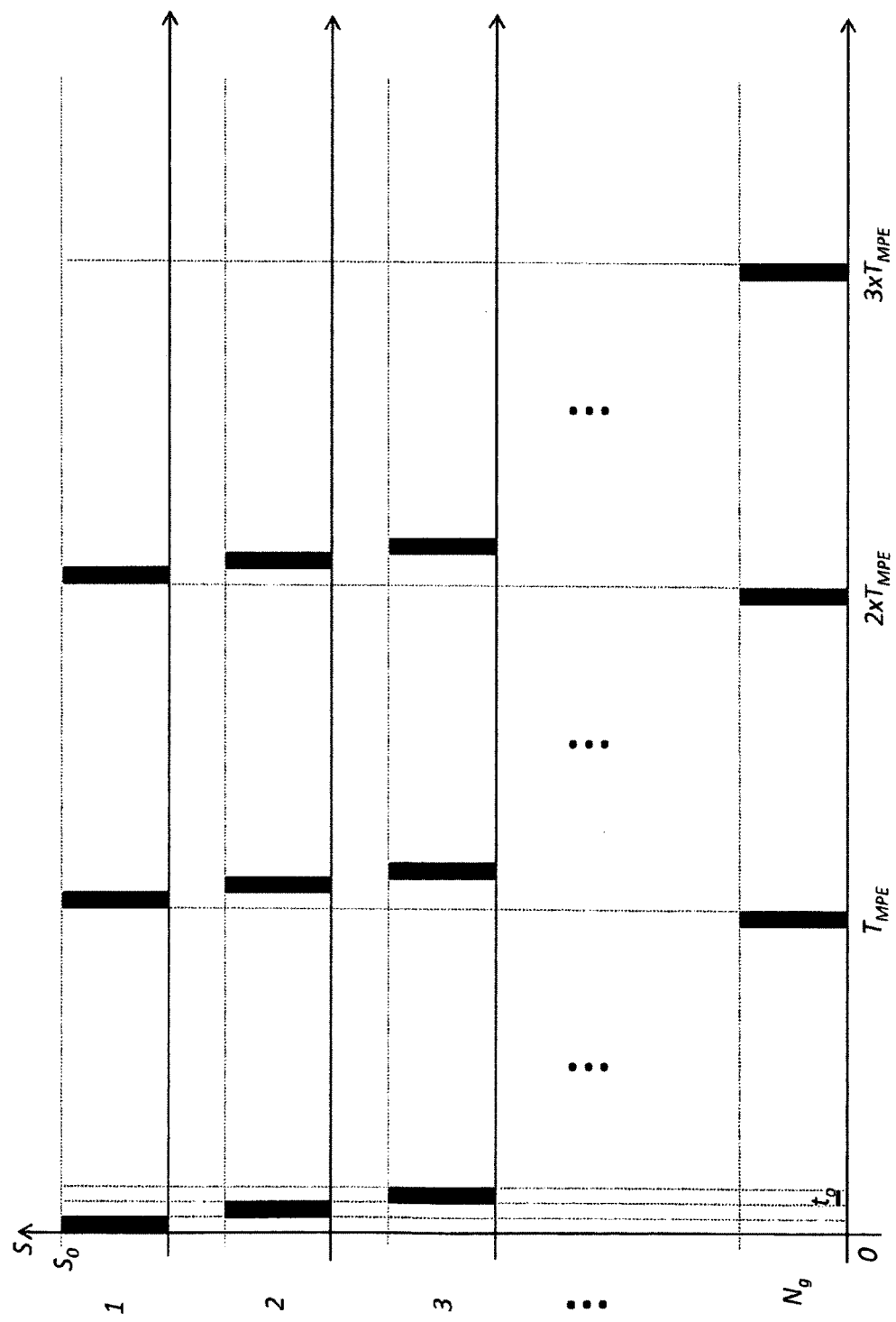
FIG. 100 illustrates one embodiment of a method which iterates across all antenna groups according to Round-Robin scheduling policy for transmitting data.

The framework of DIDO systems with adaptive per-antenna power control is depicted in FIG. 99. The amplitude of the digital signal coming out of the multiplexer 994 is dynamically adjusted with power scaling factors $S_1, \ldots, S_m$, before being sent to the DAC units 995. The power scaling factors are computed by the power control unit 992 based on the CQI 993.

In one embodiment, $N_g$ DIDO antenna groups are defined. Every group contains at least as many DIDO antennas as the number of active clients (K). At any given time, only one group has $N_a > K$ active DIDO antennas transmitting to the clients at larger power level ($S_o$) than MPE limit ($\overline{MPE}$). One method iterates across all antenna groups according to Round-Robin scheduling policy depicted in FIG. 100. In another embodiment, different scheduling techniques (i.e., proportional-fair scheduling [8]) are employed for cluster selection to optimize error rate or throughput performance.

Assuming Round-Robin power allocation, from (14) we derive the average transmit power for every DIDO antenna as $$S = S_o \frac{t_o}{T_{MPE}} \leq \overline{MPE} \qquad (15)$$

where $t_o$ is the period of time over which the antenna group is active and $T_{MPE}$=30 min is the average time defined by the FCC guidelines [2]. The ratio in (15) is the duty factor (DF) of the groups, defined such that the average transmit power from every DIDO antenna satisfies the MPE limit ($\overline{MPE}$). The duty factor depends on the number of active clients, the number of groups and active antennas per-group, according to the following definition $$DF \triangleq \frac{K}{N_g N_a} = \frac{t_o}{T_{MPE}}. \qquad (16)$$

The SNR gain (in dB) obtained in DIDO systems with power control and antenna grouping is expressed as a function of the duty factor as $$G_{db} = 10 \log_{10}\left(\frac{1}{DF}\right). \qquad (17)$$

We observe the gain in (17) is achieved at the expense of $G_{dB}$ additional transmit power across all DIDO antennas.

In general, the total transmit power from all $N_a$ of all $N_g$ groups is defined as $$\overline{P} = \Sigma_{j=1}^{N_g} \Sigma_{i=1}^{N_a} P_{ij} \qquad (18)$$

where the $P_{ij}$ is the average per-antenna transmit power given by $$P_{ij} = \frac{1}{T_{MPE}} \int_0^{T_{MPE}} S_{ij}(t)\, dt \leq \overline{MPE} \qquad (19)$$

and $S_{ij}(t)$ is the power spectral density for the $i^{th}$ transmit antenna within the $j^{th}$ group. In one embodiment, the power spectral density in (19) is designed for every antenna to optimize error rate or throughput performance.

To gain some intuition on the performance of the proposed method, consider 400 DIDO distributed antennas in a given coverage area and 400 clients subscribing to a wireless Internet service offered over DIDO systems. It is unlikely that every Internet connection will be fully utilized all the time. Let us assume that 10% of the clients will be actively using the wireless Internet connection at any given time. Then, 400 DIDO antennas can be divided in $N_g$=10 groups of $N_a$=40 antennas each, every group serving K=40 active clients at any given time with duty factor DF=0.1. The SNR gain resulting from this transmission scheme is $G_{dB}$=10 $\log_{10}(1/DF)$=10 dB, provided by 10 dB additional transmit power from all DIDO antennas. We observe, however, that the average per-antenna transmit power is constant and is within the MPE limit.

Figure 101:
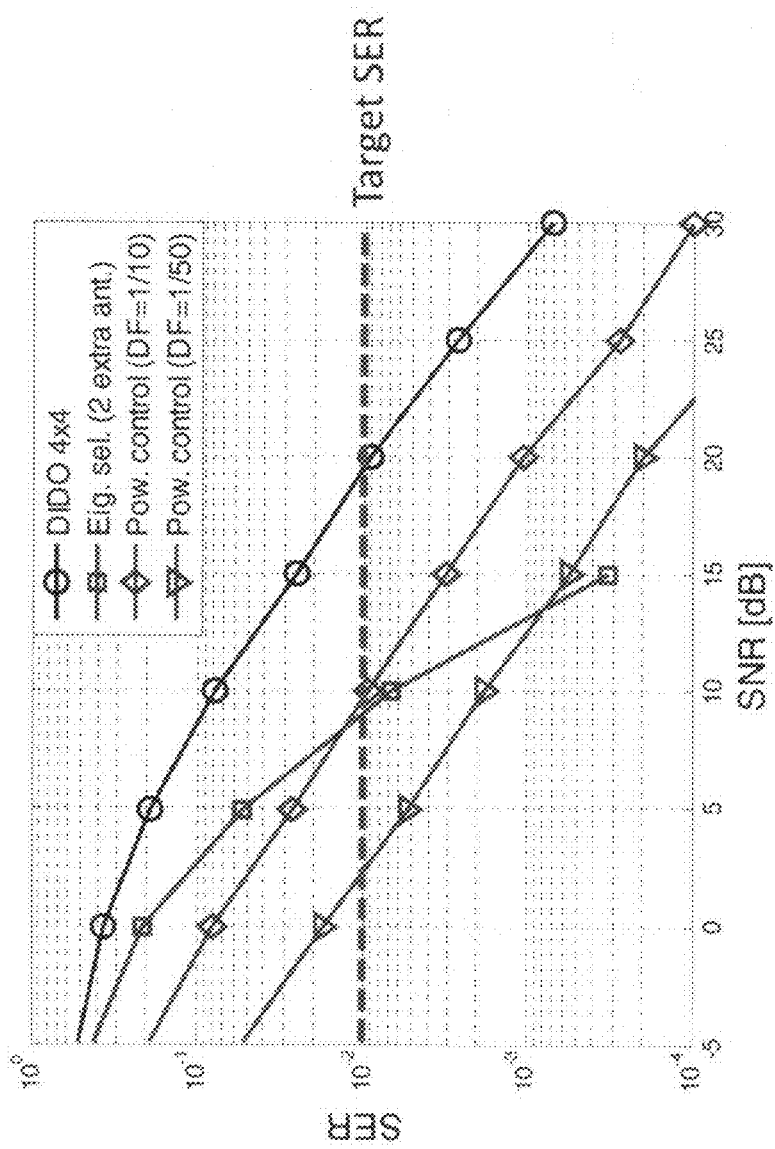
FIG. 101 illustrates a comparison of the uncoded SER performance of power control with antenna grouping against conventional eigenmode selection in U.S. Pat. No. 7,636,381.
Figure 102:
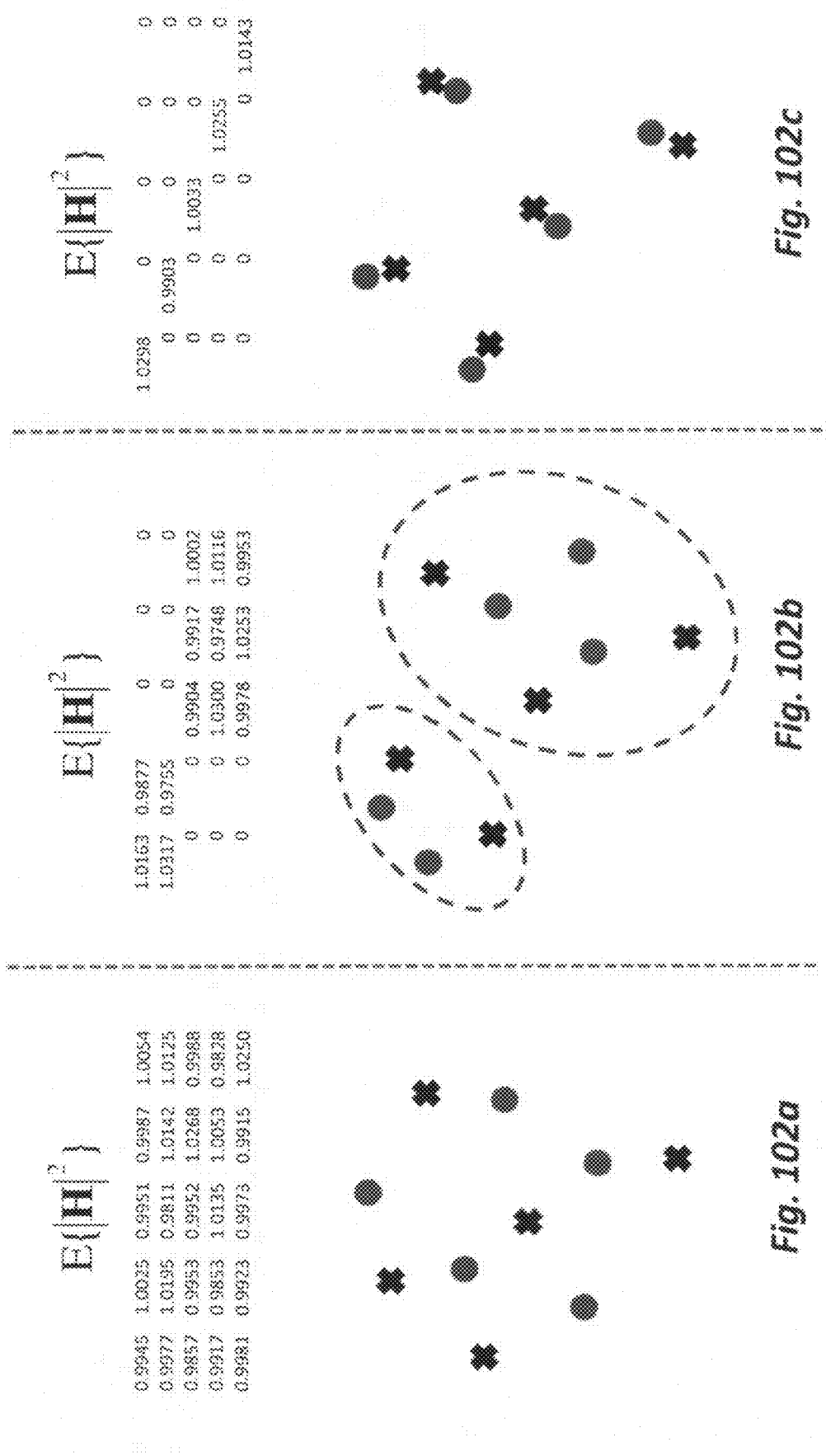
FIGS. 102*a-c* illustrate thee scenarios in which BD precoding dynamically adjusts the precoding weights to account for different power levels over the wireless links between DIDO antennas and clients.

FIG. 101 compares the (uncoded) SER performance of the above power control with antenna grouping against conventional eigenmode selection in U.S. Pat. No. 7,636, 381. All schemes use BD precoding with four clients, each client equipped with single antenna. The SNR refers to the ratio of per-transmit-antenna power over noise power (i.e., per-antenna transmit SNR). The curve denoted with DIDO 4×4 assumes four transmit antenna and BD precoding. The curve with squares denotes the SER performance with two extra transmit antennas and BD with eigenmode selection, yielding 10 dB SNR gain (at 1% SER target) over conventional BD precoding. Power control with antenna grouping and DF=1/10 yields 10 dB gain at the same SER target as well. We observe that eigenmode selection changes the slope of the SER curve due to diversity gain, whereas our power control method shifts the SER curve to the left (maintaining the same slope) due to increased average transmit power. For comparison, the SER with larger duty factor DF=1/50 is shown to provide additional 7 dB gain compared to DF=1/10.

Note that our power control may have lower complexity than conventional eigenmode selection methods. In fact, the antenna ID of every group can be pre-computed and shared among DIDO antennas and clients via lookup tables, such that only K channel estimates are required at any given time. For eigenmode selection, (K+2) channel estimates are computed and additional computational processing is required to select the eigenmode that minimizes the SER at any given time for all clients.

Next, we describe another method involving DIDO antenna grouping to reduce CSI feedback overhead in some special scenarios. FIG. 102a shows one scenario where clients (dots) are spread randomly in one area covered by multiple DIDO distributed antennas (crosses). The average power over every transmit-receive wireless link can be computed as $$A = \{|H|^2\}. \qquad (20)$$

where H is the channel estimation matrix available at the DIDO BTS.

The matrices A in FIGS. 102a-c are obtained numerically by averaging the channel matrices over 1000 instances. Two alternative scenarios are depicted in FIG. 102b and FIG.

102c, respectively, where clients are grouped together around a subset of DIDO antennas and receive negligible power from DIDO antennas located far away. For example, FIG. 102b shows two groups of antennas yielding block diagonal matrix A. One extreme scenario is when every client is very close to only one transmitter and the transmitters are far away from one another, such that the power from all other DIDO antennas is negligible. In this case, the DIDO link degenerates in multiple SISO links and A is a diagonal matrix as in FIG. 102c.

In all three scenarios above, the BD precoding dynamically adjusts the precoding weights to account for different power levels over the wireless links between DIDO antennas and clients. It is convenient, however, to identify multiple groups within the DIDO cluster and operate DIDO precoding only within each group. Our proposed grouping method yields the following advantages:

Computational gain: DIDO precoding is computed only within every group in the cluster. For example, if BD precoding is used, singular value decomposition (SVD) has complexity $O(n^3)$, where n is the minimum dimension of the channel matrix H. If H can be reduced to a block diagonal matrix, the SVD is computed for every block with reduced complexity. In fact, if the channel matrix is divided into two block matrices with dimensions $n_1$ and $n_2$ such that $n=n_1+n_2$, the complexity of the SVD is only $O(n_1^3)+O(n_2^3)<O(n^3)$. In the extreme case, if H is diagonal matrix, the DIDO link reduce to multiple SISO links and no SVD calculation is required.

Reduced CSI feedback overhead: When DIDO antennas and clients are divided into groups, in one embodiment, the CSI is computed from the clients to the antennas only within the same group. In TDD systems, assuming channel reciprocity, antenna grouping reduces the number of channel estimates to compute the channel matrix H. In FDD systems where the CSI is fed back over the wireless link, antenna grouping further yields reduction of CSI feedback overhead over the wireless links between DIDO antennas and clients.

Multiple Access Techniques for the DIDO Uplink Channel

In one embodiment of the invention, different multiple access techniques are defined for the DIDO uplink channel. These techniques can be used to feedback the CSI or transmit data streams from the clients to the DIDO antennas over the uplink. Hereafter, we refer to feedback CSI and data streams as uplink streams.

Multiple-input multiple-output (MIMO): the uplink streams are transmitted from the client to the DIDO antennas via open-loop MIMO multiplexing schemes. This method assumes all clients are time/frequency synchronized. In one embodiment, synchronization among clients is achieved via training from the downlink and all DIDO antennas are assumed to be locked to the same time/frequency reference clock. Note that variations in delay spread at different clients may generate jitter between the clocks of different clients that may affect the performance of MIMO uplink scheme. After the clients send uplink streams via MIMO multiplexing schemes, the receive DIDO antennas may use non-linear (i.e., maximum likelihood, ML) or linear (i.e., zeros-forcing, minimum mean squared error) receivers to cancel co-channel interference and demodulate the uplink streams individually.

Time division multiple access (TDMA): Different clients are assigned to different time slots. Every client sends its uplink stream when its time slot is available.

Frequency division multiple access (FDMA): Different clients are assigned to different carrier frequencies. In multicarrier (OFDM) systems, subsets of tones are assigned to different clients that transmit the uplink streams simultaneously, thereby reducing latency.

Code division multiple access (CDMA): Every client is assigned to a different pseudo-random sequence and orthogonality across clients is achieved in the code domain.

In one embodiment of the invention, the clients are wireless devices that transmit at much lower power than the DIDO antennas. In this case, the DIDO BTS defines client sub-groups based on the uplink SNR information, such that interference across sub-groups is minimized. Within every sub-group, the above multiple access techniques are employed to create orthogonal channels in time, frequency, space or code domains thereby avoiding uplink interference across different clients.

In another embodiment, the uplink multiple access techniques described above are used in combination with antenna grouping methods presented in the previous section to define different client groups within the DIDO cluster.

System and Method for Link Adaptation in DIDO Multicarrier Systems

Link adaptation methods for DIDO systems exploiting time, frequency and space selectivity of wireless channels were defined in U.S. Pat. No. 7,636,381. Described below are embodiments of the invention for link adaptation in multicarrier (OFDM) DIDO systems that exploit time/frequency selectivity of wireless channels.

We simulate Rayleigh fading channels according to the exponentially decaying power delay profile (PDP) or Saleh-Valenzuela model in [9]. For simplicity, we assume single-cluster channel with multipath PDP defined as $$P_n = e^{-\beta n} \quad (21)$$

where n=0, ..., L−1, is the index of the channel tap, L is the number of channel taps and $\beta=1/\sigma_{DS}$ is the PDP exponent that is an indicator of the channel coherence bandwidth, inverse proportional to the channel delay spread ($\sigma_{DS}$). Low values of $\beta$ yield frequency-flat channels, whereas high values of $\beta$ produce frequency selective channels. The PDP in (21) is normalized such that the total average power for all L channel taps is unitary $$\bar{P}_n = \frac{P_n}{\sum_{i=0}^{L-1} P_i}. \quad (22)$$

Figure 103:
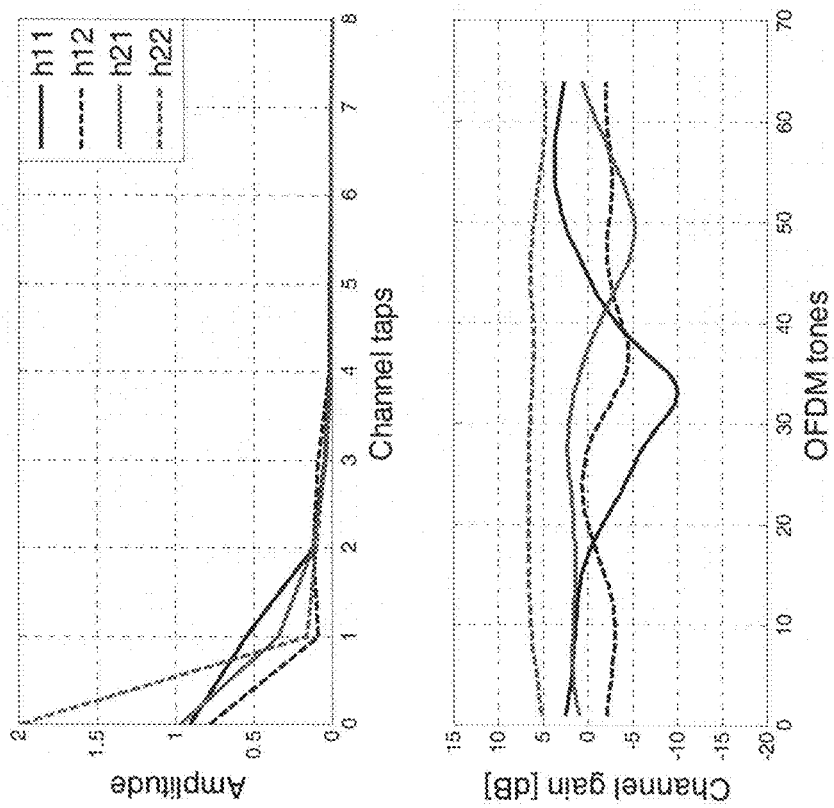
FIG. 103 illustrates the amplitude of low frequency selective channels (assuming $\beta=1$) over delay domain or instantaneous PDP (upper plot) and frequency domain (lower plot) for DIDO 2×2 systems
Figure 104:
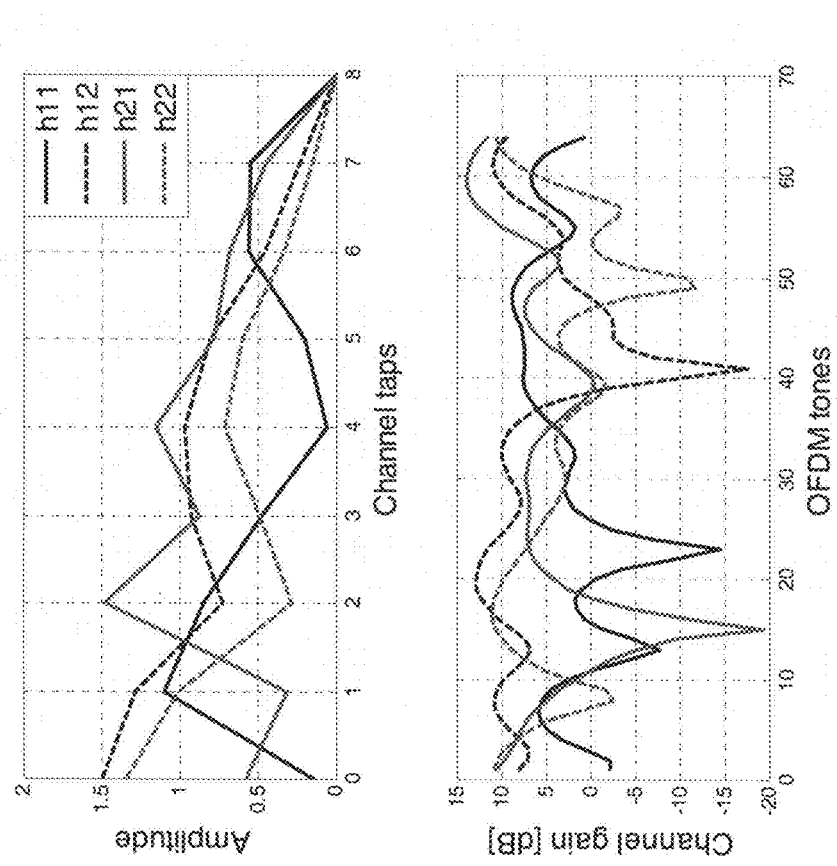
FIG. 104 illustrates one embodiment of a channel matrix frequency response for DIDO 2×2, with a single antenna per client.

FIG. 103 depicts the amplitude of low frequency selective channels (assuming $\beta=1$) over delay domain or instantaneous PDP (upper plot) and frequency domain (lower plot) for DIDO 2×2 systems. The first subscript indicates the client, the second subscript the transmit antenna. High frequency selective channels (with $\beta=0.1$) are shown in FIG. 104.

Next, we study the performance of DIDO precoding in frequency selective channels. We compute the DIDO precoding weights via BD, assuming the signal model in (1) that satisfies the condition in (2). We reformulate the DIDO receive signal model in (5), with the condition in (2), as $$r_k = H_{ek} s_k + n_k. \quad (23)$$

where $H_{ek} = H_k W_k$ is the effective channel matrix for user k. For DIDO 2×2, with a single antenna per client, the effective channel matrix reduces to one value with a frequency response shown in FIG. 105 and for channels characterized by high frequency selectivity (e.g., with $\beta=0.1$) in FIG. 104. The continuous line in FIG. 105 refers to client 1, whereas the line with dots refers to client 2. Based on the channel quality metric in FIG. 105 we define time/frequency domain link adaptation (LA) methods that dynamically adjust MCSs, depending on the changing channel conditions.

We begin by evaluating the performance of different MCSs in AWGN and Rayleigh fading SISO channels. For simplicity, we assume no FEC coding, but the following LA methods can be extended to systems that include FEC.

Figure 106:
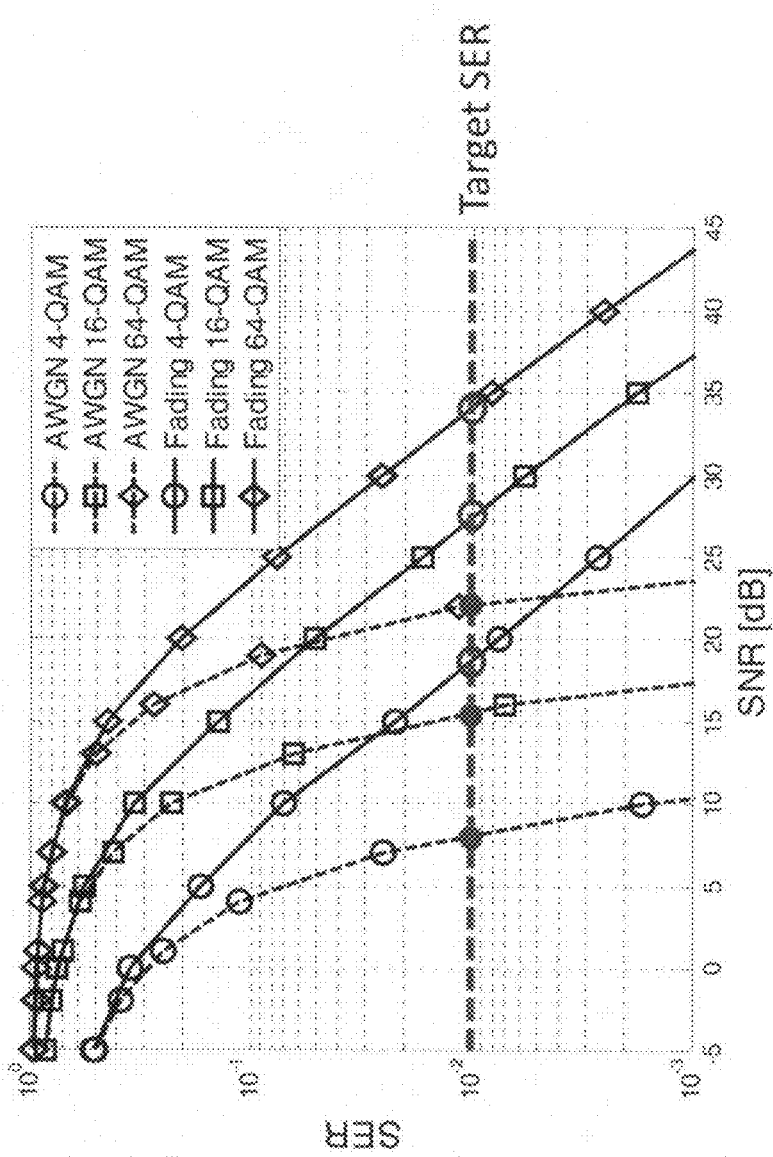
FIG. 106 illustrates exemplary SER for different QAM schemes (i.e., 4-QAM, 16-QAM, 64-QAM).

FIG. 106 shows the SER for different QAM schemes (i.e., 4-QAM, 16-QAM, 64-QAM). Without loss of generality, we assume target SER of 1% for uncoded systems. The SNR thresholds to meet that target SER in AWGN channels are 8 dB, 15.5 dB and 22 dB for the three modulation schemes, respectively. In Rayleigh fading channels, it is well known the SER performance of the above modulation schemes is worse than AWGN [13] and the SNR thresholds are: 18.6 dB, 27.3 dB and 34.1 dB, respectively. We observe that DIDO precoding transforms the multi-user downlink channel into a set of parallel SISO links. Hence, the same SNR thresholds as in FIG. 106 for SISO systems hold for DIDO systems on a client-by-client basis. Moreover, if instantaneous LA is carried out, the thresholds in AWGN channels are used.

The key idea of the proposed LA method for DIDO systems is to use low MCS orders when the channel undergoes deep fades in the time domain or frequency domain (depicted in FIG. 104) to provide link-robustness. Contrarily, when the channel is characterized by large gain, the LA method switches to higher MCS orders to increase spectral efficiency. One contribution of the present application compared to U.S. Pat. No. 7,636,381 is to use the effective channel matrix in (23) and in FIG. 105 as a metric to enable adaptation.

Figure 105:
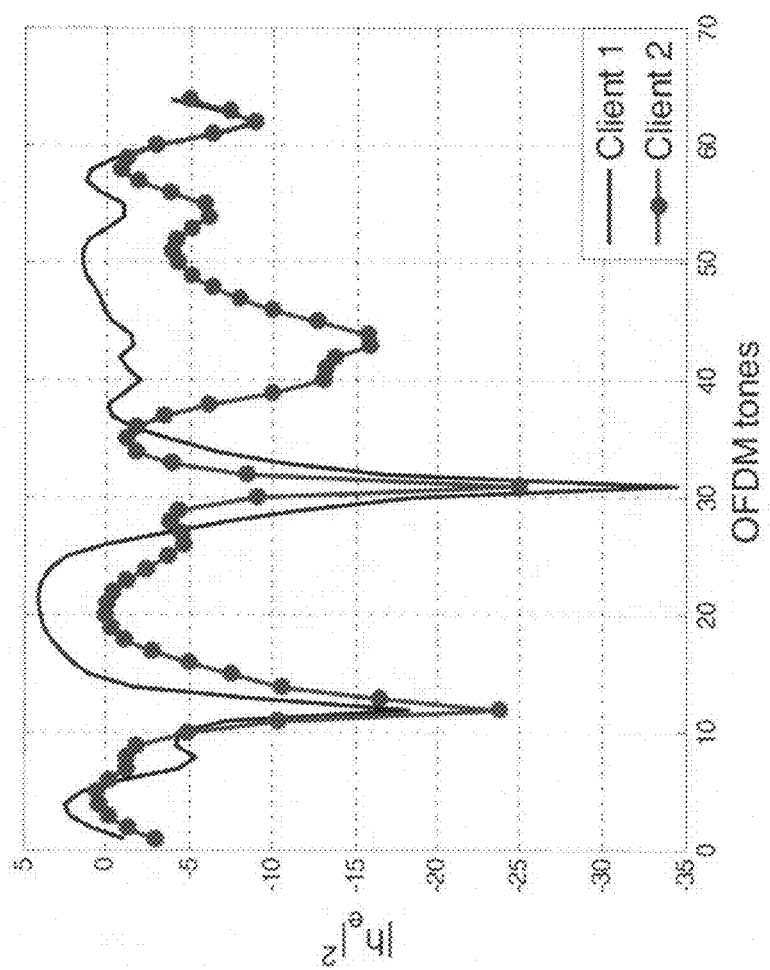
FIG. 105 illustrates one embodiment of a channel matrix frequency response for DIDO 2×2, with a single antenna per client for channels characterized by high frequency selectivity (e.g., with $\beta=0.1$).
Figure 107:
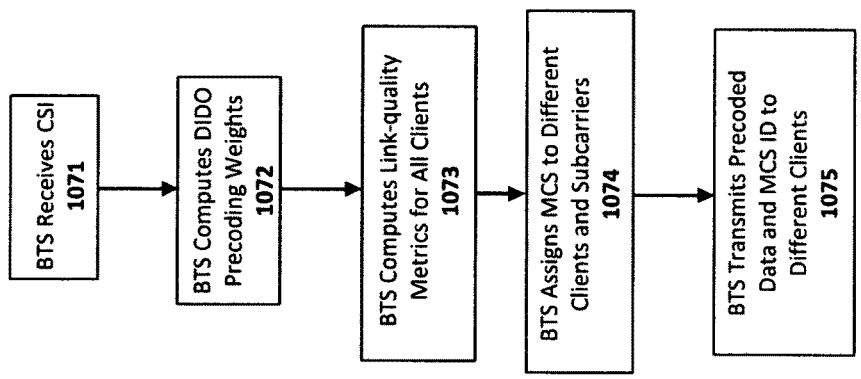
FIG. 107 illustrates one embodiment of a method for implementing link adaptation (LA) techniques.

The general framework of the LA methods is depicted in FIG. 107 and defined as follows:
  CSI estimation: At 1071 the DIDO BTS computes the CSI from all users. Users may be equipped with single or multiple receive antennas.
  DIDO precoding: At 1072, the BTS computes the DIDO precoding weights for all users. In one embodiment, BD is used to compute these weights. The precoding weights are calculated on a tone-by-tone basis.
  Link-quality metric calculation: At 1073 the BTS computes the frequency-domain link quality metrics. In OFDM systems, the metrics are calculated from the CSI and DIDO precoding weights for every tone. In one embodiment of the invention, the link-quality metric is the average SNR over all OFDM tones. We define this method as LA1 (based on average SNR performance). In another embodiment, the link quality metric is the frequency response of the effective channel in (23). We define this method as LA2 (based on tone-by-tone performance to exploit frequency diversity). If every client has single antenna, the frequency-domain effective channel is depicted in FIG. 105. If the clients have multiple receive antennas, the link-quality metric is defined as the Frobenius norm of the effective channel matrix for every tone. Alternatively, multiple link-quality metrics are defined for every client as the singular values of the effective channel matrix in (23).
  Bit-loading algorithm: At 1074, based on the link-quality metrics, the BTS determines the MCSs for different clients and different OFDM tones. For LA1 method, the same MCS is used for all clients and all OFDM tones based on the SNR thresholds for Rayleigh fading channels in FIG. 106. For LA2, different MCSs are assigned to different OFDM tones to exploit channel frequency diversity.
  Precoded data transmission: At 1075, the BTS transmits precoded data streams from the DIDO distributed antennas to the clients using the MCSs derived from the bit-loading algorithm. One header is attached to the precoded data to communicate the MCSs for different tones to the clients. For example, if eight MCSs are available and the OFDM symbols are defined with N=64 tone, $\log_2(8)*N=192$ bits are required to communicate the current MCS to every client. Assuming 4-QAM (2 bits/symbol spectral efficiency) is used to map those bits into symbols, only 192/2/N=1.5 OFDM symbols are required to map the MCS information. In another embodiment, multiple subcarriers (or OFDM tones) are grouped into subbands and the same MCS is assigned to all tones in the same subband to reduce the overhead due to control information. Moreover, the MCS are adjusted based on temporal variations of the channel gain (proportional to the coherence time). In fixed-wireless channel (characterized by low Doppler effect) the MCS are recalculated every fraction of the channel coherence time, thereby reducing the overhead required for control information.

FIG. 108 shows the SER performance of the LA methods described above. For comparison, the SER performance in Rayleigh fading channels is plotted for each of the three QAM schemes used. The LA2 method adapts the MCSs to the fluctuation of the effective channel in the frequency domain, thereby providing 1.8 bps/Hz gain in spectral efficiency for low SNR (i.e., SNR=20 dB) and 15 dB gain in SNR (for SNR>35 dB) compared to LA1.

System and Method for DIDO Precoding Interpolation in Multicarrier Systems

The computational complexity of DIDO systems is mostly localized at the centralized processor or BTS. The most computationally expensive operation is the calculation of the precoding weights for all clients from their CSI. When BD precoding is employed, the BTS has to carry out as many singular value decomposition (SVD) operations as the number of clients in the system. One way to reduce complexity is through parallelized processing, where the SVD is computed on a separate processor for every client.

In multicarrier DIDO systems, each subcarrier undergoes flat-fading channel and the SVD is carried out for every client over every subcarrier. Clearly the complexity of the system increases linearly with the number of subcarriers. For example, in OFDM systems with 1 MHz signal bandwidth, the cyclic prefix ($L_0$) must have at least eight channel taps (i.e., duration of 8 microseconds) to avoid intersymbol interference in outdoor urban macrocell environments with large delay spread [3]. The size ($N_{FFT}$) of the fast Fourier transform (FFT) used to generate the OFDM symbols is typically set to multiple of $L_0$ to reduce loss of data rate. If $N_{FFT}=64$, the effective spectral efficiency of the system is limited by a factor $N_{FFT}/(N_{FFT}+L_0)=89\%$. Larger values of $N_{FFT}$ yield higher spectral efficiency at the expense of higher computational complexity at the DIDO precoder.

One way to reduce computational complexity at the DIDO precoder is to carry out the SVD operation over a subset of tones (that we call pilot tones) and derive the precoding weights for the remaining tones via interpolation. Weight interpolation is one source of error that results in inter-client interference. In one embodiment, optimal weight interpolation techniques are employed to reduce inter-client interference, yielding improved error rate performance and lower computational complexity in multicarrier systems. In DIDO systems with M transmit antennas, U clients and N receive antennas per clients, the condition for the precoding weights of the $k^{th}$ client ($W_k$) that guarantees zero interference to the other clients u is derived from (2) as $$H_u W_k = 0^{N \times N}; \forall u=1,\ldots,U; \text{ with } u \neq k \quad (24)$$

where $H_u$ are the channel matrices corresponding to the other DIDO clients in the system.

In one embodiment of the invention, the objective function of the weight interpolation method is defined as $$f(\theta_k) = \sum_{\substack{u=1 \\ u \neq k}}^{U} \left\| H_u \hat{W}_k(\theta_k) \right\|_F \quad (25)$$

where $\theta_k$ is the set of parameters to be optimized for user k, $\hat{W}_k(\theta_k)$ is the weight interpolation matrix and $\|\cdot\|_F$ denotes the Frobenius norm of a matrix. The optimization problem is formulated as $$\theta_{k,opt} = \arg\min_{\theta_k \in \Theta_k} f(\theta_k) \quad (26)$$

where $\Theta_k$ is the feasible set of the optimization problem and $\theta_{k,\,opt}$ is the optimal solution.

The objective function in (25) is defined for one OFDM tone. In another embodiment of the invention, the objective function is defined as linear combination of the Frobenius norm in (25) of the matrices for all the OFDM tones to be interpolated. In another embodiment, the OFDM spectrum is divided into subsets of tones and the optimal solution is given by $$\theta_{k,opt} = \arg\min_{\theta_k \in \Theta_k} \max_{n \in A} f(n, \theta_k) \quad (27)$$

where n is the OFDM tone index and A is the subset of tones.

The weight interpolation matrix $W_k(\theta_k)$ in (25) is expressed as a function of a set of parameters $\theta_k$. Once the optimal set is determined according to (26) or (27), the optimal weight matrix is computed. In one embodiment of the invention, the weight interpolation matrix of given OFDM tone n is defined as linear combination of the weight matrices of the pilot tones. One example of weight interpolation function for beamforming systems with single client was defined in [11]. In DIDO multi-client systems we write the weight interpolation matrix as $$\hat{W}_k(lN_0+n, \theta_k) = (1-c_n)\cdot W(l) + c_n e^{j\theta_k}\cdot W(l+1) \quad (28)$$

where $0 \leq l \leq (L_0-1)$, $L_0$ is the number of pilot tones and $c_n = (n-1)/N_0$, with $N_0 = N_{FFT}/L_0$. The weight matrix in (28) is then normalized such that $\|\hat{W}_k\|_F = \sqrt{NM}$ to guarantee unitary power transmission from every antenna. If N=1 (single receive antenna per client), the matrix in (28) becomes a vector that is normalized with respect to its norm. In one embodiment of the invention, the pilot tones are chosen uniformly within the range of the OFDM tones. In another embodiment, the pilot tones are adaptively chosen based on the CSI to minimize the interpolation error.

We observe that one key difference of the system and method in [11] against the one proposed in this patent application is the objective function. In particular, the systems in [11] assumes multiple transmit antennas and single client, so the related method is designed to maximize the product of the precoding weight by the channel to maximize the receive SNR for the client. This method, however, does not work in multi-client scenarios, since it yields inter-client interference due to interpolation error. By contrast, our method is designed to minimize inter-client interference thereby improving error rate performance to all clients.

Figure 109:
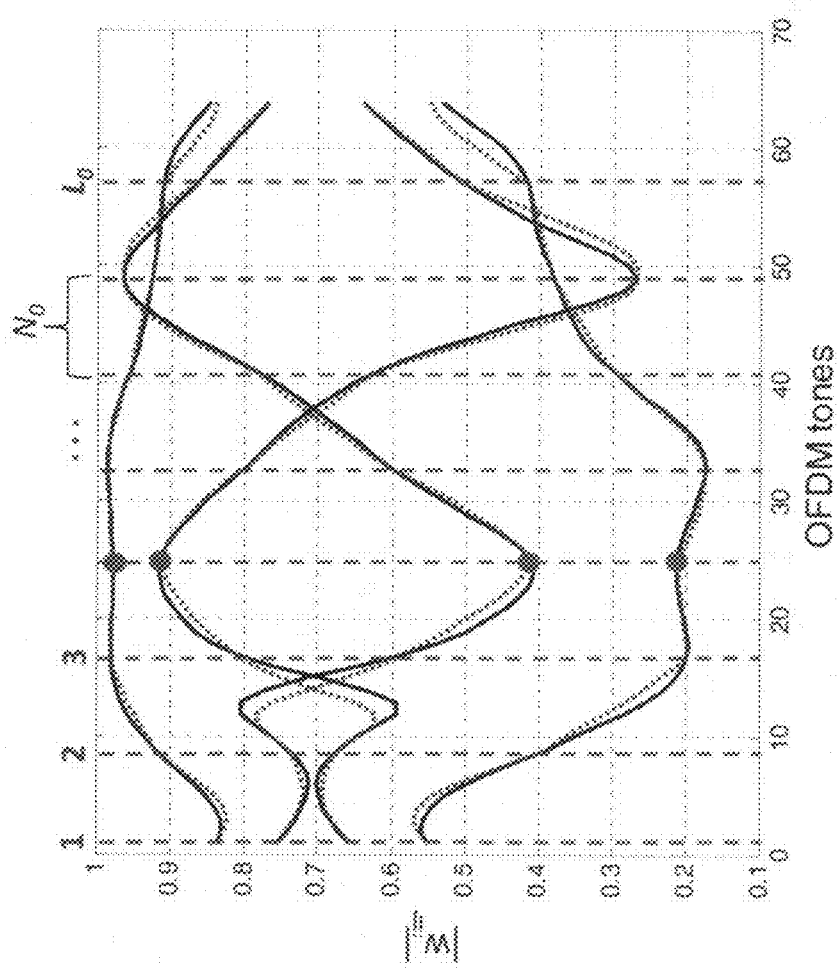
FIG. 109 illustrates the entries of the matrix in equation (28) as a function of the OFDM tone index for DIDO 2×2 systems with $N_{FFT}=64$ and $L_0=8$.

FIG. 109 shows the entries of the matrix in (28) as a function of the OFDM tone index for DIDO 2×2 systems with $N_{FFT}=64$ and $L_0=8$. The channel PDP is generated according to the model in (21) with $\beta=1$ and the channel consists of only eight channel taps. We observe that $L_0$ must be chosen to be larger than the number of channel taps. The solid lines in FIG. 109 represent the ideal functions, whereas the dotted lines are the interpolated ones. The interpolated weights match the ideal ones for the pilot tones, according to the definition in (28). The weights computed over the remaining tones only approximate the ideal case due to estimation error.

Figure 110:
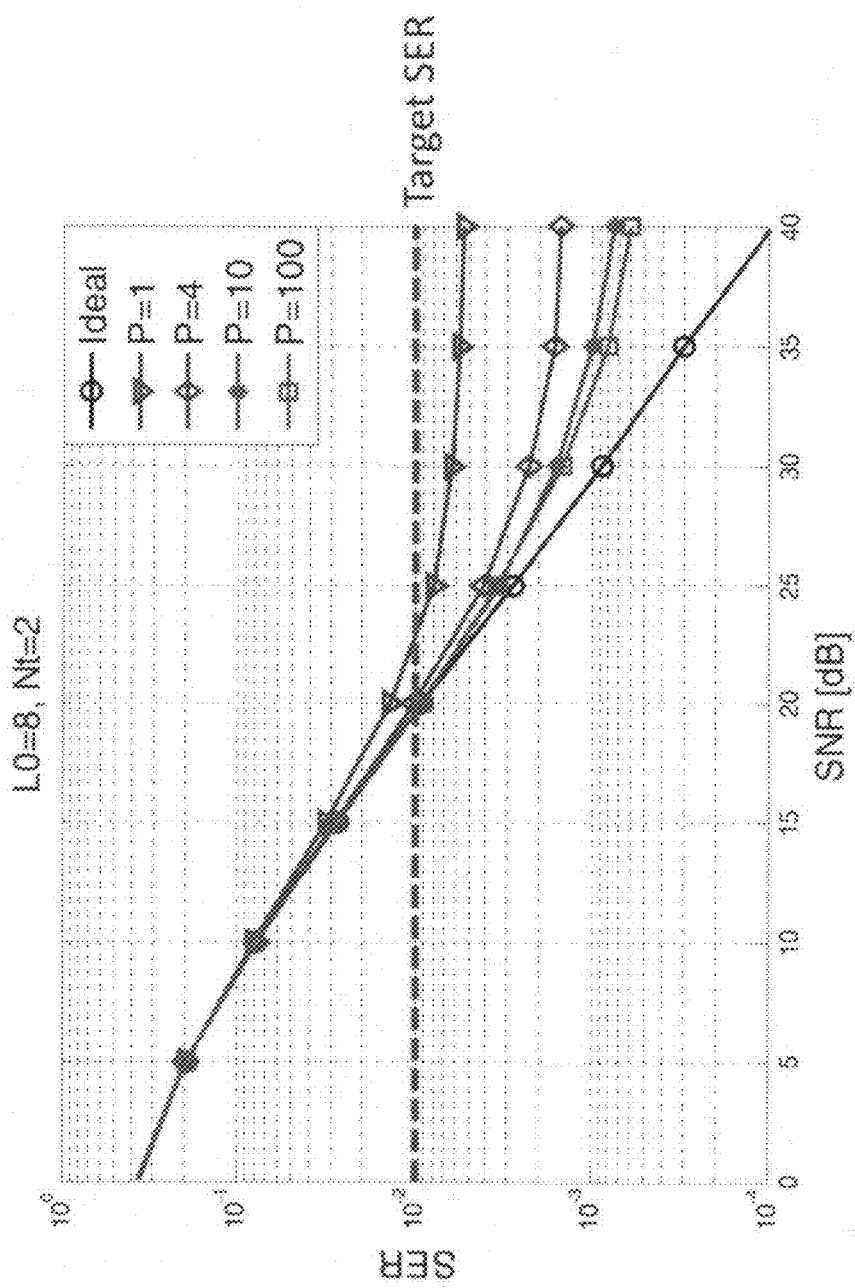
FIG. 110 illustrates the SER versus SNR for $L_0=8$, $M=N_t=2$ transmit antennas and a variable number of P.

One way to implement the weight interpolation method is via exhaustive search over the feasible set $\Theta_k$ in (26). To reduce the complexity of the search, we quantize the feasible set into P values uniformly in the range $[0,2\pi]$. FIG. 110 shows the SER versus SNR for $L_0=8$, $M=N_t=2$ transmit antennas and variable number of P. As the number of quantization levels increases, the SER performance improves. We observe the case P=10 approaches the performance of P=100 for much lower computational complexity, due to reduced number of searches.

Figure 111:
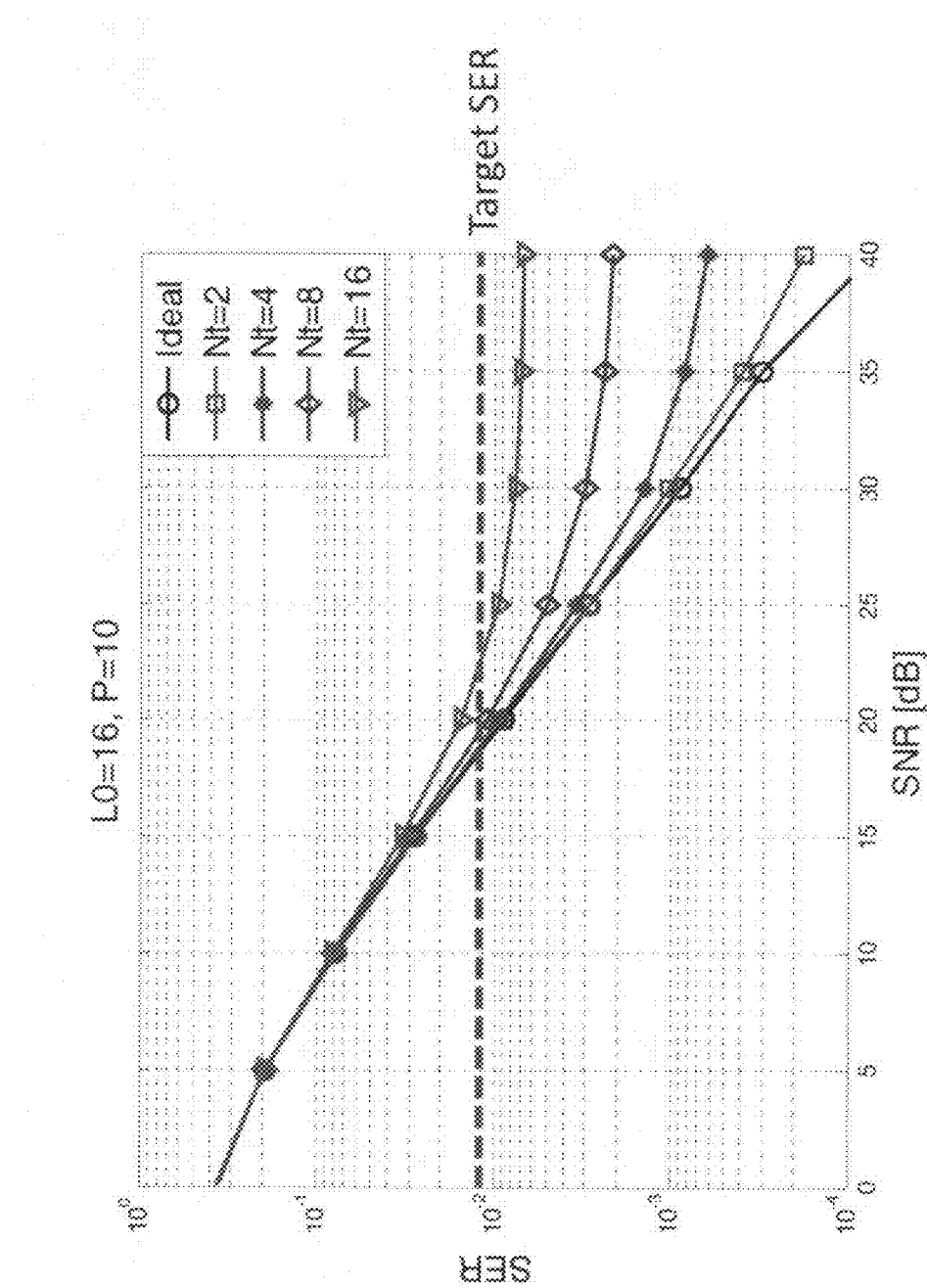
FIG. 111 illustrates the SER performance of one embodiment of an interpolation method for different DIDO orders and $L_0=16$.

FIG. 111 shows the SER performance of the interpolation method for different DIDO orders and $L_0=16$. We assume the number of clients is the same as the number of transmit antennas and every client is equipped with single antenna. As the number of clients increases the SER performance degrades due to increase inter-client interference produced by weight interpolation errors.

In another embodiment of the invention, weight interpolation functions other than those in (28) are used. For example, linear prediction autoregressive models [12] can be used to interpolate the weights across different OFDM tones, based on estimates of the channel frequency correlation.

REFERENCES

[1] A. Forenza and S. G. Perlman, "System and method for distributed antenna wireless communications", U.S. application Ser. No. 12/630,627, filed Dec. 2, 2009, entitled "System and Method For Distributed Antenna Wireless Communications"

[2] FCC, "Evaluating compliance with FCC guidelines for human exposure to radiofrequency electromagnetic fields," OET Bulletin 65, Ed. 97-01, August 1997

[3] 3GPP, "Spatial Channel Model AHG (Combined ad-hoc from 3GPP & 3GPP2)", SCM Text V6.0, Apr. 22, 2003

[4] 3GPP TR 25.912, "Feasibility Study for Evolved UTRA and UTRAN", V9.0.0 (2009-10)

[5] 3GPP TR 25.913, "Requirements for Evolved UTRA (E-UTRA) and Evolved UTRAN (E-UTRAN)", V8.0.0 (2009-01)

[6] W. C. Jakes, *Microwave Mobile Communications*, IEEE Press, 1974

[7] K. K. Wong, et al., "A joint channel diagonalization for multiuser MIMO antenna systems," IEEE Trans. Wireless Comm., vol. 2, pp. 773-786, July 2003;

[8] P. Viswanath, et al., "Opportunistic beamforming using dump antennas," IEEE Trans. On Inform. Theory, vol. 48, pp. 1277-1294, June 2002.

[9] A. A. M. Saleh, et al., "A statistical model for indoor multipath propagation," IEEE Jour. Select. Areas in Comm., vol. 195 SAC-5, no. 2, pp. 128-137, February 1987.

[10] A. Paulraj, et al., *Introduction to Space-Time Wireless Communications*, Cambridge University Press, 40 West 20th Street, New York, N.Y., USA, 2003.

[11] J. Choi, et al., "Interpolation Based Transmit Beamforming for MIMO-OFDM with Limited Feedback," *IEEE Trans. on Signal Processing*, vol. 53, no. 11, pp. 4125-4135, November 2005.

[12] I. Wong, et al., "Long Range Channel Prediction for Adaptive OFDM Systems," *Proc. of the IEEE Asilomar Conf. on Signals, Systems, and Computers*, vol. 1, pp. 723-736, Pacific Grove, Calif., USA, Nov. 7-10, 2004.

[13] J. G. Proakis, *Communication System Engineering*, Prentice Hall, 1994

[14] B. D. Van Veen, et al., "Beamforming: a versatile approach to spatial filtering," *IEEE ASSP Magazine*, April 1988.

[15] R. G. Vaughan, "On optimum combining at the mobile," *IEEE Trans. On Vehic. Tech.*, vol 37, n. 4, pp. 181-188, November 1988

[16] F. Qian, "Partially adaptive beamforming for correlated interference rejection," *IEEE Trans. On Sign. Proc.*, vol. 43, n. 2, pp. 506-515, February 1995

[17] H. Krim, et. al., "Two decades of array signal processing research," *IEEE Signal Proc. Magazine*, pp. 67-94, July 1996

[19] W. R. Remley, "Digital beamforming system", U.S. Pat. No. 4,003,016, January 1977

[18] R. J. Masak, "Beamforming/null-steering adaptive array", U.S. Pat. No. 4,771,289, September 1988

[20] K.-B. Yu, et. al., "Adaptive digital beamforming architecture and algorithm for nulling mainlobe and multiple sidelobe radar jammers while preserving monopulse ratio angle estimation accuracy", U.S. Pat. No. 5,600,326, February 1997

[21] H. Boche, et al., "Analysis of different precoding/decoding strategies for multiuser beamforming", IEEE Vehic. Tech. Conf., vol. 1, April 2003

[22] M. Schubert, et al., "Joint 'dirty paper' pre-coding and downlink beamforming," vol. 2, pp. 536-540, December 2002

[23] H. Boche, et al. "A general duality theory for uplink and downlink beamformingc", vol. 1, pp. 87-91, December 2002

[24] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[25] Q. H. Spencer, A. L. Swindlehurst, and M. Haardt, "Zero forcing methods for downlink spatial multiplexing in multiuser MIMO channels," IEEE Trans. Sig. Proc., vol. 52, pp. 461-471, February 2004.

II. Disclosure from Certain Related Applications

FIG. 1 shows a prior art MIMO system with transmit antennas 104 and receive antennas 105. Such a system can achieve up to 3× the throughput that would normally be achievable in the available channel. There are a number of different approaches in which to implement the details of such a MIMO system which are described in published literature on the subject, and the following explanation describes one such approach.

Before data is transmitted in the MIMO system of FIG. 1, the channel is "characterized." This is accomplished by initially transmitting a "training signal" from each of the transmit antennas 104 to each of the receivers 105. The training signal is generated by the coding and modulation subsystem 102, converted to analog by a D/A converter (not shown), and then converted from baseband to RF by each transmitter 103, in succession. Each receive antenna 105 coupled to its RF Receiver 106 receives each training signal and converts it to baseband. The baseband signal is converted to digital by a D/A converter (not shown), and the signal processing subsystem 107 characterizes the training signal. Each signal's characterization may include many factors including, for example, phase and amplitude relative to a reference internal to the receiver, an absolute reference, a relative reference, characteristic noise, or other factors. Each signal's characterization is typically defined as a vector that characterizes phase and amplitude changes of several aspects of the signal when it is transmitted across the channel. For example, in a quadrature amplitude modulation ("QAM")-modulated signal the characterization might be a vector of the phase and amplitude offsets of several multipath images of the signal. As another example, in an orthogonal frequency division multiplexing ("OFDM")-modulated signal, it might be a vector of the phase and amplitude offsets of several or all of the individual sub-signals in the OFDM spectrum.

The signal processing subsystem 107 stores the channel characterization received by each receiving antenna 105 and corresponding receiver 106. After all three transmit antennas 104 have completed their training signal transmissions, then the signal processing subsystem 107 will have stored three channel characterizations for each of three receiving antennas 105, resulting in a 3×3 matrix 108, designated as the channel characterization matrix, "H." Each individual matrix element is the channel characterization (which is typically a vector, as described above) of the training signal transmission of transmit antenna 104$i$ as received by the receive antenna 105$j$.

At this point, the signal processing subsystem 107 inverts the matrix H 108, to produce $H^{-1}$, and awaits transmission of actual data from transmit antennas 104. Note that various prior art MIMO techniques described in available literature, can be utilized to ensure that the H matrix 108 can be inverted.

In operation, a payload of data to be transmitted is presented to the data Input subsystem 100. It is then divided up into three parts by splitter 101 prior to being presented to coding and modulation subsystem 102. For example, if the payload is the ASCII bits for "abcdef," it might be divided up into three sub-payloads of ASCII bits for "ad," "be," and "cf" by Splitter 101. Then, each of these sub-payloads is presented individually to the coding and modulation subsystem 102.

Each of the sub-payloads is individually coded by using a coding system suitable for both statistical independence of each signal and error correction capability. These include, but are not limited to Reed-Solomon coding, Viterbi coding, and Turbo Codes. Finally, each of the three coded sub-payloads is modulated using an appropriate modulation scheme for the channel. Examples of modulation schemes are differential phase shift key ("DPSK") modulation, 64-QAM modulation and OFDM. It should be noted here that the diversity gains provided by MIMO allow for higher-order modulation constellations that would otherwise be feasible in a SISO (Single Input-Single Output) system utilizing the same channel. Each coded and modulated signal is then transmitted through its own antenna 104 following D/A conversion by a D/A conversion unit (not shown) and RF generation by each transmitter 103.

Assuming that adequate spatial diversity exists amongst the transmit and receive antennas, each of the receiving antennas 105 will receive a different combination of the three transmitted signals from antennas 104. Each signal is received and converted down to baseband by each RF receiver 106, and digitized by an A/D converter (not shown). If $y_n$ is the signal received by the nth receive antenna 105, and $x_n$ is the signal transmitted by nth transmit antenna 104, and N is noise, this can be described by the following three equations:

$$y_1 = x_1 H_{11} + x_2 H_{12} + x_3 H_{13} + N$$

$$y_2 = x_1 H_{21} + x_2 H_{22} + x_3 H_{23} + N$$

$$y_3 = x_1 H_{31} + x_2 H_{32} + x_3 H_{33} + N$$

Given that this is a system of three equations with three unknowns, it is a matter of linear algebra for the signal processing subsystem 107 to derive $x_1$, $x_2$, and $x_3$ (assuming that N is at a low enough level to permit decoding of the signals):

$$x_1 = y_1 H^{-1}{}_{11} + y_2 H^{-1}{}_{12} + y_3 H^{-1}{}_{13}$$

$$x_2 = y_1 H^{-1}{}_{21} + y_2 H^{-1}{}_{22} + y_3 H^{-1}{}_{23}$$

$$x_3 = y_1 H^{-1}{}_{31} + y_2 H^{-1}{}_{32} + y_3 H^{-1}{}_{33}$$

Once the three transmitted signals $x_n$ are thus derived, they are then demodulated, decoded, and error-corrected by signal processing subsystem 107 to recover the three bit streams that were originally separated out by splitter 101. These bit streams are combined in combiner unit 108, and output as a single data stream from the data output 109. Assuming the robustness of the system is able to overcome the noise impairments, the data output 109 will produce the same bit stream that was introduced to the data Input 100.

Although the prior art system just described is generally practical up to four antennas, and perhaps up to as many as 10, for the reasons described in the Background section of this disclosure, it becomes impractical with large numbers of antennas (e.g. 25, 100, or 1000).

Typically, such a prior art system is two-way, and the return path is implemented exactly the same way, but in reverse, with each side of the communications channels having both transmit and receive subsystems.

Figure 2:
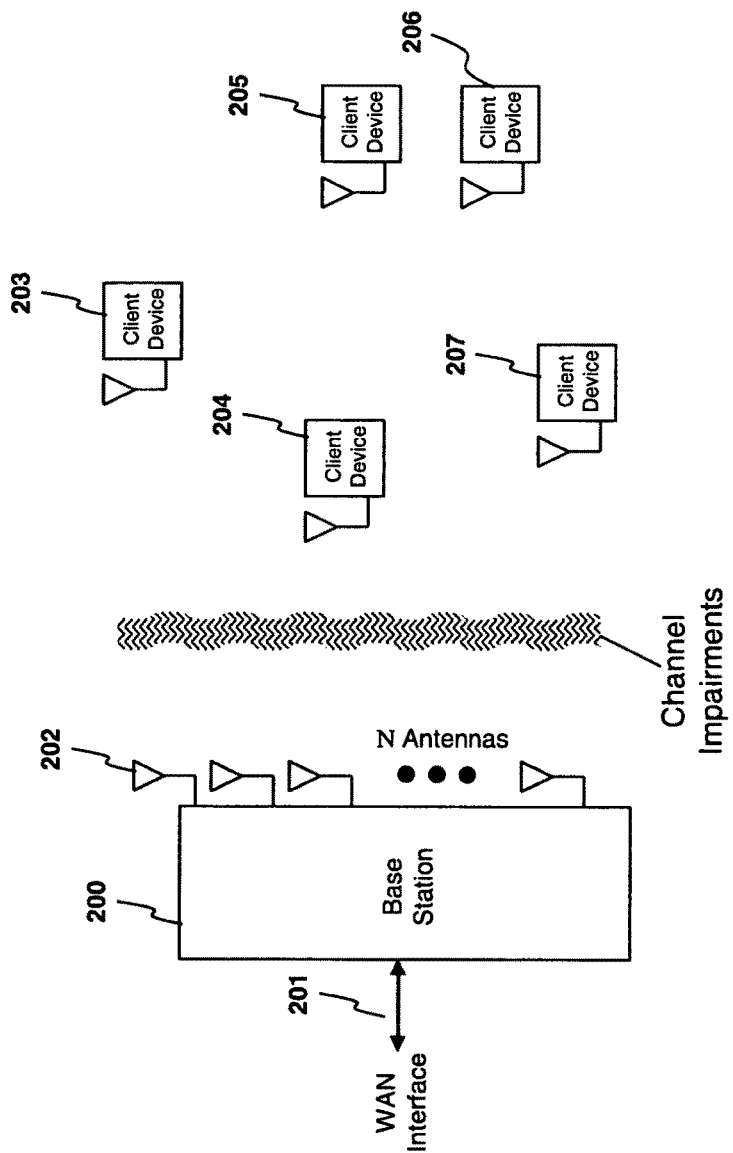
FIG. 2 illustrates an N-antenna Base Station communicating with a plurality of Single-antenna Client Devices.

FIG. 2 illustrates one embodiment of the invention in which a Base Station (BS) 200 is configured with a Wide Area Network (WAN) interface (e.g. to the Internet through a T1 or other high speed connection) 201 and is provisioned with a number (N) of antennas 202. For the time being, we use the term "Base Station" to refer to any wireless station that communicates wirelessly with a set of clients from a fixed location. Examples of Base Stations are access points in wireless local area networks (WLANs) or WAN antenna tower or antenna array. There are a number of Client Devices 203-207, each with a single antenna, which are served wirelessly from the Base Station 200. Although for the purposes of this example it is easiest to think about such a Base Station as being located in an office environment where it is serving Client Devices 203-207 that are wireless-network equipped personal computers, this architecture will apply to a large number of applications, both indoor and outdoor, where a Base Station is serving wireless clients. For example, the Base Station could be based at a cellular phone tower, or on a television broadcast tower. In one embodiment, the Base Station 200 is positioned on the ground and is configured to transmit upward at HF frequencies (e.g., frequencies up to 24 MHz) to bounce signals off the ionosphere as described in co-pending application entitled SYSTEM AND METHOD FOR ENHANCING NEAR VERTICAL INCIDENCE SKYWAVE ("NVIS") COMMUNICATION USING SPACE-TIME CODING, Ser. No. 10/817,731, Filed Apr. 2, 2004, which is assigned to the assignee of the present application and which is incorporated herein by reference.

Certain details associated with the Base Station 200 and Client Devices 203-207 set forth above are for the purpose of illustration only and are not required for complying with the underlying principles of the invention. For example, the Base Station may be connected to a variety of different types of wide area networks via WAN interface 201 including application-specific wide area networks such as those used for digital video distribution. Similarly, the Client Devices may be any variety of wireless data processing and/or communication devices including, but not limited to cellular phones, personal digital assistants ("PDAs"), receivers, and wireless cameras.

In one embodiment, the Base Station's n Antennas 202 are separated spatially such that each is transmitting and receiving signals which are not spatially correlated, just as if the Base Station was a prior art MIMO transceiver. As described in the Background, experiments have been done where antennas placed within $\lambda/6$ (i.e. ⅙ wavelength) apart successfully achieve an increase in throughput from MIMO, but generally speaking, the further apart these Base Station antennas are placed, the better the system performance, and $\lambda/2$ is a desirable minimum. Of course, the underlying principles of the invention are not limited to any particular separation between antennas.

Note that a single Base Station 200 may very well have its antennas located very far apart. For example, in the HF spectrum, the antennas may be 10 meters apart or more (e.g., in an NVIS implementation mentioned above). If 100 such antennas are used, the Base Station's antenna array could well occupy several square kilometers.

In addition to spatial diversity techniques, one embodiment of the invention polarizes the signal in order to increase the effective throughput of the system. Increasing channel capacity through polarization is a well known technique which has been employed by satellite television providers for years. Using polarization, it is possible to have multiple (e.g., three) Base Station or users' antennas very close to each other, and still be not spatially correlated. Although conventional RF systems usually will only benefit from the diversity of two dimensions (e.g. x and y) of polarization, the architecture described herein may further benefit from the diversity of three dimensions of polarization (x, y and z).

In addition to space and polarization diversity, one embodiment of the invention employs antennas with near-orthogonal radiation patterns to improve link performance via pattern diversity. Pattern diversity can improve the capacity and error-rate performance of MIMO systems and its benefits over other antenna diversity techniques have been shown in the following papers:

[13] L. Dong, H. Ling, and R. W. Heath Jr., "Multiple-input multiple-output wireless communication systems using antenna pattern diversity," *Proc. IEEE Glob. Telecom. Conf.*, vol. 1, pp. 997-1001, November 2002.

[14] R. Vaughan, "Switched parasitic elements for antenna diversity," *IEEE Trans. Antennas Propagat.*, vol. 47, pp. 399-405, February 1999.

[15] P. Mattheijssen, M. H. A. J. Herben, G. Dolmans, and L. Leyten, "Antenna-pattern diversity versus space diversity for use at handhelds," *IEEE Trans. on Veh. Technol.*, vol. 53, pp. 1035-1042, July 2004.

[16] C. B. Dietrich Jr, K. Dietze, J. R. Nealy, and W. L. Stutzman, "Spatial, polarization, and pattern diversity for wireless handheld terminals," *Proc. IEEE Antennas and Prop. Symp.*, vol. 49, pp. 1271-1281, September 2001.

[17] A. Forenza and R. W. Heath, Jr., "Benefit of Pattern Diversity Via 2-element Array of Circular Patch Antennas in Indoor Clustered MIMO Channels", *IEEE Trans. on Communications*, vol. 54, no. 5, pp. 943-954, May 2006.

Using pattern diversity, it is possible to have multiple Base Station or users' antennas very close to each other, and still be not spatially correlated.

Figure 3:
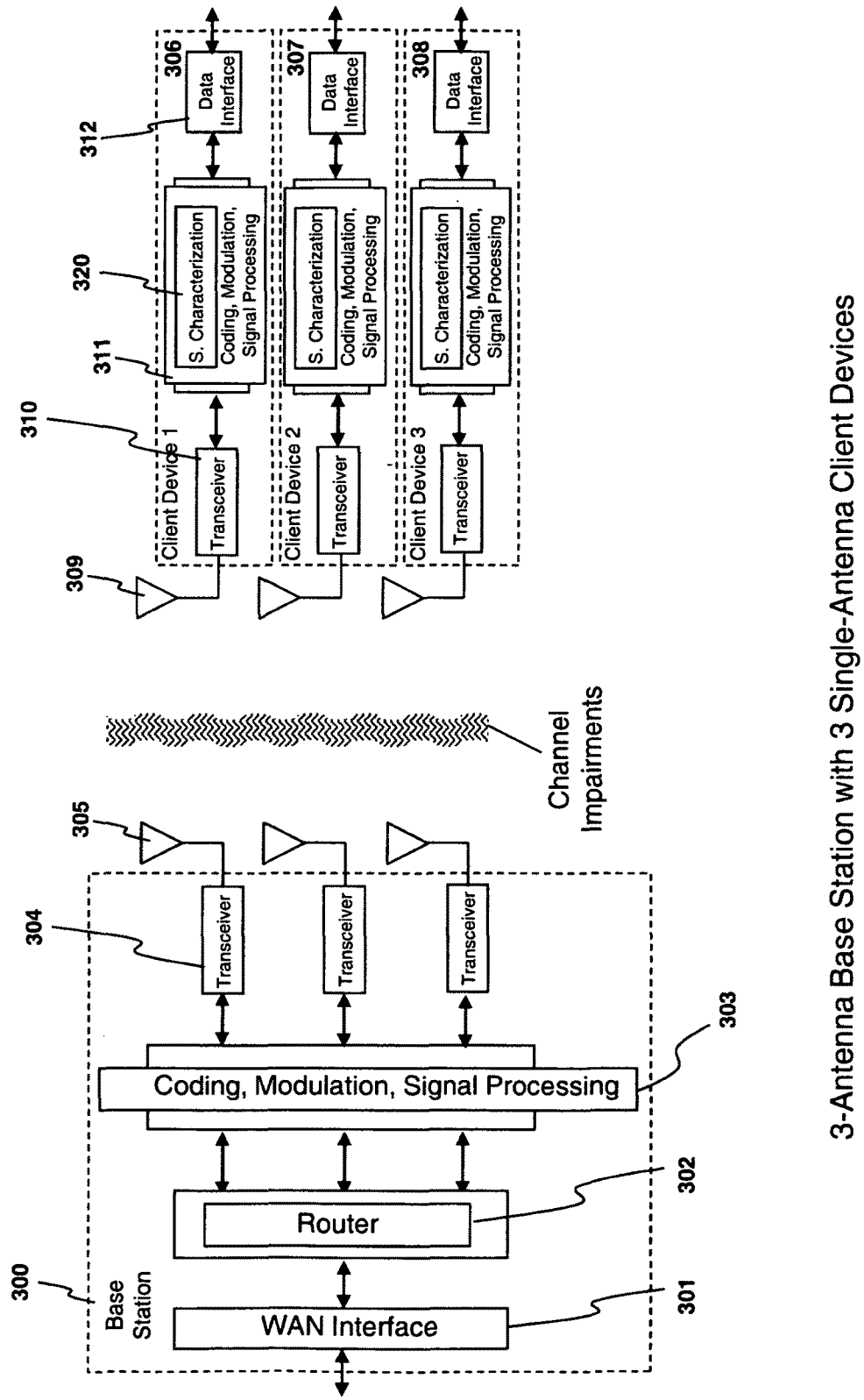
FIG. 3 illustrates a three Antenna Base Station communicating with three Single-Antenna Client Devices

FIG. 3 provides additional detail of one embodiment of the Base Station 200 and Client Devices 203-207 shown in FIG. 2. For the purposes of simplicity, the Base Station 300 is shown with only three antennas 305 and only three Client Devices 306-308. It will be noted, however, that the embodiments of the invention described herein may be implemented with a virtually unlimited number of antennas 305 (i.e., limited only by available space and noise) and Client Devices 306-308.

FIG. 3 is similar to the prior art MIMO architecture shown in FIG. 1 in that both have three antennas on each sides of a communication channel. A notable difference is that in the prior art MIMO system the three antennas 105 on the right side of FIG. 1 are all a fixed distance from one another (e.g., integrated on a single device), and the received signals from each of the antennas 105 are processed together in the Signal Processing subsystem 107. By contrast, in FIG. 3, the three antennas 309 on the right side of the diagram are each coupled to a different Client Device 306-308, each of which may be distributed anywhere within range of the Base Station 305.

As such, the signal that each Client Device receives is processed independently from the other two received signals in its Coding, Modulation, Signal Processing subsystem 311. Thus, in contrast to a Multiple-Input (i.e. antennas 105) Multiple-Output (i.e. antennas 104) "MIMO" system, FIG. 3 illustrates a Multiple Input (i.e. antennas 305) Distributed Output (i.e. antennas 305) system, referred to hereinafter as a "MIDO" system.

Note that this application uses different terminology than previous applications, so as to better conform with academic and industry practices. In previously cited co-pending application, SYSTEM AND METHOD FOR ENHANCING NEAR VERTICAL INCIDENCE SKYWAVE ("NVIS") COMMUNICATION USING SPACE-TIME CODING, Ser. No. 10/817,731, Filed Apr. 2, 2004, and application Ser. No. 10/902,978 filed Jul. 30, 2004 for which this is application is a continuation-in-part, the meaning of "Input" and "Output" (in the context of SIMO, MISO, DIMO and MIDO) is reversed from how the terms are used in this application. In the prior applications, "Input" referred to the wireless signals as they are input to the receiving antennas (e.g. antennas 309 in FIG. 3), and "Output" referred to the wireless signals as they are output by the transmitting antennas (e.g. antennas 305). In academia and the wireless industry, the reverse meaning of "Input" and "Output" is commonly used, in which "Input" refers to the wireless signals as they are input to the channel (i.e. the transmitted wireless signals from antennas 305) and "Output" refers to the wireless signals as they are output from the channel (i.e. wireless signals received by antennas 309). This application adopts this terminology, which is the reverse of the applications cited previously in this paragraph. Thus, the following terminology equivalences shall be drawn between applications:

| 10/817,731 and 10/902,978 | Current Application |
|---|---|
| SIMO = | MISO |
| MISO = | SIMO |
| DIMO = | MIDO |
| MIDO = | DIMO |

The MIDO architecture shown in FIG. 3 achieves a similar capacity increase as MIMO over a SISO system for a given number of transmitting antennas. However, one difference between MIMO and the particular MIDO embodiment illustrated in FIG. 3 is that, to achieve the capacity increase provided by multiple base station antennas, each MIDO Client Device 306-308 requires only a single receiving antenna, whereas with MIMO, each Client Device requires as least as many receiving antennas as the capacity multiple that is hoped to be achieved. Given that there is usually a practical limit to how many antennas can be placed on a Client Device (as explained in the Background), this typically limits MIMO systems to between four to ten antennas (and 4× to 10× capacity multiple). Since the Base Station 300 is typically serving many Client Devices from a fixed and powered location, is it practical to expand it to far more antennas than ten, and to separate the antennas by a suitable distance to achieve spatial diversity. As illustrated, each antenna is equipped with a transceiver 304 and a portion of the processing power of a Coding, Modulation, and Signal Processing section 303. Significantly, in this embodiment, no matter how much Base Station 300 is expanded, each Client Device 306-308 only will require one antenna 309, so the cost for an individual user Client Device 306-308 will be low, and the cost of Base Station 300 can be shared among a large base of users.

Figure 4:
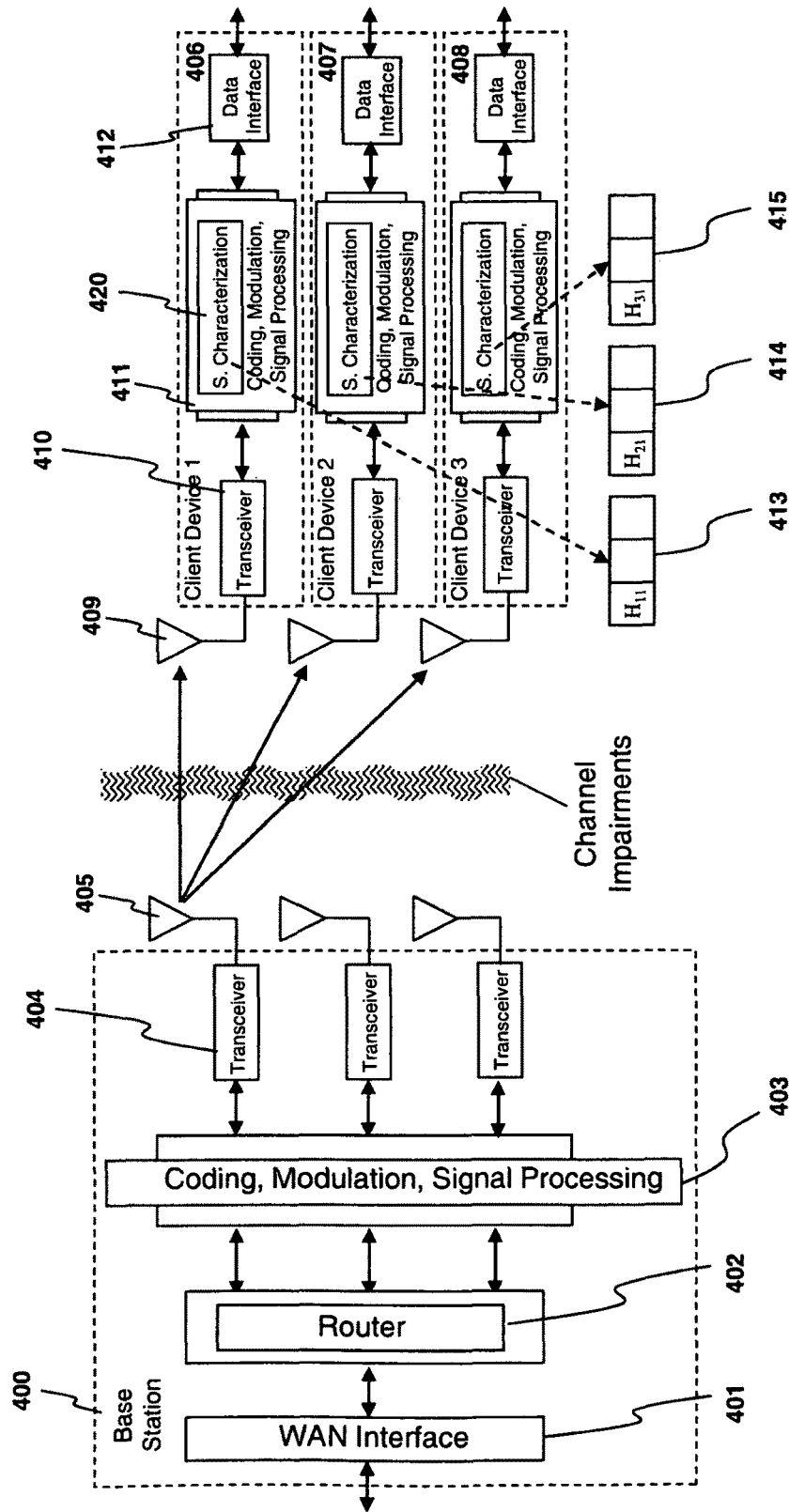
FIG. 4 illustrates training signal techniques employed in one embodiment of the invention.
Figure 5:
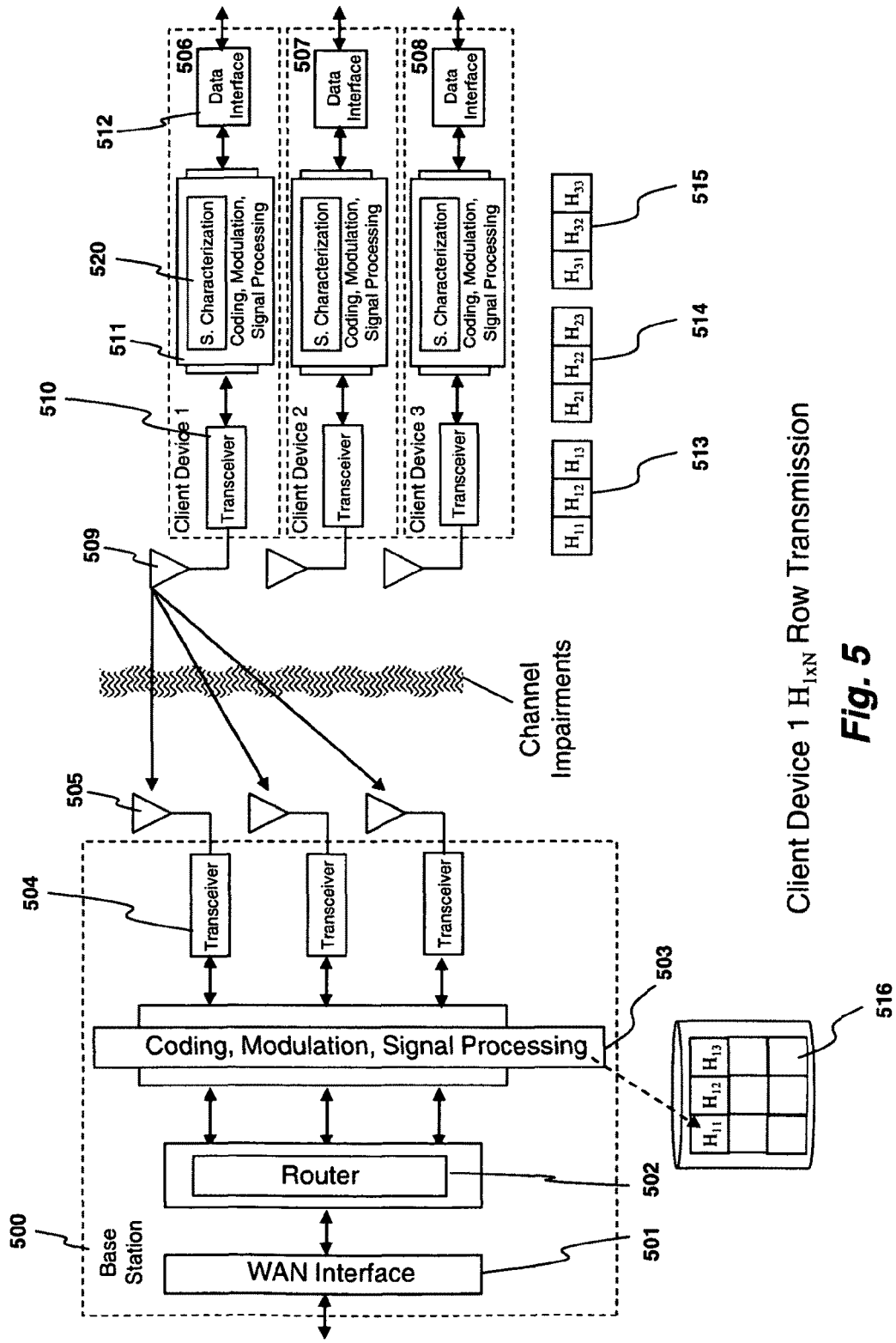
FIG. 5 illustrates channel characterization data transmitted from a client device to a base station according to one embodiment of the invention.
Figure 6:
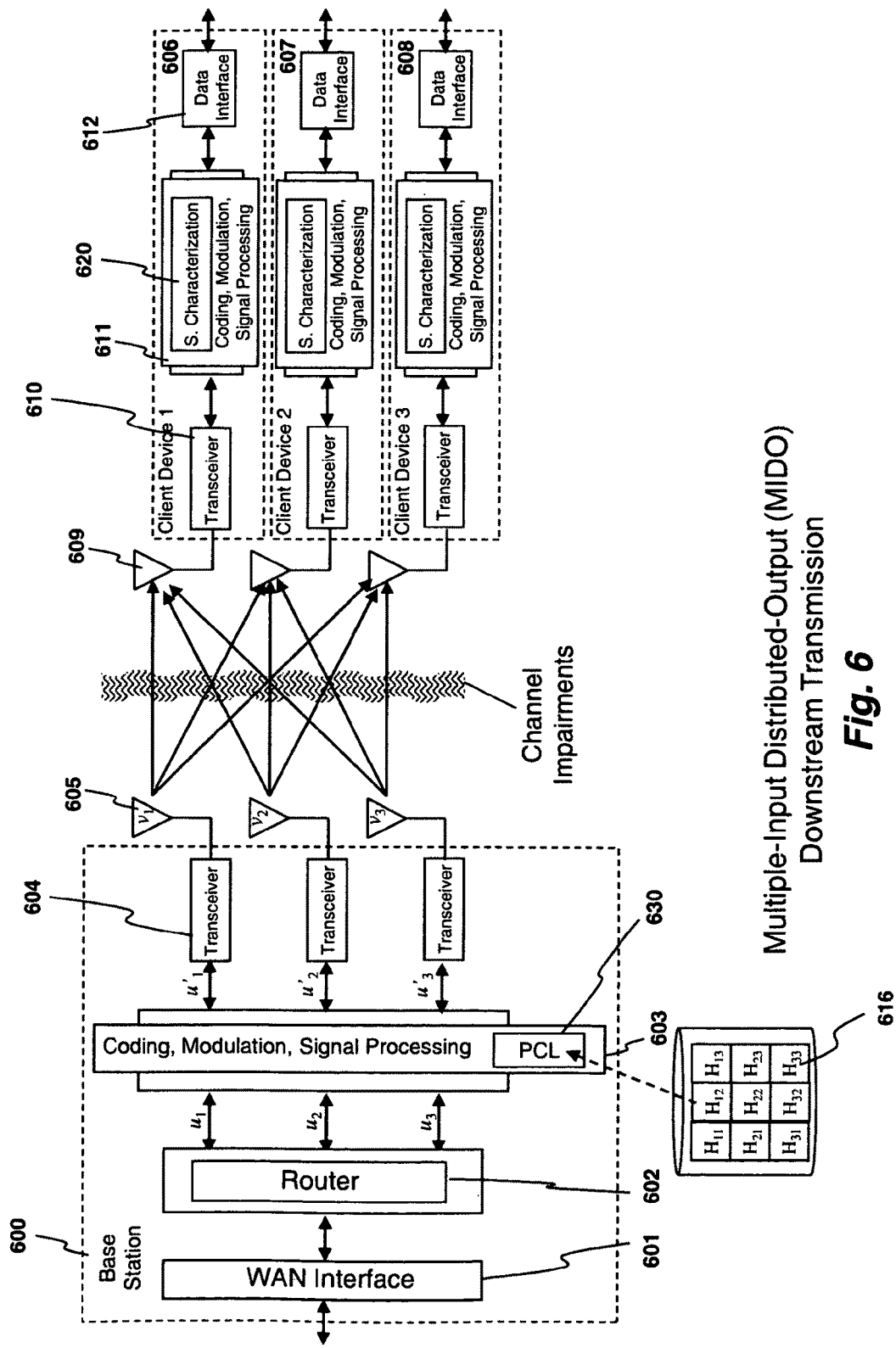
FIG. 6 illustrates a Multiple-Input Distributed-Output ("MIDO") downstream transmission according to one embodiment of the invention.

An example of how a MIDO transmission from the Base Station 300 to the Client Devices 306-308 can be accomplished is illustrated in FIGS. 4 through 6.

In one embodiment of the invention, before a MIDO transmission begins, the channel is characterized. As with a MIMO system, a training signal is transmitted (in the embodiment herein described), one-by-one, by each of the antennas 405. FIG. 4 illustrates only the first training signal transmission, but with three antennas 405 there are three separate transmissions in total. Each training signal is generated by the Coding, Modulation, and Signal Processing subsystem 403, converted to analog through a D/A converter, and transmitted as RF through each RF Transceiver 404. Various different coding, modulation and signal processing techniques may be employed including, but not limited to, those described above (e.g., Reed Solomon, Viterbi coding; QAM, DPSK, QPSK modulation, . . . etc).

Each Client Device 406-408 receives a training signal through its antenna 409 and converts the training signal to baseband by Transceiver 410. An A/D converter (not shown) converts the signal to digital where is it processed by each Coding, Modulation, and Signal Processing subsystem 411. Signal characterization logic 320 then characterizes the resulting signal (e.g., identifying phase and amplitude distortions as described above) and stores the characterization in memory. This characterization process is similar to that of prior art MIMO systems, with a notable difference being that the each client device only computes the characterization vector for its one antenna, rather than for n antennas. For example, the Coding Modulation and Signal Processing subsystem 420 of client device 406 is initialized with a known pattern of the training signal (either at the time of manufacturing, by receiving it in a transmitted message, or through another initialization process). When antenna 405 transmits the training signal with this known pattern, Coding Modulation and Signal Processing subsystem 420 uses correlation methods to find the strongest received pattern of the training signal, it stores the phase and amplitude offset, then it subtracts this pattern from the received signal. Next, it finds then second strongest received pattern that correlates to the training signal, it stores the phase and amplitude offset, then it subtracts this second strongest pattern from the received signal. This process continues until either some fixed number of phase and amplitude offsets are stored (e.g. eight), or a detectable training signal pattern drops below a given noise floor. This vector of phase/amplitude offsets becomes element $H_{11}$ of the vector 413. Simultaneously, Coding Modulation and Signal Processing subsystems for Client Devices 407 and 408 implement the produce their vector elements $H_{21}$ and $H_{31}$.

The memory in which the characterization is stored may be a non-volatile memory such as a Flash memory or a hard drive and/or a volatile memory such as a random access memory (e.g., SDRAM, RDAM). Moreover, different Client Devices may concurrently employ different types of memories to store the characterization information (e.g., PDA's may use Flash memory whereas notebook computers may use a hard drive). The underlying principles of the invention are not limited to any particular type of storage mechanism on the various Client Devices or the Base Station.

As mentioned above, depending on the scheme employed, since each Client Device 406-408 has only one antenna, each only stores a 1×3 row 413-415 of the H matrix. FIG. 4 illustrates the stage after the first training signal transmission where the first column of 1×3 rows 413-415 has been stored with channel characterization information for the first of the three Base Station antennas 405. The remaining two columns are stored following the channel characterization of the next two training signal transmissions from the remaining two base station antennas. Note that for the sake of illustration the three training signals are transmitted at separate times. If the three training signal patterns are chosen such as not to be correlated to one another, they may be transmitted simultaneously, thereby reducing training time.

As indicated in FIG. 5, after all three pilot transmissions are complete, each Client Device 506-508 transmits back to the Base Station 500 the 1×3 row 513-515 of matrix H that it has stored. To the sake of simplicity, only one Client Device 506 is illustrated transmitting its characterization information in FIG. 5. An appropriate modulation scheme (e.g. DPSK, 64QAM, OFDM) for the channel combined with adequate error correction coding (e.g. Reed Solomon, Viterbi, and/or Turbo codes) may be employed to make sure that the Base Station 500 receives the data in the rows 513-515 accurately.

Although all three antennas 505 are shown receiving the signal in FIG. 5, it is sufficient for a single antenna and transceiver of the Base Station 500 to receive each 1×3 row 513-515 transmission. However, utilizing many or all of antennas 505 and Transceivers 504 to receive each transmission (i.e., utilizing prior art Single-Input Multiple-Output ("SIMO") processing techniques in the Coding, Modulation and Signal Processing subsystem 503) may yield a better signal-to-noise ratio ("SNR") than utilizing a single antenna 505 and Transceiver 504 under certain conditions.

As the Coding, Modulation and Signal Processing subsystem 503 of Base Station 500 receives the 1×3 row 513-515, from each Client Device 507-508, it stores it in a 3×3H matrix 516. As with the Client Devices, the Base Station may employ various different storage technologies including, but not limited to non-volatile mass storage memories (e.g., hard drives) and/or volatile memories (e.g., SDRAM) to store the matrix 516. FIG. 5 illustrates a stage at which the Base Station 500 has received and stored the 1×3 row 513 from Client Device 509. The 1×3 rows 514 and 515 may be transmitted and stored in H matrix 516 as they are received from the remaining Client Devices, until the entire H matrix 516 is stored.

Figure 66:
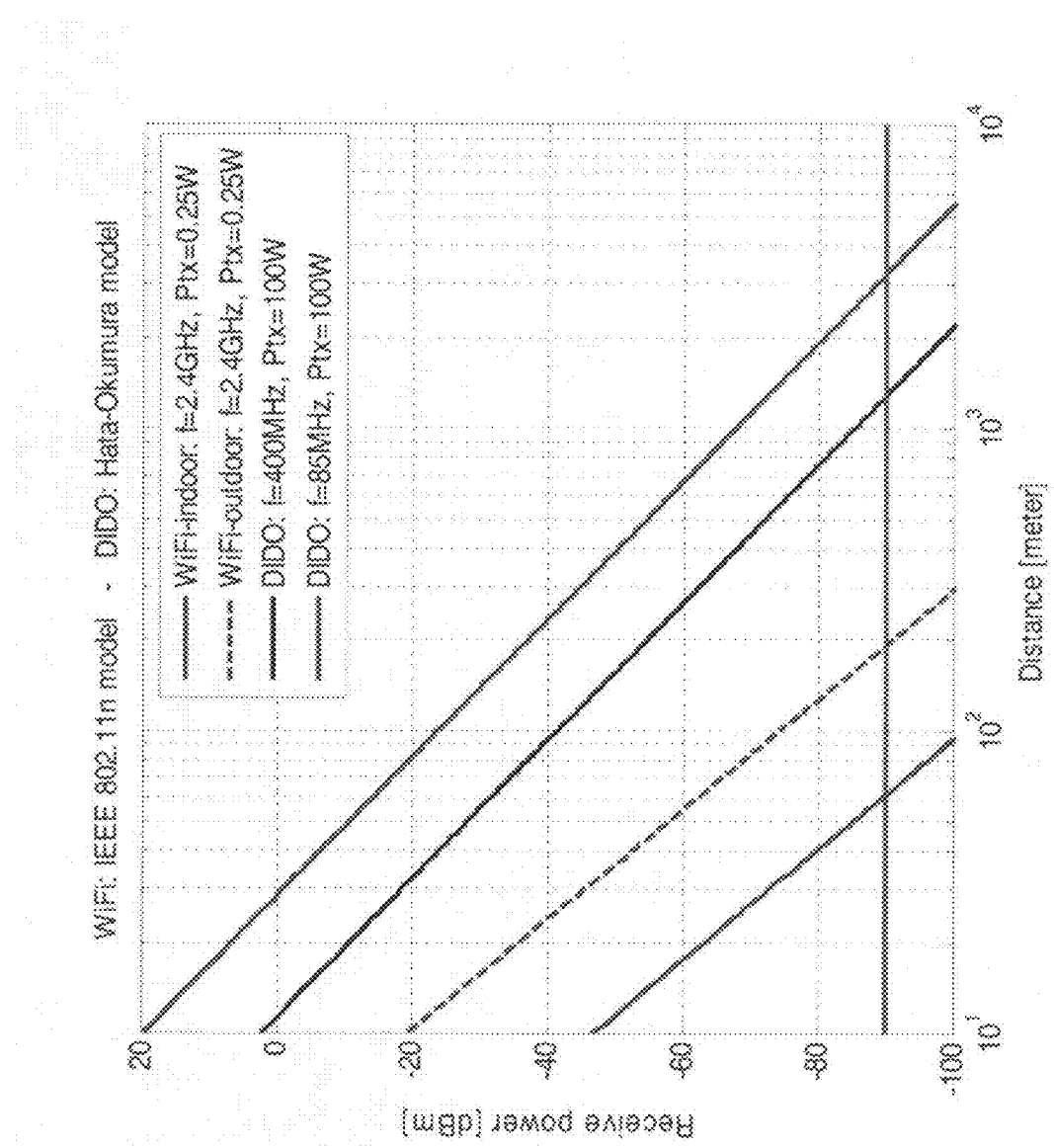
FIG. 66 illustrates the path loss of DIDO at 85 MHz and 400 MHz using the Hata-Okumura model.

One embodiment of a MIDO transmission from a Base Station 600 to Client Devices 606-608 will now be described with reference to FIG. 66. Because each Client Device 606-608 is an independent device, typically each device is receiving a different data transmission. As such, one embodiment of a Base Station 600 includes a Router 602 communicatively positioned between the WAN Interface 601 and the Coding, Modulation and Signal Processing subsystem 603 that sources multiple data streams (formatted into bit streams) from the WAN interface 601 and routes them as separate bit streams $u_1$-$u_3$ intended for each Client Device 606-608, respectively. Various well known routing techniques may be employed by the router 602 for this purpose.

The three bit streams, $u_1$-$u_3$, shown in FIG. 6 are then routed into the Coding, Modulation and Signal Processing subsystem 603 and coded into statistically distinct, error correcting streams (e.g. using Reed Solomon, Viterbi, or Turbo Codes) and modulated using an appropriate modulation scheme for the channel (such as DPSK, 64QAM or OFDM). In addition, the embodiment illustrated in FIG. 6 includes signal precoding logic 630 for uniquely coding the signals transmitted from each of the antennas 605 based on the signal characterization matrix 616. More specifically, rather than routing each of the three coded and modulated bit streams to a separate antenna (as is done in FIG. 1), in one embodiment, the precoding logic 630 multiplies the three bit streams $u_1$-$u_3$ in FIG. 6 by the inverse of the H matrix 616, producing three new bit streams, $u'_1$-$u'_3$. The three precoded bit streams are then converted to analog by D/A converters (not shown) and transmitted as RF by Transceivers 604 and antennas 605.

Before explaining how the bit streams are received by the Client Devices 606-608, the operations performed by the precoding module 630 will be described. Similar to the MIMO example from FIG. 1 above, the coded and modulated signal for each of the three source bit streams will be designated with $u_n$. In the embodiment illustrated in FIG. 6, each $u_i$ contains the data from one of the three bit streams routed by the Router 602, and each such bit stream is intended for one of the three Client Devices 606-608.

However, unlike the MIMO example of FIG. 1, where each $x_i$ is transmitted by each antenna 104, in the embodiment of the invention illustrated in FIG. 6, each $u_i$ is received at each Client Device antenna 609 (plus whatever noise N there is in the channel). To achieve this result, the output of each of the three antennas 605 (each of which we will designate as v) is a function of $u_i$ and the H matrix that characterizes the channel for each Client Device. In one embodiment, each $v_i$ is calculated by the precoding logic 630 within the Coding, Modulation and Signal Processing subsystem 603 by implementing the following formulas:

$$v_1 = u_1 H^{-1}{}_{11} + u_2 H^{-1}{}_{12} + u_3 H^{-1}{}_{13}$$

$$v_2 = u_1 H^{-1}{}_{21} + u_2 H^{-1}{}_{22} + u_3 H^{-1}{}_{23}$$

$$v_3 = u_1 H^{-1}{}_{31} + u_2 H^{-1}{}_{32} + u_3 H^{-1}{}_{33}$$

Thus, unlike MIMO, where each $x_i$ is calculated at the receiver after the signals have been transformed by the channel, the embodiments of the invention described herein solve for each $v_i$ at the transmitter before the signals have been transformed by the channel. Each antenna 609 receives $u_i$ already separated from the other $u_{n-1}$ bit streams intended for the other antennas 609. Each Transceiver 610 converts each received signal to baseband, where it is digitized by an A/D converter (now shown), and each Coding, Modulation and Signal Processing subsystem 611, demodulates and decodes the $x_i$ bit stream intended for it, and sends its bit stream to a Data Interface 612 to be used by the Client Device (e.g., by an application on the client device).

The embodiments of the invention described herein may be implemented using a variety of different coding and modulation schemes. For example, in an OFDM implementation, where the frequency spectrum is separated into a plurality of sub-bands, the techniques described herein may be employed to characterize each individual sub-band. As mentioned above, however, the underlying principles of the invention are not limited to any particular modulation scheme.

If the Client Devices 606-608 are portable data processing devices such as PDAs, notebook computers, and/or wireless telephones the channel characterization may change frequently as the Client Devices may move from one location to another. As such, in one embodiment of the invention, the channel characterization matrix 616 at the Base Station is continually updated. In one embodiment, the Base Station 600 periodically (e.g., every 250 milliseconds) sends out a new training signal to each Client Device, and each Client Device continually transmits its channel characterization vector back to the Base Station 600 to ensure that the channel characterization remains accurate (e.g. if the environment changes so as to affect the channel or if a Client Device moves). In one embodiment, the training signal is interleaved within the actual data signal sent to each client device. Typically, the training signals are much lower throughput than the data signals, so this would have little impact on the overall throughput of the system. Accordingly, in this embodiment, the channel characterization matrix 616 may be updated continuously as the Base Station actively communicates with each Client Device, thereby maintaining an accurate channel characterization as the Client Devices move from one location to the next or if the environment changes so as to affect the channel.

Figure 7:
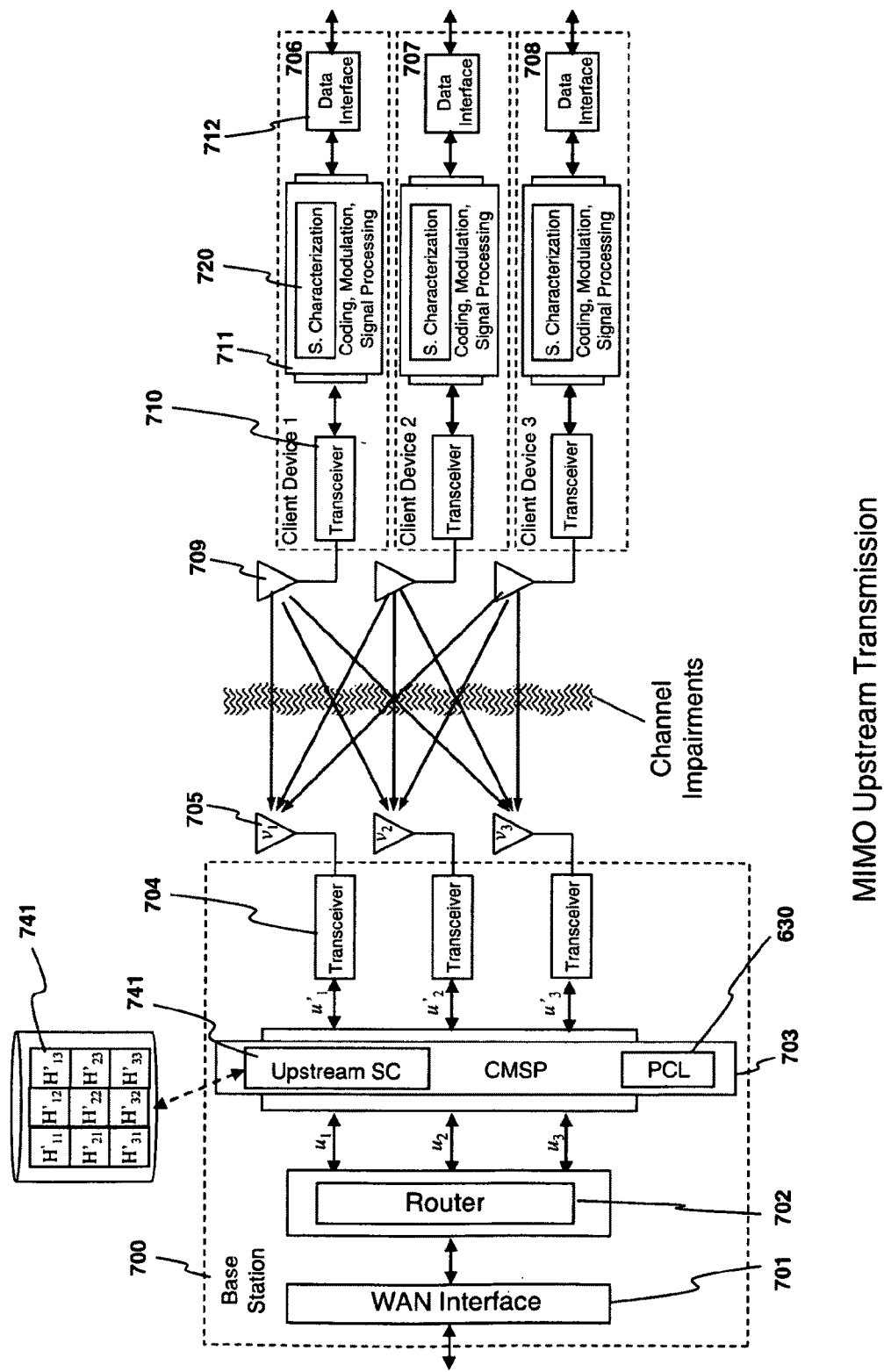
FIG. 7 illustrates a Multiple-Input Multiple Output ("MIMO") upstream transmission according to one embodiment of the invention.

One embodiment of the invention illustrated in FIG. 7 employs MIMO techniques to improve the upstream communication channel (i.e., the channel from the Client Devices 706-708 to the Base Station 700). In this embodiment, the channel from each of the Client Devices is continually analyzed and characterized by upstream channel characterization logic 741 within the Base Station. More specifically, each of the Client Devices 706-708 transmits a training signal to the Base Station 700 which the channel characterization logic 741 analyzes (e.g., as in a typical MIMO system) to generate an N×M channel characterization matrix 741, where N is the number of Client Devices and M is the number of antennas employed by the Base Station. The embodiment illustrated in FIG. 7 employs three antennas 705 at the Base Station and three Client Devices 706-608, resulting in a 3×3 channel characterization matrix 741 stored at the Base Station 700. The MIMO upstream transmission illustrated in FIG. 7 may be used by the Client Devices both for transmitting data back to the Base Station 700, and for transmitting channel characterization vectors back to the Base Station 700 as illustrated in FIG. 5. But unlike the embodiment illustrated in FIG. 5 in which each Client Device's channel characterization vector is transmitted at a separate time, the method shown in FIG. 7 allows for the simultaneous transmission of channel characterization vectors from multiple Client Devices back to the Base Station 700, thereby dramatically reducing the channel characterization vectors' impact on return channel throughput.

As mentioned above, each signal's characterization may include many factors including, for example, phase and amplitude relative to a reference internal to the receiver, an absolute reference, a relative reference, characteristic noise, or other factors. For example, in a quadrature amplitude modulation ("QAM")-modulated signal the characterization might be a vector of the phase and amplitude offsets of several multipath images of the signal. As another example, in an orthogonal frequency division multiplexing ("OFDM")-modulated signal, it might be a vector of the phase and amplitude offsets of several or all of the individual sub-signals in the OFDM spectrum. The training signal may be generated by each Client Device's coding and modulation subsystem 711, converted to analog by a D/A converter (not shown), and then converted from baseband to RF by each Client Device's transmitter 709. In one embodiment, in order to ensure that the training signals are synchronized, Client Devices only transmit training signals when requested by the Base Station (e.g., in a round robin manner). In addition, training signals may be interleaved within or transmitted concurrently with the actual data signal sent from each client device. Thus, even if the Client Devices 706-708 are mobile, the training signals may be continuously transmitted and analyzed by the upstream channel characterization logic 741, thereby ensuring that the channel characterization matrix 741 remains up-to-date.

The total channel capacity supported by the foregoing embodiments of the invention may be defined as min (N, M) where M is the number of Client Devices and N is the number of Base Station antennas. That is, the capacity is limited by the number of antennas on either the Base Station side or the Client side. As such, one embodiment of the invention employs synchronization techniques to ensure that no more than min (N, M) antennas are transmitting/receiving at a given time.

Figure 8:
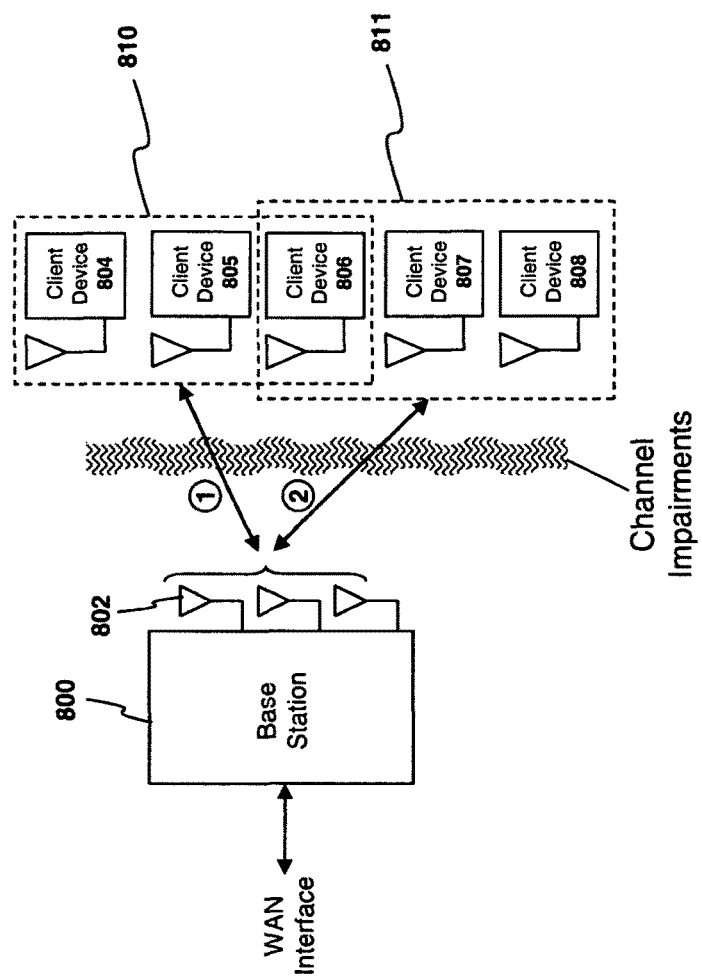
FIG. 8 illustrates a base station cycling through different client groups to allocate throughput according to one embodiment of the invention.

In a typical scenario, the number of antennas 705 on the Base Station 700 will be less than the number of Client Devices 706-708. An exemplary scenario is illustrated in FIG. 8 which shows five Client Devices 804-808 communicating with a base station having three antennas 802. In this embodiment, after determining the total number of Client Devices 804-808, and collecting the necessary channel characterization information (e.g., as described above), the Base Station 800 chooses a first group of three clients 810 with which to communicate (three clients in the example because min (N, M)=3). After communicating with the first group of clients 810 for a designated period of time, the Base Station then selects another group of three clients 811 with which to communicate. To distribute the communication channel evenly, the Base Station 800 selects the two Client Devices 807, 808 which were not included in the first group. In addition, because an extra antenna is available, the Base Station 800 selects an additional client device 806 included in the first group. In one embodiment, the Base Station 800 cycles between groups of clients in this manner such that each client is effectively allocated the same amount of throughput over time. For example, to allocate throughput evenly, the Base Station may subsequently select any combination of three Client Devices which excludes Client Device 806 (i.e., because Client Device 806 was engaged in communication with the Base Station for the first two cycles).

In one embodiment, in addition to standard data communications, the Base Station may employ the foregoing techniques to transmit training signals to each of the Client Devices and receive training signals and signal characterization data from each of the Client Devices.

In one embodiment, certain Client Devices or groups of client devices may be allocated different levels of throughput. For example, Client Devices may be prioritized such that relatively higher priority Client Devices may be guaranteed more communication cycles (i.e., more throughput) than relatively lower priority client devices. The "priority" of a Client Device may be selected based on a number of variables including, for example, the designated level of a user's subscription to the wireless service (e.g., user's may be willing to pay more for additional throughput) and/or the type of data being communicated to/from the Client Device (e.g., real-time communication such as telephony audio and video may take priority over non-real time communication such as email).

In one embodiment of the Base Station dynamically allocates throughput based on the Current Load required by each Client Device. For example, if Client Device 804 is streaming live video and the other devices 805-808 are performing non-real time functions such as email, then the Base Station 800 may allocate relatively more throughput to this client 804. It should be noted, however, that the underlying principles of the invention are not limited to any particular throughput allocation technique.

Figure 9:
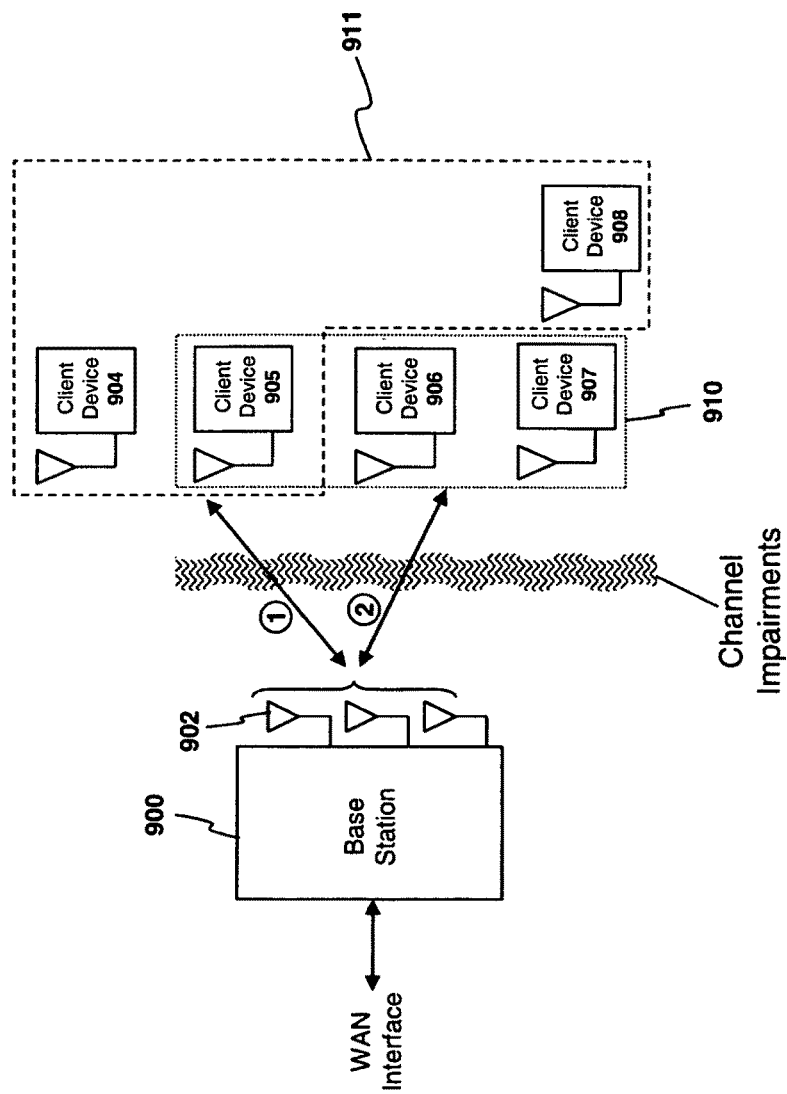
FIG. 9 illustrates a grouping of clients based on proximity according to one embodiment of the invention.

As illustrated in FIG. 9, two Client Devices 907, 908 may be so close in proximity, that the channel characterization for the clients is effectively the same. As a result, the Base Station will receive and store effectively equivalent channel characterization vectors for the two Client Devices 907, 908 and therefore will not be able to create unique, spatially distributed signals for each Client Device. Accordingly, in one embodiment, the Base Station will ensure that any two or more Client Devices which are in close proximity to one another are allocated to different groups. In FIG. 9, for example, the Base Station 900 first communicates with a first group 910 of Client Devices 904, 905 and 908; and then with a second group 911 of Client Devices 905, 906, 907, ensuring that Client Devices 907 and 908 are in different groups.

Alternatively, in one embodiment, the Base Station 900 communicates with both Client Devices 907 and 908 concurrently, but multiplexes the communication channel using known channel multiplexing techniques. For example, the Base Station may employ time division multiplexing ("TDM"), frequency division multiplexing ("FDM") or code division multiple access ("CDMA") techniques to divide the single, spatially-correlated signal between Client Devices 907 and 908.

Although each Client Device described above is equipped with a single antenna, the underlying principles of the invention may be employed using Client Devices with multiple antennas to increase throughput. For example, when used on the wireless systems described above, a client with 2 antennas will realize a 2× increase in throughput, a client with 3 antennas will realize a 3× increase in throughput, and so on (i.e., assuming that the spatial and angular separation between the antennas is sufficient). The Base Station may apply the same general rules when cycling through Client Devices with multiple antennas. For example, it may treat each antenna as a separate client and allocate throughput to that "client" as it would any other client (e.g., ensuring that each client is provided with an adequate or equivalent period of communication).

Figure 10:
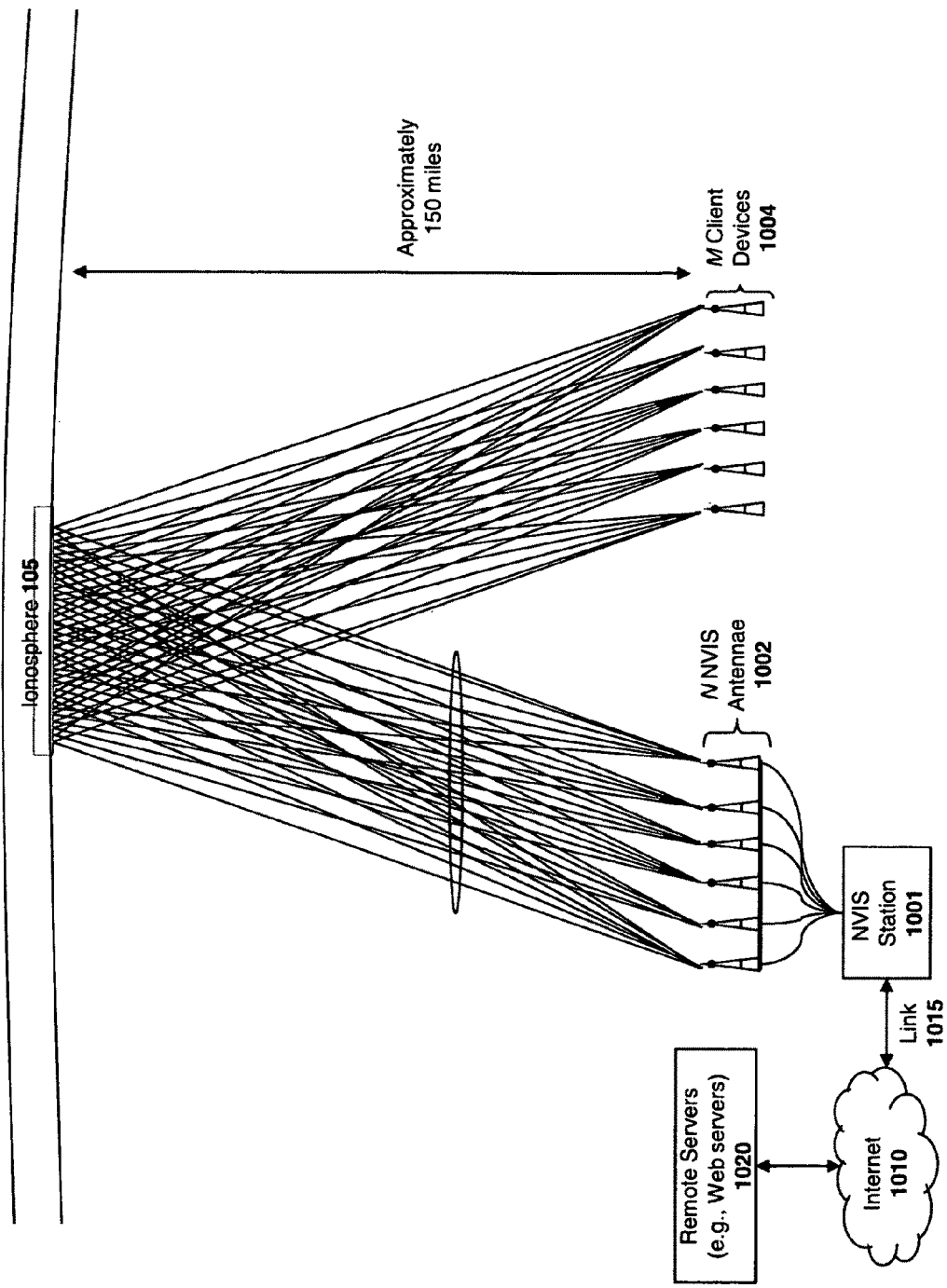
FIG. 10 illustrates an embodiment of the invention employed within an NVIS system.

As mentioned above, one embodiment of the invention employs the MIDO and/or MIMO signal transmission techniques described above to increase the signal-to-noise ratio and throughput within a Near Vertical Incidence Skywave ("NVIS") system. Referring to FIG. 10, in one embodiment of the invention, a first NVIS station 1001 equipped with a matrix of N antennas 1002 is configured to communicate with M client devices 1004. The NVIS antennas 1002 and antennas of the various client devices 1004 transmit signals upward to within about 15 degrees of vertical in order to achieve the desired NVIS and minimize ground wave interference effects. In one embodiment, the antennas 1002 and client devices 1004, support multiple independent data streams 1006 using the various MIDO and MIMO techniques described above at a designated frequency within the NVIS spectrum (e.g., at a carrier frequency at or below 23 MHz, but typically below 10 MHz), thereby significantly increasing the throughput at the designated frequency (i.e., by a factor proportional to the number of statistically independent data streams).

The NVIS antennas serving a given station may be physically very far apart from each other. Given the long wavelengths below 10 MHz and the long distance traveled for the signals (as much as 300 miles round trip), physical separation of the antennas by 100s of yards, and even miles, can provide advantages in diversity. In such situations, the individual antenna signals may be brought back to a centralized location to be processed using conventional wired or wireless communications systems. Alternatively, each antenna can have a local facility to process its signals, then use conventional wired or wireless communications systems to communicate the data back to a centralized location. In one embodiment of the invention, NVIS Station 1001 has a broadband link 1015 to the Internet 1010 (or other wide area network), thereby providing the client devices 1003 with remote, high speed, wireless network access.

In one embodiment, the Base Station and/or users may exploit polarization/pattern diversity techniques described above to reduce the array size and/or users' distance while providing diversity and increased throughput. As an example, in MIDO systems with HF transmissions, the users may be in the same location and yet their signals be uncorrelated because of polarization/pattern diversity. In particular, by using pattern diversity, one user may be communicating to the Base Station via groundwave whereas the other user via NVIS.

Additional Embodiments of the Invention

DIDO-OFDM Precoding with I/Q Imbalance

One embodiment of the invention employs a system and method to compensate for in-phase and quadrature (I/Q) imbalance in distributed-input distributed-output (DIDO) systems with orthogonal frequency division multiplexing (OFDM). Briefly, according to this embodiment, user devices estimate the channel and feedback this information to the Base Station; the Base Station computes the precoding matrix to cancel inter-carrier and inter-user interference caused by I/Q imbalance; and parallel data streams are transmitted to multiple user devices via DIDO precoding; the user devices demodulate data via zero-forcing (ZF), minimum mean-square error (MMSE) or maximum likelihood (ML) receiver to suppress residual interference.

As described in detail below, some of the significant features of this embodiment of the invention include, but are not limited to:

Precoding to cancel inter-carrier interference (ICI) from mirror tones (due to I/Q mismatch) in OFDM systems;

Precoding to cancel inter-user interference and ICI (due to I/Q mismatch) in DIDO-OFDM systems;

Techniques to cancel ICI (due to I/Q mismatch) via ZF receiver in DIDO-OFDM systems employing block diagonalization (BD) precoder;

Techniques to cancel inter-user interference and ICI (due to I/Q mismatch) via precoding (at the transmitter) and a ZF or MMSE filter (at the receiver) in DIDO-OFDM systems;

Techniques to cancel inter-user interference and ICI (due to I/Q mismatch) via pre-coding (at the transmitter) and a nonlinear detector like a maximum likelihood (ML) detector (at the receiver) in DIDO-OFDM systems;

The use of pre-coding based on channel state information to cancel inter-carrier interference (ICI) from mirror tones (due to I/Q mismatch) in OFDM systems;

The use of pre-coding based on channel state information to cancel inter-carrier interference (ICI) from mirror tones (due to I/Q mismatch) in DIDO-OFDM systems;

The use of an I/Q mismatch aware DIDO precoder at the station and an IQ-aware DIDO receiver at the user terminal;

The use of an I/Q mismatch aware DIDO precoder at the station, an I/Q aware DIDO receiver at the user terminal, and an I/Q aware channel estimator;

The use of an I/Q mismatch aware DIDO precoder at the station, an I/Q aware DIDO receiver at the user terminal, an I/Q aware channel estimator, and an I/Q aware DIDO feedback generator that sends channel state information from the user terminal to the station;

The use of an I/Q mismatch-aware DIDO precoder at the station and an I/Q aware DIDO configurator that uses I/Q channel information to perform functions including user selection, adaptive coding and modulation, space-time-frequency mapping, or precoder selection;

The use of an I/Q aware DIDO receiver that cancels ICI (due to I/Q mismatch) via ZF receiver in DIDO-OFDM systems employing block diagonalization (BD) precoder;

The use of an I/Q aware DIDO receiver that cancels ICI (due to I/Q mismatch) via pre-coding (at the transmitter) and a nonlinear detector like a maximum likelihood detector (at the receiver) in DIDO-OFDM systems; and The use of an I/Q aware DIDO receiver that cancels ICI (due to I/Q mismatch) via ZF or MMSE filter in DIDO-OFDM systems.

a. Background

The transmit and receive signals of typical wireless communication systems consist of in-phase and quadrature (I/Q) components. In practical systems, the inphase and quadrature components may be distorted due to imperfections in the mixing and baseband operations. These distortions manifest as I/Q phase, gain and delay mismatch. Phase imbalance is caused by the sine and cosine in the modulator/demodulator not being perfectly orthogonal. Gain imbalance is caused by different amplifications between the inphase and quadrature components. There may be an additional distortion, called delay imbalance, due to difference in delays between the I- and Q-rails in the analog circuitry.

In orthogonal frequency division multiplexing (OFDM) systems, I/Q imbalance causes inter-carrier interference (ICI) from the mirror tones. This effect has been studied in the literature and methods to compensate for I/Q mismatch in single-input single-output SISO-OFDM systems have been proposed in M. D. Benedetto and P. Mandarini, "Analysis of the effect of the I/Q baseband filter mismatch in an OFDM modem," Wireless personal communications, pp. 175-186, 2000; S. Schuchert and R. Hasholzner, "A novel I/Q imbalance compensation scheme for the reception of OFDM signals," IEEE Transaction on Consumer Electronics, August 2001; M. Valkama, M. Renfors, and V. Koivunen, "Advanced methods for I/Q imbalance compensation in communication receivers," IEEE Trans. Sig. Proc., October 2001; R. Rao and B. Daneshrad, "Analysis of I/Q mismatch and a cancellation scheme for OFDM systems," IST Mobile Communication Summit, June 2004; A. Tarighat, R. Bagheri, and A. H. Sayed, "Compensation schemes and performance analysis of IQ imbalances in OFDM receivers," Signal Processing, IEEE Transactions on [see also Acoustics, Speech, and Signal Processing, IEEE Transactions on], vol. 53, pp. 3257-3268, August 2005.

An extension of this work to multiple-input multiple-output MIMO-OFDM systems was presented in R. Rao and B. Daneshrad, "I/Q mismatch cancellation for MIMO OFDM systems," in Personal, Indoor and Mobile Radio Communications, 2004; PIMRC 2004. 15th IEEE International Symposium on, vol. 4, 2004, pp. 2710-2714. R. M. Rao, W. Zhu, S. Lang, C. Oberli, D. Browne, J. Bhatia, J. F. Frigon, J. Wang, P; Gupta, H. Lee, D. N. Liu, S. G. Wong, M. Fitz, B. Daneshrad, and O. Takeshita, "Multi-antenna testbeds for research and education in wireless communications," IEEE Communications Magazine, vol. 42, no. 12, pp. 72-81, December 2004; S. Lang, M. R. Rao, and B. Daneshrad, "Design and development of a 5.25 GHz software defined wireless OFDM communication platform," IEEE Communications Magazine, vol. 42, no. 6, pp. 6-12, June 2004, for spatial multiplexing (SM) and in A. Tarighat and A. H. Sayed, "MIMO OFDM receivers for systems with IQ imbalances," IEEE Trans. Sig. Proc., vol. 53, pp. 3583-3596, September 2005, for orthogonal space-time block codes (OSTBC).

Unfortunately, there is currently no literature on how to correct for I/Q gain and phase imbalance errors in a distributed-input distributed-output (DIDO) communication system. The embodiments of the invention described below provide a solution to these problems.

DIDO systems consist of one Base Station with distributed antennas that transmits parallel data streams (via precoding) to multiple users to enhance downlink throughput, while exploiting the same wireless resources (i.e., same slot duration and frequency band) as conventional SISO systems. A detailed description of DIDO systems was presented in S. G. Perlman and T. Cotter, "System and Method for Distributed Input-Distributed Output Wireless Communications," Ser. No. 10/902,978, filed Jul. 30, 2004 ("Prior Application"), which is assigned to the assignee of the present application and which is incorporated herein by reference.

There are many ways to implement DIDO precoders. One solution is block diagonalization (BD) described in Q. H. Spencer, A. L. Swindlehurst, and M. Haardt, "Zero forcing methods for downlink spatial multiplexing in multiuser MIMO channels," IEEE Trans. Sig. Proc., vol. 52, pp.

461-471, February 2004. K. K. Wong, R. D. Murch, and K. B. Letaief, "A joint channel diagonalization for multiuser MIMO antenna systems," IEEE Trans. Wireless Comm., vol. 2, pp. 773-786, July 2003; L. U. Choi and R. D. Murch, "A transmit preprocessing technique for multiuser MIMO systems using a decomposition approach," IEEE Trans. Wireless Comm., vol. 3, pp. 20-24, January 2004; Z. Shen, J. G. Andrews, R. W. Heath, and B. L. Evans, "Low complexity user selection algorithms for multiuser MIMO systems with block diagonalization," accepted for publication in IEEE Trans. Sig. Proc., September 2005; Z. Shen, R. Chen, J. G. Andrews, R. W. Heath, and B. L. Evans, "Sum capacity of multiuser MIMO broadcast channels with block diagonalization," submitted to IEEE Trans. Wireless Comm., October 2005; R. Chen, R. W. Heath, and J. G. Andrews, "Transmit selection diversity for unitary precoded multiuser spatial multiplexing systems with linear receivers," accepted to IEEE Trans. on Signal Processing, 2005. The methods for I/Q compensation presented in this document assume BD precoder, but can be extended to any type of DIDO precoder.

In DIDO-OFDM systems, I/Q mismatch causes two effects: ICI and inter-user interference. The former is due to interference from the mirror tones as in SISO-OFDM systems. The latter is due to the fact that I/Q mismatch destroys the orthogonality of the DIDO precoder yielding interference across users. Both of these types of interference can be cancelled at the transmitter and receiver through the methods described herein. Three methods for I/Q compensation in DIDO-OFDM systems are described and their performance is compared against systems with and without I/Q mismatch. Results are presented based both on simulations and practical measurements carried out with the DIDO-OFDM prototype.

The present embodiments are an extension of the Prior Application. In particular, these embodiments relate to the following features of the Prior Application:

The system as described in the prior application, where the I/Q rails are affected by gain and phase imbalance;

The training signals employed for channel estimation are used to calculate the DIDO precoder with I/Q compensation at the transmitter; and The signal characterization data accounts for distortion due to I/Q imbalance and is used at the transmitter to compute the DIDO precoder according to the method proposed in this document.

b. Embodiments of the Invention

First, the mathematical model and framework of the invention will be described.

Before presenting the solution, it is useful to explain the core mathematical concept. We explain it assuming I/Q gain and phase imbalance (phase delay is not included in the description but is dealt with automatically in the DIDO-OFDM version of the algorithm). To explain the basic idea, suppose that we want to multiply two complex numbers $s = s_I + js_Q$ and $h = h_I + jh_Q$ and let $x = h \cdot s$. We use the subscripts to denote inphase and quadrature components. Recall that $$x_I = s_I h_I - s_Q h_Q$$

and $$x_Q = s_I h_Q + s_Q h_I$$

In matrix form this can be rewritten as $$\begin{bmatrix} x_I \\ x_Q \end{bmatrix} = \begin{bmatrix} h_I & -h_Q \\ h_Q & h_I \end{bmatrix} \begin{bmatrix} s_I \\ s_Q \end{bmatrix}.$$

Note the unitary transformation by the channel matrix (H). Now suppose that s is the transmitted symbol and h is the channel. The presence of I/Q gain and phase imbalance can be modeled by creating a non-unitary transformation as follows $$\begin{bmatrix} x_I \\ x_Q \end{bmatrix} = \begin{bmatrix} h_{11} & h_{12} \\ h_{21} & h_{22} \end{bmatrix} \begin{bmatrix} s_I \\ s_Q \end{bmatrix}. \quad (A)$$

The trick is to recognize that it is possible to write $$\begin{bmatrix} h_{11} & h_{12} \\ h_{21} & h_{22} \end{bmatrix} = \frac{1}{2}\begin{bmatrix} h_{11}+h_{22} & h_{12}-h_{21} \\ -(h_{12}-h_{21}) & h_{11}+h_{22} \end{bmatrix} + \frac{1}{2}\begin{bmatrix} h_{11}-h_{22} & h_{12}+h_{21} \\ h_{12}-h_{21} & h_{22}-h_{11} \end{bmatrix} = $$
$$\frac{1}{2}\begin{bmatrix} h_{11}+h_{22} & h_{12}-h_{21} \\ -(h_{12}-h_{21}) & h_{11}+h_{22} \end{bmatrix} + \frac{1}{2}\begin{bmatrix} h_{11}-h_{22} & -(h_{12}+h_{21}) \\ h_{12}+h_{21} & h_{11}-h_{22} \end{bmatrix}\begin{bmatrix} 1 & 0 \\ 0 & -1 \end{bmatrix}.$$

Now, rewriting (A)

$$\begin{bmatrix} x_I \\ x_Q \end{bmatrix} = \frac{1}{2}\begin{bmatrix} h_{11}+h_{22} & h_{12}-h_{21} \\ -(h_{12}-h_{21}) & h_{11}+h_{22} \end{bmatrix}\begin{bmatrix} s_I \\ s_Q \end{bmatrix} + \quad (5)$$
$$\frac{1}{2}\begin{bmatrix} h_{11}-h_{22} & -(h_{12}+h_{21}) \\ h_{12}+h_{21} & h_{11}-h_{22} \end{bmatrix}\begin{bmatrix} 1 & 0 \\ 0 & -1 \end{bmatrix}\begin{bmatrix} s_I \\ s_Q \end{bmatrix}$$
$$= \frac{1}{2}\begin{bmatrix} h_{11}+h_{22} & h_{12}-h_{21} \\ -(h_{12}-h_{21}) & h_{11}+h_{22} \end{bmatrix}\begin{bmatrix} s_I \\ s_Q \end{bmatrix} +$$
$$\frac{1}{2}\begin{bmatrix} h_{11}-h_{22} & -(h_{12}+h_{21}) \\ h_{12}+h_{21} & h_{11}-h_{22} \end{bmatrix}\begin{bmatrix} s_I \\ -s_Q \end{bmatrix}$$

Let us define $$\mathcal{H}_e = \frac{1}{2}\begin{bmatrix} h_{11}+h_{22} & h_{12}-h_{21} \\ -(h_{12}-h_{21}) & h_{11}+h_{22} \end{bmatrix}$$

and $$\mathcal{H}_c = \frac{1}{2}\begin{bmatrix} h_{11}-h_{22} & -(h_{12}+h_{21}) \\ h_{12}+h_{21} & h_{11}-h_{22} \end{bmatrix}.$$

Both of these matrices have a unitary structure thus can be equivalently represented by complex scalars as and $$h_e = h_{11} + h_{22} + j(h_{21} - h_{12})$$

and $$h_c = h_{11} - h_{22} + j(h_{21} + h_{12}).$$

Using all of these observations, we can put the effective equation back in a scalar form with two channels: the equivalent channel $h_e$ and the conjugate channel $h_c$. Then the effective transformation in (5) becomes $$x = h_e s + h_c s^*.$$

We refer to the first channel as the equivalent channel and the second channel as the conjugate channel. The equivalent channel is the one you would observe if there were no I/Q gain and phase imbalance.

Using similar arguments, it can be shown that the input-output relationship of a discrete-time MIMO N×M system with I/Q gain and phase imbalance is (using the scalar equivalents to build their matrix counterparts)

$$x[t] = \sum_{\ell=0}^{L} h_e[\ell]s(t-\ell) + h_c[\ell]s^*[t-\ell]$$

where t is the discrete time index, $h_e$, $h_c \in C^{M \times N}$, $s=[s_1, \ldots, s_N]$, $x=[x_1, \ldots, x_M]$ and L is the number of channel taps.

In DIDO-OFDM systems, the received signal in the frequency domain is represented. Recall from signals and systems that if $$FFT_K\{s[t]\}=S[k] \text{ then } FFT_K\{s^*[t]\}=S^*[(-k)]=S^*[K-k] \text{ for } k=0,1,\ldots,K-1.$$

With OFDM, the equivalent input-output relationship for a MIMO-OFDM system for subcarrier k is $$\bar{x}[k]=H_e[k]\bar{s}[k]+H_c[k]\bar{s}^*[K-k] \quad (1)$$

where $k=0, 1, \ldots, K-1$ is the OFDM subcarrier index, $H_e$ and $H_c$ denote the equivalent and conjugate channel matrices, respectively, defined as $$H_e[k] = \sum_{\ell=0}^{L} h_e[\ell]e^{-j\frac{2\Pi k}{K}\ell}$$

and $$H_c[k] = \sum_{\ell=0}^{L} h_c[\ell]e^{-j\frac{2\Pi k}{K}\ell}.$$

The second contribution in (1) is interference from the mirror tone. It can be dealt with by constructing the following stacked matrix system (note carefully the conjugates)

$$\begin{bmatrix} \bar{x}[k] \\ \bar{x}^*[K-k] \end{bmatrix} = \begin{bmatrix} H_e[k] & H_c[k] \\ H_c^*[K-k] & H_e^*[K-k] \end{bmatrix} \begin{bmatrix} \bar{s}[k] \\ \bar{s}^*[K-k] \end{bmatrix}$$

where $\bar{s}=[\bar{s}_1,\bar{s}_2]^T$ and $\bar{x}=[\bar{x}_1,\bar{x}_2]^T$ are the vectors of transmit and receive symbols in the frequency domain, respectively.

Using this approach, an effective matrix is built to use for DIDO operation. For example, with DIDO 2×2 the input-output relationship (assuming each user has a single receive antenna) the first user device sees (in the absence of noise)

$$\begin{bmatrix} \bar{x}_1[k] \\ \bar{x}_1^*[K-k] \end{bmatrix} = \begin{bmatrix} H_e^{(1)}[k] & H_c^{(1)}[k] \\ H_c^{(1)*}[K-k] & H_e^{(1)*}[K-k] \end{bmatrix} W \begin{bmatrix} \bar{s}_1[k] \\ \bar{s}_1^*[K-k] \\ \bar{s}_2[k] \\ \bar{s}_2^*[K-k] \end{bmatrix} \quad (2)$$

while the second user observes $$\begin{bmatrix} \bar{x}_2[k] \\ \bar{x}_2^*[K-k] \end{bmatrix} = \begin{bmatrix} H_e^{(2)}[k] & H_c^{(2)}[k] \\ H_c^{(2)*}[K-k] & H_e^{(2)*}[K-k] \end{bmatrix} W \begin{bmatrix} \bar{s}_1[k] \\ \bar{s}_1^*[K-k] \\ \bar{s}_2[k] \\ \bar{s}_2^*[K-k] \end{bmatrix} \quad (3)$$

where $H_e^{(m)}$, $H_c^{(m)} \in C^{1 \times 2}$ denote the m-th row of the matrices $H_e$ and $H_c$, respectively, and $W \in C^{4 \times 4}$ is the DIDO pre-coding matrix. From (2) and (3) it is observed that the received symbol $\bar{x}_m[k]$ of user m is affected by two sources of interference caused by I/Q imbalance: inter-carrier interference from the mirror tone (i.e., $\bar{s}^*_m[K-k]$) and inter-user interference (i.e., $\bar{s}_p[k]$ and $\bar{s}^*_p[K-k]$ with $p \neq m$). The DIDO precoding matrix W in (3) is designed to cancel these two interference terms.

There are several different embodiments of the DIDO precoder that can be used here depending on joint detection applied at the receiver. In one embodiment, block diagonalization (BD) is employed (see, e.g., Q. H. Spencer, A. L. Swindlehurst, and M. Haardt, "Zeroforcing methods for downlink spatial multiplexing in multiuser MIMO channels," IEEE Trans. Sig. Proc., vol. 52, pp. 461-471, February 2004. K. K. Wong, R. D. Murch, and K. B. Letaief, "A joint channel diagonalization for multiuser MIMO antenna systems," IEEE Trans. Wireless Comm., vol. 2, pp. 773-786, July 2003. L. U. Choi and R. D. Murch, "A transmit preprocessing technique for multiuser MIMO systems using a decomposition approach," IEEE Trans. Wireless Comm., vol. 3, pp. 20-24, January 2004. Z. Shen, J. G. Andrews, R. W. Heath, and B. L. Evans, "Low complexity user selection algorithms for multiuser MIMO systems with block diagonalization," accepted for publication in IEEE Trans. Sig. Proc., September 2005. Z. Shen, R. Chen, J. G. Andrews, R. W. Heath, and B. L. Evans, "Sum capacity of multiuser MIMO broadcast channels with block diagonalization," submitted to IEEE Trans. Wireless Comm., October 2005, computed from the composite channel $[H_e^{(m)}, H_c^{(m)}]$ (rather than $H_e^{(m)}$). So, the current DIDO system chooses the precoder such that $$H_w \triangleq \begin{bmatrix} H_e^{(1)}[k] & H_c^{(1)}[k] \\ H_c^{(1)*}[K-k] & H_e^{(1)*}[K-k] \\ H_e^{(2)}[k] & H_c^{(2)}[k] \\ H_c^{(2)*}[K-k] & H_e^{(2)*}[K-k] \end{bmatrix} W \quad (4)$$

$$= \begin{bmatrix} \alpha_{1,1} & 0 & 0 & 0 \\ 0 & \alpha_{1,2} & 0 & 0 \\ 0 & 0 & \alpha_{2,1} & 0 \\ 0 & 0 & 0 & \alpha_{2,2} \end{bmatrix}$$

$$\triangleq \begin{bmatrix} H_w^{(1,1)} & H_w^{(1,2)} \\ H_w^{(2,1)} & H_w^{(2,2)} \end{bmatrix}$$

where $\alpha_{i,j}$ are constants and $H_w^{(i,j)} \in C^{2 \times 2}$. This method is beneficial because using this precoder, it is possible to keep other aspects of the DIDO precoder the same as before, since the effects of I/Q gain and phase imbalance are completely cancelled at the transmitter.

It is also possible to design DIDO precoders that pre-cancel inter-user interference, without pre-cancelling ICI due to IQ imbalance. With this approach, the receiver (instead of the transmitter) compensates for the IQ imbalance by employing one of the receive filters described below. Then, the pre-coding design criterion in (4) can be modified as $$H_w \triangleq \begin{bmatrix} H_e^{(1)}[k] & H_c^{(1)}[k] \\ H_c^{(1)*}[K-k] & H_e^{(1)*}[K-k] \\ H_e^{(2)}[k] & H_c^{(2)}[k] \\ H_c^{(2)*}[K-k] & H_e^{(2)*}[K-k] \end{bmatrix} W \quad (5)$$

$$= \begin{bmatrix} \alpha_{1,1} & \alpha_{1,2} & 0 & 0 \\ \alpha_{2,1} & \alpha_{2,2} & 0 & 0 \\ 0 & 0 & \alpha_{3,3} & \alpha_{3,4} \\ 0 & 0 & \alpha_{4,3} & \alpha_{4,4} \end{bmatrix}$$

$$\triangleq \begin{bmatrix} H_w^{(1,1)} & H_w^{(1,2)} \\ H_w^{(2,1)} & H_w^{(2,2)} \end{bmatrix}$$

$$\bar{x}_1[k] = [H_w^{(1,1)} \ H_w^{(1,2)}] \begin{bmatrix} \bar{s}_1[k] \\ \bar{s}_2[k] \end{bmatrix} \quad (6)$$

and $$\bar{x}_2[k] = [H_w^{(2,1)} \ H_w^{(2,2)}] \begin{bmatrix} \bar{s}_1[k] \\ \bar{s}_2[k] \end{bmatrix} \quad (7)$$

where $\bar{s}_m[k] = [\bar{s}_m[k], \bar{s}^*_m[K-k]]^T$ for the m-th transmit symbol and $\bar{x}_m[k] = [\bar{x}_m[k], \bar{x}^*_m[K-k]]^T$ is the receive symbol vector for user m.

At the receive side, to estimate the transmit symbol vector $\bar{s}_m[k]$, user m employs ZF filter and the estimated symbol vector is given by $$\hat{s}_m^{(ZF)}[k] = [(H_w^{(m,m)\dagger} H_w^{(m,m)})^{-1} H_w^{(m,m)\dagger}] \bar{x}_m[k] \quad (8)$$

While the ZF filter is the easiest to understand, the receiver may apply any number of other filters known to those skilled in the art. One popular choice is the MMSE filter where $$\hat{s}_m^{(MMSE)}[k] = (H_w^{(m,m)\dagger} + \rho^{-1} I)^{-1} H_w^{(m,m)\dagger} H_w^{(m,m)} \bar{x}_m[k] \quad (9)$$

and ρ is the signal-to-noise ratio. Alternatively, the receiver may perform a maximum likelihood symbol detection (or sphere decoder or iterative variation). For example, the first user might use the ML receiver and solve the following optimization $$\hat{s}_m^{(ML)}[k] = \arg\min_{s_1, s_2 \in S} \left\| \bar{y}_1[k] - [H_w^{(1,1)} \ H_w^{(1,2)}] \begin{bmatrix} s_1[k] \\ s_2[k] \end{bmatrix} \right\| \quad (10)$$

where S is the set of all possible vectors s and depends on the constellation size. The ML receiver gives better performance at the expense of requiring more complexity at the receiver. A similar set of equations applies for the second user.

Note that $H_w^{(1,2)}$ and $H_w^{(2,1)}$ in (6) and (7) are assumed to have zero entries. This assumption holds only if the transmit precoder is able to cancel completely the inter-user interference as for the criterion in (4). Similarly, $H_w^{(1,1)}$ and $H_w^{(2,2)}$ are diagonal matrices only if the transmit precoder is able to cancel completely the inter-carrier interference (i.e., from the mirror tones).

Figure 13:
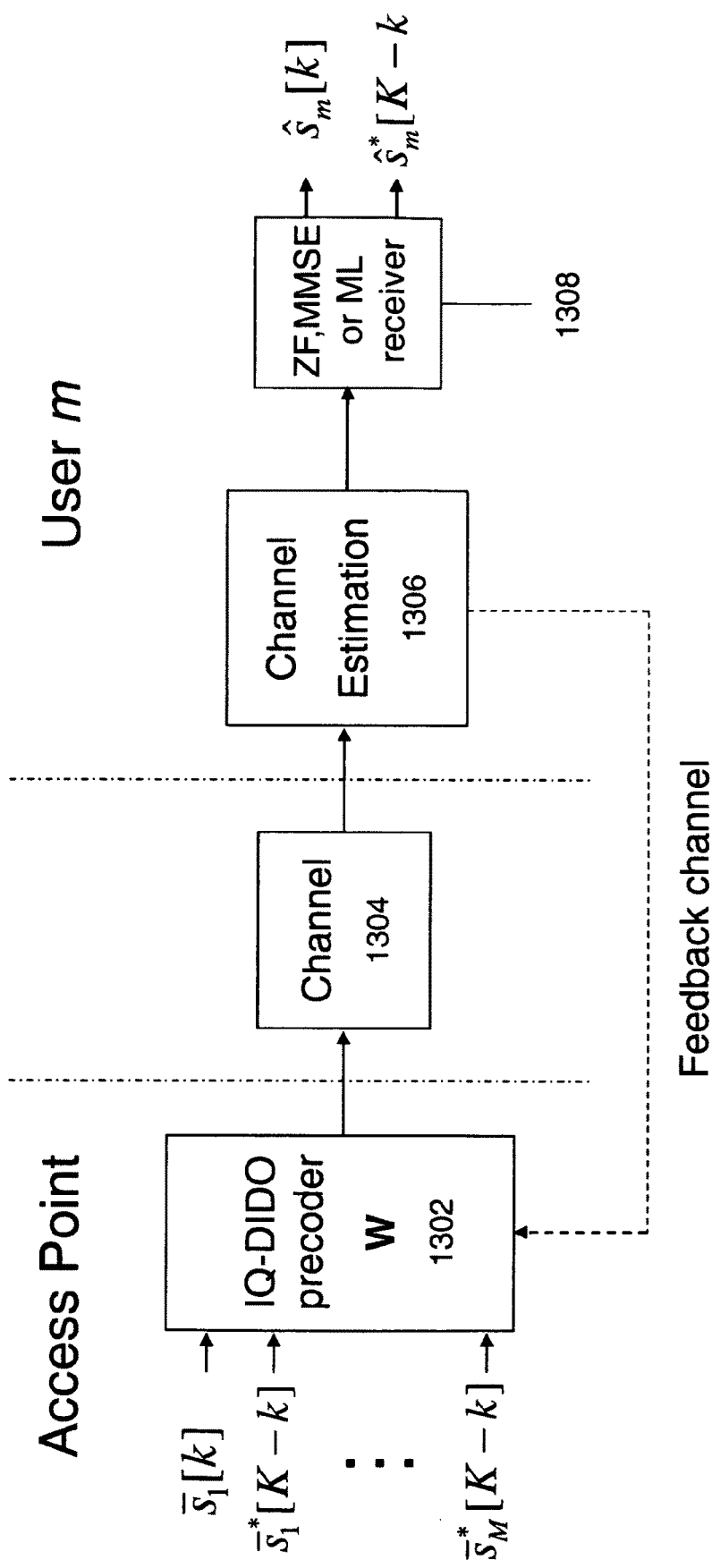
FIG. 13 illustrates one embodiment of DIDO-OFDM systems with I/Q compensation.

FIG. 13 illustrates one embodiment of a framework for DIDO-OFDM systems with I/Q compensation including IQ-DIDO precoder 1302 within a Base Station (BS), a transmission channel 1304, channel estimation logic 1306 within a user device, and a ZF, MMSE or ML receiver 1308. The channel estimation logic 1306 estimates the channels $H_e^{(m)}$ and $H_c^{(m)}$ via training symbols and feedbacks these estimates to the precoder 1302 within the AP. The BS computes the DIDO precoder weights (matrix W) to pre-cancel the interference due to I/Q gain and phase imbalance as well as inter-user interference and transmits the data to the users through the wireless channel 1304. User device m employs the ZF, MMSE or ML receiver 1308, by exploiting the channel estimates provided by the unit 1304, to cancel residual interference and demodulates the data.

The following three embodiments may be employed to implement this I/Q compensation algorithm:

Method 1—TX compensation:

In this embodiment, the transmitter calculates the pre-coding matrix according to the criterion in (4). At the receiver, the user devices employ a "simplified" ZF receiver, where $H_w^{(1,1)}$ and $H_w^{(2,2)}$ are assumed to be diagonal matrices. Hence, equation (8) simplifies as $$\hat{s}_m[k] = \begin{bmatrix} 1/\alpha_{m,1} & 0 \\ 0 & 1/\alpha_{m,2} \end{bmatrix} \bar{x}_m[k]. \quad (10)$$

Method 2—RX compensation:

In this embodiment, the transmitter calculates the pre-coding matrix based on the conventional BD method described in R. Chen, R. W. Heath, and J. G. Andrews, "Transmit selection diversity for unitary precoded multiuser spatial multiplexing systems with linear receivers," accepted to IEEE Trans. on Signal Processing, 2005, without canceling inter-carrier and inter-user interference as for the criterion in (4). With this method, the pre-coding matrix in (2) and (3) simplifies as $$W = \begin{bmatrix} w_{1,1}[k] & 0 & w_{1,2}[k] & 0 \\ 0 & w_{1,1}^*[K-k] & 0 & w_{1,2}^*[K-k] \\ w_{2,1}[k] & 0 & w_{2,2}[k] & 0 \\ 0 & w_{2,1}^*[K-k] & 0 & w_{2,2}^*[K-k] \end{bmatrix}. \quad (12)$$

At the receiver, the user devices employ a ZF filter as in (8). Note that this method does not pre-cancel the interference at the transmitter as in the method 1 above. Hence, it cancels the inter-carrier interference at the receiver, but it is not able to cancel the inter-user interference. Moreover, in method 2 the users only need to feedback the vector $H_e^{(m)}$ for the transmitter to compute the DIDO precoder, as opposed to method 1 that requires feedback of both $H_e^{(m)}$ and $H_c^{(m)}$. Therefore, method 2 is particularly suitable for DIDO systems with low rate feedback channels. On the other hand, method 2 requires slightly higher computational complexity at the user device to compute the ZF receiver in (8) rather than (11).

Method 3—TX-RX compensation:

In one embodiment, the two methods described above are combined. The transmitter calculates the pre-coding matrix as in (4) and the receivers estimate the transmit symbols according to (8).

I/Q imbalance, whether phase imbalance, gain imbalance, or delay imbalance, creates a deleterious degradation in signal quality in wireless communication systems. For this reason, circuit hardware in the past was designed to have very low imbalance. As described above, however, it is possible to correct this problem using digital signal processing in the form of transmit pre-coding and/or a special receiver. One embodiment of the invention comprises a system with several new functional units, each of which is important for the implementation of I/Q correction in an OFDM communication system or a DIDO-OFDM communication system.

Figure 11:
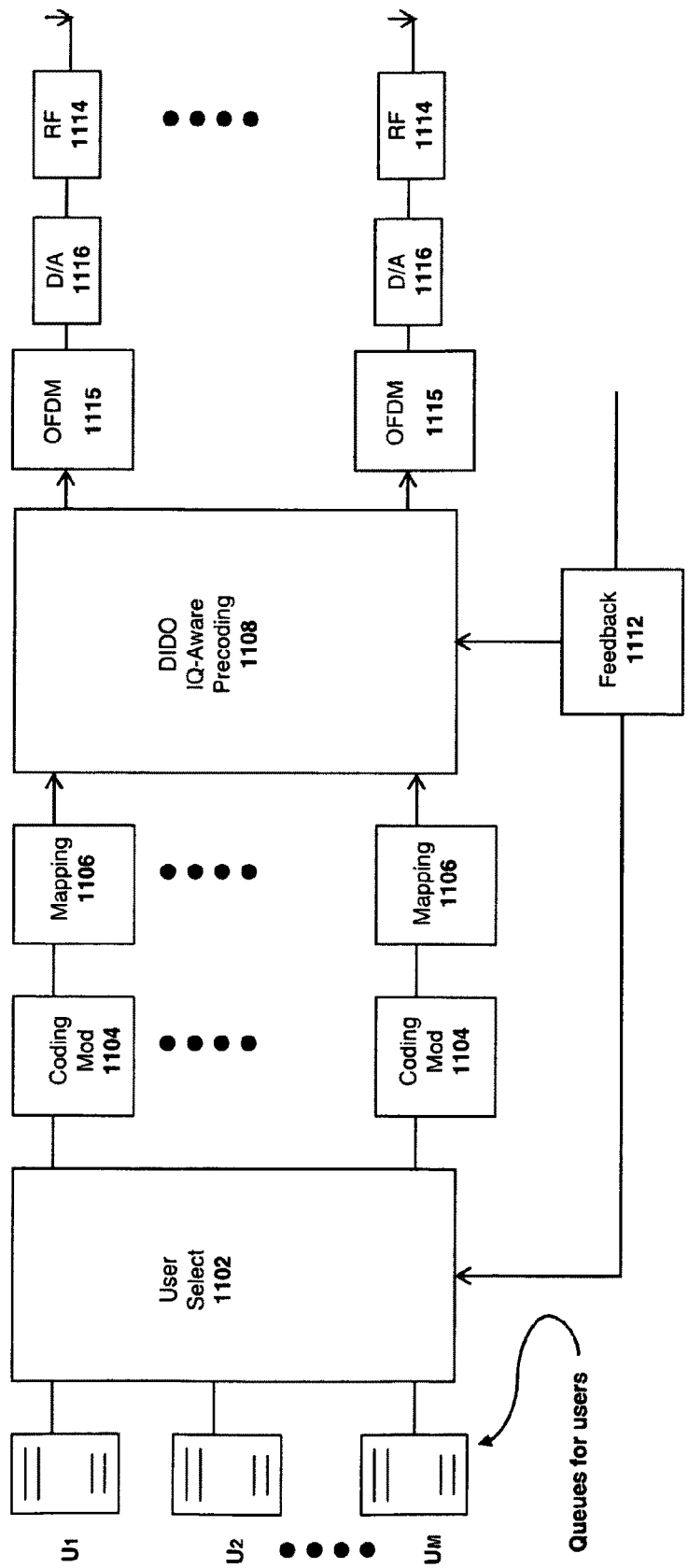
FIG. 11 illustrates an embodiment of the DIDO transmitter with I/Q compensation functional units.

One embodiment of the invention uses pre-coding based on channel state information to cancel inter-carrier interference (ICI) from mirror tones (due to I/Q mismatch) in an OFDM system. As illustrated in FIG. 11, a DIDO transmitter according to this embodiment includes a user selector unit 1102, a plurality of coding modulation units 1104, a corresponding plurality of mapping units 1106, a DIDO IQ-aware precoding unit 1108, a plurality of RF transmitter units 1114, a user feedback unit 1112 and a DIDO configurator unit 1110.

The user selector unit 1102 selects data associated with a plurality of users $U_1$-$U_M$, based on the feedback information obtained by the feedback unit 1112, and provides this information each of the plurality of coding modulation units 1104. Each coding modulation unit 1104 encodes and modulates the information bits of each user and send them to the mapping unit 1106. The mapping unit 1106 maps the input bits to complex symbols and sends the results to the DIDO IQ-aware precoding unit 1108. The DIDO IQ-aware precoding unit 1108 exploits the channel state information obtained by the feedback unit 1112 from the users to compute the DIDO IQ-aware precoding weights and precoding the input symbols obtained from the mapping units 1106. Each of the precoded data streams is sent by the DIDO IQ-aware precoding unit 1108 to the OFDM unit 1115 that computes the IFFT and adds the cyclic prefix. This information is sent to the D/A unit 1116 that operates the digital to analog conversion and send it to the RF unit 1114. The RF unit 1114 upconverts the baseband signal to intermediate/radio frequency and send it to the transmit antenna.

The precoder operates on the regular and mirror tones together for the purpose of compensating for I/Q imbalance. Any number of precoder design criteria may be used including ZF, MMSE, or weighted MMSE design. In a preferred embodiment, the precoder completely removes the ICI due to I/Q mismatch thus resulting in the receiver not having to perform any additional compensation.

In one embodiment, the precoder uses a block diagonalization criterion to completely cancel inter-user interference while not completely canceling the I/Q effects for each user, requiring additional receiver processing. In another embodiment, the precoder uses a zero-forcing criterion to completely cancel both inter-user interference and ICI due to I/Q imbalance. This embodiment can use a conventional DIDO-OFDM processor at the receiver.

Figure 12:
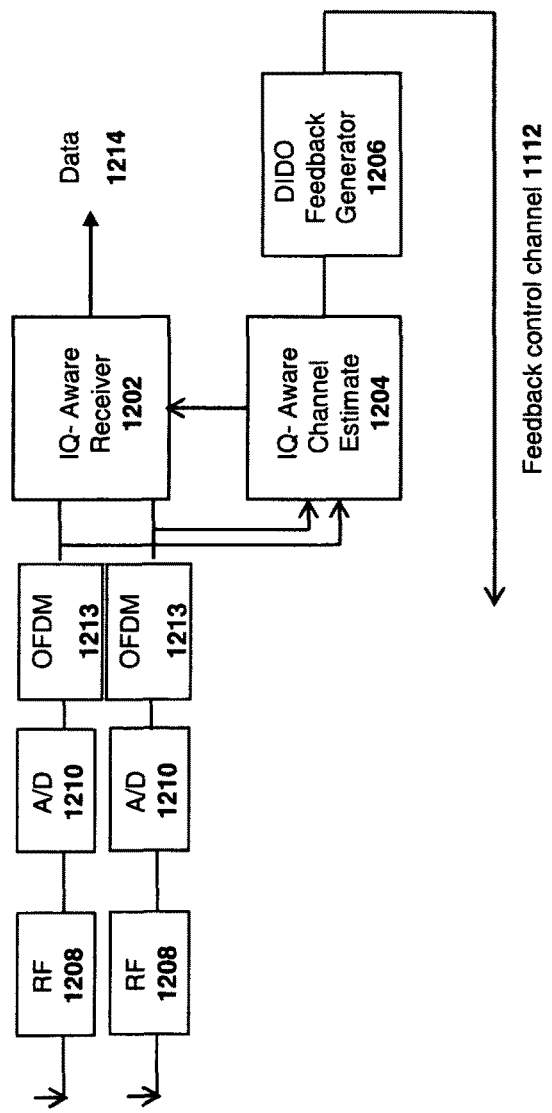
FIG. 12 a DIDO receiver with I/Q compensation functional units.

One embodiment of the invention uses pre-coding based on channel state information to cancel inter-carrier interference (ICI) from mirror tones (due to I/Q mismatch) in a DIDO-OFDM system and each user employs an IQ-aware DIDO receiver. As illustrated in FIG. 12, in one embodiment of the invention, a system including the receiver 1202 includes a plurality of RF units 1208, a corresponding plurality of A/D units 1210, an IQ-aware channel estimator unit 1204 and a DIDO feedback generator unit 1206.

The RF units 1208 receive signals transmitted from the DIDO transmitter units 1,14 downconverts the signals to baseband and provide the downconverted signals to the A/D units 1210. The A/D units 1210 then convert the signal from analog to digital and send it to the OFDM units 1213. The OFDM units 1213 remove the cyclic prefix and operates the FFT to report the signal to the frequency domain. During the training period the OFDM units 1213 send the output to the IQ-aware channel estimate unit 1204 that computes the channel estimates in the frequency domain. Alternatively, the channel estimates can be computed in the time domain. During the data period the OFDM units 1213 send the output to the IQ-aware receiver unit 1202. The IQ-aware receiver unit 1202 computes the IQ receiver and demodulates/decodes the signal to obtain the data 1214. The IQ-aware channel estimate unit 1204 sends the channel estimates to the DIDO feedback generator unit 1206 that may quantize the channel estimates and send it back to the transmitter via the feedback control channel 1112.

The receiver 1202 illustrated in FIG. 12 may operate under any number of criteria known to those skilled in the art including ZF, MMSE, maximum likelihood, or MAP receiver. In one preferred embodiment, the receiver uses an MMSE filter to cancel the ICI caused by IQ imbalance on the mirror tones. In another preferred embodiment, the receiver uses a nonlinear detector like a maximum likelihood search to jointly detect the symbols on the mirror tones. This method has improved performance at the expense of higher complexity.

In one embodiment, an IQ-aware channel estimator 1204 is used to determine the receiver coefficients to remove ICI. Consequently we claim a DIDO-OFDM system that uses pre-coding based on channel state information to cancel inter-carrier interference (ICI) from mirror tones (due to I/Q mismatch), an IQ-aware DIDO receiver, and an IQ-aware channel estimator. The channel estimator may use a conventional training signal or may use specially constructed training signals sent on the inphase and quadrature signals. Any number of estimation algorithms may be implemented including least squares, MMSE, or maximum likelihood. The IQ-aware channel estimator provides an input for the IQ-aware receiver.

Channel state information can be provided to the station through channel reciprocity or through a feedback channel. One embodiment of the invention comprises a DIDO-OFDM system, with I/Q-aware precoder, with an I/Q-aware feedback channel for conveying channel state information from the user terminals to the station. The feedback channel may be a physical or logical control channel. It may be dedicated or shared, as in a random access channel. The feedback information may be generated using a DIDO feedback generator at the user terminal, which we also claim. The DIDO feedback generator takes as an input the output of the I/Q aware channel estimator. It may quantize the channel coefficients or may use any number of limited feedback algorithms known in the art.

The allocation of users, modulation and coding rate, mapping to space-time-frequency code slots may change depending on the results of the DIDO feedback generator. Thus, one embodiment comprises an IQ-aware DIDO configurator that uses an IQ-aware channel estimate from one or more users to configure the DIDO IQ-aware precoder, choose the modulation rate, coding rate, subset of users allowed to transmit, and their mappings to space-time-frequency code slots.

To evaluate the performance of the proposed compensation methods, three DIDO 2×2 systems will be compared:

1. With I/Q mismatch: transmit over all the tones (except DC and edge tones), without compensation for I/Q mismatch;

2. With I/Q compensation: transmit over all the tones and compensate for I/Q mismatch by using the "method 1" described above;

3. Ideal: transmit data only over the odd tones to avoid inter-user and inter-carrier (i.e., from the mirror tones) interference caused to I/Q mismatch.

Figure 14:
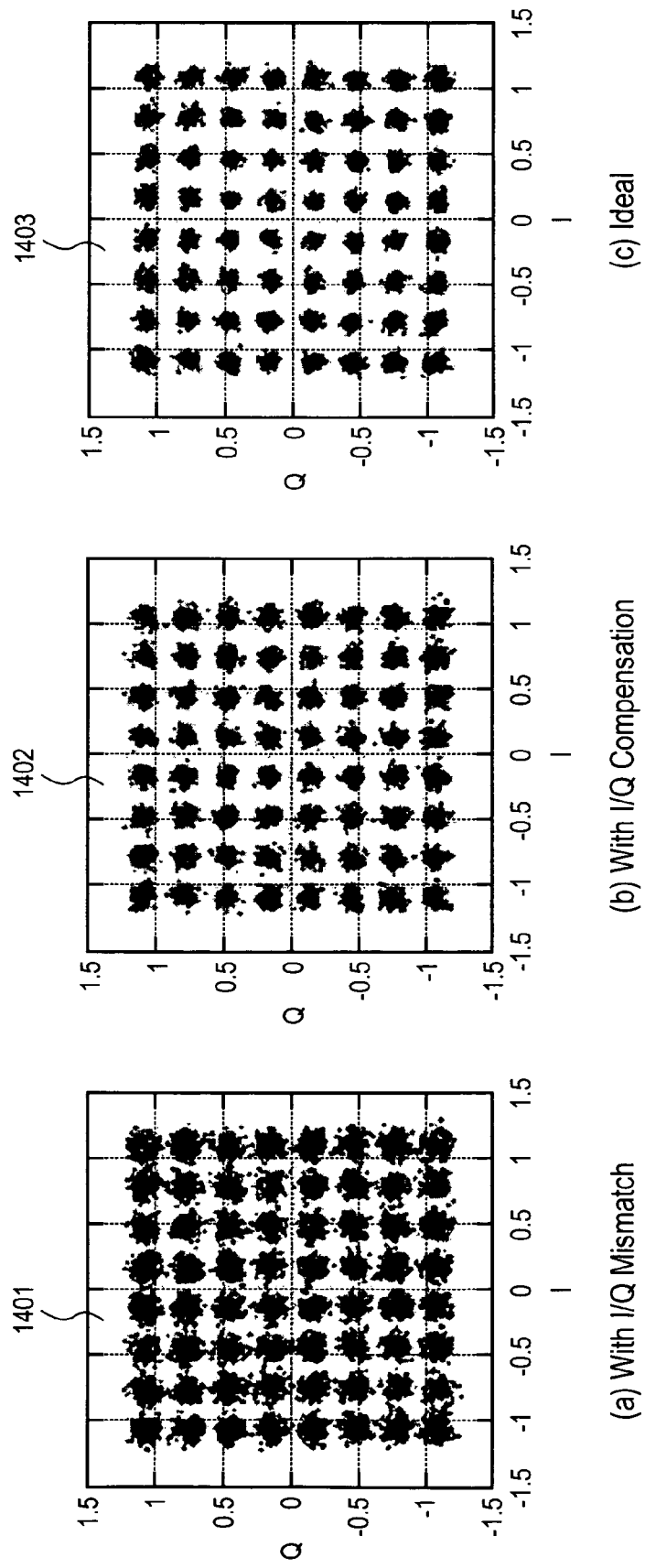
FIG. 14 illustrates one embodiment of DIDO 2×2 performance with and without I/Q compensation.

Hereafter, results obtained from measurements with the DIDO-OFDM prototype in real propagation scenarios are presented. FIG. 14 depicts the 64-QAM constellations obtained from the three systems described above. These constellations are obtained with the same users' locations and fixed average signal-to-noise ratio (~45 dB). The first constellation 1401 is very noisy due to interference from the mirror tones caused by I/Q imbalance. The second constellation 1402 shows some improvements due to I/Q compensations. Note that the second constellation 1402 is not as clean as the ideal case shown as constellation 1403 due to possible phase noise that yields inter-carrier interference (ICI).

Figure 15:
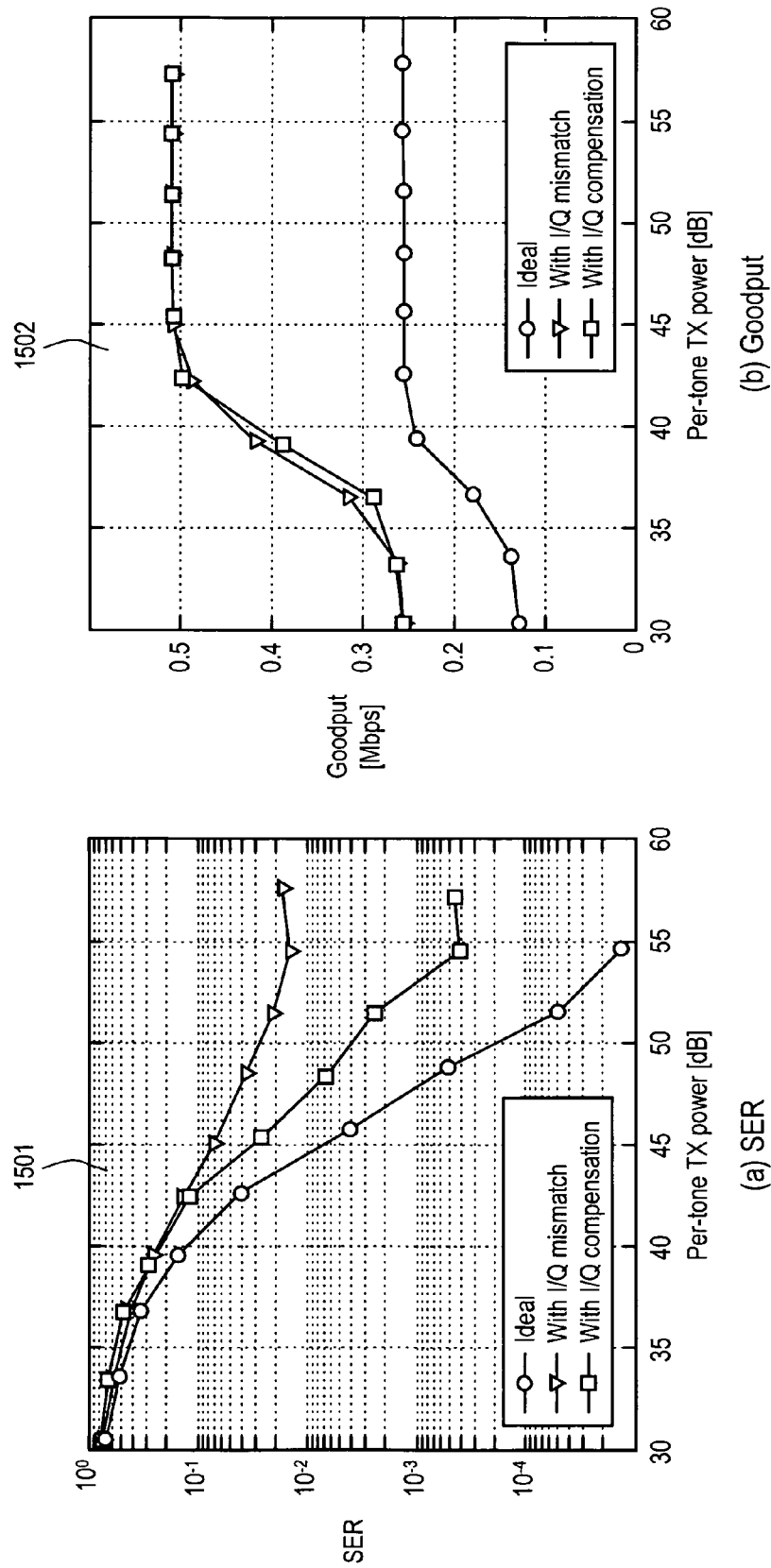
FIG. 15 illustrates one embodiment of DIDO 2×2 performance with and without I/Q compensation.

FIG. 15 shows the average SER (Symbol Error Rate) 1501 and per-user goodput 1502 performance of DIDO 2×2 systems with 64-QAM and coding rate ¾, with and without I/Q mismatch. The OFDM bandwidth is 250 KHz, with 64 tones and cyclic prefix length $L_{cp}=4$. Since in the ideal case we transmit data only over a subset of tones, SER and goodput performance is evaluated as a function of the average per-tone transmit power (rather than total transmit power) to guarantee a fair comparison across different cases. Moreover, in the following results, we use normalized values of transmit power (expressed in decibel), since our goal here is to compare the relative (rather than absolute) performance of different schemes. FIG. 15 shows that in presence of I/Q imbalance the SER saturates, without reaching the target SER (~$10^{-2}$), consistently to the results reported in A. Tarighat and A. H. Sayed, "MIMO OFDM receivers for systems with IQ imbalances," IEEE Trans. Sig. Proc., vol. 53, pp. 3583-3596, September 2005. This saturation effect is due to the fact that both signal and interference (from the mirror tones) power increase as the TX power increases. Through the proposed I/Q compensation method, however, it is possible to cancel the interference and obtain better SER performance. Note that the slight increase in SER at high SNR is due to amplitude saturation effects in the DAC, due to the larger transmit power required for 64-QAM modulations.

Moreover, observe that the SER performance with I/Q compensation is very close to the ideal case. The 2 dB gap in TX power between these two cases is due to possible phase noise that yields additional interference between adjacent OFDM tones. Finally, the goodput curves 1502 show that it is possible to transmit twice as much data when the I/Q method is applied compared to the ideal case, since we use all the data tones rather than only the odd tones (as for the ideal case).

Figure 16:
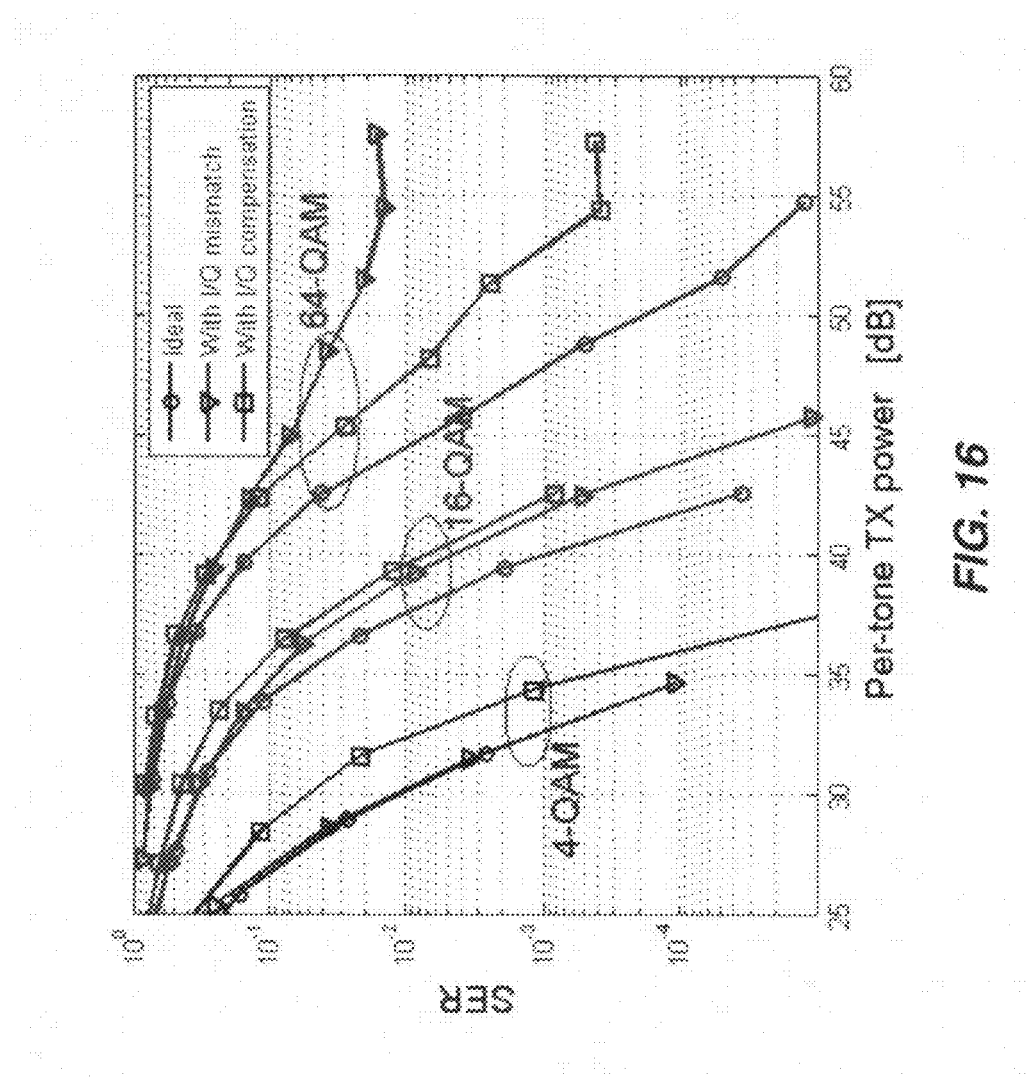
FIG. 16 illustrates one embodiment of the SER (Symbol Error Rate) with and without I/Q compensation for different QAM constellations.

FIG. 16 graphs the SER performance of different QAM constellations with and without I/Q compensation. We observe that, in this embodiment, the proposed method is particularly beneficial for 64-QAM constellations. For 4-QAM and 16-QAM the method for I/Q compensation yields worse performance than the case with I/Q mismatch, possibly because the proposed method requires larger power to enable both data transmission and interference cancellation from the mirror tones. Moreover, 4-QAM and 16-QAM are not as affected by I/Q mismatch as 64-QAM due to the larger minimum distance between constellation points. See A. Tarighat, R. Bagheri, and A. H. Sayed, "Compensation schemes and performance analysis of IQ imbalances in OFDM receivers," IEEE Transactions on Signal Processing, vol. 53, pp. 3257-3268, August 2005. This can be also observed in FIG. 16 by comparing the I/Q mismatch against the ideal case for 4-QAM and 16-QAM. Hence, the additional power required by the DIDO precoder with interference cancellation (from the mirror tones) does not justify the small benefit of the I/Q compensation for the cases of 4-QAM and 16-QAM. Note that this issue may be fixed by employing the methods 2 and 3 for I/Q compensation described above.

Figure 17:
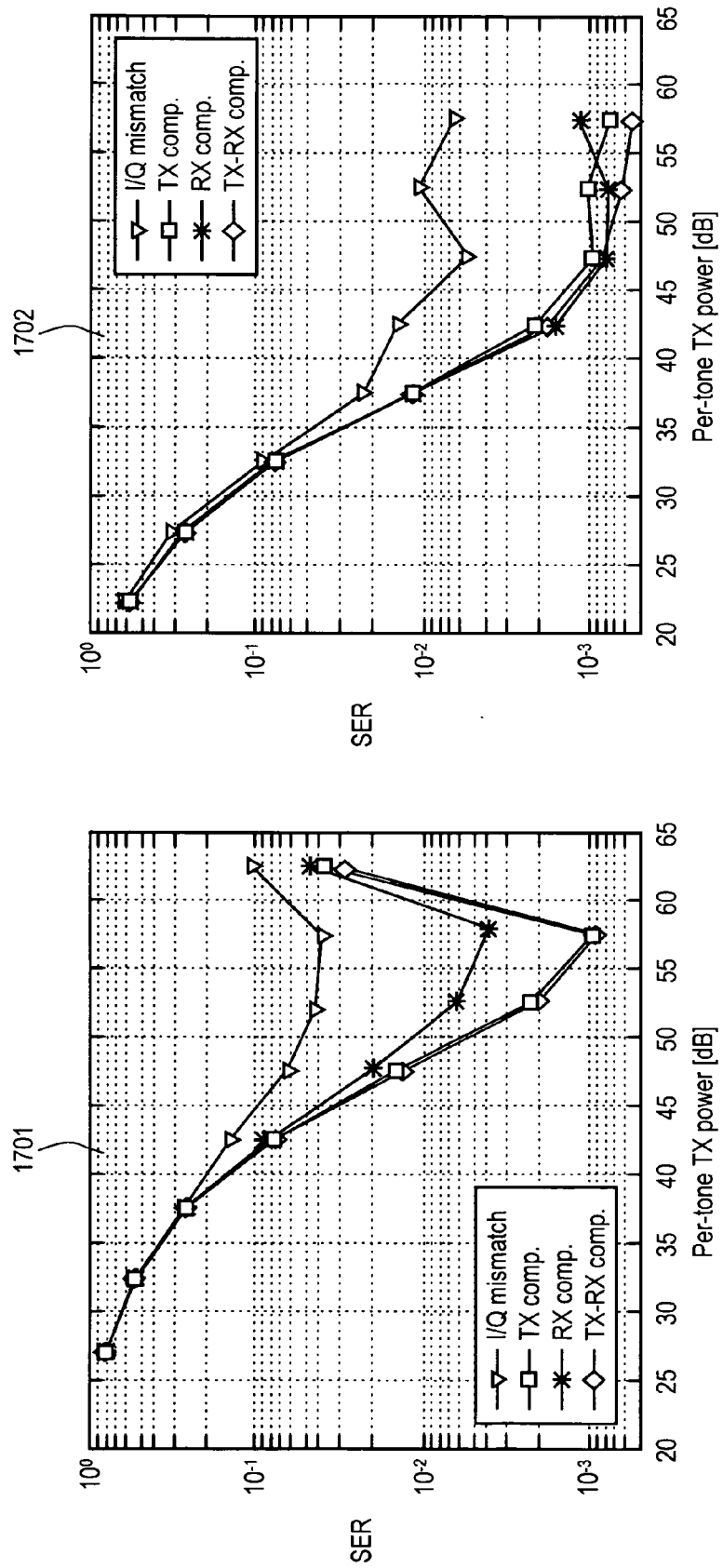
FIG. 17 illustrates one embodiment of DIDO 2×2 performances with and without compensation in different user device locations.

Finally, the relative SER performance of the three methods described above is measured in different propagation conditions. For reference, also described is the SER performance in presence of I/Q mismatch. FIG. 17 depicts the SER measured for a DIDO 2×2 system with 64-QAM at carrier frequency of 450.5 MHz and bandwidth of 250 KHz, at two different users' locations. In Location 1 the users are ~6λ from the BS in different rooms and NLOS (Non-Line of Sight)) conditions. In Location 2 the users are ~λ from the BS in LOS (Line of Sight).

FIG. 17 shows that all three compensation methods always outperform the case of no compensation. Moreover, it should be noted that method 3 outperforms the other two compensation methods in any channel scenario. The relative performance of method 1 and 2 depends on the propagation conditions. It is observed through practical measurement campaigns that method 1 generally outperforms method 2, since it pre-cancels (at the transmitter) the inter-user interference caused by I/Q imbalance. When this inter-user interference is minimal, method 2 may outperform method 1 as illustrated in graph 1702 of FIG. 17, since it does not suffer from power loss due to the I/Q compensation precoder.

Figure 18:
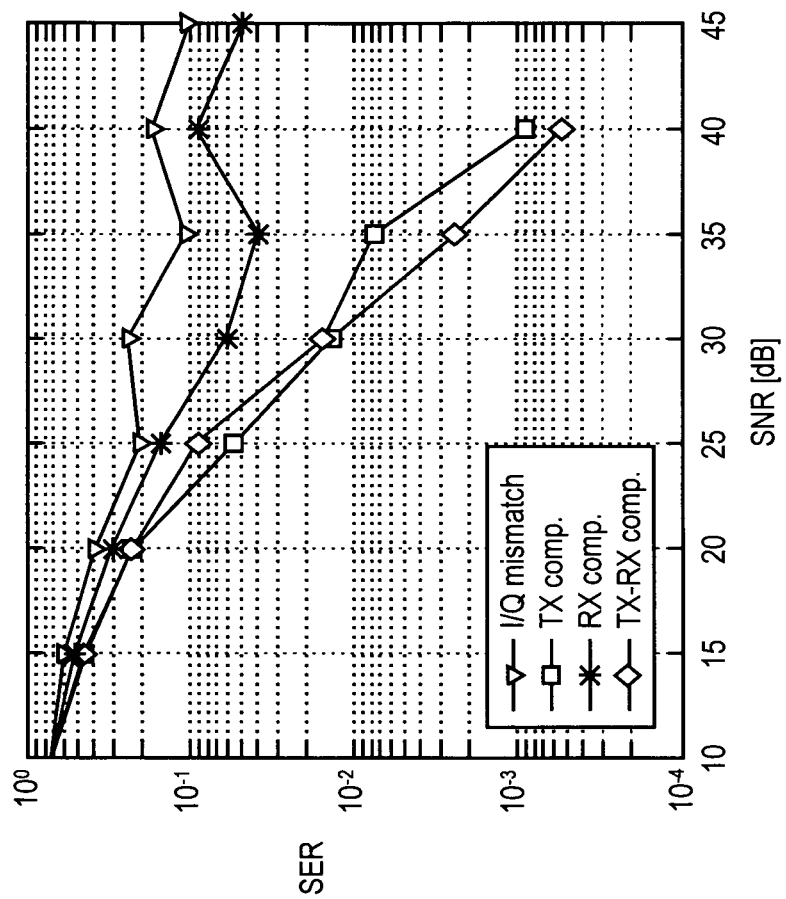
FIG. 18 illustrates one embodiment of the SER with and without I/Q compensation in ideal (i.i.d. (independent and identically-distributed)) channels.

So far, different methods have been compared by considering only a limited set of propagation scenarios as in FIG. 17. Hereafter, the relative performance of these methods in ideal i.i.d. (independent and identically-distributed) channels is measured. DIDO-OFDM systems are simulated with I/Q phase and gain imbalance at the transmit and receive sides. FIG. 18 shows the performance of the proposed methods with only gain imbalance at the transmit side (i.e., with 0.8 gain on the I rail of the first transmit chain and gain 1 on the other rails). It is observed that method 3 outperforms all the other methods. Also, method 1 performs better than method 2 in i.i.d. channels, as opposed to the results obtained in Location 2 in graph 1702 of FIG. 17.

Thus, given the three novel methods to compensate for I/Q imbalance in DIDO-OFDM systems described above, Method 3 outperforms the other proposed compensation methods. In systems with low rate feedback channels, method 2 can be used to reduce the amount of feedback required for the DIDO precoder, at the expense of worse SER performance.

II. Adaptive DIDO Transmission Scheme

Another embodiment of a system and method to enhance the performance of distributed-input distributed-output (DIDO) systems will now be described. This method dynamically allocates the wireless resources to different user devices, by tracking the changing channel conditions, to increase throughput while satisfying certain target error rate. The user devices estimate the channel quality and feedback it to the Base Station (BS); the Base Station processes the channel quality obtained from the user devices to select the best set of user devices, DIDO scheme, modulation/coding scheme (MCS) and array configuration for the next transmission; the Base Station transmits parallel data to multiple user devices via pre-coding and the signals are demodulated at the receiver.

A system that efficiently allocates resources for a DIDO wireless link is also described. The system includes a DIDO Base Station with a DIDO configurator, which processes feedback received from the users to select the best set of users, DIDO scheme, modulation/coding scheme (MCS) and array configuration for the next transmission; a receiver in a DIDO system that measures the channel and other relevant parameters to generate a DIDO feedback signal; and a DIDO feedback control channel for conveying feedback information from users to the Base Station.

As described in detail below, some of the significant features of this embodiment of the invention include, but are not limited to:

Techniques to adaptively select number of users, DIDO transmission schemes (i.e., antenna selection or multiplexing), modulation/coding scheme (MCS) and array configurations based on the channel quality information, to minimize SER or maximize per-user or downlink spectral efficiency;

Techniques to define sets of DIDO transmission modes as combinations of DIDO schemes and MCSs;

Techniques to assign different DIDO modes to different time slots, OFDM tones and DIDO substreams, depending on the channel conditions;

Techniques to dynamically assign different DIDO modes to different users based on their channel quality;

Criteria to enable adaptive DIDO switching based on link quality metrics computed in the time, frequency and space domains;

Criteria to enable adaptive DIDO switching based on lookup tables.

Figure 19:
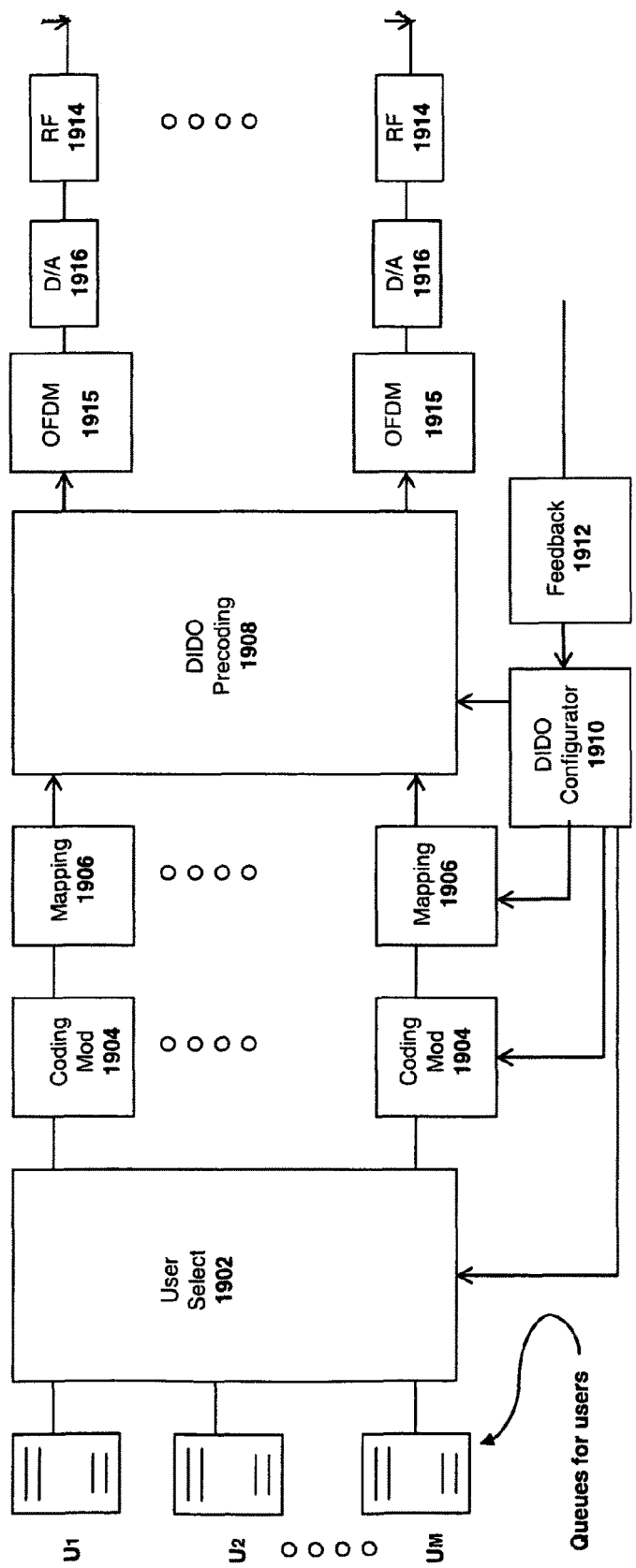
FIG. 19 illustrates one embodiment of a transmitter framework of adaptive DIDO systems.
Figure 20:
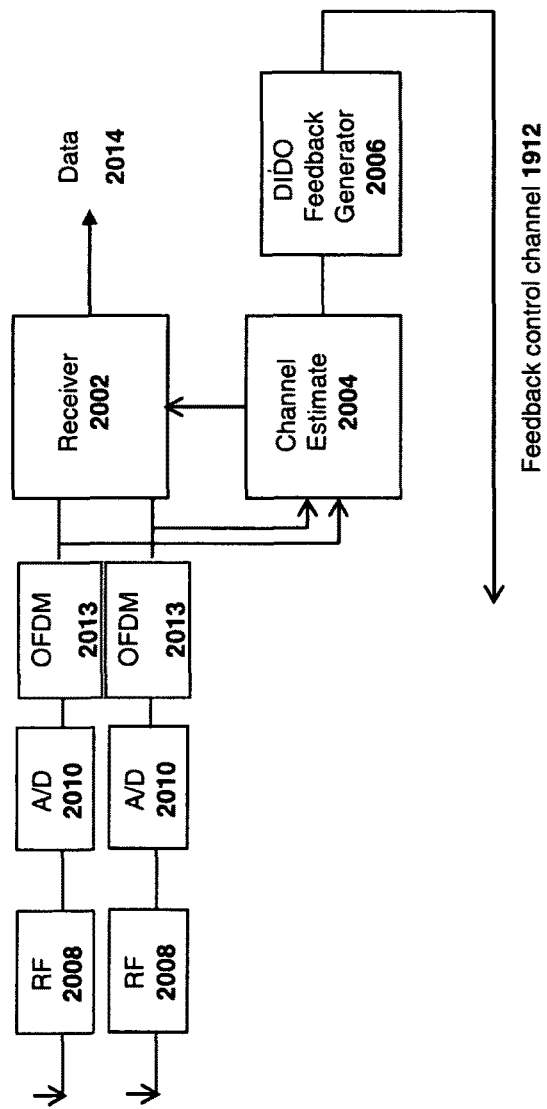
FIG. 20 illustrates one embodiment of a receiver framework of adaptive DIDO systems.

A DIDO system with a DIDO configurator at the Base Station as in FIG. 19 to adaptively select the number of users, DIDO transmission schemes (i.e., antenna selection or multiplexing), modulation/coding scheme (MCS) and array configurations based on the channel quality information, to minimize SER or maximize per user or downlink spectral efficiency;

A DIDO system with a DIDO configurator at the Base Station and a DIDO feedback generator at each user device as in FIG. 20, which uses the estimated channel state and/or other parameters like the estimated SNR at the receiver to generate a feedback message to be input into the DIDO configurator.

A DIDO system with a DIDO configurator at the Base Station, DIDO feedback generator, and a DIDO feedback control channel for conveying DIDO-specific configuration information from the users to the Base Station.

a. Background

In multiple-input multiple-output (MIMO) systems, diversity schemes such as orthogonal space-time block codes (OSTBC) (See V. Tarokh, H. Jafarkhani, and A. R. Calderbank, "Spacetime block codes from orthogonal designs," IEEE Trans. Info. Th., vol. 45, pp. 1456-467, July 1999) or antenna selection (See R. W. Heath Jr., S. Sandhu, and A. J. Paulraj, "Antenna selection for spatial multiplexing systems with linear receivers," IEEE Trans. Comm., vol. 5, pp. 142-144, April 2001) are conceived to combat channel fading, providing increased link robustness that translates in better coverage. On the other hand, spatial multiplexing (SM) enables transmission of multiple parallel data streams as a means to enhance systems throughput. See G. J. Foschini, G. D. Golden, R. A. Valenzuela, and P. W. Wolniansky, "Simplified processing for high spectral efficiency wireless communication employing multielement arrays," IEEE Jour. Select. Areas in Comm., vol. 17, no. 11, pp. 1841-1852, November 1999. These benefits can be simultaneously achieved in MIMO systems, according to the theoretical diversity/multiplexing tradeoffs derived in L. Zheng and D. N. C. Tse, "Diversity and multiplexing: a fundamental tradeoff in multiple antenna channels," IEEE Trans. Info. Th., vol. 49, no. 5, pp. 1073-1096, May 2003. One practical implementation is to adaptively switch between diversity and multiplexing transmission schemes, by tracking the changing channel conditions.

A number of adaptive MIMO transmission techniques have been proposed thus far. The diversity/multiplexing switching method in R. W. Heath and A. J. Paulraj, "Switching between diversity and multiplexing in MIMO systems," IEEE Trans. Comm., vol. 53, no. 6, pp. 962-968, June 2005, was designed to improve BER (Bit Error Rate) for fixed rate transmission, based on instantaneous channel quality information. Alternatively, statistical channel information can be employed to enable adaptation as in S. Catreux, V. Erceg, D. Gesbert, and R. W. Heath. Jr., "Adaptive modulation and MIMO coding for broadband wireless data networks," IEEE Comm. Mag., vol. 2, pp. 108-115, June 2002 ("Catreux"), resulting in reduced feedback overhead and number of control messages. The adaptive transmission algorithm in Catreux was designed to enhance spectral efficiency for predefined target error rate in orthogonal frequency division multiplexing (OFDM) systems, based on channel time/frequency selectivity indicators. Similar low feedback adaptive approaches have been proposed for narrowband systems, exploiting the channel spatial selectivity to switch between diversity schemes and spatial multiplexing. See, e.g., A. Forenza, M. R. McKay, A. Pandharipande, R. W. Heath. Jr., and I. B. Collings, "Adaptive MIMO transmission for exploiting the capacity of spatially correlated channels," accepted to the IEEE Trans. on Veh. Tech., March 2007; M. R. McKay, I. B. Collings, A. Forenza, and R. W. Heath. Jr., "Multiplexing/beamforming switching for coded MIMO in spatially correlated Rayleigh channels," accepted to the IEEE Trans. on Veh. Tech., December 2007; A. Forenza, M. R. McKay, R. W. Heath. Jr., and I. B. Collings, "Switching between OSTBC and spatial multiplexing with linear receivers in spatially correlated MIMO channels," Proc. IEEE Veh. Technol. Conf., vol. 3, pp. 1387-1391, May 2006; M. R. McKay, I. B. Collings, A. Forenza, and R. W. Heath Jr., "A throughput-based adaptive MIMO BICM approach for spatially correlated channels," to appear in Proc. IEEE ICC, June 2006

In this document, we extend the scope of the work presented in various prior publications to DIDO-OFDM systems. See, e.g., R. W. Heath and A. J. Paulraj, "Switching between diversity and multiplexing in MIMO systems," IEEE Trans. Comm., vol. 53, no. 6, pp. 962-968, June 2005. S. Catreux, V. Erceg, D. Gesbert, and R. W. Heath Jr., "Adaptive modulation and MIMO coding for broadband wireless data networks," IEEE Comm. Mag., vol. 2, pp. 108-115, June 2002; A. Forenza, M. R. McKay, A. Pandharipande, R. W. Heath Jr., and I. B. Collings, "Adaptive MIMO transmission for exploiting the capacity of spatially correlated channels," IEEE Trans. on Veh. Tech., vol. 56, n. 2, pp. 619-630, March 2007. M. R. McKay, I. B. Collings, A. Forenza, and R. W. Heath Jr., "Multiplexing/beamforming switching for coded MIMO in spatially correlated Rayleigh channels," accepted to the IEEE Trans. on Veh. Tech., December 2007; A. Forenza, M. R. McKay, R. W. Heath Jr., and I. B. Collings, "Switching between OSTBC and spatial multiplexing with linear receivers in spatially correlated MIMO channels," Proc. IEEE Veh. Technol. Conf., vol. 3, pp. 1387-1391, May 2006. M. R. McKay, I. B. Collings, A. Forenza, and R. W. Heath Jr., "A throughput-based adaptive MIMO BICM approach for spatially correlated channels," to appear in Proc. IEEE ICC, June 2006.

A novel adaptive DIDO transmission strategy is described herein that switches between different numbers of users, numbers of transmit antennas and transmission schemes based on channel quality information as a means to improve the system performance. Note that schemes that adaptively select the users in multiuser MIMO systems were already proposed in M. Sharif and B. Hassibi, "On the capacity of MIMO broadcast channel with partial side information," IEEE Trans. Info. Th., vol. 51, p. 506522, February 2005; and W. Choi, A. Forenza, J. G. Andrews, and R. W. Heath Jr., "Opportunistic space division multiple access with beam selection," to appear in IEEE Trans. on Communications. The opportunistic space division multiple access (OSDMA) schemes in these publications, however, are designed to maximize the sum capacity by exploiting multi-user diversity and they achieve only a fraction of the theoretical capacity of dirty paper codes, since the interference is not completely pre-canceled at the transmitter. In the DIDO transmission algorithm described herein block diagonalization is employed to pre-cancel inter-user interference. The proposed adaptive transmission strategy, however, can be applied to any DIDO system, independently on the type of pre-coding technique.

The present patent application describes an extension of the embodiments of the invention described above and in the Prior Application, including, but not limited to the following additional features:

1. The training symbols of the Prior Application for channel estimation can be employed by the wireless client devices to evaluate the link-quality metrics in the adaptive DIDO scheme;

2. The base station receives signal characterization data from the client devices as described in the Prior Application. In the current embodiment, the signal characterization data is defined as link-quality metric used to enable adaptation;

3. The Prior Application describes a mechanism to select the number of transmit antennas and users as well as defines throughput allocation. Moreover, different levels of throughput can be dynamically assigned to different clients as in the Prior Application. The current embodiment of the invention defines novel criteria related to this selection and throughput allocation.

b. Embodiments of the Invention

The goal of the proposed adaptive DIDO technique is to enhance per-user or downlink spectral efficiency by dynamically allocating the wireless resource in time, frequency and space to different users in the system. The general adaptation criterion is to increase throughput while satisfying the target error rate. Depending on the propagation conditions, this adaptive algorithm can also be used to improve the link quality of the users (or coverage) via diversity schemes. The flowchart illustrated in FIG. 21 describes steps of the adaptive DIDO scheme.

The Base Station (BS) collects the channel state information (CSI) from all the users in 2102. From the received CSI, the BS computes the link quality metrics in time/frequency/space domains in 2104. These link quality metrics are used to select the users to be served in the next transmission as well as the transmission mode for each of the users in 2106. Note that the transmission modes consist of different combinations of modulation/coding and DIDO schemes. Finally, the BS transmits data to the users via DIDO precoding as in 2108.

At 2102, the Base Station collects the channel state information (CSI) from all the user devices. The CSI is used by the Base Station to determine the instantaneous or statistical channel quality for all the user devices at 2104. In DIDO-OFDM systems the channel quality (or link quality metric) can be estimated in the time, frequency and space domains. Then, at 2106, the Base Station uses the link quality metric to determine the best subset of users and transmission mode for the current propagation conditions. A set of DIDO transmission modes is defined as combinations of DIDO schemes (i.e., antenna selection or multiplexing), modulation/coding schemes (MCSs) and array configuration. At 2108, data is transmitted to user devices using the selected number of users and transmission modes.

In one embodiment, the mode selection is enabled by lookup tables (LUTs) pre-computed based on error rate performance of DIDO systems in different propagation environments. These LUTs map channel quality information into error rate performance. To construct the LUTs, the error rate performance of DIDO systems is evaluated in different propagation scenarios as a function of the SNR. From the error rate curves, it is possible to compute the minimum SNR required to achieve certain pre-defined target error rate. We define this SNR requirement as SNR threshold. Then, the SNR thresholds are evaluated in different propagation scenarios and for different DIDO transmission modes and stored in the LUTs. For example, the SER results in FIGS. 24 and 26 can be used to construct the LUTs. Then, from the LUTs, the Base Station selects the transmission modes for the active users that increase throughput while satisfying predefined target error rate. Finally, the Base Station transmits data to the selected users via DIDO pre-coding. Note that different DIDO modes can be assigned to different time slots, OFDM tones and DIDO substreams such that the adaptation may occur in time, frequency and space domains.

One embodiment of a system employing DIDO adaptation is illustrated in FIGS. 19-20. Several new functional units are introduced to enable implementation of the proposed DIDO adaptation algorithms. Specifically, in one embodiment, a DIDO configurator 1910 performs a plurality of functions including selecting the number of users, DIDO transmission schemes (i.e., antenna selection or multiplexing), modulation/coding scheme (MCS), and array configurations based on the channel quality information 1912 provided by user devices.

The user selector unit 1902 selects data associated with a plurality of users $U_1$-$U_M$, based on the feedback information obtained by the DIDO configurator 1910, and provides this information each of the plurality of coding modulation units 1904. Each coding modulation unit 1904 encodes and modulates the information bits of each user and sends them to the mapping unit 1906. The mapping unit 1906 maps the input bits to complex symbols and sends it to the precoding unit 1908. Both the coding modulation units 1904 and the mapping unit 1906 exploit the information obtained from the DIDO configurator unit 1910 to choose the type of modulation/coding scheme to employ for each user. This information is computed by the DIDO configurator unit 1910 by exploiting the channel quality information of each of the users as provided by the feedback unit 1912. The DIDO precoding unit 1908 exploits the information obtained by the DIDO configurator unit 1910 to compute the DIDO precoding weights and precoding the input symbols obtained from the mapping units 1906. Each of the precoded data streams are sent by the DIDO precoding unit 1908 to the OFDM unit 1915 that computes the IFFT and adds the cyclic prefix. This information is sent to the D/A unit 1916 that operates the digital to analog conversion and sends the resulting analog signal to the RF unit 1914. The RF unit 1914 upconverts the baseband signal to intermediate/radio frequency and send it to the transmit antenna.

The RF units 2008 of each client device receive signals transmitted from the DIDO transmitter units 1914, downconverts the signals to baseband and provide the downconverted signals to the A/D units 2010. The A/D units 2010 then convert the signal from analog to digital and send it to the OFDM units 2013. The OFDM units 2013 remove the cyclic prefix and carries out the FFT to report the signal to the frequency domain. During the training period the OFDM units 2013 send the output to the channel estimate unit 2004 that computes the channel estimates in the frequency domain. Alternatively, the channel estimates can be computed in the time domain. During the data period the OFDM units 2013 send the output to the receiver unit 2002 which demodulates/decodes the signal to obtain the data 2014. The channel estimate unit 2004 sends the channel estimates to the DIDO feedback generator unit 2006 that may quantize the channel estimates and send it back to the transmitter via the feedback control channel 1912.

The DIDO configurator 1910 may use information derived at the Base Station or, in a preferred embodiment, uses additionally the output of a DIDO Feedback Generator 2006 (see FIG. 20), operating at each user device. The DIDO Feedback Generator 2006 uses the estimated channel state 2004 and/or other parameters like the estimated SNR at the receiver to generate a feedback message to be input into the DIDO Configurator 1910. The DIDO Feedback Generator 2006 may compress information at the receiver, may quantize information, and/or use some limited feedback strategies known in the art.

The DIDO Configurator 1910 may use information recovered from a DIDO Feedback Control Channel 1912. The DIDO Feedback Control Channel 1912 is a logical or physical control channel that is used to send the output of the DIDO Feedback Generator 2006 from the user to the Base Station. The control channel 1912 may be implemented in any number of ways known in the art and may be a logical or a physical control channel. As a physical channel it may comprise a dedicated time/frequency slot assigned to a user. It may also be a random access channel shared by all users. The control channel may be pre-assigned or it may be created by stealing bits in a predefined way from an existing control channel.

In the following discussion, results obtained through measurements with the DIDO-OFDM prototype are described in real propagation environments. These results demonstrate the potential gains achievable in adaptive DIDO systems. The performance of different order DIDO systems is presented initially, demonstrating that it is possible to increase the number of antennas/user to achieve larger downlink throughput. The DIDO performance as a function of user device's location is then described, demonstrating the need for tracking the changing channel conditions. Finally, the performance of DIDO systems employing diversity techniques is described.

i. Performance of Different Order DIDO Systems

The performance of different DIDO systems is evaluated with increasing number of transmit antennas N=M, where M is the number of users. The performance of the following systems is compared: SISO, DIDO 2×2, DIDO 4×4, DIDO 6×6 and DIDO 8×8. DIDO N×M refers to DIDO with N transmit antennas at the BS and M users.

Figure 22:
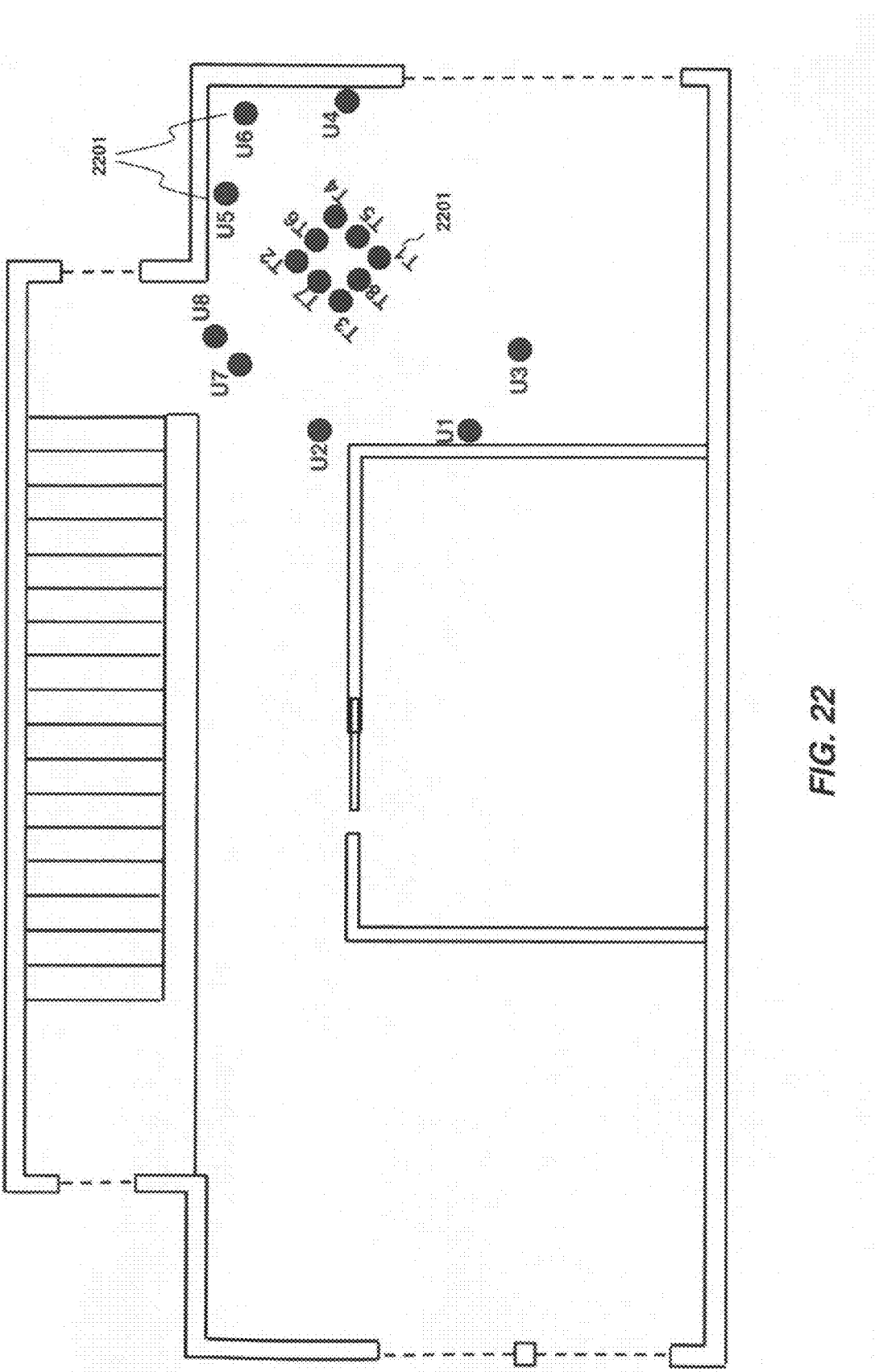
FIG. 22 illustrates one embodiment of the antenna layout for DIDO measurements.

FIG. 22 illustrates the transmit/receive antenna layout in a exemplary residential floor plan. The transmit antennas 2201 are placed in squared array configuration and the users are located around the transmit array. In FIG. 22, T indicates the "transmit" antennas and U refers to the "user devices" 2202.

Different antenna subsets are active in the 8-element transmit array, depending on the value of N chosen for different measurements. For each DIDO order (N) the subset of antennas that covers the largest real estate for the fixed size constraint of the 8-element array was chosen. This criterion is expected to enhance the spatial diversity for any given value of N.

Figure 23:
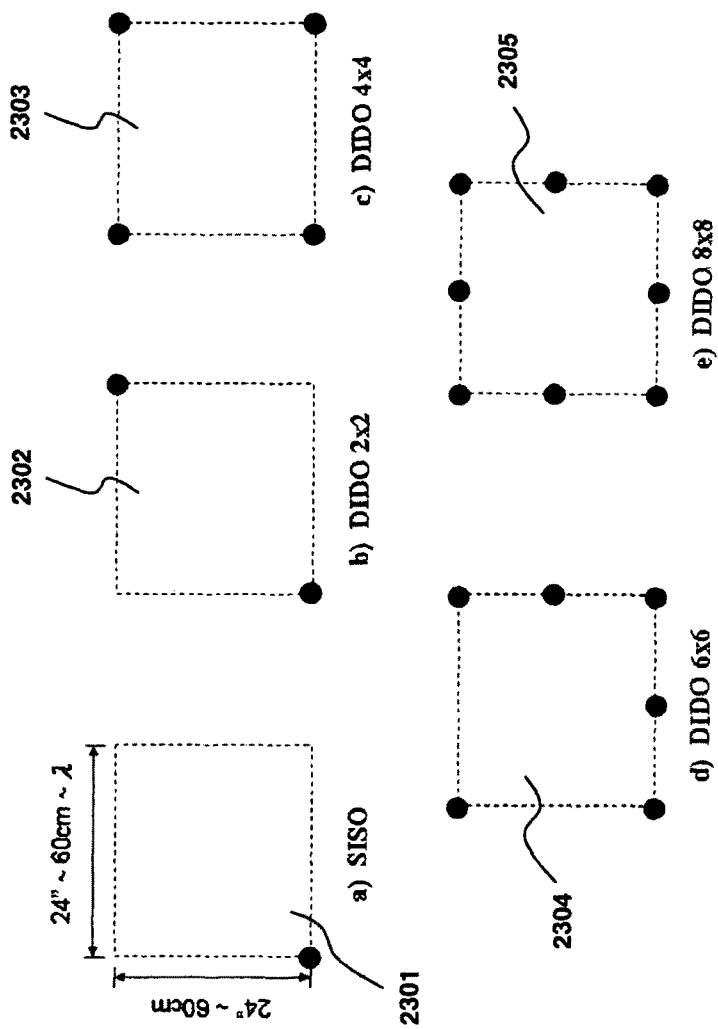
FIG. 23 illustrates embodiments of array configurations for different order DIDO systems.

FIG. 23 shows the array configurations for different DIDO orders that fit the available real estate (i.e., dashed line and outer walls). The squared dashed box has dimensions of 24"×24", corresponding to $\sim\lambda\times\lambda$ at the carrier frequency of 450 MHz.

Based on the comments related to FIG. 23 and with reference to FIG. 22, the performance of each of the following systems will now be defined and compared:

SISO with T1 and U1 (2301)
DIDO 2×2 with T1,2 and U1,2 (2302)
DIDO 4×4 with T1,2,3,4 and U1,2,3,4 (2303)
DIDO 6×6 with T1,2,3,4,5,6 and U1,2,3,4,5,6 (2304)
DIDO 8×8 with T1,2,3,4,5,6,7,8 and U1,2,3,4,5,6,7,8 (2305)

Figure 24:
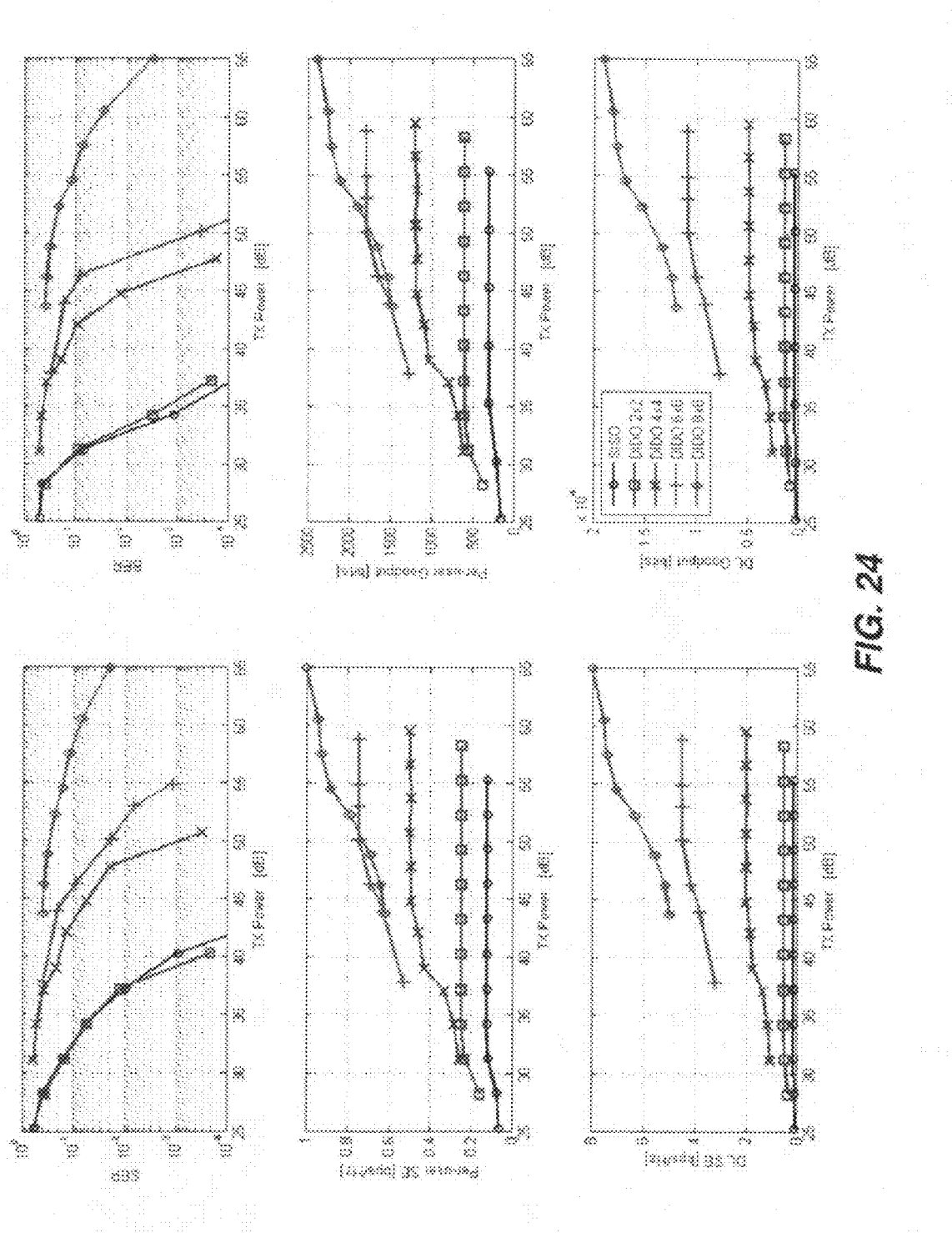
FIG. 24 illustrates the performance of different order DIDO systems.

FIG. 24 shows the SER, BER, SE (Spectral Efficiency) and goodput performance as a function of the transmit (TX) power for the DIDO systems described above, with 4-QAM and FEC (Forward Error Correction) rate of ½. Observe that the SER and BER performance degrades for increasing values of N. This effect is due to two phenomena: for fixed TX power, the input power to the DIDO array is split between increasing number of users (or data streams); the spatial diversity decreases with increasing number of users in realistic (spatially correlated) DIDO channels.

To compare the relative performance of different order DIDO systems the target BER is fixed to $10^{-4}$ (this value may vary depending on the system) that corresponds approximately to SER=$10^{-2}$ as shown in FIG. 24. We refer to the TX power values corresponding to this target as TX power thresholds (TPT). For any N, if the TX power is below the TPT, we assume it is not possible to transmit with DIDO order N and we need to switch to lower order DIDO. Also, in FIG. 24, observe that the SE and goodput performance saturate when the TX power exceeds the TPTs for any value of N. From these results, an adaptive transmission strategy may be designed that switches between different order DIDO to enhance SE or goodput for fixed predefined target error rate.

ii. Performance with Variable User Location

Figure 25:
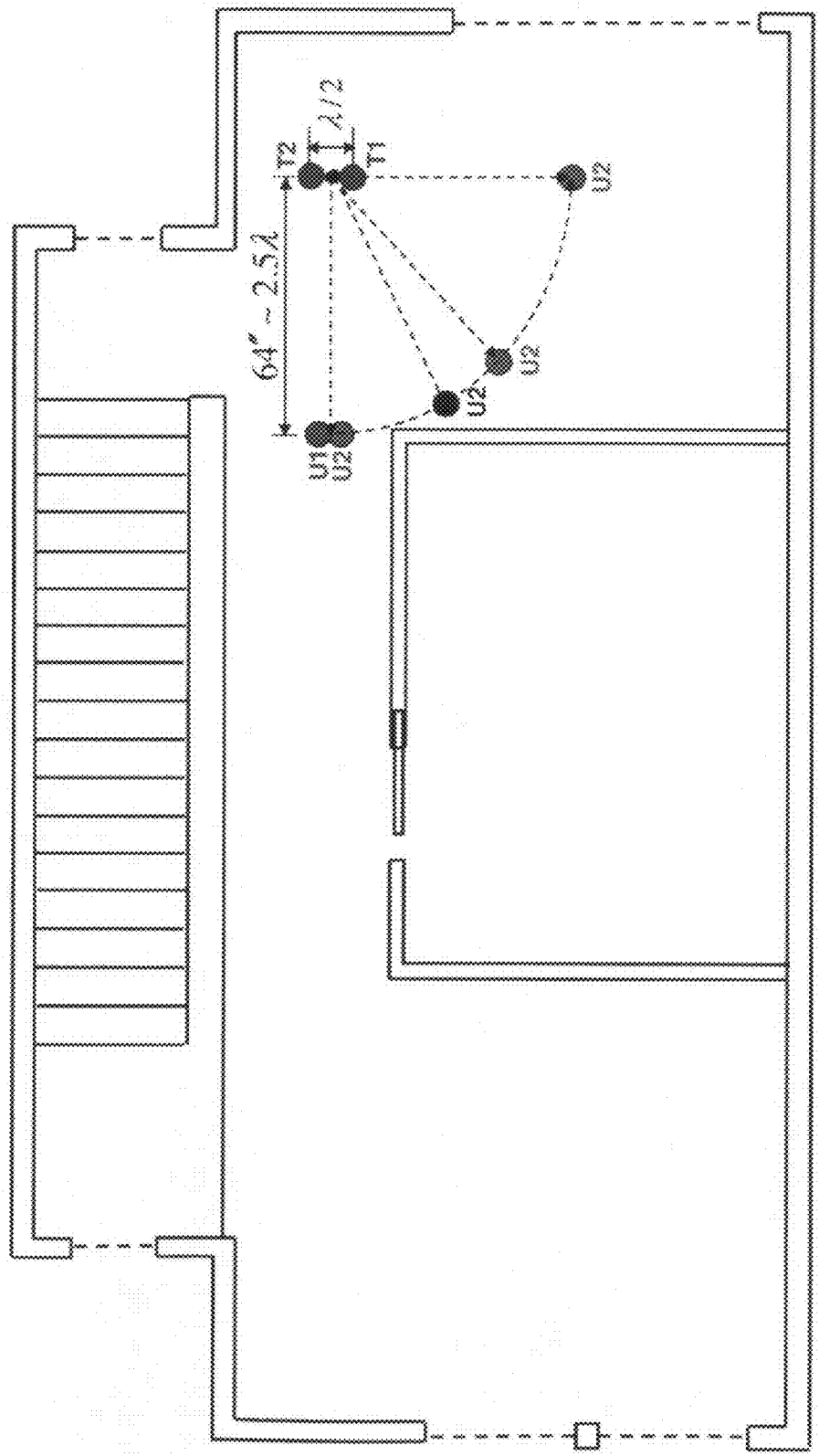
FIG. 25 illustrates one embodiment of the antenna layout for DIDO measurements.

The goal of this experiment is to evaluate the DIDO performance for different users' location, via simulations in spatially correlated channels. DIDO 2×2 systems are considered with 4QAM and an FEC rate of ½. User 1 is at a broadside direction from the transmit array, whereas user 2 changes locations from broadside to endfire directions as illustrated in FIG. 25. The transmit antennas are spaced $\sim\lambda/2$ and separated $\sim 2.5\lambda$ from the users.

Figure 26:
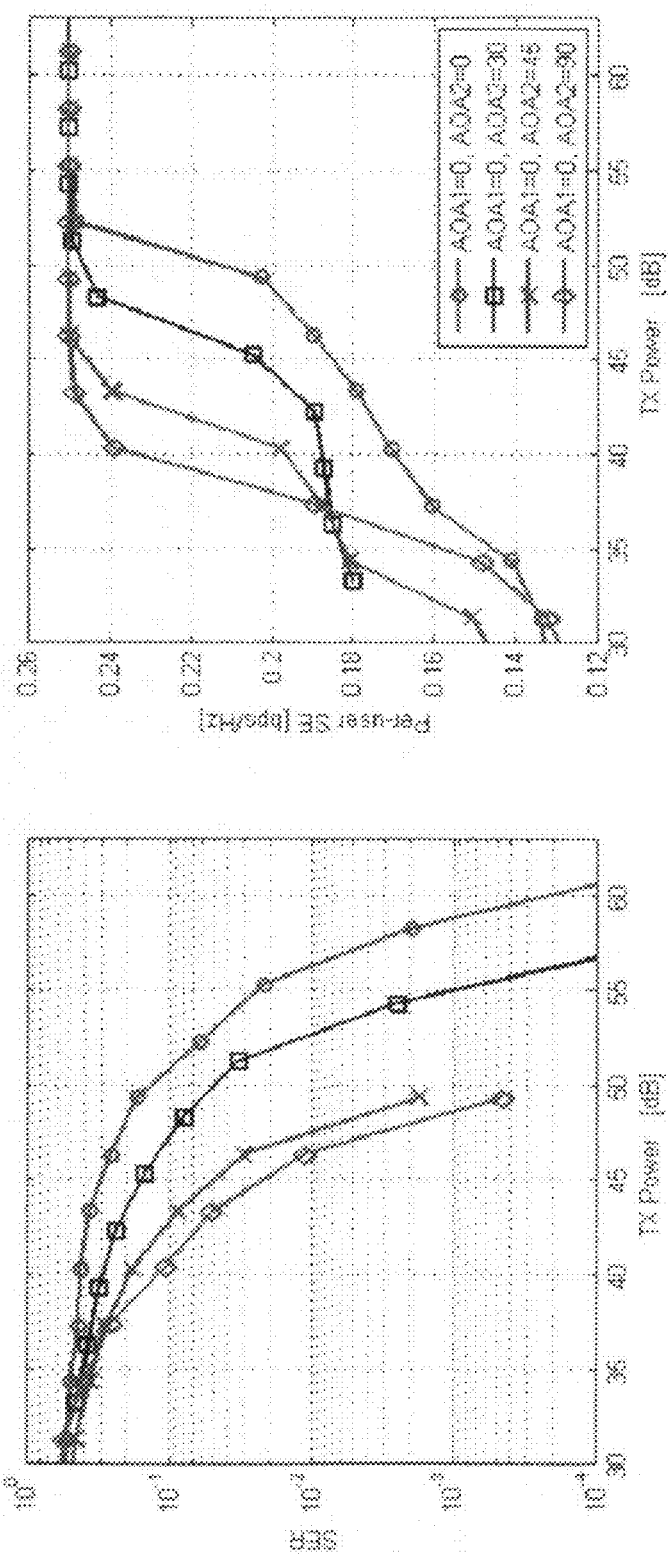
FIG. 26 illustrates one embodiment of the DIDO 2×2 performance with 4-QAM and FEC rate ½ as function of the user device location.

FIG. 26 shows the SER and per-user SE results for different locations of user device 2. The user device's angles of arrival (AOAs) range between 0° and 90°, measured from the broadside direction of the transmit array. Observe that, as the user device's angular separation increases, the DIDO performance improves, due to larger diversity available in the DIDO channel. Also, at target SER=$10^{-2}$ there is a 10 dB gap between the cases AOA2=0° and AOA2=90°. This result is consistent to the simulation results obtained in FIG.

35 for an angle spread of 10°. Also, note that for the case of AOA1=AOA2=0° there may be coupling effects between the two users (due to the proximity of their antennas) that may vary their performance from the simulated results in FIG. 35.

iii. Preferred Scenario for DIDO 8×8

FIG. 24 illustrated that DIDO 8×8 yields a larger SE than lower order DIDO at the expense of higher TX power requirement. The goal of this analysis is to show there are cases where DIDO 8×8 outperforms DIDO 2×2, not only in terms of peak spectral efficiency (SE), but also in terms of TX power requirement (or TPT) to achieve that peak SE.

Note that, in i.i.d. (ideal) channels, there is ~6 dB gap in TX power between the SE of DIDO 8×8 and DIDO 2×2. This gap is due to the fact that DIDO 8×8 splits the TX power across eight data streams, whereas DIDO 2×2 only between two streams. This result is shown via simulation in FIG. 32.

Figure 35:
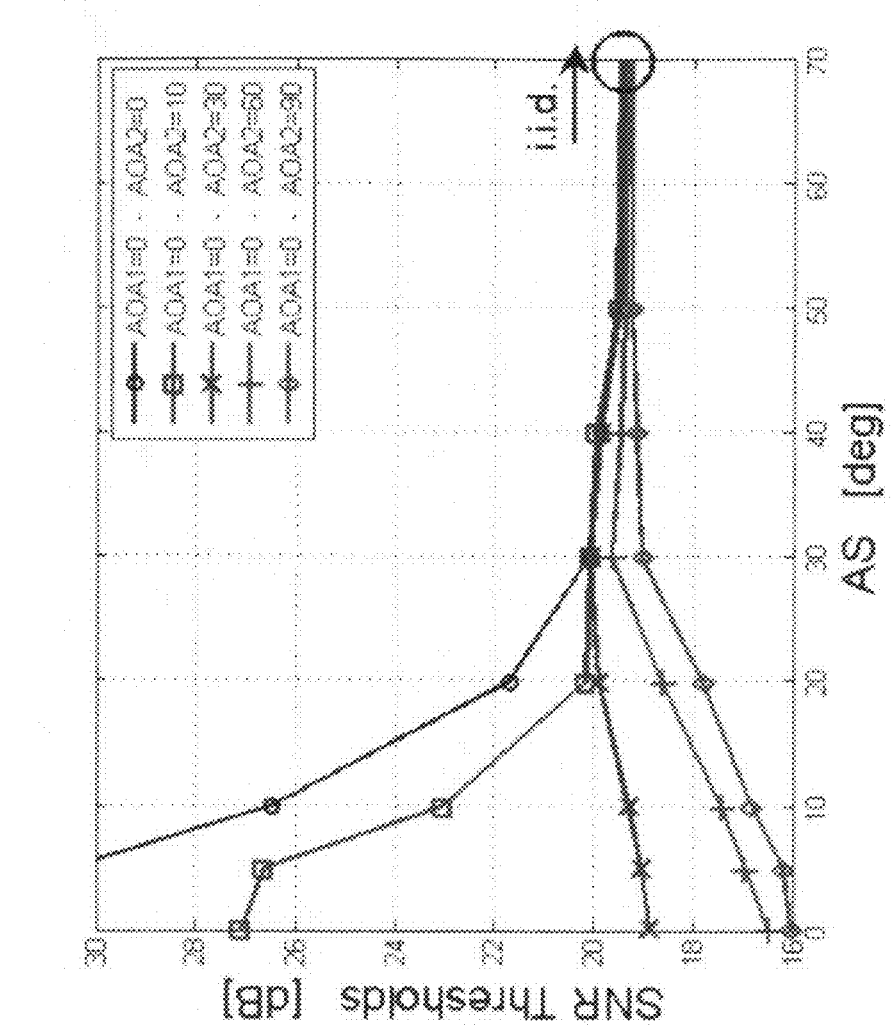
FIG. 35 plots the SNR thresholds as a function of the AS for different values of the mean angles of arrival (AOAs) of the users.

In spatially correlated channels, however, the TPT is a function of the characteristics of the propagation environment (e.g., array orientation, user location, angle spread). For example, FIG. 35 shows ~15 dB gap for low angle spread between two different user device's locations. Similar results are presented in FIG. 26 of the present application.

Similarly to MIMO systems, the performance of DIDO systems degrades when the users are located at endfire directions from the TX array (due to lack of diversity). This effect has been observed through measurements with the current DIDO prototype. Hence, one way to show that DIDO 8×8 outperforms DIDO 2×2 is to place the users at endfire directions with respect to the DIDO 2×2 arrays. In this scenario, DIDO 8×8 outperforms DIDO 2×2 due to the higher diversity provided by the 8-antenna array.

In this analysis, consider the following systems:

System 1: DIDO 8×8 with 4-QAM (transmit 8 parallel data streams every time slot);

System 2: DIDO 2×2 with 64-QAM (transmit to users X and Y every 4 time slots). For this system we consider four combinations of TX and RX antenna locations: a) T1,T2 U1,2 (endfire direction); b) T3,T4 U3,4 (endfire direction); c) T5,T6 U5,6 (~30° from the endfire direction); d) T7,T8 U7,8 (NLOS (Non-Line of Sight));

System 3: DIDO 8×8 with 64-QAM; and

System 4: MISO 8×1 with 64-QAM (transmit to user X every 8 time slots).

For all these cases, an FEC rate of ¾ was used.

Figure 27:
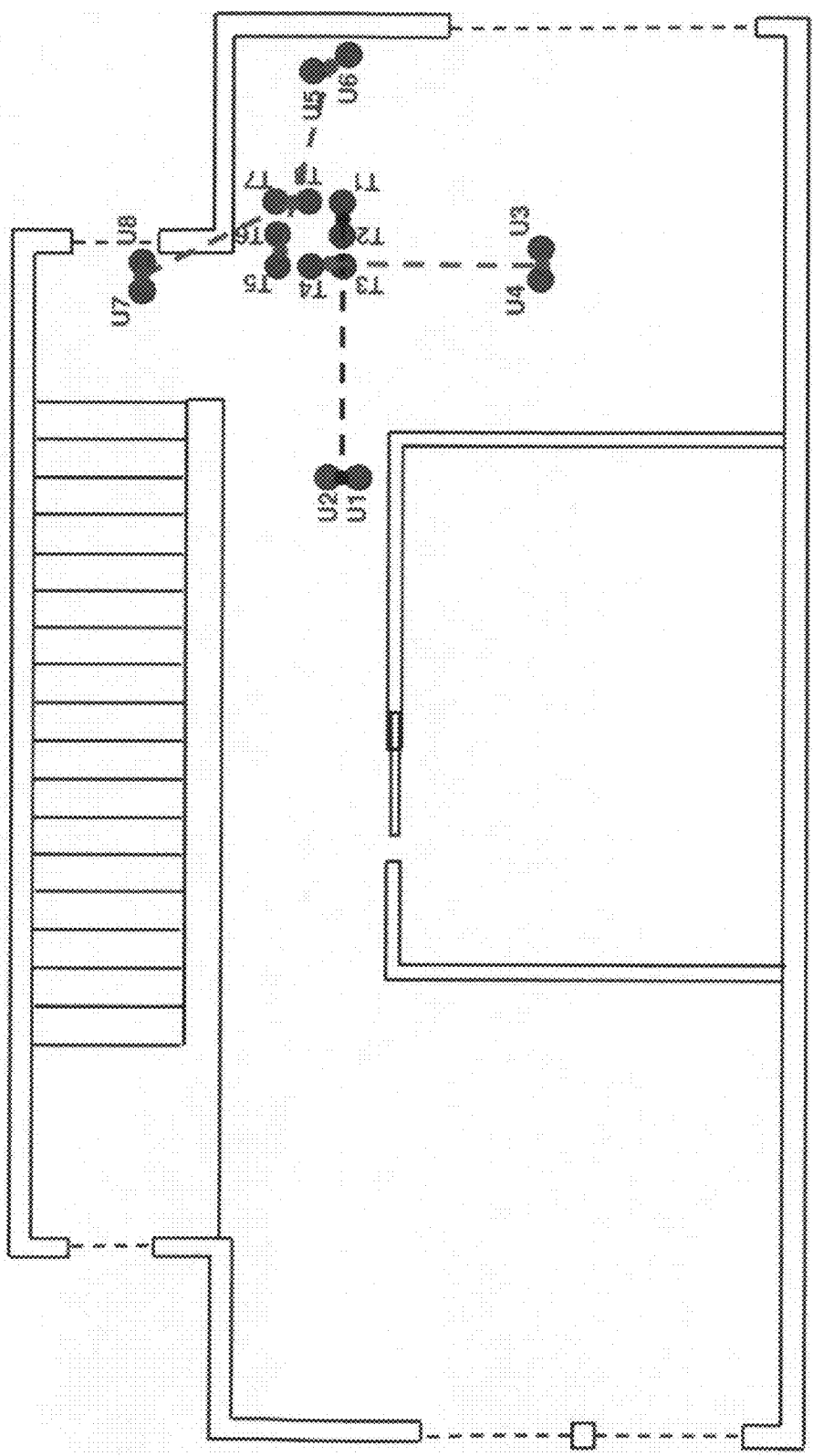
FIG. 27 illustrates one embodiment of the antenna layout for DIDO measurements.

The users' locations are depicted in FIG. 27.

Figure 28:
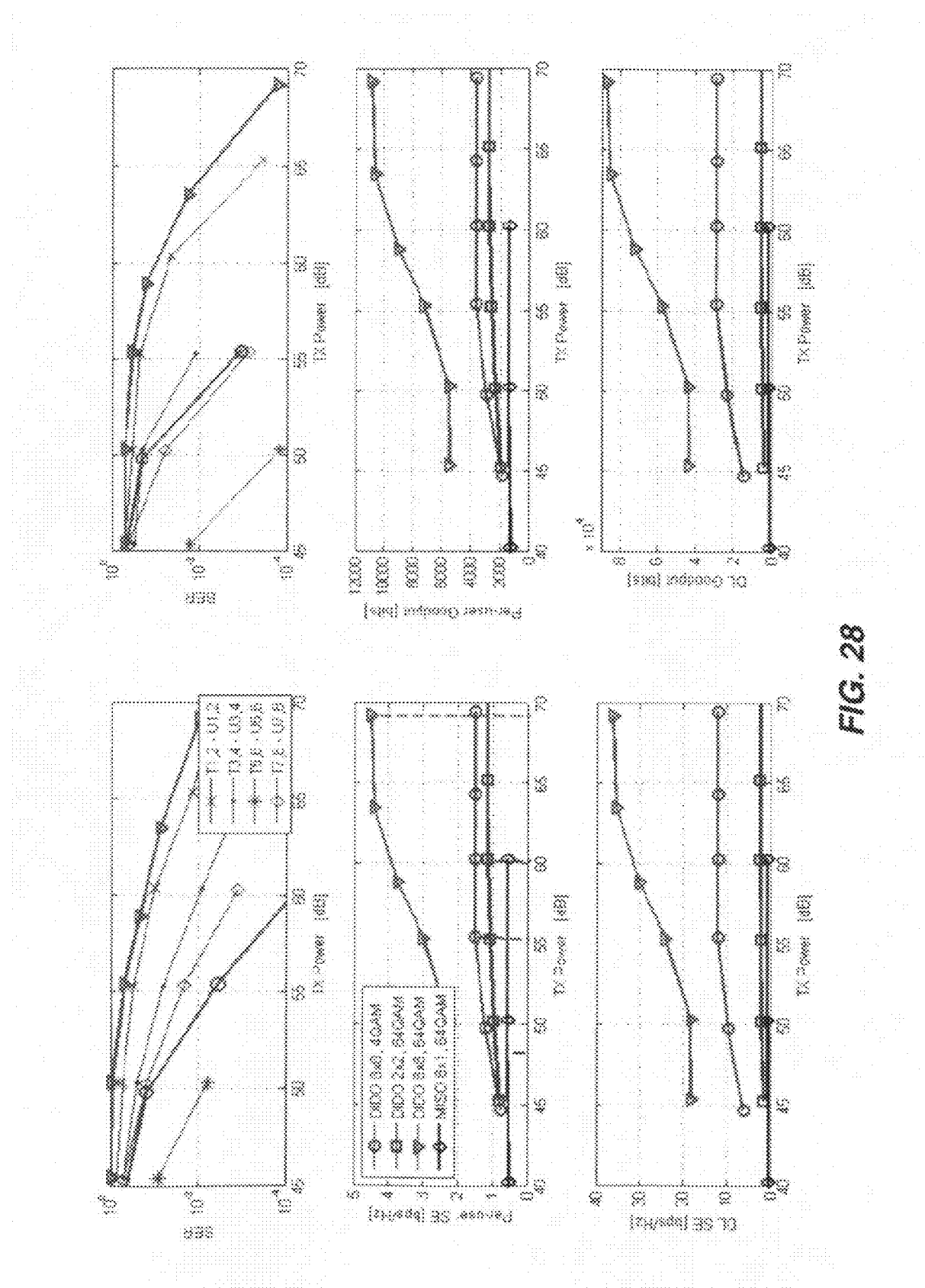
FIG. 28 illustrates how, in one embodiment, DIDO 8×8 yields larger SE than DIDO 2×2 for lower TX power requirement.

In FIG. 28 the SER results show a ~15 dB gap between Systems 2a and 2c due to different array orientations and user locations (similar to the simulation results in FIG. 35). The first subplot in the second row shows the values of TX power for which the SE curves saturate (i.e. corresponding to BER 1e-4). We observe that System 1 yields larger per-user SE for lower TX power requirement (~5 dB less) than System 2. Also, the benefits of DIDO 8×8 versus DIDO 2×2 are more evident for the DL (downlink) SE and DL goodput due to multiplexing gain of DIDO 8×8 over DIDO 2×2. System 4 has lower TX power requirement (8 dB less) than System 1, due to the array gain of beamforming (i.e., MRC with MISO 8×1). But System 4 yields only ⅓ of per-user SE compared to System 1. System 2 performs worse than System 1 (i.e., yields lower SE for larger TX power requirement). Finally, System 3 yields much larger SE (due to larger order modulations) than System 1 for larger TX power requirement (~15 dB).

From these results, the following conclusions may be drawn:

One channel scenario was identified for which DIDO 8×8 outperforms DIDO 2×2 (i.e., yields larger SE for lower TX power requirement);

In this channel scenario, DIDO 8×8 yields larger per user SE and DL SE than DIDO 2×2 and MISO 8×1; and It is possible to further increase the performance of DIDO 8×8 by using higher order modulations (i.e., 64-QAM rather than 4-QAM) at the expense of larger TX power requirements (~15 dB more).

iv. DIDO with Antenna Selection

Hereafter, we evaluate the benefit of the antenna selection algorithm described in R. Chen, R. W. Heath, and J. G. Andrews, "Transmit selection diversity for unitary precoded multiuser spatial multiplexing systems with linear receivers," accepted to IEEE Trans. on Signal Processing, 2005. We present the results for one particular DIDO system with two users, 4-QAM and FEC rate of ½. The following systems are compared in FIG. 27:

DIDO 2×2 with T1,2 and U1,2; and

DIDO 3×2 using antenna selection with T1,2,3 and U1,2.

The transmit antenna's and user device locations are the same as in FIG. 27.

Figure 29:
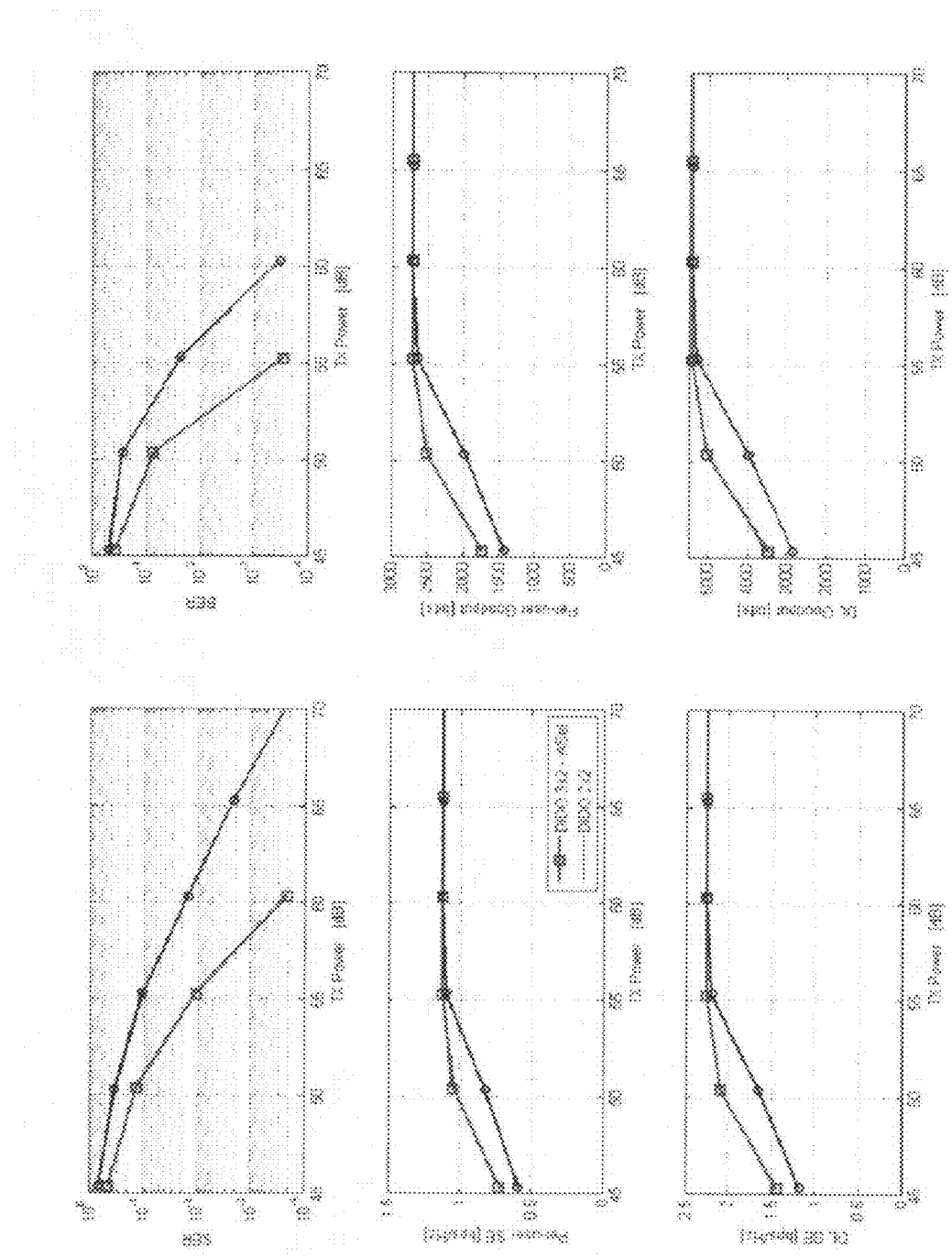
FIG. 29 illustrates one embodiment of DIDO 2×2 performance with antenna selection.

FIG. 29 shows that DIDO 3×2 with antenna selection may provide ~5 dB gain compared to DIDO 2×2 systems (with no selection). Note that the channel is almost static (i.e., no Doppler), so the selection algorithms adapts to the path-loss and channel spatial correlation rather than the fast-fading. We should be seeing different gains in scenarios with high Doppler. Also, in this particular experiment it was observed that the antenna selection algorithm selects antennas 2 and 3 for transmission.

iv. SNR Thresholds for the LUTs

In section [0171] we stated that the mode selection is enabled by LUTs. The LUTs can be pre-computed by evaluating the SNR thresholds to achieve certain predefined target error-rate performance for the DIDO transmission modes in different propagation environments. Hereafter, we provide the performance of DIDO systems with and without antenna selection and variable number of users that can be used as guidelines to construct the LUTs. While FIGS. 24, 26, 28, 29 were derived from practical measurements with the DIDO prototype, the following Figures are obtained through simulations. The following BER results assume no FEC.

Figure 30:
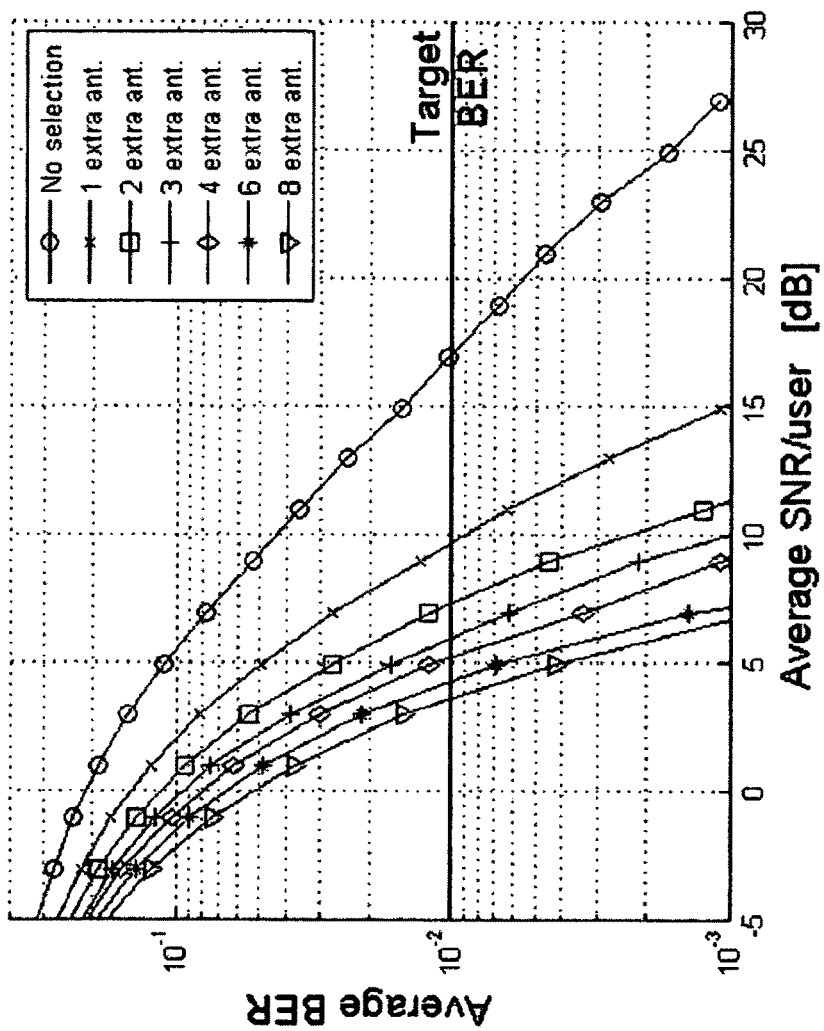
FIG. 30 illustrates average bit error rate (BER) performance of different DIDO precoding schemes in i.i.d. channels.

FIG. 30 shows the average BER performance of different DIDO precoding schemes in i.i.d. channels. The curve labeled as 'no selection' refers to the case when BD is employed. In the same figure the performance of antenna selection (ASel) is shown for different number of extra antennas (with respect to the number of users). It is possible to see that as the number of extra antennas increases, ASel provides better diversity gain (characterized by the slope of the BER curve in high SNR regime), resulting in better coverage. For example, if we fix the target BER to $10^{-2}$ (practical value for uncoded systems), the SNR gain provided by ASel increases with the number of antennas.

Figure 31:
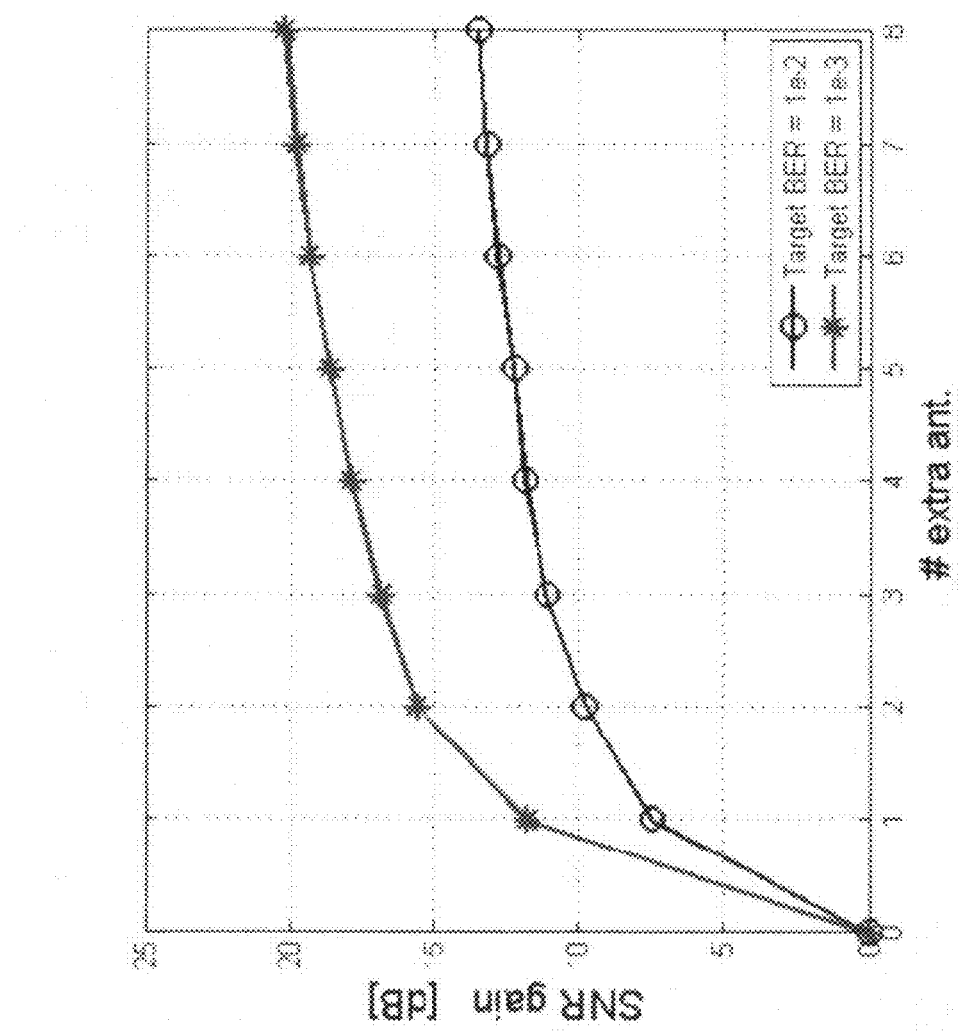
FIG. 31 illustrates the signal to noise ratio (SNR) gain of ASel as a function of the number of extra transmit antennas in i.i.d. channels.

FIG. 31 shows the SNR gain of ASel as a function of the number of extra transmit antennas in i.i.d. channels, for different targets BER. It is possible to see that, just by adding 1 or 2 antennas, ASel yields significant SNR gains compared to BD. In the following sections, we will evaluate the performance of ASel only for the cases of 1 or 2 extra antennas and by fixing the target BER to $10^{-2}$ (for uncoded systems).

Figure 32:
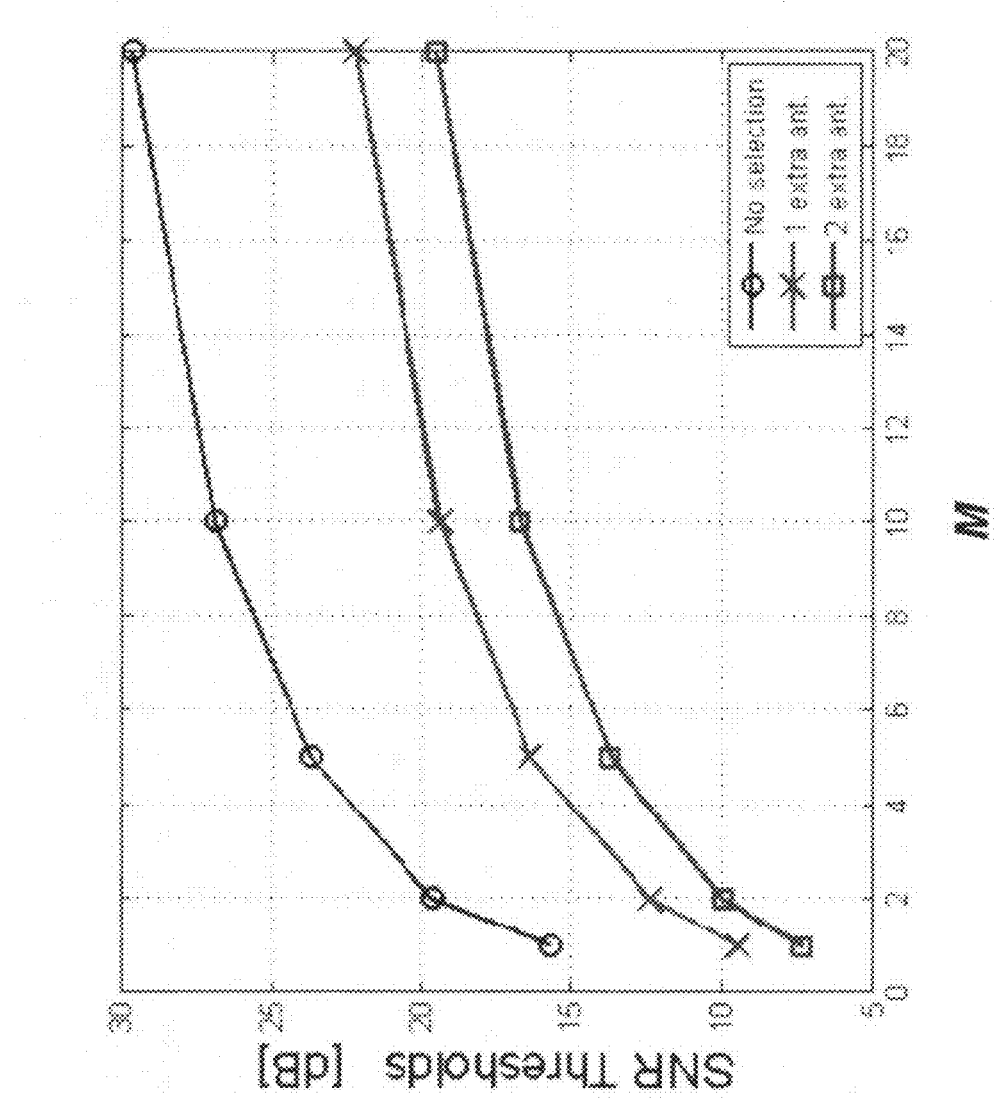
FIG. 32 illustrates the SNR thresholds as a function of the number of users (M) for block diagnalization (BD) and ASel with 1 and 2 extra antennas in i.i.d. channels.

FIG. 32 depicts the SNR thresholds as a function of the number of users (M) for BD and ASel with 1 and 2 extra antennas in i.i.d. channels. We observe that the SNR thresholds increase with M due to the larger receive SNR requirement for larger number of users. Note that we assume fixed total transmit power (with variable number of transmit antennas) for any number of users. Moreover, FIG. 32 shows that the gain due to antenna selection is constant for any number of users in i.i.d. channels.

Hereafter, we show the performance of DIDO systems in spatially correlated channels. We simulate each user's channel through the COST-259 spatial channel model described in X. Zhuang, F. W. Vook, K. L. Baum, T. A. Thomas, and M. Cudak, "Channel models for link and system level simulations," IEEE 802.16 Broadband Wireless Access Working Group, September 2004. We generate single-cluster for each user. As a case study, we assume NLOS channels, uniform linear array (ULA) at the transmitter, with element spacing of 0.5 lambda. For the case of 2-user system, we simulate the clusters with mean angles of arrival AOA1 and AOA2 for the first and second user, respectively. The AOAs are measured with respect to the broadside direction of the ULA. When more than two users are in the system, we generate the users' clusters with uniformly spaced mean AOAs in the range $[-\phi_m, \phi_m]$, where we define $$\Phi_M = \frac{\Delta\phi(M-1)}{2} \quad (13)$$

with K being the number of users and $\Delta\phi$ is the angular separation between the users' mean AOAs. Note that the angular range $[-\phi_m, \phi_m]$ is centered at the 0° angle, corresponding to the broadside direction of the ULA. Hereafter, we study the BER performance of DIDO systems as a function of the channel angle spread (AS) and angular separation between users, with BD and ASel transmission schemes and different numbers of users.

Figure 33:
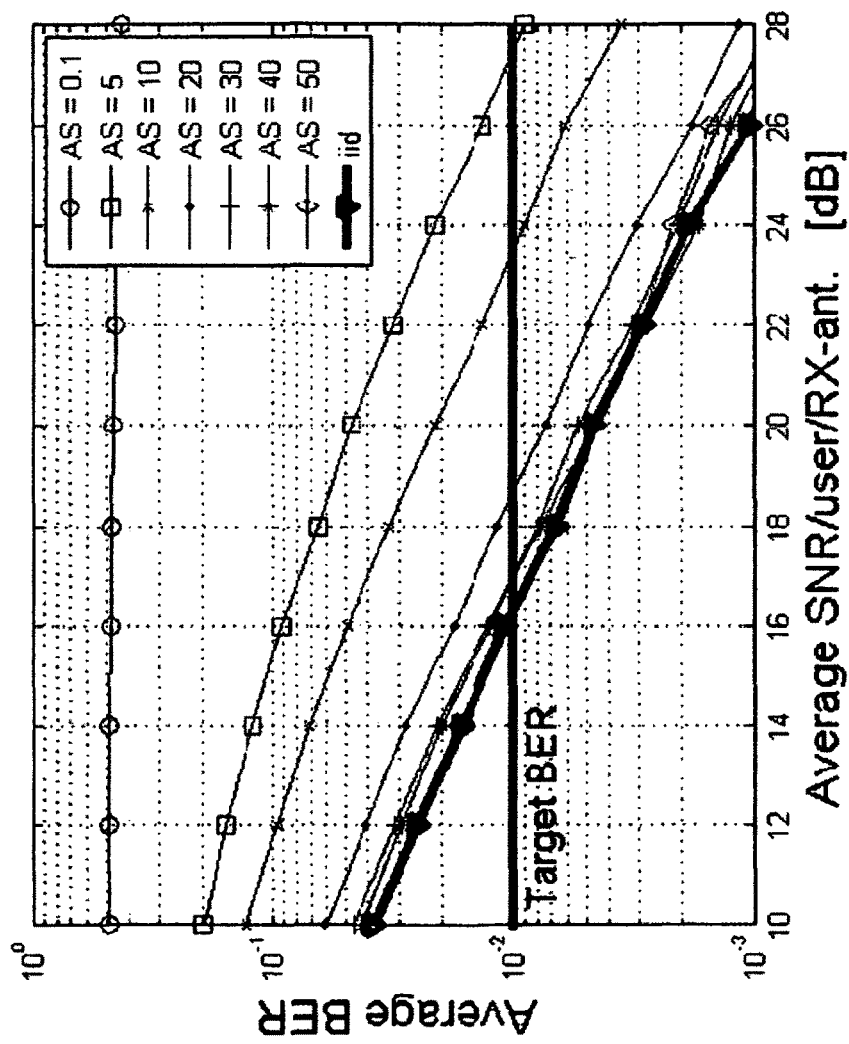
FIG. 33 illustrates the BER versus per-user average SNR for two users located at the same angular direction with different values of Angle Spread (AS).

FIG. 33 depicts the BER versus per-user average SNR for two users located at the same angular direction (i.e., AOA1=AOA2=0°, with respect to the broadside direction of the ULA), with different values of AS. It is possible to see that as the AS increases the BER performance improves and approaches the i.i.d. case. In fact, higher AS yields statistically less overlapping between the eigenmodes of the two users and better performance of the BD precoder.

Figure 34:
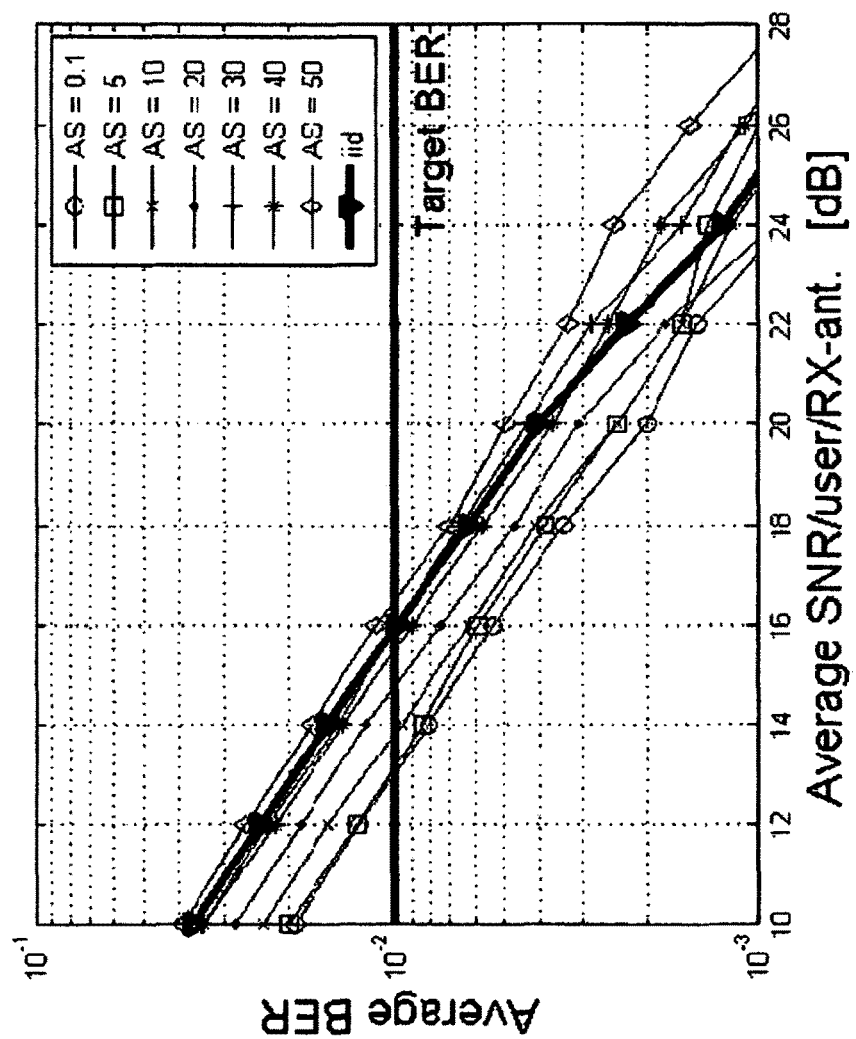
FIG. 34 illustrates similar results as FIG. 33, but with higher angular separation between the users.

FIG. 34 shows similar results as FIG. 33, but with higher angular separation between the users. We consider AOA1=0° and AOA2=90° (i.e., 90° angular separation). The best performance is now achieved in the low AS case. In fact, for the case of high angle separation, there is less overlapping between the users' eigenmodes when the angular spread is low. Interestingly, we observe that the BER performance in low AS is better than i.i.d. channels for the same reasons just mentioned.

Next, we compute the SNR thresholds, for target BER of $10^{-2}$ in different correlation scenarios. FIG. 35 plots the SNR thresholds as a function of the AS for different values of the mean AOAs of the users. For low users' angular separation reliable transmissions with reasonable SNR requirement (i.e., 18 dB) are possible only for channels characterized by high AS. On the other hand, when the users are spatially separated, less SNR is required to meet the same target BER.

Figure 36:
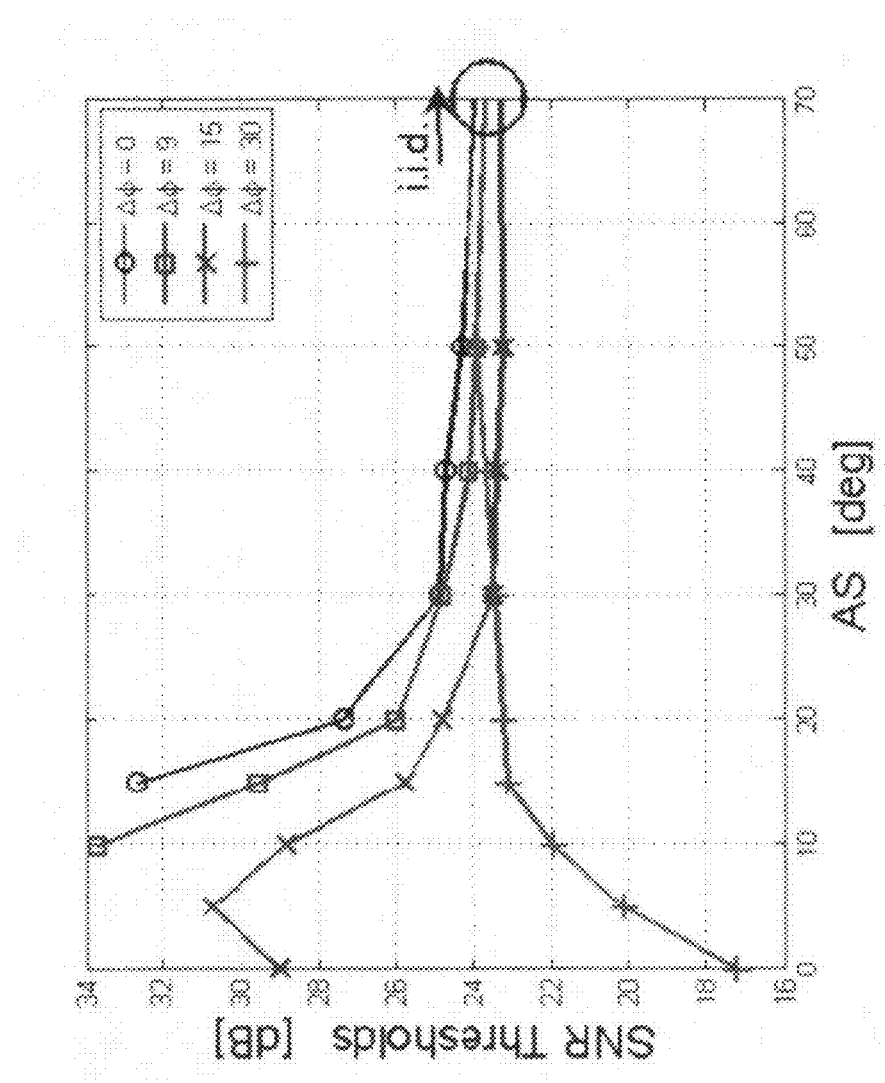
FIG. 36 illustrates the SNR threshold for an exemplary case of five users.

FIG. 36 shows the SNR threshold for the case of five users. The users' mean AOAs are generated according to the definition in (13), with different values of angular separation $\Delta\phi$. We observe that for $\Delta\phi=0°$ and AS<15°, BD performs poorly due to the small angle separation between users, and the target BER is not satisfied. For increasing AS the SNR requirement to meet the fixed target BER decreases. On the other end, for $\Delta\phi=30°$, the smallest SNR requirement is obtained at low AS, consistently to the results in FIG. 35. As the AS increases, the SNR thresholds saturate to the one of i.i.d. channels. Note that $\Delta\phi=30°$ with 5 users corresponds to the AOA range of [−60°, 60°], that is typical for base stations in cellular systems with 120° sectorized cells.

Figure 37:
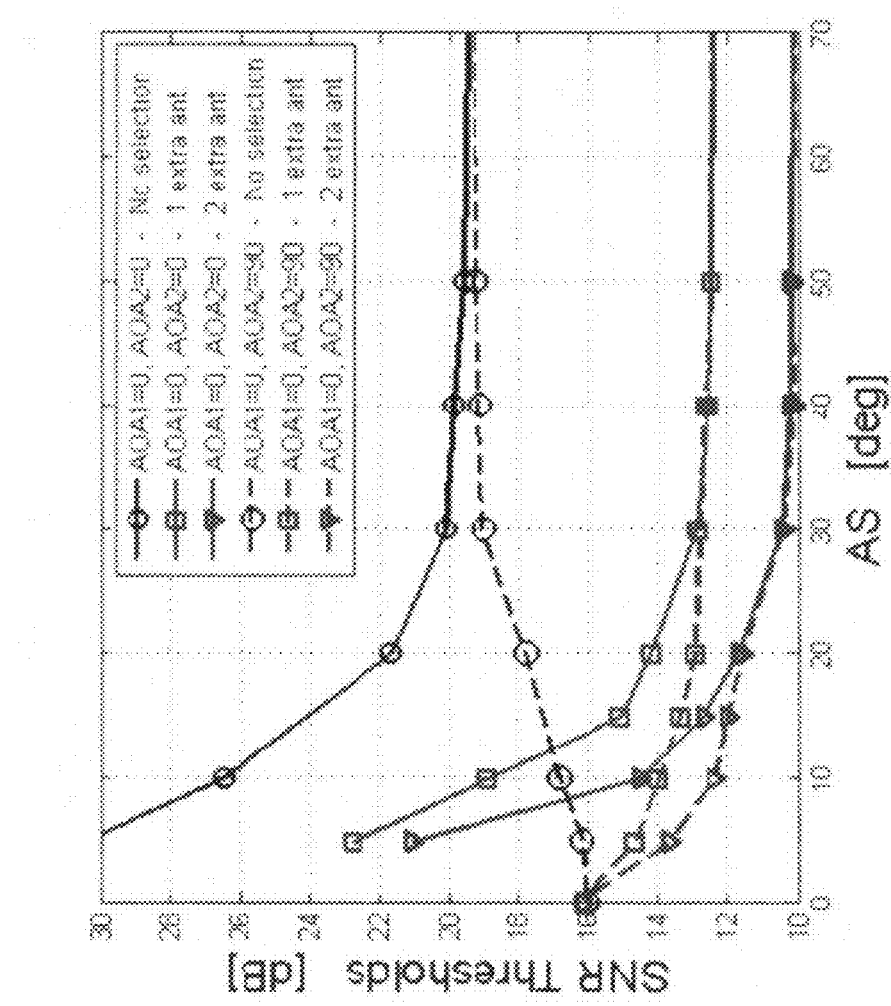
FIG. 37 provides a comparison of the SNR threshold of BD and ASel, with 1 and 2 extra antennas, for two user case.
Figure 38:
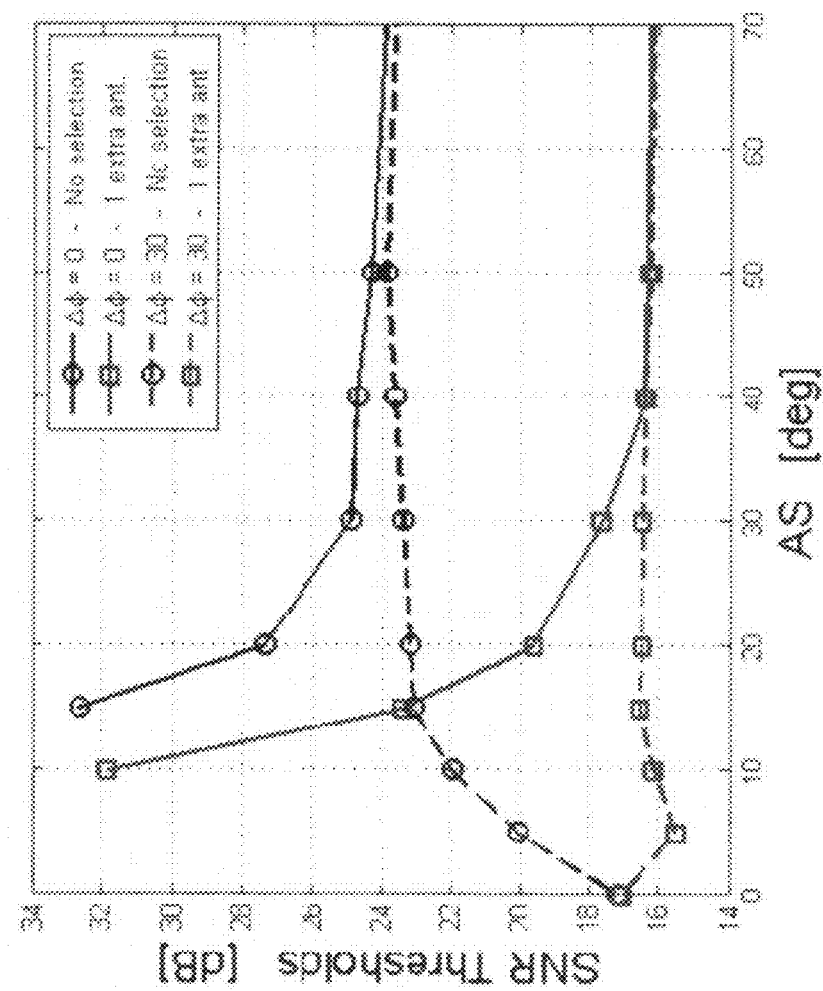
FIG. 38 illustrates similar results as FIG. 37, but for a five user case.

Next, we study the performance of ASel transmission scheme in spatially correlated channels. FIG. 37 compares the SNR threshold of BD and ASel, with 1 and 2 extra antennas, for two user case. We consider two different cases of angular separation between users: {AOA1=0°, AOA2=0°} and {AOA1=0°, AOA2=90°}. The curves for BD scheme (i.e., no antenna selection) are the same as in FIG. 35. We observe that ASel yields 8 dB and 10 dB SNR gains with 1 and 2 extra antennas, respectively, for high AS. As the AS decreases, the gain due to ASel over BD becomes smaller due to the reduced number of degrees of freedom in the MIMO broadcast channel. Interestingly, for AS=0° (i.e., close to LOS channels) and the case {AOA1=0°, AOA2=90°}, ASel does not provide any gain due to the luck of diversity in the space domain. FIG. 38 shows similar results as FIG. 37, but for five user case.

We compute the SNR thresholds (assuming usual target BER of $10^{-2}$) as a function of the number of users in the system (M), for both BD and ASel transmission schemes. The SNR thresholds correspond to the average SNR, such that the total transmit power is constant for any M. We assume maximum separation between the mean AOAs of each user's cluster within the azimuth range $[-\phi_m, \phi_m]=[-60°, 60°]$. Then, the angular separation between users is $\Delta\phi=120°/(M-1)$.

Figure 39:
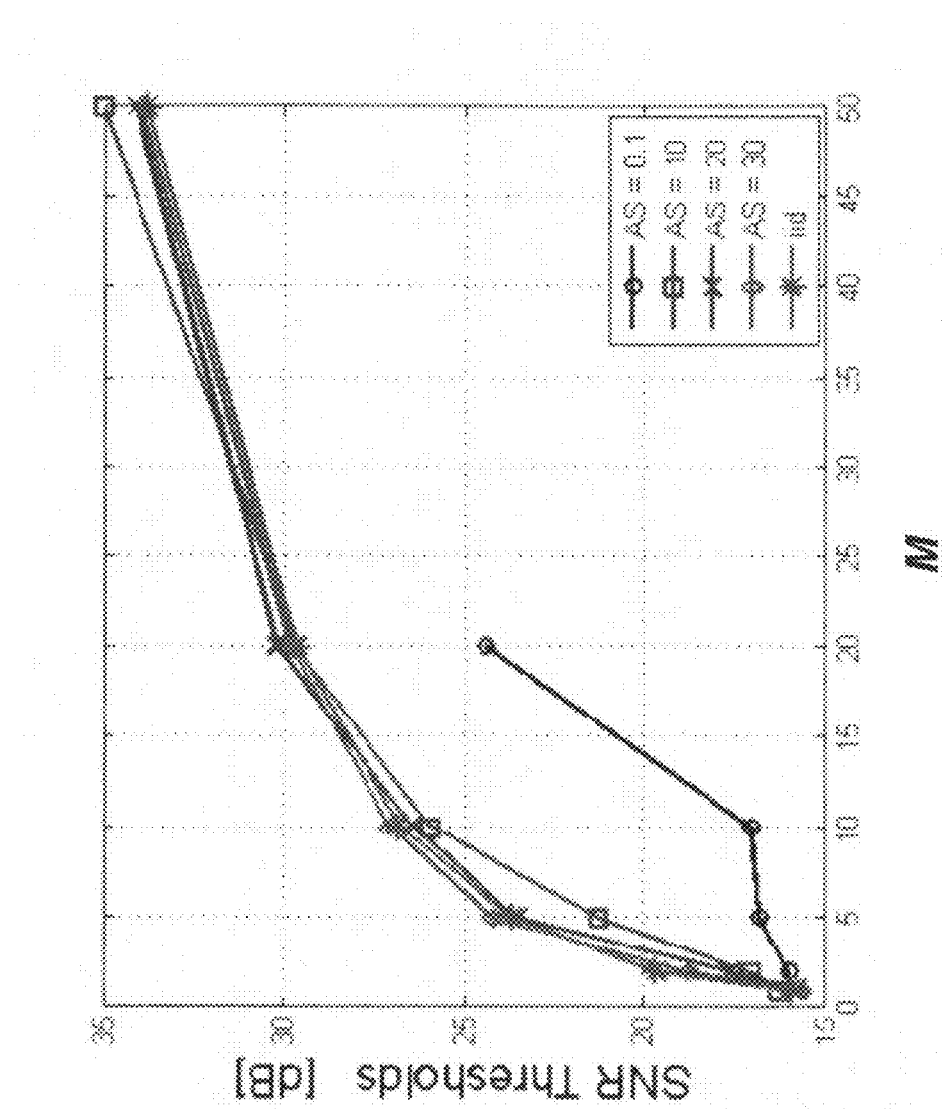

FIG. 39 shows the SNR thresholds for BD scheme with different values of AS. We observe that the lowest SNR requirement is obtained for AS=0.1° (i.e., low angle spread) with relatively small number of users (i.e., K≤20), due to the large angular separation between users. For M>50, however, the SNR requirement is way above 40 dB, since $\Delta\phi$ is very small, and BD is impractical. Moreover, for AS>10° the SNR thresholds remain almost constant for any M, and the DIDO system in spatially correlated channels approaches the performance of i.i.d. channels.

Figure 40:
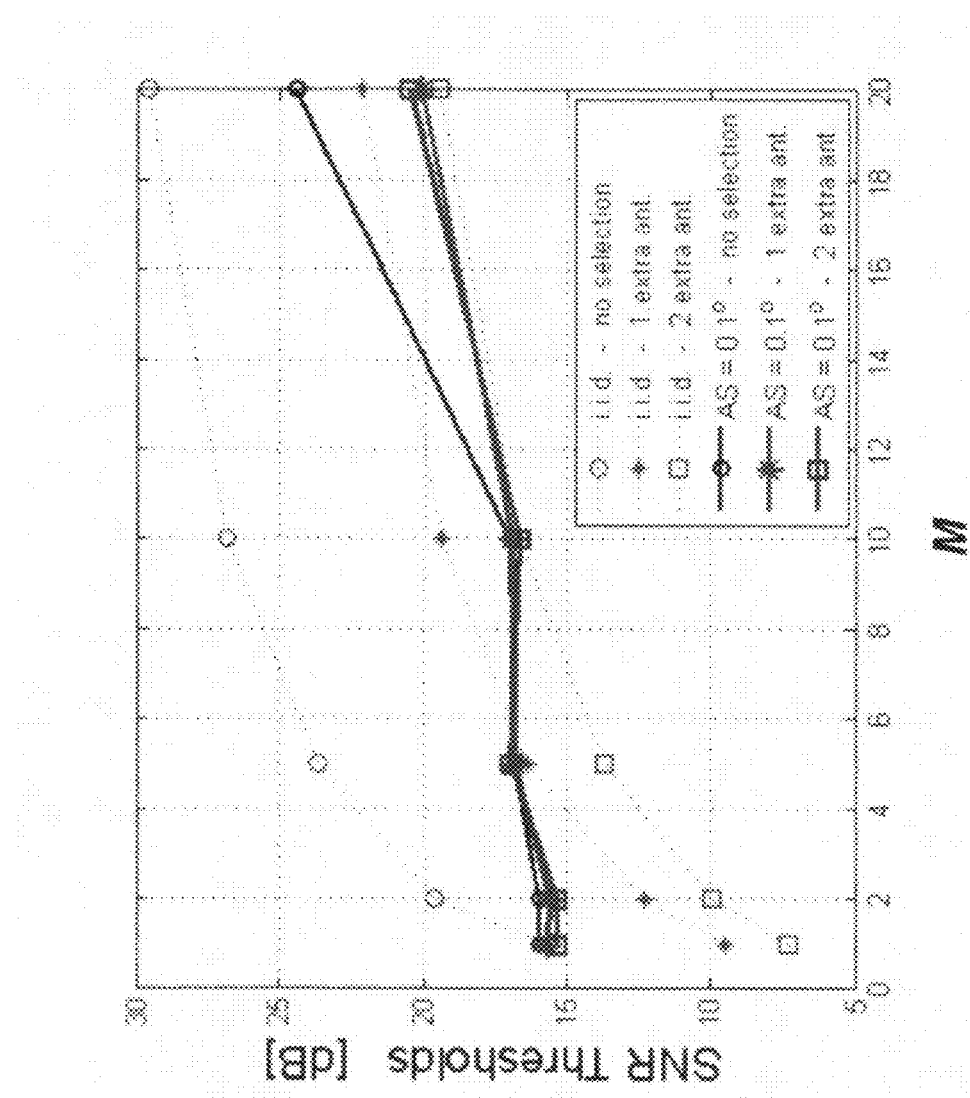
FIG. 40 illustrates the SNR thresholds in spatially correlated channels with AS=0.1° for BD and ASel with 1 and 2 extra antennas.

To reduce the values of the SNR thresholds and improve the performance of the DIDO system we apply ASel transmission scheme. FIG. 40 depicts the SNR thresholds in spatially correlated channels with AS=0.1° for BD and ASel with 1 and 2 extra antennas. For reference we report also the curves for the i.i.d. case shown in FIG. 32. It is possible to see that, for low number of users (i.e., M≤10), antenna selection does not help reducing the SNR requirement due to the lack of diversity in the DIDO broadcast channel. As the number of users increases, ASel benefits from multiuser diversity yielding SNR gains (i.e., 4 dB for M=20). Moreover, for M≤20, the performance of ASel with 1 or 2 extra antennas in highly spatially correlated channels is the same.

Figure 41:
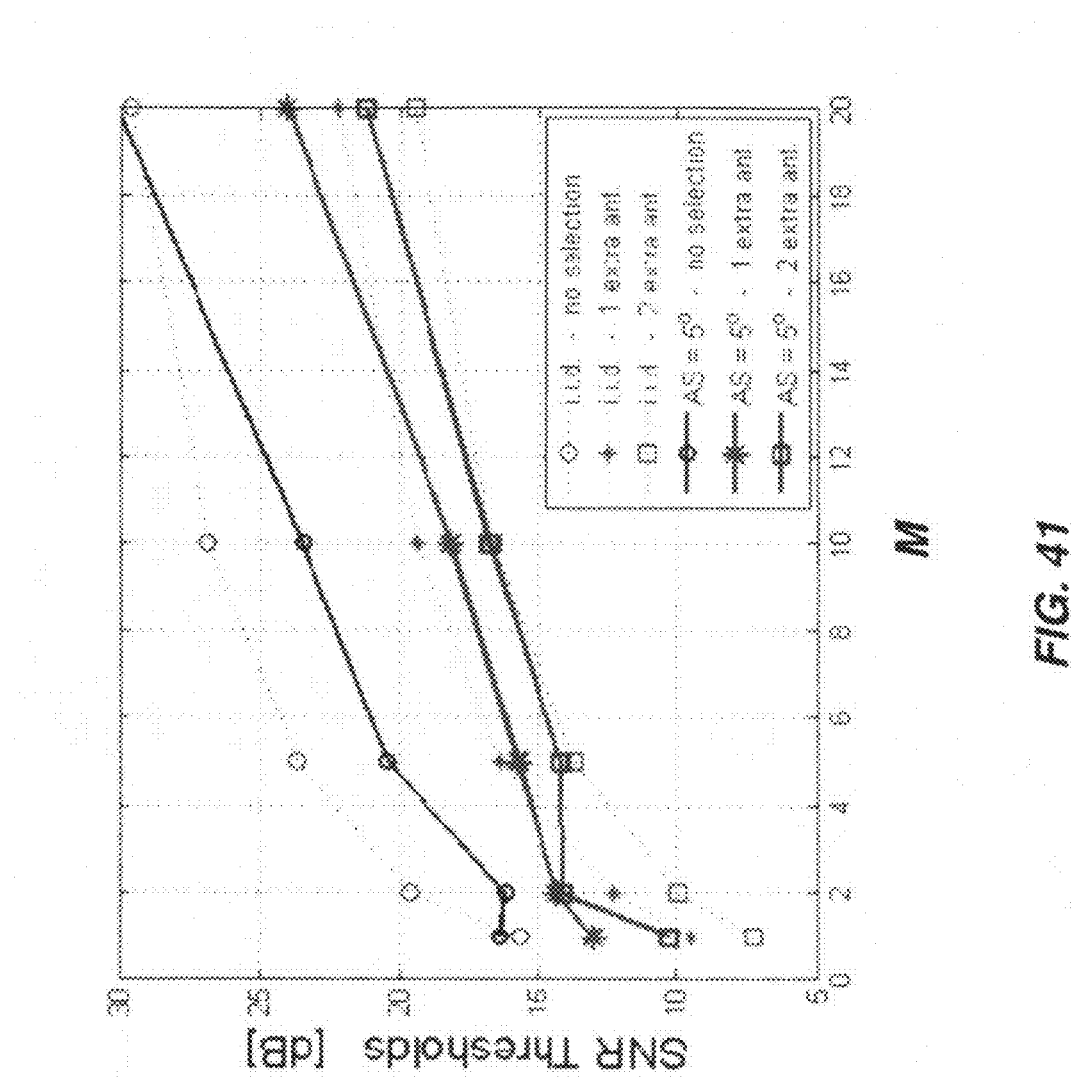
FIG. 41 illustrates the computation of the SNR thresholds for two more channel scenarios with AS=5°.
Figure 42:
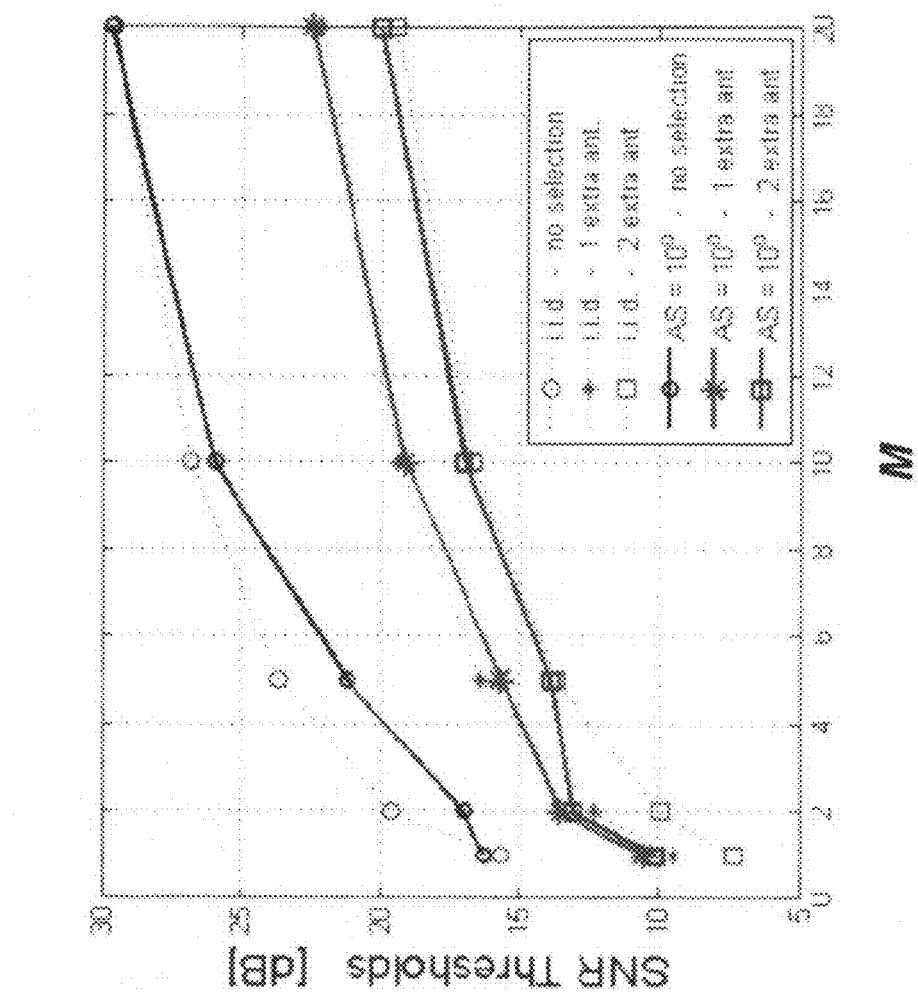
FIG. 42 illustrates the computation of the SNR thresholds for two more channel scenarios with AS=10°.

We then compute the SNR thresholds for two more channel scenarios: AS=5° in FIG. 41 and AS=10° in FIG. 42. FIG. 41 shows that ASel yields SNR gains also for relatively small number of users (i.e., M≤10) as opposed to FIG. 40, due to the larger angle spread. For AS=10° the SNR thresholds reduce further and the gains due to ASel get higher, as reported in FIG. 42.

Figure 43:
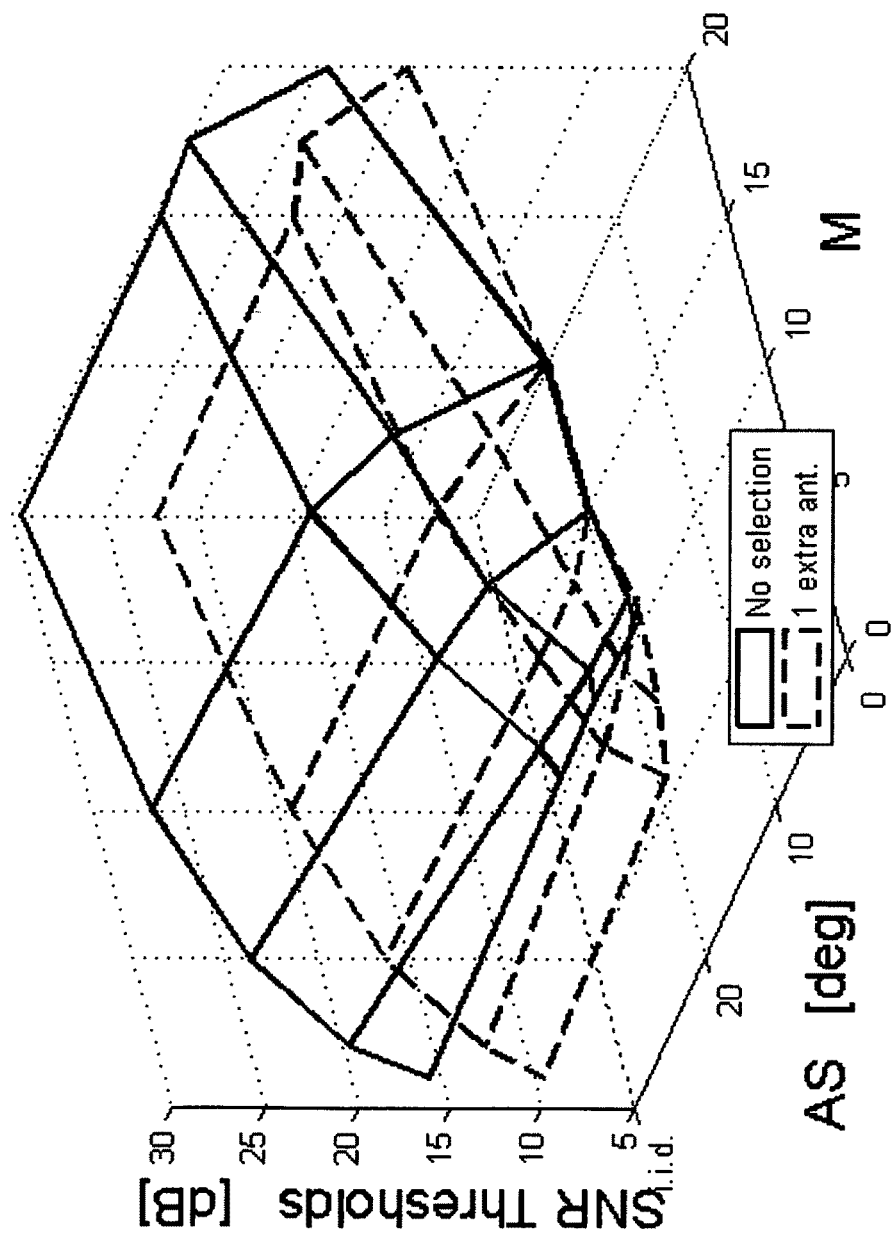
FIGS. 43-44 illustrate the SNR thresholds as a function of the number of users (M) and angle spread (AS) for BD and ASel schemes, with 1 and 2 extra antennas, respectively.
Figure 44:
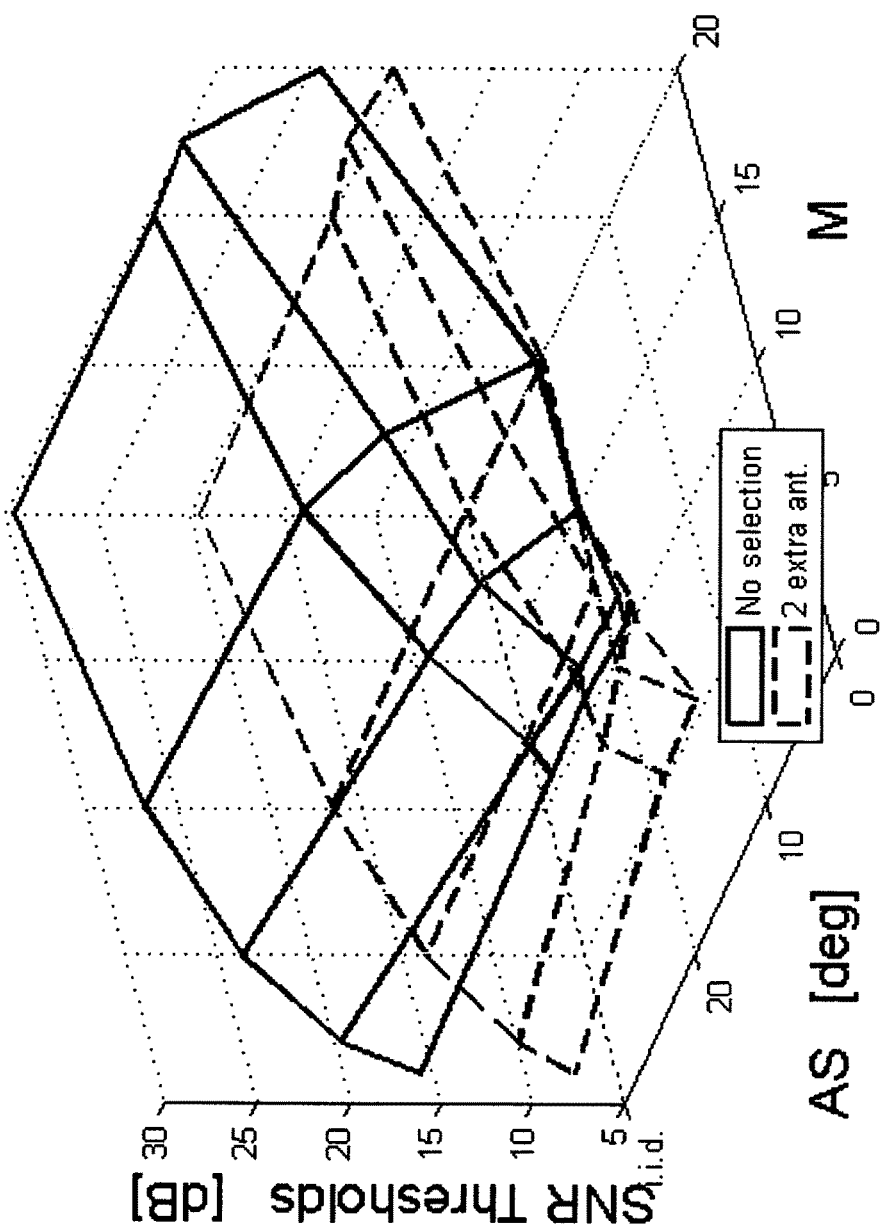

Finally, we summarize the results presented so far for correlated channels. FIG. 43 and FIG. 44 show the SNR thresholds as a function of the number of users (M) and angle spread (AS) for BD and ASel schemes, with 1 and 2 extra antennas, respectively. Note that the case of AS=30° corresponds actually to i.i.d. channels, and we used this value of AS in the plot only, for graphical representation. We observe that, while BD is affected by the channel spatial correlation, ASel yields almost the same performance for any AS. Moreover, for AS=0.1°, ASel performs similarly to BD for low M, whereas outperforms BD for large M (i.e., M≥20), due to multiuser diversity.

Figure 49:
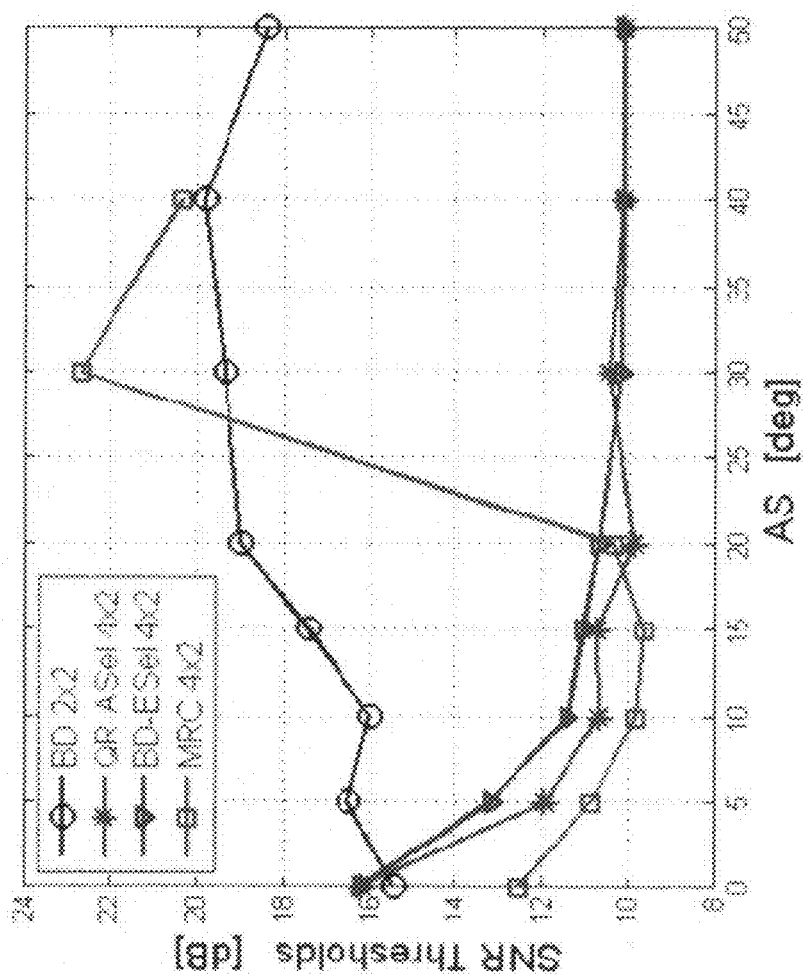
FIG. 49 compares the performance of different DIDO schemes in terms of SNR thresholds.

FIG. 49 compares the performance of different DIDO schemes in terms of SNR thresholds. The DIDO schemes considered are: BD, ASel, BD with eigenmode selection (BD-ESel) and maximum ratio combining (MRC). Note that MRC, does not pre-cancel interference at the transmitter (unlike the other methods), but does provide larger gain in case the users are spatially separated. In FIG. 49 we plot the SNR threshold for target BER=10−2 for DIDO N×2 systems when the two users are located at −30° and 30° from the broadside direction of the transmit array, respectively. We observe that for low AS the MRC scheme provides 3 dB gain compared to the other schemes since the users' spatial channels are well separated and the effect of inter-user interference is low. Note that the gain of MRC over DIDO N×2 are due to array gain. For AS larger than 20° the QR-ASel scheme outperforms the other and yields about 10 dB gain compared to BD 2×2 with no selection. QR-ASel and BD-ESel provide about the same performance for any value of AS.

Described above is a novel adaptive transmission technique for DIDO systems. This method dynamically switches between DIDO transmission modes to different users to enhance throughput for fixed target error rate. The performance of different order DIDO systems was measured in different propagation conditions and it was observed that significant gains in throughput may be achieved by dynamically selecting the DIDO modes and number of users as a function of the propagation conditions.

Pre-Compensation of Frequency and Phase Offset a. Background

As previously described, wireless communication systems use carrier waves to convey information. These carrier waves are usually sinusoids that are amplitude and/or phase modulated in response to information to be transmitted. The nominal frequency of the sinusoid is known as the carrier frequency. To create this waveform, the transmitter synthesizes one or more sinusoids and uses upconversion to create a modulated signal riding on a sinusoid with the prescribed carrier frequency. This may be done through direct conversion where the signal is directly modulated on the carrier or through multiple upconversion stages. To process this waveform, the receiver must demodulate the received RF signal and effectively remove the modulating carrier. This requires that the receiver synthesize one or more sinusoidal signals to reverse the process of modulation at the transmitter, known as downconversion. Unfortunately, the sinusoidal signals generated at the transmitter and receiver are derived from different reference oscillators. No reference oscillator creates a perfect frequency reference; in practice there is always some deviation from the true frequency.

In wireless communication systems, the differences in the outputs of the reference oscillators at the transmitter and receivers create the phenomena known as carrier frequency offset, or simply frequency offset, at the receiver. Essentially there is some residual modulation in the received signal (corresponding to the difference in the transmit and receive carriers), which occurs after downconversion. This creates distortion in the received signal resulting in higher bit error rates and lower throughput.

There are different techniques for dealing with carrier frequency offset. Most approaches estimate the carrier frequency offset at the receiver and then apply a carrier frequency offset correction algorithm. The carrier frequency offset estimation algorithm may be blind using offset QAM (T. Fusco and M. Tanda, "Blind Frequency-offset Estimation for OFDM/OQAM Systems," IEEE Transactions on Signal Processing, vol. 55, pp. 1828-1838, 2007); periodic properties (E. Serpedin, A. Chevreuil, G. B. Giannakis, and P. Loubaton, "Blind channel and carrier frequency offset estimation using periodic modulation precoders," IEEE Transactions on Signal Processing, vol. 48, no. 8, pp. 2389-2405, August 2000); or the cyclic prefix in orthogonal frequency division multiplexing (OFDM) structure approaches (J. J. van de Beek, M. Sandell, and P. O. Borjesson, "ML estimation of time and frequency offset in OFDM systems," IEEE Transactions on Signal Processing, vol. 45, no. 7, pp. 1800-1805, July 1997; U. Tureli, H. Liu, and M. D. Zoltowski, "OFDM blind carrier offset estimation: ESPRIT," IEEE Trans. Commun., vol. 48, no. 9, pp. 1459-1461, September 2000; M. Luise, M. Marselli, and R. Reggiannini, "Low-complexity blind carrier frequency recovery for OFDM signals over frequency-selective radio channels," IEEE Trans. Commun., vol. 50, no. 7, pp. 1182-1188, July 2002).

Alternatively special training signals may be utilized including a repeated data symbol (P. H. Moose, "A technique for orthogonal frequency division multiplexing frequency offset correction," IEEE Trans. Commun., vol. 42, no. 10, pp. 2908-2914, October 1994); two different symbols (T. M. Schmidl and D. C. Cox, "Robust frequency and timing synchronization for OFDM," IEEE Trans. Commun., vol. 45, no. 12, pp. 1613-1621, December 1997); or periodically inserted known symbol sequences (M. Luise and R. Reggiannini, "Carrier frequency acquisition and tracking for OFDM systems," IEEE Trans. Commun., vol. 44, no. 11, pp. 1590-1598, November 1996). The correction may occur in analog or in digital. The receiver can also use carrier frequency offset estimation to precorrect the transmitted signal to eliminate offset. Carrier frequency offset correction has been studied extensively for multicarrier and OFDM systems due to their sensitivity to frequency offset (J. J. van de Beek, M. Sandell, and P. O. Borjesson, "ML estimation of time and frequency offset in OFDM systems," Signal Processing, IEEE Transactions on [see also Acoustics, Speech, and Signal Processing, IEEE Transactions on], vol. 45, no. 7, pp. 1800-1805, July 1997; U. Tureli, H. Liu, and M. D. Zoltowski, "OFDM blind carrier offset estimation: ESPRIT," IEEE Trans. Commun., vol. 48, no. 9, pp. 1459-1461, September 2000; T. M. Schmidl and D. C. Cox, "Robust frequency and timing synchronization for OFDM," IEEE Trans. Commun., vol. 45, no. 12, pp. 1613-1621, December 1997; M. Luise, M. Marselli, and R. Reggiannini, "Low-complexity blind carrier frequency recovery for OFDM signals over frequency-selective radio channels," IEEE Trans. Commun., vol. 50, no. 7, pp. 1182-1188, July 2002).

Frequency offset estimation and correction is an important issue for multi-antenna communication systems, or more generally MIMO (multiple input multiple output) systems. In MIMO systems where the transmit antennas are locked to one frequency reference and the receivers are locked to another frequency reference, there is a single offset between the transmitter and receiver. Several algorithms have been proposed to tackle this problem using training signals (K. Lee and J. Chun, "Frequency-offset estimation for MIMO and OFDM systems using orthogonal training sequences," IEEE Trans. Veh. Technol., vol. 56, no. 1, pp. 146-156, January 2007; M. Ghogho and A. Swami, "Training design for multipath channel and frequency offset estimation in MIMO systems," IEEE Transactions on Signal Processing, vol. 54, no. 10, pp. 3957-3965, October 2006, and adaptive tracking C. Oberli and B. Daneshrad, "Maximum likelihood tracking algorithms for MIMOOFDM," in Communications, 2004 IEEE International Conference on, vol. 4, Jun. 20-24, 2004, pp. 2468-2472). A more severe problem is encountered in MIMO systems where the transmit antennas are not locked to the same frequency reference but the receive antennas are locked together. This happens practically in the uplink of a spatial division multiple access (SDMA) system, which can be viewed as a MIMO system where the different users correspond to different transmit antennas. In this case the compensation of frequency offset is much more complicated. Specifically, the frequency offset creates interference between the different transmitted MIMO streams. It can be corrected using complex joint estimation and equalization algorithms (A. Kannan, T. P. Krauss, and M. D. Zoltowski, "Separation of cochannel signals under imperfect timing and carrier synchronization," IEEE Trans. Veh. Technol., vol. 50, no. 1, pp. 79-96, January 2001), and equalization followed by frequency offset estimation (T. Tang and R. W. Heath, "Joint frequency offset estimation and interference cancellation for MIMO-OFDM systems [mobile radio]," 2004. VTC2004-Fall. 2004 IEEE $60^{th}$ Vehicular Technology Conference, vol. 3, pp. 1553-1557, Sep. 26-29, 2004; X. Dai, "Carrier frequency offset estimation for OFDM/SDMA systems using consecutive pilots," IEEE Proceedings-Communications, vol. 152, pp. 624-632, Oct. 7, 2005). Some work has dealt with the related problem of residual phase off-set and tracking error, where residual phase offsets are estimated and compensated after frequency offset estimation, but this work only consider the uplink of an SDMA OFDMA system (L. Haring, S. Bieder, and A. Czylwik, "Residual carrier and sampling frequency synchronization in multiuser OFDM systems," 2006. VTC 2006-Spring. IEEE 63rd Vehicular Technology Conference, vol. 4, pp. 1937-1941, 2006). The most severe case in MIMO systems occurs when all transmit and receive antennas have different frequency references. The only available work on this topic only deals with asymptotic analysis of estimation error in flat fading channels (O. Besson and P. Stoica, "On parameter estimation of MIMO flat-fading channels with frequency offsets," Signal Processing, IEEE Transactions on [see also Acoustics, Speech, and Signal Processing, IEEE Transactions on], vol. 51, no. 3, pp. 602-613, March 2003).

A case that has not been significantly investigated occurs when the different transmit antennas of a MIMO system do not have the same frequency reference and the receive antennas process the signals independently. This happens in what is known as a distributed input distributed-output (DIDO) communication system, also called the MIMO broadcast channel in the literature. DIDO systems consist of one access point with distributed antennas that transmit parallel data streams (via precoding) to multiple users to enhance downlink throughput, while exploiting the same wireless resources (i.e., same slot duration and frequency band) as conventional SISO systems. Detailed description of DIDO systems was presented in, S. G. Perlman and T. Cotter, "System and method for distributed input-distributed output wireless communications," United States Patent Application 20060023803, July 2004. There are many ways to implement DIDO precoders. One solution is block diagonalization (BD) described in, for example, Q. H. Spencer, A. L. Swindlehurst, and M. Haardt, "Zero-forcing methods for downlink spatial multiplexing in multiuser MIMO channels," IEEE Trans. Sig. Proc., vol. 52, pp. 461-471, February 2004; K. K. Wong, R. D. Murch, and K. B. Letaief, "A joint-channel diagonalization for multiuser MIMO antenna systems," IEEE Trans. Wireless Comm., vol. 2, pp. 773-786, July 2003; L. U. Choi and R. D. Murch, "A transmit preprocessing technique for multiuser MIMO systems using a decomposition approach," IEEE Trans. Wireless Comm., vol. 3, pp. 20-24, January 2004; Z. Shen, J. G. Andrews, R. W. Heath, and B. L. Evans, "Low complexity user selection algorithms for multiuser MIMO systems with block diagonalization," accepted for publication in IEEE Trans. Sig. Proc., September 2005; Z. Shen, R. Chen, J. G. Andrews, R. W. Heath, and B. L. Evans, "Sum capacity of multiuser MIMO broadcast channels with block diagonalization," submitted to IEEE Trans. Wireless Comm., October 2005; R. Chen, R. W. Heath, and J. G. Andrews, "Transmit selection diversity for unitary precoded multiuser spatial multiplexing systems with linear receivers," accepted to IEEE Trans. on Signal Processing, 2005.

In DIDO systems, transmit precoding is used to separate data streams intended for different users. Carrier frequency offset causes several problems related to the system implementation when the transmit antenna radio frequency chains do not share the same frequency reference. When this happens, each antenna is effectively transmits at a slightly different carrier frequency. This destroys the integrity of the DIDO precoder resulting in each user experiencing extra interference. Proposed below are several solutions to this problem. In one embodiment of the solution, the DIDO transmit antennas share a frequency reference through a wired, optical, or wireless network. In another embodiment of the solution, one or more users estimate the frequency offset differences (the relative differences in the offsets between pairs of antennas) and send this information back to the transmitter. The transmitter then precorrects for the frequency offset and proceeds with the training and precoder estimation phase for DIDO. There is a problem with this embodiment when there are delays in the feedback channel. The reason is that there may be residual phase errors created by the correction process that are not accounted for in the subsequent channel estimation. To solve this problem, one additional embodiment uses a novel frequency offset and phase estimator that can correct this problem by estimating the delay. Results are presented based both on simulations and practical measurements carried out with a DIDO-OFDM prototype.

The frequency and phase offset compensation method proposed in this document may be sensitive to estimation errors due to noise at the receiver. Hence, one additional embodiment proposes methods for time and frequency offset estimation that are robust also under low SNR conditions.

There are different approaches for performing time and frequency offset estimation. Because of its sensitivity to synchronization errors, many of these approaches were proposed specifically for the OFDM waveform.

The algorithms typically do not exploit the structure of the OFDM waveform thus they are generic enough for both single carrier and multicarrier waveforms. The algorithm described below is among a class of techniques that employ known reference symbols, e.g. training data, to aid in synchronization. Most of these methods are extensions of Moose's frequency offset estimator (see P. H. Moose, "A technique for orthogonal frequency division multiplexing frequency offset correction," IEEE Trans. Commun., vol. 42, no. 10, pp. 2908-2914, October 1994.). Moose proposed to use two repeated training signals and derived the frequency offset using the phase difference between both received signals. Moose's method can only correct for the fractional frequency offset. An extension of the Moose method was proposed by Schmidl and Cox (T. M. Schmidl and D. C. Cox, "Robust frequency and timing synchronization for OFDM," IEEE Trans. Commun., vol. 45, no. 12, pp. 1613-1621, December 1997.). Their key innovation was to use one periodic OFDM symbol along with an additional differentially encoded training symbol. The differential encoding in the second symbol enables integer offset correction. Coulson considered a similar setup as described in T. M. Schmidl and D. C. Cox, "Robust frequency and timing synchronization for OFDM," IEEE Trans. Commun., vol. 45, no. 12, pp. 1613-1621, December 1997, and provided a detailed discussion of algorithms and analysis as described in A. J. Coulson, "Maximum likelihood synchronization for OFDM using a pilot symbol: analysis," IEEE J. Select. Areas Commun., vol. 19, no. 12, pp. 2495-2503, December 2001; A. J. Coulson, "Maximum likelihood synchronization for OFDM using a pilot symbol: algorithms," IEEE J. Select. Areas Commun., vol. 19, no. 12, pp. 2486-2494, December 2001. One main difference is that Coulson uses repeated maximum length sequences to provide good correlation properties. He also suggests using chirp signals because of their constant envelope properties in the time and frequency domains. Coulson considers several practical details but does not include integer estimation. Multiple repeated training signals were considered by Minn et. al. in H. Minn, V. K. Bhargava, and K. B. Letaief, "A robust timing and frequency synchronization for OFDM systems," IEEE Trans. Wireless Commun., vol. 2, no. 4, pp. 822-839, July 2003, but the structure of the training was not optimized. Shi and Serpedin show that the training structure has some optimality form the perspective of frame synchronization (K. Shi and E. Serpedin, "Coarse frame and carrier synchronization of OFDM systems: a new metric and comparison," IEEE Trans. Wireless Commun., vol. 3, no. 4, pp. 1271-1284, July 2004). One embodiment of the invention uses the Shi and Serpedin approach to perform frame synchronization and fractional frequency offset estimation.

Many approaches in the literature focus on frame synchronization and fractional frequency offset correction. Integer offset correction is solved using an additional training symbol as in T. M. Schmidl and D. C. Cox, "Robust frequency and timing synchronization for OFDM," IEEE Trans. Commun., vol. 45, no. 12, pp. 1613-1621, December 1997. For example, Morrelli et. al. derived an improved version of T. M. Schmidl and D. C. Cox, "Robust frequency and timing synchronization for OFDM," IEEE Trans. Commun., vol. 45, no. 12, pp. 1613-1621, December 1997, in M. Morelli, A. N. D'Andrea, and U. Mengali, "Frequency ambiguity resolution in OFDM systems," IEEE Commun. Lett., vol. 4, no. 4, pp. 134-136, April 2000. An alternative approach using a different preamble structure was suggested by Morelli and Mengali (M. Morelli and U. Mengali, "An improved frequency offset estimator for OFDM applications," IEEE Commun. Lett., vol. 3, no. 3, pp. 75-77, March 1999). This approach uses the correlations between M repeated identical training symbols to increase the range of the fractional frequency offset estimator by a factor of M. This is the best linear unbiased estimator and accepts a large offset (with proper design) but does not provide good timing synchronization.

System Description

One embodiment of the invention uses pre-coding based on channel state information to cancel frequency and phase offsets in DIDO systems. See FIG. 11 and the associated description above for a description of this embodiment.

Figure 45:
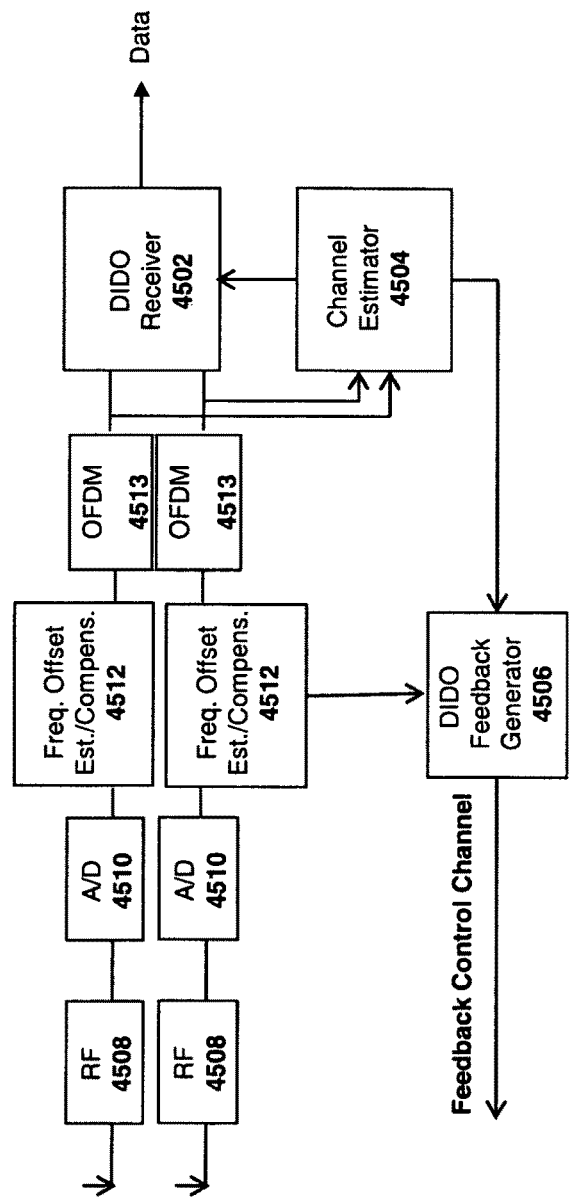
FIG. 45 illustrates a receiver equipped with frequency offset estimator/compensator.

In one embodiment of the invention, each user employs a receiver equipped with frequency offset estimator/compensator. As illustrated in FIG. 45, in one embodiment of the invention, a system including the receiver includes a plurality of RF units 4508, a corresponding plurality of A/D units 4510, a receiver equipped with a frequency offset estimator/compensator 4512 and a DIDO feedback generator unit 4506.

The RF units 4508 receive signals transmitted from the DIDO transmitter units, downconvert the signals to baseband and provide the downconverted signals to the A/D units 4510. The A/D units 4510 then convert the signal from analog to digital and send it to the frequency offset estimator/compensator units 4512. The frequency offset estimator/compensator units 4512 estimate the frequency offset and compensate for it, as described herein, and then send the compensated signal to the OFDM units 4513. The OFDM units 4513 remove the cyclic prefix and operate the Fast Fourier Transform (FFT) to report the signal to the frequency domain. During the training period the OFDM units 4513 send the output to the channel estimate unit 4504 that computes the channel estimates in the frequency domain. Alternatively, the channel estimates can be computed in the time domain. During the data period the OFDM units 4513 send the output to the DIDO receiver unit 4502 which demodulates/decodes the signal to obtain the data. The channel estimate unit 4504 sends the channel estimates to the DIDO feedback generator unit 4506 that may quantize the channel estimates and send them back to the transmitter via the feedback control channel, as illustrated.

Description of One Embodiment of an Algorithm for a DIDO 2×2 Scenario

Described below are embodiments of an algorithm for frequency/phase offset compensation in DIDO systems. The DIDO system model is initially described with and without frequency/phase offsets. For the sake of the simplicity, the particular implementation of a DIDO 2×2 system is provided. However, the underlying principles of the invention may also be implemented on higher order DIDO systems.

DIDO System Model w/o Frequency and Phase Offset

The received signals of DIDO 2×2 can be written for the first user as $$r_1[t] = h_{11}(w_{11}x_1[t] + w_{21}x_2[t]) + h_{12}(w_{12}x_1[t] + w_{22}x_2[t]) \quad (1)$$

and for the second user as $$r_2[t] = h_{21}(w_{11}x_1[t] + w_{21}x_2[t]) + h_{22}(w_{12}x_1[t] + w_{22}x_2[t]) \quad (2)$$

where t is the discrete time index, $h_{mn}$ hand $w_{mn}$ are the channel and the DIDO precoding weights between the m-th user and n-th transmit antenna, respectively, and $x_m$ is the transmit signal to user m. Note that $h_{mn}$ and $w_{mn}$ are not a function of t since we assume the channel is constant over the period between training and data transmission.

Figure 46:
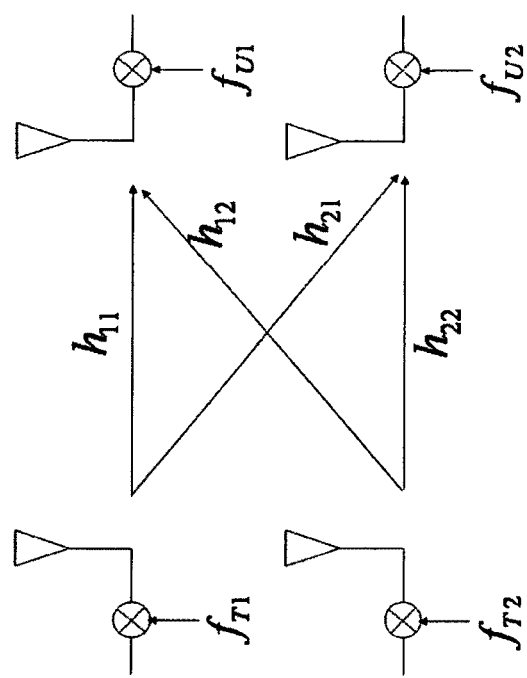
FIG. 46 illustrates DIDO 2×2 system model according to one embodiment of the invention.

In the presence of frequency and phase offset, the received signals are expressed as $$r_1[t] = e^{j(\omega_{U1}-\omega_{T1})T_s(t-t_{11})}h_{11}(w_{11}x_1[t]+w_{21}x_2[t]) + e^{j(\omega_{U1}-\omega_{T2})T_s(t-t_{12})}h_{12}(w_{12}x_1[t]+w_{22}x_2[t]) \quad (3)$$

and $$r_2[t] = e^{j(\omega_{U2}-\omega_{T1})T_s(t-t_{21})}h_{21}(w_{11}x_1[t]+w_{21}x_2[t]) + e^{j(\omega_{U2}-\omega_{T2})T_s(t-t_{22})}h_{22}(w_{12}x_1[t]+w_{22}x_2[t]) \quad (4)$$

where $T_s$ is the symbol period, $\omega_{Tn}=2\Pi f_{Tn}$ for the n-th transmit antenna, $\omega_{Um}=2\Pi f_{Um}$ for the m-th user, and $f_{Tn}$ and $f_{U_m}$ are the actual carrier frequencies (affected by offset) for the n-th transmit antenna and m-th user, respectively. The values $t_{mn}$ denote random delays that cause phase offset over the channel $h_{mn}$. FIG. 46 depicts the DIDO 2×2 system model.

For the time being, we use the following definitions:

$$\Delta\omega_{mn} = \omega_{Um} - \omega_{Tn} \tag{5}$$

to denote the frequency offset between the m-th user and the n-th transmit antenna.

Figure 47:
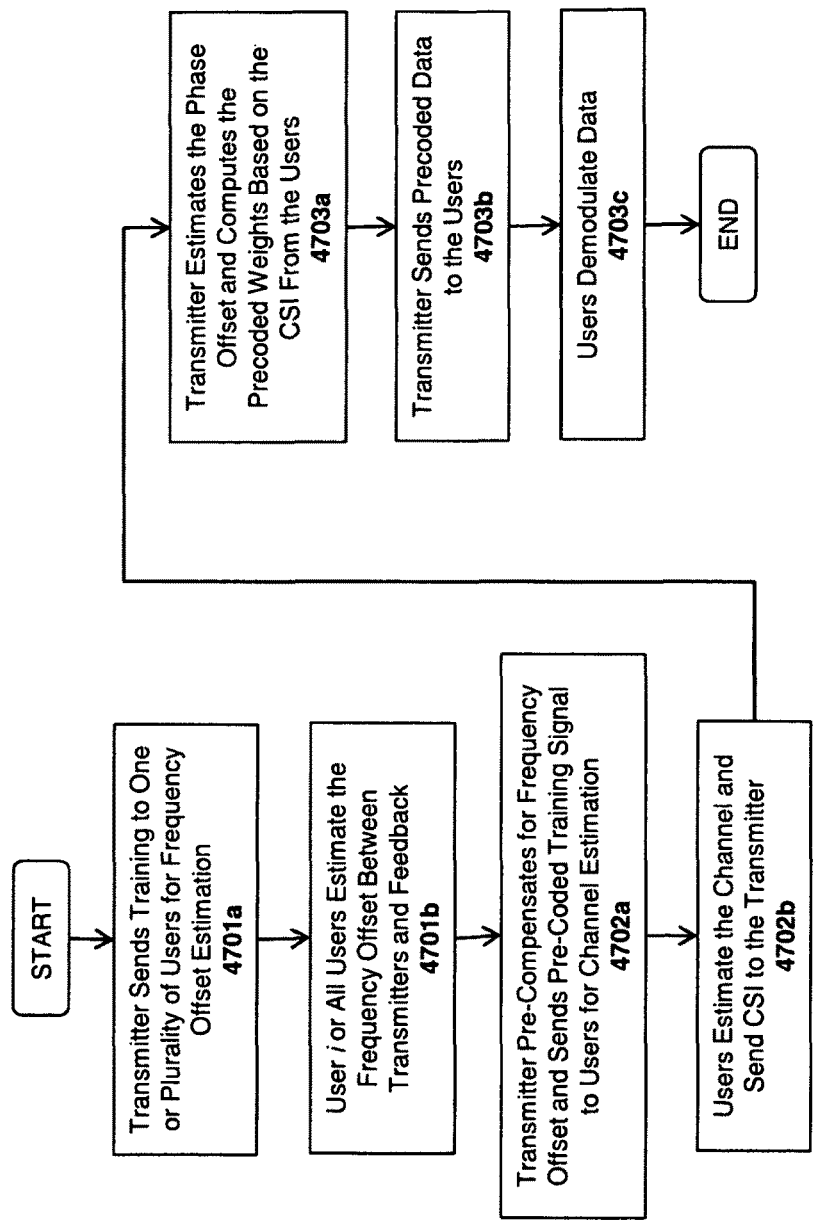
FIG. 47 illustrates a method according to one embodiment of the invention.

A method according to one embodiment of the invention is illustrated in FIG. 47. The method includes the following general steps (which include sub-steps, as illustrated): training period for frequency offset estimation 4701; training period for channel estimation 4702; data transmission via DIDO precoding with compensation 4703. These steps are described in detail below.

(a) Training Period for Frequency Offset Estimation (4701)

During the first training period the base station sends one or more training sequences from each transmit antennas to one of the users (4701a). As described herein "users" are wireless client devices. For the DIDO 2×2 case, the signal received by the m-th user is given by $$r_m[t] = e^{j\Delta\omega_{m1}T_s(t-t_{m1})}h_{m1}p_1[t] + e^{j\Delta\omega_{m2}T_s(t-t_{m2})}h_{m2}p_2[t] \tag{6}$$

where $p_1$ and $p_2$ are the training sequences transmitted from the first and second antennas, respectively.

The m-th user may employ any type of frequency offset estimator (i.e., convolution by the training sequences) and estimates the offsets $\Delta\omega_{m1}$ and $\Delta\omega_{m2}$. Then, from these values the user computes the frequency offset between the two transmit antennas as $$\Delta\omega_T = \Delta\omega_{m2} - \Delta\omega_{m1} = \omega_{T1} - \omega_{T2} \tag{7}$$

Finally, the value in (7) is fed back to the base station (4701b).

Note that $p_1$ and $p_2$ in (6) are designed to be orthogonal, so that the user can estimate $\Delta\omega_{m1}$ and $\Delta\omega_{m2}$. Alternatively, in one embodiment, the same training sequence is used over two consecutive time slots and the user estimates the offset from there. Moreover, to improve the estimate of the offset in (7) the same computations described above can be done for all users of the DIDO systems (not just for the m-th user) and the final estimate may be the (weighted) average of the values obtained from all users. This solution, however, requires more computational time and amount of feedback. Finally, updates of the frequency offset estimation are needed only if the frequency offset varies over time. Hence, depending on the stability of the clocks at the transmitter, this step 4701 of the algorithm can be carried out on a long-term basis (i.e., not for every data transmission), resulting in reduction of feedback overhead.

(a) Training Period for Channel Estimation (4702)

(b) During the second training period, the base station first obtains the frequency offset feedback with the value in (7) from the m-th user or from the plurality of users. The value in (7) is used to pre-compensate for the frequency offset at the transmit side. Then, the base station sends training data to all the users for channel estimation (4702a).

For DIDO 2×2 systems, the signal received at the first user is given by $$r_1[t] = e^{j\Delta\omega_{11}T_s(t-\tilde{t}_{11})}h_{11}p_1[t] + e^{j\Delta\omega_{12}T_s(t-\tilde{t}_{12})}h_{12}e^{-j\Delta\omega_T T_s t}p_2[t] \tag{8}$$

and at the second user by $$r_2[t] = e^{j\Delta\omega_{21}T_s(t-\tilde{t}_{21})}h_{21}p_1[t] + e^{j\Delta\omega_{22}T_s(t-\tilde{t}_{22})}h_{22}e^{-j\Delta\omega_T T_s t}p_2[t] \tag{9}$$

where $\tilde{t}_{mn} = t_{mn} + \Delta t$ and $\Delta t$ is random or known delay between the first and second transmissions of the base station. Moreover, $p_1$ and $p_2$ are the training sequences transmitted from the first and second antennas, respectively, for frequency offset and channel estimation.

Note that the pre-compensation is applied only to the second antennas in this embodiment.

Expanding (8) we obtain $$r_1[t] = e^{j\Delta\omega_{11}T_s}e^{j\theta_{11}}[h_{11}p_1[t] + e^{j(\theta_{12}-\theta_{11})}h_{12}p_2[t]] \tag{10}$$

and similarly for the second user $$r_2[t] = e^{j\Delta\omega_{21}T_s}e^{j\theta_{21}}[h_{21}p_1[t] + e^{j(\theta_{22}-\theta_{21})}h_{22}p_2[t]] \tag{11}$$

where $\theta_{mn} = -\Delta\omega_{mn}T_s\tilde{t}_{mn}$.

At the receive side, the users compensate for the residual frequency offset by using the training sequences $p_1$ and $p_2$. Then the users estimate via training the vector channels (4702b)

$$h_1 = \begin{bmatrix} h_{11} \\ e^{j(\theta_{12}-\theta_{11})}h_{12} \end{bmatrix} \tag{12}$$

$$h_2 = \begin{bmatrix} h_{21} \\ e^{j(\theta_{22}-\theta_{21})}h_{22} \end{bmatrix}$$

These channel in (12) or channel state information (CSI) is fed back to the base station (4702b) that computes the DIDO precoder as described in the following subsection.

(c) DIDO Precoding with Pre-compensation (4703)

The base station receives the channel state information (CSI) in (12) from the users and computes the precoding weights via block diagonalization (BD) (4703a), such that $$w_1^T h_2 = 0, \; w_2^T h_1 = 0 \tag{13}$$

where the vectors $h_1$ are defined in (12) and $w_m = [w_{m1}, w_{m2}]$. Note that the invention presented in this disclosure can be applied to any other DIDO precoding method besides BD. The base station also pre-compensates for the frequency offset by employing the estimate in (7) and phase offset by estimating the delay ($\Delta t_0$) between the second training transmission and the current transmission (4703a). Finally, the base station sends data to the users via the DIDO precoder (4703b)

After this transmit processing, the signal received at user 1 is given by $$r_1[t] = e^{j\Delta\omega_{11}T_s(t-\tilde{t}_{11}-\Delta t_o)}h_{11}[w_{11}x_1[t] + w_{21}x_2[t]]$$

$$= e^{j\Delta\omega_{12}T_s(t-\tilde{t}_{12}-\Delta t_o)}h_{12}e^{-j\Delta\omega_T T_s(t-\Delta t_o)}\begin{bmatrix} w_{12}x_1[t] + \\ w_{22}x_2[t] \end{bmatrix}$$

$$= \gamma_1[t]\begin{bmatrix} h_{11}(w_{11}x_1[t] + w_{21}x_2[t]) + \\ e^{j(\Delta\omega_{11}\tilde{t}_{11} - \Delta\omega_{12}\tilde{t}_{12})T_s}h_{12}(w_{12}x_1[t] + w_{22}x_2[t]) \end{bmatrix}$$

$$= \gamma_1[t]\begin{bmatrix} (h_{11}w_{11} + e^{j(\theta_{12}-\theta_{11})}h_{12}w_{12})x_1[t] + \\ (h_{11}w_{21} + e^{j(\theta_{12}-\theta_{11})}h_{12}w_{22})x_2[t] \end{bmatrix} \tag{14}$$

where $\gamma_1[t] = e^{j\Delta\omega_{11}T_s(t-\tilde{t}_{11}-\Delta t_o)}$. Using the property (13) we obtain $$r_1[t] = \gamma_1[t]w_1^T h_1 x_1[t] \tag{15}$$

Similarly, for user 2 we get $$r_2[t] = e^{j\Delta\omega_{21}T_S(t-\tilde{t}_{21}-\Delta t_o)}h_{21}[w_{11}x_1[t]+w_{21}x_2[t]]+ \\ e^{j\Delta\omega_{22}T_S(t-\tilde{t}_{22}-\Delta t_o)}h_{22}e^{-j\Delta\omega_T T_S(t-\Delta t_o)}[w_{12}x_1[t]+ \\ w_{22}x_2[t]]] \quad (16)$$

and expanding (16)

$$r_2[t] = \gamma_2[t]w_2^T h_2 x_2[t] \quad (17)$$

where $\gamma_2[t] = e^{j\Delta\omega_{21}T_S(t-\tilde{t}_{21}-\Delta t_o)}$.

Finally, the users compute the residual frequency offset and the channel estimation to demodulate the data streams $x_1[t]$ and $x_2[t]$ (4703c).

Generalization to DIDO N×M

In this section, the previously described techniques are generalized to DIDO systems with N transmit antennas and M users.

i. Training Period for Frequency Offset Estimation

During the first training period, the signal received by the m-th user as a result of the training sequences sent from the N antennas is given by $$r_m[t] = \sum_{n=1}^{N} e^{j\Delta\omega_{mn}T_S(t-t_{mn})} h_{mn} p_n[t] \quad (18)$$

where $p_n$ is the training sequences transmitted from the n-th antenna.

After estimating the offsets $\Delta\omega_{mn}$, $\forall n=1,\ldots,N$, the m-th user computes the frequency offset between the first and the n-th transmit antenna as $$\Delta\omega_{T,1n} = \Delta\omega_{mn} - \Delta\omega_{m1} = \omega_{T1} - \omega_{Tn}. \quad (19)$$

Finally, the values in (19) are fed back to the base station.

ii. Training Period for Channel Estimation

During the second training period, the base station first obtains the frequency offset feedback with the value in (19) from the m-th user or from the plurality of users. The value in (19) is used to pre-compensate for the frequency offset at the transmit side. Then, the base station sends training data to all the users for channel estimation.

For DIDO N×M systems, the signal received at the m-th user is given by $$r_m[t] = e^{j\Delta\omega_{m1}T_S(t-\tilde{t}_{m1})}h_{m1}p_1[t] + \\ \sum_{n=2}^{N} e^{j\Delta\omega_{mn}T_S(t-\tilde{t}_{mn})}h_{mn}e^{-j\Delta\omega_{T,1n}T_S t}p_n[t] \\ = e^{j\Delta\omega_{m1}T_S(t-\tilde{t}_{m1})}\left[h_{m1}p_1[t] + \sum_{n=2}^{N} e^{j(\theta_{mn}-\theta_{m1})}h_{mn}p_n[t]\right] \\ = e^{j\Delta\omega_{m1}T_S(t-\tilde{t}_{m1})}\sum_{n=1}^{N} e^{j(\theta_{mn}-\theta_{m1})}h_{mn}p_n[t] \quad (20)$$

where $\theta_{mn} = -\Delta\omega_{mn}T_S \tilde{t}_{mn}, \tilde{t}_{mn} = t_{mn} + \Delta t$ and $\Delta t$ is random or known delay between the first and second transmissions of the base station. Moreover, $p_n$ is the training sequence transmitted from the n-th antenna for frequency offset and channel estimation.

At the receive side, the users compensate for the residual frequency offset by using the training sequences $p_n$. Then, each users m estimates via training the vector channel $$h_m = \begin{bmatrix} h_{m1} \\ e^{j(\theta_{m2}-\theta_{m1})}h_{m2} \\ \vdots \\ e^{j(\theta_{mN}-\theta_{m1})}h_{mN} \end{bmatrix} \quad (21)$$

and feeds back to the base station that computes the DIDO precoder as described in the following subsection.

iii. DIDO Precoding with Pre-Compensation

The base station receives the channel state information (CSI) in (12) from the users and computes the precoding weights via block diagonalization (BD), such that $$w_m^T h_l = 0, \forall m \neq l, m = 1, \ldots, M \quad (22)$$

where the vectors $h_m$ are defined in (21) and $w_m = [w_{m1}, w_{m2}, \ldots, w_{mN}]$. The base station also pre-compensates for the frequency offset by employing the estimate in (19) and phase offset by estimating the delay ($\Delta t_o$) between the second training transmission and the current transmission. Finally, the base station sends data to the users via the DIDO precoder.

After this transmit processing, the signal received at user i is given by $$r_i[t] = e^{j\Delta\omega_{i1}T_S(t-\tilde{t}_{i1}-\Delta t_0)}h_{i1}\sum_{m=1}^{M}w_{m1}x_m[t]++ \quad (23)$$

$$\sum_{n=2}^{N} e^{j\Delta\omega_{in}T_S(t-\tilde{t}_{in}-\Delta t_o)}h_{in}e^{-j\Delta\omega_{T,1n}T_S(t-\Delta t_o)}\sum_{m=1}^{M}w_{mn}x_m[t]$$

$$= e^{j\Delta\omega_{i1}T_S(t-\Delta t_o)}e^{-j\Delta\omega_{i1}T_S \tilde{t}_{i1}}h_{i1}\sum_{m=1}^{M}w_{m1}x_m[t] +$$

$$\sum_{n=2}^{N} e^{j\Delta\omega_{i1}T_S(t-\Delta t_o)}e^{-j\Delta\omega_{in}T_S \tilde{t}_{in}}h_{in}\sum_{m=1}^{M}w_{mn}x_m[t]$$

$$= \gamma_i[t]\left[h_{i1}\sum_{m=1}^{M}w_{m1}x_m[t] + \sum_{n=2}^{N}e^{j(\theta_{in}-\theta_{i1})}h_{in}\sum_{m=1}^{M}w_{m1}x_m[t]\right]$$

$$= \gamma_i[t]\left[\sum_{n=1}^{N}e^{j(\theta_{in}-\theta_{i1})}h_{in}\sum_{m=1}^{M}w_{mn}x_m[t]\right]$$

$$= \gamma_i[t]\sum_{m=1}^{M}\left[\sum_{n=1}^{N}e^{j(\theta_{in}-\theta_{i1})}h_{in}w_{mn}\right]x_m[t]$$

$$= \gamma_i[t]\sum_{m=1}^{M}w_m^T h_i x_m[t]$$

Where $\gamma_i[n] = e^{j\Delta\omega_{i1}T_S(t-\tilde{t}_{i1}-\Delta t_o)}$. Using the property (22) we obtain $$r_i[t] = \gamma_i[t]w_i^T h_i x_i[t] \quad (24)$$

Finally, the users compute the residual frequency offset and the channel estimation to demodulate the data streams $x_i[t]$.

Results

Figure 48:
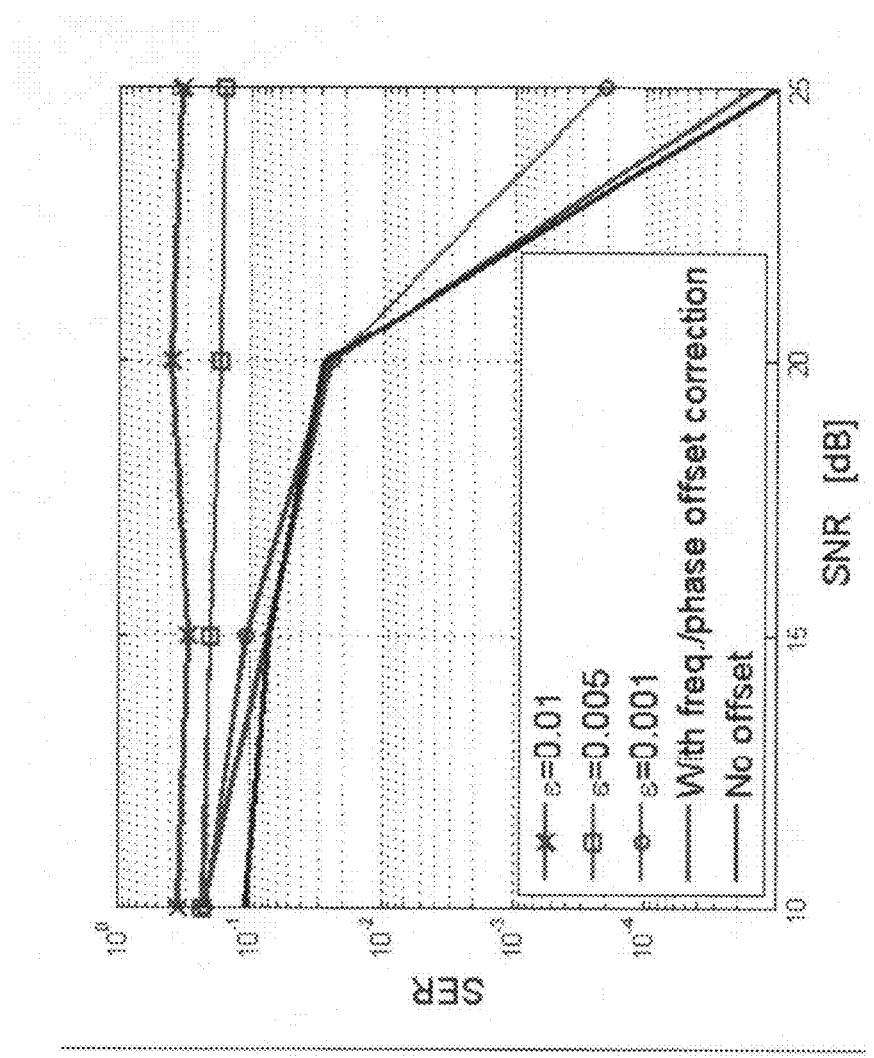
FIG. 48 illustrates SER results of DIDO 2×2 systems with and without frequency offset.

FIG. 48 shows the SER results of DIDO 2×2 systems with and without frequency offset. It is possible to see that the proposed method completely cancels the frequency/phase offsets yielding the same SER as systems without offsets.

Next, we evaluate the sensitivity of the proposed compensation method to frequency offset estimation errors and/or fluctuations of the offset in time. Hence, we re-write (14) as $$r_1[t] = e^{j\Delta\omega_{11}T_s(t-\tilde{t}_{11}-\Delta t_o)}h_{11}[w_{11}x_1[t]+w_{21}x_2[t]] + e^{j\Delta\omega_{12}T_s(t-\tilde{t}_{12}-\Delta t_o)}h_{12}e^{-j(\Delta\omega T+2\Pi\epsilon)T_s(t-\Delta t_o)}[w_{12}x_1[t]+w_{22}x_2[t]]] \quad (25)$$

where $\epsilon$ indicates the estimation error and/or variation of the frequency offset between training and data transmission. Note that the effect of $\epsilon$ is to destroy the orthogonality property in (13) such that the interference terms in (14) and (16) are not completely pre-canceled at the transmitter. As a results of that, the SER performance degrades for increasing values of $\epsilon$.

FIG. 48 shows the SER performance of the frequency offset compensation method for different values of $\epsilon$. These results assume $T_s$=0.3 ms (i.e., signal with 3 KHz bandwidth). We observe that for $\epsilon$=0.001 Hz (or less) the SER performance is similar to the no offset case.

f. Description of One Embodiment of an Algorithm for Time and Frequency Offset Estimation Hereafter, we describe additional embodiments to carry out time and frequency offset estimation (4701b in FIG. 47). The transmit signal structure under consideration is illustrated in H. Minn, V. K. Bhargava, and K. B. Letaief, "A robust timing and frequency synchronization for OFDM systems," IEEE Trans. Wireless Commun., vol. 2, no. 4, pp. 822-839, July 2003, and studied in more detail in K. Shi and E. Serpedin, "Coarse frame and carrier synchronization of OFDM systems: a new metric and comparison," IEEE Trans. Wireless Commun., vol. 3, no. 4, pp. 1271-1284, July 2004. Generally sequences with good correlation properties are used for training. For example, for our system, Chu sequences are used which are derived as described in D. Chu, "Polyphase codes with good periodic correlation properties (corresp.)," IEEE Trans. Inform. Theory, vol. 18, no. 4, pp. 531-532, July 1972. These sequences have an interesting property that they have perfect circular correlations. Let $L_{cp}$ denote the length of the cyclic prefix and let $N_t$ denote the length of the component training sequences. Let $N_t = M_t$, where $M_t$ is the length of the training sequence. Under these assumptions the transmitted symbol sequence for the preamble can be written as $$s[n] = t[n - N_t] \quad \text{for } n = -1, \ldots, -L_{cp}$$
$$s[n] = t[n] \quad \text{for } n = 0, \ldots, N_t - 1$$
$$s[n] = t[n - N_t] \quad \text{for } n = N_t, \ldots, 2N_t - 1$$
$$s[n] = -t[n - 2N_t] \quad \text{for } n = 2N_t, \ldots, 3N_t - 1$$
$$s[n] = t[n - 3N_t] \quad \text{for } n = 3N_t, \ldots, 4N_t - 1.$$

Note that the structure of this training signal can be extended to other lengths but repeating the block structure. For example, to use 16 training signals we consider a structure such as:

[CP, B, B, −B, B, B, B, −B, B, −B, −B, B, −B, B, B, −B, B, ].

By using this structure and letting $N_t$=4 $M_t$ all the algorithms to be described can be employed without modification. Effectively we are repeating the training sequence. This is especially useful in cases where a suitable training signal may not be available.

Consider the following received signal, after matched filtering and downsampling to the symbol rate:

$$r[n] = e^{2\pi\epsilon n}\sum_{l=0}^{L}h[l]s[n-l-\Delta] + v[n]$$

where $\epsilon$ is the unknown discrete-time frequency offset, $\Delta$ is the unknown frame offset, h[l] are the unknown discrete-time channel coefficients, and v[n] is additive noise. To explain the key ideas in the following sections the presence of additive noise is ignored.

i. Coarse Frame Synchronization

The purpose of coarse frame synchronization is to solve for the unknown frame offset $\Delta$. Let us make the following definitions $$r_1[n] := [r[n], r[n+1], \ldots, r[n+N_t-1]]^T,$$

$$\bar{r}_1[n] := [r[n+L_{cp}], r[n+1], \ldots, r[n+N_t-1]]^T,$$

$$r_2[n] := [r[n+N_t], r[n+1+N_t], \ldots, r[n+2N_t-1]]^T,$$

$$\bar{r}_2[n] := [r[n+L_{cp}+N_t], r[n+1+L_{cp}+N_t], \ldots, r[n+L_{cp}+2N_t-1]]^T,$$

$$r_3[n] := [r[n+2N_t], r[n+1+2N_t], \ldots, r[n+3N_t-1]]^T,$$

$$\bar{r}_3[n] := [r[n+L_{cp}+2N_t], r[n+L_{cp}+1+2N_t], \ldots, r[n+L_{cp}+3N_t-1]]^T,$$

$$r_4[n] := [r[n+3N_t], r[n+1+3N_t], \ldots, r[n+4N_t-1]]^T,$$

$$\bar{r}_4[n] := [r[n+L_{cp}+3N_t], r[n+L_{cp}+1+3N_t], \ldots, r[n+L_{cp}+4N_t-1]]^T.$$

The proposed coarse frame synchronization algorithm is inspired from the algorithm in K. Shi and E. Serpedin, "Coarse frame and carrier synchronization of OFDM systems: a new metric and comparison," IEEE Trans. Wireless Commun., vol. 3, no. 4, pp. 1271-1284, July 2004, derived from a maximum likelihood criterion.

Method 1—Improved coarse frame synchronization: the coarse frame synchronization estimator solves the following optimization $$\hat{\Delta} = \arg\max_{k\in Z}\frac{|P_1(k)| + |P_2(k)| + |P_3(k)|}{\|r_1\|^2 + \|r_2\|^2 + \|r_3\|^2 + \|r_4\|^2 + \frac{1}{2}(\|\bar{r}_1\|^2 + \|\bar{r}_2\|^2 + \|\bar{r}_3\|^2 + \|\bar{r}_4\|^2)}$$

where $$P_1[k] = r_1^*[k]r_2[k] - r_3^*[k]r_4[k] - r_2^*[k]\bar{r}_3[k]$$

$$P_2[k] = r_2^*[k]r_4[k] - r_1^*[k]r_3[k]$$

$$P_3[k] = \bar{r}_1^*[k]\bar{r}_4[k].$$

Let the corrected signal be defined as $$r_c[n] = r[n - \hat{\Delta} - \lceil L_{cp}/4 \rceil].$$

The additional correction term is used to compensate for small initial taps in the channel and can be adjusted based on the application. This extra delay will be included henceforth in the channel.

ii. Fractional Frequency Offset Correction

The fractional frequency offset correction follows the coarse frame synchronization block.

Method 2—Improved fractional frequency offset correction: the fractional frequency offset is the solution to $$\hat{\epsilon}_f = \frac{phase P_1[\hat{\Delta}]}{2\pi N_t}.$$

This is known as a fractional frequency offset because the algorithm can only correct for offsets $$|\hat{\epsilon}_f| < \frac{1}{2N_t}.$$

This problem will be solved in the next section. Let the fine frequency offset corrected signal be defined as $$r_f[n] = e^{-j2\pi \hat{\epsilon}_f} r_c[n].$$

Note that the Methods 1 and 2 are an improvement to K. Shi and E. Serpedin, "Coarse frame and carrier synchronization of OFDM systems: a new metric and comparison," IEEE Trans. Wireless Commun., vol. 3, no. 4, pp. 1271-1284, July 2004 that works better in frequency-selective channels. One specific innovation here is the use of both r and r̄ as described above. The use of r̄ improves the prior estimator because it ignores the samples that would be contaminated due to inter-symbol interference.

iii. Integer Frequency Offset Correction

To correct for the integer frequency offset, it is necessary to write an equivalent system model for the received signal after fine frequency offset correction. Absorbing remaining timing errors into the channel, the received signal in the absence of noise has the following structure:

$$r_f[n] = e^{j2\pi \frac{nk}{N_s}} \sum_{l=0}^{L_{cp}} g[l] s[n-l]$$

for $n=0, 1, \ldots, 4N_t-1$. The integer frequency offset is k while the unknown equivalent channel is g[l].

Method 3—Improved integer frequency offset correction: the integer frequency offset is the solution to $$\hat{k} = \arg\max_{m=0,1,\ldots,N_t-1} r^* D[k] S(S^*S)^{-1} S^* D[k]^* r$$

where $$r = D[k] S g$$

$$d[k] := \text{diag}\left\{1, e^{j2\pi \frac{n1}{N_t}}, \ldots, e^{j2\pi \frac{n(4N_t-1)}{N_t}}\right\}$$

$$S := \begin{bmatrix} s[0] & s[-1] & \ldots & \ldots & s[-L_{cp}] \\ s[1] & s[0] & s[-1] & \ldots & s[-L_{cp}+1] \\ s[4N_t-1] & s[4N_t-2] & s[4N_t-3] & \ldots & s[4N_t-1-L_{cp}] \end{bmatrix}$$

$$g := \begin{bmatrix} g[0] \\ g[1] \\ \vdots \\ g[L_{cp}] \end{bmatrix}$$

This gives the estimate of the total frequency offset as $$\hat{\epsilon} = \frac{\hat{k}}{N_t} + \hat{\epsilon}_f.$$

Practically, Method 3 has rather high complexity. To reduce complexity the following observations can be made. First of all, the product $S^{S(S^*S)^{-1}S^*}$ can be precomputed. Unfortunately, this still leaves a rather large matrix multiplication. An alternative is to exploit the observation that with the proposed training sequences, $S^*S \approx I$. This leads to the following reduced complexity method.

Method 4—Low-complexity improved integer frequency offset correction: a low complexity integer frequency offset estimator solves $$\hat{k} = \arg\max_{m=0,1,\ldots,N_t-1} (S^*D[k]^*r)^*(S^*D[k]^*r).$$

iv. Results

In this section we compare the performance of the different proposed estimators.

First, in FIG. 50 we compare the amount of overhead required for each method. Note that both of the new methods reduce the overhead required by 10× to 20×. To compare the performance of the different estimators, Monte Carlo experiments were performed. The setup considered is our usual NVIS transmit waveform constructed from a linear modulation with a symbol rate of 3K symbols per second, corresponding to a passband bandwidth of 3 kHz, and raised cosine pulse shaping. For each Monte Carlo realization, the frequency offset is generated from a uniform distribution on $[-f_{max}, f_{max}]$.

Figure 51:
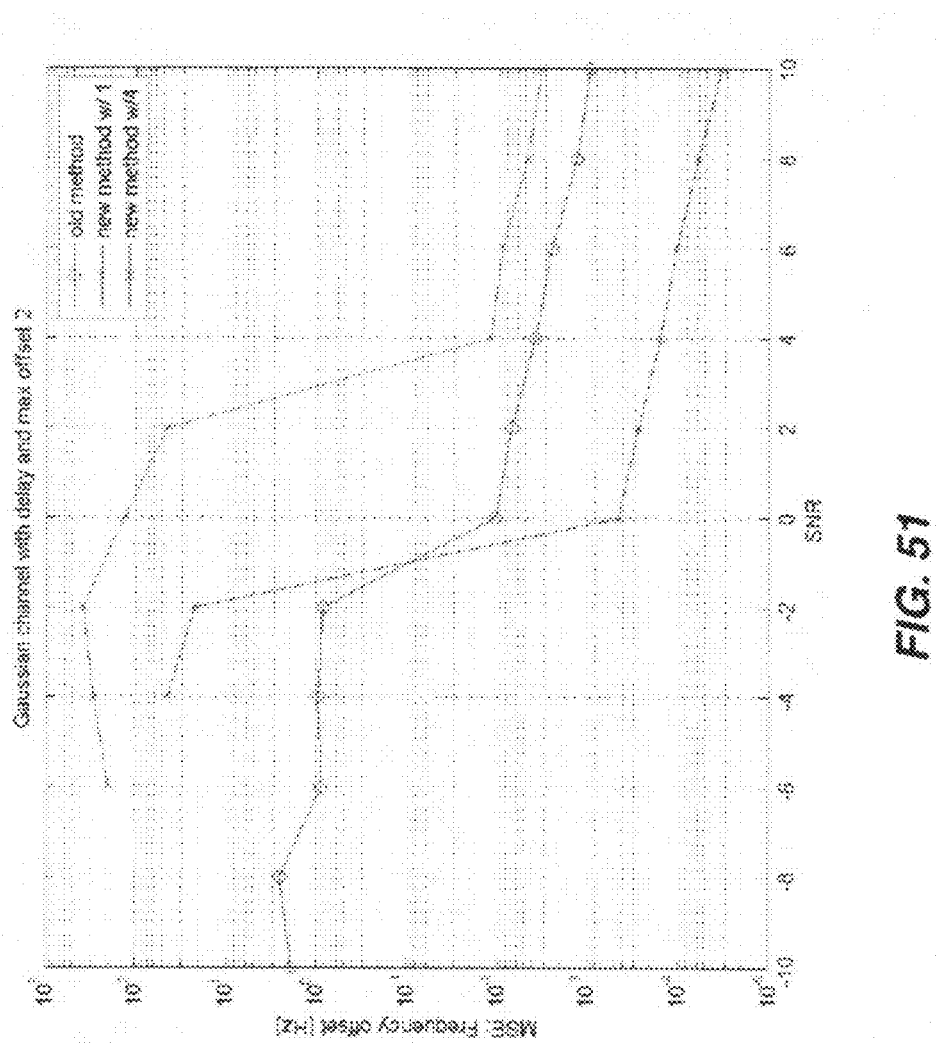
FIG. 51 illustrates a simulation with a small frequency offset of $f_{max}$=2 Hz and no integer offset correction.

A simulation with a small frequency offset of $f_{max}=2$ Hz and no integer offset correction is illustrated in FIG. 51. It can be seen from this performance comparison that performance with $N_t/M_t=1$ is slightly degraded from the original estimator, though still substantially reduces overhead. Performance with $N_t/M_t=4$ is much better, almost 10 dB. All the curves experience a knee at low SNR points due to errors in the integer offset estimation. A small error in the integer offset can create a large frequency error and thus a large mean squared error. Integer offset correction can be turned off in small offsets to improve performance.

Figure 52:
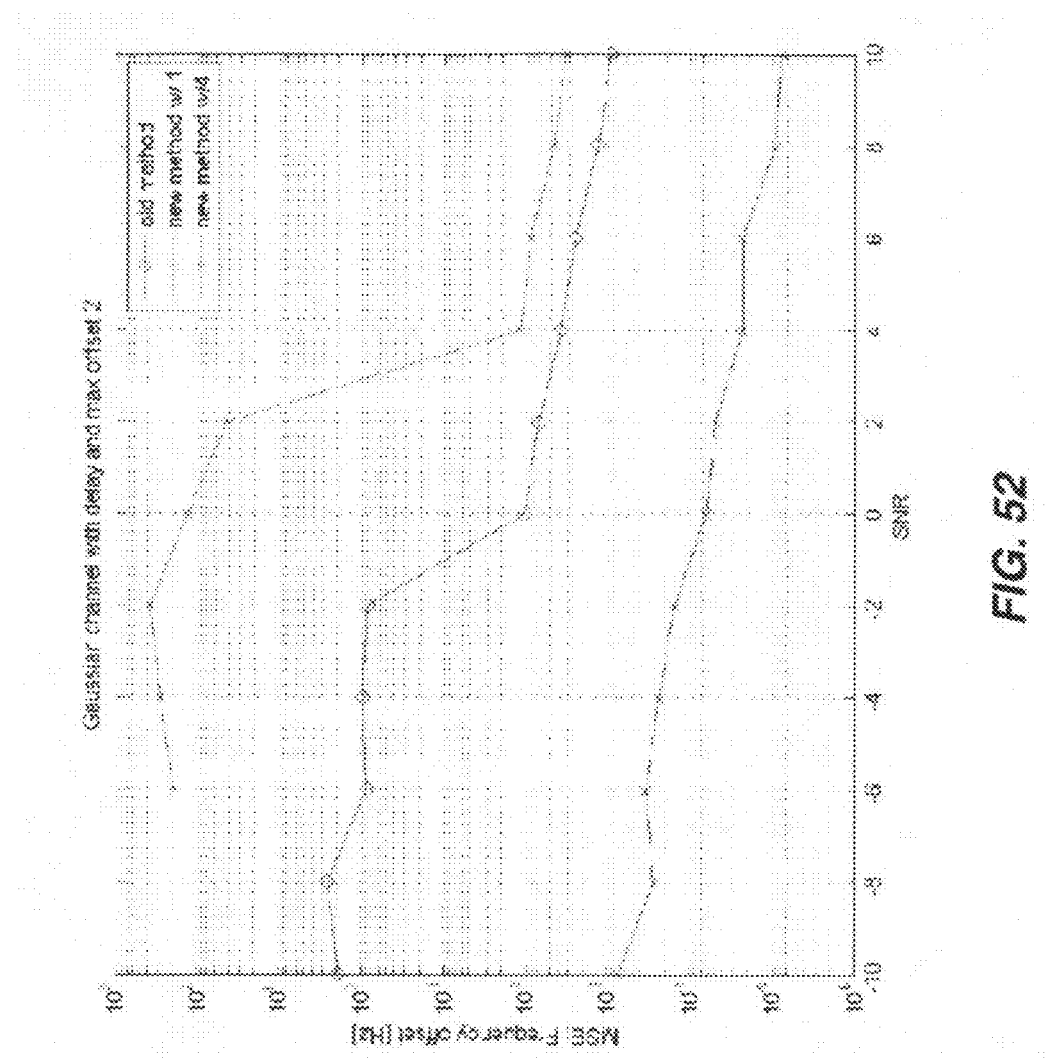
FIG. 52 illustrates results when turning off the integer offset estimator.

In the presence of multipath channels, the performance of frequency offset estimators generally degrades. Turning off the integer offset estimator, however, reveals quite good performance in FIG. 52. Thus, in multipath channels it is even more important to perform a robust coarse correction followed by an improved fine correction algorithm. Notice that the offset performance with $N_t/M_t=4$ is much better in the multipath case.

Adaptive DIDO Transmission Scheme

New systems and methods for adaptive DIDO systems are described below. These systems and methods are extensions to the patent applications entitled "System and Method for Distributed Input-Distributed Output Wireless Communications," Ser. Nos. 11/894,394, 11/894,362, and 11/894,540, filed Aug. 20, 2007, of which the present application is a continuation-in-part. The content of these applications has been described above. The adaptive DIDO system and method described in the foregoing applications were designed to exploit instantaneous and/or statistical channel quality information. Described below are additional techniques to enable adaptation between different DIDO modes assuming instantaneous channel knowledge.

The following prior art references will be discussed below within the context of the embodiments of the invention. Each reference will be identified by its corresponding bracketed number:

[1] K. K. Wong, R. D. Murch, and K. B. Letaief, "A joint-channel diagonalization for multiuser MIMO antenna systems," *IEEE Trans. Commun.*, vol. 2, no. 4, pp. 773-786, July 2003.

[2] R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Processing*, vol. 55, no. 3, pp. 1159-1171, March 2007.

[3] R. W. Heath, Jr. and A. J. Paulraj, "Switching Between Diversity and Multiplexing in MIMO Systems," *IEEE Trans. on Communications*, vol. 53, no. 6, pp. 962-968, June 2005.

A fundamental concept associated with link adaptation (LA) is to adaptively adjust system parameters such as modulation order, FEC coding rate and/or transmission schemes to the changing channel conditions to improve throughput or error rate performance. These system parameters are often combined in sets of "transmission modes," referred to herein as DIDO modes. One embodiment of a technique for LA is to measure the channel quality information and predict the best transmission mode based on certain performance criterion. The channel quality consists of statistical channel information, as in slow LA, or (instantaneous) CSI, as in fast LA. One embodiment of the system and method described herein is employed within the context of fast LA systems and the goal is to increase throughput for fixed predefined target error rate.

Figure 21:
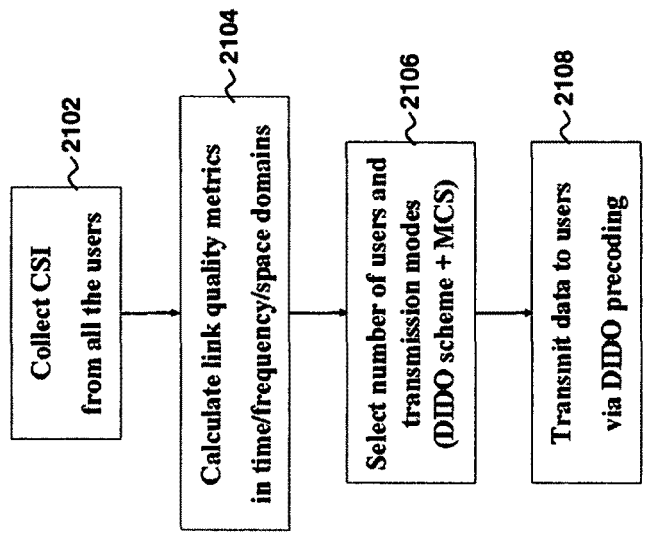
FIG. 21 illustrates one embodiment of a method of adaptive DIDO-OFDM.

One embodiment of a method for adaptive DIDO transmission is depicted in FIG. 21. In frequency division duplex (FDD) systems the proposed adaptive algorithm consists of the following steps: i) the users compute the channel quality indicator (CQI) 2102; ii) the users select the best DIDO mode for transmission 2106 based on the CQI in time/frequency/space domains 2104; iii) the base station selects the active users and transmits data with the selected DIDO modes via DIDO precoding. In time division duplex (TDD) systems, where the uplink/downlink channel reciprocity can be exploited, the base station may compute the CQIs and select the best DIDO modes for all the users. Moreover, to compute the DIDO precoding weights, the channel state information (CSI) can be computed at the users side in FDD systems or at the base station in TDD systems. When the CSI is computed at the users' side and fed back to the base station, the base station can exploit the CSI to compute the CQI for every users to enable the adaptive DIDO algorithm.

We first define an indicator of channel quality that is used to predict the performance of different DIDO modes and select the optimal one for given transmission. One example of channel quality indicator (CQI) is the mutual information (MI) of DIDO systems defined as [1,2]

$$C = \sum_{k=1}^{K} \log_2 \left| I_{N_k} + \frac{\gamma_k}{N_k} \tilde{H}_k^H \tilde{H}_k \right| \quad (1)$$

where K is the number of users, $\tilde{H}_k = H_k T_k$ is the equivalent channel transfer matrix, $H_k$ is the channel matrix for the k-th user, $T_k$ is the DIDO precoding matrix for the k-th user, $\gamma_k$ is the per-user SNR and $N_k$ is the number of parallel data streams sent to user k. We observe that the CQI in (1) depends on the SNR and the channel matrix.

The MI in (1) measures the data rate per unit bandwidth that can be transmitted reliably over the DIDO link (i.e., error-free spectral efficiency). When the spectral efficiency (SE) of given DIDO mode is below the MI in (1) the error rate performance is arbitrarily small, whereas when the SE exceeds (1) the error rate approaches 100%. As an example, we plot the spectral efficiency of three DIDO modes as a function of the MI (1) in FIG. 53. The DIDO modes consist of three constellation orders: 4-QAM, 16-QAM and 64-QAM. For simplicity and without loss of generality we assume no FEC coding. The transmitter of the 2×2 DIDO system employs block-diagonalization precoding scheme [1]. The SE is obtained from the symbol error rate as SE=$\log_2$M*(1−SER), where M is the M-QAM constellation size. We simulate the channel according to the block fading i.i.d. channel model. We generate 1000 channel realizations and for each realization we simulate 500 AWGN samples. The SNR values chosen for this simulation are {0, 10, 20, 30} dB.

Figure 53:
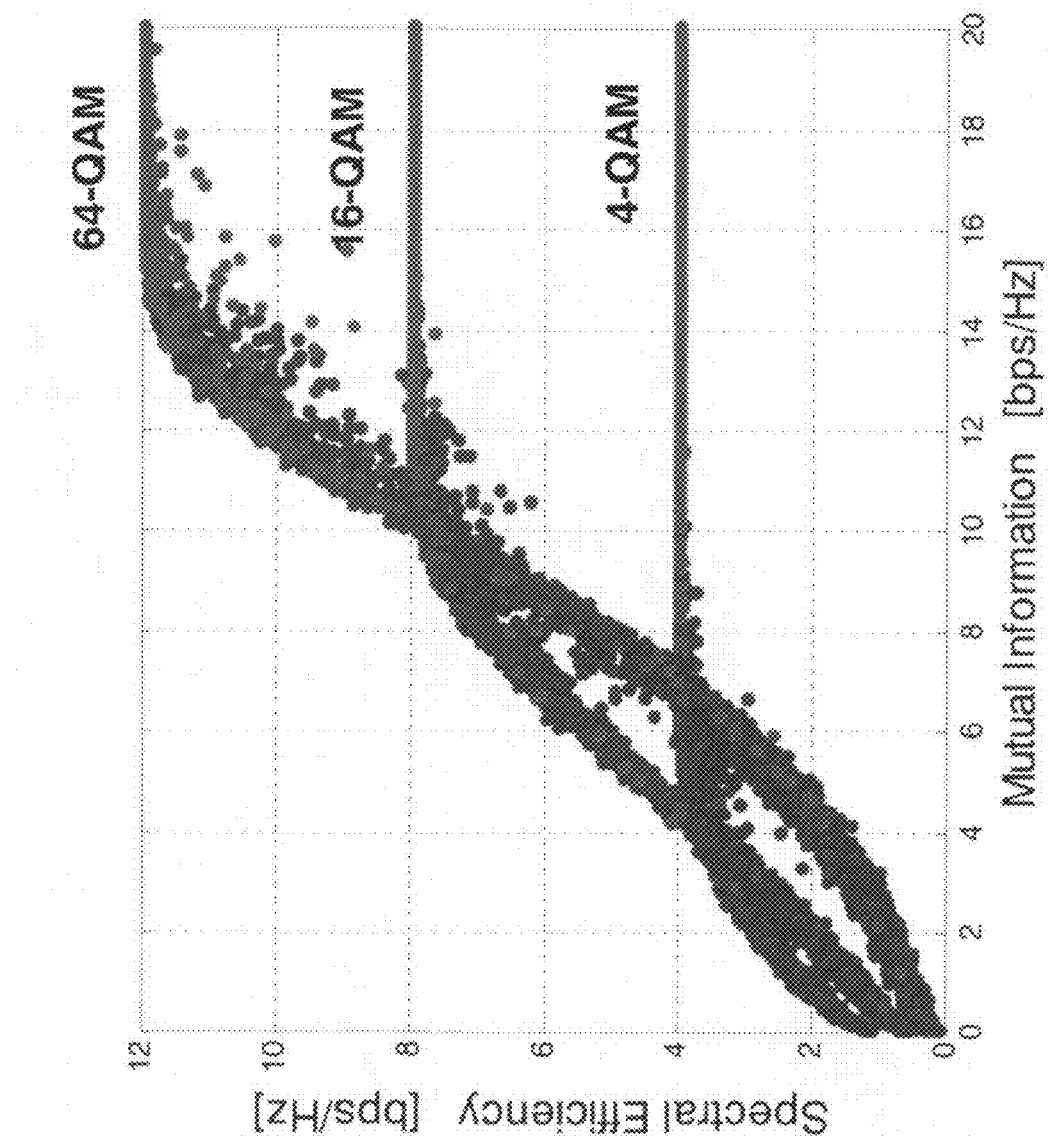
FIG. 53 illustrates downlink spectral efficiency (SE) in [bps/Hz] as a function of mutual information in [bps/Hz].
Figure 54:
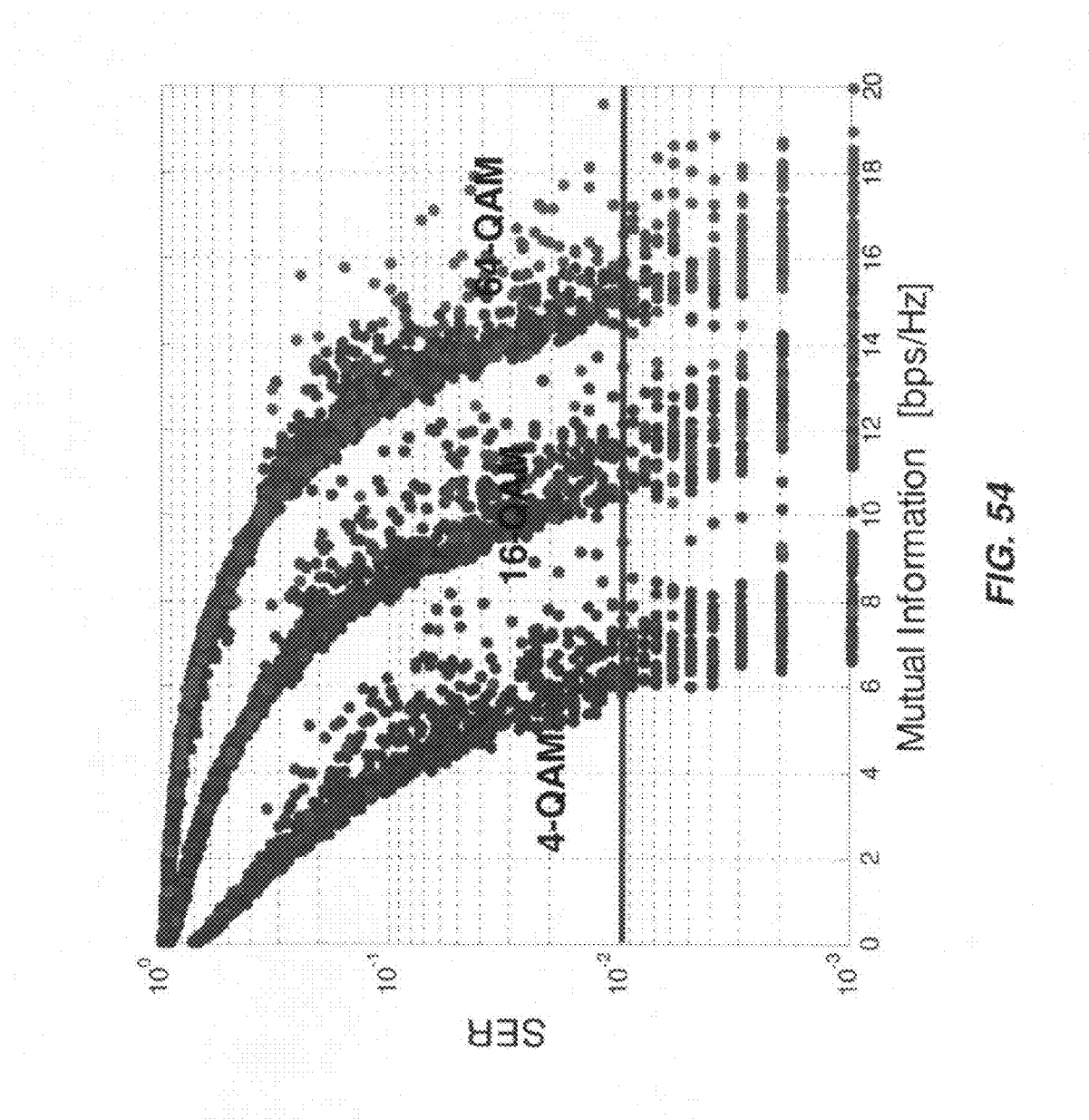
FIG. 54 illustrates average per-user symbol error rare (SER) performance as a function of the mutual information in [bps/Hz].

In FIG. 53, each dot corresponds to one combination of mutual information and SE obtained within each AWGN block. Moreover, different colors are associated to different values of SNR. Similar results are expressed in terms of SER as a function of the MI (1) in FIG. 54. For the case of 4-QAM, we note that when the SE exceeds MI in FIG. 53 the SER is close to 100% in FIG. 54. Unfortunately, there is a large variance in the SER vs. MI plot that prevent the identification of the thresholds used to define the link-quality regions.

Next, we define another CQI to reduce this variance. We first expand (1) as $$C = \sum_{k=1}^{K} \sum_{i=1}^{N_k} \log_2 \left(1 + \frac{\gamma_k}{N_k} |\lambda_{k,i}|^2 \right)$$

where $\lambda_{k,i}$ is the i-th singular value of the matrix $\tilde{H}_k$. We observe that the per-user SER (which is a function of the post-processing SNR) depends on $$\lambda_{min}^k = \min_{i=1,\ldots,N_k} (\lambda_{k,i})$$

and the system SER is upper bounded by the user with the smallest singular value $$\lambda_{min} = \min_{k=1,\ldots,K} (\lambda_{min}^k)$$

among all the users [2]. Then, we define the following CQI $$C_{min} = \min_{k=1,\ldots,K} \left\{ \min_{i=1,\ldots,N_k} \left[ \log_2 \left(1 + \frac{\gamma_k}{N_k} |\lambda_{k,i}|^2 \right) \right] \right\} \quad (2)$$

Figure 55:
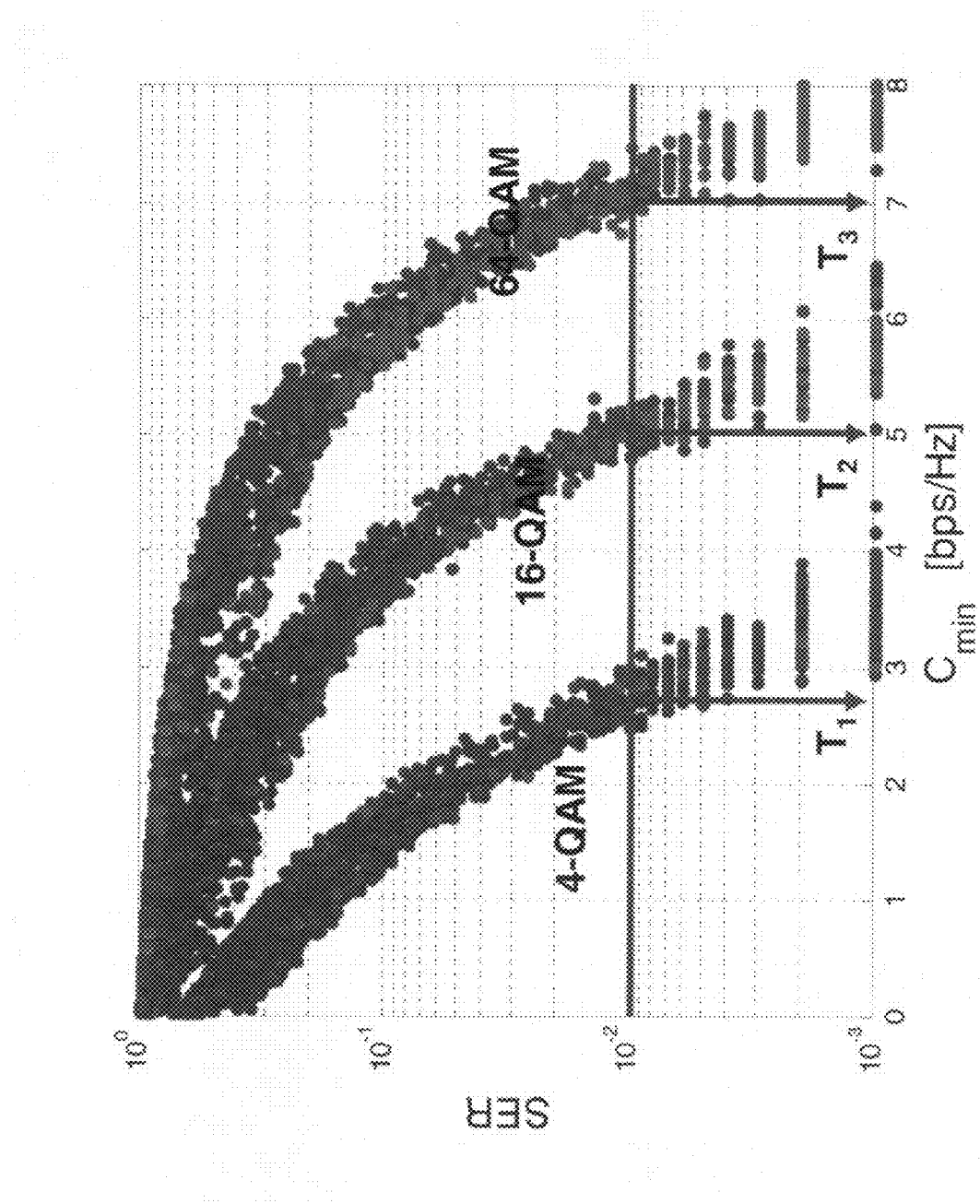
FIG. 55 illustrates average per-user SER performance as a function of the minimum mutual information in [bps/Hz] and the thresholds used to switch between different DIDO modes.

FIG. 55 shows the SER vs. $C_{min}$ for different DIDO modes. We observe the reduced variance compared to FIG. 54. To define the CQI thresholds and link-quality regions, we fix the target SER. For example, if the target SER is 1%, the CQI thresholds are $T_1=2.8$ bps/Hz, $T_2=5$ bps/Hz and $T_3=7$ bps/Hz.

Figure 56:
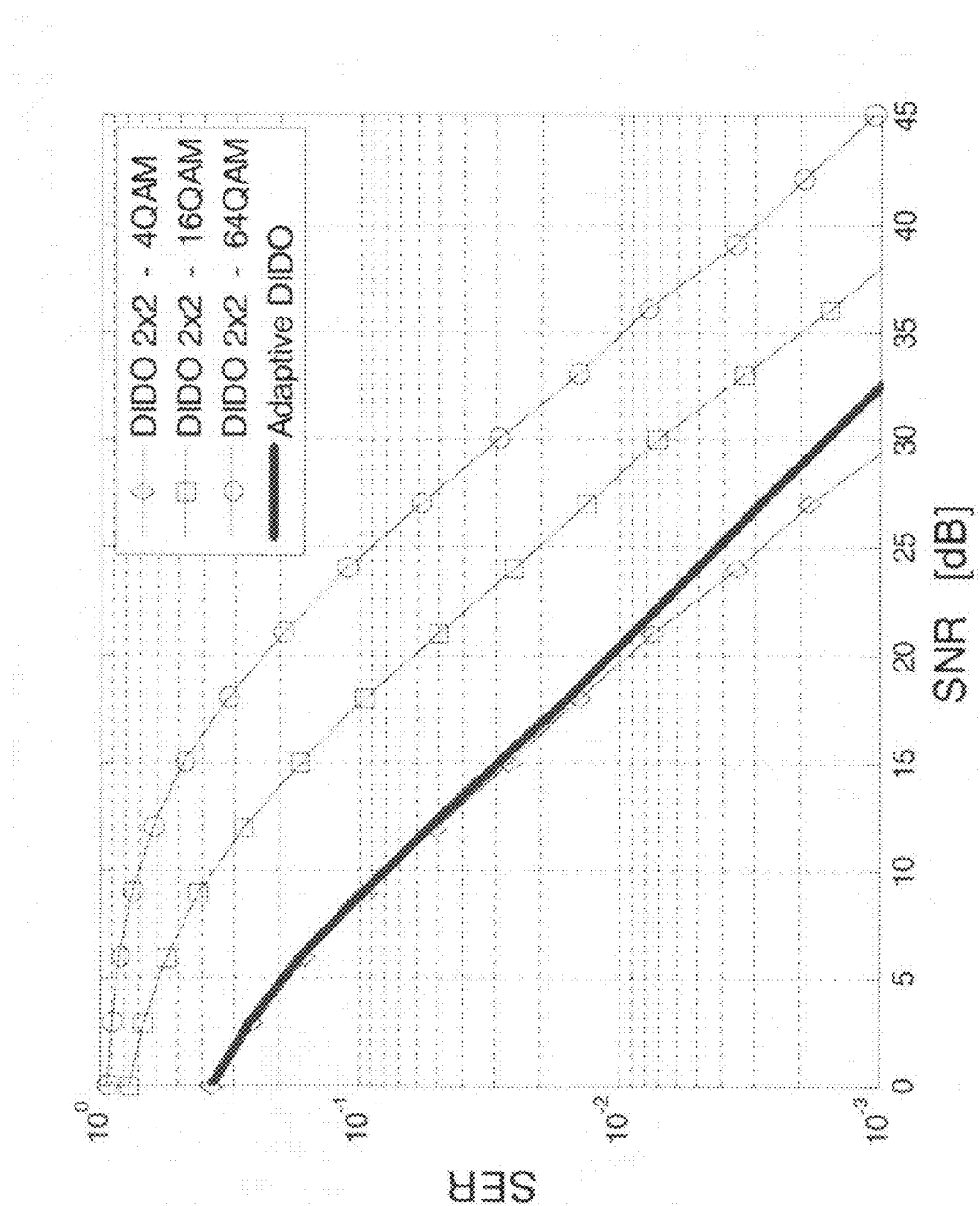
FIG. 56 illustrates average per-user SER vs. SNR for fixed modulation and adaptive DIDO systems.
Figure 57:
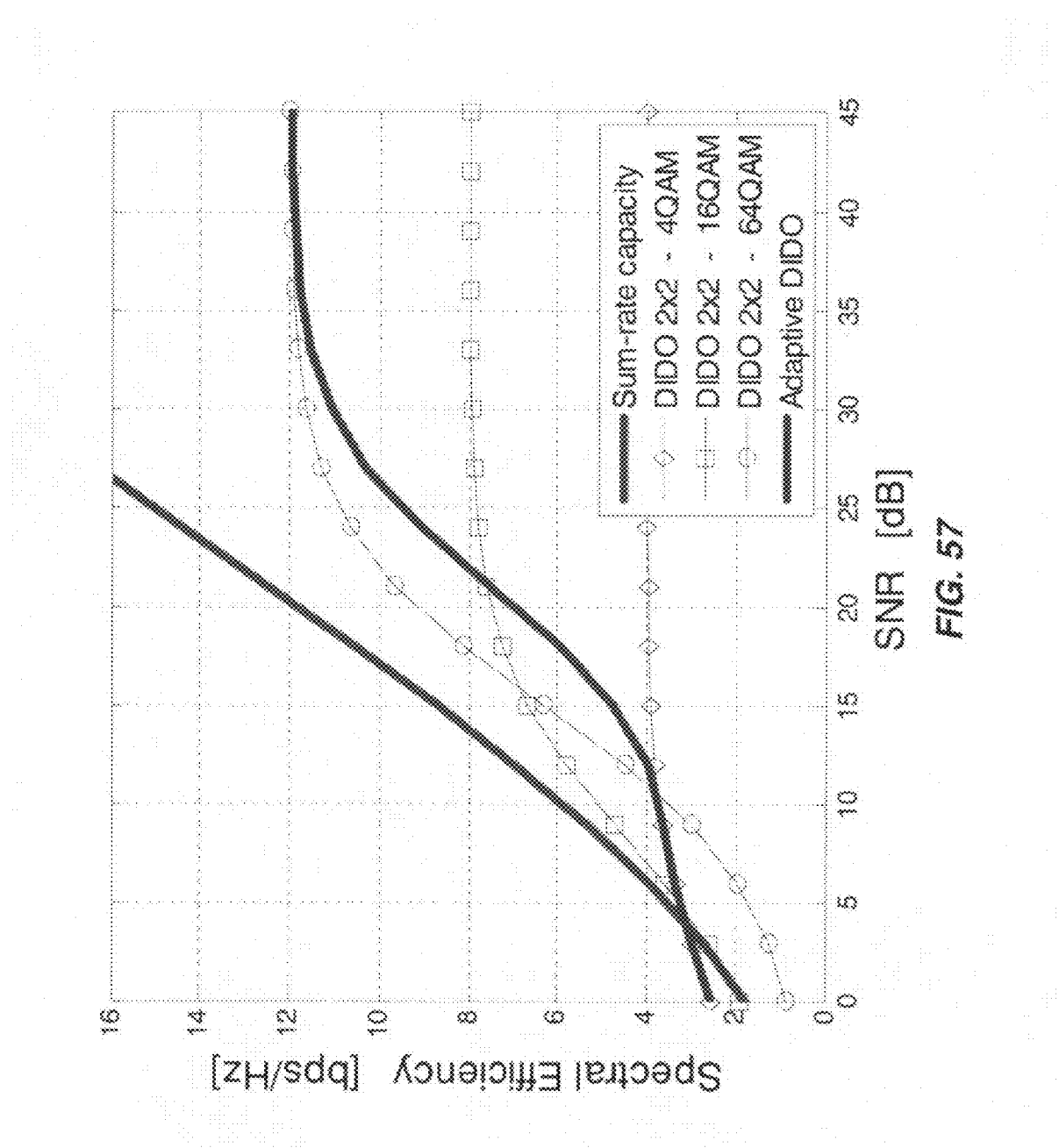
FIG. 57 illustrates downlink SE vs. SNR for fixed modulation and adaptive DIDO systems.
Figure 58:
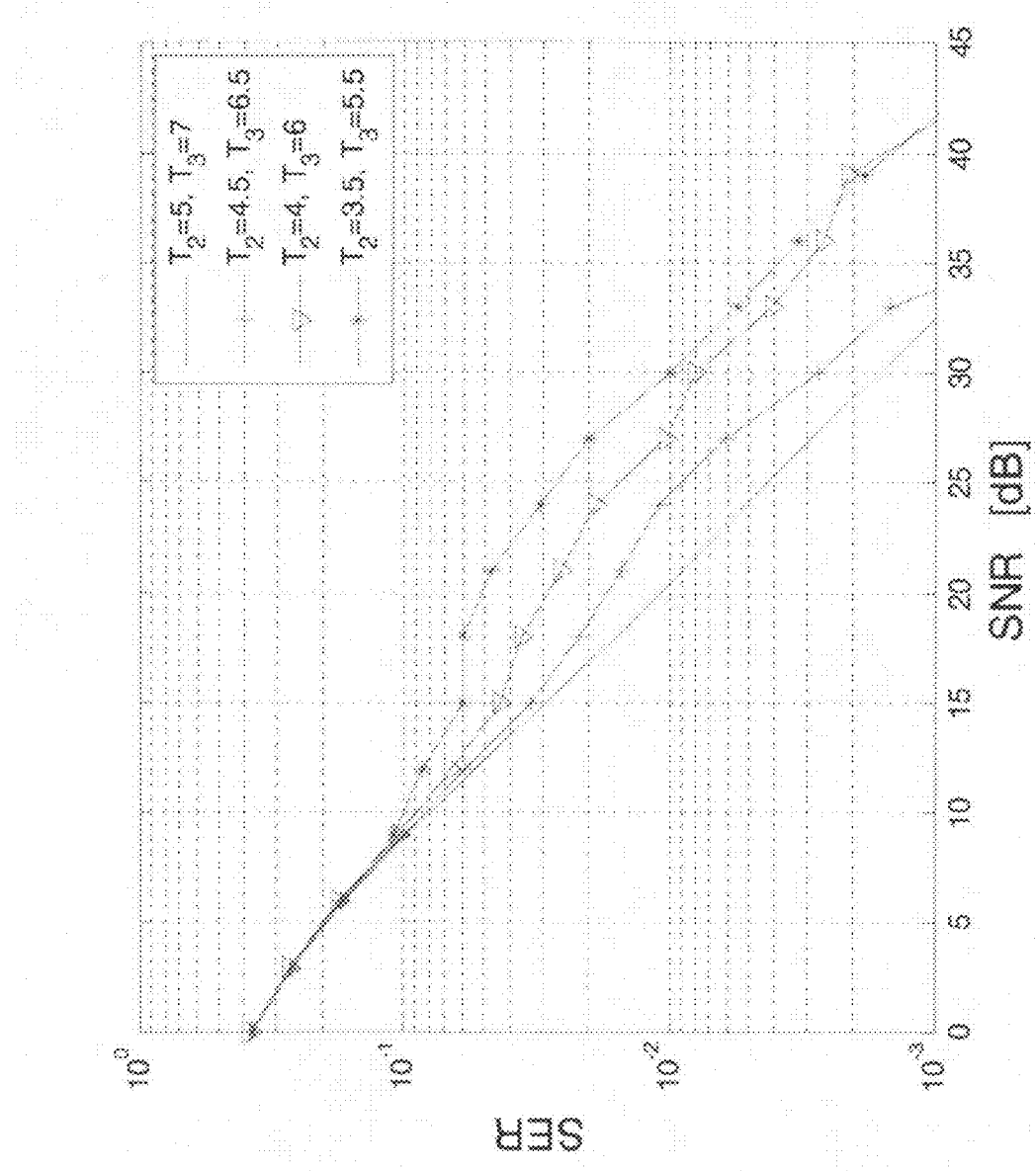
FIG. 58 illustrates average per-user SER vs. SNR for adaptive DIDO systems with different thresholds.
Figure 59:
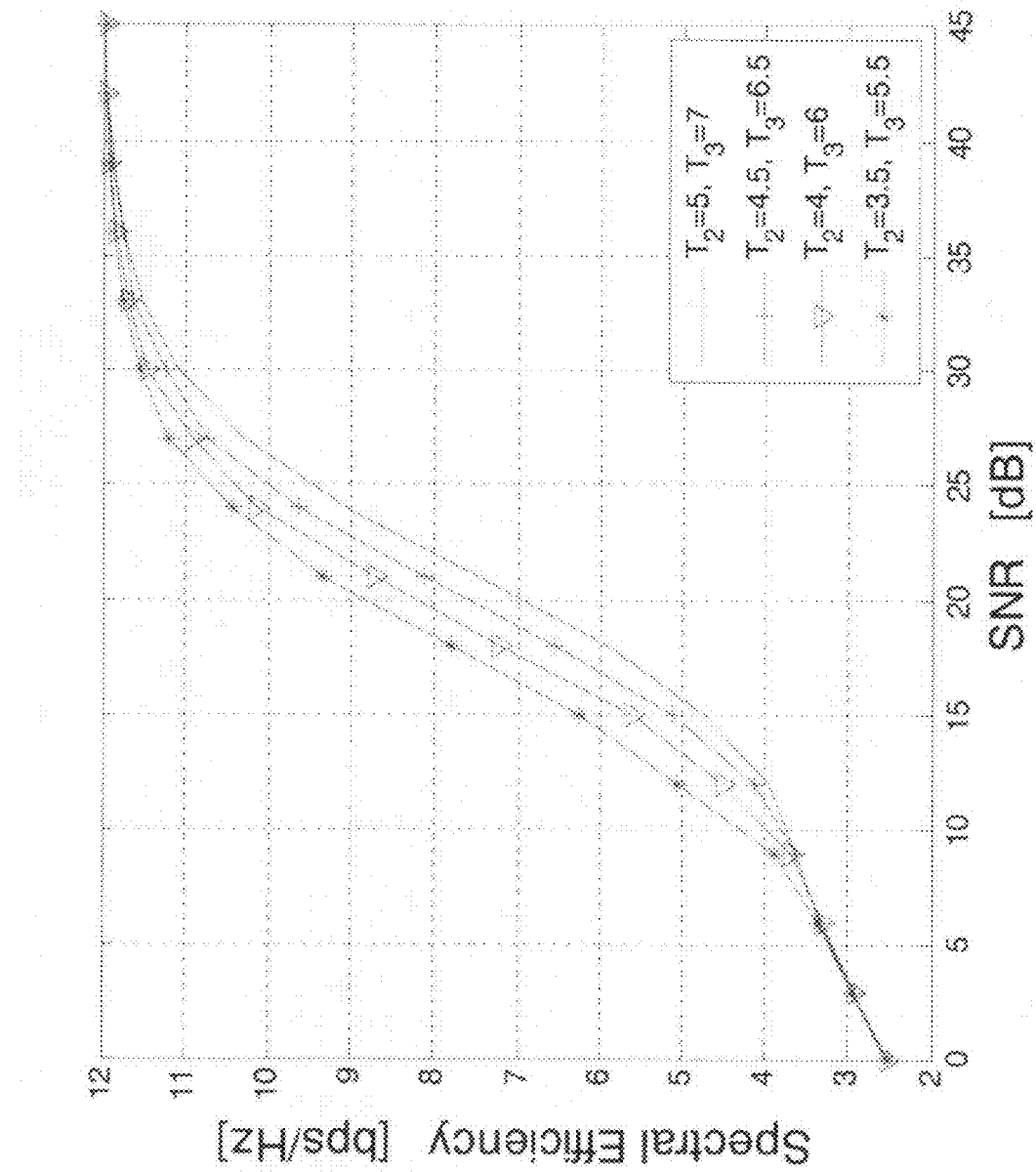
FIG. 59 illustrates downlink SE vs. SNR for adaptive DIDO systems with different thresholds

Finally, we compare the SER and SE performance as a function of SNR for different DIDO modes against the adaptive DIDO algorithm. Results are shown in FIGS. 56 and 57. We observe that the adaptive algorithm maintains the SER below 1% for SNR>20 dB while increasing the SE, approaching the ideal sum-rate capacity. FIGS. 58 and 59 show the performance of the adaptive DIDO algorithm for different values of the CQI thresholds. We observe that by decreasing the CQI thresholds for fixed SNR the SE increases at the expense of larger SER. In one embodiment, the CQI thresholds are adjusted based on the system performance requirements.

The proposed method for fast LA in DIDO systems includes different types of adaptation criteria and CQIs. For example, a similar adaptive DIDO algorithm can be designed to minimize error rate performance for fixed rate transmission, similar to the approach described in [3] for MIMO systems. Moreover, different types of CQIs can be employed such as the minimum singular value of the composite channel matrix as $$\lambda_{min} = \min_{j=1,\ldots,\overline{N}} \{\lambda_j(HH^H)\} \quad (3)$$

where $$\overline{N} = \sum_{k=1}^{K} N_k$$

is the total number of data streams sent to the users and H is the composite channel matrix obtained by stacking the channel matrices of all the users as $$H = \begin{bmatrix} H_1 \\ \vdots \\ H_K \end{bmatrix} \quad (4)$$

Figure 60:
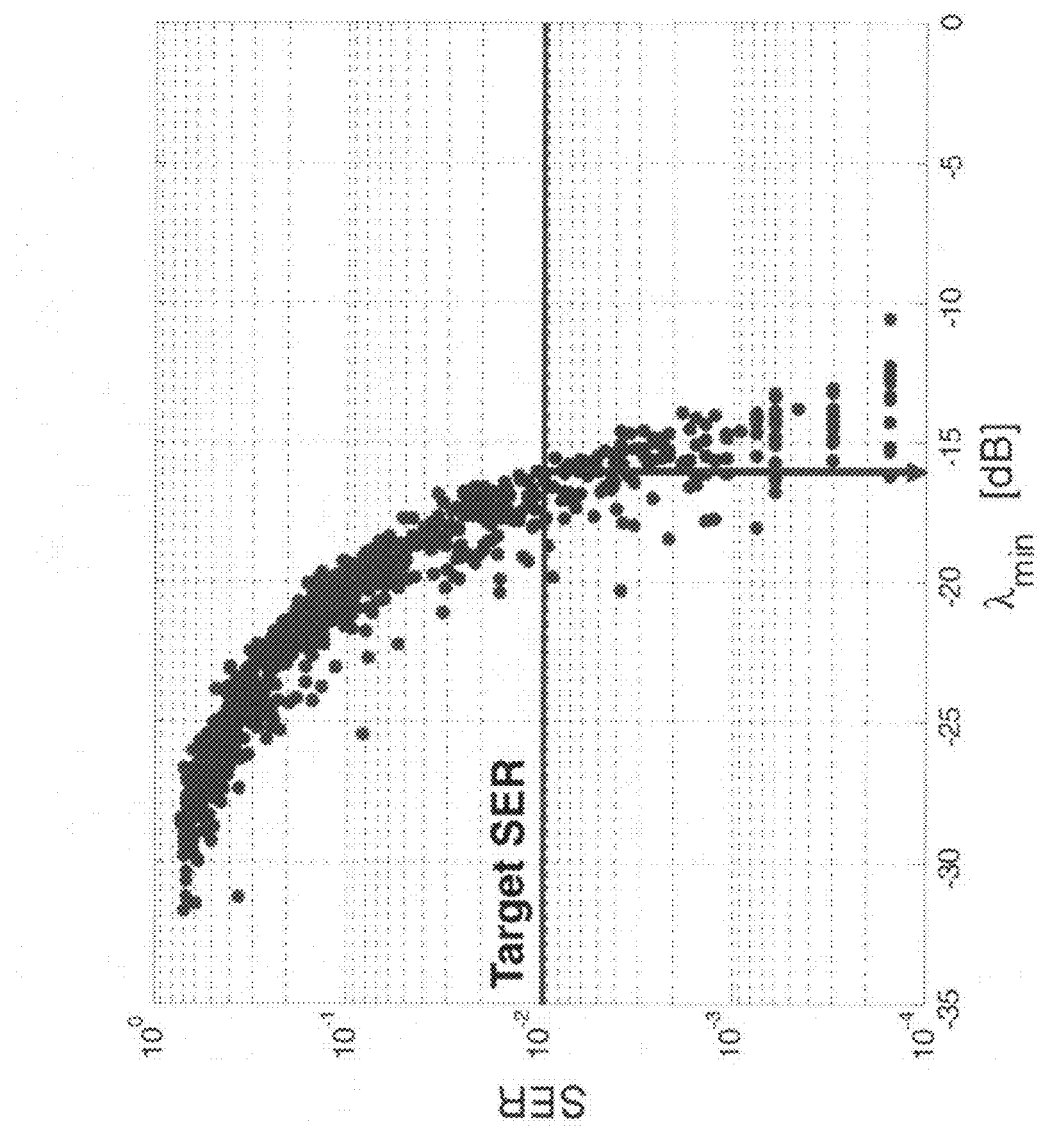
FIG. 60 illustrates average per-user SER performance as a function of the minimum singular value of the effective channel matrix and the CQI threshold for 4-QAM constellation.

FIG. 60 shows the SER expressed as a function of the minimum singular value in (3) for 4-QAM constellation, average SNR=15 dB and single-tap channels. The composite channel matrix in (4) is normalized such that $\|H\|_F^2=1$. We observe that, for 4-QAM constellation, the CQI threshold to guarantee SER<1% is −16 dB. Similar results can be obtained for higher order modulations.

The proposed method can be extended to multicarrier systems, such as orthogonal frequency division multiplexing (OFDM) systems. In multicarrier systems the MI in (1) and (2) is computed for each subcarrier and different MCSs are assigned to different subcarriers, thereby exploiting the frequency selectivity of wireless channels. This method, however, may result in large number of control information to share the CQI or DIDO mode number between transmitters and receivers. An alternative method is to group multiple subcarriers with similar channel quality and compute the average of (1) or (2) over each group of subcarrier. Then, different DIDO modes are assigned to different groups of subcarriers based on the criterion described above.

III. Disclosure from U.S. application Ser. No. 12/630,627

DIDO systems are described in the related application U.S. Pat. No. 7,418,053, where multiple antennas of the same DIDO base station in FIG. 2 work cooperatively to pre-cancel interference and create parallel non-interfering data streams to multiple users. These antennas, with or without local transmitters and/or receivers may be spread across a wide coverage area and be interconnected to the same DIDO base station via wired or wireless links, including networks such as the Internet. For example, as disclosed in related U.S. Pat. No. 7,418,053 in the paragraph starting at column 6, line 31, a single base station may have its antennas located very far apart, potentially resulting in the base station's antenna array occupying several square kilometers. And, for example as disclosed in related U.S. Pat. No. 7,599,420 in the paragraph starting at column 17 line 4, and in paragraphs [0142] of U.S. application Ser. No. 11/894,362 and U.S. application Ser. No. 11/894,540, the separation of antennas from a single DIDO base station may be physically separated by 100s of yards or even miles, potentially providing diversity advantages, and the signals for each antenna installation may either processed locally at each antenna location or brought back to a centralized location for processing. Further, methods for practical deployment of DIDO systems, including addressing practical issues associated with processing signals with widely distributed DIDO antennas, are described in the related applications U.S. Pat. No. 7,599,420, U.S. application Ser. No. 11/894,362 and U.S. application Ser. No. 11/894,540.

Recent publications [32,33] analyzed theoretically the performance of cooperative base stations in the context of cellular systems. In practice, when those cooperative base stations are connected to one another via wireless, wired, or optical network (i.e., wide area network, WAN backbone, router) to share precoded data, control information and/or time/frequency synchronization information as described in U.S. Pat. No. 7,418,053, U.S. Pat. No. 7,599,420, U.S. application Ser. No. 11/894,362 and U.S. application Ser. No. 11/894,540 they function as multiple distributed antennas of a single DIDO base station as shown in FIGS. 2 and 3. In the system in [32,33], however, multiple base stations (or distributed antennas of the same DIDO base station) are constrained by their physical placements derived from cell planning, as in conventional cellular systems.

A significant advantage of DIDO systems over prior art systems is that DIDO systems enable the distribution of multiple cooperative distributed antennas, all using the same frequency at the same time in the same wide coverage area, without significantly restricting the physical placement of the distributed antennas. In contrast to prior art multi-user systems, which avoid interference from multiple base transmitters at a given user receiver, the simultaneous RF waveform transmissions from multiple DIDO distributed antennas deliberately interfere with each other at each user's receiver. The interference is a precisely controlled constructive and destructive interference of RF waveforms incident upon each receiving antenna which, rather than impairing data reception, enhances data reception. It also achieves a valuable goal: it results in multiple simultaneous non-interfering channels to the users via space-time precoding techniques, increasing the aggregate throughput in a given coverage area, increasing the throughput to a given user, and significantly increasing the reliability and predictability of throughput to a given user.

Thus, when using DIDO, multiple distributed antenna RF waveform transmission interference and user channel interference have an inverse relationship: multiple distributed antenna RF waveform interference results in simultaneous non-interfering user channels.

With prior art multi-user systems, multiple base station (and/or ad hoc transceivers) RF waveform transmission interference and user channel interference have a direct relationship: multiple base station (and/or ad hoc transceivers) RF waveform interference results in simultaneous interfering user channels.

So, what DIDO utilizes and relies upon to achieve performance far beyond prior art systems is exactly what is avoided by, and results in impairment of, prior art systems.

And, because the number of non-interfering channels (and aggregate throughput) grows largely proportionately with the number of DIDO distributed antennas (unlike MU-MIMO systems, where the aggregate throughput asymptotically levels off as the number of cluster antennas at a base station is increased), the spectrum utilization of a given coverage area can be scaled as the number of users in an area scales, all without subdividing the coverage area by frequency or sector, and without requiring significant restrictions on the placement of DIDO distributed antennas. This results in enormous efficiencies in spectrum utilization and aggregate user downlink (DL) and uplink (UL) data rates, and enormous placement flexibility for either commercial or consumer base station installation.

In this way, DIDO opens the door to a very large increase in multi-user wireless spectrum efficiency by specifically doing exactly what prior art systems had been meticulously designed to avoid doing.

Figure 61:
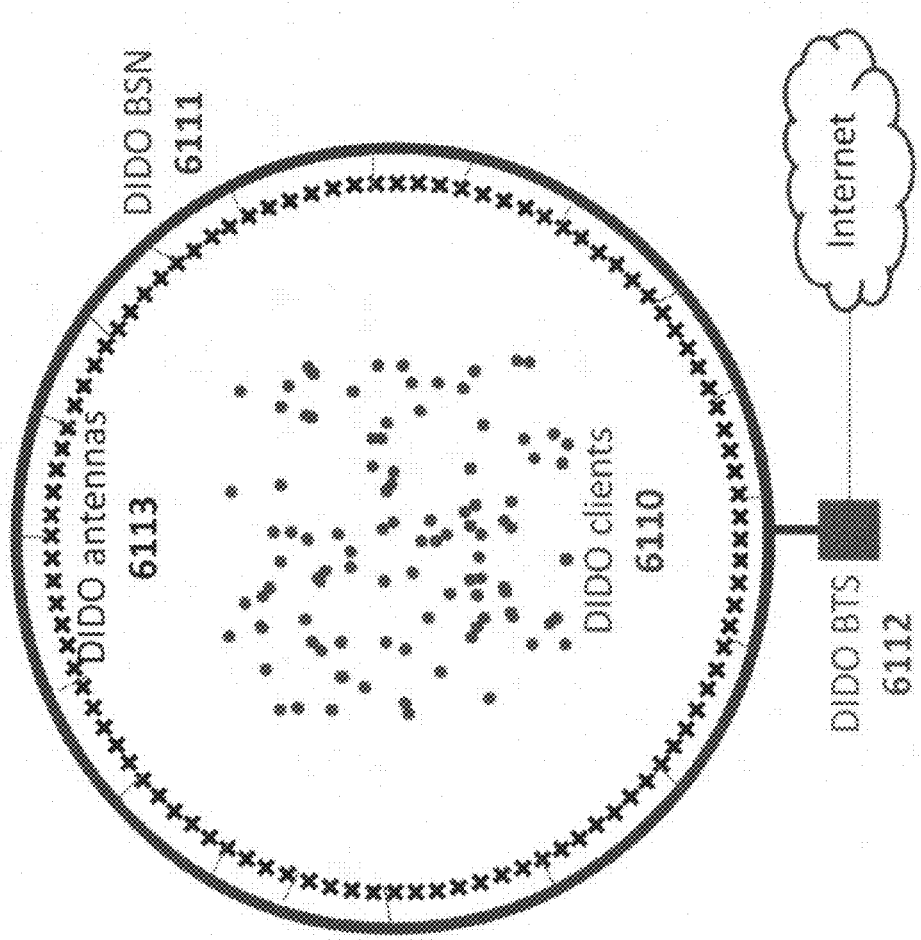
FIG. 61 illustrates one embodiment of a circular topology of base transceiver stations (DIDO antennas)
Figure 62:
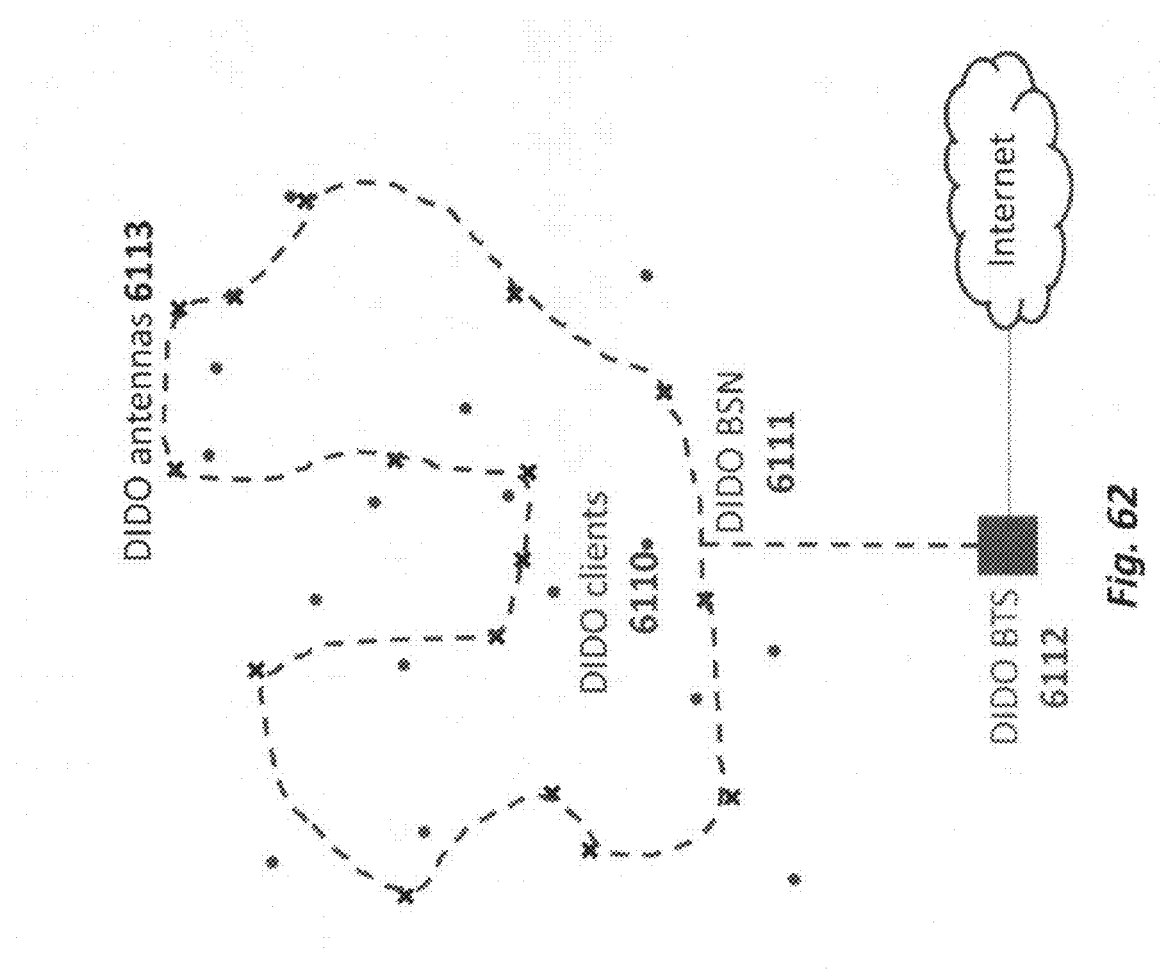
FIG. 62 illustrates an one embodiment of an alternate arrangement of DIDO antennas.

As illustrated in FIGS. 61-62, in one embodiment, DIDO systems consist of:

DIDO Clients 6110: wireless devices that estimate the channel state information (CSI), feedback the CSI to the transmitters and demodulate precoded data. Typically each user would have a DIDO client device.

DIDO Distributed Antennas 6113: wireless devices interconnected via a network that transmit precoded data to all DIDO clients. A wide variety of network types can be used to interconnect the distributed antennas 6113 including, but not limited to, a local area network (LAN), a wire area network (WAN), the Internet, a commercial fiber optic loop, a wireless network, or any combination thereof. In one embodiment, to provide a simultaneous independent channel to each client, the number of DIDO distributed antennas is at least equal to the number of clients that are served via precoding, and thereby avoids sharing channels among clients. More DIDO distributed antennas than clients can be used to improve link reliability via transmit diversity techniques, or can be used in combination with multi-antenna clients to increase data rate and/or improve link reliability. Note that "distributed antenna", as used herein, may not be merely an antenna, but refers to a device capable of transmitting and/or receiving through at least one antenna. For example, the device may incorporate the network interface to the DIDO BTS 6112 (described below) and a transceiver, as well as an antenna attached to the transceiver. The distributed antennas 6113 are the antennas that the DIDO BTS 6112, utilizes to implement the DIDO multi-user system.

DIDO Base Transceiver Station ("BTS" or "base station") 6112: computes the precoding weights based on the CSI obtained from all users in a DIDO system and sends precoded data to the DIDO distributed antennas. The BTS may be connected to the Internet, public switched telephone network (PSTN) or private networks to provide connectivity between users and such networks. For example, upon clients' requests to access web content, the CP fetches data through the Internet and transmits data to the clients via the DIDO distributed antennas.

DIDO Base Station Network (BSN) 6111: One embodiment of DIDO technology enables precisely controlled cooperation among multiple DIDO distributed antennas spread over wide areas and interconnected by a network. In one embodiment, the network used to interconnect the DIDO distributed antennas is a metro fiber optic ring (preferably, with the DIDO distributed antennas connecting to the metro fiber optic ring at locations where it is convenient), characterized by relatively low latency and reasonably high throughput (e.g. throughput to each DIDO antenna comparable to the wireless throughput achievable from that DIDO antenna). The fiber optic ring is used to share control information and precoded data among different stations. Note that many other communication networks can be used instead of a metro fiber optic ring, including fiber optic networks in different topologies other than a ring, fiber-to-the-home (FFTH), Digital Subscriber Lines (DSL), cable modems, wireless links, data over power line, Ethernet, etc. The communication network interconnecting the DIDO distributed antennas may well be made up of a combination of different network technologies. For example, some DIDO distributed antennas may be connected to DSL, some to fiber, some to cable modems, some on Ethernet, etc. The network may be a private network, the Internet, or a combination. Thus, much like prior art consumer and commercial WiFi base stations are connected via a variety of network technologies, as is convenient at each location, so may be the DIDO distributed antennas. Whatever form this network takes, be it a uniform technology, or a variety of technologies, it is referred herein as the Base Station Network or "BSN." In one embodiment of the BSN, there is an approximate 10-30 msec round trip time (RTT) latency between BTS and the DIDO distributed antennas, due to the packet switched nature of existing fiber or DSL networks. The variance of that latency (i.e., jitter) is of the order of milliseconds. If lower latency (i.e., <1 msec) and jitter is required for DIDO systems, the BSN may be designed with dedicated fiber links. Depending on the quality of service offered to different DIDO clients, a combination of low and high latency BSNs can be employed.

Depending on the layout of the network interconnecting the DIDO distributed antennas 6113, one or multiple DIDO BTSs can be used in a given coverage area. We define a DIDO cell as the coverage area served by one DIDO BTS. One embodiment with circular topology is depicted in FIG. 61 (the dots are the DIDO clients 6110, and crosses are the DIDO distributed antennas 6113). In more realistic scenarios the BSN does not have circular shape as in FIG. 61. In fact, the DIDO distributed antennas may be placed randomly within the DIDO cell, wherever connections to the BSN are available and/or conveniently reached, as depicted in FIG. 62. If the coverage area is one city, in one embodiment multiple DIDO cells (associated to multiple DIDO BTSs) can be designed to cover the whole city. In that case, cellular planning is required to allocate different frequency channels to adjacent DIDO cells to avoid inter-cell interference. Alternatively, one DIDO cell can be designed to cover the entire city at the expense of higher computational complexity at the DIDO BTS (e.g., more CSI data from all the users in the same DIDO cell to be processed by the BTS) and larger throughput requirement over the network interconnecting the DIDO distributed antennas.

Figure 63:
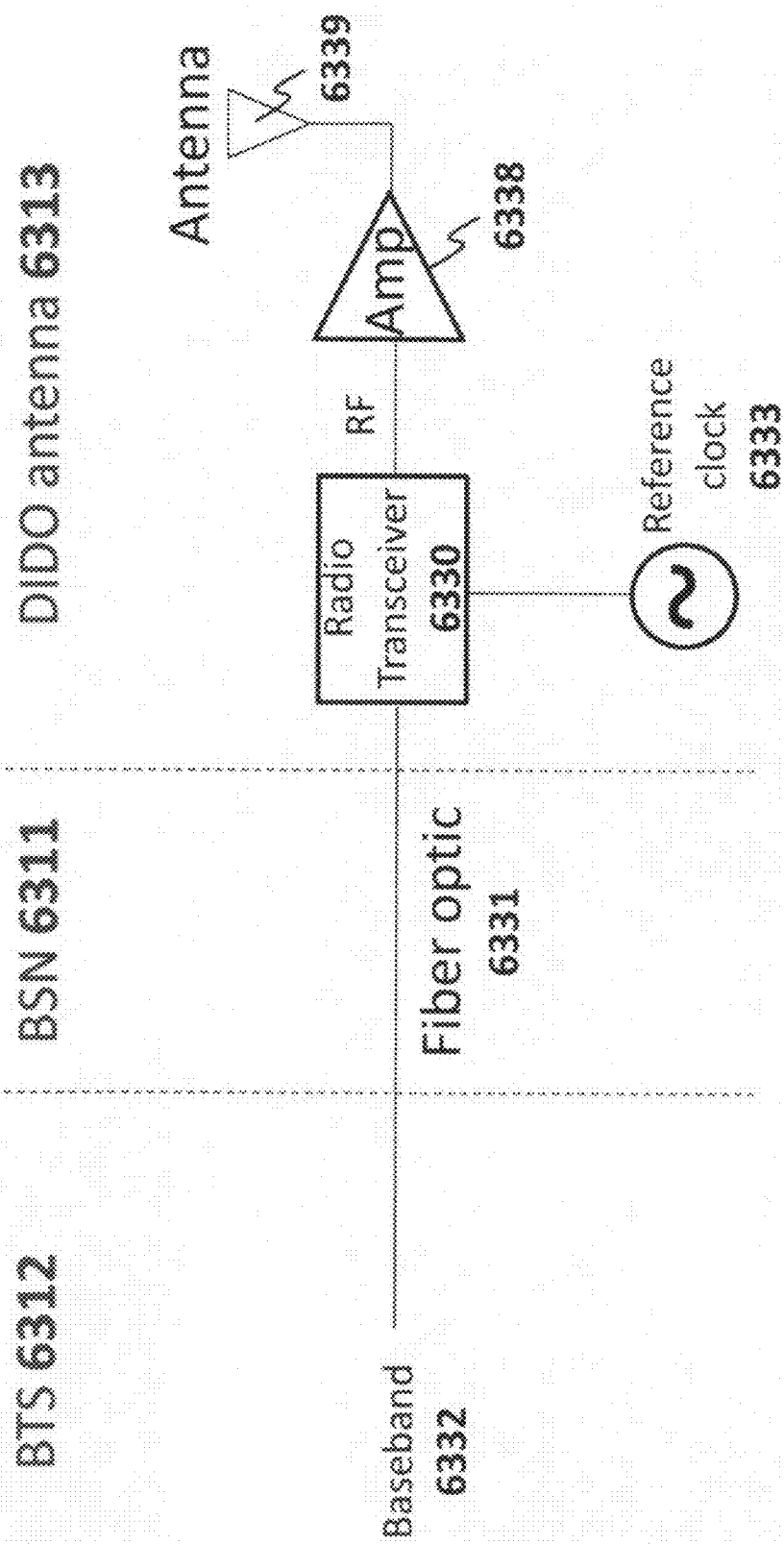
FIG. 63 illustrates one embodiment in which a base station network (BSN) is used to deliver precoded baseband data from the centralized processors (CPs) to DIDO antennas.

In one embodiment of the invention, the BSN 6111 is used to deliver precoded baseband data from the BTS 6112 to the DIDO distributed antennas 6113. As shown in FIG. 63, the DIDO distributed antenna 6313 includes a radio transceiver 6330 equipped with digital-to-analog converter (DAC), analog-to-digital converter (ADC), mixer and coupled to (or including) a power amplifier 6338. Each DIDO distributed antenna receives the baseband precoded data 6332 over the BSN 6311 (such as fiber optic cable 6331) from the BTS 6312, modulates the signal at the carrier frequency and transmits the modulated signal to the clients over the wireless link via antenna 6339. As illustrated in FIG. 63, a reference clock signal is provided to the radio transceiver by a reference clock generator 6333.

Figure 64:
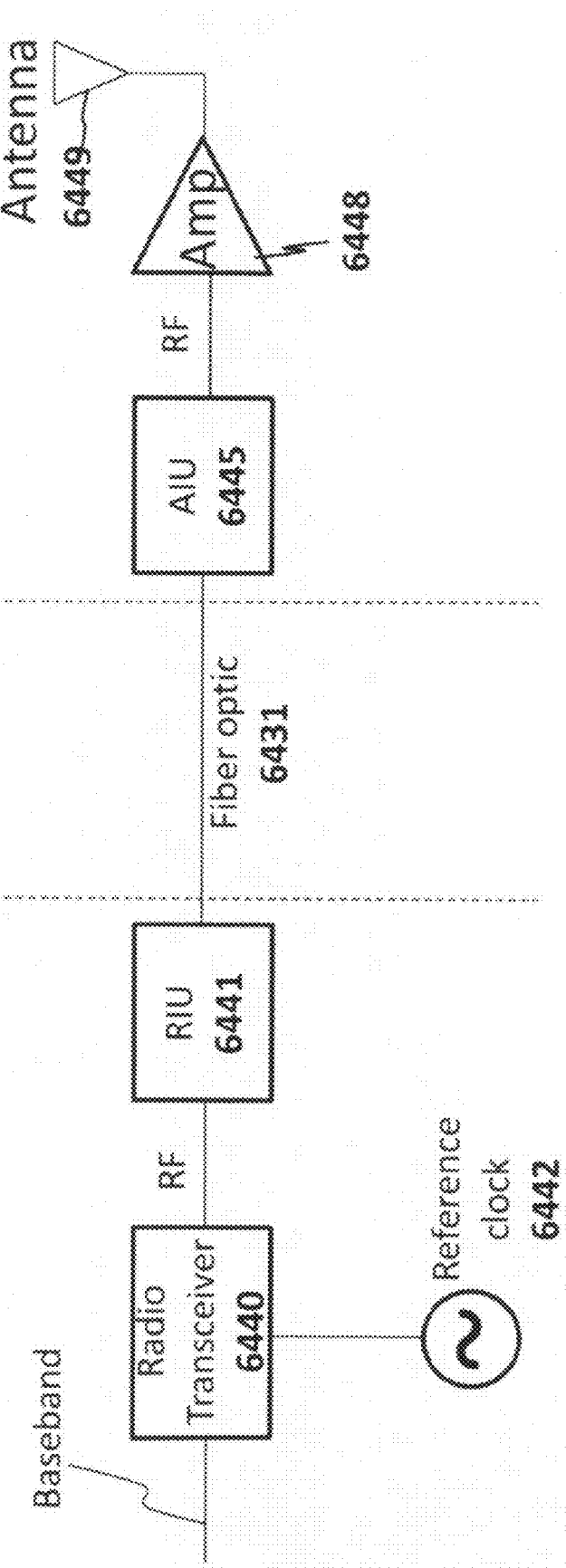
FIG. 64 illustrates one embodiment in which the BSN is used to carry modulated signals.

In another embodiment of the invention, the BSN is used to carry modulated signals as illustrated in FIG. 64, which shows the structure of DIDO systems employing RF-over-fiber. For example, if the BSN is a fiber optic channel 6431 with sufficient bandwidth, a radio frequency (RF) modulated signal is sent over the fiber according to a system such as that described in [17,18]. Multiple radios 6440 (up to as many as the number of DIDO distributed antennas) can be employed at the BTS 6412 to modulate the baseband signals carrying precoded data. The RF modulated signal is converted into optical signal by the radio interface unit (RIU) 6441. One example of an RIU for UHF is the FORAX LOS1 by Syntonics [19]. The optical signal propagates from the BTS to the DIDO distributed antennas 6413 over the BSN 6411. The DIDO distributed antennas are equipped with one amplifier interface unit (AIU) 6445 that converts the optical signal to RF. The RF signal is amplified by amplifier 6448 and sent through the antenna 6449 over the wireless link. An advantage of DIDO with RF-over-fiber solution is significant reduction in complexity and cost of the DIDO distributed antennas. In fact, the DIDO distributed antenna consists only of one AIU 6445, power amplifier 6448 and antenna 6449. Moreover, if the fiber propagation delay is known and fixed, all the radios at the BTS can be locked to the same reference clock 6442 as in FIG. 64, with an appropriate delay to compensate for the propagation delay, and no time/frequency synchronization is required at the DIDO distributed antenna, thereby simplifying further the complexity of DIDO systems.

In another embodiment, existing cellular towers with antennas, transceivers, and backhaul connectivity are reconfigured such that the backhauls are connected to a DIDO BTS 6112. The backhaul connectivity becomes functionally equivalent to the BSN 6111. Then, as described previously, the cellular transceivers and antennas become functionally equivalent to the DIDO distributed antennas 6113. Depending on the transceivers and antennas installed in existing cellular phone towers, they may need to be reconfigured or replaced, so as to be able to operate in a DIDO configuration. For example, the transmitters may have been configured to transmit at a low power level so as to not cause interference with a nearby cell using the same frequency. With DIDO, there is no need to mitigate such waveform interference, and indeed, such waveform interference increases the spectrum utilization of the coverage area beyond that achievable in a prior art cellular configuration.

In another embodiment, existing cellular towers are partially used for DIDO, as described in the preceding paragraph, and partially used as conventional cellular towers, so as to support compatibility with existing cellular devices. Such a combined system can be implemented in a number of different ways. In one embodiment, TDMA is used to alternate between DIDO use and conventional cellular use. So, at any given time, the cellular towers are used for only DIDO or for conventional cellular communications.

Some key features and benefits of DIDO systems, compared to typical multi-user wireless systems, including cellular systems employing MU-MIMO techniques, are:

Large spatial diversity: Because DIDO distributed antennas can be located anywhere within a coverage area, and work cooperatively without channel interference, this results in larger transmit antenna spacing and multipath angular spread. Thus, far more antennas can be used, while still maintaining spatial diversity. Unlike prior art commercial or consumer base stations, DIDO distributed antennas can be placed anywhere there is a reasonably fast Internet (or other network) connection, even if it is only a few feet from the ground, indoor or outdoor. Reduced coverage (e.g., due to lower transmit antenna height or physical obstacles) can be compensated by larger transmit power (e.g., 100 W rather than ~200 mW as in typical cellular systems in urban areas or ~250 mW in typical WiFi access points) because there is no concern (or far less concern than with prior art cellular systems) about higher-powered transmissions interfering with another cell or WiFi access point using the same frequency. Larger spatial diversity translates into a larger number of non-interfering channels that can be created to multiple users. Theoretically (e.g., due to large antenna spacing and angular spread), the number of spatial channels is equal to the number of transmit DIDO stations. That yields an n× improvement in aggregate DL data rate, where n is the number of DIDO stations. For example, whereas prior art cellular system might achieve a maximum of net 3× improvement in aggregate spectrum utilization, a DIDO system might achieve a 10×, 100× or even greater improvement in aggregate spectrum utilization.

Uniform rate distribution: Since the DIDO distributed antennas can be dispersed throughout a wide area, far more users can be characterized by good signal-to-noise ratio (SNR) from one or more DIDO distributed antennas. Then, far more users can experience similar data rates, unlike cellular systems where cell-edge users suffer from poor link-budget and low data rate.

Cost effective: DIDO distributed antennas can be designed as inexpensive devices with single antenna transceivers (similar to WiFi access points). Moreover, they do not require costly real estate or expensive installation as cell towers because of the ability to flexibly locate them within the coverage area.

2. Methods for Implementation and Deployment of DIDO systems

The following describes different embodiments of practical deployment of DIDO systems.

a. Downlink Channel

The general algorithm used in one embodiment to enable DIDO communications over wireless links is described as follows.

CSI Computation: All DIDO clients compute the CSI from all DIDO distributed antenna transmitters based on training sequences received from DIDO distributed antennas as shown in FIG. 4. The CSI is fed back wirelessly from DIDO clients to DIDO distributed antennas 6113 via TDMA or MIMO techniques as described in the related applications and in FIG. 5, and then the DIDO distributed antennas 6113 send the CSI via the DIDO BSN 6111 to the DIDO BTS 6112.

Precoding Computation: the DIDO BTS 6112 computes the precoding weights from the CSI feedback from the entire DIDO cell. Precoded data are sent from the DIDO BTS 6112 to the DIDO distributed antennas in FIG. 6 via the DIDO BSN 6111. One precoded data stream is sent to each of the DIDO distributed antennas.

Precoded Data Transmission: the DIDO distributed antennas transmit precoded data to all clients over the wireless links.

Demodulation: the DIDO clients demodulate the precoded data streams.

In DIDO systems, the feedback loop in FIGS. 19-20 consists of: transmission of the training sequence for channel estimation from DIDO distributed antennas to clients; CSI estimation by clients; CSI feedback from clients via the DIDO distributed antennas through the DIDO BSN 6111 to the DIDO BTS 6112; precoded data transmission from DIDO BTS 6112 through the DIDO BSN 6111 to DIDO distributed antennas to clients. To guarantee the CSI is up-to-date for successful DIDO precoding and data demodulation at the client side, the delay over the feedback loop should be lower than the channel coherence time. The feedback loop delay depends on the BTS computational resources relative to the computational complexity of the DIDO precoding as well as latency over the BSN. Processing at each client and DIDO distributed antenna is typically very limited (i.e., on the order of a microsecond or less with a single DSP or CPU), depending on the hardware and processor speed. Most of the feedback loop delay is due the latency for transmission of precoded data from the DIDO BTS 6112 to the DIDO distributed antennas 6113 over the DIDO BSN 6111 (e.g., on the order of milliseconds).

As discussed above, a low latency or high latency BSN can be used in DIDO systems depending on the available network. In one embodiment, the DIDO BTS 6112 switches among two or more types of BSN network infrastructure based on the each users' channel coherence time. For example, outdoor clients are typically characterized by more severe Doppler effects due to the potential of fast mobility of clients or objects within the channel (i.e., resulting in low channel coherence time). Indoor clients have generally fixed wireless or low mobility links (e.g., high channel coherence time). In one embodiment, DIDO distributed antennas connected to low latency BSN network infrastructure (e.g., dedicated fiber rings) are assigned to outdoor clients, whereas DIDO distributed antennas connected to high latency BSN network infrastructure (e.g., consumer Internet connections such as DSL or cable modems) are assigned to serve indoor clients. To avoid interference among transmissions to the different types of clients, indoor and outdoor clients can be multiplexed via TDMA, FDMA or CDMA schemes.

Moreover, DIDO distributed antennas connected to low latency BSNs can also be used for delay-sensitive algorithms such as those used for client time and frequency synchronization.

We observe that DIDO provides an inherently secure network when more than one DIDO distributed antenna is used to reach a user. In fact, the precoded streams from the BTS to the DIDO distributed antennas consist of linear combinations of data (for different clients) and DIDO precoding weights. Then, the data stream sent from the BTS to the BSN generally cannot be demodulated at the DIDO distributed antenna, since the DIDO distributed antenna is unaware of the precoding weights used by the BTS. Also, the precoding weights change over time as the complex gain of the wireless channels from DIDO distributed antenna-to-client varies (due to Doppler effects), adding an additional level of security. Moreover, the data stream intended to each client can be demodulated only at the client's location, where the precoded signals from all transmit DIDO distributed antennas recombine to provide user interference-free data. At any other location, demodulation of data intended to one particular user is not possible due to high levels of inter-user interference.

b. Uplink Channel

In the uplink (UL) channel, the clients send data (e.g., to request Web content to the DIDO BTS 6112 from the Internet), CSI and control information (e.g., time/frequency synchronization, channel quality information, modulation scheme, etc.). In one embodiment, there are two alternatives for the UL channel that may be used separately or in combination: i) clients communicate directly to the DIDO BTS 6112 via TDMA, FDMA or CDMA schemes; ii) clients communicate to multiple DIDO distributed antennas by creating spatial channels via MIMO techniques as in FIG. 7 (in the MIMO case, however, transmission time synchronization among clients is required).

c. Time and Frequency Synchronization

In one embodiment, the DIDO distributed antennas are synchronized in time and frequency. If RF-over-fiber is employed as in FIG. 64, all radio transceivers at the BTS are locked to the same reference clock 6442, thereby guaranteeing perfect time and frequency synchronization. Assuming negligible jitter over the DIDO BSN 6111, artificial delays can be added to the transmit RF waveforms at the DIDO BTS 6112 side to compensate for propagation delays over the DIDO BSN 6111 to different DIDO distributed antennas.

If the DIDO BSN 6111 is used to carry baseband waveforms as in FIG. 63, time and frequency synchronization is required for the radio transceivers at different DIDO distributed antennas. There are various methods to achieve this synchronization, and more than one method can be used at once.

i. Time and Frequency Synchronization Via GPSDO

In one embodiment time/frequency synchronization is achieved by connecting the transmitter in radio transceiver 6330 to a GPS Disciplined Oscillators (GPSDO). A crystal clock with high frequency stability and low jitter (e.g., Oven-Controlled Crystal Oscillator, OCXO) is used in one embodiment.

ii. Time and Frequency Synchronization Via Power Line Reference

An alternate embodiment utilizes the 60 Hz (in the United States, 50 Hz in other regions) signal available over power lines as a common clock reference for all transmitters. Based on empirical measurements, the jitter of the 60 Hz reference signal (after low pass filtering) can be on the order of 100 nanoseconds. It would be necessary, however, to compensate for deterministic offsets due to variable propagation path length along the power lines at different locations.

iii. Time and Frequency Synchronization with Free-Running Clocks

An alternative embodiment is used to compensate the time and frequency offsets across different DIDO distributed antennas whose clocks are not synchronized to an external clock reference, but rather are free-running as described in the related U.S. Pat. No. 7,599,420 and in FIGS. 45, 46 and 47.

Coarse Time Synchronization: In one embodiment, all DIDO distributed antennas have free-running clocks as illustrated in FIG. 46 that can generate a periodic reference signal (one pulse per second (PPS) in one embodiment). The DIDO BTS 6112 sends an initial trigger signal to all DIDO distributed antennas via the DIDO BSN 6111 to trigger their transmission at the next PPS. The roundtrip time (RU) over the BSN is assumed to be of the order of particular time interval (10 msec in one embodiment, or ~5 ms in each direction), so all DIDO distributed antennas will start transmitting with a relative time offset of at most 1 sec+5 msec. Each DIDO distributed antenna sends one training signal (i.e., Zadoff-Chu sequence or methods for GPS systems in [6]) to all users for initial time offset estimation. Alternatively, only a subset of users (those with highest SNR) can be selected to reduce the complexity of the algorithm. Training signals from different DIDO distributed antennas are orthogonal or sent via TDMA/FDMA to avoid interference. The users estimate the relative time of arrival from every transmitter by correlating the receive signal with the known training sequence. The same training sequence can be sent periodically and the correlation can be averaged over a long period of time (e.g., on the order of minutes in one embodiment) to average-out multipath effects, particularly in the case of mobile users. In one embodiment of the invention, time-reversal techniques [31] can be applied to pre-compensate for multipath effects at the transmitter and obtain precise time of arrival estimates. Then, the users compute the delays (i.e., deterministic time offsets) of each transmitter relative to a given time reference (e.g., one of the DIDO distributed antennas can be chosen as an absolute time reference). The relative time offset is fed back from the clients to the DIDO distributed antennas or directly to the DIDO BTS 6112. Then, each DIDO antenna averages the time offset information obtained from all the users and adjusts its PPS (and clock reference) according to that.

Figure 65:
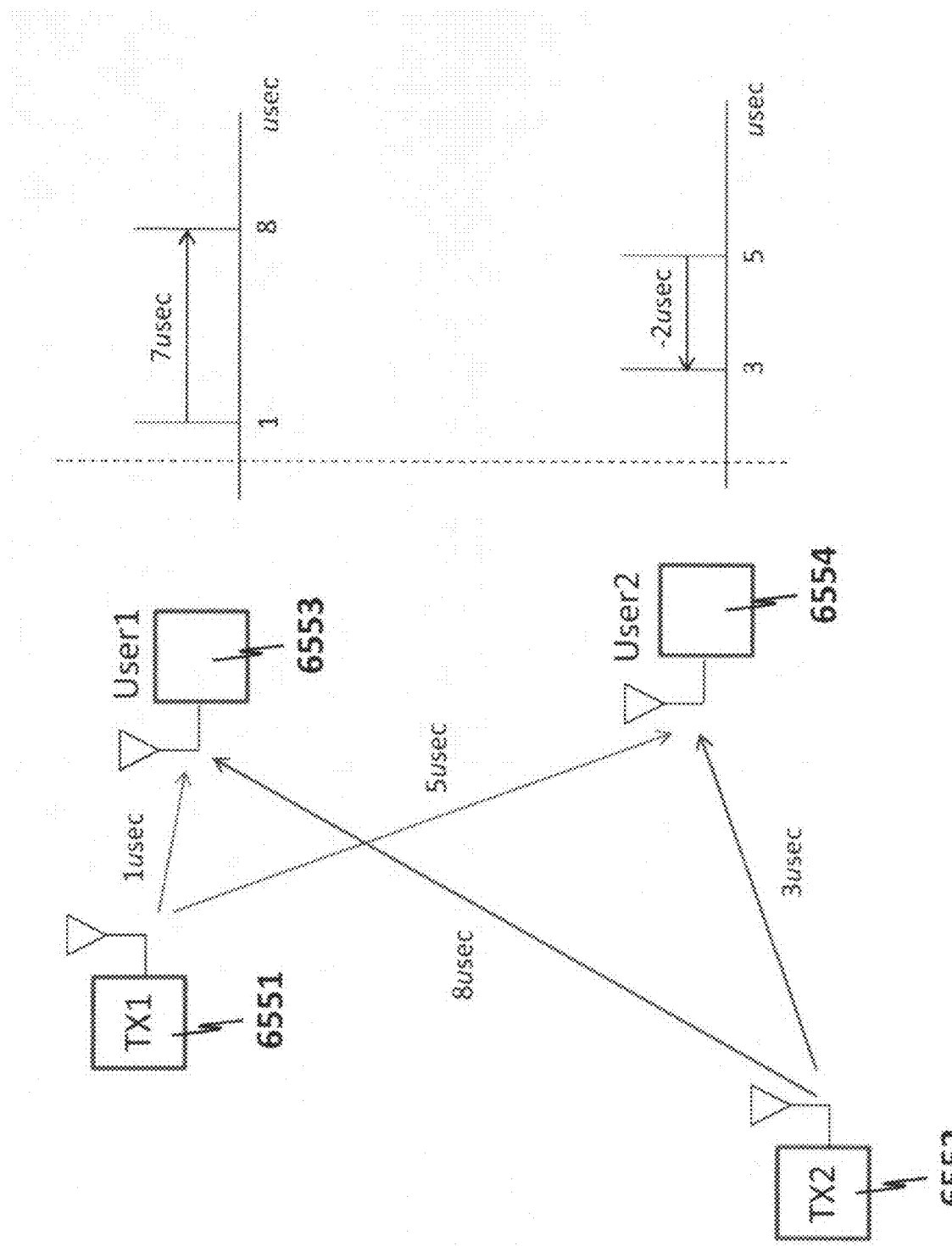
FIG. 65 illustrates one embodiment comprised of two DIDO base stations perfectly synchronized and two users with Line Of Sight (LOS) channels

In one embodiment, the time offset is computed from measurements by many users to average out the difference in propagation delay across users. For example, FIG. 65 shows one case with two DIDO distributed antennas 6551 and 6552 perfectly synchronized (e.g., via GPSDO) and two users 6553 and 6554 with Line Of Sight (LOS) channels. We use TX1 6551 as the absolute time reference. Since we assume the transmitters are perfectly synchronized, the average time offset between users should be zero. However, if we average the offset information only across two users, as in FIG. 65, the average offset of TX2 6552 relative to TX1 6551 would be (7+(−2))/2=2.5 usec. By relying on the Monte Carlo method, we can average out this effect as the number of users increases. It is possible to simulate the bias of this algorithm depending on the TX/RX distribution and channel delay spread.

Fine Time Synchronization: Once the coarse time offset is removed, DIDO distributed antennas can keep running the algorithm periodically to improve the offset estimates. Moreover, the DIDO transmit stations are typically at fixed locations (e.g. transceiver DIDO distributed antennas connected to the DIDO BSN 6111). Hence the algorithm should converge after a period of time. The same algorithm is rerun every time one DIDO distributed antenna changes its location or a new DIDO distributed antenna is added to the DIDO BSN 6111.

Frequency Offset Compensation: once the 1 PPS reference signals at all DIDO distributed antennas are synchronized, the DIDO distributed antennas send training to one or multiple users to estimate the relative frequency offset between stations. Then, the frequency offset compensation method described in the related U.S. Pat. No. 7,599,420 and FIG. 47 is applied to transmit precoded data to all users while compensating for the offset. Note that for the best performance of this algorithm, two conditions need to be satisfied: i) good SNR between all DIDO transmitters and the user (or users) responsible for frequency offset estimation; ii) good clock stability: if the OCXOs at the DIDO distributed antennas are stable, the frequency offset estimation can be carried out only occasionally, thereby reducing the feedback information.

d. Control Channel Via the BSN

In one embodiment, the DIDO BSN 6111 is used for at least the following three purposes:

CSI Feedback: The DIDO clients feedback the CSI wirelessly to the DIDO distributed antennas. If TDMA, FDMA or CDMA schemes are used for feedback, only one DIDO distributed antenna (the one with best SNR to all users) is selected to receive the CSI. If MIMO techniques are employed, all DIDO distributed antennas are used simultaneously to demodulate the CSI from all clients. Then the CSI is fed back from the DIDO distributed antennas to the DIDO BTS 6112 via the DIDO BSN 6111. Alternatively, the CSI can be fed back wirelessly directly from the clients (or the DIDO distributed antennas) to a DIDO BTS 6112 equipped with one antenna via TDMA or CDMA schemes. This second solution has the advantage of avoiding latency caused by the DIDO BSN 6111, but may not be achievable if the wireless link between each of the clients (or the DIDO distributed antennas) and the DIDO BTS 6112 is not of high enough SNR and reliability. To reduce the throughput requirement over the UL channel, the CSI may be quantized or any number of limited feedback algorithms known in the art can be applied [28-30].

Control Information: The DIDO BTS 6112 sends control information to the DIDO distributed antennas via the DIDO BSN 6111. Examples of control information are: transmit power for different DIDO distributed antennas (to enable power control algorithms); active DIDO distributed antenna IDs (to enable antenna selection algorithms); trigger signals for time synchronization and frequency offset values.

Precoded data: the DIDO BTS 6112 sends precoded data to all DIDO distributed antennas via the DIDO BSN 6111. That precoded data is then sent from the DIDO distributed antennas synchronously to all clients over wireless links.

Case Study 1

DIDO in UHF Spectrum a. UHF and Microwave Spectrum Allocation

Different frequency bands are available in the United States as possible candidates for DIDO system deployment: (i) the unused television frequency band between 54-698 MHz (TV Channels 2-51 with 6 MHz channel bandwidth), recommended by the White Spaces Coalition to deliver high speed Internet services; (ii) the 734-746 MHz and 746-756 MHz planned to be used for future developments of LTE systems by AT&T and Verizon, respectively; (iii) the 2.5 GHz band for broadband radio service (BRS), consisting of 67.5 MHz of spectrum split in five channels for future deployment of WiMAX systems.

b. Propagation Channel in UHF Spectrum

We begin by computing the path loss of DIDO systems in urban environments at different frequencies allocated for White Spaces. We use the Hata-Okumura model described in [7], with transmit and receive antenna heights of 1.5 meter (e.g., indoor installation of the DIDO distributed antennas) and 100 W transmit power. To determine the range, we use −90 dBm target receive sensitivity of typical wireless devices. FIG. 66 shows the path loss at 85 MHz and 400 MHz. In one embodiment, the expected range for DIDO systems is between 1 Km and 3 Km depending on the frequency.

Some prior art multi-user systems proposed for White Spaces have similar interference avoidance protocols as WiFi, although at UHF frequencies. We compare DIDO UHF results against the path loss for WiFi systems with 250 mW transmit power. The range for WiFi extends only between 60 meters (indoor) and 200 meters (outdoor). Wider range achievable by DIDO systems is due to larger transmit power and lower carrier frequency (subject to generally lower attenuation from obstacles at UHF frequencies). But, we observe that WiFi systems were deliberately limited in power because large transmit power would create harmful interference to other users using WiFi systems (or other users in the 2.4 GHz ISM spectrum) because only one interfering access point can be transmitting at once, and by extending the range, increasingly more WiFi access points would interfere with one another. Contrarily, in DIDO systems inter-user interference is suppressed by multiple DIDO distributed antennas transmitting precoded data to the clients.

Next, we summarize the parameters that characterize time, frequency and space selectivity in UHF channels.

Figure 67:
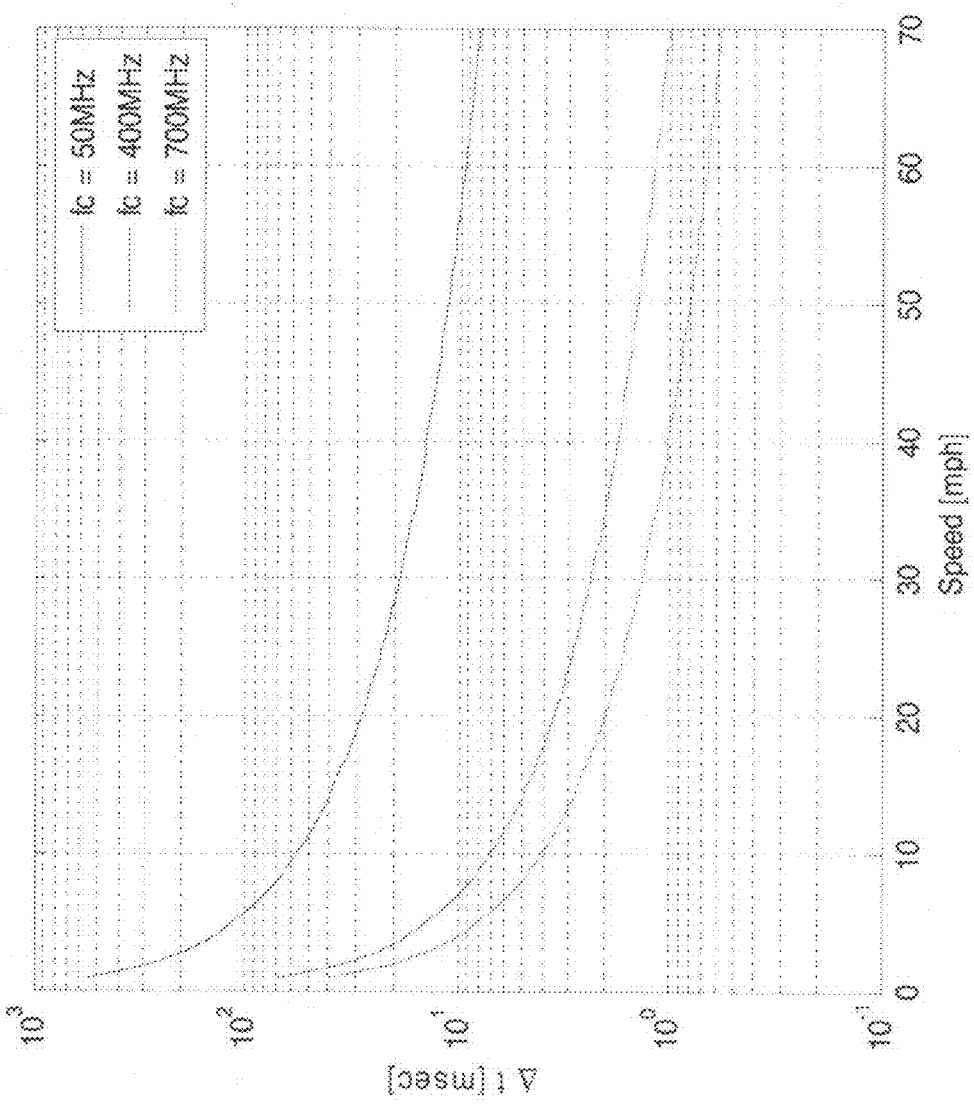
FIG. 67 illustrates the period maximum delay between channel state information and data transmission as a function of the relative velocity between transmitter and receiver for different frequencies in the UHF band.

Time selectivity is caused by relative motion of transmitter and receiver that yields shift in the frequency domain of the received waveform, known as the Doppler effect. We model the Doppler spectrum according to the well known Jakes' model for rich scattering environments (e.g., urban areas), and compute the channel coherence time from the maximum Doppler shift according to [14]. As a rule of thumb, the channel complex gain can be considered constant over a period of time corresponding to one tenth of the channel coherence time ($\Delta t = T_c/10$). FIG. 67 shows the period $\Delta t$ as a function of the relative velocity between transmitter and receiver for different frequencies in the UHF band.

In DIDO systems, $\Delta t$ provides the constraint to the maximum delay that can be tolerated between estimation of the channel state information (CSI) and data transmission via DIDO precoding. For example, if the constraint is $\Delta t = 10$ msec, the maximum speed that can be tolerated by DIDO systems is 4 mph at 700 MHz, 7 mph at 400 MHz, and 57 mph at 50 MHz. If a low latency network is used for the BSN and the DIDO BTS 6112 is in the vicinity of the DIDO distributed antennas (so as to minimize network transit delay), far less than 10 msec RTT can be achieved $\Delta t$. For example, if $\Delta t = 1$ msec, at 400 MHz, DIDO can tolerate approximately highway speeds of 70 Mph.

Frequency selectivity depends on the channel delay spread. Typical values of delay spread for indoor environments are below 300 nsec [8-10]. In urban and suburban areas the delay spread ranges between 1 and 10 usec [11,12]. In rural environments it is typically on the order of 10 to 30 usec [11-13].

Space selectivity depends on the channel angular spread and antenna spacing at transmit/receive side. In urban environments, the channel angular spread is typically large due to rich scattering effects. In rich scattering environments, it was shown that the minimum antenna spacing (either at transmitter or receiver sides) to guarantee good spatial selectivity is about one wavelength [15,16].

In FIG. 68 we summarize the main propagation effects in DIDO systems for three different carrier frequencies. We observe that lower frequencies provide better range and robustness to mobile speed at the expense of larger antenna size and distance between transceivers. A good tradeoff is offered by the 400 MHz band. This band can support pedestrian speed at a ~10 msec limitation to transmit control information from the centralized processor to the DIDO distributed antennas over the Internet, and it can support highway speeds with a ~1 msec limitation.

c. Practical Implementation of DIDO Systems in Uhf Spectrum

Based on the channel parameters and systems constraints described above, we provide one embodiment of DIDO system design in UHF spectrum as follows:

Bandwidth: 5 to 10 MHz, depending on UHF spectrum availability.

Carrier frequency: 400 MHz for best tradeoff between range/Doppler and antenna size/spacing.

Modulation: orthogonal frequency division multiplexing (OFDM) is used to reduce receiver complexity and exploit channel frequency diversity (via interleaving) as in FIG. 11. The cyclic prefix is 10 usec, based upon the maximum delay spread expected in UHF channels, corresponding to 50 channel taps at 5 MHz bandwidth. The OFDM waveform can be designed with 1024 tones, corresponding to ~5% loss in spectral efficiency. The total OFDM symbol length (including cyclic prefix and data) is 215 usec.

Packet Size: is limited by the latency over the DIDO BSN 6111 and Doppler effects. For example, the nominal RTT of one embodiment is 10 msec. Then, the time required to send precoded data from the DIDO BST 6112 to the DIDO distributed antennas is ~5 msec (half RTT). Assuming maximum users' speed of 7 mph at 400 MHz as in FIG. 68, the channel gain can be considered constant for approximately 10 msec. Hence, we use the remaining 5 msec to send data and define the packet size as $(5e\text{-}3/215e\text{-}6) \approx 23$ OFDM symbols. Note that higher users' speeds yield a larger Doppler effect resulting in a lower number of OFDM symbols sent per packet, unless the latency over the DIDO BSN 6111 can be reduced.

CSI Estimation and Precoding: With the system parameters above, training for CSI estimation is sent every 5 msec. The users estimate/feedback the CSI and ~5 msec later they receive 5 msec of precoded data to demodulate.

DIDO Distributed Antenna Placement Within the Coverage Area: Although DIDO distributed antennas can be placed on existing cell towers, as a practical matter, given limited real estate available at existing cell towers, there may be a limited number of antenna locations available. For example, if a maximum of four antennas were placed on each tower this might yield up to 3× increase in data rate as shown in [4] (due to lack of spatial diversity). In this configuration, latency across DIDO transmitters is negligible, since they are all placed on the same tower, but without additional spatial diversity, the gain in spectral utilization will be limited. In one embodiment, the DIDO distributed antennas are placed in random locations throughout the coverage area all connected to the DIDO BSN 6111. Unlike a the coverage area of given cell in a prior art cellular system, which is based on transmission range from the cell tower, the coverage area of a DIDO cell is based instead on the transmission range of each DIDO distributed antenna, which in accordance with the path loss model in one embodiment is approximately 1 Km. Thus, a user within 1 Km of at least one DIDO distributed antenna will receive service, and a user within range of several DIDO distributed antennas will get non-interfering service from the DIDO distributed antennas within range.

Case Study 2

DIDO in NVIS Links

Another application of DIDO technology is in the HF band. The key advantage of HF systems is extended coverage in the 1-30 MHz frequency band due to reflection off of the ionosphere. One example of propagation via the ionosphere is near-vertical incident skywave (NVIS) where signals sent towards the sky with high elevation angles from the horizon bounce off the ionosphere and return back to Earth. NVIS offers unprecedented coverage over conventional terrestrial wireless systems: NVIS links extend between 20 and 300 miles, whereas typical range of terrestrial systems is between 1 and 5 miles.

Hereafter, we present the characteristics of NVIS links based on results obtained from the literature and our experimental data. Then we present a practical implementation of DIDO systems in NVIS links that were described in the related U.S. Pat. No. 7,418,053, U.S. Pat. No. 7,599,420, U.S. application Ser. No. 11/894,362, U.S. application Ser. No. 11/894,394 U.S. application Ser. No. 11/143,503 and U.S. application Ser. No. 11/894,540 and in FIG. 10.

a. HF Spectrum Allocation

Figure 69:
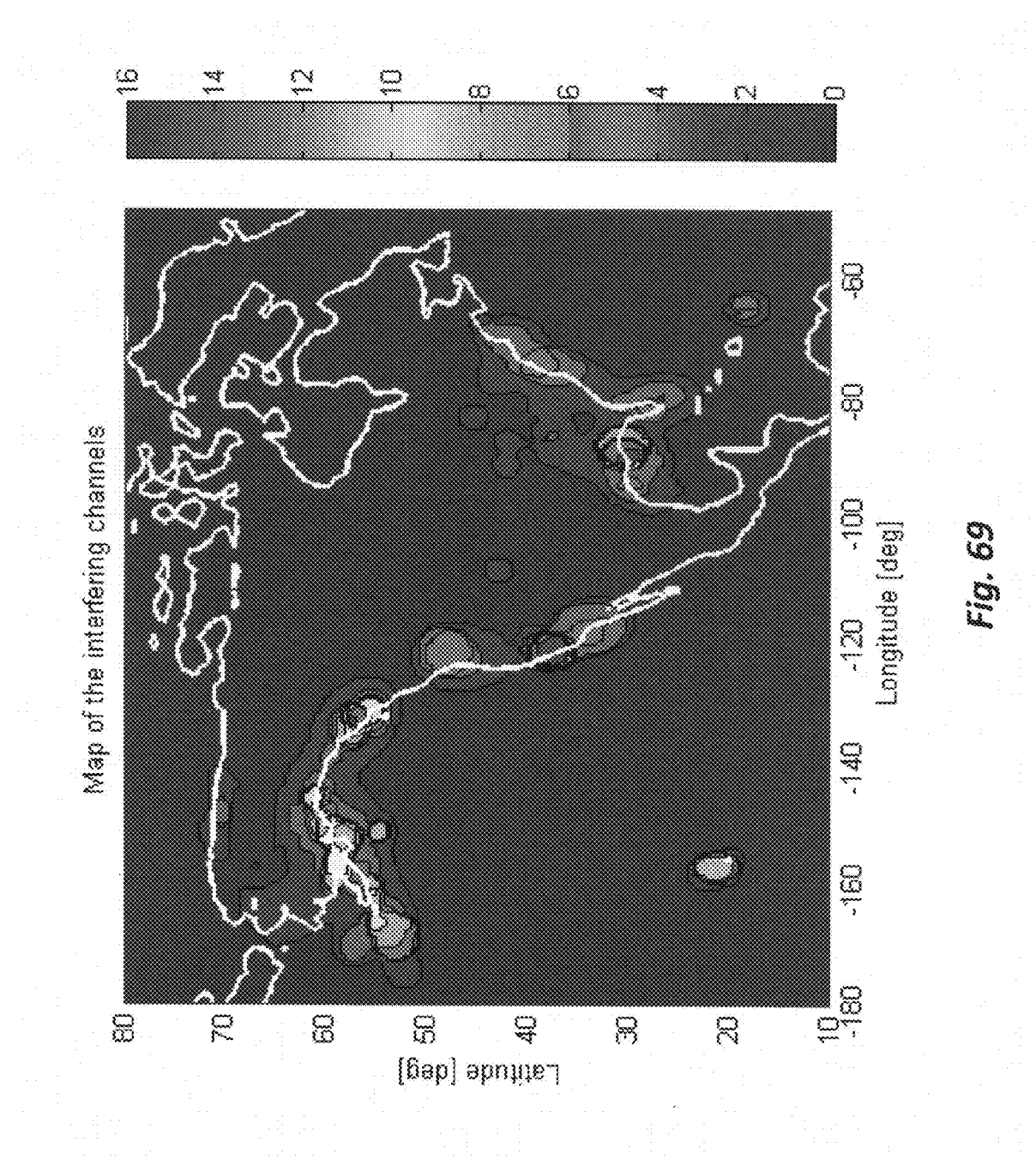
FIG. 69 illustrates the areas in the US territory currently covered by transceiver stations operating in the Maritime band. The colors identify the number of active channels (out of the 146 channels available in the Maritime band) that would cause harmful interference to DIDO-NVIS stations at any location.

The HF band is divided into several subbands dedicated to different types of services. For example, the Maritime band is defined between 4 MHz and 4.438 MHz. According to the Federal Communications Commission (FCC) licensing database (i.e., universal licensing systems, "ULS"), there are 1,070 licenses authorized to operate in this Maritime band. There are 146 channels of 3 KHz bandwidth each, covering 0.438 MHz bandwidth. Most of the transceiver stations operating in the Maritime band are located along the coast of the US territory as depicted in FIG. 69. Hence, DIDO-NVIS distributed antennas operating inland (far away from the coast) would not cause harmful interference to those Maritime stations or vessels at sea. Moreover, along the coast, cognitive radio techniques can be applied to detect channels in use and avoid transmission over DIDO-NVIS links in those channels. For example, if the DIDO-NVIS system is designed to transmit broadband OFDM waveforms (~1 MHz bandwidth), the OFDM tones corresponding to active channels in the Maritime band can be suppressed to avoid interference.

Other portions of the HF spectrum are occupied by the Aeronautical band within [3.3,155] MHz and [3.4,3.5] MHz, and the Amateur radio bands defined in the ranges [1.8,2] MHz, [3.5,4] MHz, [5.3305,5.4035] MHz, [7,7.3] MHz, [10.10,10.15] MHz, [14,14.35] MHz, [18.068,18.168] MHz, [21,21.450] MHz, [24.89,24.99] MHz, [28,29.7] MHz. Our experimental measurements have shown that the Amateur radio band is mostly unutilized, particularly during daytime, allowing DIDO-NVIS links without causing harmful interference. Moreover, similarly to the Maritime band, coexistence of DIDO-NVIS systems with Amateur radio transceivers may be enabled by cognitive radio techniques.

b. NVIS Propagation Channel

We provide an overview of radio wave propagation through the ionosphere. Then we describe path loss, noise and time/frequency/space selectivity in typical NVIS channels.

Figure 70:
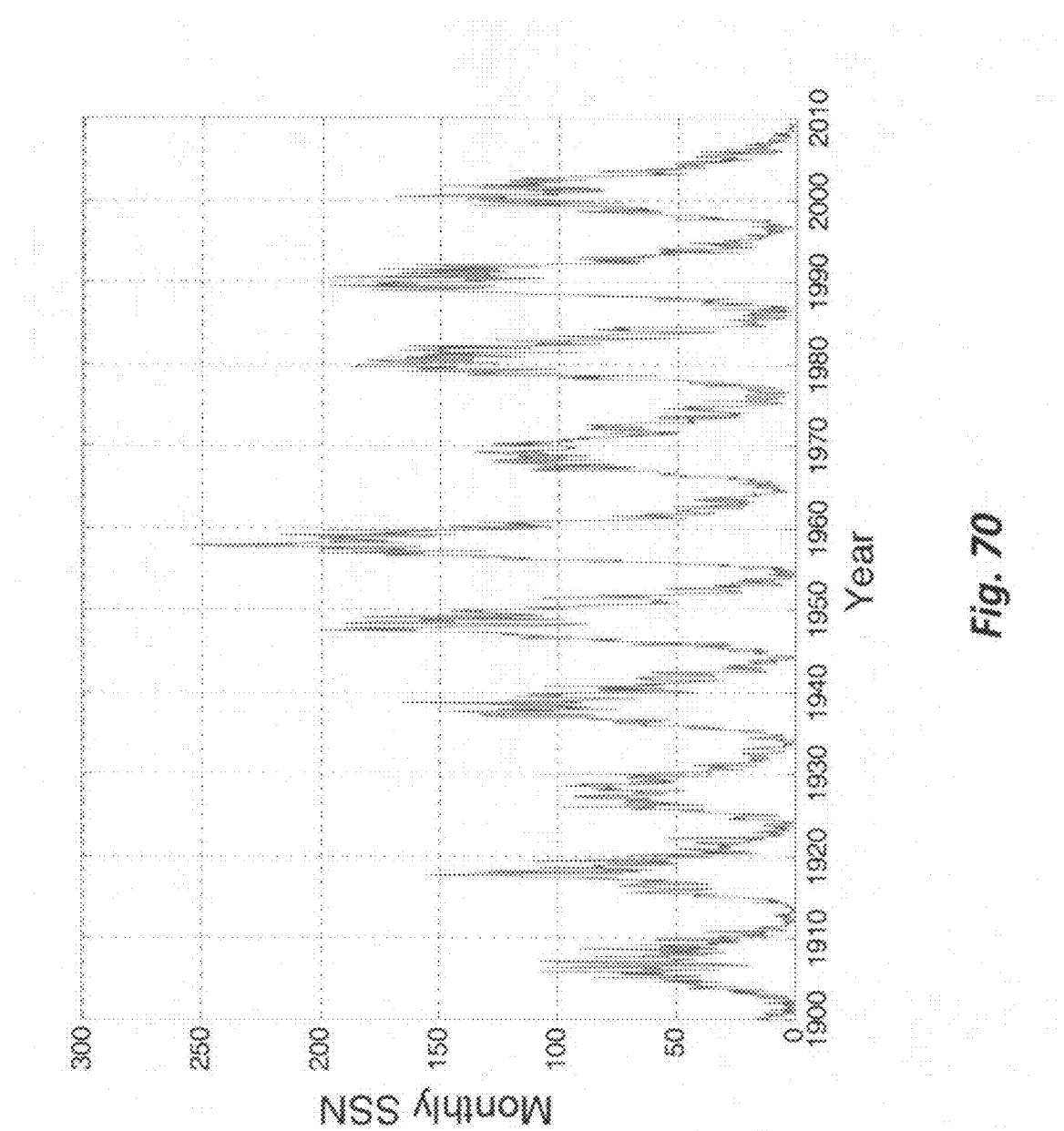
FIG. 70 illustrates sunspot number from the January 1900 throughout June 2009.

The ionosphere consists of ionized gas or plasma. The plasma behaves as an electromagnetic shield for radio waves propagating from Earth upwards that are refracted and reflected back to Earth as in FIG. 10. The stronger the level of ionization, the higher the critical frequency of the plasma and number of reflections in the ionosphere, resulting in improved signal quality over NVIS links. The ionization level depends on the intensity of solar radiations that strike the ionosphere producing plasma. One empirical measure of the solar activity is the sunspot number (SSN) that varies on 11-year cycles as shown in FIG. 70. Hence, the performance of DIDO-NVIS systems is expected to vary throughout every 11-year cycle, yielding highest SNR and largest number of usable HF bands at the peak of the cycle.

Figure 71:
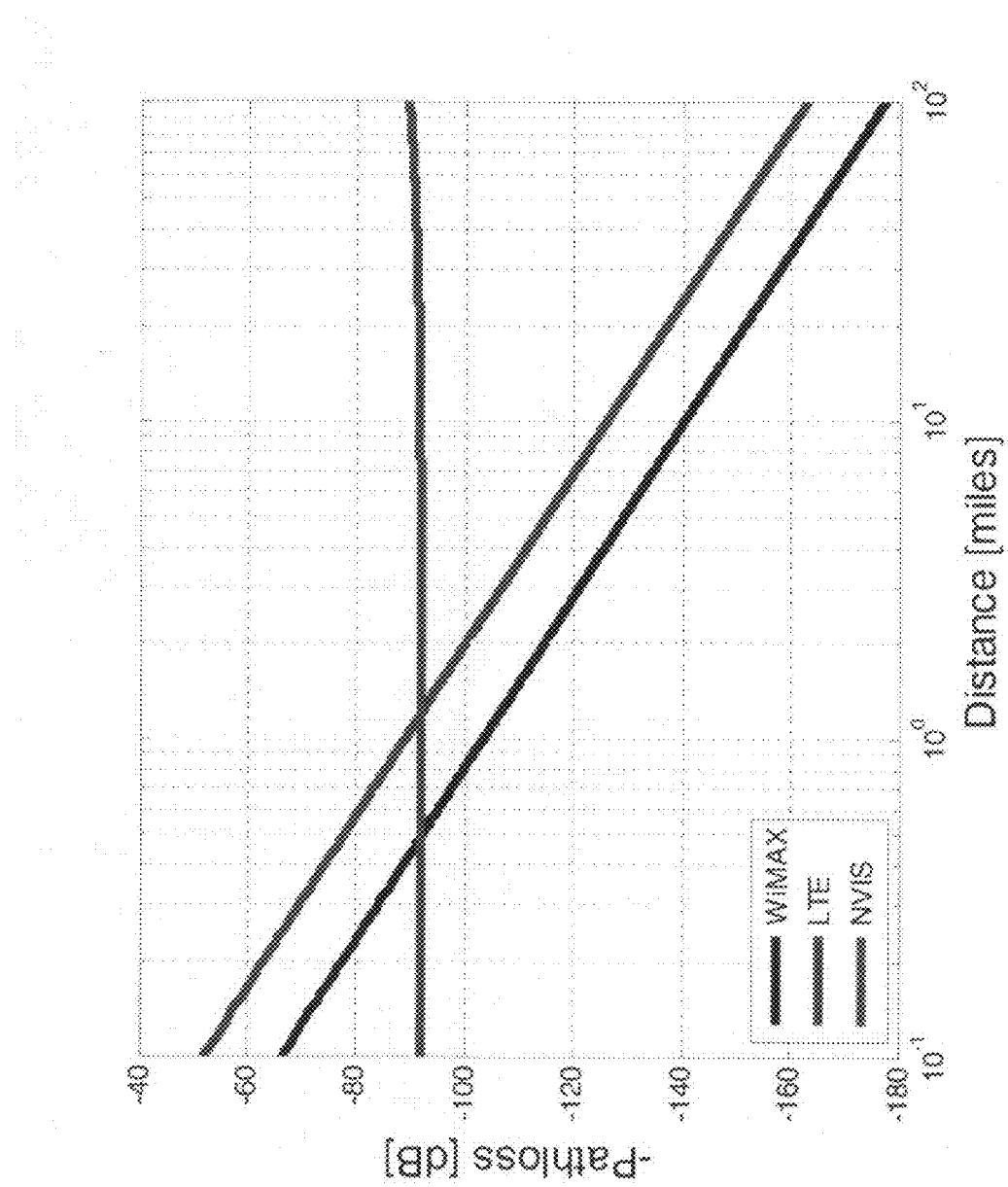
FIG. 71 illustrates the path loss of WiMAX, LTE and NVIS systems.

Due to the absence of obstacles in NVIS links, the propagation loss is mostly due to free space path loss (i.e., Friis formula), without additional attenuation factors as in standard terrestrial wireless systems. Depending on the time of the day and incident angle to the ionosphere, propagating waveforms may suffer from additional 10-25 dB loss due to attenuation from the D layer (i.e., lowest layer of the ionosphere). FIG. 71 compares the path loss in NVIS links against next generation wireless systems such as WiMAX and 3GPP long term evolution (LTE) in macrocells with 43 dBm transmit power. For WiMAX and LTE we used 2.5 GHz and 700 MHz carrier frequencies, respectively. NVIS links yield better signal quality (i.e., wider coverage) than standard systems for distances greater than ~1 mile.

Any wireless system is affected by thermal noise produced internally to radio receivers. In contrast to standard wireless systems, HF links are severely affected by other external noise sources such as: atmospheric noise, man-made noise and galactic noise. Man-made noise is due to environmental sources such as power lines, machinery, ignition systems, and is the main source of noise in the HF band. Its typical values range between −133 and −110 dBm/Hz depending on the environment (i.e., remote versus industrial).

From our Doppler measurements, we observed typical channel coherence time in NVIS links is of the order of seconds, That is about 100 times larger than the Δt=10 msec constraint on the DIDO feedback loop over the DIDO BSN 6111. Hence, in DIDO-NVIS systems a long feedback delay over the DIDO BSN 6111 can be tolerated due to extremely high channel coherence time. Note that our measurements assumed fixed wireless links. In case of mobile stations, the channel coherence time is expected to be of the order of 2 sec in a very high speed scenario (i.e., vehicle or airplane moving at 200 mph) that is still orders of magnitude higher than the latency over the DIDO BSN 6111.

Typical values of delay spreads in NVIS channels are around 2 ms corresponding, corresponding to the roundtrip propagation delay Earth-ionosphere (about 300 Km high). That value may be larger (~5 msec) in presence of multilayer refractions in the ionosphere.

The angular spread in NVIS links is typically very small (less than 1 degree, based on our measurements and simulations). Hence, large antenna spacing is required to obtain spatially selective channels and exploit spatial diversity via DIDO techniques. Strangeways' simulator points to around twenty wavelengths required for a long distance HF skywave link [34,35]. Some experimental results for HF skywave with a spacing of around 0.7 wavelengths indicated high correlation [36,37]. Similar results were obtained from our measurements in NVIS links.

c. DIDO-NVIS Experimental Results

Figure 72:
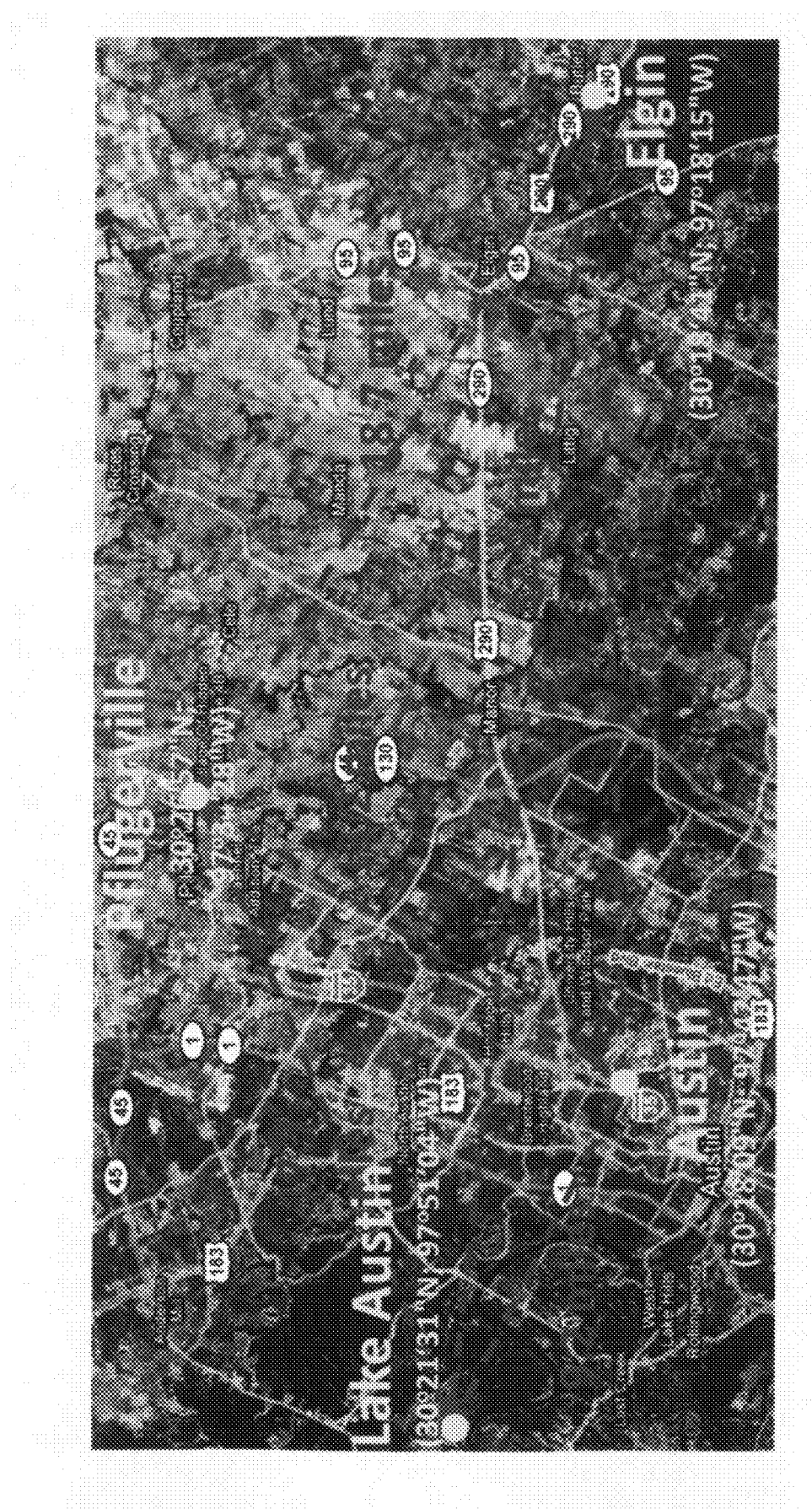
FIG. 72 illustrates the locations of DIDO-NVIS transmitter (TX) and receiver (RX) stations
Figure 73:
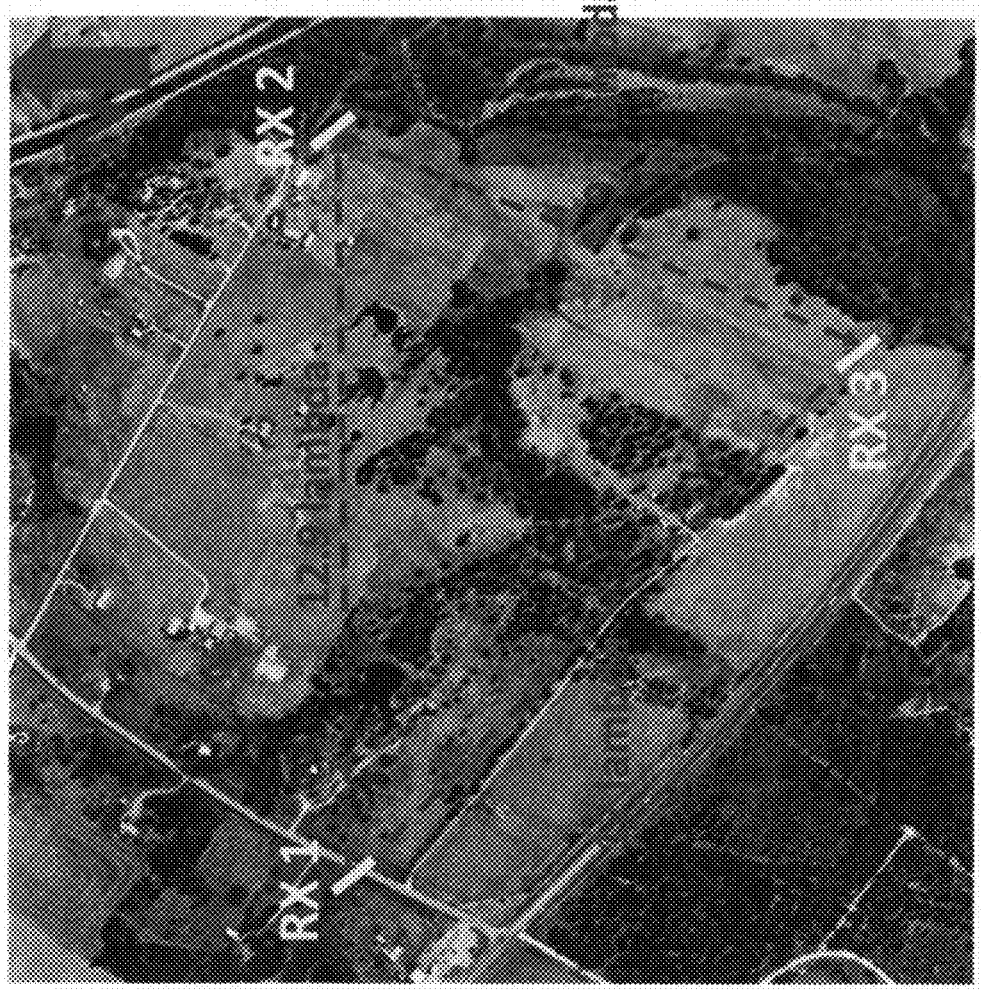
FIG. 73 illustrates DIDO-NVIS receive antenna location. "lambda" denotes the wavelength at 3.9 MHz (~77 meters)

We measured the performance of DIDO-NVIS systems with a practical testbed consisting of three DIDO distributed antennas 6113 for transmission and three DIDO clients 6110 for reception. The transmitters are located in the area of Austin, Tex., as depicted in FIG. 72: TX1 in central Austin, TX2 in Pflugerville, TX3 in Lake Austin. All three receivers are installed with antenna spacing of about 10 wavelengths as in FIG. 73. All six transmit and receive antennas have the same orientation with respect to the direction of the North, since our goal was to evaluate DIDO-NVIS performance when only space diversity is available, without polarization diversity.

The three transmitting distributed antennas are locked to the same GPSDO that provide time and frequency reference. The three receiving DIDO clients have free-running clocks and synchronization algorithms are implemented to compensate for time/frequency offsets. The carrier frequency is 3.9 MHz, bandwidth is 3.125 KHz and we use OFDM modulation with 4-QAM.

Figure 74:
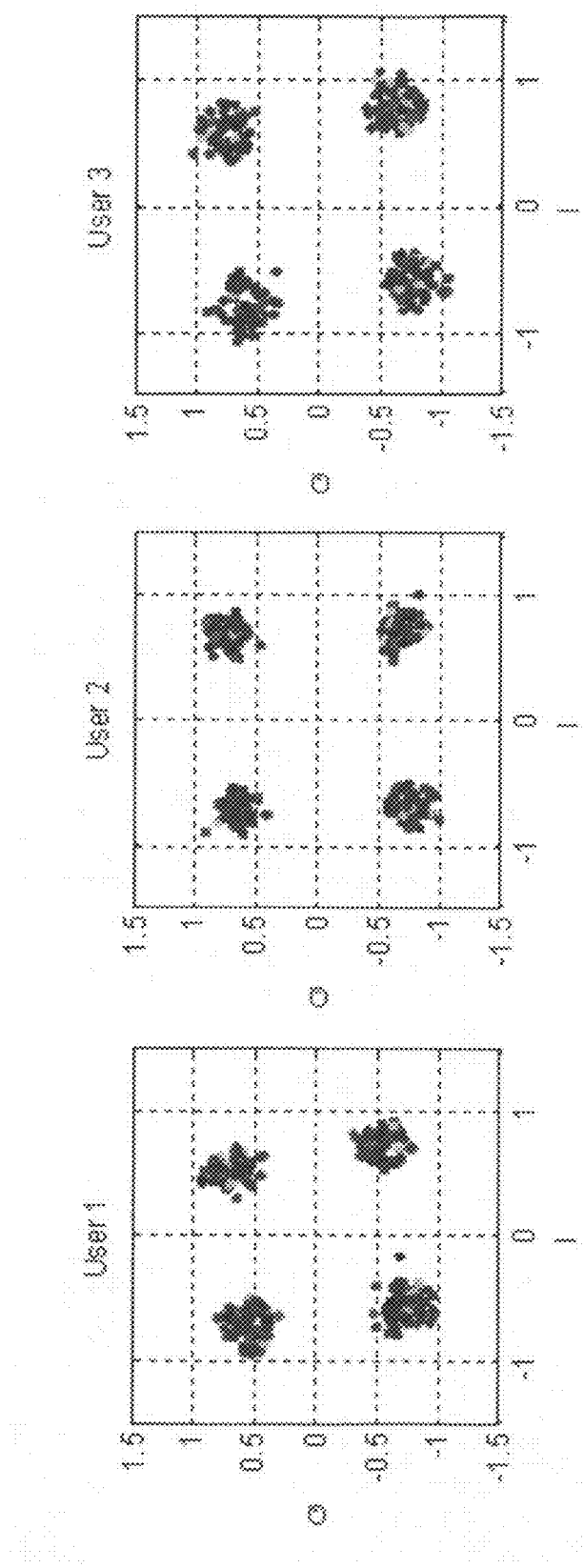
FIG. 74 illustrates typical 4-QAM constellations demodulated at three users' locations over DIDO-NVIS links.

Typical 4-QAM constellations demodulated at the three DIDO client locations are depicted in FIG. 74. Our DIDO-NVIS 3×3 testbed creates three simultaneous spatial channels over NVIS links by pre-cancelling inter-user interference at the transmit side and enabling successful demodulation at the users' side.

Figure 75:
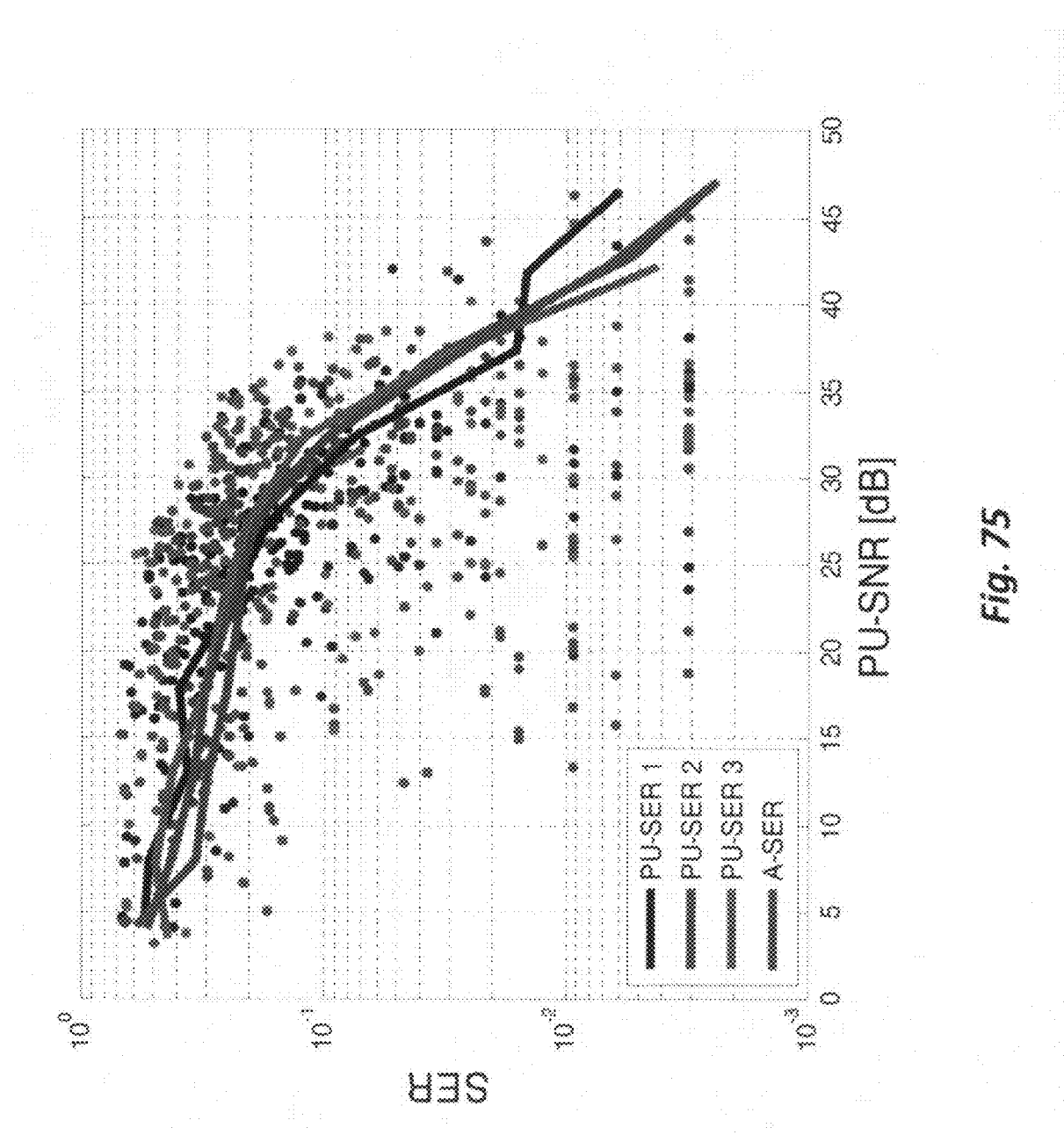
FIG. 75 illustrates SER as a function of PU-SNR for DIDO-NVIS 3×3.

We compute the symbol error rate (SER) performance as a function of the per-user SNR (PU-SNR) over about 1000 channel realizations as in FIG. 75. The dots are individual measurements for all three DIDO clients 6112 and the solid lines are the average per-user SER (PU-SER). The average SER across all three DIDO clients 6112 is denoted as A-SER. About 40 dB receive SNR is require to successfully demodulate 4-QAM constellations in DIDO-NIVS 3×3 links with A-SER<1%. In fact, the transmit/receive antenna configuration in our experiments yields very low spatial diversity (due to relatively close proximity of the receive antennas, given the wavelength, and transmitters being all located on one side of the receivers rather than around the users). In more favorable conditions (i.e., transmitters placed around the users in circle and at larger distance as in FIG. 61) much lower SNR (~20 dB) is required to demodulate QAM constellations with DIDO-NVIS, as derived via simulations in realistic NVIS propagation channels.

d. Practical Implementation of DIDO Systems in NVIS Links

Similarly to the case study 1, we provide one embodiment of DIDO-NVIS system design as follows:

Bandwidth: 1-3 MHz, depending on HF spectrum availability. Larger bandwidths are less practical, since they require more challenging broadband antenna designs. For example, 3 MHz bandwidth at 4 MHz carrier frequency corresponds to fractional antenna bandwidth of 75%.

Carrier Frequency: The HF frequencies corresponding to the plasma critical frequency of the ionosphere are between 1 and 10 MHz. Radio waves at lower frequencies (~1 MHz) are typically reflected by the ionosphere at nighttime, whereas higher frequencies (~10 MHz) at daytime. The frequency of optimal transmission (FOT) at given time of the day varies with the SSN. In practical DIDO-NVIS systems, the carrier frequency can be adjusted throughout the day depending on the FOT provided by the ionospheric maps.

Transmit Power: Based on the path loss results in FIG. 71, the average transmit power requirement for 1 MHz bandwidth with receivers in remote areas (i.e., man-made noise level of −133 dBm/Hz) is between 10 dBm and 30 dBm, depending on QAM modulation and forward error correction (FEC) coding schemes. In industrial areas (i.e., man-made noise level of −110 dBm/Hz) those levels increase of about 23 dB up to 33-53 dBm, depending on QAM modulation and FEC coding schemes.

Modulation: We assume OFDM modulation as in FIG. 11. The cyclic prefix is 2 msec (based upon typical delay spread expected in NVIS links) corresponding to 2000 channel taps at 1 MHz bandwidth. The OFDM waveform can be designed with $2^{14}$ tones, corresponding to ~10% loss in spectral efficiency due to cyclic prefix. The total OFDM symbol duration (including cyclic prefix and data) at 1 MHz bandwidth is 18.4 msec.

Packet Size: is limited by the minimum channel coherence time expected in NVIS links. The minimum coherence time is approximately 1 sec and the channel gain can be considered constant over one tenth of that duration (~100 msec) in the worst case scenario. Then, the packet size is about five OFDM symbols. The packet size can be dynamically adjusted as the coherence time varies over time.

CSI Estimation and Precoding: With the system parameters above, training for CSI estimation is sent every ~100 msec (or higher, when the coherence time increases). The users estimate/feedback the CSI and ~5 msec later (i.e., latency over the BSN feedback loop) they receive 100 msec of precoded data to demodulate.

Figure 76:
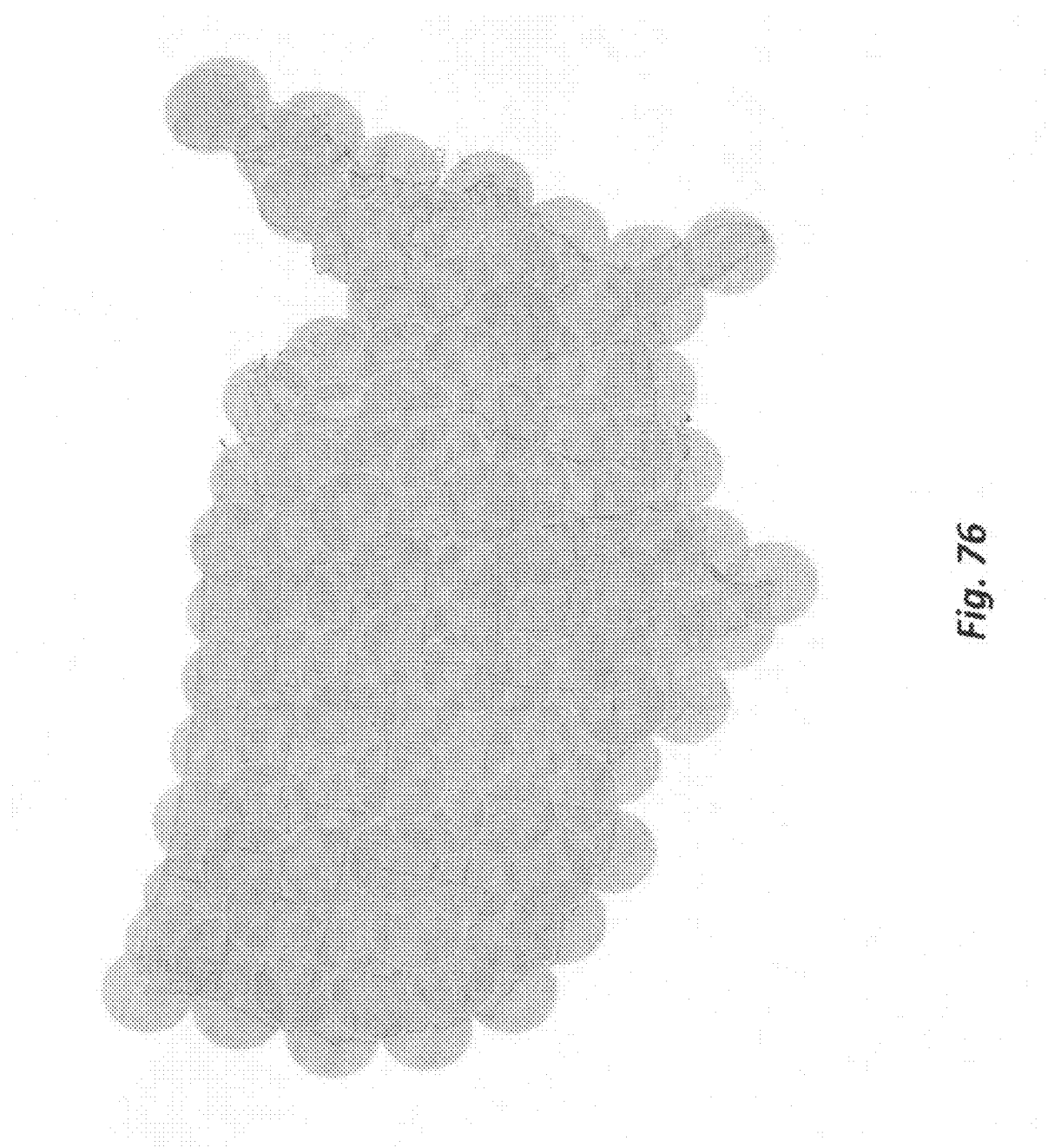
FIG. 76 illustrates DIDO-NVIS cells across the territory of the 48 contiguous states of the USA.

DIDO Distributed Antenna Placement Within the Coverage Area: One practical solution to implement DIDO-NVIS systems is to place multiple DIDO distributed antennas along the circumference of a circular region of radius ~100 miles as in FIG. 61. These stations are connected to each other via a BSN that carries control information. At the speed of light through optical fiber, the propagation latency along the circumference of radius 100 miles is ~3.4 msec. This delay is much smaller than typical channel coherence time in NVIS channels and can be tolerated without any significant performance degradation for the DIDO precoder. Note that if the optical fiber is shared across different operators, that delay may be larger (i.e., 10-30 msec) due to the packet switched nature of the Internet. Multiple DIDO-NVIS cells as in FIG. 76 can be distributed to provide full coverage over the USA. For example, FIG. 76 shows that 109 DIDO cells of radius 125 miles are required to cover the entire territory of the 48 contiguous states in the USA.

REFERENCES

The following references are referred to in the above detailed description, as indicated by the numbered brackets:

[1] 3GPP, "Multiple Input Multiple Output in UTRA", 3GPP TR 25.876 V7.0.0, March 2007

[2] 3GPP, "Base Physical channels and modulation", TS 36.211, V8.7.0, May 2009

[3] 3GPP, "Multiplexing and channel coding", TS 36.212, V8.7.0, May 2009

[4] ArrayComm, "Field-proven results", http://www.arraycomm.com/serve.php?page=proof

[6] http://www.jackson-labs.com/docs/HP_GPS_Apps.pdf

[7] Oda, Y.; Tsuchihashi, R.; Tsunekawa, K.; Hata, M., "Measured path loss and multipath propagation characteristics in UHF and microwave frequency bands for urban mobile communications", Vehicular Technology Conference, Vol. 1, pp. 337-341, 2001

[8] Devasirvatham, D. M. J.; Krain, M. J.; Rappaport, D. A.; Banerjee, C., "Radio propagation measurements at 850 MHz, 1.7 GHz and 4 GHz inside two dissimilar office buildings", IEEE Electronics Letters, Vol. 26, n 7, pp. 445-447 March 1990

[9] Devasirvatham, D., "Time delay spread and signal level measurements of 850 MHz radio waves in building environments", IEEE Trans. on Ant. and Prop., Vol. 34, n. 11, pp. 1300-1305, November 1986

[10] Devasirvatham, D. M. J.; Murray, R. R.; Banerjee, C., "Time delay spread measurements at 850 MHz and 1.7 GHz inside a metropolitan office building", IEEE Electronics Letters, Vol. 25, n 3, pp. 194-196, February 1989

[11] Garcia, C. R.; Lehner, A.; Strang, T.; Frank, K., "Channel Model for Train to Train Communication Using the 400 MHz Band", in Proc. of IEEE Vehicular Technology Conference, pp. 3082-3086, May 2008

[12] John Proakis, "Digital Communications", Mc Graw Hill, 4th Edition, 2001.
[13] Zogg, A., "Multipath delay spread in a hilly region at 210 MHz", IEEE Transactions on Vehicular Technology, Vol. 36, n 4, Page(s): 184-187, November 1987
[14] T. S. Rappaport, *Wireless Communications*, Prentice Hall, 2002
[15] A. Forenza and R. W. Heath, Jr., "Impact of Antenna Geometry on MIMO Communication in Indoor Clustered Channels, (invited) *Proc. of the IEEE AP-S Intern. Symp.*, vol. 2, pp. 1700-1703, Jun. 20-26, 2004.
[16] M. L. Morris and M. A. Jensen, "Network Model for MIMO Systems With Coupled Antennas and Noisy Amplifiers", IEEE TRANS. ON ANTENNAS AND PROPAGATION, VOL. 53, NO. 1, pp. 545-552, January 2005
[17] B. G. Montgomery, "Analog RF-over-fiber technology", Syntonics LLC, January 2008 http://chesapeakebayaoc.org/documents/Syntonics_AOC_RF_over-Fiber_19_Jan_08.pdf
[18] J. Daniel, "Introduction to public safety: RF signal distribution using fiber optics", 2009, http://www.rfsolutions.com/fiber.pdf
[19] Syntonics, "FORAX RF-over-fiber communications systems", http://www.syntonicscorp.com/products/products-foraxRF.html
[20] G. Caire and S. Shamai, "On the achievable throughput of a multiantenna Gaussian broadcast channel," *IEEE Trans. Info. Th.*, vol. 49, pp. 1691-1706, July 2003.
[21] P. Viswanath and D. Tse, "Sum capacity of the vector Gaussian broadcast channel and uplink-downlink duality," *IEEE Trans. Info. Th.*, vol. 49, pp. 1912-1921, August 2003.
[22] S. Vishwanath, N. Jindal, and A. Goldsmith, "Duality, achievable rates, and sum-rate capacity of Gaussian MIMO broadcast channels," *IEEE Trans. Info. Th.*, vol. 49, pp. 2658-2668, October 2003.
[23] W. Yu and J. Cioffi, "Sum capacity of Gaussian vector broadcast channels," *IEEE Trans. Info. Th.*, vol. 50, pp. 1875-1892, September 2004.
[24] M. Costa, "Writing on dirty paper," *IEEE Transactions on Information Theory*, vol. 29, pp. 439-441, May 1983.
[25] M. Bengtsson, "A pragmatic approach to multi-user spatial multiplexing," *Proc. of Sensor Array and Multichannel Sign. Proc. Workshop*, pp. 130-134, August 2002.
[26] K.-K. Wong, R. D. Murch, and K. B. Letaief, "Performance enhancement of multiuser MIMO wireless communication systems," *IEEE Trans. Comm.*, vol. 50, pp. 1960-1970, December 2002.
[27] M. Sharif and B. Hassibi, "On the capacity of MIMO broadcast channel with partial side information," *IEEE Trans. Info. Th.*, vol. 51, pp. 506-522, February 2005.
[28] T. Yoo, N. Jindal, and A. Goldsmith, "Multi-antenna broadcast channels with limited feedback and user selection," *IEEE Journal on Sel. Areas in Communications*, vol. 25, pp. 1478-91, July 2007.
[29] P. Ding, D. J. Love, and M. D. Zoltowski, "On the sum rate of channel subspace feedback for multi-antenna broadcast channels," in *Proc., IEEE Globecom*, vol. 5, pp. 2699-2703, November 2005.
[30] N. Jindal, "MIMO broadcast channels with finite-rate feedback," *IEEE Trans. on Info. Theory*, vol. 52, pp. 5045-60, November 2006.
[31] T. Strohmer, M. Emami, J. Hansen, G. Papanicolaou, A. J. Paulraj, "Application of Time-Reversal with MMSE Equalizer to UWB Communications", Proc. of IEEE Globecom, vol. 5, pp. 3123-3127, November 2004.
[32] J. Zhang, R. Chen, J. G. Andrews, A. Ghosh, and R. W. Heath, Jr., "Coordinated Multi-cell MIMO Systems with Cellular Block Diagonalization," *Proc. of the IEEE Asilomar Conf. on Signals, Systems, and Computers*, pp. 1669-1673, Pacific Grove, Calif., Nov. 4-7, 2007
[33] J. Zhang, R. Chen, J. G. Andrews, A. Ghosh, and R. W. Heath, Jr., "Networked MIMO with Clustered Linear Precoding," *IEEE Trans. on Wireless vol.* 8, no. 4, pp. 1910-1921, April 2009.
[34] H. J. Strangeways, "Determination of the correlation distance for spaced antennas on multipath HF links and implications for design of SIMO and MIMO systems," www.esaspaceweather.net/spweather/workshops/eswwll/proc/Session3/Strangeways HFMIMOposter.pdf
[35] H. J. Strangeways, "Investigation of signal correlation for spaced and co-located antennas on multipath hf links and implications for the design of SIMO and MIMO systems", IEEE First European Conf. on Antennas and Propagation (EuCAP 2006), Vol., n. 6-10, pp. 1-6, November 2006
[36] N. Abbasi, S. D. Gunashekar, E. M. Warrington, S. Salous, S. Feeney, L. Bertel, D. Lemur and M. Oger, "Capacity estimation of HF-MIMO systems", International Conference on Ionospheric Systems and Techniques, April 2009
[37] S. Gunashekar, E. M. Warrington, S. Salous, S. M. Feeney, N. M. Abbasi, L. Bertel, D. Lemur, M. Oger, "Investigations into the Feasibility of MIMO Techniques within the HF Band: Preliminary Results", Radio Science (Special Issue), 2009, (In Press)

Embodiments of the invention may include various steps as set forth above. The steps may be embodied in machine-executable instructions which cause a general-purpose or special-purpose processor to perform certain steps. For example, the various components within the Base Stations/APs and Client Devices described above may be implemented as software executed on a general purpose or special purpose processor. To avoid obscuring the pertinent aspects of the invention, various well known personal computer components such as computer memory, hard drive, input devices, etc., have been left out of the figures.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, certain modules such as the Coding, Modulation and Signal Processing Logic 903 described above may be implemented on a programmable digital signal processor ("DSP") (or group of DSPs) such as a DSP using a Texas Instruments' TMS320x architecture (e.g., a TMS320C6000, TMS320C5000, . . . etc). The DSP in this embodiment may be embedded within an add-on card to a personal computer such as, for example, a PCI card. Of course, a variety of different DSP architectures may be used while still complying with the underlying principles of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

Moreover, throughout the foregoing description, numerous publications were cited to provide a more thorough understanding of the present invention. All of these cited references are incorporated into the present application by reference.

The invention claimed is:

1. A machine-implemented method within a multiuser multiple antenna system (MU-MAS), that creates a plurality of simultaneous non-interfering data streams from a plurality of cooperative, distributed antennas to a plurality of clients, for adjusting communication with a first client as the first client moves from a first MU-MAS cluster to a second MU-MAS cluster, the method comprising:
   detecting signal strength between the first client and the first MU-MAS cluster ("S1") and between the first client and the second MU-MAS cluster ("S2"); and
   switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;
   wherein, when the first client is within a zone in which S2 is sufficiently low with respect to S1, MU-MAS precoding without IMCI cancellation is implemented on a BTS in the first MU-MAS cluster to transmit a first set of simultaneous non-interfering data streams within a frequency band to a first plurality of clients including the first client, and MU-MAS precoding without IMCI cancellation is implemented a BTS in the second MU-MAS cluster to transmit a second set of simultaneous non-interfering data streams within the frequency band to a second plurality of clients not including the first client.

2. The method as in claim 1, further comprising:
   calculating a signal-to-interference-plus-noise ratio (SINR) or signal-to-interference ratio (SIR) for S1 and S2; and
   defining one or more of the signal thresholds based on values of the SIR or SINR.

3. The method as in claim 1, further comprising:
   adjusting one or more of the threshold values dynamically to implement a hysteresis loop in response to the first client moving between zones to avoid repetitive switches between each of the zones based on the relative values of S1 and S2.

4. The method as in claim 1, wherein a determination as to the zone in which the client currently resides is made by the client.

5. The method as in claim 1, wherein a determination as to a zone in which the client currently resides is made by a base transceiver station (BTS) in the first MU-MAS cluster or the second MU-MAS cluster.

6. The method as in claim 1, wherein the switching is implemented with a finite state machine, the finite state machine implemented as a processor executing sequences of instructions.

7. The method as in claim 1 wherein implementing MU-MAS precoding with IMCI cancellation comprises transmitting a plurality of radio frequency (RF) signals to create locations in space with zero RF energy.

8. The method as in claim 7, wherein M distributed transmitting antennas create up to (M−1) points of zero RF energy.

9. The method as in claim 7, wherein the locations of zero RF energy are receivers, the transmitting antennas are aware of the channel state information between the transmitters and the receivers, and the transmitters utilize the channel state information to determine the interfering signals to be simultaneously transmitted.

10. The method as in claim 9, wherein the MU-MAS precoding is block diagonalization precoding.

11. The method as in claim 1, when the first client is within a zone in which S2 has increased relative to S1 or S1 has decreased relative to S2 such that the relative values of S2 and S1 have resulted in a first of the one or more thresholds being reached, the method further comprising:
   generating channel state information (CSI) defining a channel state between one or more antennas of the first client and one or more antennas of the second MU-MAS cluster, wherein a BTS of the second MU-MAS cluster uses the CSI to implement MU-MAS precoding with IMCI cancellation to avoid RF interference at the first client.

12. The method as in claim 1, wherein, when the first client is within a zone in which S2 has increased relative to S1 or S1 has decreased relative to S2 such that the relative values of S2 and S1 have resulted in a second of the one or more thresholds being reached, MU-MAS precoding without IMCI cancellation is implemented on a BTS in the second MU-MAS cluster to transmit a set of simultaneous non-interfering data streams within a frequency band to a first plurality of clients including the first client and the method further comprising:
   generating channel state information (CSI) defining a channel state between one or more antennas of the first client and one or more antennas of the first MU-MAS cluster, wherein a BTS of the first MU-MAS cluster uses the CSI to implement MU-MAS precoding with IMCI cancellation to avoid RF interference at the first client.

13. The method as in claim 1, wherein, when the first client is within a zone in which S2 has increased relative to S1 or S1 has decreased relative to S2 such that the relative values of S2 and S1 have resulted in a third of the one or more thresholds being reached, MU-MAS precoding without IMCI cancellation is implemented on a BTS in the second MU-MAS cluster to transmit a first set of simultaneous non-interfering data streams within a frequency band to a first plurality of clients including the first client, and MU-MAS precoding without IMCI cancellation is implemented on a BTS in the first MU-MAS cluster to transmit a second set of simultaneous non-interfering data streams within the frequency band to a second plurality of clients not including the first client.

14. A system comprising a processing device and a memory storing instructions, wherein the processing device executes the instructions that cause the system to perform a method within a multiuser multiple antenna system (MU-MAS), that creates a plurality of simultaneous non-interfering data streams from a plurality of cooperative distributed antennas to a plurality of clients, for adjusting communication with a first client as the first client moves from a first MU-MAS cluster to a second MU-MAS cluster, the method comprising:

detecting signal strength between the first client and the first MU-MAS cluster ("S1") and between the first client and the second MU-MAS cluster ("S2"); and switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;

wherein, when the first client is within a zone in which S2 is sufficiently low with respect to S1, MU-MAS precoding without IMCI cancellation is implemented on a BTS in the first MU-MAS cluster to transmit a first set of simultaneous non-interfering data streams within a frequency band to a first plurality of clients including the first client, and MU-MAS precoding without IMCI cancellation is implemented a BTS in the second MU-MAS cluster to transmit a second set of simultaneous non-interfering data streams within the frequency band to a second plurality of clients not including the first client.

15. The system as in claim 14, the method further comprising:

calculating a signal-to-interference-plus-noise ratio (SINR) or signal-to-interference ratio (SIR) for S1 and S2; and defining one or more of the signal thresholds based on values of the SIR or SINR.

16. The system as in claim 14, the method further comprising:

adjusting one or more of the threshold values dynamically to implement a hysteresis loop in response to the first client moving between zones to avoid repetitive switches between each of the zones based on the relative values of S1 and S2.

17. The system as in claim 14, the method wherein a determination as to the zone in which the client currently resides is made by the client.

18. The system as in claim 14, the method wherein a determination as to a zone in which the client currently resides is made by a base transceiver station (BTS) in the first MU-MAS cluster or the second MU-MAS cluster.

19. The system as in claim 14, wherein the switching is implemented with a finite state machine, the finite state machine implemented as a processor executing sequences of instructions.

20. The system as in claim 14 wherein implementing MU-MAS precoding with IMCI cancellation comprises transmitting a plurality of radio frequency (RF) signals to create locations in space with zero RF energy.

21. The system as in claim 20, wherein M distributed transmitting antennas create up to (M−1) points of zero RF energy.

22. The system as in claim 20, wherein the locations of zero RF energy are receivers, the transmitting antennas are aware of the channel state information between the transmitters and the receivers, and the transmitters utilize the channel state information to determine the interfering signals to be simultaneously transmitted.

23. The system as in claim 22, wherein the MU-MAS precoding is block diagonalization precoding.

24. The system as in claim 14, when the first client is within a zone in which S2 has increased relative to S1 or S1 has decreased relative to S2 such that the relative values of S2 and S1 have resulted in a first of the one or more thresholds being reached, the method further comprising:

generating channel state information (CSI) defining a channel state between one or more antennas of the first client and one or more antennas of the second MU-MAS cluster, wherein a BTS of the second MU-MAS cluster uses the CSI to implement MU-MAS precoding with IMCI cancellation to avoid RF interference at the first client.

25. The system as in claim 14, wherein, when the first client is within a zone in which S2 has increased relative to S1 or S1 has decreased relative to S2 such that the relative values of S2 and S1 have resulted in a second of the one or more thresholds being reached, MU-MAS precoding without IMCI cancellation is implemented on a BTS in the second MU-MAS cluster to transmit a set of simultaneous non-interfering data streams within a frequency band to a first plurality of clients including the first client and the method further comprising:

generating channel state information (CSI) defining a channel state between one or more antennas of the first client and one or more antennas of the first MU-MAS cluster, wherein a BTS of the first MU-MAS cluster uses the CSI to implement MU-MAS precoding with IMCI cancellation to avoid RF interference at the first client.

26. The system as in claim 14, wherein, when the first client is within a zone in which S2 has increased relative to S1 or S1 has decreased relative to S2 such that the relative values of S2 and S1 have resulted in a third of the one or more thresholds being reached, MU-MAS precoding without IMCI cancellation is implemented on a BTS in the second MU-MAS cluster to transmit a first set of simultaneous non-interfering data streams within a frequency band to a first plurality of clients including the first client, and MU-MAS precoding without IMCI cancellation is implemented on a BTS in the first MU-MAS cluster to transmit a second set of simultaneous non-interfering data streams within the frequency band to a second plurality of clients not including the first client.

27. A machine-implemented method within a multiuser multiple antenna system (MU-MAS), that creates a plurality of simultaneous non-interfering data streams from a plurality of cooperative, distributed antennas to a plurality of clients, for adjusting communication with a first client as the first client moves from a first MU-MAS cluster to a second MU-MAS cluster, the method comprising:

detecting signal strength between the first client and the first MU-MAS cluster ("S1") and between the first client and the second MU-MAS cluster ("S2"); and switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2 wherein when the first client is within a zone in which S2 has increased relative to S1 or S1 has decreased relative to S2 such that the relative values of S2 and S1 have resulted in a first of the one or more thresholds being reached, the method further comprising:

generating channel state information (CSI) defining a channel state between one or more antennas of the first client and one or more antennas of the second MU- MAS cluster, wherein a BTS of the second MU-MAS cluster uses the CSI to implement MU-MAS precoding with IMCI cancellation to avoid RF interference at the first client.

28. A machine-implemented method within a multiuser multiple antenna system (MU-MAS), that creates a plurality of simultaneous non-interfering data streams from a plurality of cooperative, distributed antennas to a plurality of clients, for adjusting communication with a first client as the first client moves from a first MU-MAS cluster to a second MU-MAS cluster, the method comprising:
- detecting signal strength between the first client and the first MU-MAS cluster ("S1") and between the first client and the second MU-MAS cluster ("S2"); and
- switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;
- wherein, when the first client is within a zone in which S2 has increased relative to S1 or S1 has decreased relative to S2 such that the relative values of S2 and S1 have resulted in a second of the one or more thresholds being reached, MU-MAS precoding without IMCI cancellation is implemented on a BTS in the second MU-MAS cluster to transmit a set of simultaneous non-interfering data streams within a frequency band to a first plurality of clients including the first client and the method further comprising:
- generating channel state information (CSI) defining a channel state between one or more antennas of the first client and one or more antennas of the first MU-MAS cluster, wherein a BTS of the first MU-MAS cluster uses the CSI to implement MU-MAS precoding with IMCI cancellation to avoid RF interference at the first client.

29. A machine-implemented method within a multiuser multiple antenna system (MU-MAS), that creates a plurality of simultaneous non-interfering data streams from a plurality of cooperative, distributed antennas to a plurality of clients, for adjusting communication with a first client as the first client moves from a first MU-MAS cluster to a second MU-MAS cluster, the method comprising:
- detecting signal strength between the first client and the first MU-MAS cluster ("S1") and between the first client and the second MU-MAS cluster ("S2"); and
- switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;
- wherein, when the first client is within a zone in which S2 has increased relative to S1 or S1 has decreased relative to S2 such that the relative values of S2 and S1 have resulted in a third of the one or more thresholds being reached, MU-MAS precoding without IMCI cancellation is implemented on a BTS in the second MU-MAS cluster to transmit a first set of simultaneous non-interfering data streams within a frequency band to a first plurality of clients including the first client, and MU-MAS precoding without IMCI cancellation is implemented on a BTS in the first MU-MAS cluster to transmit a second set of simultaneous non-interfering data streams within the frequency band to a second plurality of clients not including the first client.

30. A system comprising a processing device and a memory storing instructions, wherein the processing device executes the instructions that cause the system to perform a method within a multiuser multiple antenna system (MU-MAS), that creates a plurality of simultaneous non-interfering data streams from a plurality of cooperative distributed antennas to a plurality of clients, for adjusting communication with a first client as the first client moves from a first MU-MAS cluster to a second MU-MAS cluster, the method comprising:
- detecting signal strength between the first client and the first MU-MAS cluster ("S1") and between the first client and the second MU-MAS cluster ("S2"); and
- switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;
- wherein when the first client is within a zone in which S2 has increased relative to S1 or S1 has decreased relative to S2 such that the relative values of S2 and S1 have resulted in a first of the one or more thresholds being reached, the method further comprising:
- generating channel state information (CSI) defining a channel state between one or more antennas of the first client and one or more antennas of the second MU-MAS cluster, wherein a BTS of the second MU-MAS cluster uses the CSI to implement MU-MAS precoding with IMCI cancellation to avoid RF interference at the first client.

31. A system comprising a processing device and a memory storing instructions, wherein the processing device executes the instructions that cause the system to perform a method within a multiuser multiple antenna system (MU-MAS), that creates a plurality of simultaneous non-interfering data streams from a plurality of cooperative distributed antennas to a plurality of clients, for adjusting communication with a first client as the first client moves from a first MU-MAS cluster to a second MU-MAS cluster, the method comprising:
- detecting signal strength between the first client and the first MU-MAS cluster ("S1") and between the first client and the second MU-MAS cluster ("S2"); and
- switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;
- wherein, when the first client is within a zone in which S2 has increased relative to S1 or S1 has decreased relative to S2 such that the relative values of S2 and S1 have resulted in a second of the one or more thresholds being reached, MU-MAS precoding without IMCI cancellation is implemented on a BTS in the second MU-MAS cluster to transmit a set of simultaneous non-interfering data streams within a frequency band to a first plurality of clients including the first client and the method further comprising:
- generating channel state information (CSI) defining a channel state between one or more antennas of the first client and one or more antennas of the first MU-MAS cluster, wherein a BTS of the first MU-MAS cluster uses the CSI to implement MU-MAS precoding with IMCI cancellation to avoid RF interference at the first client.

32. A system comprising a processing device and a memory storing instructions, wherein the processing device executes the instructions that cause the system to perform a method within a multiuser multiple antenna system (MU-MAS), that creates a plurality of simultaneous non-interfering data streams from a plurality of cooperative distributed antennas to a plurality of clients, for adjusting communication with a first client as the first client moves from a first MU-MAS cluster to a second MU-MAS cluster, the method comprising:

detecting signal strength between the first client and the first MU-MAS cluster ("S1") and between the first client and the second MU-MAS cluster ("S2"); and switching between MU-MAS precoding with inter-MU-MAS-cluster interference (IMCI) cancellation and MU-MAS precoding without IMCI cancellation at the first MU-MAS cluster or at the second MU-MAS cluster based upon one or more signal thresholds and the detected signal strengths S1 and S2;

wherein, when the first client is within a zone in which S2 has increased relative to S1 or S1 has decreased relative to S2 such that the relative values of S2 and S1 have resulted in a third of the one or more thresholds being reached, MU-MAS precoding without IMCI cancellation is implemented on a BTS in the second MU-MAS cluster to transmit a first set of simultaneous non-interfering data streams within a frequency band to a first plurality of clients including the first client, and MU-MAS precoding without IMCI cancellation is implemented on a BTS in the first MU-MAS cluster to transmit a second set of simultaneous non-interfering data streams within the frequency band to a second plurality of clients not including the first client.

* * * * *